US012087308B2

(12) United States Patent
Gruber et al.

(10) Patent No.: US 12,087,308 B2
(45) Date of Patent: Sep. 10, 2024

(54) INTELLIGENT AUTOMATED ASSISTANT

(71) Applicant: Apple Inc., Cupertino, CA (US)

(72) Inventors: Thomas R. Gruber, Santa Cruz, CA (US); Adam J. Cheyer, Oakland, CA (US); Daniel Keen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 32 days.

(21) Appl. No.: 16/912,278

(22) Filed: Jun. 25, 2020

(65) Prior Publication Data

US 2020/0327895 A1 Oct. 15, 2020

Related U.S. Application Data

(63) Continuation of application No. 16/352,410, filed on Mar. 13, 2019, now Pat. No. 10,741,185, which is a (Continued)

(51) Int. Cl.

*G06Q 10/00* (2023.01)
*G06F 3/16* (2006.01)
*G06F 16/2457* (2019.01)
*G06F 16/9537* (2019.01)
*G06Q 10/02* (2012.01)

(Continued)

(52) U.S. Cl.

CPC .............. *G10L 17/22* (2013.01); *G06F 3/167* (2013.01); *G06F 16/2457* (2019.01); *G06F 16/9537* (2019.01); *G06Q 10/02* (2013.01); *G10L 15/22* (2013.01); *G10L 15/1815* (2013.01); *G10L 2015/226* (2013.01)

(58) Field of Classification Search

None

See application file for complete search history.

(56) References Cited

U.S. PATENT DOCUMENTS 1,559,320 A 10/1925 Hirsh
2,180,522 A 11/1939 Henne (Continued)

FOREIGN PATENT DOCUMENTS

AU 2014100581 B4 9/2014
AU 2015203483 A1 7/2015

(Continued)

OTHER PUBLICATIONS

2004 Chrysler Pacifica: U-Connect Hands-Free Communication System, The Best and Brightest of 2004, Brief Article, Automotive Industries, Sep. 2003, 1 page.

(Continued)

*Primary Examiner* — Tonya Joseph

(74) *Attorney, Agent, or Firm* — DLA Piper LLP (US)

(57) ABSTRACT

The intelligent automated assistant system engages with the user in an integrated, conversational manner using natural language dialog, and invokes external services when appropriate to obtain information or perform various actions. The system can be implemented using any of a number of different platforms, such as the web, email, smartphone, and the like, or any combination thereof. In one embodiment, the system is based on sets of interrelated domains and tasks, and employs additional functionally powered by external services with which the system can interact.

39 Claims, 52 Drawing Sheets

Related U.S. Application Data continuation of application No. 13/913,336, filed on Jun. 7, 2013, now Pat. No. 10,276,170, which is a continuation-in-part of application No. 12/987,982, filed on Jan. 10, 2011, now Pat. No. 9,318,108.

(60) Provisional application No. 61/657,736, filed on Jun. 8, 2012, provisional application No. 61/295,774, filed on Jan. 18, 2010.

(51) Int. Cl.

*G10L 15/22* (2006.01)
*G10L 17/22* (2013.01)
*G10L 15/18* (2013.01)

(56) References Cited

U.S. PATENT DOCUMENTS 3,704,345 A 11/1972 Coker et al.
3,710,321 A 1/1973 Rubenstein
3,828,132 A 8/1974 Flanagan et al.
3,979,557 A 9/1976 Schulman et al.
4,013,085 A 3/1977 Wright
4,081,631 A 3/1978 Feder
4,090,216 A 5/1978 Constable
4,107,784 A 8/1978 Van Bemmelen
4,108,211 A 8/1978 Tanaka
4,159,536 A 6/1979 Kehoe et al.
4,181,821 A 1/1980 Pirz et al.
4,204,089 A 5/1980 Key et al.
4,241,286 A 12/1980 Gordon
4,253,477 A 3/1981 Eichman
4,278,838 A 7/1981 Antonov
4,282,405 A 8/1981 Taguchi
4,310,721 A 1/1982 Manley et al.
4,332,464 A 6/1982 Bartulis et al.
4,348,553 A 9/1982 Baker et al.
4,384,169 A 5/1983 Mozer et al.
4,386,345 A 5/1983 Narveson et al.
4,433,377 A 2/1984 Eustis et al.
4,451,849 A 5/1984 Fuhrer
4,485,439 A 11/1984 Rothstein
4,495,644 A 1/1985 Parks et al.
4,513,379 A 4/1985 Wilson et al.
4,513,435 A 4/1985 Sakoe et al.
4,577,343 A 3/1986 Oura
4,586,158 A 4/1986 Brandle
4,587,670 A 5/1986 Levinson et al.
4,589,022 A 5/1986 Prince et al.
4,611,346 A 9/1986 Bednar et al.
4,615,081 A 10/1986 Lindahl
4,618,984 A 10/1986 Das et al.
4,642,790 A 2/1987 Minshull et al.
4,653,021 A 3/1987 Takagi
4,654,875 A 3/1987 Srihari et al.
4,655,233 A 4/1987 Laughlin
4,658,425 A 4/1987 Julstrom
4,670,848 A 6/1987 Schramm
4,677,570 A 6/1987 Taki
4,680,429 A 7/1987 Murdock et al.
4,680,805 A 7/1987 Scott
4,686,522 A 8/1987 Hernandez et al.
4,688,195 A 8/1987 Thompson et al.
4,692,941 A 9/1987 Jacks et al.
4,698,625 A 10/1987 McCaskill et al.
4,709,390 A 11/1987 Atal et al.
4,713,775 A 12/1987 Scott et al.
4,718,094 A 1/1988 Bahl et al.
4,724,542 A 2/1988 Williford
4,726,065 A 2/1988 Froessl
4,727,354 A 2/1988 Lindsay
RE32,632 E 3/1988 Atkinson
4,736,296 A 4/1988 Katayama et al.
4,750,122 A 6/1988 Kaji et al.
4,754,489 A 6/1988 Bokser
4,755,811 A 7/1988 Slavin et al.
4,776,016 A 10/1988 Hansen
4,783,804 A 11/1988 Juang et al.
4,783,807 A 11/1988 Marley
4,785,413 A 11/1988 Atsumi
4,790,028 A 12/1988 Ramage
4,797,930 A 1/1989 Goudie
4,802,223 A 1/1989 Lin et al.
4,803,729 A 2/1989 Baker
4,807,752 A 2/1989 Chodorow
4,811,243 A 3/1989 Racine
4,813,074 A 3/1989 Marcus
4,819,271 A 4/1989 Bahl et al.
4,827,518 A 5/1989 Feustel et al.
4,827,520 A 5/1989 Zeinstra
4,829,576 A 5/1989 Porter
4,829,583 A 5/1989 Monroe et al.
4,831,551 A 5/1989 Schalk et al.
4,833,712 A 5/1989 Bahl et al.
4,833,718 A 5/1989 Sprague
4,837,798 A 6/1989 Cohen et al.
4,837,831 A 6/1989 Gillick et al.
4,839,853 A 6/1989 Deerwester et al.
4,852,168 A 7/1989 Sprague
4,862,504 A 8/1989 Nomura
4,875,187 A 10/1989 Smith
4,878,230 A 10/1989 Murakami et al.
4,887,212 A 12/1989 Zamora et al.
4,896,359 A 1/1990 Yamamoto et al.
4,903,305 A 2/1990 Gillick et al.
4,905,163 A 2/1990 Garber et al.
4,908,867 A 3/1990 Silverman
4,914,586 A 4/1990 Swinehart et al.
4,914,590 A 4/1990 Loatman et al.
4,918,723 A 4/1990 Iggulden et al.
4,926,491 A 5/1990 Maeda et al.
4,928,307 A 5/1990 Lynn
4,931,783 A 6/1990 Atkinson
4,935,954 A 6/1990 Thompson et al.
4,939,639 A 7/1990 Lee et al.
4,941,488 A 7/1990 Marxer et al.
4,944,013 A 7/1990 Gouvianakis et al.
4,945,504 A 7/1990 Nakama et al.
4,953,106 A 8/1990 Gansner et al.
4,955,047 A 9/1990 Morganstein et al.
4,965,763 A 10/1990 Zamora
4,972,462 A 11/1990 Shibata
4,974,191 A 11/1990 Amirghodsi et al.
4,975,975 A 12/1990 Filipski
4,977,598 A 12/1990 Doddington et al.
4,980,916 A 12/1990 Zinser
4,985,924 A 1/1991 Matsuura
4,992,972 A 2/1991 Brooks et al.
4,994,966 A 2/1991 Hutchins
4,994,983 A 2/1991 Landell et al.
5,001,774 A 3/1991 Lee
5,003,577 A 3/1991 Ertz et al.
5,007,095 A 4/1991 Nara et al.
5,007,098 A 4/1991 Kumagai
5,010,574 A 4/1991 Wang
5,016,002 A 5/1991 Levanto
5,020,112 A 5/1991 Chou
5,021,971 A 6/1991 Lindsay
5,022,081 A 6/1991 Hirose et al.
5,027,110 A 6/1991 Chang et al.
5,027,406 A 6/1991 Roberts et al.
5,027,408 A 6/1991 Kroeker et al.
5,029,211 A 7/1991 Ozawa
5,031,217 A 7/1991 Nishimura
5,032,989 A 7/1991 Tornetta
5,033,087 A 7/1991 Bahl et al.
5,040,218 A 8/1991 Vitale et al.
5,046,099 A 9/1991 Nishimura
5,047,614 A 9/1991 Bianco
5,047,617 A 9/1991 Shepard et al.
5,050,215 A 9/1991 Nishimura
5,053,758 A 10/1991 Cornett et al.
5,054,084 A 10/1991 Tanaka et al.
5,057,915 A 10/1991 Von Kohorn

(56) References Cited

U.S. PATENT DOCUMENTS 5,067,158 A 11/1991 Arjmand
5,067,503 A 11/1991 Stile
5,072,452 A 12/1991 Brown et al.
5,075,896 A 12/1991 Wilcox et al.
5,079,723 A 1/1992 Herceg et al.
5,083,119 A 1/1992 Trevett et al.
5,083,268 A 1/1992 Hemphill et al.
5,086,792 A 2/1992 Chodorow
5,090,012 A 2/1992 Kajiyama et al.
5,091,790 A 2/1992 Silverberg
5,091,945 A 2/1992 Kleijn
5,103,498 A 4/1992 Lanier et al.
5,109,509 A 4/1992 Katayama et al.
5,111,423 A 5/1992 Kopec, Jr. et al.
5,119,079 A 6/1992 Hube et al.
5,122,951 A 6/1992 Kamiya
5,123,103 A 6/1992 Ohtaki et al.
5,125,022 A 6/1992 Hunt et al.
5,125,030 A 6/1992 Nomura et al.
5,127,043 A 6/1992 Hunt et al.
5,127,053 A 6/1992 Koch
5,127,055 A 6/1992 Larkey
5,128,672 A 7/1992 Kaehler
5,133,011 A 7/1992 McKiel, Jr.
5,133,023 A 7/1992 Bokser
5,142,584 A 8/1992 Ozawa
5,144,875 A 9/1992 Nakada
5,148,541 A 9/1992 Lee et al.
5,153,913 A 10/1992 Kandefer et al.
5,157,610 A 10/1992 Asano et al.
5,157,779 A 10/1992 Washburn et al.
5,161,102 A 11/1992 Griffin et al.
5,164,900 A 11/1992 Bernath
5,164,982 A 11/1992 Davis
5,165,007 A 11/1992 Bahl et al.
5,167,004 A 11/1992 Netsch et al.
5,175,536 A 12/1992 Aschliman et al.
5,175,803 A 12/1992 Yeh
5,175,814 A 12/1992 Anick et al.
5,179,627 A 1/1993 Sweet et al.
5,179,652 A 1/1993 Rozmanith et al.
5,194,950 A 3/1993 Murakami et al.
5,195,034 A 3/1993 Garneau et al.
5,195,167 A 3/1993 Bahl et al.
5,197,005 A 3/1993 Shwartz et al.
5,199,077 A 3/1993 Wilcox et al.
5,201,034 A 4/1993 Matsuura et al.
5,202,952 A 4/1993 Gillick et al.
5,208,862 A 5/1993 Ozawa
5,210,689 A 5/1993 Baker et al.
5,212,638 A 5/1993 Bernath
5,212,821 A 5/1993 Gorin et al.
5,216,747 A 6/1993 Hardwick et al.
5,218,700 A 6/1993 Beechick
5,220,629 A 6/1993 Kosaka et al.
5,220,639 A 6/1993 Lee
5,220,657 A 6/1993 Bly et al.
5,222,146 A 6/1993 Bahl et al.
5,230,036 A 7/1993 Akamine et al.
5,231,670 A 7/1993 Goldhor et al.
5,235,680 A 8/1993 Bijnagte
5,237,502 A 8/1993 White et al.
5,241,619 A 8/1993 Schwartz et al.
5,252,951 A 10/1993 Tannenbaum et al.
5,253,325 A 10/1993 Clark
5,257,387 A 10/1993 Richek et al.
5,260,697 A 11/1993 Barrett et al.
5,266,931 A 11/1993 Tanaka
5,266,949 A 11/1993 Rossi
5,267,345 A 11/1993 Brown et al.
5,268,990 A 12/1993 Cohen et al.
5,274,771 A 12/1993 Hamilton et al.
5,274,818 A 12/1993 Vasilevsky et al.
5,276,616 A 1/1994 Kuga et al.
5,276,794 A 1/1994 Lamb, Jr.
5,278,980 A 1/1994 Pedersen et al.
5,282,265 A 1/1994 Rohra Suda et al.
5,283,818 A 2/1994 Klausner et al.
5,287,448 A 2/1994 Nicol et al.
5,289,562 A 2/1994 Mizuta et al.
RE34,562 E 3/1994 Murakami et al.
5,291,286 A 3/1994 Murakami et al.
5,293,254 A 3/1994 Eschbach
5,293,448 A 3/1994 Honda
5,293,452 A 3/1994 Picone et al.
5,296,642 A 3/1994 Konishi
5,297,170 A 3/1994 Eyuboglu et al.
5,297,194 A 3/1994 Hunt et al.
5,299,125 A 3/1994 Baker et al.
5,299,284 A 3/1994 Roy
5,301,109 A 4/1994 Landauer et al.
5,303,406 A 4/1994 Hansen et al.
5,305,205 A 4/1994 Weber et al.
5,305,768 A 4/1994 Gross et al.
5,309,359 A 5/1994 Katz et al.
5,315,689 A 5/1994 Kanazawa et al.
5,317,507 A 5/1994 Gallant
5,317,647 A 5/1994 Pagallo
5,325,297 A 6/1994 Bird et al.
5,325,298 A 6/1994 Gallant
5,325,462 A 6/1994 Farrett
5,326,270 A 7/1994 Ostby et al.
5,327,342 A 7/1994 Roy
5,327,498 A 7/1994 Hamon
5,329,608 A 7/1994 Bocchieri et al.
5,333,236 A 7/1994 Bahl et al.
5,333,266 A 7/1994 Boaz et al.
5,333,275 A 7/1994 Wheatley et al.
5,335,011 A 8/1994 Addeo et al.
5,335,276 A 8/1994 Thompson et al.
5,341,293 A 8/1994 Vertelney et al.
5,341,466 A 8/1994 Perlin et al.
5,345,536 A 9/1994 Hoshimi et al.
5,349,645 A 9/1994 Zhao
5,353,374 A 10/1994 Wilson et al.
5,353,376 A 10/1994 Oh et al.
5,353,377 A 10/1994 Kuroda et al.
5,353,408 A 10/1994 Kato et al.
5,353,432 A 10/1994 Richek et al.
5,357,431 A 10/1994 Nakada et al.
5,367,640 A 11/1994 Hamilton et al.
5,369,575 A 11/1994 Lamberti et al.
5,369,577 A 11/1994 Kadashevich et al.
5,371,853 A 12/1994 Kao et al.
5,371,901 A 12/1994 Reed et al.
5,373,566 A 12/1994 Murdock
5,377,103 A 12/1994 Lamberti et al.
5,377,301 A 12/1994 Rosenberg et al.
5,377,303 A 12/1994 Firman
5,384,671 A 1/1995 Fisher
5,384,892 A 1/1995 Strong
5,384,893 A 1/1995 Hutchins
5,386,494 A 1/1995 White
5,386,556 A 1/1995 Hedin et al.
5,390,236 A 2/1995 Klausner et al.
5,390,279 A 2/1995 Strong
5,390,281 A 2/1995 Luciw et al.
5,392,419 A 2/1995 Walton
5,396,625 A 3/1995 Parkes
5,400,434 A 3/1995 Pearson
5,404,295 A 4/1995 Katz et al.
5,406,305 A 4/1995 Shimomura et al.
5,408,060 A 4/1995 Muurinen
5,412,756 A 5/1995 Bauman et al.
5,412,804 A 5/1995 Krishna
5,412,806 A 5/1995 Du et al.
5,418,951 A 5/1995 Damashek
5,422,656 A 6/1995 Allard et al.
5,424,947 A 6/1995 Nagao et al.
5,425,108 A 6/1995 Hwang et al.
5,428,731 A 6/1995 Powers, III
5,434,777 A 7/1995 Luciw
5,440,615 A 8/1995 Caccuro et al.
5,442,598 A 8/1995 Haikawa et al.

(56) References Cited

U.S. PATENT DOCUMENTS

| | | | |
|---|---|---|---|
| 5,442,780 | A | 8/1995 | Takanashi et al. |
| 5,444,823 | A | 8/1995 | Nguyen |
| 5,449,368 | A | 9/1995 | Kuzmak |
| 5,450,523 | A | 9/1995 | Zhao |
| 5,455,888 | A | 10/1995 | Iyengar et al. |
| 5,457,768 | A | 10/1995 | Tsuboi et al. |
| 5,459,488 | A | 10/1995 | Geiser |
| 5,463,696 | A | 10/1995 | Beernink et al. |
| 5,463,725 | A | 10/1995 | Henckel et al. |
| 5,465,401 | A | 11/1995 | Thompson |
| 5,469,529 | A | 11/1995 | Bimbot et al. |
| 5,471,611 | A | 11/1995 | McGregor |
| 4,555,775 | B1 | 12/1995 | Pike |
| 5,473,728 | A | 12/1995 | Luginbuhl et al. |
| 5,475,587 | A | 12/1995 | Anick et al. |
| 5,475,796 | A | 12/1995 | Iwata |
| 5,477,447 | A | 12/1995 | Luciw et al. |
| 5,477,448 | A | 12/1995 | Golding et al. |
| 5,477,451 | A | 12/1995 | Brown et al. |
| 5,479,488 | A | 12/1995 | Lennig et al. |
| 5,481,739 | A | 1/1996 | Staats |
| 5,483,261 | A | 1/1996 | Yasutake |
| 5,485,372 | A | 1/1996 | Golding et al. |
| 5,485,543 | A | 1/1996 | Aso |
| 5,488,204 | A | 1/1996 | Mead et al. |
| 5,488,727 | A | 1/1996 | Agrawal et al. |
| 5,490,234 | A | 2/1996 | Narayan |
| 5,491,758 | A | 2/1996 | Bellegarda et al. |
| 5,491,772 | A | 2/1996 | Hardwick et al. |
| 5,493,677 | A | 2/1996 | Balogh et al. |
| 5,495,604 | A | 2/1996 | Harding et al. |
| 5,497,319 | A | 3/1996 | Chong et al. |
| 5,500,903 | A | 3/1996 | Gulli |
| 5,500,905 | A | 3/1996 | Martin et al. |
| 5,500,937 | A | 3/1996 | Thompson-Rohrlich |
| 5,502,774 | A | 3/1996 | Bellegarda et al. |
| 5,502,790 | A | 3/1996 | Yi |
| 5,502,791 | A | 3/1996 | Nishimura et al. |
| 5,515,475 | A | 5/1996 | Gupta et al. |
| 5,521,816 | A | 5/1996 | Roche et al. |
| 5,524,140 | A | 6/1996 | Klausner et al. |
| 5,533,182 | A | 7/1996 | Bates et al. |
| 5,535,121 | A | 7/1996 | Roche et al. |
| 5,536,902 | A | 7/1996 | Serra et al. |
| 5,537,317 | A | 7/1996 | Schabes et al. |
| 5,537,618 | A | 7/1996 | Boulton et al. |
| 5,537,647 | A | 7/1996 | Hermansky et al. |
| 5,543,588 | A | 8/1996 | Bisset et al. |
| 5,543,897 | A | 8/1996 | Altrieth, III |
| 5,544,264 | A | 8/1996 | Bellegarda et al. |
| 5,548,507 | A | 8/1996 | Martino et al. |
| 5,555,343 | A | 9/1996 | Luther |
| 5,555,344 | A | 9/1996 | Zunkler |
| 5,559,301 | A | 9/1996 | Bryan, Jr. et al. |
| 5,559,945 | A | 9/1996 | Beaudet et al. |
| 5,564,446 | A | 10/1996 | Wiltshire |
| 5,565,888 | A | 10/1996 | Selker |
| 5,568,536 | A | 10/1996 | Tiller et al. |
| 5,568,540 | A | 10/1996 | Greco et al. |
| 5,570,324 | A | 10/1996 | Geil |
| 5,572,576 | A | 11/1996 | Klausner et al. |
| 5,574,823 | A | 11/1996 | Hassanein et al. |
| 5,574,824 | A | 11/1996 | Slyh et al. |
| 5,577,135 | A | 11/1996 | Grajski et al. |
| 5,577,164 | A | 11/1996 | Kaneko et al. |
| 5,577,241 | A | 11/1996 | Spencer |
| 5,578,808 | A | 11/1996 | Taylor |
| 5,579,037 | A | 11/1996 | Tahara et al. |
| 5,579,436 | A | 11/1996 | Chou et al. |
| 5,581,484 | A | 12/1996 | Prince |
| 5,581,652 | A | 12/1996 | Abe et al. |
| 5,581,655 | A | 12/1996 | Cohen et al. |
| 5,583,993 | A | 12/1996 | Foster et al. |
| 5,584,024 | A | 12/1996 | Shwartz |
| 5,594,641 | A | 1/1997 | Kaplan et al. |

| | | | |
|---|---|---|---|
| 5,596,260 | A | 1/1997 | Moravec et al. |
| 5,596,676 | A | 1/1997 | Swaminathan et al. |
| 5,596,994 | A | 1/1997 | Bro |
| 5,608,624 | A | 3/1997 | Luciw |
| 5,608,698 | A | 3/1997 | Yamanoi et al. |
| 5,608,841 | A | 3/1997 | Tsuboka |
| 5,610,812 | A | 3/1997 | Schabes et al. |
| 5,613,036 | A | 3/1997 | Strong |
| 5,613,122 | A | 3/1997 | Burnard et al. |
| 5,615,378 | A | 3/1997 | Nishino et al. |
| 5,615,384 | A | 3/1997 | Allard et al. |
| 5,616,876 | A | 4/1997 | Cluts |
| 5,617,386 | A | 4/1997 | Choi |
| 5,617,507 | A | 4/1997 | Lee et al. |
| 5,617,539 | A | 4/1997 | Ludwig et al. |
| 5,619,583 | A | 4/1997 | Page et al. |
| 5,619,694 | A | 4/1997 | Shimazu |
| 5,621,859 | A | 4/1997 | Schwartz et al. |
| 5,621,903 | A | 4/1997 | Luciw et al. |
| 5,627,939 | A | 5/1997 | Huang et al. |
| 5,634,084 | A | 5/1997 | Malsheen et al. |
| 5,636,325 | A | 6/1997 | Farrett |
| 5,638,425 | A | 6/1997 | Meador, III et al. |
| 5,638,489 | A | 6/1997 | Tsuboka |
| 5,638,523 | A | 6/1997 | Mullet et al. |
| 5,640,487 | A | 6/1997 | Lau et al. |
| 5,642,464 | A | 6/1997 | Yue et al. |
| 5,642,466 | A | 6/1997 | Narayan |
| 5,642,519 | A | 6/1997 | Martin |
| 5,644,656 | A | 7/1997 | Akra et al. |
| 5,644,727 | A | 7/1997 | Atkins |
| 5,644,735 | A | 7/1997 | Luciw et al. |
| 5,649,060 | A | 7/1997 | Ellozy et al. |
| 5,652,828 | A | 7/1997 | Silverman |
| 5,652,884 | A | 7/1997 | Palevich |
| 5,652,897 | A | 7/1997 | Linebarger et al. |
| 5,661,787 | A | 8/1997 | Pocock |
| 5,664,055 | A | 9/1997 | Kroon |
| 5,670,985 | A | 9/1997 | Cappels, Sr. et al. |
| 5,675,819 | A | 10/1997 | Schuetze |
| 5,682,475 | A | 10/1997 | Johnson et al. |
| 5,682,539 | A | 10/1997 | Conrad et al. |
| 5,684,513 | A | 11/1997 | Decker |
| 5,687,077 | A | 11/1997 | Gough, Jr. |
| 5,689,287 | A | 11/1997 | Mackinlay et al. |
| 5,689,616 | A | 11/1997 | Li |
| 5,689,618 | A | 11/1997 | Gasper et al. |
| 5,692,205 | A | 11/1997 | Berry et al. |
| 5,696,962 | A | 12/1997 | Kupiec |
| 5,699,082 | A | 12/1997 | Marks et al. |
| 5,701,400 | A | 12/1997 | Amado |
| 5,706,442 | A | 1/1998 | Anderson et al. |
| 5,708,659 | A | 1/1998 | Rostoker et al. |
| 5,708,822 | A | 1/1998 | Wical |
| 5,710,886 | A | 1/1998 | Christensen et al. |
| 5,710,922 | A | 1/1998 | Alley et al. |
| 5,712,949 | A | 1/1998 | Kato et al. |
| 5,712,957 | A | 1/1998 | Waibel et al. |
| 5,715,468 | A | 2/1998 | Budzinski |
| 5,717,877 | A | 2/1998 | Orton et al. |
| 5,721,827 | A | 2/1998 | Logan et al. |
| 5,721,949 | A | 2/1998 | Smith et al. |
| 5,724,406 | A | 3/1998 | Juster |
| 5,724,985 | A | 3/1998 | Snell et al. |
| 5,726,672 | A | 3/1998 | Hernandez et al. |
| 5,727,950 | A | 3/1998 | Cook et al. |
| 5,729,694 | A | 3/1998 | Holzrichter et al. |
| 5,729,704 | A | 3/1998 | Stone et al. |
| 5,732,216 | A | 3/1998 | Logan et al. |
| 5,732,390 | A | 3/1998 | Katayanagi et al. |
| 5,732,395 | A | 3/1998 | Silverman |
| 5,734,750 | A | 3/1998 | Arai et al. |
| 5,734,791 | A | 3/1998 | Acero et al. |
| 5,736,974 | A | 4/1998 | Selker |
| 5,737,487 | A | 4/1998 | Bellegarda et al. |
| 5,737,609 | A | 4/1998 | Reed et al. |
| 5,737,734 | A | 4/1998 | Schultz |
| 5,739,451 | A | 4/1998 | Winksy et al. |
| 5,740,143 | A | 4/1998 | Suetomi |

(56) References Cited

U.S. PATENT DOCUMENTS 5,742,705 A 4/1998 Parthasarathy
5,742,736 A 4/1998 Haddock
5,745,116 A 4/1998 Pisutha-Arnond
5,745,873 A 4/1998 Braida et al.
5,748,512 A 5/1998 Vargas
5,748,974 A 5/1998 Johnson
5,749,071 A 5/1998 Silverman
5,749,081 A 5/1998 Whiteis
5,751,906 A 5/1998 Silverman
5,757,358 A 5/1998 Osga
5,757,979 A 5/1998 Hongo et al.
5,758,079 A 5/1998 Ludwig et al.
5,758,083 A 5/1998 Singh et al.
5,758,314 A 5/1998 McKenna
5,759,101 A 6/1998 Von Kohorn
5,761,640 A 6/1998 Kalyanswamy et al.
5,765,131 A 6/1998 Stentiford et al.
5,765,168 A 6/1998 Burrows
5,771,276 A 6/1998 Wolf
5,774,834 A 6/1998 Visser
5,774,855 A 6/1998 Foti et al.
5,774,859 A 6/1998 Houser et al.
5,777,614 A 7/1998 Ando et al.
5,778,405 A 7/1998 Ogawa
5,790,978 A 8/1998 Olive et al.
5,794,050 A 8/1998 Dahlgren et al.
5,794,182 A 8/1998 Manduchi et al.
5,794,207 A 8/1998 Walker et al.
5,794,237 A 8/1998 Gore, Jr.
5,797,008 A 8/1998 Burrows
5,799,268 A 8/1998 Boguraev
5,799,269 A 8/1998 Schabes et al.
5,799,276 A 8/1998 Komissarchik et al.
5,801,692 A 9/1998 Muzio et al.
5,802,466 A 9/1998 Gallant et al.
5,802,526 A 9/1998 Fawcett et al.
5,812,697 A 9/1998 Sakai et al.
5,812,698 A 9/1998 Platt et al.
5,815,142 A 9/1998 Allard et al.
5,815,225 A 9/1998 Nelson
5,818,142 A 10/1998 Edleblute et al.
5,818,451 A 10/1998 Bertram et al.
5,818,924 A 10/1998 King et al.
5,822,288 A 10/1998 Shinada
5,822,720 A 10/1998 Bookman et al.
5,822,730 A 10/1998 Roth et al.
5,822,743 A 10/1998 Gupta et al.
5,825,349 A 10/1998 Meier et al.
5,825,352 A 10/1998 Bisset et al.
5,825,881 A 10/1998 Colvin, Sr.
5,826,261 A 10/1998 Spencer
5,828,768 A 10/1998 Eatwell et al.
5,828,999 A 10/1998 Bellegarda et al.
5,832,433 A 11/1998 Yashchin et al.
5,832,435 A 11/1998 Silverman
5,833,134 A 11/1998 Ho et al.
5,835,077 A 11/1998 Dao et al.
5,835,079 A 11/1998 Shieh
5,835,721 A 11/1998 Donahue et al.
5,835,732 A 11/1998 Kikinis et al.
5,835,893 A 11/1998 Ushioda
5,839,106 A 11/1998 Bellegarda
5,841,902 A 11/1998 Tu
5,842,165 A 11/1998 Raman et al.
5,845,255 A 12/1998 Mayaud
5,848,410 A 12/1998 Walls et al.
5,850,480 A 12/1998 Scanlon
5,850,629 A 12/1998 Holm et al.
5,854,893 A 12/1998 Ludwig et al.
5,855,000 A 12/1998 Waibel et al.
5,857,184 A 1/1999 Lynch
5,859,636 A 1/1999 Pandit
5,860,063 A 1/1999 Gorin et al.
5,860,064 A 1/1999 Henton
5,860,075 A 1/1999 Hashizume et al.
5,862,223 A 1/1999 Walker et al.
5,862,233 A 1/1999 Poletti
5,864,806 A 1/1999 Mokbel et al.
5,864,815 A 1/1999 Rozak et al.
5,864,844 A 1/1999 James et al.
5,864,855 A 1/1999 Ruocco et al.
5,867,799 A 2/1999 Lang et al.
5,870,710 A 2/1999 Ozawa et al.
5,873,056 A 2/1999 Liddy et al.
5,875,427 A 2/1999 Yamazaki
5,875,429 A 2/1999 Douglas
5,875,437 A 2/1999 Atkins
5,876,396 A 3/1999 Lo et al.
5,877,751 A 3/1999 Kanemitsu et al.
5,877,757 A 3/1999 Baldwin et al.
5,878,393 A 3/1999 Hata et al.
5,878,394 A 3/1999 Muhling
5,878,396 A 3/1999 Henton
5,880,411 A 3/1999 Gillespie et al.
5,880,731 A 3/1999 Liles et al.
5,884,039 A 3/1999 Ludwig et al.
5,884,323 A 3/1999 Hawkins et al.
5,890,117 A 3/1999 Silverman
5,890,122 A 3/1999 Van et al.
5,891,180 A 4/1999 Greeninger et al.
5,893,126 A 4/1999 Drews et al.
5,893,132 A 4/1999 Huffman et al.
5,895,448 A 4/1999 Vysotsky et al.
5,895,464 A 4/1999 Bhandari et al.
5,895,466 A 4/1999 Goldberg et al.
5,896,321 A 4/1999 Miller et al.
5,896,500 A 4/1999 Ludwig et al.
5,899,972 A 5/1999 Miyazawa et al.
5,905,498 A 5/1999 Diament et al.
5,909,666 A 6/1999 Gould et al.
5,912,951 A 6/1999 Checchio et al.
5,912,952 A 6/1999 Brendzel
5,913,193 A 6/1999 Huang et al.
5,915,001 A 6/1999 Uppaluru et al.
5,915,236 A 6/1999 Gould et al.
5,915,238 A 6/1999 Tjaden
5,915,249 A 6/1999 Spencer
5,917,487 A 6/1999 Ulrich
5,918,303 A 6/1999 Yamaura et al.
5,920,327 A 7/1999 Seidensticker, Jr.
5,920,836 A 7/1999 Gould et al.
5,920,837 A 7/1999 Gould et al.
5,923,757 A 7/1999 Hocker et al.
5,924,068 A 7/1999 Richard et al.
5,926,769 A 7/1999 Valimaa et al.
5,926,789 A 7/1999 Barbara et al.
5,930,408 A 7/1999 Seto
5,930,751 A 7/1999 Cohrs et al.
5,930,754 A 7/1999 Karaali et al.
5,930,769 A 7/1999 Rose
5,930,783 A 7/1999 Li et al.
5,933,477 A 8/1999 Wu
5,933,806 A 8/1999 Beyerlein et al.
5,933,822 A 8/1999 Braden-Harder et al.
5,936,926 A 8/1999 Yokouchi et al.
5,937,163 A 8/1999 Lee et al.
5,940,811 A 8/1999 Norris
5,940,841 A 8/1999 Schmuck et al.
5,941,944 A 8/1999 Messerly
5,943,043 A 8/1999 Furuhata et al.
5,943,049 A 8/1999 Matsubara et al.
5,943,052 A 8/1999 Allen et al.
5,943,429 A 8/1999 Haendel et al.
5,943,443 A 8/1999 Itonori et al.
5,943,670 A 8/1999 Prager
5,946,647 A 8/1999 Miller et al.
5,948,040 A 9/1999 DeLorme et al.
5,949,961 A 9/1999 Sharman
5,950,123 A 9/1999 Schwelb et al.
5,952,992 A 9/1999 Helms
5,953,541 A 9/1999 King et al.
5,956,021 A 9/1999 Kubota et al.
5,956,699 A 9/1999 Wong et al.
5,960,394 A 9/1999 Gould et al.

(56) References Cited

U.S. PATENT DOCUMENTS

| | | | |
|---|---|---|---|
| 5,960,422 | A | 9/1999 | Prasad |
| 5,963,208 | A | 10/1999 | Dolan et al. |
| 5,963,924 | A | 10/1999 | Williams et al. |
| 5,963,964 | A | 10/1999 | Nielsen |
| 5,966,126 | A | 10/1999 | Szabo |
| 5,970,446 | A | 10/1999 | Goldberg et al. |
| 5,970,474 | A | 10/1999 | LeRoy et al. |
| 5,973,612 | A | 10/1999 | Deo et al. |
| 5,973,676 | A | 10/1999 | Kawakura |
| 5,974,146 | A | 10/1999 | Randle et al. |
| 5,977,950 | A | 11/1999 | Rhyne |
| 5,982,352 | A | 11/1999 | Pryor |
| 5,982,891 | A | 11/1999 | Ginter et al. |
| 5,982,902 | A | 11/1999 | Terano |
| 5,983,179 | A | 11/1999 | Gould et al. |
| 5,983,216 | A | 11/1999 | Kirsch et al. |
| 5,987,132 | A | 11/1999 | Rowney |
| 5,987,140 | A | 11/1999 | Rowney et al. |
| 5,987,401 | A | 11/1999 | Trudeau |
| 5,987,404 | A | 11/1999 | Della Pietra et al. |
| 5,987,440 | A | 11/1999 | O'Neil et al. |
| 5,990,887 | A | 11/1999 | Redpath et al. |
| 5,991,441 | A | 11/1999 | Jourjine |
| 5,995,460 | A | 11/1999 | Takagi et al. |
| 5,995,590 | A | 11/1999 | Brunet et al. |
| 5,998,972 | A | 12/1999 | Gong |
| 5,999,169 | A | 12/1999 | Lee |
| 5,999,895 | A | 12/1999 | Forest |
| 5,999,908 | A | 12/1999 | Abelow |
| 5,999,927 | A | 12/1999 | Tukey et al. |
| 6,006,274 | A | 12/1999 | Hawkins et al. |
| 6,009,237 | A | 12/1999 | Hirabayashi et al. |
| 6,011,585 | A | 1/2000 | Anderson |
| 6,014,428 | A | 1/2000 | Wolf |
| 6,016,471 | A | 1/2000 | Kuhn et al. |
| 6,018,705 | A | 1/2000 | Gaudet |
| 6,018,711 | A | 1/2000 | French-St. George et al. |
| 6,020,881 | A | 2/2000 | Naughton et al. |
| 6,023,536 | A | 2/2000 | Visser |
| 6,023,676 | A | 2/2000 | Erell |
| 6,023,684 | A | 2/2000 | Pearson |
| 6,024,288 | A | 2/2000 | Gottlich et al. |
| 6,026,345 | A | 2/2000 | Shah et al. |
| 6,026,375 | A | 2/2000 | Hall et al. |
| 6,026,388 | A | 2/2000 | Liddy et al. |
| 6,026,393 | A | 2/2000 | Gupta et al. |
| 6,029,132 | A | 2/2000 | Kuhn et al. |
| 6,029,135 | A | 2/2000 | Krasle |
| 6,035,267 | A | 3/2000 | Watanabe et al. |
| 6,035,303 | A | 3/2000 | Baer et al. |
| 6,035,336 | A | 3/2000 | Lu et al. |
| 6,038,533 | A | 3/2000 | Buchsbaum et al. |
| 6,040,824 | A | 3/2000 | Maekawa et al. |
| 6,041,023 | A | 3/2000 | Lakhansingh |
| 6,047,255 | A | 4/2000 | Williamson |
| 6,047,300 | A | 4/2000 | Walfish et al. |
| 6,052,654 | A | 4/2000 | Gaudet et al. |
| 6,052,656 | A | 4/2000 | Suda et al. |
| 6,054,990 | A | 4/2000 | Tran |
| 6,055,514 | A | 4/2000 | Wren |
| 6,055,531 | A | 4/2000 | Bennett et al. |
| 6,064,767 | A | 5/2000 | Muir et al. |
| 6,064,959 | A | 5/2000 | Young et al. |
| 6,064,960 | A | 5/2000 | Bellegarda et al. |
| 6,064,963 | A | 5/2000 | Gainsboro |
| 6,067,519 | A | 5/2000 | Lowry |
| 6,069,648 | A | 5/2000 | Suso et al. |
| 6,070,138 | A | 5/2000 | Iwata |
| 6,070,139 | A | 5/2000 | Miyazawa et al. |
| 6,070,140 | A | 5/2000 | Tran |
| 6,070,147 | A | 5/2000 | Harms et al. |
| 6,073,033 | A | 6/2000 | Campo |
| 6,073,036 | A | 6/2000 | Heikkinen et al. |
| 6,073,097 | A | 6/2000 | Gould et al. |
| 6,076,051 | A | 6/2000 | Messerly et al. |
| 6,076,060 | A | 6/2000 | Lin et al. |
| 6,076,088 | A | 6/2000 | Paik et al. |
| 6,078,914 | A | 6/2000 | Redfern |
| 6,081,750 | A | 6/2000 | Hoffberg et al. |
| 6,081,774 | A | 6/2000 | de Hita et al. |
| 6,081,780 | A | 6/2000 | Lumelsky |
| 6,085,204 | A | 7/2000 | Chijiwa et al. |
| 6,088,671 | A | 7/2000 | Gould et al. |
| 6,088,731 | A | 7/2000 | Kiraly et al. |
| 6,092,043 | A | 7/2000 | Squires et al. |
| 6,094,649 | A | 7/2000 | Bowen et al. |
| 6,097,391 | A | 8/2000 | Wilcox |
| 6,101,468 | A | 8/2000 | Gould et al. |
| 6,101,470 | A | 8/2000 | Eide et al. |
| 6,105,865 | A | 8/2000 | Hardesty |
| 6,108,627 | A | 8/2000 | Sabourin |
| 6,108,640 | A | 8/2000 | Slotznick |
| 6,111,562 | A | 8/2000 | Downs et al. |
| 6,111,572 | A | 8/2000 | Blair et al. |
| 6,115,686 | A | 9/2000 | Chung et al. |
| 6,116,907 | A | 9/2000 | Baker et al. |
| 6,119,101 | A | 9/2000 | Peckover |
| 6,121,960 | A | 9/2000 | Carroll et al. |
| 6,122,340 | A | 9/2000 | Darley et al. |
| 6,122,614 | A | 9/2000 | Kahn et al. |
| 6,122,616 | A | 9/2000 | Henton |
| 6,122,647 | A | 9/2000 | Horowitz et al. |
| 6,125,284 | A | 9/2000 | Moore et al. |
| 6,125,346 | A | 9/2000 | Nishimura et al. |
| 6,125,356 | A | 9/2000 | Brockman et al. |
| 6,129,582 | A | 10/2000 | Wilhite et al. |
| 6,138,098 | A | 10/2000 | Shieber et al. |
| 6,138,158 | A | 10/2000 | Boyle et al. |
| 6,141,642 | A | 10/2000 | Oh |
| 6,141,644 | A | 10/2000 | Kuhn et al. |
| 6,144,377 | A | 11/2000 | Oppermann et al. |
| 6,144,380 | A | 11/2000 | Shwarts et al. |
| 6,144,938 | A | 11/2000 | Surace et al. |
| 6,144,939 | A | 11/2000 | Pearson et al. |
| 6,151,401 | A | 11/2000 | Annaratone |
| 6,154,551 | A | 11/2000 | Frenkel |
| 6,154,720 | A | 11/2000 | Onishi et al. |
| 6,157,935 | A | 12/2000 | Tran et al. |
| 6,161,084 | A | 12/2000 | Messerly et al. |
| 6,161,087 | A | 12/2000 | Wightman et al. |
| 6,161,944 | A | 12/2000 | Leman |
| 6,163,769 | A | 12/2000 | Acero et al. |
| 6,163,809 | A | 12/2000 | Buckley |
| 6,167,369 | A | 12/2000 | Schulze |
| 6,169,538 | B1 | 1/2001 | Nowlan et al. |
| 6,172,948 | B1 | 1/2001 | Keller et al. |
| 6,173,194 | B1 | 1/2001 | Vanttila |
| 6,173,251 | B1 | 1/2001 | Ito et al. |
| 6,173,261 | B1 | 1/2001 | Arai et al. |
| 6,173,263 | B1 | 1/2001 | Conkie |
| 6,173,279 | B1 | 1/2001 | Levin et al. |
| 6,177,905 | B1 | 1/2001 | Welch |
| 6,177,931 | B1 | 1/2001 | Alexander et al. |
| 6,179,432 | B1 | 1/2001 | Zhang et al. |
| 6,182,028 | B1 | 1/2001 | Karaali et al. |
| 6,185,533 | B1 | 2/2001 | Holm et al. |
| 6,188,391 | B1 | 2/2001 | Seely et al. |
| 6,188,967 | B1 | 2/2001 | Kurtzberg et al. |
| 6,188,999 | B1 | 2/2001 | Moody |
| 6,191,939 | B1 | 2/2001 | Burnett |
| 6,192,253 | B1 | 2/2001 | Charlier et al. |
| 6,192,340 | B1 | 2/2001 | Abecassis |
| 6,195,641 | B1 | 2/2001 | Loring et al. |
| 6,205,456 | B1 | 3/2001 | Nakao |
| 6,208,044 | B1 | 3/2001 | Viswanadham et al. |
| 6,208,932 | B1 | 3/2001 | Ohmura et al. |
| 6,208,956 | B1 | 3/2001 | Motoyama |
| 6,208,964 | B1 | 3/2001 | Sabourin |
| 6,208,967 | B1 | 3/2001 | Pauws et al. |
| 6,208,971 | B1 | 3/2001 | Bellegarda et al. |
| 6,212,564 | B1 | 4/2001 | Harter et al. |
| 6,216,102 | B1 | 4/2001 | Martino et al. |
| 6,216,131 | B1 | 4/2001 | Liu et al. |
| 6,217,183 | B1 | 4/2001 | Shipman |

(56) References Cited

U.S. PATENT DOCUMENTS 6,222,347 B1 4/2001 Gong
6,226,403 B1 5/2001 Parthasarathy
6,226,533 B1 5/2001 Akahane
6,226,614 B1 5/2001 Mizuno et al.
6,226,655 B1 5/2001 Borman et al.
6,230,322 B1 5/2001 Saib et al.
6,232,539 B1 5/2001 Looney et al.
6,232,966 B1 5/2001 Kurlander
6,233,545 B1 5/2001 Datig
6,233,547 B1 5/2001 Denber et al.
6,233,559 B1 5/2001 Balakrishnan
6,233,578 B1 5/2001 Machihara et al.
6,237,025 B1 5/2001 Ludwig et al.
6,240,303 B1 5/2001 Katzur
6,243,681 B1 6/2001 Guji et al.
6,246,981 B1 6/2001 Papineni et al.
6,249,606 B1 6/2001 Kiraly et al.
6,259,436 B1 7/2001 Moon et al.
6,259,826 B1 7/2001 Pollard et al.
6,260,011 B1 7/2001 Heckerman et al.
6,260,013 B1 7/2001 Sejnoha
6,260,016 B1 7/2001 Holm et al.
6,260,024 B1 7/2001 Shkedy
6,266,637 B1 7/2001 Donovan et al.
6,268,859 B1 7/2001 Andresen et al.
6,269,712 B1 8/2001 Zentmyer
6,271,835 B1 8/2001 Hoeksma
6,272,456 B1 8/2001 De Campos
6,272,464 B1 8/2001 Kiraz et al.
6,275,795 B1 8/2001 Tzirkel-Hancock
6,275,824 B1 8/2001 O'Flaherty et al.
6,278,443 B1 8/2001 Amro et al.
6,278,970 B1 8/2001 Milner
6,282,507 B1 8/2001 Horiguchi et al.
6,285,785 B1 9/2001 Bellegarda et al.
6,285,786 B1 9/2001 Seni et al.
6,289,085 B1 9/2001 Miyashita et al.
6,289,124 B1 9/2001 Okamoto
6,289,301 B1 9/2001 Higginbotham et al.
6,289,353 B1 9/2001 Hazlehurst et al.
6,292,772 B1 9/2001 Kantrowitz
6,292,778 B1 9/2001 Sukkar
6,295,390 B1 9/2001 Kobayashi et al.
6,295,541 B1 9/2001 Bodnar et al.
6,297,818 B1 10/2001 Ulrich et al.
6,298,314 B1 10/2001 Blackadar et al.
6,298,321 B1 10/2001 Karlov et al.
6,300,947 B1 10/2001 Kanevsky
6,304,844 B1 10/2001 Pan et al.
6,304,846 B1 10/2001 George et al.
6,307,548 B1 10/2001 Flinchem et al.
6,308,149 B1 10/2001 Gaussier et al.
6,310,610 B1 10/2001 Beaton et al.
6,311,157 B1 10/2001 Strong
6,311,189 B1 10/2001 deVries et al.
6,317,237 B1 11/2001 Nakao et al.
6,317,594 B1 11/2001 Gossman et al.
6,317,707 B1 11/2001 Bangalore et al.
6,317,831 B1 11/2001 King
6,321,092 B1 11/2001 Fitch et al.
6,321,179 B1 11/2001 Glance et al.
6,323,846 B1 11/2001 Westerman et al.
6,324,502 B1 11/2001 Handel et al.
6,324,512 B1 11/2001 Junqua et al.
6,330,538 B1 12/2001 Breen
6,331,867 B1 12/2001 Eberhard et al.
6,332,175 B1 12/2001 Birrell et al.
6,334,103 B1 12/2001 Surace et al.
6,335,722 B1 1/2002 Tani et al.
6,336,365 B1 1/2002 Blackadar et al.
6,336,727 B1 1/2002 Kim
6,340,937 B1 1/2002 Stepita-Klauco
6,341,316 B1 1/2002 Kloba et al.
6,343,267 B1 1/2002 Kuhn et al.
6,345,250 B1 2/2002 Martin
6,347,315 B1 2/2002 Kiyoki et al.
6,351,522 B1 2/2002 Vitikainen
6,351,762 B1 2/2002 Ludwig et al.
6,353,442 B1 3/2002 Masui
6,353,794 B1 3/2002 Davis et al.
6,356,287 B1 3/2002 Ruberry et al.
6,356,854 B1 3/2002 Schubert et al.
6,356,864 B1 3/2002 Foltz et al.
6,356,905 B1 3/2002 Gershman et al.
6,357,147 B1 3/2002 Darley et al.
6,359,572 B1 3/2002 Vale
6,359,970 B1 3/2002 Burgess
6,360,227 B1 3/2002 Aggarwal et al.
6,360,237 B1 3/2002 Schulz et al.
6,363,348 B1 3/2002 Besling et al.
6,366,883 B1 4/2002 Campbell et al.
6,366,884 B1 4/2002 Bellegarda et al.
6,374,217 B1 4/2002 Bellegarda
6,377,530 B1 4/2002 Burrows
6,377,925 B1 4/2002 Greene, Jr. et al.
6,377,928 B1 4/2002 Saxena et al.
6,381,593 B1 4/2002 Yano et al.
6,385,586 B1 5/2002 Dietz
6,385,662 B1 5/2002 Moon et al.
6,389,114 B1 5/2002 Dowens et al.
6,397,183 B1 5/2002 Baba et al.
6,397,186 B1 5/2002 Bush et al.
6,400,806 B1 6/2002 Uppaluru
6,401,065 B1 6/2002 Kanevsky et al.
6,405,169 B1 6/2002 Kondo et al.
6,405,238 B1 6/2002 Votipka
6,408,272 B1 6/2002 White et al.
6,411,924 B1 6/2002 De Hita et al.
6,411,932 B1 6/2002 Molnar et al.
6,415,250 B1 7/2002 Van Den Akker
6,417,873 B1 7/2002 Fletcher et al.
6,421,305 B1 7/2002 Gioscia et al.
6,421,672 B1 7/2002 McAllister et al.
6,421,707 B1 7/2002 Miller et al.
6,424,944 B1 7/2002 Hikawa
6,430,551 B1 8/2002 Thelen et al.
6,434,522 B1 8/2002 Tsuboka
6,434,524 B1 8/2002 Weber
6,434,604 B1 8/2002 Harada et al.
6,437,818 B1 8/2002 Ludwig et al.
6,438,523 B1 8/2002 Oberteuffer et al.
6,442,518 B1 8/2002 Van Thong et al.
6,442,523 B1 8/2002 Siegel
6,446,076 B1 9/2002 Burkey et al.
6,448,485 B1 9/2002 Barile
6,448,986 B1 9/2002 Smith
6,449,620 B1 9/2002 Draper et al.
6,453,281 B1 9/2002 Walters et al.
6,453,292 B2 9/2002 Ramaswamy et al.
6,453,315 B1 9/2002 Weissman et al.
6,456,616 B1 9/2002 Rantanen
6,456,972 B1 9/2002 Gladstein et al.
6,460,015 B1 10/2002 Hetherington et al.
6,460,029 B1 10/2002 Fries et al.
6,462,778 B1 10/2002 Abram et al.
6,463,128 B1 10/2002 Elwin
6,466,654 B1 10/2002 Cooper et al.
6,467,924 B2 10/2002 Shipman
6,469,712 B1 10/2002 Hilpert, Jr. et al.
6,469,722 B1 10/2002 Kinoe et al.
6,469,732 B1 10/2002 Chang et al.
6,470,347 B1 10/2002 Gillam
6,473,630 B1 10/2002 Baranowski et al.
6,477,488 B1 11/2002 Bellegarda
6,477,494 B2 11/2002 Hyde-Thomson et al.
6,487,533 B2 11/2002 Hyde-Thomson et al.
6,487,534 B1 11/2002 Thelen et al.
6,487,663 B1 11/2002 Jaisimha et al.
6,489,951 B1 12/2002 Wong et al.
6,490,560 B1 12/2002 Ramaswamy et al.
6,493,006 B1 12/2002 Gourdol et al.
6,493,428 B1 12/2002 Hillier
6,493,652 B1 12/2002 Ohlenbusch et al.
6,493,667 B1 12/2002 De Souza et al.

(56) References Cited

U.S. PATENT DOCUMENTS 6,499,013 B1 12/2002 Weber
6,499,014 B1 12/2002 Chihara
6,499,016 B1 12/2002 Anderson et al.
6,501,937 B1 12/2002 Ho et al.
6,502,194 B1 12/2002 Berman et al.
6,505,158 B1 1/2003 Conkie
6,505,175 B1 1/2003 Silverman et al.
6,505,183 B1 1/2003 Loofbourrow et al.
6,507,829 B1 1/2003 Richards et al.
6,510,406 B1 1/2003 Marchisio
6,510,417 B1 1/2003 Woods et al.
6,513,008 B2 1/2003 Pearson et al.
6,513,063 B1 1/2003 Julia et al.
6,519,565 B1 2/2003 Clements et al.
6,519,566 B1 2/2003 Boyer et al.
6,523,026 B1 2/2003 Gillis
6,523,061 B1 2/2003 Halverson et al.
6,523,172 B1 2/2003 Martinez-Guerra et al.
6,526,351 B2 2/2003 Whitham
6,526,382 B1 2/2003 Yuschik
6,526,395 B1 2/2003 Morris
6,529,592 B1 3/2003 Khan
6,529,608 B2 3/2003 Gersabeck et al.
6,532,444 B1 3/2003 Weber
6,532,446 B1 3/2003 King
6,535,610 B1 3/2003 Stewart
6,535,852 B2 3/2003 Eide
6,535,983 B1 3/2003 McCormack et al.
6,536,139 B2 3/2003 Darley et al.
6,538,665 B2 3/2003 Crow et al.
6,542,171 B1 4/2003 Satou et al.
6,542,584 B1 4/2003 Sherwood et al.
6,546,262 B1 4/2003 Freadman
6,546,367 B2 4/2003 Otsuka
6,546,388 B1 4/2003 Edlund et al.
6,549,497 B2 4/2003 Miyamoto et al.
6,553,343 B1 4/2003 Kagoshima et al.
6,553,344 B2 4/2003 Bellegarda et al.
6,556,971 B1 4/2003 Rigsby et al.
6,556,983 B1 4/2003 Altschuler et al.
6,560,903 B1 5/2003 Darley
6,563,769 B1 5/2003 Van Der Meulen
6,564,186 B1 5/2003 Kiraly et al.
6,567,549 B1 5/2003 Marianetti et al.
6,570,557 B1 5/2003 Westerman et al.
6,570,596 B2 5/2003 Frederiksen
6,582,342 B2 6/2003 Kaufman
6,583,806 B2 6/2003 Ludwig et al.
6,584,464 B1 6/2003 Warthen
6,587,403 B1 7/2003 Keller et al.
6,587,404 B1 7/2003 Keller et al.
6,590,303 B1 7/2003 Austin et al.
6,591,379 B1 7/2003 LeVine et al.
6,594,673 B1 7/2003 Smith et al.
6,594,688 B2 7/2003 Ludwig et al.
6,597,345 B2 7/2003 Hirshberg
6,598,021 B1 7/2003 Shambaugh et al.
6,598,022 B2 7/2003 Yuschik
6,598,039 B1 7/2003 Livowsky
6,598,054 B2 7/2003 Schuetze et al.
6,601,026 B2 7/2003 Appelt et al.
6,601,234 B1 7/2003 Bowman-Amuah
6,603,837 B1 8/2003 Kesanupalli et al.
6,604,059 B2 8/2003 Strubbe et al.
6,606,101 B1 8/2003 Malamud et al.
6,606,388 B1 8/2003 Townsend et al.
6,606,632 B1 8/2003 Saulpaugh et al.
6,611,789 B1 8/2003 Darley
6,615,172 B1 9/2003 Bennett et al.
6,615,175 B1 9/2003 Gazdzinski
6,615,176 B2 9/2003 Lewis et al.
6,615,220 B1 9/2003 Austin et al.
6,621,768 B1 9/2003 Keller et al.
6,621,892 B1 9/2003 Banister et al.
6,622,121 B1 9/2003 Crepy et al.
6,622,136 B2 9/2003 Russell
6,623,529 B1 9/2003 Lakritz
6,625,583 B1 9/2003 Silverman et al.
6,628,808 B1 9/2003 Bach et al.
6,631,186 B1 10/2003 Adams et al.
6,631,346 B1 10/2003 Karaorman et al.
6,633,741 B1 10/2003 Posa et al.
6,633,846 B1 10/2003 Bennett et al.
6,633,932 B1 10/2003 Bork et al.
6,640,098 B1 10/2003 Roundtree
6,642,940 B1 11/2003 Dakss et al.
6,643,401 B1 11/2003 Kashioka et al.
6,643,824 B1 11/2003 Bates et al.
6,647,260 B2 11/2003 Dusse et al.
6,650,735 B2 11/2003 Burton et al.
6,651,042 B1 11/2003 Field et al.
6,651,218 B1 11/2003 Adler et al.
6,654,740 B2 11/2003 Tokuda et al.
6,658,389 B1 12/2003 Alpdemir
6,658,408 B2 12/2003 Yano et al.
6,658,577 B2 12/2003 Huppi et al.
6,662,023 B1 12/2003 Helle
6,665,639 B2 12/2003 Mozer et al.
6,665,640 B1 12/2003 Bennett et al.
6,665,641 B1 12/2003 Coorman et al.
6,671,672 B1 12/2003 Heck
6,671,683 B2 12/2003 Kanno
6,671,856 B1 12/2003 Gillam
6,675,169 B1 1/2004 Bennett et al.
6,675,233 B1 1/2004 Du et al.
6,677,932 B1 1/2004 Westerman
6,680,675 B1 1/2004 Suzuki
6,684,187 B1 1/2004 Conkie
6,684,376 B1 1/2004 Kerzman et al.
6,690,387 B2 2/2004 Zimmerman et al.
6,690,800 B2 2/2004 Resnick
6,690,828 B2 2/2004 Meyers
6,691,064 B2 2/2004 Vroman
6,691,090 B1 2/2004 Laurila et al.
6,691,111 B2 2/2004 Lazaridis et al.
6,691,151 B1 2/2004 Cheyer et al.
6,694,295 B2 2/2004 Lindholm et al.
6,694,297 B2 2/2004 Sato
6,697,780 B1 2/2004 Beutnagel et al.
6,697,824 B1 2/2004 Bowman-Amuah
6,701,294 B1 3/2004 Ball et al.
6,701,305 B1 3/2004 Holt et al.
6,701,318 B2 3/2004 Fox et al.
6,704,015 B1 3/2004 Bovarnick et al.
6,704,034 B1 3/2004 Rodriguez et al.
6,704,698 B1 3/2004 Paulsen, Jr. et al.
6,704,710 B2 3/2004 Strong
6,708,153 B2 3/2004 Brittan et al.
6,711,585 B1 3/2004 Copperman et al.
6,714,221 B1 3/2004 Christie et al.
6,716,139 B1 4/2004 Hosseinzadeh-Dolkhani et al.
6,718,324 B2 4/2004 Edlund et al.
6,718,331 B2 4/2004 Davis et al.
6,720,980 B1 4/2004 Lui et al.
6,721,728 B2 4/2004 McGreevy
6,721,734 B1 4/2004 Subasic et al.
6,724,370 B2 4/2004 Dutta et al.
6,725,197 B1 4/2004 Wuppermann et al.
6,728,675 B1 4/2004 Maddalozzo, Jr. et al.
6,728,681 B2 4/2004 Whitham
6,728,729 B1 4/2004 Jawa et al.
6,731,312 B2 5/2004 Robbin
6,732,142 B1 5/2004 Bates et al.
6,735,632 B1 5/2004 Kiraly et al.
6,738,738 B2 5/2004 Henton
6,741,264 B1 5/2004 Lesser
6,742,021 B1 5/2004 Halverson et al.
6,751,592 B1 6/2004 Shiga
6,751,595 B2 6/2004 Busayapongchai et al.
6,751,621 B1 6/2004 Calistri-Yeh et al.
6,754,504 B1 6/2004 Reed
6,757,362 B1 6/2004 Cooper et al.
6,757,365 B1 6/2004 Bogard
6,757,646 B2 6/2004 Marchisio

(56) References Cited

U.S. PATENT DOCUMENTS

| | | | |
|---|---|---|---|
| 6,757,653 | B2 | 6/2004 | Buth et al. |
| 6,757,718 | B1 | 6/2004 | Halverson et al. |
| 6,760,412 | B1 | 7/2004 | Loucks |
| 6,760,700 | B2 | 7/2004 | Lewis et al. |
| 6,760,754 | B1 | 7/2004 | Isaacs et al. |
| 6,762,692 | B1 | 7/2004 | Mingot et al. |
| 6,762,741 | B2 | 7/2004 | Weindorf |
| 6,762,777 | B2 | 7/2004 | Carroll |
| 6,763,089 | B2 | 7/2004 | Feigenbaum |
| 6,766,294 | B2 | 7/2004 | MacGinite et al. |
| 6,766,320 | B1 | 7/2004 | Wang et al. |
| 6,766,324 | B2 | 7/2004 | Carlson et al. |
| 6,768,979 | B1 | 7/2004 | Menendez-Pidal et al. |
| 6,772,123 | B2 | 8/2004 | Cooklev et al. |
| 6,772,195 | B1 | 8/2004 | Hatlelid et al. |
| 6,772,394 | B1 | 8/2004 | Kamada |
| 6,775,358 | B1 | 8/2004 | Breitenbach et al. |
| 6,778,951 | B1 | 8/2004 | Contractor |
| 6,778,952 | B2 | 8/2004 | Bellegarda |
| 6,778,962 | B1 | 8/2004 | Kasai et al. |
| 6,778,970 | B2 | 8/2004 | Au |
| 6,778,979 | B2 | 8/2004 | Grefenstette et al. |
| 6,782,510 | B1 | 8/2004 | Gross et al. |
| 6,784,901 | B1 | 8/2004 | Harvey et al. |
| 6,789,094 | B2 | 9/2004 | Rudoff et al. |
| 6,789,231 | B1 | 9/2004 | Reynar et al. |
| 6,790,704 | B2 | 9/2004 | Doyle et al. |
| 6,792,082 | B1 | 9/2004 | Levine |
| 6,792,086 | B1 | 9/2004 | Saylor et al. |
| 6,792,407 | B2 | 9/2004 | Kibre et al. |
| 6,794,566 | B2 | 9/2004 | Pachet |
| 6,795,059 | B2 | 9/2004 | Endo |
| 6,799,226 | B1 | 9/2004 | Robbin et al. |
| 6,801,604 | B2 | 10/2004 | Maes et al. |
| 6,801,964 | B1 | 10/2004 | Mahdavi |
| 6,803,905 | B1 | 10/2004 | Capps et al. |
| 6,804,649 | B2 | 10/2004 | Miranda |
| 6,804,677 | B2 | 10/2004 | Shadmon et al. |
| 6,807,536 | B2 | 10/2004 | Achlioptas et al. |
| 6,807,574 | B1 | 10/2004 | Partovi et al. |
| 6,810,379 | B1 | 10/2004 | Vermeulen et al. |
| 6,813,218 | B1 | 11/2004 | Antonelli et al. |
| 6,813,491 | B1 | 11/2004 | McKinney |
| 6,813,607 | B1 | 11/2004 | Faruquie et al. |
| 6,816,578 | B1 | 11/2004 | Kredo et al. |
| 6,820,055 | B2 | 11/2004 | Saindon et al. |
| 6,829,018 | B2 | 12/2004 | Lin et al. |
| 6,829,603 | B1 | 12/2004 | Chai et al. |
| 6,832,194 | B1 | 12/2004 | Mozer et al. |
| 6,832,381 | B1 | 12/2004 | Mathur et al. |
| 6,836,537 | B1 | 12/2004 | Zirngibl et al. |
| 6,836,651 | B2 | 12/2004 | Segal et al. |
| 6,836,760 | B1 | 12/2004 | Bellegarda et al. |
| 6,839,464 | B2 | 1/2005 | Hawkins et al. |
| 6,839,669 | B1 | 1/2005 | Gould et al. |
| 6,839,670 | B1 | 1/2005 | Stammler et al. |
| 6,839,742 | B1 | 1/2005 | Dyer et al. |
| 6,842,767 | B1 | 1/2005 | Partovi et al. |
| 6,847,966 | B1 | 1/2005 | Sommer et al. |
| 6,847,979 | B2 | 1/2005 | Allemang et al. |
| 6,850,775 | B1 | 2/2005 | Berg |
| 6,850,887 | B2 | 2/2005 | Epstein et al. |
| 6,851,115 | B1 | 2/2005 | Cheyer et al. |
| 6,856,259 | B1 | 2/2005 | Sharp |
| 6,857,800 | B2 | 2/2005 | Zhang et al. |
| 6,859,931 | B1 | 2/2005 | Cheyer et al. |
| 6,862,568 | B2 | 3/2005 | Case |
| 6,862,710 | B1 | 3/2005 | Marchisio |
| 6,865,533 | B2 | 3/2005 | Addison et al. |
| 6,868,045 | B1 | 3/2005 | Schroder |
| 6,868,385 | B1 | 3/2005 | Gerson |
| 6,870,529 | B1 | 3/2005 | Davis |
| 6,871,346 | B1 | 3/2005 | Kumbalimutt et al. |
| 6,873,986 | B2 | 3/2005 | McConnell et al. |
| 6,876,947 | B1 | 4/2005 | Darley et al. |
| 6,877,003 | B2 | 4/2005 | Ho et al. |
| 6,879,957 | B1 | 4/2005 | Pechter et al. |
| 6,882,335 | B2 | 4/2005 | Saarinen |
| 6,882,337 | B2 | 4/2005 | Shetter |
| 6,882,747 | B2 | 4/2005 | Thawonmas et al. |
| 6,882,955 | B1 | 4/2005 | Ohlenbusch et al. |
| 6,882,971 | B2 | 4/2005 | Craner |
| 6,885,734 | B1 | 4/2005 | Eberle et al. |
| 6,889,361 | B1 | 5/2005 | Bates et al. |
| 6,895,084 | B1 | 5/2005 | Saylor et al. |
| 6,895,257 | B2 | 5/2005 | Boman et al. |
| 6,895,380 | B2 | 5/2005 | Sepe, Jr. |
| 6,895,558 | B1 | 5/2005 | Loveland |
| 6,898,550 | B1 | 5/2005 | Blackadar et al. |
| 6,901,364 | B2 | 5/2005 | Nguyen et al. |
| 6,901,399 | B1 | 5/2005 | Corston et al. |
| 6,904,405 | B2 | 6/2005 | Suominen |
| 6,907,112 | B1 | 6/2005 | Guedalia et al. |
| 6,907,140 | B2 | 6/2005 | Matsugu et al. |
| 6,910,004 | B2 | 6/2005 | Tarbouriech et al. |
| 6,910,007 | B2 | 6/2005 | Stylianou et al. |
| 6,910,186 | B2 | 6/2005 | Kim |
| 6,911,971 | B2 | 6/2005 | Suzuki et al. |
| 6,912,407 | B1 | 6/2005 | Clarke et al. |
| 6,912,498 | B2 | 6/2005 | Stevens et al. |
| 6,912,499 | B1 | 6/2005 | Sabourin et al. |
| 6,915,138 | B2 | 7/2005 | Kraft |
| 6,915,246 | B2 | 7/2005 | Gusler et al. |
| 6,917,373 | B2 | 7/2005 | Vong et al. |
| 6,918,677 | B2 | 7/2005 | Shipman |
| 6,924,828 | B1 | 8/2005 | Hirsch |
| 6,925,438 | B2 | 8/2005 | Mohamed et al. |
| 6,928,149 | B1 | 8/2005 | Panjwani et al. |
| 6,928,614 | B1 | 8/2005 | Everhart |
| 6,931,255 | B2 | 8/2005 | Mekuria |
| 6,931,384 | B1 | 8/2005 | Horvitz et al. |
| 6,932,708 | B2 | 8/2005 | Yamashita et al. |
| 6,934,394 | B1 | 8/2005 | Anderson |
| 6,934,684 | B2 | 8/2005 | Alpdemir et al. |
| 6,934,756 | B2 | 8/2005 | Maes |
| 6,934,812 | B1 | 8/2005 | Robbin et al. |
| 6,937,975 | B1 | 8/2005 | Elworthy |
| 6,937,986 | B2 | 8/2005 | Denenberg et al. |
| 6,944,593 | B2 | 9/2005 | Kuzunuki et al. |
| 6,948,094 | B2 | 9/2005 | Schultz et al. |
| 6,950,087 | B2 | 9/2005 | Knox et al. |
| 6,950,502 | B1 | 9/2005 | Jenkins |
| 6,952,799 | B2 | 10/2005 | Edwards et al. |
| 6,954,755 | B2 | 10/2005 | Reisman |
| 6,954,899 | B1 | 10/2005 | Anderson |
| 6,956,845 | B2 | 10/2005 | Baker et al. |
| 6,957,076 | B2 | 10/2005 | Hunzinger |
| 6,957,183 | B2 | 10/2005 | Malayath et al. |
| 6,960,734 | B1 | 11/2005 | Park |
| 6,961,699 | B1 | 11/2005 | Kahn et al. |
| 6,961,912 | B2 | 11/2005 | Aoki et al. |
| 6,963,841 | B2 | 11/2005 | Handal et al. |
| 6,964,023 | B2 | 11/2005 | Maes et al. |
| 6,965,376 | B2 | 11/2005 | Tani et al. |
| 6,965,863 | B1 | 11/2005 | Zuberec et al. |
| 6,968,311 | B2 | 11/2005 | Knockeart et al. |
| 6,970,820 | B2 | 11/2005 | Junqua et al. |
| 6,970,881 | B1 | 11/2005 | Mohan et al. |
| 6,970,915 | B1 | 11/2005 | Partovi et al. |
| 6,970,935 | B1 | 11/2005 | Maes |
| 6,976,090 | B2 | 12/2005 | Ben-Shaul et al. |
| 6,978,127 | B1 | 12/2005 | Bulthuis et al. |
| 6,978,239 | B2 | 12/2005 | Chu et al. |
| 6,980,949 | B2 | 12/2005 | Ford |
| 6,980,955 | B2 | 12/2005 | Okutani et al. |
| 6,983,251 | B1 | 1/2006 | Umemoto et al. |
| 6,985,858 | B2 | 1/2006 | Frey et al. |
| 6,985,865 | B1 | 1/2006 | Packingham et al. |
| 6,988,071 | B1 | 1/2006 | Gazdzinski |
| 6,990,450 | B2 | 1/2006 | Case et al. |
| 6,996,520 | B2 | 2/2006 | Levin |
| 6,996,531 | B2 | 2/2006 | Korall et al. |
| 6,996,575 | B2 | 2/2006 | Cox et al. |
| 6,999,066 | B2 | 2/2006 | Litwiller |

(56) References Cited

U.S. PATENT DOCUMENTS 6,999,914 B1 2/2006 Boerner et al.
6,999,925 B2 2/2006 Fischer et al.
6,999,927 B2 2/2006 Mozer et al.
7,000,189 B2 2/2006 Dutta et al.
7,002,556 B2 2/2006 Tsukada et al.
7,003,099 B1 2/2006 Zhang et al.
7,003,463 B1 2/2006 Maes et al.
7,003,522 B1 2/2006 Reynar et al.
7,006,969 B2 2/2006 Atal
7,007,239 B1 2/2006 Hawkins et al.
7,010,581 B2 3/2006 Brown et al.
7,013,289 B2 3/2006 Horn et al.
7,013,308 B1 3/2006 Tunstall-Pedoe
7,013,429 B2 3/2006 Fujimoto et al.
7,015,894 B2 3/2006 Morohoshi
7,020,685 B1 3/2006 Chen et al.
7,024,363 B1 4/2006 Comerford et al.
7,024,364 B2 4/2006 Guerra et al.
7,024,366 B1 4/2006 Deyoe et al.
7,024,460 B2 4/2006 Koopmas et al.
7,027,568 B1 4/2006 Simpson et al.
7,027,974 B1 4/2006 Busch et al.
7,027,990 B2 4/2006 Sussman
7,028,252 B1 4/2006 Baru et al.
7,030,861 B1 4/2006 Westerman et al.
7,031,530 B2 4/2006 Driggs et al.
7,031,909 B2 4/2006 Mao et al.
7,035,794 B2 4/2006 Sirivara
7,035,801 B2 4/2006 Jimenez-Feltstrom
7,035,807 B1 4/2006 Brittain et al.
7,036,128 B1 4/2006 Julia et al.
7,038,659 B2 5/2006 Rajkowski
7,039,588 B2 5/2006 Okutani et al.
7,043,420 B2 5/2006 Ratnaparkhi
7,043,422 B2 5/2006 Gao et al.
7,046,230 B2 5/2006 Zadesky et al.
7,046,850 B2 5/2006 Braspenning et al.
7,047,193 B1 5/2006 Bellegarda
7,050,550 B2 5/2006 Steinbiss et al.
7,050,976 B1 5/2006 Packingham
7,050,977 B1 5/2006 Bennett
7,051,096 B1 5/2006 Krawiec et al.
7,054,419 B2 5/2006 Culliss
7,054,888 B2 5/2006 LaChapelle et al.
7,057,607 B2 6/2006 Mayoraz et al.
7,058,569 B2 6/2006 Coorman et al.
7,058,888 B1 6/2006 Gjerstad et al.
7,058,889 B2 6/2006 Trovato et al.
7,062,223 B2 6/2006 Gerber et al.
7,062,225 B2 6/2006 White
7,062,428 B2 6/2006 Hogenhout et al.
7,062,438 B2 6/2006 Kobayashi et al.
7,065,185 B1 6/2006 Koch
7,065,485 B1 6/2006 Chong-White et al.
7,069,213 B2 6/2006 Thompson
7,069,220 B2 6/2006 Coffman et al.
7,069,560 B1 6/2006 Cheyer et al.
7,072,686 B1 7/2006 Schrager
7,072,941 B2 7/2006 Griffin et al.
7,076,527 B2 7/2006 Bellegarda et al.
7,079,713 B2 7/2006 Simmons
7,082,322 B2 7/2006 Harano
7,084,758 B1 8/2006 Cole
7,084,856 B2 8/2006 Huppi
7,085,723 B2 8/2006 Ross et al.
7,085,960 B2 8/2006 Bouat et al.
7,088,345 B2 8/2006 Robinson et al.
7,089,292 B1 8/2006 Roderick et al.
7,092,370 B2 8/2006 Jiang et al.
7,092,887 B2 8/2006 Mozer et al.
7,092,928 B1 8/2006 Elad et al.
7,092,950 B2 8/2006 Wong et al.
7,093,693 B1 8/2006 Gazdzinski
7,095,733 B1 8/2006 Yarlagadda et al.
7,096,183 B2 8/2006 Junqua
7,100,117 B1 8/2006 Chwa et al.
7,103,548 B2 9/2006 Squibbs et al.
7,107,204 B1 9/2006 Liu et al.
7,111,248 B2 9/2006 Mulvey et al.
7,111,774 B2 9/2006 Song
7,113,803 B2 9/2006 Dehlin
7,113,943 B2 9/2006 Bradford et al.
7,115,035 B2 10/2006 Tanaka
7,117,231 B2 10/2006 Fischer et al.
7,123,696 B2 10/2006 Lowe
7,124,081 B1 10/2006 Bellegarda
7,124,082 B2 10/2006 Freedman
7,124,164 B1 10/2006 Chemtob
7,127,046 B1 10/2006 Smith et al.
7,127,396 B2 10/2006 Chu et al.
7,127,403 B1 10/2006 Saylor et al.
7,133,900 B1 11/2006 Szeto
7,136,710 B1 11/2006 Hoffberg et al.
7,136,818 B1 11/2006 Cosatto et al.
7,137,126 B1 11/2006 Coffman et al.
7,139,697 B2 11/2006 Häkkinen et al.
7,139,714 B2 11/2006 Bennett et al.
7,139,722 B2 11/2006 Perrella et al.
7,143,028 B2 11/2006 Hillis et al.
7,143,038 B2 11/2006 Katae
7,143,040 B2 11/2006 Durston et al.
7,146,319 B2 12/2006 Hunt
7,146,437 B2 12/2006 Robbin et al.
7,149,319 B2 12/2006 Roeck
7,149,695 B1 12/2006 Bellegarda
7,149,964 B1 12/2006 Cottrille et al.
7,152,070 B1 12/2006 Musick et al.
7,152,093 B2 12/2006 Ludwig et al.
7,154,526 B2 12/2006 Foote et al.
7,155,668 B2 12/2006 Holland et al.
7,158,647 B2 1/2007 Azima et al.
7,159,174 B2 1/2007 Johnson et al.
7,162,412 B2 1/2007 Yamada et al.
7,162,482 B1 1/2007 Dunning
7,165,073 B2 1/2007 Vandersluis
7,166,791 B2 1/2007 Robbin et al.
7,171,360 B2 1/2007 Huang et al.
7,174,042 B1 2/2007 Simmons et al.
7,174,295 B1 2/2007 Kivimaki
7,174,297 B2 2/2007 Guerra et al.
7,174,298 B2 2/2007 Sharma
7,177,794 B2 2/2007 Mani et al.
7,177,798 B2 2/2007 Hsu et al.
7,177,817 B1 2/2007 Khosla et al.
7,181,386 B2 2/2007 Mohri et al.
7,181,388 B2 2/2007 Tian
7,184,064 B2 2/2007 Zimmerman et al.
7,185,276 B2 2/2007 Keswa
7,188,085 B2 3/2007 Pelletier
7,190,351 B1 3/2007 Goren
7,190,794 B2 3/2007 Hinde
7,191,118 B2 3/2007 Bellegarda
7,191,131 B1 3/2007 Nagao
7,193,615 B2 3/2007 Kim et al.
7,194,186 B1 3/2007 Strub et al.
7,194,413 B2 3/2007 Mahoney et al.
7,194,471 B1 3/2007 Nagatsuka et al.
7,194,611 B2 3/2007 Bear et al.
7,194,699 B2 3/2007 Thomson et al.
7,197,120 B2 3/2007 Luehrig et al.
7,197,460 B1 3/2007 Gupta et al.
7,200,550 B2 4/2007 Menezes et al.
7,200,558 B2 4/2007 Kato et al.
7,200,559 B2 4/2007 Wang
7,203,297 B2 4/2007 Vitikainen et al.
7,203,646 B2 4/2007 Bennett
7,206,809 B2 4/2007 Ludwig et al.
7,216,008 B2 5/2007 Sakata
7,216,073 B2 5/2007 Lavi et al.
7,216,080 B2 5/2007 Tsiao et al.
7,218,920 B2 5/2007 Hyon
7,218,943 B2 5/2007 Klassen et al.
7,219,063 B2 5/2007 Schalk et al.
7,219,123 B1 5/2007 Fiechter et al.

(56) References Cited

U.S. PATENT DOCUMENTS

| | | | |
|---|---|---|---|
| 7,225,125 | B2 | 5/2007 | Bennett et al. |
| 7,228,278 | B2 | 6/2007 | Nguyen et al. |
| 7,231,343 | B1 | 6/2007 | Treadgold et al. |
| 7,231,597 | B1 | 6/2007 | Braun et al. |
| 7,233,790 | B2 | 6/2007 | Kjellberg et al. |
| 7,233,904 | B2 | 6/2007 | Luisi |
| 7,234,026 | B2 | 6/2007 | Robbin et al. |
| 7,236,932 | B1 | 6/2007 | Grajski |
| 7,240,002 | B2 | 7/2007 | Minamino et al. |
| 7,243,130 | B2 | 7/2007 | Horvitz et al. |
| 7,243,305 | B2 | 7/2007 | Schabes et al. |
| 7,246,118 | B2 | 7/2007 | Chastain et al. |
| 7,246,151 | B2 | 7/2007 | Isaacs et al. |
| 7,248,900 | B2 | 7/2007 | Deeds et al. |
| 7,251,454 | B2 | 7/2007 | White |
| 7,254,773 | B2 | 8/2007 | Bates et al. |
| 7,257,537 | B2 | 8/2007 | Ross et al. |
| 7,259,752 | B1 | 8/2007 | Simmons |
| 7,260,529 | B1 | 8/2007 | Lengen |
| 7,263,373 | B2 | 8/2007 | Mattisson |
| 7,266,189 | B1 | 9/2007 | Day |
| 7,266,495 | B1 | 9/2007 | Beaufays et al. |
| 7,266,496 | B2 | 9/2007 | Wang et al. |
| 7,266,499 | B2 | 9/2007 | Surace et al. |
| 7,269,544 | B2 | 9/2007 | Simske |
| 7,269,556 | B2 | 9/2007 | Kiss et al. |
| 7,272,224 | B1 | 9/2007 | Normile et al. |
| 7,275,063 | B2 | 9/2007 | Horn |
| 7,277,088 | B2 | 10/2007 | Robinson et al. |
| 7,277,854 | B2 | 10/2007 | Bennett et al. |
| 7,277,855 | B1 | 10/2007 | Acker et al. |
| 7,280,958 | B2 | 10/2007 | Pavlov et al. |
| 7,283,072 | B1 | 10/2007 | Plachta et al. |
| 7,289,102 | B2 | 10/2007 | Hinckley et al. |
| 7,290,039 | B1 | 10/2007 | Lisitsa et al. |
| 7,292,579 | B2 | 11/2007 | Morris |
| 7,292,979 | B2 | 11/2007 | Karas et al. |
| 7,293,015 | B2 | 11/2007 | Zhou |
| 7,296,230 | B2 | 11/2007 | Fukatsu et al. |
| 7,299,033 | B2 | 11/2007 | Kjellberg et al. |
| 7,302,392 | B1 | 11/2007 | Thenthiruperai et al. |
| 7,302,394 | B1 | 11/2007 | Baray et al. |
| 7,302,686 | B2 | 11/2007 | Togawa |
| 7,308,404 | B2 | 12/2007 | Venkataraman et al. |
| 7,308,408 | B1 | 12/2007 | Stifelman et al. |
| 7,310,329 | B2 | 12/2007 | Vieri et al. |
| 7,310,600 | B1 | 12/2007 | Garner et al. |
| 7,310,605 | B2 | 12/2007 | Janakiraman et al. |
| 7,313,523 | B1 | 12/2007 | Bellegarda et al. |
| 7,315,809 | B2 | 1/2008 | Xun |
| 7,315,818 | B2 | 1/2008 | Stevens et al. |
| 7,319,957 | B2 | 1/2008 | Robinson et al. |
| 7,321,783 | B2 | 1/2008 | Kim |
| 7,322,023 | B2 | 1/2008 | Shulman et al. |
| 7,324,833 | B2 | 1/2008 | White et al. |
| 7,324,947 | B2 | 1/2008 | Jordan et al. |
| 7,328,155 | B2 | 2/2008 | Endo et al. |
| 7,345,670 | B2 | 3/2008 | Armstrong |
| 7,345,671 | B2 | 3/2008 | Robbin et al. |
| 7,349,953 | B2 | 3/2008 | Lisitsa et al. |
| 7,353,139 | B1 | 4/2008 | Burrell et al. |
| 7,359,493 | B1 | 4/2008 | Wang et al. |
| 7,359,671 | B2 | 4/2008 | Richenstein et al. |
| 7,359,851 | B2 | 4/2008 | Tong et al. |
| 7,360,158 | B1 | 4/2008 | Beeman |
| 7,362,738 | B2 | 4/2008 | Taube et al. |
| 7,363,227 | B2 | 4/2008 | Mapes-Riordan et al. |
| 7,365,260 | B2 | 4/2008 | Kawashima |
| 7,366,461 | B1 | 4/2008 | Brown |
| 7,373,612 | B2 | 5/2008 | Risch et al. |
| 7,376,556 | B2 | 5/2008 | Bennett |
| 7,376,632 | B1 | 5/2008 | Sadek et al. |
| 7,376,645 | B2 | 5/2008 | Bernard |
| 7,378,963 | B1 | 5/2008 | Begault et al. |
| 7,379,874 | B2 | 5/2008 | Schmid et al. |
| 7,380,203 | B2 | 5/2008 | Keely et al. |
| 7,383,170 | B2 | 6/2008 | Mills et al. |
| 7,386,438 | B1 | 6/2008 | Franz et al. |
| 7,386,449 | B2 | 6/2008 | Sun et al. |
| 7,386,799 | B1 | 6/2008 | Clanton et al. |
| 7,389,224 | B1 | 6/2008 | Elworthy |
| 7,389,225 | B1 | 6/2008 | Jensen et al. |
| 7,392,185 | B2 | 6/2008 | Bennett |
| 7,394,947 | B2 | 7/2008 | Li et al. |
| 7,398,209 | B2 | 7/2008 | Kennewick et al. |
| 7,401,300 | B2 | 7/2008 | Nurmi |
| 7,403,938 | B2 | 7/2008 | Harrison et al. |
| 7,403,941 | B2 | 7/2008 | Bedworth et al. |
| 7,404,143 | B2 | 7/2008 | Freelander et al. |
| 7,409,337 | B1 | 8/2008 | Potter et al. |
| 7,409,347 | B1 | 8/2008 | Bellegarda |
| 7,412,389 | B2 | 8/2008 | Yang |
| 7,412,470 | B2 | 8/2008 | Masuno et al. |
| 7,415,100 | B2 | 8/2008 | Cooper et al. |
| 7,418,389 | B2 | 8/2008 | Chu et al. |
| 7,418,392 | B1 | 8/2008 | Mozer et al. |
| 7,426,467 | B2 | 9/2008 | Nashida et al. |
| 7,426,468 | B2 | 9/2008 | Coifman et al. |
| 7,427,024 | B1 | 9/2008 | Gazdzinski et al. |
| 7,428,541 | B2 | 9/2008 | Houle |
| 7,433,869 | B2 | 10/2008 | Gollapudi |
| 7,433,921 | B2 | 10/2008 | Ludwig et al. |
| 7,441,184 | B2 | 10/2008 | Frerebeau et al. |
| 7,443,316 | B2 | 10/2008 | Lim |
| 7,444,589 | B2 | 10/2008 | Zellner |
| 7,447,360 | B2 | 11/2008 | Li et al. |
| 7,447,635 | B1 | 11/2008 | Konopka et al. |
| 7,447,637 | B1 | 11/2008 | Grant et al. |
| 7,451,081 | B1 | 11/2008 | Gajic et al. |
| 7,454,351 | B2 | 11/2008 | Jeschke et al. |
| 7,460,652 | B2 | 12/2008 | Chang |
| 7,461,043 | B2 | 12/2008 | Hess |
| 7,467,087 | B1 | 12/2008 | Gillick et al. |
| 7,467,164 | B2 | 12/2008 | Marsh |
| 7,472,061 | B1 | 12/2008 | Alewine et al. |
| 7,472,065 | B2 | 12/2008 | Aaron et al. |
| 7,475,010 | B2 | 1/2009 | Chao |
| 7,475,015 | B2 | 1/2009 | Epstein et al. |
| 7,475,063 | B2 | 1/2009 | Datta et al. |
| 7,477,238 | B2 | 1/2009 | Fux et al. |
| 7,477,240 | B2 | 1/2009 | Yanagisawa |
| 7,478,037 | B2 | 1/2009 | Strong |
| 7,478,091 | B2 | 1/2009 | Mojsilovic et al. |
| 7,478,129 | B1 | 1/2009 | Chemtob |
| 7,479,948 | B2 | 1/2009 | Kim et al. |
| 7,479,949 | B2 | 1/2009 | Jobs et al. |
| 7,483,832 | B2 | 1/2009 | Tischer |
| 7,483,894 | B2 | 1/2009 | Cao |
| 7,487,089 | B2 | 2/2009 | Mozer |
| 7,487,093 | B2 | 2/2009 | Mutsuno et al. |
| 7,490,034 | B2 | 2/2009 | Finnigan et al. |
| 7,490,039 | B1 | 2/2009 | Shaffer et al. |
| 7,493,251 | B2 | 2/2009 | Gao et al. |
| 7,493,560 | B1 | 2/2009 | Kipnes et al. |
| 7,496,498 | B2 | 2/2009 | Chu et al. |
| 7,496,512 | B2 | 2/2009 | Zhao et al. |
| 7,499,923 | B2 | 3/2009 | Kawatani |
| 7,502,738 | B2 | 3/2009 | Kennewick et al. |
| 7,505,795 | B1 | 3/2009 | Lim et al. |
| 7,508,324 | B2 | 3/2009 | Suraqui |
| 7,508,373 | B2 | 3/2009 | Lin et al. |
| 7,516,123 | B2 | 4/2009 | Betz et al. |
| 7,519,327 | B2 | 4/2009 | White |
| 7,519,398 | B2 | 4/2009 | Hirose |
| 7,522,927 | B2 | 4/2009 | Fitch et al. |
| 7,523,036 | B2 | 4/2009 | Akabane et al. |
| 7,523,108 | B2 | 4/2009 | Cao |
| 7,526,466 | B2 | 4/2009 | Au |
| 7,526,738 | B2 | 4/2009 | Ording et al. |
| 7,528,713 | B2 | 5/2009 | Singh et al. |
| 7,529,671 | B2 | 5/2009 | Rockenbeck et al. |
| 7,529,676 | B2 | 5/2009 | Koyama |
| 7,529,677 | B1 | 5/2009 | Wittenber |
| 7,535,997 | B1 | 5/2009 | McQuaide, Jr. et al. |

(56) References Cited

U.S. PATENT DOCUMENTS 7,536,029 B2 5/2009 Choi et al.
7,536,565 B2 5/2009 Girish et al.
7,538,685 B1 5/2009 Cooper et al.
7,539,619 B1 5/2009 Seligman et al.
7,539,656 B2 5/2009 Fratkina et al.
7,541,940 B2 6/2009 Upton
7,542,967 B2 6/2009 Hurst-Hiller et al.
7,542,971 B2 6/2009 Thione et al.
7,543,232 B2 6/2009 Easton, Jr. et al.
7,546,382 B2 6/2009 Healey et al.
7,546,529 B2 6/2009 Reynar et al.
7,548,895 B2 6/2009 Pulsipher
7,552,045 B2 6/2009 Barliga et al.
7,552,055 B2 6/2009 Lecoeuche
7,555,431 B2 6/2009 Bennett
7,555,496 B1 6/2009 Lantrip et al.
7,558,381 B1 7/2009 Ali et al.
7,558,730 B2 7/2009 Davis et al.
7,559,026 B2 7/2009 Girish et al.
7,561,069 B2 7/2009 Horstemeyer
7,562,007 B2 7/2009 Hwang
7,562,032 B2 7/2009 Abbosh et al.
7,562,082 B2 7/2009 Zhou
7,565,104 B1 7/2009 Brown et al.
7,565,380 B1 7/2009 Venkatachary
7,568,151 B2 7/2009 Bargeron et al.
7,571,092 B1 8/2009 Nieh
7,571,106 B2 8/2009 Cao et al.
7,577,522 B2 8/2009 Rosenberg
7,580,551 B1 8/2009 Srihari et al.
7,580,576 B2 8/2009 Wang et al.
7,580,839 B2 8/2009 Tamura et al.
7,584,092 B2 9/2009 Brockett et al.
7,584,093 B2 9/2009 Potter et al.
7,584,278 B2 9/2009 Rajarajan et al.
7,584,429 B2 9/2009 Fabritius
7,593,868 B2 9/2009 Margiloff et al.
7,596,269 B2 9/2009 King et al.
7,596,499 B2 9/2009 Anguera et al.
7,596,606 B2 9/2009 Codignotto
7,596,765 B2 9/2009 Almas
7,599,918 B2 10/2009 Shen et al.
7,603,349 B1 10/2009 Kraft et al.
7,603,381 B2 10/2009 Burke et al.
7,603,684 B1 10/2009 Ellis
7,606,444 B1 10/2009 Erol et al.
7,606,712 B1 10/2009 Smith et al.
7,607,083 B2 10/2009 Gong et al.
7,609,179 B2 10/2009 Diaz-Gutierrez et al.
7,610,258 B2 10/2009 Yuknewicz et al.
7,613,264 B2 11/2009 Wells et al.
7,614,008 B2 11/2009 Ording
7,617,094 B2 11/2009 Aoki et al.
7,620,407 B1 11/2009 Donald et al.
7,620,549 B2 11/2009 Di Cristo et al.
7,620,894 B1 11/2009 Kahn
7,623,119 B2 11/2009 Autio et al.
7,624,007 B2 11/2009 Bennett
7,627,481 B1 12/2009 Kuo et al.
7,630,900 B1 12/2009 Strom
7,630,901 B2 12/2009 Omi
7,633,076 B2 12/2009 Huppi et al.
7,634,409 B2 12/2009 Kennewick et al.
7,634,413 B1 12/2009 Kuo et al.
7,634,718 B2 12/2009 Nakajima
7,634,732 B1 12/2009 Blagsvedt et al.
7,636,657 B2 12/2009 Ju et al.
7,640,158 B2 12/2009 Detlef et al.
7,640,160 B2 12/2009 Di Cristo et al.
7,643,990 B1 1/2010 Bellegarda
7,647,225 B2 1/2010 Bennett et al.
7,649,454 B2 1/2010 Singh et al.
7,649,877 B2 1/2010 Vieri et al.
7,653,883 B2 1/2010 Hotelling et al.
7,656,393 B2 2/2010 King et al.
7,657,424 B2 2/2010 Bennett
7,657,430 B2 2/2010 Ogawa
7,657,828 B2 2/2010 Lucas et al.
7,657,844 B2 2/2010 Gibson et al.
7,657,849 B2 2/2010 Chaudhri et al.
7,660,715 B1 2/2010 Thambiratnam
7,663,607 B2 2/2010 Hotelling et al.
7,664,558 B2 2/2010 Lindahl et al.
7,664,638 B2 2/2010 Cooper et al.
7,668,710 B2 2/2010 Doyle
7,669,134 B1 2/2010 Christie et al.
7,672,841 B2 3/2010 Bennett
7,672,952 B2 3/2010 Isaacson et al.
7,673,238 B2 3/2010 Girish et al.
7,673,251 B1 3/2010 Wibisono
7,673,340 B1 3/2010 Cohen et al.
7,676,026 B1 3/2010 Baxter, Jr.
7,676,365 B2 3/2010 Hwang et al.
7,676,463 B2 3/2010 Thompson et al.
7,679,534 B2 3/2010 Kay et al.
7,680,649 B2 3/2010 Park
7,681,126 B2 3/2010 Roose
7,683,886 B2 3/2010 Willey
7,683,893 B2 3/2010 Kim
7,684,985 B2 3/2010 Dominach et al.
7,684,990 B2 3/2010 Caskey et al.
7,684,991 B2 3/2010 Stohr et al.
7,689,245 B2 3/2010 Cox et al.
7,689,408 B2 3/2010 Chen et al.
7,689,409 B2 3/2010 Heinecke
7,689,412 B2 3/2010 Wu et al.
7,689,421 B2 3/2010 Li et al.
7,689,916 B1 3/2010 Goel et al.
7,693,715 B2 4/2010 Hwang et al.
7,693,717 B2 4/2010 Kahn et al.
7,693,719 B2 4/2010 Chu et al.
7,693,720 B2 4/2010 Kennewick et al.
7,698,131 B2 4/2010 Bennett
7,698,136 B1 4/2010 Nguyen et al.
7,702,500 B2 4/2010 Blaedow
7,702,508 B2 4/2010 Bennett
7,703,091 B1 4/2010 Martin et al.
7,706,510 B2 4/2010 Ng
7,707,026 B2 4/2010 Liu
7,707,027 B2 4/2010 Balchandran et al.
7,707,032 B2 4/2010 Wang et al.
7,707,221 B1 4/2010 Dunning et al.
7,707,226 B1 4/2010 Tonse
7,707,267 B2 4/2010 Lisitsa et al.
7,710,262 B2 5/2010 Ruha
7,711,129 B2 5/2010 Lindahl et al.
7,711,550 B1 5/2010 Feinberg et al.
7,711,565 B1 5/2010 Gazdzinski
7,711,672 B2 5/2010 Au
7,712,053 B2 5/2010 Bradford et al.
7,716,056 B2 5/2010 Weng et al.
7,716,077 B1 5/2010 Mikurak
7,716,216 B1 5/2010 Harik et al.
7,720,674 B2 5/2010 Kaiser et al.
7,720,683 B1 5/2010 Vermeulen et al.
7,721,226 B2 5/2010 Barabe et al.
7,721,301 B2 5/2010 Wong et al.
7,724,242 B2 5/2010 Hillis et al.
7,724,696 B1 5/2010 Parekh
7,725,307 B2 5/2010 Bennett
7,725,318 B2 5/2010 Gavalda et al.
7,725,320 B2 5/2010 Bennett
7,725,321 B2 5/2010 Bennett
7,725,419 B2 5/2010 Lee et al.
7,725,838 B2 5/2010 Williams
7,729,904 B2 6/2010 Bennett
7,729,916 B2 6/2010 Coffman et al.
7,734,461 B2 6/2010 Kwak et al.
7,735,012 B2 6/2010 Naik
7,739,588 B2 6/2010 Reynar et al.
7,742,953 B2 6/2010 King et al.
7,743,188 B2 6/2010 Haitani et al.
7,747,616 B2 6/2010 Yamada et al.
7,752,152 B2 7/2010 Paek et al.

(56) References Cited

U.S. PATENT DOCUMENTS 7,756,707 B2 7/2010 Garner et al.
7,756,708 B2 7/2010 Cohen et al.
7,756,868 B2 7/2010 Lee
7,756,871 B2 7/2010 Yacoub et al.
7,757,173 B2 7/2010 Beaman
7,757,176 B2 7/2010 Vakil et al.
7,757,182 B2 7/2010 Elliott et al.
7,761,296 B1 7/2010 Bakis et al.
7,763,842 B2 7/2010 Hsu et al.
7,770,104 B2 8/2010 Scopes
7,774,202 B2 8/2010 Spengler et al.
7,774,204 B2 8/2010 Mozer et al.
7,774,388 B1 8/2010 Runchey
7,774,753 B1 8/2010 Reilly et al.
7,777,717 B2 8/2010 Fux et al.
7,778,432 B2 8/2010 Larsen
7,778,595 B2 8/2010 White et al.
7,778,632 B2 8/2010 Kurlander et al.
7,778,830 B2 8/2010 Davis et al.
7,779,069 B2 8/2010 Frid-Nielsen et al.
7,779,353 B2 8/2010 Grigoriu et al.
7,779,356 B2 8/2010 Griesmer
7,779,357 B2 8/2010 Naik
7,783,283 B2 8/2010 Kuusinen et al.
7,783,486 B2 8/2010 Rosser et al.
7,788,590 B2 8/2010 Taboada et al.
7,788,663 B2 8/2010 Illowsky et al.
7,796,980 B1 9/2010 McKinney et al.
7,797,265 B2 9/2010 Brinker et al.
7,797,269 B2 9/2010 Rieman et al.
7,797,331 B2 9/2010 Theimer et al.
7,797,338 B2 9/2010 Feng et al.
7,797,629 B2 9/2010 Fux et al.
7,801,721 B2 9/2010 Rosart et al.
7,801,728 B2 9/2010 Ben-David et al.
7,801,729 B2 9/2010 Mozer
7,805,299 B2 9/2010 Coifman
7,809,550 B1 10/2010 Barrows
7,809,565 B2 10/2010 Coifman
7,809,569 B2 10/2010 Attwater et al.
7,809,570 B2 10/2010 Kennewick et al.
7,809,610 B2 10/2010 Cao
7,809,744 B2 10/2010 Nevidomski et al.
7,813,729 B2 10/2010 Lee et al.
7,818,165 B2 10/2010 Carlgren et al.
7,818,176 B2 10/2010 Freeman et al.
7,818,215 B2 10/2010 King et al.
7,818,291 B2 10/2010 Ferguson et al.
7,818,672 B2 10/2010 Mccormack et al.
7,822,608 B2 10/2010 Cross, Jr. et al.
7,823,123 B2 10/2010 Sabbouh
7,826,945 B2 11/2010 Zhang et al.
7,827,047 B2 11/2010 Anderson et al.
7,831,246 B1 11/2010 Smith et al.
7,831,423 B2 11/2010 Schubert
7,831,426 B2 11/2010 Bennett
7,831,432 B2 11/2010 Bodin et al.
7,835,504 B1 11/2010 Donald et al.
7,836,437 B2 11/2010 Kacmarcik et al.
7,840,348 B2 11/2010 Kim et al.
7,840,400 B2 11/2010 Lavi et al.
7,840,447 B2 11/2010 Kleinrock et al.
7,840,581 B2 11/2010 Ross et al.
7,840,912 B2 11/2010 Elias et al.
7,844,394 B2 11/2010 Kim
7,848,924 B2 12/2010 Nurminen et al.
7,848,926 B2 12/2010 Goto et al.
7,853,444 B2 12/2010 Wang et al.
7,853,445 B2 12/2010 Bachenko et al.
7,853,574 B2 12/2010 Kraenzel et al.
7,853,577 B2 12/2010 Sundaresan et al.
7,853,664 B1 12/2010 Wang et al.
7,853,900 B2 12/2010 Nguyen et al.
7,861,164 B2 12/2010 Qin
7,865,817 B2 1/2011 Ryan et al.
7,869,998 B1 1/2011 Di Fabbrizio et al.
7,869,999 B2 1/2011 Amato et al.
7,870,118 B2 1/2011 Jiang et al.
7,870,133 B2 1/2011 Krishnamoorthy et al.
7,873,149 B2 1/2011 Schultz et al.
7,873,519 B2 1/2011 Bennett
7,873,523 B2 1/2011 Potter et al.
7,873,654 B2 1/2011 Bernard
7,877,705 B2 1/2011 Chambers et al.
7,880,730 B2 2/2011 Robinson et al.
7,881,283 B2 2/2011 Cormier et al.
7,881,936 B2 2/2011 Longe et al.
7,885,390 B2 2/2011 Chaudhuri et al.
7,885,844 B1 2/2011 Cohen et al.
7,886,233 B2 2/2011 Rainisto et al.
7,889,101 B2 2/2011 Yokota
7,889,184 B2 2/2011 Blumenberg et al.
7,889,185 B2 2/2011 Blumenberg et al.
7,890,329 B2 2/2011 Wu et al.
7,890,330 B2 2/2011 Ozkaragoz et al.
7,890,652 B2 2/2011 Bull et al.
7,895,039 B2 2/2011 Braho et al.
7,895,531 B2 2/2011 Radtke et al.
7,899,666 B2 3/2011 Varone
7,904,297 B2 3/2011 Mirkovic et al.
7,908,287 B1 3/2011 Katragadda
7,912,289 B2 3/2011 Kansal et al.
7,912,699 B1 3/2011 Saraclar et al.
7,912,702 B2 3/2011 Bennett
7,912,720 B1 3/2011 Hakkani-Tur et al.
7,912,828 B2 3/2011 Bonnet et al.
7,913,185 B1 3/2011 Benson et al.
7,916,979 B2 3/2011 Simmons
7,917,364 B2 3/2011 Yacoub
7,917,367 B2 3/2011 Di Cristo et al.
7,917,497 B2 3/2011 Harrison et al.
7,920,678 B2 4/2011 Cooper et al.
7,920,682 B2 4/2011 Byrne et al.
7,920,857 B2 4/2011 Lau et al.
7,925,525 B2 4/2011 Chin
7,925,610 B2 4/2011 Elbaz et al.
7,929,805 B2 4/2011 Wang et al.
7,930,168 B2 4/2011 Weng et al.
7,930,183 B2 4/2011 Odell et al.
7,930,197 B2 4/2011 Ozzie et al.
7,933,399 B2 4/2011 Knott et al.
7,936,339 B2 5/2011 Marggraff et al.
7,936,861 B2 5/2011 Martin et al.
7,936,863 B2 5/2011 John et al.
7,937,075 B2 5/2011 Zellner
7,941,009 B2 5/2011 Li et al.
7,945,294 B2 5/2011 Zhang et al.
7,945,470 B1 5/2011 Cohen et al.
7,949,529 B2 5/2011 Weider et al.
7,949,534 B2 5/2011 Davis et al.
7,949,752 B2 5/2011 Lange et al.
7,953,679 B2 5/2011 Chidlovskii et al.
7,957,975 B2 6/2011 Burns et al.
7,958,136 B1 6/2011 Curtis et al.
7,962,179 B2 6/2011 Huang
7,974,835 B2 7/2011 Balchandran et al.
7,974,844 B2 7/2011 Sumita
7,974,972 B2 7/2011 Cao
7,975,216 B2 7/2011 Woolf et al.
7,983,478 B2 7/2011 Liu et al.
7,983,915 B2 7/2011 Knight et al.
7,983,917 B2 7/2011 Kennewick et al.
7,983,919 B2 7/2011 Conkie
7,983,997 B2 7/2011 Allen et al.
7,984,062 B2 7/2011 Dunning et al.
7,986,431 B2 7/2011 Emori et al.
7,987,151 B2 7/2011 Schott et al.
7,987,176 B2 7/2011 Latzina et al.
7,987,244 B1 7/2011 Lewis et al.
7,991,614 B2 8/2011 Washio et al.
7,992,085 B2 8/2011 Wang-Aryattanwanich et al.
7,996,228 B2 8/2011 Miller et al.
7,996,589 B2 8/2011 Schultz et al.
7,996,769 B2 8/2011 Fux et al.

(56) References Cited

U.S. PATENT DOCUMENTS 7,996,792 B2 8/2011 Anzures et al.
7,999,669 B2 8/2011 Singh et al.
8,000,453 B2 8/2011 Cooper et al.
8,001,125 B1 8/2011 Magdalin et al.
8,005,664 B2 8/2011 Hanumanthappa
8,005,679 B2 8/2011 Jordan et al.
8,006,180 B2 8/2011 Tunning et al.
8,010,367 B2 8/2011 Muschett et al.
8,010,614 B1 8/2011 Musat et al.
8,014,308 B2 9/2011 Gates et al.
8,015,006 B2 9/2011 Kennewick et al.
8,015,011 B2 9/2011 Nagano et al.
8,015,144 B2 9/2011 Zheng et al.
8,018,431 B1 9/2011 Zehr et al.
8,019,271 B1 9/2011 Izdepski
8,019,604 B2 9/2011 Ma
8,020,104 B2 9/2011 Robarts et al.
8,024,195 B2 9/2011 Mozer et al.
8,024,415 B2 9/2011 Horvitz et al.
8,027,836 B2 9/2011 Baker et al.
8,031,943 B2 10/2011 Chen et al.
8,032,383 B1 10/2011 Bhardwaj et al.
8,032,409 B1 10/2011 Mikurak
8,036,901 B2 10/2011 Mozer
8,037,034 B2 10/2011 Plachta et al.
8,041,557 B2 10/2011 Liu
8,041,570 B2 10/2011 Mirkovic et al.
8,041,611 B2 10/2011 Kleinrock et al.
8,042,053 B2 10/2011 Darwish et al.
8,046,231 B2 10/2011 Hirota et al.
8,046,363 B2 10/2011 Cha et al.
8,046,374 B1 10/2011 Bromwich et al.
8,050,500 B1 11/2011 Batty et al.
8,050,919 B2 11/2011 Das
8,054,180 B1 11/2011 Scofield et al.
8,055,296 B1 11/2011 Persson et al.
8,055,502 B2 11/2011 Clark et al.
8,055,708 B2 11/2011 Chitsaz et al.
8,056,070 B2 11/2011 Goller et al.
8,060,824 B2 11/2011 Brownrigg, Jr. et al.
8,064,753 B2 11/2011 Freeman
8,065,143 B2 11/2011 Yanagihara
8,065,155 B1 11/2011 Gazdzinski
8,065,156 B2 11/2011 Gazdzinski
8,068,604 B2 11/2011 Leeds et al.
8,069,046 B2 11/2011 Kennewick et al.
8,069,422 B2 11/2011 Sheshagiri et al.
8,073,681 B2 12/2011 Baldwin et al.
8,073,695 B1 12/2011 Hendricks et al.
8,077,153 B2 12/2011 Benko et al.
8,078,473 B1 12/2011 Gazdzinski
8,078,978 B2 12/2011 Perry et al.
8,082,153 B2 12/2011 Coffman et al.
8,082,498 B2 12/2011 Salamon et al.
8,090,571 B2 1/2012 Elshishiny et al.
8,095,364 B2 1/2012 Longe et al.
8,099,289 B2 1/2012 Mozer et al.
8,099,395 B2 1/2012 Pabla et al.
8,099,418 B2 1/2012 Inoue et al.
8,103,510 B2 1/2012 Sato
8,103,947 B2 1/2012 Lunt et al.
8,107,401 B2 1/2012 John et al.
8,112,275 B2 2/2012 Kennewick et al.
8,112,280 B2 2/2012 Lu
8,117,026 B2 2/2012 Lee et al.
8,117,037 B2 2/2012 Gazdzinski
8,117,542 B2 2/2012 Radtke et al.
8,121,413 B2 2/2012 Hwang et al.
8,121,837 B2 2/2012 Agapi et al.
8,122,094 B1 2/2012 Kotab
8,122,353 B2 2/2012 Bouta
8,130,929 B2 3/2012 Wilkes et al.
8,131,557 B2 3/2012 Davis et al.
8,135,115 B1 3/2012 Hogg, Jr. et al.
8,138,912 B2 3/2012 Singh et al.
8,140,330 B2 3/2012 Cevik et al.
8,140,335 B2 3/2012 Kennewick et al.
8,140,368 B2 3/2012 Eggenberger et al.
8,140,567 B2 3/2012 Padovitz et al.
8,145,489 B2 3/2012 Freeman et al.
8,150,694 B2 4/2012 Kennewick et al.
8,150,700 B2 4/2012 Shin et al.
8,155,956 B2 4/2012 Cho et al.
8,156,005 B2 4/2012 Vieri
8,160,877 B1 4/2012 Nucci et al.
8,160,883 B2 4/2012 Lecoeuche
8,165,321 B2 4/2012 Paquier et al.
8,165,886 B1 4/2012 Gagnon et al.
8,166,019 B1 4/2012 Lee et al.
8,166,032 B2 4/2012 Sommer et al.
8,170,790 B2 5/2012 Lee et al.
8,170,966 B1 5/2012 Musat et al.
8,171,137 B1 5/2012 Parks et al.
8,175,872 B2 5/2012 Kristjansson et al.
8,175,876 B2 5/2012 Bou-Ghazale et al.
8,179,370 B1 5/2012 Yamasani et al.
8,188,856 B2 5/2012 Singh et al.
8,190,359 B2 5/2012 Bourne
8,190,596 B2 5/2012 Nambiar et al.
8,194,827 B2 6/2012 Jaiswal et al.
8,195,460 B2 6/2012 Degani et al.
8,195,467 B2 6/2012 Mozer et al.
8,195,468 B2 6/2012 Kennewick et al.
8,200,489 B1 6/2012 Baggenstoss
8,200,495 B2 6/2012 Braho et al.
8,201,109 B2 6/2012 Van Os et al.
8,204,238 B2 6/2012 Mozer
8,205,788 B1 6/2012 Gazdzinski et al.
8,209,183 B1 6/2012 Patel et al.
8,213,911 B2 7/2012 Williams et al.
8,219,115 B1 7/2012 Nelissen
8,219,406 B2 7/2012 Yu et al.
8,219,407 B1 7/2012 Roy et al.
8,219,555 B1 7/2012 Mianji
8,219,608 B2 7/2012 alSafadi et al.
8,224,649 B2 7/2012 Chaudhari et al.
8,224,757 B2 7/2012 Bohle
8,228,299 B1 7/2012 Maloney et al.
8,233,919 B2 7/2012 Haag et al.
8,234,111 B2 7/2012 Lloyd et al.
8,239,206 B1 8/2012 LeBeau et al.
8,239,207 B2 8/2012 Seligman et al.
8,244,545 B2 8/2012 Paek et al.
8,244,712 B2 8/2012 Serlet et al.
8,250,071 B1 8/2012 Killalea et al.
8,254,829 B1 8/2012 Kindred et al.
8,255,216 B2 8/2012 White
8,255,217 B2 8/2012 Stent et al.
8,260,117 B1 9/2012 Xu et al.
8,260,247 B2 9/2012 Lazaridis et al.
8,260,617 B2 9/2012 Dhanakshirur et al.
8,260,619 B1 9/2012 Bansal et al.
8,270,933 B2 9/2012 Riemer et al.
8,271,287 B1 9/2012 Kermani
8,275,621 B2 9/2012 Alewine et al.
8,275,736 B2 9/2012 Guo et al.
8,279,171 B2 10/2012 Hirai et al.
8,280,438 B2 10/2012 Barbera
8,285,546 B2 10/2012 Reich
8,285,551 B2 10/2012 Gazdzinski
8,285,553 B2 10/2012 Gazdzinski
8,285,737 B1 10/2012 Lynn et al.
8,290,777 B1 10/2012 Nguyen et al.
8,290,778 B2 10/2012 Gazdzinski
8,290,781 B2 10/2012 Gazdzinski
8,296,124 B1 10/2012 Holsztynska et al.
8,296,145 B2 10/2012 Clark et al.
8,296,146 B2 10/2012 Gazdzinski
8,296,153 B2 10/2012 Gazdzinski
8,296,380 B1 10/2012 Kelly et al.
8,296,383 B2 10/2012 Lindahl
8,300,776 B2 10/2012 Davies et al.
8,300,801 B2 10/2012 Sweeney et al.
8,301,456 B2 10/2012 Gazdzinski

(56) References Cited

U.S. PATENT DOCUMENTS 8,311,189 B2 11/2012 Champlin et al.
8,311,834 B1 11/2012 Gazdzinski
8,311,835 B2 11/2012 Lecoeuche
8,311,838 B2 11/2012 Lindahl et al.
8,312,017 B2 11/2012 Martin et al.
8,321,786 B2 11/2012 Lunati et al.
8,326,627 B2 12/2012 Kennewick et al.
8,332,205 B2 12/2012 Krishnan et al.
8,332,218 B2 12/2012 Cross et al.
8,332,224 B2 12/2012 Di Cristo et al.
8,332,748 B1 12/2012 Karam
8,335,689 B2 12/2012 Wittenstein et al.
8,340,975 B1 12/2012 Rosenberger
8,345,665 B2 1/2013 Vieri et al.
8,346,563 B1 1/2013 Hjelm et al.
8,346,757 B1 1/2013 Lamping et al.
8,352,183 B2 1/2013 Thota et al.
8,352,268 B2 1/2013 Naik et al.
8,352,272 B2 1/2013 Rogers et al.
8,355,919 B2 1/2013 Silverman et al.
8,359,234 B2 1/2013 Vieri
8,370,145 B2 2/2013 Endo et al.
8,370,158 B2 2/2013 Gazdzinski
8,371,503 B2 2/2013 Gazdzinski
8,374,871 B2 2/2013 Ehsani et al.
8,375,320 B2 2/2013 Kotler et al.
8,380,504 B1 2/2013 Peden et al.
8,380,507 B2 2/2013 Herman et al.
8,381,107 B2 2/2013 Rottler et al.
8,381,135 B2 2/2013 Hotelling et al.
8,386,485 B2 2/2013 Kerschberg et al.
8,386,926 B1 2/2013 Matsuoka
8,391,844 B2 3/2013 Lamiraux et al.
8,396,714 B2 3/2013 Rogers et al.
8,396,715 B2 3/2013 Odell et al.
8,401,163 B1 3/2013 Kirchhoff et al.
8,406,745 B1 3/2013 Upadhyay et al.
8,407,239 B2 3/2013 Dean et al.
8,423,288 B2 4/2013 Stahl et al.
8,428,758 B2 4/2013 Naik et al.
8,433,572 B2 4/2013 Caskey et al.
8,433,778 B1 4/2013 Shreesha et al.
8,434,133 B2 4/2013 Kulkarni et al.
8,442,821 B1 5/2013 Vanhoucke
8,447,612 B2 5/2013 Gazdzinski
8,452,597 B2 5/2013 Bringert et al.
8,452,602 B1 5/2013 Bringert et al.
8,453,058 B1 5/2013 Coccaro et al.
8,457,959 B2 6/2013 Kaiser
8,458,115 B2 6/2013 Cai et al.
8,458,278 B2 6/2013 Christie et al.
8,463,592 B2 6/2013 Lu et al.
8,464,150 B2 6/2013 Davidson et al.
8,473,289 B2 6/2013 Jitkoff et al.
8,477,323 B2 7/2013 Low et al.
8,478,816 B2 7/2013 Parks et al.
8,479,122 B2 7/2013 Hotelling et al.
8,484,027 B1 7/2013 Murphy
8,489,599 B2 7/2013 Bellotti
8,498,857 B2 7/2013 Kopparapu et al.
8,514,197 B2 8/2013 Shahraray et al.
8,515,736 B1 8/2013 Duta
8,515,750 B1 8/2013 Lei et al.
8,521,513 B2 8/2013 Millett et al.
8,521,526 B1 8/2013 Lloyd et al.
8,521,531 B1 8/2013 Kim
8,527,276 B1 9/2013 Senior et al.
8,533,266 B2 9/2013 Koulomzin et al.
8,537,033 B2 9/2013 Gueziec
8,539,342 B1 9/2013 Lewis
8,543,375 B2 9/2013 Hong
8,543,397 B1 9/2013 Nguyen
8,543,398 B1 9/2013 Strope et al.
8,560,229 B1 10/2013 Park et al.
8,560,366 B2 10/2013 Mikurak
8,571,528 B1 10/2013 Channakeshava
8,571,851 B1 10/2013 Tickner et al.
8,577,683 B2 11/2013 Dewitt
8,583,416 B2 11/2013 Huang et al.
8,583,511 B2 11/2013 Hendrickson
8,583,638 B2 11/2013 Donelli
8,589,156 B2 11/2013 Burke et al.
8,589,161 B2 11/2013 Kennewick et al.
8,589,374 B2 11/2013 Chaudhari
8,589,869 B2 11/2013 Wolfram
8,589,911 B1 11/2013 Sharkey et al.
8,595,004 B2 11/2013 Koshinaka
8,595,642 B1 11/2013 Lagassey
8,600,743 B2 12/2013 Lindahl et al.
8,600,746 B1 12/2013 Lei et al.
8,600,930 B2 12/2013 Sata et al.
8,606,090 B2 12/2013 Eyer
8,606,568 B1 12/2013 Tickner et al.
8,606,576 B1 12/2013 Barr et al.
8,606,577 B1 12/2013 Stewart et al.
8,615,221 B1 12/2013 Cosenza et al.
8,620,659 B2 12/2013 Di Cristo et al.
8,620,662 B2 12/2013 Bellegarda
8,626,681 B1 1/2014 Jurca et al.
8,630,841 B2 1/2014 Van Caldwell et al.
8,635,073 B2 1/2014 Chang
8,638,363 B2 1/2014 King et al.
8,639,516 B2 1/2014 Lindahl et al.
8,645,128 B1 2/2014 Agiomyrgiannakis
8,645,137 B2 2/2014 Bellegarda et al.
8,645,138 B1 2/2014 Weinstein et al.
8,654,936 B1 2/2014 Tofighbakhsh et al.
8,655,646 B2 2/2014 Lee et al.
8,655,901 B1 2/2014 Li et al.
8,660,843 B2 2/2014 Falcon et al.
8,660,849 B2 2/2014 Gruber et al.
8,660,924 B2 2/2014 Hoch et al.
8,660,970 B1 2/2014 Fiedorowicz
8,661,112 B2 2/2014 Creamer et al.
8,661,340 B2 2/2014 Goldsmith et al.
8,670,979 B2 3/2014 Gruber et al.
8,675,084 B2 3/2014 Bolton et al.
8,676,904 B2 3/2014 Lindahl et al.
8,677,377 B2 3/2014 Cheyer et al.
8,681,950 B2 3/2014 Vlack et al.
8,682,667 B2 3/2014 Haughay et al.
8,687,777 B1 4/2014 Lavian et al.
8,688,446 B2 4/2014 Yanagihara et al.
8,688,453 B1 4/2014 Joshi et al.
8,689,135 B2 4/2014 Portele et al.
8,694,322 B2 4/2014 Snitkovskiy et al.
8,695,074 B2 4/2014 Saraf et al.
8,696,364 B2 4/2014 Cohen
8,706,472 B2 4/2014 Ramerth et al.
8,706,474 B2 4/2014 Blume et al.
8,706,503 B2 4/2014 Cheyer et al.
8,707,195 B2 4/2014 Fleizach et al.
8,712,778 B1 4/2014 Thenthiruperai
8,713,119 B2 4/2014 Lindahl et al.
8,713,418 B2 4/2014 King et al.
8,719,006 B2 5/2014 Bellegarda et al.
8,719,014 B2 5/2014 Wagner et al.
8,719,039 B1 5/2014 Sharifi
8,731,610 B2 5/2014 Appaji
8,731,912 B1 5/2014 Tickner et al.
8,731,942 B2 5/2014 Cheyer et al.
8,739,208 B2 5/2014 Rodriguez et al.
8,744,852 B1 6/2014 Seymour et al.
8,751,971 B2 6/2014 Fleizach et al.
8,760,537 B2 6/2014 Johnson et al.
8,762,145 B2 6/2014 Ouchi et al.
8,762,156 B2 6/2014 Chen et al.
8,762,469 B2 6/2014 Lindahl et al.
8,768,693 B2 7/2014 Lempel et al.
8,768,702 B2 7/2014 Boettcher et al.
8,775,154 B2 7/2014 Clinchant et al.
8,775,177 B1 7/2014 Heigold et al.
8,775,931 B2 7/2014 Fux et al.
8,781,456 B2 7/2014 Prociw

(56) References Cited

U.S. PATENT DOCUMENTS 8,781,841 B1 7/2014 Wang
8,793,301 B2 7/2014 Wegenkittl et al.
8,798,255 B2 8/2014 Lubowich et al.
8,798,995 B1 8/2014 Edara et al.
8,799,000 B2 8/2014 Guzzoni et al.
8,805,690 B1 8/2014 LeBeau et al.
8,812,299 B1 8/2014 Su
8,812,302 B2 8/2014 Xiao et al.
8,812,321 B2 8/2014 Gilbert et al.
8,823,507 B1 9/2014 Touloumtzis
8,831,947 B2 9/2014 Wasserblat et al.
8,831,949 B1 9/2014 Smith et al.
8,838,457 B2 9/2014 Cerra et al.
8,855,915 B2 10/2014 Furuhata et al.
8,861,925 B1 10/2014 Ohme
8,862,252 B2 10/2014 Rottler et al.
8,868,111 B1 10/2014 Kahn et al.
8,868,409 B1 10/2014 Mengibar et al.
8,868,469 B2 10/2014 Xu et al.
8,868,529 B2 10/2014 Lerenc
8,880,405 B2 11/2014 Cerra et al.
8,886,534 B2 11/2014 Nakano et al.
8,886,540 B2 11/2014 Cerra et al.
8,886,541 B2 11/2014 Friedlander
8,892,446 B2 11/2014 Cheyer et al.
8,893,023 B2 11/2014 Perry et al.
8,897,822 B2 11/2014 Martin
8,898,064 B1 11/2014 Thomas et al.
8,898,568 B2 11/2014 Bull et al.
8,903,716 B2 12/2014 Chen et al.
8,909,693 B2 12/2014 Frissora et al.
8,918,321 B2 12/2014 Czahor
8,922,485 B1 12/2014 Lloyd
8,930,176 B2 1/2015 Li et al.
8,930,191 B2 1/2015 Gruber et al.
8,938,394 B1 1/2015 Faaborg et al.
8,938,450 B2 1/2015 Spivack et al.
8,938,688 B2 1/2015 Bradford et al.
8,942,986 B2 1/2015 Cheyer et al.
8,943,423 B2 1/2015 Merrill et al.
8,964,947 B1 2/2015 Noolu et al.
8,972,240 B2 3/2015 Brockett et al.
8,972,432 B2 3/2015 Shaw et al.
8,972,878 B2 3/2015 Mohler et al.
8,976,063 B1 3/2015 Hawkins et al.
8,976,108 B2 3/2015 Hawkins et al.
8,977,255 B2 3/2015 Freeman et al.
8,983,383 B1 3/2015 Haskin
8,989,713 B2 3/2015 Doulton
8,990,235 B2 3/2015 King et al.
8,994,660 B2 3/2015 Neels et al.
8,995,972 B1 3/2015 Cronin
8,996,350 B1 3/2015 Dub et al.
8,996,376 B2 3/2015 Fleizach et al.
8,996,381 B2 3/2015 Mozer et al.
8,996,639 B1 3/2015 Faaborg et al.
9,002,714 B2 4/2015 Kim et al.
9,009,046 B1 4/2015 Stewart
9,015,036 B2 4/2015 Karov Zangvil et al.
9,020,804 B2 4/2015 Barbaiani et al.
9,026,425 B2 5/2015 Nikoulina et al.
9,026,426 B2 5/2015 Wu et al.
9,031,834 B2 5/2015 Coorman et al.
9,031,970 B1 5/2015 Das et al.
9,037,967 B1 5/2015 Al-Jefri et al.
9,043,208 B2 5/2015 Koch et al.
9,043,211 B2 5/2015 Haiut et al.
9,046,932 B2 6/2015 Medlock et al.
9,049,255 B2 6/2015 MacFarlane et al.
9,049,295 B1 6/2015 Cooper et al.
9,053,706 B2 6/2015 Jitkoff et al.
9,058,105 B2 6/2015 Drory et al.
9,058,332 B1 6/2015 Darby et al.
9,058,811 B2 6/2015 Wang et al.
9,063,979 B2 6/2015 Chiu et al.
9,064,495 B1 6/2015 Torok et al.
9,065,660 B2 6/2015 Ellis et al.
9,070,247 B2 6/2015 Kuhn et al.
9,070,366 B1 6/2015 Mathias et al.
9,071,701 B2 6/2015 Donaldson et al.
9,075,435 B1 7/2015 Noble et al.
9,076,448 B2 7/2015 Bennett et al.
9,076,450 B1 7/2015 Sadek et al.
9,081,411 B2 7/2015 Kalns et al.
9,081,482 B1 7/2015 Zhai et al.
9,082,402 B2 7/2015 Yadgar et al.
9,083,581 B1 7/2015 Addepalli et al.
9,094,636 B1 7/2015 Sanders et al.
9,098,467 B1 8/2015 Blanksteen et al.
9,101,279 B2 8/2015 Ritchey et al.
9,112,984 B2 8/2015 Sejnoha et al.
9,117,447 B2 8/2015 Gruber et al.
9,123,338 B1 9/2015 Sanders et al.
9,143,907 B1 9/2015 Caldwell et al.
9,159,319 B1 10/2015 Hoffmeister
9,164,983 B2 10/2015 Liu et al.
9,171,541 B2 10/2015 Kennewick et al.
9,171,546 B1 10/2015 Pike
9,183,845 B1 11/2015 Gopalakrishnan et al.
9,190,062 B2 11/2015 Haughay
9,208,153 B1 12/2015 Zaveri et al.
9,213,754 B1 12/2015 Zhan et al.
9,218,122 B2 12/2015 Thoma et al.
9,218,809 B2 12/2015 Bellegarda
9,218,819 B1 12/2015 Stekkelpak et al.
9,223,537 B2 12/2015 Brown et al.
9,236,047 B2 1/2016 Rasmussen
9,241,073 B1 1/2016 Van Rensburg et al.
9,251,713 B1 2/2016 Giovanniello et al.
9,255,812 B2 2/2016 Maeoka et al.
9,258,604 B1 2/2016 Bilobrov et al.
9,262,412 B2 2/2016 Yang et al.
9,262,612 B2 2/2016 Cheyer
9,263,058 B2 2/2016 Huang et al.
9,280,535 B2 3/2016 Varma et al.
9,282,211 B2 3/2016 Osawa
9,286,910 B1 3/2016 Li et al.
9,292,487 B1 3/2016 Weber
9,292,489 B1 3/2016 Sak et al.
9,292,492 B2 3/2016 Sarikaya et al.
9,299,344 B2 3/2016 Braho et al.
9,300,718 B2 3/2016 Khanna
9,301,256 B2 3/2016 Mohan et al.
9,305,543 B2 4/2016 Fleizach et al.
9,305,548 B2 4/2016 Kennewick et al.
9,311,308 B2 4/2016 Sankarasubramaniam et al.
9,311,912 B1 4/2016 Swietlinski et al.
9,313,317 B1 4/2016 LeBeau et al.
9,318,108 B2 4/2016 Gruber et al.
9,325,809 B1 4/2016 Barros et al.
9,325,842 B1 4/2016 Siddiqi et al.
9,330,659 B2 5/2016 Ju et al.
9,330,668 B2 5/2016 Nanavati et al.
9,330,720 B2 5/2016 Lee
9,335,983 B2 5/2016 Breiner et al.
9,338,493 B2 5/2016 Van Os et al.
9,349,368 B1 5/2016 LeBeau et al.
9,355,472 B2 5/2016 Kocienda et al.
9,361,084 B1 6/2016 Costa
9,367,541 B1 6/2016 Servan et al.
9,368,114 B2 6/2016 Larson et al.
9,377,871 B2 6/2016 Waddell et al.
9,378,456 B2 6/2016 White et al.
9,378,740 B1 6/2016 Rosen et al.
9,380,155 B1 6/2016 Reding et al.
9,383,827 B1 7/2016 Faaborg et al.
9,384,185 B2 7/2016 Medlock et al.
9,390,726 B1 7/2016 Smus et al.
9,396,722 B2 7/2016 Chung et al.
9,401,147 B2 7/2016 Jitkoff et al.
9,406,224 B1 8/2016 Sanders et al.
9,406,299 B2 8/2016 Gollan et al.
9,408,182 B1 8/2016 Hurley et al.
9,412,392 B2 8/2016 Lindahl

(56) References Cited

U.S. PATENT DOCUMENTS

| | | | |
|---|---|---|---|
| 9,418,650 | B2 | 8/2016 | Bharadwaj et al. |
| 9,423,266 | B2 | 8/2016 | Clark et al. |
| 9,424,246 | B2 | 8/2016 | Spencer et al. |
| 9,424,840 | B1 | 8/2016 | Hart et al. |
| 9,431,021 | B1 | 8/2016 | Scalise et al. |
| 9,432,499 | B2 | 8/2016 | Hajdu et al. |
| 9,436,918 | B2 | 9/2016 | Pantel et al. |
| 9,437,186 | B1 | 9/2016 | Liu et al. |
| 9,437,189 | B2 | 9/2016 | Epstein et al. |
| 9,442,687 | B2 | 9/2016 | Park et al. |
| 9,443,527 | B1 | 9/2016 | Watanabe et al. |
| 9,454,599 | B2 | 9/2016 | Golden et al. |
| 9,454,957 | B1 | 9/2016 | Mathias et al. |
| 9,465,798 | B2 | 10/2016 | Lin |
| 9,465,833 | B2 | 10/2016 | Aravamudan et al. |
| 9,465,864 | B2 | 10/2016 | Hu et al. |
| 9,466,027 | B2 | 10/2016 | Byrne et al. |
| 9,466,294 | B1 | 10/2016 | Tunstall-pedoe et al. |
| 9,471,566 | B1 | 10/2016 | Zhang et al. |
| 9,472,196 | B1 | 10/2016 | Wang et al. |
| 9,483,388 | B2 | 11/2016 | Sankaranarasimhan et al. |
| 9,483,461 | B2 | 11/2016 | Fleizach et al. |
| 9,484,021 | B1 | 11/2016 | Mairesse et al. |
| 9,495,129 | B2 | 11/2016 | Fleizach et al. |
| 9,501,741 | B2 | 11/2016 | Cheyer et al. |
| 9,502,025 | B2 | 11/2016 | Kennewick et al. |
| 9,508,028 | B2 | 11/2016 | Bannister et al. |
| 9,510,044 | B1 | 11/2016 | Pereira et al. |
| 9,514,470 | B2 | 12/2016 | Topatan et al. |
| 9,516,014 | B2 | 12/2016 | Zafiroglu et al. |
| 9,519,453 | B2 | 12/2016 | Perkuhn et al. |
| 9,524,355 | B2 | 12/2016 | Forbes et al. |
| 9,531,862 | B1 | 12/2016 | Vadodaria |
| 9,535,906 | B2 | 1/2017 | Lee et al. |
| 9,536,527 | B1 | 1/2017 | Carlson |
| 9,547,647 | B2 | 1/2017 | Badaskar |
| 9,548,050 | B2 | 1/2017 | Gruber et al. |
| 9,548,979 | B1 | 1/2017 | Johnson et al. |
| 9,569,549 | B1 | 2/2017 | Jenkins et al. |
| 9,575,964 | B2 | 2/2017 | Yadgar et al. |
| 9,578,173 | B2 | 2/2017 | Sanghavi et al. |
| 9,607,612 | B2 | 3/2017 | Deleeuw |
| 9,619,200 | B2 | 4/2017 | Chakladar et al. |
| 9,620,113 | B2 | 4/2017 | Kennewick et al. |
| 9,620,126 | B2 | 4/2017 | Chiba |
| 9,626,955 | B2 | 4/2017 | Fleizach et al. |
| 9,633,004 | B2 | 4/2017 | Giuli et al. |
| 9,633,191 | B2 | 4/2017 | Fleizach et al. |
| 9,633,660 | B2 | 4/2017 | Haughay |
| 9,652,453 | B2 | 5/2017 | Mathur et al. |
| 9,658,746 | B2 | 5/2017 | Cohn et al. |
| 9,659,002 | B2 | 5/2017 | Medlock et al. |
| 9,659,298 | B2 | 5/2017 | Lynch et al. |
| 9,665,567 | B2 | 5/2017 | Liu et al. |
| 9,665,662 | B1 | 5/2017 | Gautam et al. |
| 9,668,121 | B2 | 5/2017 | Naik et al. |
| 9,672,725 | B2 | 6/2017 | Dotan-Cohen et al. |
| 9,691,378 | B1 | 6/2017 | Meyers et al. |
| 9,697,822 | B1 | 7/2017 | Naik et al. |
| 9,697,827 | B1 | 7/2017 | Lilly et al. |
| 9,698,999 | B2 | 7/2017 | Mutagi |
| 9,720,907 | B2 | 8/2017 | Bangalore et al. |
| 9,721,566 | B2 | 8/2017 | Newendorp et al. |
| 9,721,570 | B1 | 8/2017 | Beal et al. |
| 9,723,130 | B2 | 8/2017 | Rand |
| 9,734,817 | B1 | 8/2017 | Putrycz |
| 9,734,839 | B1 | 8/2017 | Adams |
| 9,741,343 | B1 | 8/2017 | Miles et al. |
| 9,747,083 | B1 | 8/2017 | Roman et al. |
| 9,747,093 | B2 | 8/2017 | Latino et al. |
| 9,755,605 | B1 | 9/2017 | Li et al. |
| 9,760,566 | B2 | 9/2017 | Heck et al. |
| 9,767,710 | B2 | 9/2017 | Lee et al. |
| 9,772,994 | B2 | 9/2017 | Karov et al. |
| 9,786,271 | B1 | 10/2017 | Combs et al. |
| 9,792,907 | B2 | 10/2017 | Bocklet et al. |
| 9,798,719 | B2 | 10/2017 | Karov et al. |
| 9,812,128 | B2 | 11/2017 | Mixter et al. |
| 9,813,882 | B1 | 11/2017 | Masterman |
| 9,818,400 | B2 | 11/2017 | Paulik et al. |
| 9,823,811 | B2 | 11/2017 | Brown et al. |
| 9,823,828 | B2 | 11/2017 | Zambetti et al. |
| 9,830,044 | B2 | 11/2017 | Brown et al. |
| 9,830,449 | B1 | 11/2017 | Wagner |
| 9,842,168 | B2 | 12/2017 | Heck et al. |
| 9,842,584 | B1 | 12/2017 | Hart et al. |
| 9,846,685 | B2 | 12/2017 | Li |
| 9,858,925 | B2 | 1/2018 | Gruber et al. |
| 9,858,927 | B2 | 1/2018 | Williams et al. |
| 9,886,953 | B2 | 2/2018 | Lemay et al. |
| 9,887,949 | B2 | 2/2018 | Shepherd et al. |
| 9,916,839 | B1 | 3/2018 | Scalise et al. |
| 9,922,642 | B2 | 3/2018 | Pitschel et al. |
| 9,934,777 | B1 | 4/2018 | Joseph et al. |
| 9,934,785 | B1 | 4/2018 | Hulaud |
| 9,946,862 | B2 | 4/2018 | Yun et al. |
| 9,948,728 | B2 | 4/2018 | Linn et al. |
| 9,959,129 | B2 | 5/2018 | Kannan et al. |
| 9,966,065 | B2 | 5/2018 | Gruber et al. |
| 9,966,068 | B2 | 5/2018 | Cash et al. |
| 9,967,381 | B1 | 5/2018 | Kashimba et al. |
| 9,971,495 | B2 | 5/2018 | Shetty et al. |
| 9,984,686 | B1 | 5/2018 | Mutagi et al. |
| 9,986,419 | B2 | 5/2018 | Naik et al. |
| 9,990,129 | B2 | 6/2018 | Yang et al. |
| 9,990,176 | B1 | 6/2018 | Gray |
| 9,998,552 | B1 | 6/2018 | Ledet |
| 10,001,817 | B2 | 6/2018 | Zambetti et al. |
| 10,013,416 | B1 | 7/2018 | Bhardwaj et al. |
| 10,013,654 | B1 | 7/2018 | Levy et al. |
| 10,013,979 | B1 | 7/2018 | Roma et al. |
| 10,019,436 | B2 | 7/2018 | Huang |
| 10,032,451 | B1 | 7/2018 | Mamkina et al. |
| 10,032,455 | B2 | 7/2018 | Newman et al. |
| 10,037,758 | B2 | 7/2018 | Jing et al. |
| 10,043,516 | B2 | 8/2018 | Saddler et al. |
| 10,049,161 | B2 | 8/2018 | Kaneko |
| 10,049,663 | B2 | 8/2018 | Orr et al. |
| 10,049,668 | B2 | 8/2018 | Huang et al. |
| 10,055,390 | B2 | 8/2018 | Sharifi et al. |
| 10,055,681 | B2 | 8/2018 | Brown et al. |
| 10,074,360 | B2 | 9/2018 | Kim |
| 10,074,371 | B1 | 9/2018 | Wang et al. |
| 10,083,213 | B1 | 9/2018 | Podgorny et al. |
| 10,083,690 | B2 | 9/2018 | Giuli et al. |
| 10,088,972 | B2 | 10/2018 | Brown et al. |
| 10,089,072 | B2 | 10/2018 | Piersol et al. |
| 10,096,319 | B1 | 10/2018 | Jin et al. |
| 10,101,887 | B2 | 10/2018 | Bernstein et al. |
| 10,102,359 | B2 | 10/2018 | Cheyer |
| 10,127,901 | B2 | 11/2018 | Zhao et al. |
| 10,127,908 | B1 | 11/2018 | Deller et al. |
| 10,134,425 | B1 | 11/2018 | Johnson, Jr. |
| 10,169,329 | B2 | 1/2019 | Futrell et al. |
| 10,170,123 | B2 | 1/2019 | Orr et al. |
| 10,170,135 | B1 | 1/2019 | Pearce et al. |
| 10,175,879 | B2 | 1/2019 | Missig et al. |
| 10,176,167 | B2 | 1/2019 | Evermann |
| 10,176,802 | B1 | 1/2019 | Ladhak et al. |
| 10,185,542 | B2 | 1/2019 | Carson et al. |
| 10,186,254 | B2 | 1/2019 | Williams et al. |
| 10,186,266 | B1 | 1/2019 | Devaraj et al. |
| 10,191,627 | B2 | 1/2019 | Cieplinski et al. |
| 10,191,646 | B2 | 1/2019 | Zambetti et al. |
| 10,191,718 | B2 | 1/2019 | Rhee et al. |
| 10,192,546 | B1 | 1/2019 | Piersol et al. |
| 10,192,552 | B2 | 1/2019 | Raitio et al. |
| 10,192,557 | B2 | 1/2019 | Lee et al. |
| 10,199,051 | B2 | 2/2019 | Binder et al. |
| 10,200,824 | B2 | 2/2019 | Gross et al. |
| 10,216,351 | B2 | 2/2019 | Yang |
| 10,216,832 | B2 | 2/2019 | Bangalore et al. |
| 10,223,066 | B2 | 3/2019 | Martel et al. |
| 10,225,711 | B2 | 3/2019 | Parks et al. |

(56) References Cited

U.S. PATENT DOCUMENTS 10,229,356 B1 3/2019 Liu et al.
10,237,711 B2 3/2019 Linn et al.
10,248,308 B2 4/2019 Karunamuni et al.
10,255,922 B1 4/2019 Sharifi et al.
10,269,345 B2 4/2019 Castillo Sanchez et al.
10,296,160 B2 5/2019 Shah et al.
10,297,253 B2 5/2019 Walker, II et al.
10,303,772 B2 5/2019 Hosn et al.
10,304,463 B2 5/2019 Mixter et al.
10,311,482 B2 6/2019 Baldwin
10,311,871 B2 6/2019 Newendorp et al.
10,325,598 B2 6/2019 Basye et al.
10,332,513 B1 6/2019 D'souza et al.
10,332,518 B2 6/2019 Garg et al.
10,346,540 B2 7/2019 Karov et al.
10,346,753 B2 7/2019 Soon-Shiong et al.
10,353,975 B2 7/2019 Oh et al.
10,354,677 B2 7/2019 Mohamed et al.
10,356,243 B2 7/2019 Sanghavi et al.
10,366,692 B1 7/2019 Adams et al.
10,372,814 B2 8/2019 Gliozzo et al.
10,389,876 B2 8/2019 Engelke et al.
10,402,066 B2 9/2019 Kawana
10,403,283 B1 9/2019 Schramm et al.
10,409,454 B2 9/2019 Kagan et al.
10,410,637 B2 9/2019 Paulik et al.
10,417,037 B2 9/2019 Gruber et al.
10,417,344 B2 9/2019 Futrell et al.
10,417,554 B2 9/2019 Scheffler
10,446,142 B2 10/2019 Lim et al.
10,469,665 B1 11/2019 Bell et al.
10,474,961 B2 11/2019 Brigham et al.
10,496,364 B2 12/2019 Yao
10,496,705 B1 12/2019 Irani et al.
10,497,365 B2 12/2019 Gruber et al.
10,504,518 B1 12/2019 Irani et al.
10,521,946 B1 12/2019 Roche et al.
10,528,386 B2 1/2020 Yu
10,568,032 B2 2/2020 Freeman et al.
10,585,957 B2 3/2020 Heck et al.
10,630,795 B2 4/2020 Aoki et al.
10,659,851 B2 5/2020 Lister et al.
10,706,841 B2 7/2020 Gruber et al.
10,757,499 B1 8/2020 Vautrin et al.
10,769,385 B2 9/2020 Evermann
10,795,944 B2 10/2020 Brown et al.
10,796,100 B2 10/2020 Bangalore et al.
10,803,255 B2 10/2020 Dubyak et al.
10,811,013 B1 10/2020 Secker-walker et al.
10,957,311 B2 3/2021 Solomon et al.
2001/0005859 A1 6/2001 Okuyama et al.
2001/0020259 A1 9/2001 Sekiguchi et al.
2001/0027396 A1 10/2001 Sato
2001/0029455 A1 10/2001 Chin et al.
2001/0030660 A1 10/2001 Zainoulline
2001/0032080 A1 10/2001 Fukada
2001/0041021 A1 11/2001 Boyle et al.
2001/0042107 A1 11/2001 Palm
2001/0044724 A1 11/2001 Hon et al.
2001/0047264 A1 11/2001 Roundtree
2001/0049275 A1 12/2001 Pierry et al.
2001/0049277 A1 12/2001 Meyer et al.
2001/0056342 A1 12/2001 Piehn et al.
2001/0056347 A1 12/2001 Chazan et al.
2002/0001395 A1 1/2002 Davis et al.
2002/0002039 A1 1/2002 Qureshey et al.
2002/0002413 A1 1/2002 Tokue
2002/0002461 A1 1/2002 Tetsumoto
2002/0002548 A1 1/2002 Roundtree
2002/0002575 A1 1/2002 Eisler et al.
2002/0002594 A1 1/2002 Roundtree et al.
2002/0004703 A1 1/2002 Gaspard, II
2002/0004736 A1 1/2002 Roundtree et al.
2002/0010581 A1 1/2002 Euler et al.
2002/0010584 A1 1/2002 Schultz et al.
2002/0010726 A1 1/2002 Rogson
2002/0010798 A1 1/2002 Ben-Shaul et al.
2002/0013707 A1 1/2002 Shaw et al.
2002/0013784 A1 1/2002 Swanson
2002/0013852 A1 1/2002 Janik
2002/0015024 A1 2/2002 Westerman et al.
2002/0015064 A1 2/2002 Robotham et al.
2002/0021278 A1 2/2002 Hinckley et al.
2002/0026315 A1 2/2002 Miranda
2002/0026456 A1 2/2002 Bradford
2002/0031254 A1 3/2002 Lantrip et al.
2002/0031262 A1 3/2002 Imagawa et al.
2002/0032048 A1 3/2002 Kitao et al.
2002/0032564 A1 3/2002 Ehsani et al.
2002/0032591 A1 3/2002 Mahaffy et al.
2002/0032751 A1 3/2002 Bharadwaj
2002/0035467 A1 3/2002 Morimoto et al.
2002/0035469 A1 3/2002 Holzapfel
2002/0035474 A1 3/2002 Alpdemir
2002/0040297 A1 4/2002 Tsiao et al.
2002/0040359 A1 4/2002 Green et al.
2002/0042707 A1 4/2002 Zhao et al.
2002/0045438 A1 4/2002 Tagawa et al.
2002/0045961 A1 4/2002 Gibbs et al.
2002/0046025 A1 4/2002 Hain
2002/0046315 A1 4/2002 Miller et al.
2002/0052730 A1 5/2002 Nakao
2002/0052740 A1 5/2002 Charlesworth et al.
2002/0052747 A1 5/2002 Sarukkai
2002/0052913 A1 5/2002 Yamada et al.
2002/0054094 A1 5/2002 Matsuda
2002/0055844 A1 5/2002 L'Esperance et al.
2002/0055934 A1 5/2002 Lipscomb et al.
2002/0059066 A1 5/2002 O'hagan
2002/0059068 A1 5/2002 Rose et al.
2002/0065659 A1 5/2002 Isono et al.
2002/0065797 A1 5/2002 Meidan et al.
2002/0067308 A1 6/2002 Robertson
2002/0069063 A1 6/2002 Buchner et al.
2002/0069220 A1 6/2002 Tran
2002/0072816 A1 6/2002 Shdema et al.
2002/0072908 A1 6/2002 Case et al.
2002/0072914 A1 6/2002 Alshawi et al.
2002/0077082 A1 6/2002 Cruickshank
2002/0077817 A1 6/2002 Atal
2002/0078041 A1 6/2002 Wu
2002/0080163 A1 6/2002 Morey
2002/0085037 A1 7/2002 Leavitt et al.
2002/0087508 A1 7/2002 Hull et al.
2002/0091511 A1 7/2002 Hellwig et al.
2002/0095286 A1 7/2002 Ross et al.
2002/0095290 A1 7/2002 Kahn et al.
2002/0099547 A1 7/2002 Chu et al.
2002/0099552 A1 7/2002 Rubin et al.
2002/0101447 A1 8/2002 Carro
2002/0103641 A1 8/2002 Kuo et al.
2002/0103644 A1 8/2002 Brocious et al.
2002/0103646 A1 8/2002 Kochanski et al.
2002/0107684 A1 8/2002 Gao
2002/0109709 A1 8/2002 Sagar
2002/0110248 A1 8/2002 Kovales et al.
2002/0111810 A1 8/2002 Khan et al.
2002/0116082 A1 8/2002 Gudorf
2002/0116171 A1 8/2002 Russell
2002/0116185 A1 8/2002 Cooper et al.
2002/0116189 A1 8/2002 Yeh et al.
2002/0116420 A1 8/2002 Allam et al.
2002/0120697 A1 8/2002 Generous et al.
2002/0120925 A1 8/2002 Logan
2002/0122053 A1 9/2002 Dutta et al.
2002/0123891 A1 9/2002 Epstein et al.
2002/0123894 A1 9/2002 Woodward
2002/0126097 A1 9/2002 Savolainen
2002/0128827 A1 9/2002 Bu et al.
2002/0128840 A1 9/2002 Hinde et al.
2002/0129057 A1 9/2002 Spielberg
2002/0133347 A1 9/2002 Schoneburg et al.
2002/0133348 A1 9/2002 Pearson et al.
2002/0133355 A1 9/2002 Ross et al.

(56) References Cited

U.S. PATENT DOCUMENTS

2002/0135565 A1 9/2002 Gordon et al.
2002/0135618 A1 9/2002 Maes et al.
2002/0138254 A1 9/2002 Isaka et al.
2002/0138265 A1 9/2002 Stevens et al.
2002/0138270 A1 9/2002 Bellegarda et al.
2002/0138616 A1 9/2002 Basson et al.
2002/0140679 A1 10/2002 Wen
2002/0143533 A1 10/2002 Lucas et al.
2002/0143542 A1 10/2002 Eide
2002/0143551 A1 10/2002 Sharma et al.
2002/0143826 A1 10/2002 Day et al.
2002/0151297 A1 10/2002 Remboski et al.
2002/0152045 A1 10/2002 Dowling et al.
2002/0152255 A1 10/2002 Smith et al.
2002/0154160 A1 10/2002 Hosokawa
2002/0161865 A1 10/2002 Nguyen
2002/0163544 A1 11/2002 Baker et al.
2002/0164000 A1 11/2002 Cohen et al.
2002/0165918 A1 11/2002 Bettis
2002/0167534 A1 11/2002 Burke
2002/0169592 A1 11/2002 Aityan
2002/0169605 A1 11/2002 Damiba et al.
2002/0173273 A1 11/2002 Spurgat et al.
2002/0173889 A1 11/2002 Odinak et al.
2002/0173961 A1 11/2002 Guerra
2002/0173962 A1 11/2002 Tang et al.
2002/0173966 A1 11/2002 Henton
2002/0177993 A1 11/2002 Veditz et al.
2002/0184027 A1 12/2002 Brittan et al.
2002/0184189 A1 12/2002 Hay et al.
2002/0189426 A1 12/2002 Hirade et al.
2002/0191029 A1 12/2002 Gillespie et al.
2002/0193996 A1 12/2002 Squibbs et al.
2002/0198714 A1 12/2002 Zhou
2002/0198715 A1 12/2002 Belrose
2003/0001881 A1 1/2003 Mannheimer et al.
2003/0002632 A1 1/2003 Bhogal et al.
2003/0005174 A1 1/2003 Coffman et al.
2003/0013483 A1 1/2003 Ausems et al.
2003/0016770 A1 1/2003 Trans et al.
2003/0020760 A1 1/2003 Takatsu et al.
2003/0026402 A1 2/2003 Clapper
2003/0028380 A1 2/2003 Freeland et al.
2003/0033153 A1 2/2003 Olson et al.
2003/0033214 A1 2/2003 Mikkelsen et al.
2003/0037073 A1 2/2003 Tokuda et al.
2003/0037254 A1 2/2003 Fischer et al.
2003/0040908 A1 2/2003 Yang et al.
2003/0046075 A1 3/2003 Stone
2003/0046401 A1 3/2003 Abbott et al.
2003/0046434 A1 3/2003 Flanagin et al.
2003/0050781 A1 3/2003 Tamura et al.
2003/0051136 A1 3/2003 Curtis et al.
2003/0055537 A1 3/2003 Odinak et al.
2003/0061317 A1 3/2003 Brown et al.
2003/0061570 A1 3/2003 Hatori et al.
2003/0063073 A1 4/2003 Geaghan et al.
2003/0074195 A1 4/2003 Bartosik et al.
2003/0074198 A1 4/2003 Sussman
2003/0074457 A1 4/2003 Kluth
2003/0076301 A1 4/2003 Tsuk et al.
2003/0078766 A1 4/2003 Appelt et al.
2003/0078779 A1 4/2003 Desai et al.
2003/0078780 A1 4/2003 Kochanski et al.
2003/0078969 A1 4/2003 Sprague et al.
2003/0079024 A1 4/2003 Hough et al.
2003/0079038 A1 4/2003 Robbin et al.
2003/0080991 A1 5/2003 Crow et al.
2003/0083113 A1 5/2003 Chua et al.
2003/0083878 A1 5/2003 Lee et al.
2003/0083884 A1 5/2003 Odinak et al.
2003/0084350 A1 5/2003 Eibach et al.
2003/0085870 A1 5/2003 Hinckley
2003/0086699 A1 5/2003 Benyamin et al.
2003/0088414 A1 5/2003 Huang et al.
2003/0088421 A1 5/2003 Maes et al.
2003/0090467 A1 5/2003 Hohl et al.
2003/0090474 A1 5/2003 Schaefer
2003/0095096 A1 5/2003 Robbin et al.
2003/0097210 A1 5/2003 Horst et al.
2003/0097379 A1 5/2003 Ireton
2003/0097408 A1 5/2003 Kageyama et al.
2003/0098892 A1 5/2003 Hiipakka
2003/0099335 A1 5/2003 Tanaka et al.
2003/0101045 A1 5/2003 Moffatt et al.
2003/0101054 A1 5/2003 Davis et al.
2003/0115060 A1 6/2003 Junqua et al.
2003/0115064 A1 6/2003 Gusler et al.
2003/0115186 A1 6/2003 Wilkinson et al.
2003/0115552 A1 6/2003 Jahnke et al.
2003/0117365 A1 6/2003 Shteyn
2003/0120494 A1 6/2003 Jost et al.
2003/0122787 A1 7/2003 Zimmerman et al.
2003/0125927 A1 7/2003 Seme
2003/0125955 A1 7/2003 Arnold et al.
2003/0126559 A1 7/2003 Fuhrmann
2003/0128819 A1 7/2003 Lee et al.
2003/0133694 A1 7/2003 Yeo
2003/0134678 A1 7/2003 Tanaka
2003/0135740 A1 7/2003 Talmor et al.
2003/0140088 A1 7/2003 Robinson et al.
2003/0144846 A1 7/2003 Denenberge et al.
2003/0145285 A1 7/2003 Miyahira et al.
2003/0147512 A1 8/2003 Abburi
2003/0149557 A1 8/2003 Cox et al.
2003/0149567 A1 8/2003 Schmitz et al.
2003/0149978 A1 8/2003 Plotnick
2003/0152203 A1 8/2003 Berger et al.
2003/0152894 A1 8/2003 Townshend
2003/0154081 A1 8/2003 Chu et al.
2003/0154116 A1 8/2003 Lofton
2003/0157968 A1 8/2003 Boman et al.
2003/0158735 A1 8/2003 Yamada et al.
2003/0158737 A1 8/2003 Csicsatka
2003/0160702 A1 8/2003 Tanaka
2003/0160830 A1 8/2003 Degross
2003/0163316 A1 8/2003 Addison et al.
2003/0164848 A1 9/2003 Dutta et al.
2003/0167167 A1 9/2003 Gong
2003/0167318 A1 9/2003 Robbin et al.
2003/0167335 A1 9/2003 Alexander
2003/0171928 A1 9/2003 Falcon et al.
2003/0171936 A1 9/2003 Sall et al.
2003/0174830 A1 9/2003 Boyer et al.
2003/0177046 A1 9/2003 Socha-Leialoha et al.
2003/0179222 A1 9/2003 Noma et al.
2003/0182115 A1 9/2003 Malayath et al.
2003/0182131 A1 9/2003 Arnold et al.
2003/0187655 A1 10/2003 Dunsmuir
2003/0187844 A1 10/2003 Li et al.
2003/0187925 A1 10/2003 Inala et al.
2003/0188005 A1 10/2003 Yoneda et al.
2003/0188192 A1 10/2003 Tang et al.
2003/0190074 A1 10/2003 Loudon et al.
2003/0191645 A1 10/2003 Zhou
2003/0193481 A1 10/2003 Sokolsky
2003/0194080 A1 10/2003 Michaelis et al.
2003/0195741 A1 10/2003 Mani et al.
2003/0197736 A1 10/2003 Murphy
2003/0197744 A1 10/2003 Irvine
2003/0200858 A1 10/2003 Xie
2003/0204392 A1 10/2003 Finnigan et al.
2003/0204492 A1 10/2003 Wolf et al.
2003/0208756 A1 11/2003 Macrae et al.
2003/0210266 A1 11/2003 Cragun et al.
2003/0212961 A1 11/2003 Soin et al.
2003/0214519 A1 11/2003 Smith et al.
2003/0224760 A1 12/2003 Day
2003/0228863 A1 12/2003 Vander Veen et al.
2003/0228909 A1 12/2003 Tanaka et al.
2003/0229490 A1 12/2003 Etter
2003/0229616 A1 12/2003 Wong
2003/0233230 A1 12/2003 Ammicht et al.
2003/0233237 A1 12/2003 Garside et al.

(56) References Cited

U.S. PATENT DOCUMENTS

2003/0233240 A1 12/2003 Kaatrasalo
2003/0234824 A1 12/2003 Litwiller
2003/0236663 A1 12/2003 Dimitrova et al.
2004/0001396 A1 1/2004 Keller et al.
2004/0006467 A1 1/2004 Anisimovich et al.
2004/0010484 A1 1/2004 Foulger et al.
2004/0012556 A1 1/2004 Yong et al.
2004/0013252 A1 1/2004 Craner
2004/0021676 A1 2/2004 Chen et al.
2004/0022369 A1 2/2004 Vitikainen et al.
2004/0022373 A1 2/2004 Suder et al.
2004/0023643 A1 2/2004 Vander Veen et al.
2004/0030556 A1 2/2004 Bennett
2004/0030559 A1 2/2004 Payne et al.
2004/0030996 A1 2/2004 Van Liempd et al.
2004/0036715 A1 2/2004 Warren
2004/0044516 A1 3/2004 Kennewick et al.
2004/0048627 A1 3/2004 Olvera-Hernandez
2004/0049391 A1 3/2004 Polanyi et al.
2004/0051729 A1 3/2004 Borden, IV
2004/0052338 A1 3/2004 Celi, Jr. et al.
2004/0054530 A1 3/2004 Davis et al.
2004/0054533 A1 3/2004 Bellegarda
2004/0054534 A1 3/2004 Junqua
2004/0054535 A1 3/2004 Mackie et al.
2004/0054541 A1 3/2004 Kryze et al.
2004/0054690 A1 3/2004 Hillerbrand et al.
2004/0055446 A1 3/2004 Robbin et al.
2004/0056899 A1 3/2004 Sinclair, II et al.
2004/0059577 A1 3/2004 Pickering
2004/0059790 A1 3/2004 Austin-Lane et al.
2004/0061717 A1 4/2004 Menon et al.
2004/0062367 A1 4/2004 Fellenstein et al.
2004/0064593 A1 4/2004 Sinclair et al.
2004/0069122 A1 4/2004 Wilson
2004/0070567 A1 4/2004 Longe et al.
2004/0070612 A1 4/2004 Sinclair et al.
2004/0073427 A1 4/2004 Moore
2004/0073428 A1 4/2004 Zlokarnik et al.
2004/0076086 A1 4/2004 Keller et al.
2004/0078382 A1 4/2004 Mercer et al.
2004/0085162 A1 5/2004 Agarwal et al.
2004/0085368 A1 5/2004 Johnson, Jr. et al.
2004/0086120 A1 5/2004 Akins, III et al.
2004/0093213 A1 5/2004 Conkie
2004/0093215 A1 5/2004 Gupta et al.
2004/0094018 A1 5/2004 Ueshima et al.
2004/0096105 A1 5/2004 Holtsberg
2004/0098250 A1 5/2004 Kimchi et al.
2004/0100479 A1 5/2004 Nakano et al.
2004/0106432 A1 6/2004 Kanamori et al.
2004/0107169 A1 6/2004 Lowe
2004/0111266 A1 6/2004 Coorman et al.
2004/0111332 A1 6/2004 Baar et al.
2004/0114731 A1 6/2004 Gillett et al.
2004/0122656 A1 6/2004 Abir
2004/0122664 A1 6/2004 Lorenzo et al.
2004/0124583 A1 7/2004 Landis
2004/0125088 A1 7/2004 Zimmerman et al.
2004/0125922 A1 7/2004 Specht
2004/0127198 A1 7/2004 Roskind et al.
2004/0127241 A1 7/2004 Shostak
2004/0128137 A1 7/2004 Bush et al.
2004/0133817 A1 7/2004 Choi
2004/0135701 A1 7/2004 Yasuda et al.
2004/0135774 A1 7/2004 La Monica
2004/0136510 A1 7/2004 Vander Veen
2004/0138869 A1 7/2004 Heinecke
2004/0138890 A1 7/2004 Ferrans et al.
2004/0145607 A1 7/2004 Alderson
2004/0153306 A1 8/2004 Tanner et al.
2004/0160419 A1 8/2004 Padgitt
2004/0162741 A1 8/2004 Flaxer et al.
2004/0174399 A1 9/2004 Wu et al.
2004/0174434 A1 9/2004 Walker et al.
2004/0176958 A1 9/2004 Salmenkaita et al.
2004/0177319 A1 9/2004 Horn
2004/0178994 A1 9/2004 Kairls, Jr.
2004/0183833 A1 9/2004 Chua
2004/0186713 A1 9/2004 Gomas et al.
2004/0186714 A1 9/2004 Baker
2004/0186777 A1 9/2004 Margiloff et al.
2004/0193398 A1 9/2004 Chu et al.
2004/0193420 A1 9/2004 Kennewick et al.
2004/0193421 A1 9/2004 Blass
2004/0193426 A1 9/2004 Maddux et al.
2004/0196256 A1 10/2004 Wobbrock et al.
2004/0198436 A1 10/2004 Alden
2004/0199375 A1 10/2004 Ehsani et al.
2004/0199387 A1 10/2004 Wang et al.
2004/0199663 A1 10/2004 Horvitz et al.
2004/0203520 A1 10/2004 Schirtzinger et al.
2004/0205151 A1 10/2004 Sprigg et al.
2004/0205671 A1 10/2004 Sukehiro et al.
2004/0208302 A1 10/2004 Urban et al.
2004/0210634 A1 10/2004 Ferrer et al.
2004/0213419 A1 10/2004 Varma et al.
2004/0215731 A1 10/2004 Tzann-en Szeto
2004/0216049 A1 10/2004 Lewis et al.
2004/0218451 A1 11/2004 Said et al.
2004/0220798 A1 11/2004 Chi et al.
2004/0223485 A1 11/2004 Arellano et al.
2004/0223599 A1 11/2004 Bear et al.
2004/0224638 A1 11/2004 Fadell et al.
2004/0225501 A1 11/2004 Cutaia et al.
2004/0225650 A1 11/2004 Cooper et al.
2004/0225746 A1 11/2004 Niell et al.
2004/0230637 A1 11/2004 Lecoueche et al.
2004/0236778 A1 11/2004 Junqua et al.
2004/0242286 A1 12/2004 Benco et al.
2004/0243412 A1 12/2004 Gupta et al.
2004/0243419 A1 12/2004 Wang
2004/0249629 A1 12/2004 Webster
2004/0249667 A1 12/2004 Oon
2004/0252119 A1 12/2004 Hunleth et al.
2004/0252604 A1 12/2004 Johnson et al.
2004/0252966 A1 12/2004 Holloway et al.
2004/0254791 A1 12/2004 Coifman et al.
2004/0254792 A1 12/2004 Busayapongchai et al.
2004/0257432 A1 12/2004 Girish et al.
2004/0259536 A1 12/2004 Keskar et al.
2004/0260438 A1 12/2004 Chernetsky et al.
2004/0261023 A1 12/2004 Bier
2004/0262051 A1 12/2004 Carro
2004/0263636 A1 12/2004 Cutler et al.
2004/0267825 A1 12/2004 Novak et al.
2004/0268253 A1 12/2004 Demello et al.
2004/0268262 A1 12/2004 Gupta et al.
2005/0002507 A1 1/2005 Timmins et al.
2005/0010409 A1 1/2005 Hull et al.
2005/0012723 A1 1/2005 Pallakoff
2005/0015254 A1 1/2005 Beaman
2005/0015772 A1 1/2005 Saare et al.
2005/0021424 A1 1/2005 Lewis et al.
2005/0022114 A1 1/2005 Shanahan et al.
2005/0024341 A1 2/2005 Gillespie et al.
2005/0024345 A1 2/2005 Eastty et al.
2005/0027385 A1 2/2005 Yueh
2005/0030175 A1 2/2005 Wolfe
2005/0031106 A1 2/2005 Henderson
2005/0033582 A1 2/2005 Gadd et al.
2005/0033771 A1 2/2005 Schmitter et al.
2005/0034164 A1 2/2005 Sano et al.
2005/0038657 A1 2/2005 Roth et al.
2005/0039141 A1 2/2005 Burke et al.
2005/0043946 A1 2/2005 Ueyama et al.
2005/0043949 A1 2/2005 Roth et al.
2005/0043974 A1 2/2005 Vassilev et al.
2005/0044569 A1 2/2005 Marcus
2005/0045373 A1 3/2005 Born
2005/0049880 A1 3/2005 Roth et al.
2005/0055212 A1 3/2005 Nagao
2005/0055403 A1 3/2005 Brittan
2005/0058438 A1 3/2005 Hayashi

(56) References Cited

U.S. PATENT DOCUMENTS

2005/0060155 A1 3/2005 Chu et al.
2005/0071165 A1 3/2005 Hofstader et al.
2005/0071332 A1 3/2005 Ortega et al.
2005/0071437 A1 3/2005 Bear et al.
2005/0074113 A1 4/2005 Mathew et al.
2005/0080613 A1 4/2005 Colledge et al.
2005/0080620 A1 4/2005 Rao et al.
2005/0080625 A1 4/2005 Bennett et al.
2005/0080632 A1 4/2005 Endo et al.
2005/0080780 A1 4/2005 Colledge et al.
2005/0086059 A1 4/2005 Bennett
2005/0086255 A1 4/2005 Schran et al.
2005/0086605 A1 4/2005 Ferrer et al.
2005/0091118 A1 4/2005 Fano
2005/0094475 A1 5/2005 Naoi
2005/0099398 A1 5/2005 Garside et al.
2005/0100214 A1 5/2005 Zhang et al.
2005/0102144 A1 5/2005 Rapoport
2005/0102614 A1 5/2005 Brockett et al.
2005/0102625 A1 5/2005 Lee et al.
2005/0105712 A1 5/2005 Williams et al.
2005/0108001 A1 5/2005 Aarskog
2005/0108017 A1 5/2005 Esser et al.
2005/0108074 A1 5/2005 Bloechl et al.
2005/0108338 A1 5/2005 Simske et al.
2005/0108344 A1 5/2005 Tafoya et al.
2005/0114124 A1 5/2005 Liu et al.
2005/0114140 A1 5/2005 Brackett et al.
2005/0114306 A1 5/2005 Shu et al.
2005/0119890 A1 6/2005 Hirose
2005/0119897 A1 6/2005 Bennett et al.
2005/0125216 A1 6/2005 Chitrapura et al.
2005/0125235 A1 6/2005 Lazay et al.
2005/0131951 A1 6/2005 Zhang et al.
2005/0132301 A1 6/2005 Ikeda
2005/0136949 A1 6/2005 Barnes, Jr.
2005/0138305 A1 6/2005 Zellner
2005/0140504 A1 6/2005 Marshall et al.
2005/0143972 A1 6/2005 Gopalakrishnan et al.
2005/0144003 A1 6/2005 Iso-Sipila
2005/0144070 A1 6/2005 Cheshire
2005/0144568 A1 6/2005 Gruen et al.
2005/0148356 A1 7/2005 Ferguson et al.
2005/0149214 A1 7/2005 Yoo et al.
2005/0149330 A1 7/2005 Katae
2005/0149332 A1 7/2005 Kuzunuki et al.
2005/0149510 A1 7/2005 Shafrir
2005/0152558 A1 7/2005 Van Tassel
2005/0152602 A1 7/2005 Chen et al.
2005/0154578 A1 7/2005 Tong et al.
2005/0154591 A1 7/2005 Lecoeuche
2005/0159939 A1 7/2005 Mohler et al.
2005/0162395 A1 7/2005 Unruh
2005/0165607 A1 7/2005 Di Fabbrizio et al.
2005/0166153 A1 7/2005 Eytchison et al.
2005/0171779 A1 8/2005 Joublin
2005/0177445 A1 8/2005 Church
2005/0181770 A1 8/2005 Helferich
2005/0182616 A1 8/2005 Kotipalli
2005/0182627 A1 8/2005 Tanaka et al.
2005/0182628 A1 8/2005 Choi
2005/0182629 A1 8/2005 Coorman et al.
2005/0182630 A1 8/2005 Miro et al.
2005/0182765 A1 8/2005 Liddy
2005/0187773 A1 8/2005 Filoche et al.
2005/0190970 A1 9/2005 Griffin
2005/0192801 A1 9/2005 Lewis et al.
2005/0195077 A1 9/2005 Mcculloch et al.
2005/0195429 A1 9/2005 Archbold
2005/0196733 A1 9/2005 Budra et al.
2005/0201572 A1 9/2005 Lindahl et al.
2005/0202854 A1 9/2005 Kortum et al.
2005/0203747 A1 9/2005 Lecoeuche
2005/0203782 A1 9/2005 Smith
2005/0203991 A1 9/2005 Kawamura et al.
2005/0209848 A1 9/2005 Ishii
2005/0210394 A1 9/2005 Crandall et al.
2005/0216331 A1 9/2005 Ahrens et al.
2005/0222843 A1 10/2005 Kahn et al.
2005/0222973 A1 10/2005 Kaiser
2005/0228665 A1 10/2005 Kobayashi et al.
2005/0234872 A1 10/2005 Torge et al.
2005/0245243 A1 11/2005 Zuniga
2005/0246350 A1 11/2005 Canaran
2005/0246365 A1 11/2005 Lowles et al.
2005/0246726 A1 11/2005 Labrou et al.
2005/0267738 A1 12/2005 Wilkinson et al.
2005/0267757 A1 12/2005 Iso-Sipila et al.
2005/0271216 A1 12/2005 Lashkari
2005/0273337 A1 12/2005 Erell et al.
2005/0273626 A1 12/2005 Pearson et al.
2005/0278297 A1 12/2005 Nelson
2005/0278643 A1 12/2005 Ukai et al.
2005/0278647 A1 12/2005 Leavitt et al.
2005/0283364 A1 12/2005 Longe et al.
2005/0283726 A1 12/2005 Lunati
2005/0283729 A1 12/2005 Morris et al.
2005/0288934 A1 12/2005 Omi
2005/0288936 A1 12/2005 Busayapongchai et al.
2005/0289463 A1 12/2005 Wu et al.
2006/0001652 A1 1/2006 Chiu et al.
2006/0004570 A1 1/2006 Ju et al.
2006/0004744 A1 1/2006 Nevidomski et al.
2006/0007174 A1 1/2006 Shen
2006/0009973 A1 1/2006 Nguyen et al.
2006/0013414 A1 1/2006 Shih
2006/0015341 A1 1/2006 Baker
2006/0015819 A1 1/2006 Hawkins et al.
2006/0018446 A1 1/2006 Schmandt et al.
2006/0018492 A1 1/2006 Chiu et al.
2006/0020890 A1 1/2006 Kroll et al.
2006/0025999 A1 2/2006 Feng et al.
2006/0026233 A1 2/2006 Tenembaum et al.
2006/0026521 A1 2/2006 Hotelling et al.
2006/0026535 A1 2/2006 Hotelling et al.
2006/0026536 A1 2/2006 Hotelling et al.
2006/0033724 A1 2/2006 Chaudhri et al.
2006/0035632 A1 2/2006 Sorvari et al.
2006/0036946 A1 2/2006 Radtke et al.
2006/0041424 A1 2/2006 Todhunter et al.
2006/0041431 A1 2/2006 Maes
2006/0047632 A1 3/2006 Zhang
2006/0050865 A1 3/2006 Kortum et al.
2006/0052141 A1 3/2006 Suzuki
2006/0053365 A1 3/2006 Hollander et al.
2006/0053379 A1 3/2006 Henderson et al.
2006/0053387 A1 3/2006 Ording
2006/0058999 A1 3/2006 Barker et al.
2006/0059437 A1 3/2006 Conklin
2006/0060762 A1 3/2006 Chan et al.
2006/0061488 A1 3/2006 Dunton
2006/0067535 A1 3/2006 Culbert et al.
2006/0067536 A1 3/2006 Culbert et al.
2006/0069567 A1 3/2006 Tischer et al.
2006/0069664 A1 3/2006 Ling et al.
2006/0072248 A1 4/2006 Watanabe et al.
2006/0072716 A1 4/2006 Pham
2006/0074628 A1 4/2006 Elbaz et al.
2006/0074660 A1 4/2006 Waters et al.
2006/0074674 A1 4/2006 Zhang et al.
2006/0074750 A1 4/2006 Clark et al.
2006/0074898 A1 4/2006 Gavalda et al.
2006/0077055 A1 4/2006 Basir
2006/0080098 A1 4/2006 Campbell
2006/0085187 A1 4/2006 Barquilla
2006/0085465 A1 4/2006 Nori et al.
2006/0085757 A1 4/2006 Andre et al.
2006/0095265 A1 5/2006 Chu et al.
2006/0095790 A1 5/2006 Nguyen et al.
2006/0095846 A1 5/2006 Nurmi
2006/0095848 A1 5/2006 Naik
2006/0097991 A1 5/2006 Hotelling et al.
2006/0100848 A1 5/2006 Cozzi et al.
2006/0100849 A1 5/2006 Chan

(56) References Cited

U.S. PATENT DOCUMENTS

2006/0100876 A1 5/2006 Nishizaki et al.
2006/0101354 A1 5/2006 Hashimoto et al.
2006/0103633 A1 5/2006 Gioeli
2006/0106592 A1 5/2006 Brockett et al.
2006/0106594 A1 5/2006 Brockett et al.
2006/0106595 A1 5/2006 Brockett et al.
2006/0111906 A1 5/2006 Cross et al.
2006/0111909 A1 5/2006 Maes et al.
2006/0116874 A1 6/2006 Samuelsson et al.
2006/0116877 A1 6/2006 Pickering et al.
2006/0117002 A1 6/2006 Swen
2006/0119582 A1 6/2006 Ng et al.
2006/0122834 A1 6/2006 Bennett
2006/0122836 A1 6/2006 Cross et al.
2006/0129929 A1 6/2006 Weber et al.
2006/0132812 A1 6/2006 Barnes et al.
2006/0136213 A1 6/2006 Hirose et al.
2006/0141990 A1 6/2006 Zak et al.
2006/0143007 A1 6/2006 Koh et al.
2006/0143576 A1 6/2006 Gupta et al.
2006/0148520 A1 7/2006 Baker et al.
2006/0150087 A1 7/2006 Cronenberger et al.
2006/0152496 A1 7/2006 Knaven
2006/0153040 A1 7/2006 Girish et al.
2006/0156252 A1 7/2006 Sheshagiri et al.
2006/0156307 A1 7/2006 Kunjithapatham et al.
2006/0161870 A1 7/2006 Hotelling et al.
2006/0161871 A1 7/2006 Hotelling et al.
2006/0161872 A1 7/2006 Rytivaara et al.
2006/0165105 A1 7/2006 Shenfield et al.
2006/0167676 A1 7/2006 Plumb
2006/0168150 A1 7/2006 Naik et al.
2006/0168507 A1 7/2006 Hansen
2006/0168539 A1 7/2006 Hawkins et al.
2006/0172720 A1 8/2006 Islam et al.
2006/0174207 A1 8/2006 Deshpande
2006/0178868 A1 8/2006 Billerey-Mosier
2006/0181519 A1 8/2006 Vernier et al.
2006/0183466 A1 8/2006 Lee et al.
2006/0184886 A1 8/2006 Chung et al.
2006/0187073 A1 8/2006 Lin et al.
2006/0190269 A1 8/2006 Tessel et al.
2006/0190577 A1 8/2006 Yamada
2006/0193518 A1 8/2006 Dong
2006/0195206 A1 8/2006 Moon et al.
2006/0195323 A1 8/2006 Monne et al.
2006/0197753 A1 9/2006 Hotelling
2006/0197755 A1 9/2006 Bawany
2006/0200253 A1 9/2006 Hoffberg et al.
2006/0200342 A1 9/2006 Corston-Oliver et al.
2006/0200347 A1 9/2006 Kim et al.
2006/0205432 A1 9/2006 Hawkins et al.
2006/0206454 A1 9/2006 Forstall et al.
2006/0212415 A1 9/2006 Backer et al.
2006/0217967 A1 9/2006 Goertzen et al.
2006/0221738 A1 10/2006 Park et al.
2006/0221788 A1 10/2006 Lindahl et al.
2006/0224570 A1 10/2006 Quiroga et al.
2006/0229802 A1 10/2006 Vertelney et al.
2006/0229870 A1 10/2006 Kobal
2006/0229876 A1 10/2006 Aaron et al.
2006/0230410 A1 10/2006 Kurganov et al.
2006/0234680 A1 10/2006 Doulton
2006/0235550 A1 10/2006 Csicsatka et al.
2006/0235690 A1 10/2006 Tomasic et al.
2006/0235700 A1 10/2006 Wong et al.
2006/0235841 A1 10/2006 Betz et al.
2006/0236262 A1 10/2006 Bathiche et al.
2006/0239419 A1 10/2006 Joseph et al.
2006/0239471 A1 10/2006 Mao et al.
2006/0240866 A1 10/2006 Eilts et al.
2006/0242190 A1 10/2006 Wnek
2006/0246955 A1 11/2006 Nirhamo et al.
2006/0247931 A1 11/2006 Caskey et al.
2006/0252457 A1 11/2006 Schrager
2006/0253210 A1 11/2006 Rosenberg
2006/0253787 A1 11/2006 Fogg
2006/0256934 A1 11/2006 Mazor
2006/0262876 A1 11/2006 LaDue
2006/0265208 A1 11/2006 Assadollahi
2006/0265503 A1 11/2006 Jones et al.
2006/0265648 A1 11/2006 Rainisto et al.
2006/0271627 A1 11/2006 Szczepanek
2006/0274051 A1 12/2006 Longe et al.
2006/0274905 A1 12/2006 Lindahl et al.
2006/0277058 A1 12/2006 J''maev et al.
2006/0282264 A1 12/2006 Denny et al.
2006/0282415 A1 12/2006 Shibata et al.
2006/0286527 A1 12/2006 Morel
2006/0288024 A1 12/2006 Braica
2006/0291666 A1 12/2006 Ball et al.
2006/0293876 A1 12/2006 Kamatani et al.
2006/0293880 A1 12/2006 Elshishiny et al.
2006/0293886 A1 12/2006 Odell et al.
2007/0003026 A1 1/2007 Hodge et al.
2007/0004451 A1 1/2007 Anderson
2007/0005849 A1 1/2007 Oliver
2007/0006098 A1 1/2007 Krumm et al.
2007/0011154 A1 1/2007 Musgrove et al.
2007/0016563 A1 1/2007 Omoigui
2007/0016865 A1 1/2007 Johnson et al.
2007/0021956 A1 1/2007 Qu et al.
2007/0022380 A1 1/2007 Swartz et al.
2007/0025704 A1 2/2007 Tsukazaki et al.
2007/0026852 A1 2/2007 Logan et al.
2007/0027732 A1 2/2007 Hudgens
2007/0027845 A1 2/2007 Dettinger et al.
2007/0028009 A1 2/2007 Robbin et al.
2007/0032247 A1 2/2007 Shaffer et al.
2007/0033003 A1 2/2007 Morris
2007/0033026 A1 2/2007 Bartosik et al.
2007/0033261 A1 2/2007 Wagner et al.
2007/0036117 A1 2/2007 Taube et al.
2007/0036286 A1 2/2007 Champlin et al.
2007/0038436 A1 2/2007 Cristoe et al.
2007/0038609 A1 2/2007 Wu
2007/0040813 A1 2/2007 Kushler et al.
2007/0041361 A1 2/2007 Iso-Sipila
2007/0043568 A1 2/2007 Dhanakshirur et al.
2007/0044038 A1 2/2007 Horentrup et al.
2007/0046641 A1 3/2007 Lim
2007/0047719 A1 3/2007 Dhawan et al.
2007/0050184 A1 3/2007 Drucker et al.
2007/0050191 A1 3/2007 Weider et al.
2007/0050393 A1 3/2007 Vogel et al.
2007/0050712 A1 3/2007 Hull et al.
2007/0052586 A1 3/2007 Horstemeyer
2007/0055493 A1 3/2007 Lee
2007/0055508 A1 3/2007 Zhao et al.
2007/0055514 A1 3/2007 Beattie et al.
2007/0055525 A1 3/2007 Kennewick et al.
2007/0055529 A1 3/2007 Kanevsky et al.
2007/0058832 A1 3/2007 Hug et al.
2007/0060107 A1 3/2007 Day
2007/0061487 A1 3/2007 Moore et al.
2007/0061712 A1 3/2007 Bodin et al.
2007/0061754 A1 3/2007 Ardhanari et al.
2007/0067173 A1 3/2007 Bellegarda
2007/0067272 A1 3/2007 Flynt et al.
2007/0073540 A1 3/2007 Hirakawa et al.
2007/0073541 A1 3/2007 Tian
2007/0073745 A1 3/2007 Scott et al.
2007/0075965 A1 4/2007 Huppi et al.
2007/0079027 A1 4/2007 Marriott et al.
2007/0080936 A1 4/2007 Tsuk et al.
2007/0083467 A1 4/2007 Lindahl et al.
2007/0083623 A1 4/2007 Nishimura et al.
2007/0088556 A1 4/2007 Andrew
2007/0089132 A1 4/2007 Qureshey et al.
2007/0089135 A1 4/2007 Qureshey et al.
2007/0093277 A1 4/2007 Cavacuiti et al.
2007/0094026 A1 4/2007 Ativanichayaphong et al.
2007/0098195 A1 5/2007 Holmes
2007/0100206 A1 5/2007 Lin et al.

(56) References Cited

U.S. PATENT DOCUMENTS

2007/0100602 A1 5/2007 Kim
2007/0100619 A1 5/2007 Purho et al.
2007/0100635 A1 5/2007 Mahajan et al.
2007/0100709 A1 5/2007 Lee et al.
2007/0100790 A1 5/2007 Cheyer et al.
2007/0100883 A1 5/2007 Rose et al.
2007/0106512 A1 5/2007 Acero et al.
2007/0106513 A1 5/2007 Boillot et al.
2007/0106674 A1 5/2007 Agrawal et al.
2007/0116195 A1 5/2007 Thompson et al.
2007/0118377 A1 5/2007 Badino et al.
2007/0118378 A1 5/2007 Skuratovsky
2007/0121846 A1 5/2007 Altberg et al.
2007/0124149 A1 5/2007 Shen et al.
2007/0124289 A1 5/2007 Imielinski
2007/0124676 A1 5/2007 Amundsen et al.
2007/0127888 A1 6/2007 Hayashi et al.
2007/0128777 A1 6/2007 Yin et al.
2007/0129059 A1 6/2007 Nadarajah et al.
2007/0130014 A1 6/2007 Altberg et al.
2007/0130128 A1 6/2007 Garg et al.
2007/0132738 A1 6/2007 Lowles et al.
2007/0135949 A1 6/2007 Snover et al.
2007/0136064 A1 6/2007 Carroll
2007/0136778 A1 6/2007 Birger et al.
2007/0143163 A1 6/2007 Weiss et al.
2007/0143376 A1 6/2007 McIntosh
2007/0149252 A1 6/2007 Jobs et al.
2007/0150842 A1 6/2007 Chaudhri et al.
2007/0152978 A1 7/2007 Kocienda et al.
2007/0152980 A1 7/2007 Kocienda et al.
2007/0155346 A1 7/2007 Mijatovic et al.
2007/0156410 A1 7/2007 Stohr et al.
2007/0156627 A1 7/2007 D'Alicandro
2007/0157089 A1 7/2007 Van Os et al.
2007/0157268 A1 7/2007 Girish et al.
2007/0162296 A1 7/2007 Altberg et al.
2007/0162414 A1 7/2007 Horowitz et al.
2007/0168922 A1 7/2007 Kaiser et al.
2007/0173233 A1 7/2007 Vander Veen et al.
2007/0173267 A1 7/2007 Klassen et al.
2007/0174188 A1 7/2007 Fish
2007/0174396 A1 7/2007 Kumar et al.
2007/0179776 A1 8/2007 Segond et al.
2007/0179778 A1 8/2007 Gong et al.
2007/0180383 A1 8/2007 Naik
2007/0182595 A1 8/2007 Ghasabian
2007/0185551 A1 8/2007 Meadows et al.
2007/0185754 A1 8/2007 Schmidt
2007/0185831 A1 8/2007 Churcher
2007/0185917 A1 8/2007 Prahlad et al.
2007/0188901 A1 8/2007 Heckerman et al.
2007/0192027 A1 8/2007 Lee et al.
2007/0192105 A1 8/2007 Neeracher et al.
2007/0192293 A1 8/2007 Swen
2007/0192403 A1 8/2007 Heine et al.
2007/0192744 A1 8/2007 Reponen
2007/0198269 A1 8/2007 Braho et al.
2007/0198273 A1 8/2007 Hennecke
2007/0198566 A1 8/2007 Sustik
2007/0203955 A1 8/2007 Pomerantz
2007/0207785 A1 9/2007 Chatterjee et al.
2007/0208555 A1 9/2007 Blass et al.
2007/0208569 A1 9/2007 Subramanian et al.
2007/0208579 A1 9/2007 Peterson
2007/0208726 A1 9/2007 Krishnaprasad et al.
2007/0211071 A1 9/2007 Slotznick et al.
2007/0213099 A1 9/2007 Bast
2007/0213857 A1 9/2007 Bodin et al.
2007/0213984 A1 9/2007 Ativanichayaphong et al.
2007/0214122 A1 9/2007 Bala
2007/0219777 A1 9/2007 Chu et al.
2007/0219803 A1 9/2007 Chiu et al.
2007/0219983 A1 9/2007 Fish
2007/0225980 A1 9/2007 Sumita
2007/0225984 A1 9/2007 Milstein et al.
2007/0226652 A1 9/2007 Kikuchi et al.
2007/0229323 A1 10/2007 Plachta et al.
2007/0230729 A1 10/2007 Naylor et al.
2007/0233490 A1 10/2007 Yao
2007/0233497 A1 10/2007 Paek et al.
2007/0233692 A1 10/2007 Lisa et al.
2007/0233725 A1 10/2007 Michmerhuizen et al.
2007/0238488 A1 10/2007 Scott
2007/0238489 A1 10/2007 Scott
2007/0238520 A1 10/2007 Kacmarcik
2007/0239429 A1 10/2007 Johnson et al.
2007/0240043 A1 10/2007 Fux et al.
2007/0240044 A1 10/2007 Fux et al.
2007/0240045 A1 10/2007 Fux et al.
2007/0244702 A1 10/2007 Kahn et al.
2007/0247441 A1 10/2007 Kim et al.
2007/0255435 A1 11/2007 Cohen et al.
2007/0255979 A1 11/2007 Deily et al.
2007/0257890 A1 11/2007 Hotelling et al.
2007/0258642 A1 11/2007 Thota
2007/0260460 A1 11/2007 Hyatt
2007/0260595 A1 11/2007 Beatty et al.
2007/0260822 A1 11/2007 Adams
2007/0261080 A1 11/2007 Saetti
2007/0265831 A1 11/2007 Dinur et al.
2007/0265847 A1 11/2007 Ross et al.
2007/0271104 A1 11/2007 McKay
2007/0271510 A1 11/2007 Grigoriu et al.
2007/0274468 A1 11/2007 Cai
2007/0276651 A1 11/2007 Bliss et al.
2007/0276714 A1 11/2007 Beringer
2007/0276810 A1 11/2007 Rosen
2007/0277088 A1 11/2007 Bodin et al.
2007/0282595 A1 12/2007 Tunning et al.
2007/0285958 A1 12/2007 Platchta et al.
2007/0286363 A1 12/2007 Burg et al.
2007/0288241 A1 12/2007 Cross et al.
2007/0288449 A1 12/2007 Datta et al.
2007/0291108 A1 12/2007 Huber et al.
2007/0294077 A1 12/2007 Narayanan et al.
2007/0294263 A1 12/2007 Punj et al.
2007/0299664 A1 12/2007 Peters et al.
2007/0299831 A1 12/2007 Williams et al.
2007/0300140 A1 12/2007 Makela et al.
2008/0010355 A1 1/2008 Vieri et al.
2008/0012950 A1 1/2008 Lee et al.
2008/0013751 A1 1/2008 Hiselius
2008/0015864 A1 1/2008 Ross et al.
2008/0016575 A1 1/2008 Vincent et al.
2008/0021708 A1 1/2008 Bennett et al.
2008/0022208 A1 1/2008 Morse
2008/0031475 A1 2/2008 Goldstein
2008/0034032 A1 2/2008 Healey et al.
2008/0034044 A1 2/2008 Bhakta et al.
2008/0036743 A1 2/2008 Westerman et al.
2008/0040339 A1 2/2008 Zhou et al.
2008/0042970 A1 2/2008 Liang et al.
2008/0043936 A1 2/2008 Liebermann
2008/0043943 A1 2/2008 Sipher et al.
2008/0046239 A1 2/2008 Boo
2008/0046422 A1 2/2008 Lee et al.
2008/0046820 A1 2/2008 Lee et al.
2008/0046948 A1 2/2008 Verosub
2008/0048908 A1 2/2008 Sato
2008/0052063 A1 2/2008 Bennett et al.
2008/0052073 A1 2/2008 Goto et al.
2008/0052077 A1 2/2008 Bennett et al.
2008/0056459 A1 3/2008 Vallier et al.
2008/0056579 A1 3/2008 Guha
2008/0057922 A1 3/2008 Kokes et al.
2008/0059190 A1 3/2008 Chu et al.
2008/0059200 A1 3/2008 Puli
2008/0059876 A1 3/2008 Hantler et al.
2008/0062141 A1 3/2008 Chaudhri
2008/0065382 A1 3/2008 Gerl et al.
2008/0065387 A1 3/2008 Cross et al.
2008/0071529 A1 3/2008 Silverman et al.
2008/0071544 A1 3/2008 Beaufays et al.

(56) References Cited

U.S. PATENT DOCUMENTS

2008/0075296 A1 3/2008 Lindahl et al.
2008/0076972 A1 3/2008 Dorogusker et al.
2008/0077310 A1 3/2008 Murlidar et al.
2008/0077384 A1 3/2008 Agapi et al.
2008/0077386 A1 3/2008 Gao et al.
2008/0077391 A1 3/2008 Chino et al.
2008/0077393 A1 3/2008 Gao et al.
2008/0077406 A1 3/2008 Ganong
2008/0077859 A1 3/2008 Schabes et al.
2008/0079566 A1 4/2008 Singh et al.
2008/0082332 A1 4/2008 Mallett et al.
2008/0082338 A1 4/2008 O''Neil et al.
2008/0082390 A1 4/2008 Hawkins et al.
2008/0082576 A1 4/2008 Bodin et al.
2008/0082651 A1 4/2008 Singh et al.
2008/0084974 A1 4/2008 Dhanakshirur
2008/0091406 A1 4/2008 Baldwin et al.
2008/0091426 A1 4/2008 Rempel et al.
2008/0091443 A1 4/2008 Strope et al.
2008/0096531 A1 4/2008 Mcquaide et al.
2008/0096726 A1 4/2008 Riley et al.
2008/0097937 A1 4/2008 Hadjarian
2008/0098302 A1 4/2008 Roose
2008/0098480 A1 4/2008 Henry et al.
2008/0100579 A1 5/2008 Robinson et al.
2008/0101584 A1 5/2008 Gray et al.
2008/0109222 A1 5/2008 Liu
2008/0109402 A1 5/2008 Wang et al.
2008/0114480 A1 5/2008 Harb
2008/0114598 A1 5/2008 Prieto et al.
2008/0114841 A1 5/2008 Lambert
2008/0118143 A1 5/2008 Gordon et al.
2008/0120102 A1 5/2008 Rao
2008/0120112 A1 5/2008 Jordan et al.
2008/0120342 A1 5/2008 Reed et al.
2008/0122796 A1 5/2008 Jobs et al.
2008/0126077 A1 5/2008 Thorn
2008/0126091 A1 5/2008 Clark et al.
2008/0126093 A1 5/2008 Sivadas
2008/0126100 A1 5/2008 Grost et al.
2008/0129520 A1 6/2008 Lee
2008/0130867 A1 6/2008 Bowen
2008/0131006 A1 6/2008 Oliver
2008/0132221 A1 6/2008 Willey et al.
2008/0133215 A1 6/2008 Sarukkai
2008/0133228 A1 6/2008 Rao
2008/0133241 A1 6/2008 Baker et al.
2008/0133956 A1 6/2008 Fadell
2008/0140413 A1 6/2008 Millman et al.
2008/0140416 A1 6/2008 Shostak
2008/0140652 A1 6/2008 Millman et al.
2008/0140657 A1 6/2008 Azvine et al.
2008/0141125 A1 6/2008 Ghassabian et al.
2008/0141180 A1 6/2008 Reed et al.
2008/0141182 A1 6/2008 Barsness et al.
2008/0146245 A1 6/2008 Appaji
2008/0146290 A1 6/2008 Sreeram et al.
2008/0147408 A1 6/2008 Da Palma et al.
2008/0147411 A1 6/2008 Dames et al.
2008/0147874 A1 6/2008 Yoneda et al.
2008/0150900 A1 6/2008 Han
2008/0154600 A1 6/2008 Tian et al.
2008/0154612 A1 6/2008 Evermann et al.
2008/0154828 A1 6/2008 Antebi et al.
2008/0157867 A1 7/2008 Krah
2008/0163119 A1 7/2008 Kim et al.
2008/0163131 A1 7/2008 Hirai et al.
2008/0165144 A1 7/2008 Forstall et al.
2008/0165980 A1 7/2008 Pavlovic et al.
2008/0165994 A1 7/2008 Caren et al.
2008/0167013 A1 7/2008 Novick et al.
2008/0167858 A1 7/2008 Christie et al.
2008/0167876 A1 7/2008 Bakis et al.
2008/0168366 A1 7/2008 Kocienda et al.
2008/0183473 A1 7/2008 Nagano et al.
2008/0189099 A1 8/2008 Friedman et al.
2008/0189106 A1 8/2008 Low et al.
2008/0189110 A1 8/2008 Freeman et al.
2008/0189114 A1 8/2008 Fail et al.
2008/0189606 A1 8/2008 Rybak
2008/0195312 A1 8/2008 Aaron et al.
2008/0195601 A1 8/2008 Ntoulas et al.
2008/0195630 A1 8/2008 Exartier et al.
2008/0195940 A1 8/2008 Gail et al.
2008/0200142 A1 8/2008 Abdel-Kader et al.
2008/0201306 A1 8/2008 Cooper et al.
2008/0201375 A1 8/2008 Khedouri et al.
2008/0204379 A1 8/2008 Perez-Noguera
2008/0207176 A1 8/2008 Brackbill et al.
2008/0208585 A1 8/2008 Ativanichayaphong et al.
2008/0208587 A1 8/2008 Ben-David et al.
2008/0212796 A1 9/2008 Denda
2008/0219641 A1 9/2008 Sandrew et al.
2008/0221866 A1 9/2008 Katragadda et al.
2008/0221879 A1 9/2008 Cerra et al.
2008/0221880 A1 9/2008 Cerra et al.
2008/0221889 A1 9/2008 Cerra et al.
2008/0221903 A1 9/2008 Kanevsky et al.
2008/0222118 A1 9/2008 Scian et al.
2008/0228463 A1 9/2008 Mori et al.
2008/0228485 A1 9/2008 Owen
2008/0228490 A1 9/2008 Fischer et al.
2008/0228495 A1 9/2008 Cross et al.
2008/0228496 A1 9/2008 Yu et al.
2008/0228928 A1 9/2008 Donelli et al.
2008/0229185 A1 9/2008 Lynch
2008/0229218 A1 9/2008 Maeng
2008/0235017 A1 9/2008 Satomura et al.
2008/0235024 A1 9/2008 Goldberg et al.
2008/0235027 A1 9/2008 Cross
2008/0240569 A1 10/2008 Tonouchi
2008/0242280 A1 10/2008 Shapiro et al.
2008/0244390 A1 10/2008 Fux et al.
2008/0244446 A1 10/2008 Lefevre et al.
2008/0247519 A1 10/2008 Abella et al.
2008/0248797 A1 10/2008 Freeman et al.
2008/0249770 A1 10/2008 Kim et al.
2008/0253577 A1 10/2008 Eppolito
2008/0255837 A1 10/2008 Kahn et al.
2008/0255845 A1 10/2008 Bennett
2008/0255972 A1 10/2008 Ulrich et al.
2008/0256613 A1 10/2008 Grover
2008/0259022 A1 10/2008 Mansfield et al.
2008/0262838 A1 10/2008 Nurminen et al.
2008/0262846 A1 10/2008 Burns et al.
2008/0270118 A1 10/2008 Kuo et al.
2008/0270138 A1 10/2008 Knight et al.
2008/0270139 A1 10/2008 Shi et al.
2008/0270140 A1 10/2008 Hertz et al.
2008/0277473 A1 11/2008 Kotlarsky et al.
2008/0281510 A1 11/2008 Shahine
2008/0292112 A1 11/2008 Valenzuela et al.
2008/0294418 A1 11/2008 Cleary et al.
2008/0294517 A1 11/2008 Hill
2008/0294651 A1 11/2008 Masuyama et al.
2008/0294981 A1 11/2008 Balzano et al.
2008/0298766 A1 12/2008 Wen et al.
2008/0299523 A1 12/2008 Chai et al.
2008/0300871 A1 12/2008 Gilbert
2008/0300878 A1 12/2008 Bennett
2008/0306727 A1 12/2008 Thurmair et al.
2008/0312909 A1 12/2008 Hermansen et al.
2008/0313335 A1 12/2008 Jung et al.
2008/0316183 A1 12/2008 Westerman et al.
2008/0319753 A1 12/2008 Hancock
2008/0319763 A1 12/2008 Di Fabbrizio et al.
2009/0003115 A1 1/2009 Lindahl et al.
2009/0005012 A1 1/2009 Van Heugten
2009/0005891 A1 1/2009 Batson et al.
2009/0006096 A1 1/2009 Li et al.
2009/0006097 A1 1/2009 Etezadi et al.
2009/0006099 A1 1/2009 Sharpe et al.
2009/0006100 A1 1/2009 Badger et al.
2009/0006343 A1 1/2009 Platt et al.

(56) References Cited

U.S. PATENT DOCUMENTS

2009/0006345 A1 1/2009 Platt et al.
2009/0006488 A1 1/2009 Lindahl et al.
2009/0006671 A1 1/2009 Batson et al.
2009/0007001 A1 1/2009 Morin et al.
2009/0007188 A1 1/2009 Omernick
2009/0011709 A1 1/2009 Akasaka et al.
2009/0012748 A1 1/2009 Beish et al.
2009/0012775 A1 1/2009 El Hady et al.
2009/0018828 A1 1/2009 Nakadai et al.
2009/0018829 A1 1/2009 Kuperstein
2009/0018834 A1 1/2009 Cooper et al.
2009/0018835 A1 1/2009 Cooper et al.
2009/0018839 A1 1/2009 Cooper et al.
2009/0018840 A1 1/2009 Lutz et al.
2009/0022329 A1 1/2009 Mahowald
2009/0024595 A1 1/2009 Chen
2009/0027334 A1 1/2009 Foulk et al.
2009/0028435 A1 1/2009 Wu et al.
2009/0030685 A1 1/2009 Cerra et al.
2009/0030800 A1 1/2009 Grois
2009/0030978 A1 1/2009 Johnson et al.
2009/0043580 A1 2/2009 Mozer et al.
2009/0043583 A1 2/2009 Agapi et al.
2009/0043763 A1 2/2009 Peng
2009/0044094 A1 2/2009 Rapp et al.
2009/0048821 A1 2/2009 Yam et al.
2009/0048841 A1 2/2009 Pollet et al.
2009/0048845 A1 2/2009 Burckart et al.
2009/0049067 A1 2/2009 Murray
2009/0055168 A1 2/2009 Wu et al.
2009/0055175 A1 2/2009 Terrell et al.
2009/0055179 A1 2/2009 Cho et al.
2009/0055186 A1 2/2009 Lance et al.
2009/0055380 A1 2/2009 Peng et al.
2009/0055381 A1 2/2009 Wu et al.
2009/0055648 A1 2/2009 Kim et al.
2009/0058823 A1 3/2009 Kocienda
2009/0058860 A1 3/2009 Fong et al.
2009/0060351 A1 3/2009 Li et al.
2009/0060472 A1 3/2009 Bull et al.
2009/0063974 A1 3/2009 Bull et al.
2009/0064031 A1 3/2009 Bull et al.
2009/0070097 A1 3/2009 Wu et al.
2009/0070102 A1 3/2009 Maegawa
2009/0070109 A1 3/2009 Didcock et al.
2009/0070114 A1 3/2009 Staszak
2009/0074214 A1 3/2009 Bradford et al.
2009/0076792 A1 3/2009 Lawson-Tancred
2009/0076796 A1 3/2009 Daraselia
2009/0076798 A1 3/2009 Oh et al.
2009/0076819 A1 3/2009 Wouters et al.
2009/0076821 A1* 3/2009 Brenner .................. G06F 16/64 707/999.001
2009/0076825 A1 3/2009 Bradford et al.
2009/0077047 A1 3/2009 Cooper et al.
2009/0077165 A1 3/2009 Rhodes et al.
2009/0077464 A1 3/2009 Goldsmith et al.
2009/0079622 A1 3/2009 Seshadri et al.
2009/0083034 A1 3/2009 Hernandez et al.
2009/0083035 A1 3/2009 Huang et al.
2009/0083036 A1 3/2009 Zhao et al.
2009/0083037 A1 3/2009 Gleason et al.
2009/0083047 A1 3/2009 Lindahl et al.
2009/0089058 A1 4/2009 Bellegarda
2009/0091537 A1 4/2009 Huang et al.
2009/0092239 A1 4/2009 Macwan et al.
2009/0092260 A1 4/2009 Powers
2009/0092261 A1 4/2009 Bard
2009/0092262 A1 4/2009 Costa et al.
2009/0094029 A1 4/2009 Koch et al.
2009/0094033 A1 4/2009 Mozer et al.
2009/0097634 A1 4/2009 Nambiar et al.
2009/0097637 A1 4/2009 Boscher et al.
2009/0098903 A1 4/2009 Donaldson et al.
2009/0100049 A1 4/2009 Cao
2009/0100454 A1 4/2009 Weber
2009/0104898 A1 4/2009 Harris
2009/0106026 A1 4/2009 Ferrieux
2009/0106376 A1 4/2009 Tom et al.
2009/0106397 A1 4/2009 O'Keefe
2009/0112572 A1 4/2009 Thorn
2009/0112576 A1 4/2009 Jackson et al.
2009/0112592 A1 4/2009 Candelore et al.
2009/0112596 A1 4/2009 Syrdal et al.
2009/0112677 A1 4/2009 Rhett
2009/0112892 A1 4/2009 Cardie et al.
2009/0119587 A1 5/2009 Allen et al.
2009/0119588 A1 5/2009 Moore
2009/0123021 A1 5/2009 Jung et al.
2009/0123071 A1 5/2009 Iwasaki
2009/0125299 A1 5/2009 Wang
2009/0125477 A1 5/2009 Lu et al.
2009/0125602 A1 5/2009 Bhatia et al.
2009/0125813 A1 5/2009 Shen et al.
2009/0125947 A1 5/2009 Ibaraki
2009/0128505 A1 5/2009 Partridge et al.
2009/0132253 A1 5/2009 Bellegarda
2009/0132255 A1 5/2009 Lu
2009/0137286 A1 5/2009 Luke et al.
2009/0138263 A1 5/2009 Shozakai et al.
2009/0138430 A1 5/2009 Nambiar et al.
2009/0138736 A1 5/2009 Chin
2009/0138828 A1 5/2009 Schultz et al.
2009/0144036 A1 6/2009 Jorgensen et al.
2009/0144049 A1 6/2009 Haddad et al.
2009/0144428 A1 6/2009 Bowater et al.
2009/0144609 A1 6/2009 Liang et al.
2009/0146848 A1 6/2009 Ghassabian
2009/0150147 A1 6/2009 Jacoby et al.
2009/0150156 A1* 6/2009 Kennewick ........ G01C 21/3608 704/275
2009/0152349 A1 6/2009 Bonev et al.
2009/0153288 A1 6/2009 Hope et al.
2009/0154669 A1 6/2009 Wood et al.
2009/0157382 A1 6/2009 Bar
2009/0157384 A1 6/2009 Toutanova et al.
2009/0157401 A1 6/2009 Bennett
2009/0158200 A1 6/2009 Palahnuk et al.
2009/0158323 A1 6/2009 Bober et al.
2009/0158423 A1 6/2009 Orlassino et al.
2009/0160761 A1 6/2009 Moosavi et al.
2009/0160803 A1 6/2009 Hashimoto
2009/0163243 A1 6/2009 Barbera
2009/0164301 A1 6/2009 O'Sullivan et al.
2009/0164441 A1 6/2009 Cheyer
2009/0164655 A1 6/2009 Pettersson et al.
2009/0164937 A1 6/2009 Alviar et al.
2009/0167508 A1 7/2009 Fadell et al.
2009/0167509 A1 7/2009 Fadell et al.
2009/0171578 A1 7/2009 Kim et al.
2009/0171662 A1 7/2009 Huang et al.
2009/0171664 A1 7/2009 Kennewick et al.
2009/0172108 A1 7/2009 Singh
2009/0172542 A1 7/2009 Girish et al.
2009/0174667 A1 7/2009 Kocienda et al.
2009/0174677 A1 7/2009 Gehani et al.
2009/0177300 A1 7/2009 Lee
2009/0177461 A1 7/2009 Ehsani et al.
2009/0177966 A1 7/2009 Chaudhri
2009/0182445 A1 7/2009 Girish et al.
2009/0182549 A1 7/2009 Anisimovich et al.
2009/0182702 A1 7/2009 Miller
2009/0183070 A1 7/2009 Robbins
2009/0187402 A1 7/2009 Scholl
2009/0187577 A1 7/2009 Reznik et al.
2009/0187950 A1 7/2009 Nicas et al.
2009/0190774 A1 7/2009 Wang et al.
2009/0191895 A1 7/2009 Singh et al.
2009/0192782 A1 7/2009 Drewes
2009/0192787 A1 7/2009 Roon
2009/0192798 A1 7/2009 Basson et al.
2009/0198497 A1 8/2009 Kwon
2009/0204402 A1 8/2009 Marhawa et al.
2009/0204409 A1 8/2009 Mozer et al.

(56) References Cited

U.S. PATENT DOCUMENTS

2009/0204478 A1 8/2009 Kaib et al.
2009/0204596 A1 8/2009 Brun et al.
2009/0204601 A1 8/2009 Grasset
2009/0204620 A1 8/2009 Thione et al.
2009/0210230 A1 8/2009 Schwarz et al.
2009/0210232 A1 8/2009 Sanchez et al.
2009/0213134 A1 8/2009 Stephanick et al.
2009/0215466 A1 8/2009 Ahl et al.
2009/0215503 A1 8/2009 Zhang et al.
2009/0216396 A1 8/2009 Yamagata
2009/0216528 A1 8/2009 Gemello et al.
2009/0216540 A1 8/2009 Tessel et al.
2009/0216704 A1 8/2009 Zheng et al.
2009/0219166 A1 9/2009 MacFarlane et al.
2009/0221274 A1 9/2009 Venkatakrishnan et al.
2009/0222257 A1 9/2009 Sumita et al.
2009/0222270 A2 9/2009 Likens et al.
2009/0222488 A1 9/2009 Boerries et al.
2009/0224867 A1 9/2009 O'Shaughnessy et al.
2009/0228126 A1 9/2009 Spielberg et al.
2009/0228273 A1 9/2009 Wang et al.
2009/0228277 A1 9/2009 Bonforte et al.
2009/0228281 A1 9/2009 Singleton et al.
2009/0228439 A1 9/2009 Manolescu et al.
2009/0228792 A1 9/2009 Van Os et al.
2009/0228842 A1 9/2009 Westerman et al.
2009/0233264 A1 9/2009 Rogers et al.
2009/0234638 A1 9/2009 Ranjan et al.
2009/0234651 A1 9/2009 Basir et al.
2009/0234655 A1 9/2009 Kwon
2009/0235280 A1 9/2009 Tannier et al.
2009/0239202 A1 9/2009 Stone
2009/0239552 A1 9/2009 Churchill et al.
2009/0240485 A1 9/2009 Dalal et al.
2009/0241054 A1 9/2009 Hendricks
2009/0241760 A1 10/2009 Georges
2009/0247237 A1 10/2009 Mittleman et al.
2009/0248182 A1 10/2009 Logan et al.
2009/0248395 A1 10/2009 Alewine et al.
2009/0248402 A1 10/2009 Ito et al.
2009/0248420 A1 10/2009 Basir et al.
2009/0248422 A1 10/2009 Li et al.
2009/0248456 A1 10/2009 Fahmy et al.
2009/0249198 A1 10/2009 Davis et al.
2009/0249247 A1 10/2009 Tseng et al.
2009/0252350 A1 10/2009 Seguin
2009/0253457 A1 10/2009 Seguin
2009/0253463 A1 10/2009 Shin et al.
2009/0254339 A1 10/2009 Seguin
2009/0254345 A1 10/2009 Fleizach et al.
2009/0254819 A1 10/2009 Song et al.
2009/0254823 A1 10/2009 Barrett
2009/0259472 A1 10/2009 Schroeter
2009/0259475 A1 10/2009 Yamagami et al.
2009/0259969 A1 10/2009 Pallakoff
2009/0265171 A1 10/2009 Davis
2009/0265368 A1 10/2009 Crider et al.
2009/0271109 A1 10/2009 Lee et al.
2009/0271175 A1 10/2009 Bodin et al.
2009/0271176 A1 10/2009 Bodin et al.
2009/0271178 A1 10/2009 Bodin et al.
2009/0271188 A1 10/2009 Agapi et al.
2009/0271189 A1 10/2009 Agapi et al.
2009/0274315 A1 11/2009 Carnes et al.
2009/0274376 A1 11/2009 Selvaraj et al.
2009/0278804 A1 11/2009 Rubanovich et al.
2009/0281789 A1 11/2009 Waibel et al.
2009/0284471 A1 11/2009 Longe et al.
2009/0284482 A1 11/2009 Chin
2009/0286514 A1 11/2009 Lichorowic et al.
2009/0287583 A1 11/2009 Holmes
2009/0290718 A1 11/2009 Kahn et al.
2009/0292987 A1 11/2009 Sorenson
2009/0296552 A1 12/2009 Hicks et al.
2009/0298474 A1 12/2009 George
2009/0298529 A1 12/2009 Mahajan
2009/0299745 A1 12/2009 Kennewick et al.
2009/0299751 A1 12/2009 Jung
2009/0299849 A1 12/2009 Cao et al.
2009/0300391 A1 12/2009 Jessup et al.
2009/0300488 A1 12/2009 Salamon et al.
2009/0304198 A1 12/2009 Herre et al.
2009/0305203 A1 12/2009 Okumura et al.
2009/0306967 A1 12/2009 Nicolov et al.
2009/0306969 A1 12/2009 Goud et al.
2009/0306979 A1 12/2009 Jaiswal et al.
2009/0306980 A1 12/2009 Shin
2009/0306981 A1 12/2009 Cromack et al.
2009/0306985 A1 12/2009 Roberts et al.
2009/0306988 A1 12/2009 Chen et al.
2009/0306989 A1 12/2009 Kaji
2009/0307162 A1 12/2009 Bui et al.
2009/0307201 A1 12/2009 Dunning et al.
2009/0307584 A1 12/2009 Davidson et al.
2009/0307594 A1 12/2009 Kosonen et al.
2009/0309352 A1 12/2009 Walker et al.
2009/0313014 A1 12/2009 Shin et al.
2009/0313020 A1 12/2009 Koivunen
2009/0313023 A1 12/2009 Jones
2009/0313026 A1 12/2009 Coffman et al.
2009/0313544 A1 12/2009 Wood et al.
2009/0313564 A1 12/2009 Rottler et al.
2009/0316943 A1 12/2009 Frigola Munoz et al.
2009/0318119 A1 12/2009 Basir et al.
2009/0318198 A1 12/2009 Carroll
2009/0319257 A1 12/2009 Blume et al.
2009/0319266 A1 12/2009 Brown et al.
2009/0319342 A1 12/2009 Shilman et al.
2009/0326923 A1 12/2009 Yan et al.
2009/0326936 A1 12/2009 Nagashima
2009/0326938 A1 12/2009 Marila et al.
2009/0326949 A1 12/2009 Douthitt et al.
2009/0327263 A1 12/2009 Maghoul
2009/0327977 A1 12/2009 Bachfischer et al.
2010/0004918 A1 1/2010 Lee et al.
2010/0004930 A1 1/2010 Strope et al.
2010/0004931 A1 1/2010 Ma et al.
2010/0005081 A1 1/2010 Bennett
2010/0007569 A1 1/2010 Sim et al.
2010/0010803 A1 1/2010 Ishikawa et al.
2010/0010814 A1 1/2010 Patel
2010/0010948 A1 1/2010 Ito et al.
2010/0013760 A1 1/2010 Hirai et al.
2010/0013796 A1 1/2010 Abileah et al.
2010/0017212 A1 1/2010 Attwater et al.
2010/0017382 A1 1/2010 Katragadda et al.
2010/0017741 A1 1/2010 Karp et al.
2010/0019834 A1 1/2010 Zerbe et al.
2010/0020035 A1 1/2010 Ryu et al.
2010/0023318 A1 1/2010 Lemoine
2010/0023320 A1 1/2010 Di Cristo et al.
2010/0023331 A1 1/2010 Duta et al.
2010/0026526 A1 2/2010 Yokota
2010/0030549 A1 2/2010 Lee et al.
2010/0030562 A1 2/2010 Yoshizawa et al.
2010/0030928 A1 2/2010 Conroy et al.
2010/0031143 A1 2/2010 Rao et al.
2010/0031150 A1 2/2010 Andrew
2010/0036653 A1 2/2010 Kim et al.
2010/0036655 A1 2/2010 Cecil et al.
2010/0036660 A1 2/2010 Bennett
2010/0036829 A1 2/2010 Leyba
2010/0036928 A1 2/2010 Granito et al.
2010/0037183 A1 2/2010 Miyashita et al.
2010/0037187 A1 2/2010 Kondziela
2010/0039495 A1 2/2010 Rahman et al.
2010/0042400 A1 2/2010 Block et al.
2010/0042576 A1 2/2010 Roettger et al.
2010/0046842 A1 2/2010 Conwell et al.
2010/0049498 A1 2/2010 Cao et al.
2010/0049514 A1 2/2010 Kennewick et al.
2010/0050064 A1 2/2010 Liu et al.
2010/0050074 A1 2/2010 Nachmani et al.
2010/0054512 A1 3/2010 Solum

(56) References Cited

U.S. PATENT DOCUMENTS

| | | | |
|---|---|---|---|
| 2010/0054601 | A1 | 3/2010 | Anbalagan et al. |
| 2010/0057435 | A1 | 3/2010 | Kent et al. |
| 2010/0057443 | A1 | 3/2010 | Di Cristo et al. |
| 2010/0057457 | A1 | 3/2010 | Ogata et al. |
| 2010/0057461 | A1 | 3/2010 | Neubacher et al. |
| 2010/0057643 | A1 | 3/2010 | Yang |
| 2010/0058200 | A1 | 3/2010 | Jablokov et al. |
| 2010/0060646 | A1 | 3/2010 | Unsal et al. |
| 2010/0063804 | A1 | 3/2010 | Sato et al. |
| 2010/0063825 | A1 | 3/2010 | Williams et al. |
| 2010/0063961 | A1 | 3/2010 | Guiheneuf et al. |
| 2010/0064113 | A1 | 3/2010 | Lindahl et al. |
| 2010/0064218 | A1 | 3/2010 | Bull et al. |
| 2010/0064226 | A1 | 3/2010 | Stefaniak et al. |
| 2010/0066546 | A1 | 3/2010 | Aaron |
| 2010/0066684 | A1 | 3/2010 | Shahraray et al. |
| 2010/0067723 | A1 | 3/2010 | Bergmann et al. |
| 2010/0067867 | A1 | 3/2010 | Lin et al. |
| 2010/0070281 | A1 | 3/2010 | Conkie et al. |
| 2010/0070517 | A1 | 3/2010 | Ghosh et al. |
| 2010/0070521 | A1 | 3/2010 | Clinchant et al. |
| 2010/0070899 | A1 | 3/2010 | Hunt et al. |
| 2010/0071003 | A1 | 3/2010 | Bychkov et al. |
| 2010/0073201 | A1 | 3/2010 | Holcomb et al. |
| 2010/0076760 | A1 | 3/2010 | Kraenzel et al. |
| 2010/0076843 | A1 | 3/2010 | Ashton |
| 2010/0076968 | A1 | 3/2010 | Boyns et al. |
| 2010/0076993 | A1 | 3/2010 | Klawitter et al. |
| 2010/0077350 | A1 | 3/2010 | Lim et al. |
| 2010/0077469 | A1 | 3/2010 | Furman et al. |
| 2010/0079501 | A1 | 4/2010 | Ikeda et al. |
| 2010/0079508 | A1 | 4/2010 | Hodge et al. |
| 2010/0080398 | A1 | 4/2010 | Waldmann |
| 2010/0080470 | A1 | 4/2010 | Deluca et al. |
| 2010/0081456 | A1 | 4/2010 | Singh et al. |
| 2010/0081487 | A1 | 4/2010 | Chen et al. |
| 2010/0082239 | A1 | 4/2010 | Hardy et al. |
| 2010/0082286 | A1 | 4/2010 | Leung |
| 2010/0082327 | A1 | 4/2010 | Rogers et al. |
| 2010/0082328 | A1 | 4/2010 | Rogers et al. |
| 2010/0082329 | A1 | 4/2010 | Silverman et al. |
| 2010/0082333 | A1 | 4/2010 | Al-Shammari |
| 2010/0082343 | A1 | 4/2010 | Levit et al. |
| 2010/0082345 | A1 | 4/2010 | Wang et al. |
| 2010/0082346 | A1 | 4/2010 | Rogers et al. |
| 2010/0082347 | A1 | 4/2010 | Rogers et al. |
| 2010/0082348 | A1 | 4/2010 | Silverman et al. |
| 2010/0082349 | A1 | 4/2010 | Bellegarda et al. |
| 2010/0082376 | A1 | 4/2010 | Levitt |
| 2010/0082567 | A1 | 4/2010 | Rosenblatt et al. |
| 2010/0082653 | A1 | 4/2010 | Nair |
| 2010/0082970 | A1 | 4/2010 | Lindahl et al. |
| 2010/0086152 | A1 | 4/2010 | Rank et al. |
| 2010/0086153 | A1 | 4/2010 | Hagen et al. |
| 2010/0086156 | A1 | 4/2010 | Rank et al. |
| 2010/0088020 | A1 | 4/2010 | Sano et al. |
| 2010/0088093 | A1 | 4/2010 | Lee et al. |
| 2010/0088100 | A1 | 4/2010 | Lindahl |
| 2010/0094632 | A1 | 4/2010 | Davis et al. |
| 2010/0098231 | A1 | 4/2010 | Wohlert et al. |
| 2010/0099354 | A1 | 4/2010 | Johnson |
| 2010/0100080 | A1 | 4/2010 | Huculak et al. |
| 2010/0100212 | A1 | 4/2010 | Lindahl et al. |
| 2010/0100371 | A1 | 4/2010 | Yuezhong et al. |
| 2010/0100384 | A1 | 4/2010 | Ju et al. |
| 2010/0100385 | A1 | 4/2010 | Davis et al. |
| 2010/0100515 | A1 | 4/2010 | Bangalore et al. |
| 2010/0100816 | A1 | 4/2010 | Mccloskey et al. |
| 2010/0103776 | A1 | 4/2010 | Chan |
| 2010/0106486 | A1 | 4/2010 | Hua et al. |
| 2010/0106498 | A1 | 4/2010 | Morrison et al. |
| 2010/0106500 | A1 | 4/2010 | McKee et al. |
| 2010/0106503 | A1 | 4/2010 | Farrell et al. |
| 2010/0106975 | A1 | 4/2010 | Vandervort |
| 2010/0114856 | A1 | 5/2010 | Kuboyama |
| 2010/0114887 | A1 | 5/2010 | Conway et al. |
| 2010/0121637 | A1 | 5/2010 | Roy et al. |
| 2010/0122306 | A1 | 5/2010 | Pratt et al. |
| 2010/0125456 | A1 | 5/2010 | Weng et al. |
| 2010/0125458 | A1 | 5/2010 | Franco et al. |
| 2010/0125460 | A1 | 5/2010 | Mellott et al. |
| 2010/0125811 | A1 | 5/2010 | Moore et al. |
| 2010/0127854 | A1 | 5/2010 | Helvick et al. |
| 2010/0128701 | A1 | 5/2010 | Nagaraja |
| 2010/0131265 | A1 | 5/2010 | Boda et al. |
| 2010/0131269 | A1 | 5/2010 | Park et al. |
| 2010/0131273 | A1 | 5/2010 | Aley-Raz et al. |
| 2010/0131498 | A1 | 5/2010 | Linthicum et al. |
| 2010/0131899 | A1 | 5/2010 | Hubert |
| 2010/0138215 | A1 | 6/2010 | Williams |
| 2010/0138224 | A1 | 6/2010 | Bedingfield, Sr. |
| 2010/0138416 | A1 | 6/2010 | Bellotti |
| 2010/0138680 | A1 | 6/2010 | Brisebois et al. |
| 2010/0138759 | A1 | 6/2010 | Roy |
| 2010/0138798 | A1 | 6/2010 | Wilson et al. |
| 2010/0142740 | A1 | 6/2010 | Roerup |
| 2010/0145694 | A1 | 6/2010 | Ju et al. |
| 2010/0145700 | A1 | 6/2010 | Kennewick et al. |
| 2010/0145707 | A1 | 6/2010 | Ljolje et al. |
| 2010/0146442 | A1 | 6/2010 | Nagasaka et al. |
| 2010/0150321 | A1 | 6/2010 | Harris et al. |
| 2010/0153114 | A1 | 6/2010 | Shih et al. |
| 2010/0153115 | A1 | 6/2010 | Klee et al. |
| 2010/0153448 | A1 | 6/2010 | Harpur et al. |
| 2010/0153576 | A1 | 6/2010 | Wohlert et al. |
| 2010/0153968 | A1 | 6/2010 | Engel |
| 2010/0158207 | A1 | 6/2010 | Dhawan et al. |
| 2010/0161311 | A1 | 6/2010 | Massuh |
| 2010/0161313 | A1 | 6/2010 | Karttunen |
| 2010/0161337 | A1 | 6/2010 | Pulz et al. |
| 2010/0161554 | A1 | 6/2010 | Datuashvili et al. |
| 2010/0164897 | A1 | 7/2010 | Morin et al. |
| 2010/0169075 | A1 | 7/2010 | Raffa et al. |
| 2010/0169093 | A1 | 7/2010 | Washio |
| 2010/0169097 | A1 | 7/2010 | Nachman et al. |
| 2010/0169098 | A1 | 7/2010 | Patch |
| 2010/0171713 | A1 | 7/2010 | Kwok et al. |
| 2010/0174544 | A1 | 7/2010 | Heifets |
| 2010/0175066 | A1 | 7/2010 | Paik |
| 2010/0179932 | A1 | 7/2010 | Yoon et al. |
| 2010/0179991 | A1 | 7/2010 | Lorch et al. |
| 2010/0180218 | A1 | 7/2010 | Boston et al. |
| 2010/0185434 | A1 | 7/2010 | Burvall et al. |
| 2010/0185448 | A1 | 7/2010 | Meisel |
| 2010/0185643 | A1* | 7/2010 | Rao ...................... G06F 16/242 707/E17.014 |
| 2010/0185949 | A1 | 7/2010 | Jaeger |
| 2010/0191466 | A1 | 7/2010 | Deluca et al. |
| 2010/0191520 | A1 | 7/2010 | Gruhn et al. |
| 2010/0192221 | A1 | 7/2010 | Waggoner |
| 2010/0195865 | A1 | 8/2010 | Luff |
| 2010/0197359 | A1 | 8/2010 | Harris |
| 2010/0198821 | A1 | 8/2010 | Loritz et al. |
| 2010/0199180 | A1 | 8/2010 | Brichter et al. |
| 2010/0199215 | A1 | 8/2010 | Seymour et al. |
| 2010/0199340 | A1 | 8/2010 | Jonas et al. |
| 2010/0204986 | A1 | 8/2010 | Kennewick et al. |
| 2010/0211199 | A1 | 8/2010 | Naik et al. |
| 2010/0211379 | A1 | 8/2010 | Gorman et al. |
| 2010/0211644 | A1 | 8/2010 | Lavoie et al. |
| 2010/0215195 | A1 | 8/2010 | Harma et al. |
| 2010/0216509 | A1 | 8/2010 | Riemer et al. |
| 2010/0217581 | A1 | 8/2010 | Hong |
| 2010/0217604 | A1 | 8/2010 | Baldwin et al. |
| 2010/0222033 | A1 | 9/2010 | Scott et al. |
| 2010/0222098 | A1 | 9/2010 | Garg |
| 2010/0223055 | A1 | 9/2010 | Mclean |
| 2010/0223056 | A1 | 9/2010 | Kadirkamanathan et al. |
| 2010/0223131 | A1 | 9/2010 | Scott et al. |
| 2010/0225599 | A1 | 9/2010 | Danielsson et al. |
| 2010/0225809 | A1 | 9/2010 | Connors et al. |
| 2010/0227642 | A1 | 9/2010 | Kim et al. |
| 2010/0228540 | A1 | 9/2010 | Bennett |
| 2010/0228549 | A1 | 9/2010 | Herman et al. |

(56) References Cited

U.S. PATENT DOCUMENTS

| | | | |
|---|---|---|---|
| 2010/0228691 | A1 | 9/2010 | Yang et al. |
| 2010/0229082 | A1 | 9/2010 | Karmarkar et al. |
| 2010/0229100 | A1 | 9/2010 | Miller et al. |
| 2010/0231474 | A1 | 9/2010 | Yamagajo et al. |
| 2010/0235167 | A1 | 9/2010 | Bourdon |
| 2010/0235341 | A1 | 9/2010 | Bennett |
| 2010/0235729 | A1 | 9/2010 | Kocienda et al. |
| 2010/0235732 | A1 | 9/2010 | Bergman |
| 2010/0235770 | A1 | 9/2010 | Ording et al. |
| 2010/0235780 | A1 | 9/2010 | Westerman et al. |
| 2010/0235793 | A1 | 9/2010 | Ording et al. |
| 2010/0241418 | A1 | 9/2010 | Maeda et al. |
| 2010/0246784 | A1 | 9/2010 | Frazier et al. |
| 2010/0250542 | A1 | 9/2010 | Fujimaki |
| 2010/0250599 | A1 | 9/2010 | Schmidt et al. |
| 2010/0255858 | A1 | 10/2010 | Juhasz |
| 2010/0257160 | A1 | 10/2010 | Cao |
| 2010/0257478 | A1 | 10/2010 | Longe et al. |
| 2010/0257490 | A1 | 10/2010 | Lyon et al. |
| 2010/0262599 | A1 | 10/2010 | Nitz |
| 2010/0263015 | A1 | 10/2010 | Pandey et al. |
| 2010/0268537 | A1 | 10/2010 | Al-Telmissani |
| 2010/0268539 | A1 | 10/2010 | Xu et al. |
| 2010/0269040 | A1 | 10/2010 | Lee |
| 2010/0274482 | A1 | 10/2010 | Feng |
| 2010/0274753 | A1 | 10/2010 | Liberty et al. |
| 2010/0277579 | A1 | 11/2010 | Cho et al. |
| 2010/0278320 | A1 | 11/2010 | Arsenault et al. |
| 2010/0278391 | A1 | 11/2010 | Hsu et al. |
| 2010/0278453 | A1 | 11/2010 | King |
| 2010/0280983 | A1 | 11/2010 | Cho et al. |
| 2010/0281034 | A1 | 11/2010 | Petrou et al. |
| 2010/0286984 | A1 | 11/2010 | Wandinger et al. |
| 2010/0286985 | A1 | 11/2010 | Kennewick et al. |
| 2010/0287241 | A1 | 11/2010 | Swanburg et al. |
| 2010/0287514 | A1 | 11/2010 | Cragun et al. |
| 2010/0290632 | A1 | 11/2010 | Lin |
| 2010/0293460 | A1 | 11/2010 | Budelli |
| 2010/0295645 | A1 | 11/2010 | Falldin et al. |
| 2010/0299133 | A1 | 11/2010 | Kopparapu et al. |
| 2010/0299138 | A1 | 11/2010 | Kim |
| 2010/0299142 | A1 | 11/2010 | Freeman et al. |
| 2010/0299444 | A1 | 11/2010 | Nilo et al. |
| 2010/0302056 | A1 | 12/2010 | Dutton et al. |
| 2010/0303254 | A1 | 12/2010 | Yoshizawa et al. |
| 2010/0304342 | A1 | 12/2010 | Zilber |
| 2010/0304705 | A1 | 12/2010 | Hursey et al. |
| 2010/0305807 | A1 | 12/2010 | Basir et al. |
| 2010/0305947 | A1 | 12/2010 | Schwarz et al. |
| 2010/0311395 | A1 | 12/2010 | Zheng et al. |
| 2010/0312547 | A1 | 12/2010 | Van Os et al. |
| 2010/0312566 | A1 | 12/2010 | Odinak et al. |
| 2010/0318293 | A1 | 12/2010 | Brush et al. |
| 2010/0318357 | A1 | 12/2010 | Istvan et al. |
| 2010/0318366 | A1 | 12/2010 | Sullivan et al. |
| 2010/0318570 | A1 | 12/2010 | Narasinghanallur et al. |
| 2010/0318576 | A1 | 12/2010 | Kim |
| 2010/0322438 | A1 | 12/2010 | Siotis |
| 2010/0324709 | A1 | 12/2010 | Starmen |
| 2010/0324895 | A1 | 12/2010 | Kurzweil et al. |
| 2010/0324896 | A1 | 12/2010 | Attwater et al. |
| 2010/0324905 | A1 | 12/2010 | Kurzweil et al. |
| 2010/0325131 | A1 | 12/2010 | Dumais et al. |
| 2010/0325158 | A1 | 12/2010 | Oral et al. |
| 2010/0325573 | A1 | 12/2010 | Estrada et al. |
| 2010/0325588 | A1 | 12/2010 | Reddy et al. |
| 2010/0330908 | A1 | 12/2010 | Maddern et al. |
| 2010/0332003 | A1 | 12/2010 | Yaguez |
| 2010/0332220 | A1 | 12/2010 | Hursey et al. |
| 2010/0332224 | A1 | 12/2010 | Mäkelä et al. |
| 2010/0332235 | A1 | 12/2010 | David |
| 2010/0332236 | A1 | 12/2010 | Tan |
| 2010/0332280 | A1 | 12/2010 | Bradley et al. |
| 2010/0332348 | A1 | 12/2010 | Cao |
| 2010/0332428 | A1 | 12/2010 | Mchenry et al. |
| 2010/0332976 | A1 | 12/2010 | Fux et al. |
| 2010/0333030 | A1 | 12/2010 | Johns |
| 2010/0333163 | A1 | 12/2010 | Daly |
| 2011/0002487 | A1 | 1/2011 | Panther et al. |
| 2011/0004475 | A1 | 1/2011 | Bellegarda |
| 2011/0006876 | A1 | 1/2011 | Moberg et al. |
| 2011/0009107 | A1 | 1/2011 | Guba et al. |
| 2011/0010178 | A1 | 1/2011 | Lee et al. |
| 2011/0010644 | A1 | 1/2011 | Merrill et al. |
| 2011/0015928 | A1 | 1/2011 | Odell et al. |
| 2011/0016150 | A1 | 1/2011 | Engstrom et al. |
| 2011/0016421 | A1 | 1/2011 | Krupka et al. |
| 2011/0018695 | A1 | 1/2011 | Bells et al. |
| 2011/0021211 | A1 | 1/2011 | Ohki |
| 2011/0021213 | A1 | 1/2011 | Carr |
| 2011/0022292 | A1 | 1/2011 | Shen et al. |
| 2011/0022388 | A1 | 1/2011 | Wu et al. |
| 2011/0022393 | A1 | 1/2011 | Waller et al. |
| 2011/0022394 | A1 | 1/2011 | Wide et al. |
| 2011/0022472 | A1 | 1/2011 | Zon et al. |
| 2011/0022952 | A1 | 1/2011 | Wu et al. |
| 2011/0028083 | A1 | 2/2011 | Soitis |
| 2011/0029616 | A1 | 2/2011 | Wang et al. |
| 2011/0029637 | A1 | 2/2011 | Morse |
| 2011/0030067 | A1 | 2/2011 | Wilson |
| 2011/0033064 | A1 | 2/2011 | Johnson et al. |
| 2011/0034183 | A1 | 2/2011 | Haag et al. |
| 2011/0035144 | A1 | 2/2011 | Okamoto et al. |
| 2011/0035434 | A1 | 2/2011 | Lockwood |
| 2011/0038489 | A1 | 2/2011 | Visser et al. |
| 2011/0039584 | A1 | 2/2011 | Merrett |
| 2011/0040707 | A1 | 2/2011 | Theisen et al. |
| 2011/0045841 | A1 | 2/2011 | Kuhlke et al. |
| 2011/0047072 | A1 | 2/2011 | Ciurea |
| 2011/0047149 | A1 | 2/2011 | Vaananen |
| 2011/0047161 | A1 | 2/2011 | Myaeng et al. |
| 2011/0047246 | A1 | 2/2011 | Frissora et al. |
| 2011/0047266 | A1 | 2/2011 | Yu et al. |
| 2011/0047605 | A1 | 2/2011 | Sontag et al. |
| 2011/0050591 | A1 | 3/2011 | Kim et al. |
| 2011/0050592 | A1 | 3/2011 | Kim et al. |
| 2011/0054647 | A1 | 3/2011 | Chipchase |
| 2011/0054894 | A1 | 3/2011 | Phillips et al. |
| 2011/0054901 | A1 | 3/2011 | Qin et al. |
| 2011/0055244 | A1 | 3/2011 | Donelli |
| 2011/0055256 | A1 | 3/2011 | Phillips et al. |
| 2011/0060584 | A1 | 3/2011 | Ferrucci et al. |
| 2011/0060587 | A1 | 3/2011 | Phillips et al. |
| 2011/0060589 | A1 | 3/2011 | Weinberg et al. |
| 2011/0060807 | A1 | 3/2011 | Martin et al. |
| 2011/0060812 | A1 | 3/2011 | Middleton |
| 2011/0064378 | A1 | 3/2011 | Gharaat et al. |
| 2011/0064387 | A1 | 3/2011 | Mendeloff et al. |
| 2011/0065456 | A1 | 3/2011 | Brennan et al. |
| 2011/0066366 | A1 | 3/2011 | Ellanti et al. |
| 2011/0066436 | A1 | 3/2011 | Bezar |
| 2011/0066468 | A1 | 3/2011 | Huang et al. |
| 2011/0066602 | A1 | 3/2011 | Studer et al. |
| 2011/0066634 | A1 | 3/2011 | Phillips et al. |
| 2011/0072033 | A1 | 3/2011 | White et al. |
| 2011/0072114 | A1 | 3/2011 | Hoffert et al. |
| 2011/0072492 | A1 | 3/2011 | Mohler et al. |
| 2011/0075818 | A1 | 3/2011 | Vance et al. |
| 2011/0076994 | A1 | 3/2011 | Kim et al. |
| 2011/0077943 | A1 | 3/2011 | Miki et al. |
| 2011/0080260 | A1 | 4/2011 | Wang et al. |
| 2011/0081889 | A1 | 4/2011 | Gao et al. |
| 2011/0082688 | A1 | 4/2011 | Kim et al. |
| 2011/0083079 | A1 | 4/2011 | Farrell et al. |
| 2011/0087491 | A1 | 4/2011 | Wittenstein et al. |
| 2011/0087685 | A1 | 4/2011 | Lin et al. |
| 2011/0090078 | A1 | 4/2011 | Kim et al. |
| 2011/0092187 | A1 | 4/2011 | Miller |
| 2011/0093261 | A1 | 4/2011 | Angott |
| 2011/0093265 | A1 | 4/2011 | Stent et al. |
| 2011/0093271 | A1 | 4/2011 | Bernard et al. |
| 2011/0093272 | A1 | 4/2011 | Isobe et al. |
| 2011/0099000 | A1 | 4/2011 | Rai et al. |
| 2011/0099157 | A1 | 4/2011 | Lebeau et al. |

(56) References Cited

U.S. PATENT DOCUMENTS

2011/0102161 A1 5/2011 Heubel et al.
2011/0103682 A1 5/2011 Chidlovskii et al.
2011/0105097 A1 5/2011 Tadayon et al.
2011/0106534 A1 5/2011 Lebeau et al.
2011/0106536 A1 5/2011 Klappert
2011/0106736 A1 5/2011 Aharonson et al.
2011/0106878 A1 5/2011 Cho et al.
2011/0106892 A1 5/2011 Nelson et al.
2011/0110502 A1 5/2011 Daye et al.
2011/0111724 A1 5/2011 Baptiste
2011/0112825 A1 5/2011 Bellegarda
2011/0112827 A1 5/2011 Kennewick et al.
2011/0112837 A1 5/2011 Kurki-Suonio et al.
2011/0112838 A1 5/2011 Adibi
2011/0112921 A1 5/2011 Kennewick et al.
2011/0116480 A1 5/2011 Li et al.
2011/0116610 A1 5/2011 Shaw et al.
2011/0119049 A1 5/2011 Ylonen
2011/0119051 A1 5/2011 Li et al.
2011/0119623 A1 5/2011 Kim
2011/0119713 A1 5/2011 Chang et al.
2011/0119715 A1 5/2011 Chang et al.
2011/0123004 A1 5/2011 Chang et al.
2011/0125498 A1 5/2011 Pickering et al.
2011/0125540 A1 5/2011 Jang et al.
2011/0125701 A1 5/2011 Nair et al.
2011/0130958 A1 6/2011 Stahl et al.
2011/0131036 A1 6/2011 DiCristo et al.
2011/0131038 A1 6/2011 Oyaizu et al.
2011/0131045 A1 6/2011 Cristo et al.
2011/0137636 A1 6/2011 Srihari et al.
2011/0137664 A1 6/2011 Kho et al.
2011/0141141 A1 6/2011 Kankainen
2011/0143718 A1 6/2011 Engelhart, Sr.
2011/0143726 A1 6/2011 de Silva
2011/0143811 A1 6/2011 Rodriguez
2011/0144857 A1 6/2011 Wingrove et al.
2011/0144901 A1 6/2011 Wang
2011/0144973 A1 6/2011 Bocchieri et al.
2011/0144999 A1 6/2011 Jang et al.
2011/0145718 A1 6/2011 Ketola et al.
2011/0151415 A1 6/2011 Darling et al.
2011/0151830 A1 6/2011 Blanda et al.
2011/0153209 A1 6/2011 Geelen
2011/0153322 A1 6/2011 Kwak et al.
2011/0153324 A1 6/2011 Ballinger et al.
2011/0153325 A1 6/2011 Ballinger et al.
2011/0153329 A1 6/2011 Moorer
2011/0153330 A1 6/2011 Yazdani et al.
2011/0153373 A1 6/2011 Dantzig et al.
2011/0154193 A1 6/2011 Creutz et al.
2011/0157029 A1 6/2011 Tseng
2011/0161072 A1 6/2011 Terao et al.
2011/0161076 A1 6/2011 Davis et al.
2011/0161079 A1 6/2011 Gruhn et al.
2011/0161309 A1 6/2011 Lung et al.
2011/0161852 A1 6/2011 Vainio et al.
2011/0166851 A1 7/2011 LeBeau et al.
2011/0166855 A1 7/2011 Vermeulen et al.
2011/0166862 A1 7/2011 Eshed et al.
2011/0167350 A1 7/2011 Hoellwarth
2011/0173003 A1 7/2011 Levanon et al.
2011/0173537 A1 7/2011 Hemphill
2011/0175810 A1 7/2011 Markovic et al.
2011/0178804 A1 7/2011 Inoue et al.
2011/0179002 A1 7/2011 Dumitru et al.
2011/0179372 A1 7/2011 Moore et al.
2011/0183627 A1 7/2011 Ueda et al.
2011/0183650 A1 7/2011 Mckee et al.
2011/0184721 A1 7/2011 Subramanian et al.
2011/0184730 A1 7/2011 LeBeau et al.
2011/0184736 A1 7/2011 Slotznick
2011/0184737 A1 7/2011 Nakano et al.
2011/0184768 A1 7/2011 Norton et al.
2011/0184789 A1 7/2011 Kirsch
2011/0185288 A1 7/2011 Gupta et al.
2011/0191108 A1 8/2011 Friedlander
2011/0191271 A1 8/2011 Baker et al.
2011/0191344 A1 8/2011 Jin et al.
2011/0195758 A1 8/2011 Damale et al.
2011/0196670 A1 8/2011 Dang et al.
2011/0197128 A1 8/2011 Assadollahi et al.
2011/0199312 A1 8/2011 Okuta
2011/0201385 A1 8/2011 Higginbotham et al.
2011/0201387 A1 8/2011 Paek et al.
2011/0202526 A1 8/2011 Lee et al.
2011/0202594 A1 8/2011 Ricci
2011/0202874 A1 8/2011 Ramer et al.
2011/0205149 A1 8/2011 Tom et al.
2011/0208511 A1 8/2011 Sikstrom et al.
2011/0208524 A1 8/2011 Haughay
2011/0209088 A1 8/2011 Hinckley et al.
2011/0212717 A1 9/2011 Rhoads et al.
2011/0216093 A1 9/2011 Griffin
2011/0218806 A1 9/2011 Alewine et al.
2011/0218855 A1 9/2011 Cao et al.
2011/0219018 A1 9/2011 Bailey et al.
2011/0223893 A1 9/2011 Lau et al.
2011/0224972 A1 9/2011 Millett et al.
2011/0228913 A1 9/2011 Cochinwala et al.
2011/0231182 A1 9/2011 Weider et al.
2011/0231184 A1 9/2011 Kerr
2011/0231188 A1 9/2011 Kennewick et al.
2011/0231189 A1 9/2011 Anastasiadis et al.
2011/0231218 A1 9/2011 Tovar
2011/0231432 A1 9/2011 Sata et al.
2011/0231474 A1 9/2011 Locker et al.
2011/0238191 A1 9/2011 Kristjansson et al.
2011/0238407 A1 9/2011 Kent
2011/0238408 A1 9/2011 Larcheveque et al.
2011/0238676 A1 9/2011 Liu et al.
2011/0239111 A1 9/2011 Grover
2011/0242007 A1 10/2011 Gray et al.
2011/0244888 A1 10/2011 Ohki
2011/0246471 A1 10/2011 Rakib et al.
2011/0249144 A1 10/2011 Chang
2011/0250570 A1 10/2011 Mack et al.
2011/0252108 A1 10/2011 Morris et al.
2011/0257966 A1 10/2011 Rychlik
2011/0258188 A1 10/2011 Abdalmageed et al.
2011/0260829 A1 10/2011 Lee
2011/0260861 A1 10/2011 Singh et al.
2011/0264530 A1 10/2011 Santangelo et al.
2011/0264643 A1 10/2011 Cao
2011/0264999 A1 10/2011 Bells et al.
2011/0270604 A1 11/2011 Qi et al.
2011/0274303 A1 11/2011 Filson et al.
2011/0276595 A1 11/2011 Kirkland et al.
2011/0276598 A1 11/2011 Kozempel
2011/0276944 A1 11/2011 Bergman et al.
2011/0279368 A1 11/2011 Klein et al.
2011/0280143 A1 11/2011 Li et al.
2011/0282663 A1 11/2011 Talwar et al.
2011/0282888 A1 11/2011 Koperski et al.
2011/0282903 A1 11/2011 Zhang
2011/0282906 A1 11/2011 Wong
2011/0283189 A1 11/2011 McCarty
2011/0283190 A1 11/2011 Poltorak
2011/0288852 A1 11/2011 Dymetman et al.
2011/0288855 A1 11/2011 Roy
2011/0288861 A1 11/2011 Kurzweil et al.
2011/0288863 A1 11/2011 Rasmussen
2011/0288866 A1 11/2011 Rasmussen
2011/0288917 A1 11/2011 Wanek et al.
2011/0289530 A1 11/2011 Dureau et al.
2011/0298585 A1 12/2011 Barry
2011/0301943 A1 12/2011 Patch
2011/0302162 A1 12/2011 Xiao et al.
2011/0302645 A1 12/2011 Headley
2011/0306426 A1 12/2011 Novak et al.
2011/0307241 A1 12/2011 Waibel et al.
2011/0307254 A1 12/2011 Hunt et al.
2011/0307491 A1 12/2011 Fisk et al.
2011/0307810 A1 12/2011 Hilerio et al.

(56) References Cited

U.S. PATENT DOCUMENTS

2011/0313775 A1 12/2011 Laligand et al.
2011/0313803 A1 12/2011 Friend et al.
2011/0314003 A1 12/2011 Ju et al.
2011/0314032 A1 12/2011 Bennett et al.
2011/0314404 A1 12/2011 Kotler et al.
2011/0314539 A1 12/2011 Horton
2011/0320187 A1 12/2011 Motik et al.
2012/0002820 A1 1/2012 Leichter
2012/0005602 A1 1/2012 Anttila et al.
2012/0008754 A1 1/2012 Mukherjee et al.
2012/0010886 A1 1/2012 Razavilar
2012/0011138 A1 1/2012 Dunning et al.
2012/0013609 A1 1/2012 Reponen et al.
2012/0015629 A1 1/2012 Olsen et al.
2012/0016658 A1 1/2012 Wu et al.
2012/0016678 A1 1/2012 Gruber et al.
2012/0019400 A1 1/2012 Patel et al.
2012/0020490 A1 1/2012 Leichter
2012/0020503 A1 1/2012 Endo et al.
2012/0022787 A1 1/2012 LeBeau et al.
2012/0022857 A1 1/2012 Baldwin et al.
2012/0022860 A1 1/2012 Lloyd et al.
2012/0022868 A1 1/2012 LeBeau et al.
2012/0022869 A1 1/2012 Lloyd et al.
2012/0022870 A1 1/2012 Kristjansson et al.
2012/0022872 A1 1/2012 Gruber et al.
2012/0022874 A1 1/2012 Lloyd et al.
2012/0022876 A1 1/2012 LeBeau et al.
2012/0022967 A1 1/2012 Bachman et al.
2012/0023088 A1 1/2012 Cheng et al.
2012/0023095 A1 1/2012 Wadycki et al.
2012/0023462 A1 1/2012 Rosing et al.
2012/0026395 A1 2/2012 Jin et al.
2012/0029661 A1 2/2012 Jones et al.
2012/0029910 A1 2/2012 Medlock et al.
2012/0034904 A1 2/2012 LeBeau et al.
2012/0035907 A1 2/2012 Lebeau et al.
2012/0035908 A1 2/2012 Lebeau et al.
2012/0035924 A1 2/2012 Jitkoff et al.
2012/0035925 A1 2/2012 Friend et al.
2012/0035926 A1 2/2012 Ambler
2012/0035931 A1 2/2012 LeBeau et al.
2012/0035932 A1 2/2012 Jitkoff et al.
2012/0035935 A1 2/2012 Park et al.
2012/0036556 A1 2/2012 LeBeau et al.
2012/0039539 A1 2/2012 Boiman et al.
2012/0039578 A1 2/2012 Issa et al.
2012/0041752 A1 2/2012 Wang et al.
2012/0041756 A1 2/2012 Hanazawa et al.
2012/0041759 A1 2/2012 Barker et al.
2012/0042014 A1 2/2012 Desai et al.
2012/0042343 A1 2/2012 Laligand et al.
2012/0052945 A1 3/2012 Miyamoto et al.
2012/0053815 A1 3/2012 Montanari et al.
2012/0053829 A1 3/2012 Agarwal et al.
2012/0053945 A1 3/2012 Gupta et al.
2012/0056815 A1 3/2012 Mehra
2012/0059655 A1 3/2012 Cartales
2012/0059813 A1 3/2012 Sejnoha et al.
2012/0060052 A1 3/2012 White et al.
2012/0062473 A1 3/2012 Xiao et al.
2012/0064975 A1 3/2012 Gault et al.
2012/0066212 A1 3/2012 Jennings
2012/0066581 A1 3/2012 Spalink
2012/0075054 A1 3/2012 Ge et al.
2012/0075184 A1 3/2012 Madhvanath
2012/0077479 A1 3/2012 Sabotta et al.
2012/0078611 A1 3/2012 Soltani et al.
2012/0078624 A1 3/2012 Yook et al.
2012/0078627 A1 3/2012 Wagner
2012/0078635 A1 3/2012 Rothkopf et al.
2012/0078747 A1 3/2012 Chakrabarti et al.
2012/0082317 A1 4/2012 Pance et al.
2012/0083286 A1 4/2012 Kim et al.
2012/0084086 A1 4/2012 Gilbert et al.
2012/0084087 A1 4/2012 Yang et al.
2012/0084089 A1 4/2012 Lloyd et al.
2012/0084634 A1 4/2012 Wong et al.
2012/0088219 A1 4/2012 Briscoe et al.
2012/0089331 A1 4/2012 Schmidt et al.
2012/0089659 A1 4/2012 Halevi et al.
2012/0094645 A1 4/2012 Jeffrey
2012/0101823 A1 4/2012 Weng et al.
2012/0105257 A1 5/2012 Murillo et al.
2012/0108166 A1 5/2012 Hymel
2012/0108221 A1 5/2012 Thomas et al.
2012/0109632 A1 5/2012 Sugiura et al.
2012/0109753 A1 5/2012 Kennewick et al.
2012/0109997 A1 5/2012 Sparks et al.
2012/0110456 A1 5/2012 Larco et al.
2012/0114108 A1 5/2012 Katis et al.
2012/0116770 A1 5/2012 Chen et al.
2012/0117499 A1 5/2012 Mori et al.
2012/0117590 A1 5/2012 Agnihotri et al.
2012/0124126 A1 5/2012 Alcazar et al.
2012/0124177 A1 5/2012 Sparks
2012/0124178 A1 5/2012 Sparks
2012/0128322 A1 5/2012 Shaffer et al.
2012/0130709 A1 5/2012 Bocchieri et al.
2012/0130995 A1 5/2012 Risvik et al.
2012/0135714 A1 5/2012 King, II
2012/0136529 A1 5/2012 Curtis et al.
2012/0136572 A1 5/2012 Norton
2012/0136649 A1 5/2012 Freising et al.
2012/0136855 A1 5/2012 Ni et al.
2012/0136985 A1 5/2012 Popescu et al.
2012/0137367 A1 5/2012 Dupont et al.
2012/0149342 A1 6/2012 Cohen et al.
2012/0149394 A1 6/2012 Singh et al.
2012/0150532 A1 6/2012 Mirowski et al.
2012/0150544 A1 6/2012 McLoughlin et al.
2012/0150580 A1 6/2012 Norton
2012/0158293 A1 6/2012 Burnham
2012/0158399 A1 6/2012 Tremblay et al.
2012/0158422 A1 6/2012 Burnham et al.
2012/0159380 A1 6/2012 Kocienda et al.
2012/0163710 A1 6/2012 Skaff et al.
2012/0166177 A1 6/2012 Beld et al.
2012/0166196 A1 6/2012 Ju et al.
2012/0166429 A1 6/2012 Moore et al.
2012/0166942 A1 6/2012 Ramerth et al.
2012/0166959 A1 6/2012 Hilerio et al.
2012/0166998 A1 6/2012 Cotterill et al.
2012/0173222 A1 7/2012 Wang et al.
2012/0173244 A1 7/2012 Kwak et al.
2012/0173464 A1 7/2012 Tur et al.
2012/0174121 A1 7/2012 Treat et al.
2012/0176255 A1 7/2012 Choi et al.
2012/0179457 A1 7/2012 Newman et al.
2012/0179467 A1 7/2012 Williams
2012/0179471 A1 7/2012 Newman et al.
2012/0185237 A1 7/2012 Gajic et al.
2012/0185480 A1 7/2012 Ni et al.
2012/0185781 A1 7/2012 Guzman et al.
2012/0191461 A1 7/2012 Lin et al.
2012/0192096 A1 7/2012 Bowman et al.
2012/0197743 A1 8/2012 Grigg et al.
2012/0197995 A1 8/2012 Caruso
2012/0197998 A1 8/2012 Kessel et al.
2012/0201362 A1 8/2012 Crossan et al.
2012/0203767 A1 8/2012 Williams et al.
2012/0209454 A1 8/2012 Miller et al.
2012/0209654 A1 8/2012 Romagnino et al.
2012/0209853 A1 8/2012 Desai et al.
2012/0209874 A1 8/2012 Wong et al.
2012/0210266 A1 8/2012 Jiang et al.
2012/0210378 A1 8/2012 Mccoy et al.
2012/0214141 A1 8/2012 Raya et al.
2012/0214517 A1 8/2012 Singh et al.
2012/0215640 A1 8/2012 Ramer et al.
2012/0215762 A1 8/2012 Hall et al.
2012/0221339 A1 8/2012 Wang et al.
2012/0221552 A1 8/2012 Reponen et al.
2012/0223889 A1 9/2012 Medlock et al.

(56) References Cited

U.S. PATENT DOCUMENTS

| | | | |
|---|---|---|---|
| 2012/0223936 | A1 | 9/2012 | Aughey et al. |
| 2012/0232885 | A1 | 9/2012 | Barbosa et al. |
| 2012/0232886 | A1 | 9/2012 | Capuozzo et al. |
| 2012/0232906 | A1 | 9/2012 | Lindahl et al. |
| 2012/0233207 | A1 | 9/2012 | Mohajer |
| 2012/0233266 | A1 | 9/2012 | Hassan et al. |
| 2012/0233280 | A1 | 9/2012 | Ebara |
| 2012/0239403 | A1 | 9/2012 | Cano et al. |
| 2012/0239661 | A1 | 9/2012 | Giblin |
| 2012/0239761 | A1 | 9/2012 | Linner et al. |
| 2012/0242482 | A1 | 9/2012 | Elumalai et al. |
| 2012/0245719 | A1 | 9/2012 | Story, Jr. et al. |
| 2012/0245939 | A1 | 9/2012 | Braho et al. |
| 2012/0245941 | A1 | 9/2012 | Cheyer |
| 2012/0245944 | A1 | 9/2012 | Gruber et al. |
| 2012/0246064 | A1 | 9/2012 | Balkow |
| 2012/0250858 | A1 | 10/2012 | Iqbal et al. |
| 2012/0252367 | A1 | 10/2012 | Gaglio et al. |
| 2012/0252540 | A1 | 10/2012 | Kirigaya |
| 2012/0253785 | A1 | 10/2012 | Hamid et al. |
| 2012/0253791 | A1 | 10/2012 | Heck et al. |
| 2012/0254143 | A1 | 10/2012 | Varma et al. |
| 2012/0254152 | A1 | 10/2012 | Park et al. |
| 2012/0254290 | A1 | 10/2012 | Naaman |
| 2012/0259615 | A1 | 10/2012 | Morin et al. |
| 2012/0262296 | A1 | 10/2012 | Bezar |
| 2012/0265482 | A1 | 10/2012 | Grokop et al. |
| 2012/0265528 | A1 | 10/2012 | Gruber et al. |
| 2012/0265535 | A1 | 10/2012 | Bryant-Rich et al. |
| 2012/0265787 | A1 | 10/2012 | Hsu et al. |
| 2012/0265806 | A1 | 10/2012 | Blanchflower et al. |
| 2012/0271625 | A1 | 10/2012 | Bernard |
| 2012/0271634 | A1 | 10/2012 | Lenke |
| 2012/0271635 | A1 | 10/2012 | Ljolje |
| 2012/0271640 | A1 | 10/2012 | Basir |
| 2012/0271676 | A1 | 10/2012 | Aravamudan et al. |
| 2012/0275377 | A1 | 11/2012 | Lehane et al. |
| 2012/0278744 | A1 | 11/2012 | Kozitsyn et al. |
| 2012/0278812 | A1 | 11/2012 | Wang |
| 2012/0284015 | A1 | 11/2012 | Drewes |
| 2012/0284027 | A1 | 11/2012 | Mallett et al. |
| 2012/0290291 | A1 | 11/2012 | Shelley et al. |
| 2012/0290300 | A1 | 11/2012 | Lee et al. |
| 2012/0290657 | A1 | 11/2012 | Parks et al. |
| 2012/0290680 | A1 | 11/2012 | Hwang |
| 2012/0295708 | A1 | 11/2012 | Hernandez-Abrego et al. |
| 2012/0296638 | A1 | 11/2012 | Patwa |
| 2012/0296649 | A1 | 11/2012 | Bansal et al. |
| 2012/0296654 | A1 | 11/2012 | Hendrickson et al. |
| 2012/0296891 | A1 | 11/2012 | Rangan |
| 2012/0297341 | A1 | 11/2012 | Glazer et al. |
| 2012/0297348 | A1 | 11/2012 | Santoro |
| 2012/0303369 | A1 | 11/2012 | Brush et al. |
| 2012/0303371 | A1 | 11/2012 | Labsky et al. |
| 2012/0304124 | A1 | 11/2012 | Chen et al. |
| 2012/0304239 | A1 | 11/2012 | Shahraray et al. |
| 2012/0309363 | A1 | 12/2012 | Gruber et al. |
| 2012/0310642 | A1 | 12/2012 | Cao et al. |
| 2012/0310649 | A1 | 12/2012 | Cannistraro et al. |
| 2012/0310652 | A1 | 12/2012 | O'Sullivan |
| 2012/0310922 | A1 | 12/2012 | Johnson et al. |
| 2012/0311478 | A1 | 12/2012 | Van Os et al. |
| 2012/0311583 | A1 | 12/2012 | Gruber et al. |
| 2012/0311584 | A1 | 12/2012 | Gruber et al. |
| 2012/0311585 | A1 | 12/2012 | Gruber et al. |
| 2012/0316774 | A1 | 12/2012 | Yariv et al. |
| 2012/0316862 | A1 | 12/2012 | Sultan et al. |
| 2012/0316875 | A1 | 12/2012 | Nyquist et al. |
| 2012/0316878 | A1 | 12/2012 | Singleton et al. |
| 2012/0316955 | A1 | 12/2012 | Panguluri et al. |
| 2012/0317194 | A1 | 12/2012 | Tian |
| 2012/0317498 | A1 | 12/2012 | Logan et al. |
| 2012/0321112 | A1 | 12/2012 | Schubert et al. |
| 2012/0323560 | A1 | 12/2012 | Perez Cortes et al. |
| 2012/0324391 | A1 | 12/2012 | Tocci et al. |
| 2012/0327009 | A1 | 12/2012 | Fleizach |
| 2012/0329529 | A1 | 12/2012 | van der Raadt |
| 2012/0330660 | A1 | 12/2012 | Jaiswal |
| 2012/0330661 | A1 | 12/2012 | Lindahl |
| 2012/0330990 | A1 | 12/2012 | Chen et al. |
| 2013/0002716 | A1 | 1/2013 | Walker et al. |
| 2013/0005405 | A1 | 1/2013 | Prociw |
| 2013/0006633 | A1 | 1/2013 | Grokop et al. |
| 2013/0006637 | A1 | 1/2013 | Kanevsky et al. |
| 2013/0006638 | A1 | 1/2013 | Lindahl |
| 2013/0007240 | A1 | 1/2013 | Qiu et al. |
| 2013/0007648 | A1 | 1/2013 | Gamon et al. |
| 2013/0009858 | A1 | 1/2013 | Lacey |
| 2013/0010575 | A1 | 1/2013 | He et al. |
| 2013/0013313 | A1 | 1/2013 | Shechtman et al. |
| 2013/0013319 | A1 | 1/2013 | Grant et al. |
| 2013/0014026 | A1 | 1/2013 | Beringer et al. |
| 2013/0018659 | A1 | 1/2013 | Chi |
| 2013/0018863 | A1 | 1/2013 | Regan et al. |
| 2013/0024277 | A1 | 1/2013 | Tuchman et al. |
| 2013/0024576 | A1 | 1/2013 | Dishneau et al. |
| 2013/0027875 | A1 | 1/2013 | Zhu et al. |
| 2013/0028404 | A1 | 1/2013 | Omalley et al. |
| 2013/0030787 | A1 | 1/2013 | Cancedda et al. |
| 2013/0030789 | A1 | 1/2013 | Dalce |
| 2013/0030804 | A1 | 1/2013 | Zavaliagko et al. |
| 2013/0030815 | A1 | 1/2013 | Madhvanath et al. |
| 2013/0030904 | A1 | 1/2013 | Aidasani et al. |
| 2013/0030913 | A1 | 1/2013 | Zhu et al. |
| 2013/0030955 | A1 | 1/2013 | David |
| 2013/0031162 | A1 | 1/2013 | Willis et al. |
| 2013/0031476 | A1 | 1/2013 | Coin et al. |
| 2013/0033643 | A1 | 2/2013 | Kim et al. |
| 2013/0035086 | A1 | 2/2013 | Chardon et al. |
| 2013/0035942 | A1 | 2/2013 | Kim et al. |
| 2013/0035961 | A1 | 2/2013 | Yegnanarayanan |
| 2013/0041647 | A1 | 2/2013 | Ramerth et al. |
| 2013/0041654 | A1 | 2/2013 | Walker et al. |
| 2013/0041661 | A1 | 2/2013 | Lee et al. |
| 2013/0041665 | A1 | 2/2013 | Jang et al. |
| 2013/0041667 | A1 | 2/2013 | Longe et al. |
| 2013/0041968 | A1 | 2/2013 | Cohen et al. |
| 2013/0046544 | A1 | 2/2013 | Kay et al. |
| 2013/0047178 | A1 | 2/2013 | Moon et al. |
| 2013/0050089 | A1 | 2/2013 | Neels et al. |
| 2013/0054550 | A1 | 2/2013 | Bolohan |
| 2013/0054609 | A1 | 2/2013 | Rajput et al. |
| 2013/0054613 | A1 | 2/2013 | Bishop |
| 2013/0054631 | A1 | 2/2013 | Govani et al. |
| 2013/0054675 | A1 | 2/2013 | Jenkins et al. |
| 2013/0054706 | A1 | 2/2013 | Graham et al. |
| 2013/0055099 | A1 | 2/2013 | Yao et al. |
| 2013/0055147 | A1 | 2/2013 | Vasudev et al. |
| 2013/0060571 | A1 | 3/2013 | Soemo et al. |
| 2013/0060807 | A1 | 3/2013 | Rambhia et al. |
| 2013/0061139 | A1 | 3/2013 | Mahkovec et al. |
| 2013/0063611 | A1 | 3/2013 | Papakipos et al. |
| 2013/0066832 | A1 | 3/2013 | Sheehan et al. |
| 2013/0067307 | A1 | 3/2013 | Tian et al. |
| 2013/0067312 | A1 | 3/2013 | Rose |
| 2013/0067421 | A1 | 3/2013 | Osman et al. |
| 2013/0069769 | A1 | 3/2013 | Pennington et al. |
| 2013/0073286 | A1 | 3/2013 | Bastea-Forte et al. |
| 2013/0073293 | A1 | 3/2013 | Jang et al. |
| 2013/0073346 | A1 | 3/2013 | Chun et al. |
| 2013/0073580 | A1 | 3/2013 | Mehanna et al. |
| 2013/0078930 | A1 | 3/2013 | Chen et al. |
| 2013/0080152 | A1 | 3/2013 | Brun et al. |
| 2013/0080162 | A1 | 3/2013 | Chang et al. |
| 2013/0080167 | A1 | 3/2013 | Mozer |
| 2013/0080177 | A1 | 3/2013 | Chen |
| 2013/0080178 | A1 | 3/2013 | Kang et al. |
| 2013/0080251 | A1 | 3/2013 | Dempski |
| 2013/0082967 | A1 | 4/2013 | Hillis et al. |
| 2013/0085755 | A1 | 4/2013 | Bringert et al. |
| 2013/0085761 | A1 | 4/2013 | Bringert et al. |
| 2013/0086609 | A1 | 4/2013 | Levy et al. |
| 2013/0090921 | A1 | 4/2013 | Liu et al. |
| 2013/0091090 | A1 | 4/2013 | Spivack et al. |

(56) References Cited

U.S. PATENT DOCUMENTS

2013/0095805 A1 4/2013 Lebeau et al.
2013/0096909 A1 4/2013 Brun et al.
2013/0096911 A1 4/2013 Beaufort et al.
2013/0096917 A1 4/2013 Edgar et al.
2013/0097566 A1 4/2013 Berglund
2013/0097682 A1 4/2013 Zeljkovic et al.
2013/0100017 A1 4/2013 Papakipos et al.
2013/0100268 A1 4/2013 Mihailidis et al.
2013/0103391 A1 4/2013 Millmore et al.
2013/0103405 A1 4/2013 Namba et al.
2013/0106742 A1 5/2013 Lee et al.
2013/0107053 A1 5/2013 Ozaki
2013/0110505 A1 5/2013 Gruber et al.
2013/0110515 A1 5/2013 Guzzoni et al.
2013/0110518 A1 5/2013 Gruber et al.
2013/0110519 A1 5/2013 Cheyer et al.
2013/0110520 A1 5/2013 Cheyer et al.
2013/0110943 A1 5/2013 Menon et al.
2013/0111330 A1 5/2013 Staikos et al.
2013/0111348 A1 5/2013 Gruber et al.
2013/0111365 A1 5/2013 Chen et al.
2013/0111487 A1 5/2013 Cheyer et al.
2013/0111581 A1 5/2013 Griffin et al.
2013/0115927 A1 5/2013 Gruber et al.
2013/0117022 A1 5/2013 Chen et al.
2013/0124189 A1 5/2013 Baldwin et al.
2013/0124672 A1 5/2013 Pan
2013/0125168 A1 5/2013 Agnihotri et al.
2013/0132081 A1 5/2013 Ryu et al.
2013/0132084 A1 5/2013 Stonehocker et al.
2013/0132089 A1 5/2013 Fanty et al.
2013/0132871 A1 5/2013 Zeng et al.
2013/0138440 A1 5/2013 Strope et al.
2013/0141551 A1 6/2013 Kim
2013/0142317 A1 6/2013 Reynolds
2013/0142345 A1 6/2013 Waldmann
2013/0144594 A1 6/2013 Bangalore et al.
2013/0144616 A1 6/2013 Bangalore et al.
2013/0151339 A1 6/2013 Kim et al.
2013/0152092 A1 6/2013 Yadgar et al.
2013/0154811 A1 6/2013 Ferren et al.
2013/0155948 A1 6/2013 Pinheiro et al.
2013/0156198 A1 6/2013 Kim et al.
2013/0157629 A1 6/2013 Lee et al.
2013/0158977 A1 6/2013 Senior
2013/0159847 A1 6/2013 Banke et al.
2013/0159861 A1 6/2013 Rottler et al.
2013/0165232 A1 6/2013 Nelson et al.
2013/0166278 A1 6/2013 James et al.
2013/0166303 A1 6/2013 Chang et al.
2013/0166332 A1 6/2013 Hammad
2013/0166442 A1 6/2013 Nakajima et al.
2013/0167242 A1 6/2013 Paliwal
2013/0170738 A1 7/2013 Capuozzo et al.
2013/0172022 A1 7/2013 Seymour et al.
2013/0173258 A1 7/2013 Liu et al.
2013/0173268 A1 7/2013 Weng et al.
2013/0173513 A1 7/2013 Chu et al.
2013/0174034 A1 7/2013 Brown et al.
2013/0176147 A1 7/2013 Anderson et al.
2013/0176244 A1 7/2013 Yamamoto et al.
2013/0176592 A1 7/2013 Sasaki
2013/0179168 A1 7/2013 Bae et al.
2013/0179172 A1 7/2013 Nakamura et al.
2013/0179440 A1 7/2013 Gordon
2013/0183942 A1 7/2013 Novick et al.
2013/0183944 A1 7/2013 Mozer et al.
2013/0185059 A1 7/2013 Riccardi et al.
2013/0185066 A1 7/2013 Tzirkel-hancock et al.
2013/0185074 A1 7/2013 Gruber et al.
2013/0185081 A1 7/2013 Cheyer et al.
2013/0185336 A1 7/2013 Singh et al.
2013/0187850 A1 7/2013 Schulz et al.
2013/0187857 A1 7/2013 Griffin et al.
2013/0190021 A1 7/2013 Vieri et al.
2013/0191117 A1 7/2013 Atti et al.
2013/0191408 A1 7/2013 Volkert
2013/0197911 A1 8/2013 Wei et al.
2013/0197914 A1 8/2013 Yelvington et al.
2013/0198159 A1 8/2013 Hendry
2013/0198841 A1 8/2013 Poulson
2013/0204813 A1 8/2013 Master et al.
2013/0204897 A1 8/2013 McDougall
2013/0204967 A1 8/2013 Seo et al.
2013/0207898 A1 8/2013 Sullivan et al.
2013/0210410 A1 8/2013 Xu
2013/0210492 A1 8/2013 You et al.
2013/0218553 A1 8/2013 Fujii et al.
2013/0218560 A1 8/2013 Hsiao et al.
2013/0218574 A1 8/2013 Falcon et al.
2013/0218899 A1 8/2013 Raghavan et al.
2013/0219333 A1 8/2013 Palwe et al.
2013/0222249 A1 8/2013 Pasquero et al.
2013/0225128 A1 8/2013 Gomar
2013/0226935 A1 8/2013 Bai et al.
2013/0231917 A1 9/2013 Naik
2013/0234947 A1 9/2013 Kristensson et al.
2013/0235987 A1 9/2013 Arroniz-Escobar et al.
2013/0238326 A1 9/2013 Kim et al.
2013/0238647 A1 9/2013 Thompson
2013/0238729 A1 9/2013 Holzman et al.
2013/0244615 A1 9/2013 Miller et al.
2013/0246048 A1 9/2013 Nagase et al.
2013/0246050 A1 9/2013 Yu et al.
2013/0246329 A1 9/2013 Pasquero et al.
2013/0253911 A1 9/2013 Petri et al.
2013/0253912 A1 9/2013 Medlock et al.
2013/0262168 A1 10/2013 Makanawala et al.
2013/0268263 A1 10/2013 Park et al.
2013/0268956 A1 10/2013 Recco
2013/0275117 A1 10/2013 Winer
2013/0275138 A1 10/2013 Gruber et al.
2013/0275164 A1 10/2013 Gruber et al.
2013/0275199 A1 10/2013 Proctor, Jr. et al.
2013/0275625 A1 10/2013 Taivalsaari et al.
2013/0275875 A1 10/2013 Gruber et al.
2013/0275899 A1 10/2013 Schubert et al.
2013/0279724 A1 10/2013 Stafford et al.
2013/0282709 A1 10/2013 Zhu et al.
2013/0283168 A1 10/2013 Brown et al.
2013/0283199 A1 10/2013 Selig et al.
2013/0283283 A1 10/2013 Wang et al.
2013/0285913 A1 10/2013 Griffin et al.
2013/0289991 A1 10/2013 Eshwar et al.
2013/0289993 A1 10/2013 Rao et al.
2013/0289994 A1 10/2013 Newman et al.
2013/0291015 A1 10/2013 Pan
2013/0297198 A1 11/2013 Velde et al.
2013/0297317 A1 11/2013 Lee et al.
2013/0297319 A1 11/2013 Kim
2013/0297348 A1 11/2013 Cardoza et al.
2013/0300645 A1 11/2013 Fedorov
2013/0300648 A1 11/2013 Kim et al.
2013/0303106 A1 11/2013 Martin
2013/0304479 A1 11/2013 Teller et al.
2013/0304758 A1 11/2013 Gruber et al.
2013/0304815 A1 11/2013 Puente et al.
2013/0305119 A1 11/2013 Kern et al.
2013/0307855 A1 11/2013 Lamb et al.
2013/0307997 A1 11/2013 O'Keefe et al.
2013/0308922 A1 11/2013 Sano et al.
2013/0311179 A1 11/2013 Wagner
2013/0311184 A1 11/2013 Badavne et al.
2013/0311487 A1 11/2013 Moore et al.
2013/0311997 A1 11/2013 Gruber et al.
2013/0315038 A1 11/2013 Ferren et al.
2013/0316679 A1 11/2013 Miller et al.
2013/0316746 A1 11/2013 Miller et al.
2013/0317921 A1 11/2013 Havas
2013/0318478 A1 11/2013 Ogura
2013/0321267 A1 12/2013 Bhatti et al.
2013/0322634 A1 12/2013 Bennett et al.
2013/0322665 A1 12/2013 Bennett et al.
2013/0325340 A1 12/2013 Forstall et al.

(56) References Cited

U.S. PATENT DOCUMENTS

| | | | |
|---|---|---|---|
| 2013/0325436 | A1 | 12/2013 | Wang et al. |
| 2013/0325443 | A1 | 12/2013 | Begeja et al. |
| 2013/0325447 | A1 | 12/2013 | Levien et al. |
| 2013/0325448 | A1 | 12/2013 | Levien et al. |
| 2013/0325480 | A1 | 12/2013 | Lee et al. |
| 2013/0325481 | A1 | 12/2013 | Van Os et al. |
| 2013/0325484 | A1 | 12/2013 | Chakladar et al. |
| 2013/0325967 | A1 | 12/2013 | Parks et al. |
| 2013/0325970 | A1 | 12/2013 | Roberts et al. |
| 2013/0325979 | A1 | 12/2013 | Mansfield et al. |
| 2013/0328809 | A1 | 12/2013 | Smith |
| 2013/0329023 | A1 | 12/2013 | Suplee, III et al. |
| 2013/0331127 | A1 | 12/2013 | Sabatelli et al. |
| 2013/0332159 | A1 | 12/2013 | Federighi et al. |
| 2013/0332162 | A1 | 12/2013 | Keen |
| 2013/0332164 | A1 | 12/2013 | Nalk |
| 2013/0332168 | A1 | 12/2013 | Kim et al. |
| 2013/0332172 | A1 | 12/2013 | Prakash et al. |
| 2013/0332400 | A1 | 12/2013 | González |
| 2013/0332538 | A1 | 12/2013 | Clark et al. |
| 2013/0339256 | A1 | 12/2013 | Shroff |
| 2013/0339454 | A1 | 12/2013 | Walker et al. |
| 2013/0339991 | A1 | 12/2013 | Ricci |
| 2013/0342672 | A1 | 12/2013 | Gray et al. |
| 2013/0343584 | A1 | 12/2013 | Bennett et al. |
| 2013/0343721 | A1 | 12/2013 | Abecassis |
| 2013/0346065 | A1 | 12/2013 | Davidson et al. |
| 2013/0346068 | A1 | 12/2013 | Solem et al. |
| 2013/0346347 | A1 | 12/2013 | Patterson et al. |
| 2013/0347018 | A1 | 12/2013 | Limp et al. |
| 2013/0347029 | A1 | 12/2013 | Tang et al. |
| 2013/0347102 | A1 | 12/2013 | Shi |
| 2013/0347117 | A1 | 12/2013 | Parks et al. |
| 2014/0001255 | A1 | 1/2014 | Anthoine |
| 2014/0006012 | A1 | 1/2014 | Zhou et al. |
| 2014/0006025 | A1 | 1/2014 | Krishnan et al. |
| 2014/0006027 | A1 | 1/2014 | Kim et al. |
| 2014/0006030 | A1 | 1/2014 | Fleizach et al. |
| 2014/0006153 | A1 | 1/2014 | Thangam et al. |
| 2014/0006483 | A1 | 1/2014 | Garmark et al. |
| 2014/0006496 | A1 | 1/2014 | Dearman et al. |
| 2014/0006562 | A1 | 1/2014 | Handa et al. |
| 2014/0006947 | A1 | 1/2014 | Garmark et al. |
| 2014/0006955 | A1 | 1/2014 | Greenzeiger et al. |
| 2014/0008163 | A1 | 1/2014 | Mikonaho et al. |
| 2014/0012574 | A1 | 1/2014 | Pasupalak et al. |
| 2014/0012580 | A1 | 1/2014 | Ganong et al. |
| 2014/0012586 | A1 | 1/2014 | Rubin et al. |
| 2014/0012587 | A1 | 1/2014 | Park |
| 2014/0019116 | A1 | 1/2014 | Lundberg et al. |
| 2014/0019133 | A1 | 1/2014 | Bao et al. |
| 2014/0019460 | A1 | 1/2014 | Sambrani et al. |
| 2014/0028029 | A1 | 1/2014 | Jochman |
| 2014/0028477 | A1 | 1/2014 | Michalske |
| 2014/0028735 | A1 | 1/2014 | Williams et al. |
| 2014/0032453 | A1 | 1/2014 | Eustice et al. |
| 2014/0033071 | A1 | 1/2014 | Gruber et al. |
| 2014/0035823 | A1 | 2/2014 | Khoe et al. |
| 2014/0037075 | A1 | 2/2014 | Bouzid et al. |
| 2014/0039888 | A1 | 2/2014 | Taubman et al. |
| 2014/0039893 | A1 | 2/2014 | Weiner |
| 2014/0039894 | A1 | 2/2014 | Shostak |
| 2014/0040274 | A1 | 2/2014 | Aravamudan et al. |
| 2014/0040748 | A1 | 2/2014 | Lemay et al. |
| 2014/0040754 | A1 | 2/2014 | Donelli |
| 2014/0040801 | A1 | 2/2014 | Patel et al. |
| 2014/0040918 | A1 | 2/2014 | Li et al. |
| 2014/0040961 | A1 | 2/2014 | Green, Sr. et al. |
| 2014/0046934 | A1 | 2/2014 | Zhou et al. |
| 2014/0047001 | A1 | 2/2014 | Phillips et al. |
| 2014/0052451 | A1 | 2/2014 | Cheong et al. |
| 2014/0052680 | A1 | 2/2014 | Nitz et al. |
| 2014/0052791 | A1 | 2/2014 | Chakra et al. |
| 2014/0053082 | A1 | 2/2014 | Park et al. |
| 2014/0053101 | A1 | 2/2014 | Buehler et al. |
| 2014/0053210 | A1 | 2/2014 | Cheong et al. |
| 2014/0057610 | A1 | 2/2014 | Olincy et al. |
| 2014/0059030 | A1 | 2/2014 | Hakkani-Tur et al. |
| 2014/0067361 | A1 | 3/2014 | Nikoulina et al. |
| 2014/0067371 | A1 | 3/2014 | Liensberger |
| 2014/0067402 | A1 | 3/2014 | Kim |
| 2014/0067738 | A1 | 3/2014 | Kingsbury |
| 2014/0068751 | A1 | 3/2014 | Last et al. |
| 2014/0074454 | A1 | 3/2014 | Brown et al. |
| 2014/0074466 | A1 | 3/2014 | Sharifi et al. |
| 2014/0074470 | A1 | 3/2014 | Jansche et al. |
| 2014/0074472 | A1 | 3/2014 | Lin et al. |
| 2014/0074483 | A1 | 3/2014 | Van Os |
| 2014/0074589 | A1 | 3/2014 | Nielsen et al. |
| 2014/0074815 | A1 | 3/2014 | Plimton |
| 2014/0075453 | A1 | 3/2014 | Bellessort et al. |
| 2014/0078065 | A1 | 3/2014 | Akkok et al. |
| 2014/0079195 | A1 | 3/2014 | Srivastava et al. |
| 2014/0080410 | A1 | 3/2014 | Jung et al. |
| 2014/0080428 | A1 | 3/2014 | Rhoads et al. |
| 2014/0081619 | A1 | 3/2014 | Solntseva et al. |
| 2014/0081633 | A1 | 3/2014 | Badaskar et al. |
| 2014/0081635 | A1 | 3/2014 | Yanagihara |
| 2014/0081829 | A1 | 3/2014 | Milne |
| 2014/0081941 | A1 | 3/2014 | Bai et al. |
| 2014/0082500 | A1 | 3/2014 | Wilensky et al. |
| 2014/0082501 | A1 | 3/2014 | Bae et al. |
| 2014/0082715 | A1 | 3/2014 | Grajek et al. |
| 2014/0086458 | A1 | 3/2014 | Rogers et al. |
| 2014/0087711 | A1 | 3/2014 | Geyer et al. |
| 2014/0088952 | A1 | 3/2014 | Fife et al. |
| 2014/0088961 | A1 | 3/2014 | Woodward et al. |
| 2014/0088964 | A1 | 3/2014 | Bellegarda |
| 2014/0088970 | A1 | 3/2014 | Kang |
| 2014/0095171 | A1 | 4/2014 | Lynch et al. |
| 2014/0095172 | A1 | 4/2014 | Cabaco et al. |
| 2014/0095173 | A1 | 4/2014 | Lynch et al. |
| 2014/0095601 | A1 | 4/2014 | Abuelsaad et al. |
| 2014/0095965 | A1 | 4/2014 | Li |
| 2014/0096209 | A1 | 4/2014 | Saraf et al. |
| 2014/0098247 | A1 | 4/2014 | Rao et al. |
| 2014/0100847 | A1 | 4/2014 | Ishii et al. |
| 2014/0101127 | A1 | 4/2014 | Simhon et al. |
| 2014/0104175 | A1 | 4/2014 | Ouyang et al. |
| 2014/0108017 | A1 | 4/2014 | Mason et al. |
| 2014/0108391 | A1 | 4/2014 | Volkert |
| 2014/0112556 | A1 | 4/2014 | Kalinli-akbacak |
| 2014/0114554 | A1 | 4/2014 | Lagassey |
| 2014/0115062 | A1 | 4/2014 | Liu et al. |
| 2014/0115114 | A1 | 4/2014 | Garmark et al. |
| 2014/0118155 | A1 | 5/2014 | Bowers et al. |
| 2014/0118624 | A1 | 5/2014 | Jang et al. |
| 2014/0122059 | A1 | 5/2014 | Patel et al. |
| 2014/0122085 | A1 | 5/2014 | Piety et al. |
| 2014/0122086 | A1 | 5/2014 | Kapur et al. |
| 2014/0122136 | A1 | 5/2014 | Jayanthi |
| 2014/0122153 | A1 | 5/2014 | Truitt |
| 2014/0129226 | A1 | 5/2014 | Lee et al. |
| 2014/0132935 | A1 | 5/2014 | Kim et al. |
| 2014/0134983 | A1 | 5/2014 | Jung et al. |
| 2014/0135036 | A1 | 5/2014 | Bonanni et al. |
| 2014/0136013 | A1 | 5/2014 | Wolverton et al. |
| 2014/0136187 | A1 | 5/2014 | Wolverton et al. |
| 2014/0136195 | A1 | 5/2014 | Abdossalami et al. |
| 2014/0136212 | A1 | 5/2014 | Kwon et al. |
| 2014/0136946 | A1 | 5/2014 | Matas |
| 2014/0136987 | A1 | 5/2014 | Rodriguez |
| 2014/0142922 | A1 | 5/2014 | Liang et al. |
| 2014/0142923 | A1 | 5/2014 | Jones et al. |
| 2014/0142935 | A1 | 5/2014 | Lindahl et al. |
| 2014/0142953 | A1 | 5/2014 | Kim et al. |
| 2014/0143550 | A1 | 5/2014 | Ganong, III et al. |
| 2014/0143721 | A1 | 5/2014 | Suzuki et al. |
| 2014/0146200 | A1 | 5/2014 | Scott et al. |
| 2014/0149118 | A1 | 5/2014 | Lee et al. |
| 2014/0152577 | A1 | 6/2014 | Yuen et al. |
| 2014/0153709 | A1 | 6/2014 | Byrd et al. |
| 2014/0155031 | A1 | 6/2014 | Lee et al. |
| 2014/0156262 | A1 | 6/2014 | Yuen et al. |

(56) References Cited

U.S. PATENT DOCUMENTS

| | | | |
|---|---|---|---|
| 2014/0156279 | A1 | 6/2014 | Okamoto et al. |
| 2014/0157319 | A1 | 6/2014 | Kimura et al. |
| 2014/0157422 | A1 | 6/2014 | Livshits et al. |
| 2014/0163951 | A1 | 6/2014 | Nikoulina et al. |
| 2014/0163953 | A1 | 6/2014 | Parikh |
| 2014/0163954 | A1 | 6/2014 | Joshi et al. |
| 2014/0163962 | A1 | 6/2014 | Castelli et al. |
| 2014/0163976 | A1 | 6/2014 | Park et al. |
| 2014/0163977 | A1 | 6/2014 | Hoffmeister et al. |
| 2014/0163981 | A1 | 6/2014 | Cook et al. |
| 2014/0163995 | A1 | 6/2014 | Burns et al. |
| 2014/0164305 | A1 | 6/2014 | Lynch et al. |
| 2014/0164312 | A1 | 6/2014 | Lynch et al. |
| 2014/0164476 | A1 | 6/2014 | Thomson |
| 2014/0164508 | A1 | 6/2014 | Lynch et al. |
| 2014/0164532 | A1 | 6/2014 | Lynch et al. |
| 2014/0164533 | A1 | 6/2014 | Lynch et al. |
| 2014/0164953 | A1 | 6/2014 | Lynch et al. |
| 2014/0169795 | A1 | 6/2014 | Clough |
| 2014/0171064 | A1 | 6/2014 | Das |
| 2014/0172878 | A1 | 6/2014 | Clark et al. |
| 2014/0173460 | A1 | 6/2014 | Kim |
| 2014/0176814 | A1 | 6/2014 | Ahn |
| 2014/0179295 | A1 | 6/2014 | Luebbers et al. |
| 2014/0180499 | A1 | 6/2014 | Cooper et al. |
| 2014/0180689 | A1 | 6/2014 | Kim et al. |
| 2014/0180697 | A1 | 6/2014 | Torok et al. |
| 2014/0181865 | A1 | 6/2014 | Koganei |
| 2014/0188460 | A1 | 7/2014 | Ouyang et al. |
| 2014/0188477 | A1 | 7/2014 | Zhang |
| 2014/0188478 | A1 | 7/2014 | Zhang |
| 2014/0188485 | A1 | 7/2014 | Kim et al. |
| 2014/0188835 | A1 | 7/2014 | Zhang et al. |
| 2014/0195226 | A1 | 7/2014 | Yun et al. |
| 2014/0195230 | A1 | 7/2014 | Han et al. |
| 2014/0195233 | A1 | 7/2014 | Bapat |
| 2014/0195244 | A1 | 7/2014 | Cha et al. |
| 2014/0195251 | A1 | 7/2014 | Zeinstra et al. |
| 2014/0195252 | A1 | 7/2014 | Gruber et al. |
| 2014/0198048 | A1 | 7/2014 | Unruh et al. |
| 2014/0203939 | A1 | 7/2014 | Harrington et al. |
| 2014/0205076 | A1 | 7/2014 | Kumar et al. |
| 2014/0207439 | A1 | 7/2014 | Venkatapathy et al. |
| 2014/0207446 | A1 | 7/2014 | Klein et al. |
| 2014/0207447 | A1 | 7/2014 | Jiang et al. |
| 2014/0207466 | A1 | 7/2014 | Smadi et al. |
| 2014/0207468 | A1 | 7/2014 | Bartnik |
| 2014/0207582 | A1 | 7/2014 | Flinn et al. |
| 2014/0211944 | A1 | 7/2014 | Hayward et al. |
| 2014/0214429 | A1 | 7/2014 | Pantel |
| 2014/0214537 | A1 | 7/2014 | Yoo et al. |
| 2014/0215513 | A1 | 7/2014 | Ramer et al. |
| 2014/0218372 | A1 | 8/2014 | Missig et al. |
| 2014/0222435 | A1 | 8/2014 | Li et al. |
| 2014/0222436 | A1 | 8/2014 | Binder et al. |
| 2014/0222678 | A1 | 8/2014 | Sheets et al. |
| 2014/0222967 | A1 | 8/2014 | Harrang et al. |
| 2014/0223377 | A1 | 8/2014 | Shaw et al. |
| 2014/0223481 | A1 | 8/2014 | Fundament |
| 2014/0226503 | A1 | 8/2014 | Cooper et al. |
| 2014/0229158 | A1 | 8/2014 | Zweig et al. |
| 2014/0229184 | A1 | 8/2014 | Shires |
| 2014/0230055 | A1 | 8/2014 | Boehl |
| 2014/0232570 | A1 | 8/2014 | Skinder et al. |
| 2014/0232656 | A1 | 8/2014 | Pasquero et al. |
| 2014/0236595 | A1 | 8/2014 | Gray |
| 2014/0236986 | A1 | 8/2014 | Guzman |
| 2014/0237042 | A1 | 8/2014 | Ahmed et al. |
| 2014/0237366 | A1 | 8/2014 | Poulos et al. |
| 2014/0244248 | A1 | 8/2014 | Arisoy et al. |
| 2014/0244249 | A1 | 8/2014 | Mohamed et al. |
| 2014/0244254 | A1 | 8/2014 | Ju et al. |
| 2014/0244257 | A1 | 8/2014 | Colibro et al. |
| 2014/0244258 | A1 | 8/2014 | Song et al. |
| 2014/0244263 | A1 | 8/2014 | Pontual et al. |
| 2014/0244266 | A1 | 8/2014 | Brown et al. |
| 2014/0244268 | A1 | 8/2014 | Abdelsamie et al. |
| 2014/0244270 | A1 | 8/2014 | Han et al. |
| 2014/0244271 | A1 | 8/2014 | Lindahl |
| 2014/0244712 | A1 | 8/2014 | Walters et al. |
| 2014/0245140 | A1 | 8/2014 | Brown et al. |
| 2014/0247383 | A1 | 9/2014 | Dave et al. |
| 2014/0247926 | A1 | 9/2014 | Gainsboro et al. |
| 2014/0249812 | A1 | 9/2014 | Bou-Ghazale et al. |
| 2014/0249816 | A1 | 9/2014 | Pickering et al. |
| 2014/0249817 | A1 | 9/2014 | Hart et al. |
| 2014/0249820 | A1 | 9/2014 | Hsu et al. |
| 2014/0249821 | A1 | 9/2014 | Kennewick et al. |
| 2014/0250046 | A1 | 9/2014 | Winn et al. |
| 2014/0257809 | A1 | 9/2014 | Goel et al. |
| 2014/0257815 | A1 | 9/2014 | Zhao et al. |
| 2014/0257902 | A1 | 9/2014 | Moore et al. |
| 2014/0258324 | A1 | 9/2014 | Mauro et al. |
| 2014/0258357 | A1 | 9/2014 | Singh et al. |
| 2014/0258857 | A1 | 9/2014 | Dykstra-Erickson et al. |
| 2014/0258905 | A1 | 9/2014 | Lee et al. |
| 2014/0267022 | A1 | 9/2014 | Kim |
| 2014/0267599 | A1 | 9/2014 | Drouin et al. |
| 2014/0267933 | A1 | 9/2014 | Young |
| 2014/0272821 | A1 | 9/2014 | Pitschel et al. |
| 2014/0273979 | A1 | 9/2014 | Van Os et al. |
| 2014/0274005 | A1 | 9/2014 | Luna et al. |
| 2014/0274203 | A1 | 9/2014 | Ganong et al. |
| 2014/0274211 | A1 | 9/2014 | Sejnoha et al. |
| 2014/0278051 | A1 | 9/2014 | Mcgavran et al. |
| 2014/0278343 | A1 | 9/2014 | Tran |
| 2014/0278349 | A1 | 9/2014 | Grieves et al. |
| 2014/0278379 | A1 | 9/2014 | Coccaro et al. |
| 2014/0278390 | A1 | 9/2014 | Kingsbury et al. |
| 2014/0278391 | A1 | 9/2014 | Braho et al. |
| 2014/0278394 | A1 | 9/2014 | Bastyr et al. |
| 2014/0278406 | A1 | 9/2014 | Tsumura et al. |
| 2014/0278413 | A1 | 9/2014 | Pitschel et al. |
| 2014/0278426 | A1 | 9/2014 | Jost et al. |
| 2014/0278429 | A1 | 9/2014 | Ganong, III |
| 2014/0278435 | A1 | 9/2014 | Ganong et al. |
| 2014/0278436 | A1 | 9/2014 | Khanna et al. |
| 2014/0278438 | A1 | 9/2014 | Hart et al. |
| 2014/0278443 | A1 | 9/2014 | Gunn et al. |
| 2014/0278444 | A1 | 9/2014 | Larson et al. |
| 2014/0278513 | A1 | 9/2014 | Prakash et al. |
| 2014/0279622 | A1 | 9/2014 | Lamoureux et al. |
| 2014/0279739 | A1 | 9/2014 | Elkington et al. |
| 2014/0279787 | A1 | 9/2014 | Cheng et al. |
| 2014/0280072 | A1 | 9/2014 | Coleman |
| 2014/0280107 | A1 | 9/2014 | Heymans et al. |
| 2014/0280138 | A1 | 9/2014 | Li et al. |
| 2014/0280292 | A1 | 9/2014 | Skinder |
| 2014/0280353 | A1 | 9/2014 | Delaney et al. |
| 2014/0280450 | A1 | 9/2014 | Luna |
| 2014/0281944 | A1 | 9/2014 | Winer |
| 2014/0281983 | A1 | 9/2014 | Xian et al. |
| 2014/0281997 | A1 | 9/2014 | Fleizach et al. |
| 2014/0282003 | A1 | 9/2014 | Gruber et al. |
| 2014/0282007 | A1 | 9/2014 | Fleizach |
| 2014/0282045 | A1 | 9/2014 | Ayanam et al. |
| 2014/0282178 | A1 | 9/2014 | Borzello et al. |
| 2014/0282201 | A1 | 9/2014 | Pasquero et al. |
| 2014/0282203 | A1 | 9/2014 | Pasquero et al. |
| 2014/0282559 | A1 | 9/2014 | Verduzco et al. |
| 2014/0282586 | A1 | 9/2014 | Shear et al. |
| 2014/0282743 | A1 | 9/2014 | Howard et al. |
| 2014/0288990 | A1 | 9/2014 | Moore et al. |
| 2014/0289508 | A1 | 9/2014 | Wang |
| 2014/0297267 | A1 | 10/2014 | Spencer et al. |
| 2014/0297281 | A1 | 10/2014 | Togawa et al. |
| 2014/0297284 | A1 | 10/2014 | Gruber et al. |
| 2014/0297288 | A1 | 10/2014 | Yu et al. |
| 2014/0298395 | A1 | 10/2014 | Yang et al. |
| 2014/0304086 | A1 | 10/2014 | Dasdan et al. |
| 2014/0304605 | A1 | 10/2014 | Ohmura et al. |
| 2014/0309990 | A1 | 10/2014 | Gandrabur et al. |
| 2014/0309996 | A1 | 10/2014 | Zhang |
| 2014/0310001 | A1 | 10/2014 | Kalns et al. |

(56) References Cited

U.S. PATENT DOCUMENTS

2014/0310002 A1 10/2014 Nitz et al.
2014/0310348 A1 10/2014 Keskitalo et al.
2014/0310365 A1 10/2014 Sample et al.
2014/0310595 A1 10/2014 Acharya et al.
2014/0313007 A1 10/2014 Harding
2014/0315492 A1 10/2014 Woods
2014/0316585 A1 10/2014 Boesveld et al.
2014/0317030 A1 10/2014 Shen et al.
2014/0317502 A1 10/2014 Brown et al.
2014/0324429 A1 10/2014 Weilhammer et al.
2014/0324884 A1 10/2014 Lindahl et al.
2014/0330569 A1 11/2014 Kolavennu et al.
2014/0330951 A1 11/2014 Sukoff et al.
2014/0335823 A1 11/2014 Heredia et al.
2014/0337037 A1 11/2014 Chi
2014/0337048 A1 11/2014 Brown et al.
2014/0337266 A1 11/2014 Wolverton et al.
2014/0337370 A1 11/2014 Aravamudan et al.
2014/0337371 A1 11/2014 Li
2014/0337438 A1 11/2014 Govande et al.
2014/0337621 A1 11/2014 Nakhimov
2014/0337751 A1 11/2014 Lim et al.
2014/0337814 A1 11/2014 Kalns et al.
2014/0342762 A1 11/2014 Hajdu et al.
2014/0343834 A1 11/2014 Demerchant et al.
2014/0343943 A1 11/2014 Al-telmissani
2014/0343946 A1 11/2014 Torok et al.
2014/0344205 A1 11/2014 Luna et al.
2014/0344627 A1 11/2014 Schaub et al.
2014/0344687 A1 11/2014 Durham et al.
2014/0347181 A1 11/2014 Luna et al.
2014/0350847 A1 11/2014 Ichinokawa
2014/0350924 A1 11/2014 Zurek et al.
2014/0350933 A1 11/2014 Bak et al.
2014/0351741 A1 11/2014 Medlock et al.
2014/0351760 A1 11/2014 Skory et al.
2014/0358519 A1 12/2014 Mirkin et al.
2014/0358523 A1 12/2014 Sheth et al.
2014/0358549 A1 12/2014 O'connor et al.
2014/0359637 A1 12/2014 Yan
2014/0359709 A1 12/2014 Nassar et al.
2014/0361973 A1 12/2014 Raux et al.
2014/0363074 A1 12/2014 Dolfing et al.
2014/0364149 A1 12/2014 Marti et al.
2014/0365209 A1 12/2014 Evermann
2014/0365214 A1 12/2014 Bayley
2014/0365216 A1 12/2014 Gruber et al.
2014/0365226 A1 12/2014 Sinha
2014/0365227 A1 12/2014 Cash et al.
2014/0365407 A1 12/2014 Brown et al.
2014/0365505 A1 12/2014 Clark et al.
2014/0365880 A1 12/2014 Bellegarda
2014/0365885 A1 12/2014 Carson et al.
2014/0365895 A1 12/2014 Paulson et al.
2014/0365922 A1 12/2014 Yang
2014/0365945 A1 12/2014 Karunamuni et al.
2014/0370817 A1 12/2014 Luna
2014/0370841 A1 12/2014 Roberts et al.
2014/0372112 A1 12/2014 Xue et al.
2014/0372356 A1 12/2014 Bilal et al.
2014/0372468 A1 12/2014 Collins et al.
2014/0372931 A1 12/2014 Zhai et al.
2014/0379334 A1 12/2014 Fry
2014/0379341 A1 12/2014 Seo et al.
2014/0379798 A1 12/2014 Bunner et al.
2014/0380285 A1 12/2014 Gabel et al.
2015/0003797 A1 1/2015 Schmidt
2015/0004958 A1 1/2015 Wang et al.
2015/0006148 A1 1/2015 Goldszmit et al.
2015/0006157 A1 1/2015 Andrade Silva et al.
2015/0006167 A1 1/2015 Kato et al.
2015/0006176 A1 1/2015 Pogue et al.
2015/0006178 A1 1/2015 Peng et al.
2015/0006184 A1 1/2015 Marti et al.
2015/0006199 A1 1/2015 Snider et al.
2015/0012271 A1 1/2015 Peng et al.
2015/0019219 A1 1/2015 Tzirkel-hancock et al.
2015/0019221 A1 1/2015 Lee et al.
2015/0019944 A1 1/2015 Kalgi
2015/0019974 A1 1/2015 Doi et al.
2015/0025405 A1 1/2015 Vairavan et al.
2015/0026620 A1 1/2015 Kwon et al.
2015/0027178 A1 1/2015 Scalisi
2015/0031416 A1 1/2015 Wells et al.
2015/0032443 A1 1/2015 Karov et al.
2015/0033219 A1 1/2015 Breiner et al.
2015/0033275 A1 1/2015 Natani et al.
2015/0034855 A1 2/2015 Shen
2015/0038161 A1 2/2015 Jakobson et al.
2015/0039292 A1 2/2015 Suleman et al.
2015/0039295 A1 2/2015 Soschen
2015/0039299 A1 2/2015 Weinstein et al.
2015/0039305 A1 2/2015 Huang
2015/0039606 A1 2/2015 Salaka et al.
2015/0040012 A1 2/2015 Faaborg et al.
2015/0045003 A1 2/2015 Vora et al.
2015/0045007 A1 2/2015 Cash
2015/0045068 A1 2/2015 Soffer et al.
2015/0046434 A1 2/2015 Lim et al.
2015/0046537 A1 2/2015 Rakib
2015/0046828 A1 2/2015 Desai et al.
2015/0050633 A1 2/2015 Christmas et al.
2015/0050923 A1 2/2015 Tu et al.
2015/0051754 A1 2/2015 Kwon et al.
2015/0053779 A1 2/2015 Adamek et al.
2015/0053781 A1 2/2015 Nelson et al.
2015/0055879 A1 2/2015 Yang
2015/0058013 A1 2/2015 Pakhomov et al.
2015/0058018 A1 2/2015 Georges et al.
2015/0058720 A1 2/2015 Smadja et al.
2015/0058785 A1 2/2015 Ookawara
2015/0065149 A1 3/2015 Russell et al.
2015/0065200 A1 3/2015 Namgung et al.
2015/0066494 A1 3/2015 Salvador et al.
2015/0066496 A1 3/2015 Deoras et al.
2015/0066506 A1 3/2015 Romano et al.
2015/0066516 A1 3/2015 Nishikawa et al.
2015/0066817 A1 3/2015 Slayton et al.
2015/0067485 A1 3/2015 Kim et al.
2015/0067822 A1 3/2015 Randall
2015/0071121 A1 3/2015 Patil et al.
2015/0073788 A1 3/2015 Allauzen et al.
2015/0073804 A1 3/2015 Senior et al.
2015/0074524 A1 3/2015 Nicholson et al.
2015/0074615 A1 3/2015 Han et al.
2015/0081295 A1 3/2015 Yun et al.
2015/0082229 A1 3/2015 Ouyang et al.
2015/0086174 A1 3/2015 Abecassis et al.
2015/0088511 A1 3/2015 Bharadwaj et al.
2015/0088514 A1 3/2015 Typrin
2015/0088518 A1 3/2015 Kim et al.
2015/0088522 A1 3/2015 Hendrickson et al.
2015/0088523 A1 3/2015 Schuster
2015/0088998 A1 3/2015 Isensee et al.
2015/0092520 A1 4/2015 Robison et al.
2015/0094834 A1 4/2015 Vega et al.
2015/0095031 A1 4/2015 Conkie et al.
2015/0095268 A1 4/2015 Greenzeiger et al.
2015/0095278 A1 4/2015 Flinn et al.
2015/0100144 A1 4/2015 Lee et al.
2015/0100313 A1 4/2015 Sharma
2015/0100316 A1 4/2015 Williams et al.
2015/0100537 A1 4/2015 Grieves et al.
2015/0100983 A1 4/2015 Pan
2015/0106093 A1 4/2015 Weeks et al.
2015/0106737 A1 4/2015 Montoy-Wilson et al.
2015/0113407 A1 4/2015 Hoffert et al.
2015/0113435 A1 4/2015 Phillips
2015/0120296 A1 4/2015 Stern et al.
2015/0120641 A1 4/2015 Soon-shiong et al.
2015/0120723 A1 4/2015 Deshmukh et al.
2015/0121216 A1 4/2015 Brown et al.
2015/0123898 A1 5/2015 Kim et al.
2015/0127337 A1 5/2015 Heigold et al.

(56) References Cited

U.S. PATENT DOCUMENTS

| | | | |
|---|---|---|---|
| 2015/0127348 | A1 | 5/2015 | Follis |
| 2015/0127350 | A1 | 5/2015 | Agiomyrgiannakis |
| 2015/0133049 | A1 | 5/2015 | Lee et al. |
| 2015/0133109 | A1 | 5/2015 | Freeman et al. |
| 2015/0134318 | A1 | 5/2015 | Cuthbert et al. |
| 2015/0134322 | A1 | 5/2015 | Cuthbert et al. |
| 2015/0134334 | A1 | 5/2015 | Sachidanandam et al. |
| 2015/0135085 | A1 | 5/2015 | Shoham et al. |
| 2015/0135123 | A1 | 5/2015 | Carr et al. |
| 2015/0140934 | A1 | 5/2015 | Abdurrahman et al. |
| 2015/0141150 | A1 | 5/2015 | Zha |
| 2015/0142420 | A1 | 5/2015 | Sarikaya et al. |
| 2015/0142438 | A1 | 5/2015 | Dai et al. |
| 2015/0142447 | A1 | 5/2015 | Kennewick et al. |
| 2015/0142851 | A1 | 5/2015 | Gupta et al. |
| 2015/0143419 | A1 | 5/2015 | Bhagwat et al. |
| 2015/0148013 | A1 | 5/2015 | Baldwin et al. |
| 2015/0149177 | A1 | 5/2015 | Kalns et al. |
| 2015/0149182 | A1 | 5/2015 | Kalns et al. |
| 2015/0149354 | A1 | 5/2015 | Mccoy |
| 2015/0149469 | A1 | 5/2015 | Xu et al. |
| 2015/0149899 | A1 | 5/2015 | Bernstein et al. |
| 2015/0149964 | A1 | 5/2015 | Bernstein et al. |
| 2015/0154001 | A1 | 6/2015 | Knox et al. |
| 2015/0154185 | A1 | 6/2015 | Waibel |
| 2015/0154976 | A1 | 6/2015 | Mutagi |
| 2015/0160855 | A1 | 6/2015 | Bi |
| 2015/0161291 | A1 | 6/2015 | Gur et al. |
| 2015/0161370 | A1 | 6/2015 | North et al. |
| 2015/0161521 | A1 | 6/2015 | Shah et al. |
| 2015/0161989 | A1 | 6/2015 | Hsu et al. |
| 2015/0162001 | A1 | 6/2015 | Kar et al. |
| 2015/0162006 | A1 | 6/2015 | Kummer |
| 2015/0163558 | A1 | 6/2015 | Wheatley |
| 2015/0169081 | A1 | 6/2015 | Neels et al. |
| 2015/0169284 | A1 | 6/2015 | Quast et al. |
| 2015/0169336 | A1 | 6/2015 | Harper et al. |
| 2015/0169696 | A1 | 6/2015 | Krishnappa et al. |
| 2015/0170073 | A1 | 6/2015 | Baker |
| 2015/0170664 | A1 | 6/2015 | Doherty et al. |
| 2015/0172262 | A1 | 6/2015 | Ortiz, Jr. et al. |
| 2015/0172463 | A1 | 6/2015 | Quast et al. |
| 2015/0178388 | A1 | 6/2015 | Winnemoeller et al. |
| 2015/0178785 | A1 | 6/2015 | Salonen |
| 2015/0179176 | A1 | 6/2015 | Ryu et al. |
| 2015/0181285 | A1 | 6/2015 | Zhang et al. |
| 2015/0185964 | A1 | 7/2015 | Stout |
| 2015/0185996 | A1 | 7/2015 | Brown et al. |
| 2015/0186012 | A1 | 7/2015 | Coleman et al. |
| 2015/0186110 | A1 | 7/2015 | Kannan |
| 2015/0186154 | A1 | 7/2015 | Brown et al. |
| 2015/0186155 | A1 | 7/2015 | Brown et al. |
| 2015/0186156 | A1 | 7/2015 | Brown et al. |
| 2015/0186351 | A1 | 7/2015 | Hicks et al. |
| 2015/0186538 | A1 | 7/2015 | Yan et al. |
| 2015/0186783 | A1 | 7/2015 | Byrne et al. |
| 2015/0187355 | A1 | 7/2015 | Parkinson et al. |
| 2015/0187369 | A1 | 7/2015 | Dadu et al. |
| 2015/0189362 | A1 | 7/2015 | Lee et al. |
| 2015/0193379 | A1 | 7/2015 | Mehta |
| 2015/0193391 | A1 | 7/2015 | Khvostichenko et al. |
| 2015/0193392 | A1 | 7/2015 | Greenblatt et al. |
| 2015/0194152 | A1 | 7/2015 | Katuri et al. |
| 2015/0194165 | A1 | 7/2015 | Faaborg et al. |
| 2015/0195379 | A1 | 7/2015 | Zhang et al. |
| 2015/0195606 | A1 | 7/2015 | McDevitt |
| 2015/0199077 | A1 | 7/2015 | Zuger et al. |
| 2015/0199960 | A1 | 7/2015 | Huo et al. |
| 2015/0199965 | A1 | 7/2015 | Leak et al. |
| 2015/0199967 | A1 | 7/2015 | Reddy et al. |
| 2015/0201064 | A1 | 7/2015 | Bells et al. |
| 2015/0201077 | A1 | 7/2015 | Konig et al. |
| 2015/0205425 | A1 | 7/2015 | Kuscher et al. |
| 2015/0205568 | A1 | 7/2015 | Matsuoka |
| 2015/0205858 | A1 | 7/2015 | Xie et al. |
| 2015/0206529 | A1 | 7/2015 | Kwon et al. |
| 2015/0208226 | A1 | 7/2015 | Kuusilinna et al. |
| 2015/0212791 | A1 | 7/2015 | Kumar et al. |
| 2015/0213140 | A1 | 7/2015 | Volkert |
| 2015/0213796 | A1 | 7/2015 | Waltermann et al. |
| 2015/0215258 | A1 | 7/2015 | Nowakowski et al. |
| 2015/0215350 | A1 | 7/2015 | Slayton et al. |
| 2015/0220264 | A1 | 8/2015 | Lewis et al. |
| 2015/0220507 | A1 | 8/2015 | Mohajer et al. |
| 2015/0220715 | A1 | 8/2015 | Kim et al. |
| 2015/0220972 | A1 | 8/2015 | Subramanya et al. |
| 2015/0221304 | A1 | 8/2015 | Stewart |
| 2015/0221307 | A1 | 8/2015 | Shah et al. |
| 2015/0227505 | A1 | 8/2015 | Morimoto |
| 2015/0227633 | A1 | 8/2015 | Shapira |
| 2015/0228274 | A1 | 8/2015 | Leppnen et al. |
| 2015/0228275 | A1 | 8/2015 | Watanabe et al. |
| 2015/0228281 | A1 | 8/2015 | Raniere |
| 2015/0228283 | A1 | 8/2015 | Ehsani et al. |
| 2015/0228292 | A1 | 8/2015 | Goldstein et al. |
| 2015/0230095 | A1 | 8/2015 | Smith et al. |
| 2015/0234636 | A1 | 8/2015 | Barnes, Jr. |
| 2015/0234800 | A1 | 8/2015 | Patrick et al. |
| 2015/0237301 | A1 | 8/2015 | Shi et al. |
| 2015/0242091 | A1 | 8/2015 | Lu et al. |
| 2015/0242385 | A1 | 8/2015 | Bao et al. |
| 2015/0243278 | A1 | 8/2015 | Kibre et al. |
| 2015/0243279 | A1 | 8/2015 | Morse et al. |
| 2015/0243283 | A1 | 8/2015 | Halash et al. |
| 2015/0244665 | A1 | 8/2015 | Choi et al. |
| 2015/0245154 | A1 | 8/2015 | Dadu et al. |
| 2015/0248651 | A1 | 9/2015 | Akutagawa et al. |
| 2015/0248886 | A1 | 9/2015 | Sarikaya et al. |
| 2015/0253146 | A1 | 9/2015 | Annapureddy et al. |
| 2015/0253885 | A1 | 9/2015 | Kagan et al. |
| 2015/0254057 | A1 | 9/2015 | Klein et al. |
| 2015/0254058 | A1 | 9/2015 | Klein et al. |
| 2015/0254333 | A1 | 9/2015 | Fife et al. |
| 2015/0255071 | A1 | 9/2015 | Chiba |
| 2015/0256873 | A1 | 9/2015 | Klein et al. |
| 2015/0261298 | A1 | 9/2015 | Li |
| 2015/0261496 | A1 | 9/2015 | Faaborg et al. |
| 2015/0261850 | A1 | 9/2015 | Mittal |
| 2015/0269139 | A1 | 9/2015 | McAteer et al. |
| 2015/0269617 | A1 | 9/2015 | Mikurak |
| 2015/0269677 | A1 | 9/2015 | Milne |
| 2015/0269943 | A1 | 9/2015 | VanBlon et al. |
| 2015/0277574 | A1 | 10/2015 | Jain et al. |
| 2015/0278348 | A1 | 10/2015 | Paruchuri et al. |
| 2015/0278370 | A1 | 10/2015 | Stratvert et al. |
| 2015/0278737 | A1 | 10/2015 | Chen Huebscher et al. |
| 2015/0279358 | A1 | 10/2015 | Kingsbury et al. |
| 2015/0279360 | A1 | 10/2015 | Mengibar et al. |
| 2015/0279366 | A1 | 10/2015 | Krestnikov et al. |
| 2015/0281380 | A1 | 10/2015 | Wang et al. |
| 2015/0281401 | A1 | 10/2015 | Le et al. |
| 2015/0286627 | A1 | 10/2015 | Chang et al. |
| 2015/0286716 | A1 | 10/2015 | Snibbe et al. |
| 2015/0286937 | A1 | 10/2015 | Hildebrand |
| 2015/0287401 | A1 | 10/2015 | Lee et al. |
| 2015/0287409 | A1 | 10/2015 | Jang |
| 2015/0287411 | A1 | 10/2015 | Kojima et al. |
| 2015/0288629 | A1 | 10/2015 | Choi et al. |
| 2015/0294086 | A1 | 10/2015 | Kare et al. |
| 2015/0294377 | A1 | 10/2015 | Chow |
| 2015/0294516 | A1 | 10/2015 | Chiang |
| 2015/0295915 | A1 | 10/2015 | Xiu |
| 2015/0301796 | A1 | 10/2015 | Visser et al. |
| 2015/0302855 | A1 | 10/2015 | Kim et al. |
| 2015/0302856 | A1 | 10/2015 | Kim et al. |
| 2015/0302857 | A1 | 10/2015 | Yamada |
| 2015/0302870 | A1 | 10/2015 | Burke et al. |
| 2015/0309997 | A1 | 10/2015 | Lee et al. |
| 2015/0310114 | A1 | 10/2015 | Ryger et al. |
| 2015/0310858 | A1 | 10/2015 | Li et al. |
| 2015/0310862 | A1 | 10/2015 | Dauphin et al. |
| 2015/0310879 | A1 | 10/2015 | Buchanan et al. |
| 2015/0310888 | A1 | 10/2015 | Chen |
| 2015/0312182 | A1 | 10/2015 | Langholz |

(56) References Cited

U.S. PATENT DOCUMENTS

2015/0312409 A1 10/2015 Czarnecki et al.
2015/0314454 A1 11/2015 Breazeal et al.
2015/0317069 A1 11/2015 Clements et al.
2015/0317310 A1 11/2015 Eiche et al.
2015/0319411 A1 11/2015 Kasmir et al.
2015/0324041 A1 11/2015 Varley et al.
2015/0324334 A1 11/2015 Lee et al.
2015/0331664 A1 11/2015 Osawa et al.
2015/0331711 A1 11/2015 Huang et al.
2015/0332667 A1 11/2015 Mason
2015/0334346 A1 11/2015 Cheatham, III et al.
2015/0339049 A1 11/2015 Kasemset et al.
2015/0339391 A1 11/2015 Kang et al.
2015/0340033 A1 11/2015 Di Fabbrizio et al.
2015/0340040 A1 11/2015 Mun et al.
2015/0340042 A1 11/2015 Sejnoha et al.
2015/0341717 A1 11/2015 Song et al.
2015/0346845 A1 12/2015 Di Censo et al.
2015/0347086 A1 12/2015 Liedholm et al.
2015/0347381 A1 12/2015 Bellegarda
2015/0347382 A1 12/2015 Dolfing et al.
2015/0347383 A1 12/2015 Willmore et al.
2015/0347385 A1 12/2015 Flor et al.
2015/0347393 A1 12/2015 Futrell et al.
2015/0347552 A1 12/2015 Habouzit et al.
2015/0347733 A1 12/2015 Tsou et al.
2015/0347985 A1 12/2015 Gross et al.
2015/0348533 A1 12/2015 Saddler et al.
2015/0348547 A1 12/2015 Paulik et al.
2015/0348548 A1 12/2015 Piernot et al.
2015/0348549 A1 12/2015 Giuli et al.
2015/0348551 A1 12/2015 Gruber et al.
2015/0348554 A1 12/2015 Orr et al.
2015/0348555 A1 12/2015 Sugita
2015/0348565 A1 12/2015 Rhoten et al.
2015/0349934 A1 12/2015 Pollack et al.
2015/0350031 A1 12/2015 Burks et al.
2015/0350342 A1 12/2015 Thorpe et al.
2015/0350594 A1 12/2015 Mate et al.
2015/0352999 A1 12/2015 Bando et al.
2015/0355879 A1 12/2015 Beckhardt et al.
2015/0356410 A1 12/2015 Faith et al.
2015/0363587 A1 12/2015 Ahn et al.
2015/0364128 A1 12/2015 Zhao et al.
2015/0364140 A1 12/2015 Thorn
2015/0370531 A1 12/2015 Faaborg
2015/0370780 A1 12/2015 Wang et al.
2015/0370787 A1 12/2015 Akbacak et al.
2015/0370884 A1 12/2015 Hurley et al.
2015/0371215 A1 12/2015 Zhou et al.
2015/0371529 A1 12/2015 Dolecki
2015/0371639 A1 12/2015 Foerster et al.
2015/0371663 A1 12/2015 Gustafson et al.
2015/0371665 A1 12/2015 Naik et al.
2015/0373183 A1 12/2015 Woolsey et al.
2015/0379118 A1 12/2015 Wickenkamp et al.
2015/0379414 A1 12/2015 Yeh et al.
2015/0379993 A1 12/2015 Subhojit et al.
2015/0381923 A1 12/2015 Wickenkamp et al.
2015/0382047 A1 12/2015 Napolitano et al.
2015/0382079 A1 12/2015 Lister et al.
2015/0382147 A1 12/2015 Clark et al.
2016/0004690 A1 1/2016 Bangalore et al.
2016/0005320 A1 1/2016 deCharms et al.
2016/0012038 A1 1/2016 Edwards et al.
2016/0014476 A1 1/2016 Caliendo, Jr. et al.
2016/0018872 A1 1/2016 Tu et al.
2016/0018900 A1 1/2016 Tu et al.
2016/0018959 A1 1/2016 Yamashita et al.
2016/0019886 A1 1/2016 Hong
2016/0021414 A1 1/2016 Padi et al.
2016/0026258 A1 1/2016 Ou et al.
2016/0027431 A1 1/2016 Kurzweil et al.
2016/0028666 A1 1/2016 Li
2016/0029316 A1 1/2016 Mohan et al.
2016/0034042 A1 2/2016 Joo
2016/0034811 A1 2/2016 Paulik et al.
2016/0036953 A1 2/2016 Lee et al.
2016/0041809 A1 2/2016 Clayton et al.
2016/0042735 A1 2/2016 Vibbert et al.
2016/0042748 A1 2/2016 Jain et al.
2016/0043905 A1 2/2016 Fiedler
2016/0048666 A1 2/2016 Dey et al.
2016/0050254 A1 2/2016 Rao et al.
2016/0055422 A1 2/2016 Li
2016/0062605 A1 3/2016 Agarwal et al.
2016/0063094 A1 3/2016 Udupa et al.
2016/0063998 A1 3/2016 Krishnamoorthy et al.
2016/0070581 A1 3/2016 Soon-Shiong
2016/0071516 A1 3/2016 Lee et al.
2016/0071517 A1 3/2016 Beaver et al.
2016/0071521 A1 3/2016 Haughay
2016/0072940 A1 3/2016 Cronin
2016/0077794 A1 3/2016 Kim et al.
2016/0078860 A1 3/2016 Paulik et al.
2016/0080165 A1 3/2016 Ehsani et al.
2016/0080475 A1 3/2016 Singh et al.
2016/0085295 A1 3/2016 Shimy et al.
2016/0085827 A1 3/2016 Chadha et al.
2016/0086116 A1 3/2016 Rao et al.
2016/0086599 A1 3/2016 Kurata et al.
2016/0088335 A1 3/2016 Zucchetta
2016/0091967 A1 3/2016 Prokofieva et al.
2016/0092434 A1 3/2016 Bellegarda
2016/0092447 A1 3/2016 Venkataraman et al.
2016/0092766 A1 3/2016 Sainath et al.
2016/0093291 A1 3/2016 Kim
2016/0093298 A1 3/2016 Naik et al.
2016/0093301 A1 3/2016 Bellegarda et al.
2016/0093304 A1 3/2016 Kim et al.
2016/0094700 A1 3/2016 Lee et al.
2016/0094889 A1 3/2016 Venkataraman et al.
2016/0094979 A1 3/2016 Naik et al.
2016/0098991 A1 4/2016 Luo et al.
2016/0098992 A1 4/2016 Renard et al.
2016/0099892 A1 4/2016 Palakovich et al.
2016/0099984 A1 4/2016 Karagiannis et al.
2016/0104480 A1 4/2016 Sharifi
2016/0104486 A1 4/2016 Penilla et al.
2016/0111091 A1 4/2016 Bakish
2016/0112746 A1 4/2016 Zhang et al.
2016/0117386 A1 4/2016 Ajmera et al.
2016/0118048 A1 4/2016 Heide
2016/0119338 A1 4/2016 Cheyer
2016/0125048 A1 5/2016 Hamada
2016/0125071 A1 5/2016 Gabbai
2016/0132046 A1 5/2016 Beoughter et al.
2016/0132484 A1 5/2016 Nauze et al.
2016/0132488 A1 5/2016 Clark et al.
2016/0133254 A1 5/2016 Vogel et al.
2016/0139662 A1 5/2016 Dabhade
2016/0140951 A1 5/2016 Agiomyrgiannakis et al.
2016/0140962 A1 5/2016 Sharifi
2016/0147725 A1 5/2016 Patten et al.
2016/0148610 A1 5/2016 Kennewick, Jr. et al.
2016/0150020 A1 5/2016 Farmer et al.
2016/0154624 A1 6/2016 Son et al.
2016/0154880 A1 6/2016 Hoarty
2016/0155442 A1 6/2016 Kannan et al.
2016/0155443 A1 6/2016 Khan et al.
2016/0156574 A1 6/2016 Hum et al.
2016/0162456 A1 6/2016 Munro et al.
2016/0163311 A1 6/2016 Crook et al.
2016/0163312 A1 6/2016 Naik et al.
2016/0170966 A1 6/2016 Kolo
2016/0173578 A1 6/2016 Sharma et al.
2016/0173617 A1 6/2016 Allinson
2016/0173960 A1 6/2016 Snibbe et al.
2016/0179462 A1 6/2016 Bjorkengren
2016/0179464 A1 6/2016 Reddy et al.
2016/0179787 A1 6/2016 Deleeuw
2016/0180840 A1 6/2016 Siddiq et al.
2016/0180844 A1 6/2016 Vanblon et al.
2016/0182410 A1 6/2016 Janakiraman et al.

(56) References Cited

U.S. PATENT DOCUMENTS

| | | | |
|---|---|---|---|
| 2016/0182709 | A1 | 6/2016 | Kim et al. |
| 2016/0188181 | A1 | 6/2016 | Smith |
| 2016/0188738 | A1 | 6/2016 | Gruber et al. |
| 2016/0189717 | A1 | 6/2016 | Kannan et al. |
| 2016/0196110 | A1 | 7/2016 | Yehoshua et al. |
| 2016/0198319 | A1 | 7/2016 | Huang et al. |
| 2016/0203002 | A1 | 7/2016 | Kannan et al. |
| 2016/0210551 | A1 | 7/2016 | Lee et al. |
| 2016/0210981 | A1 | 7/2016 | Lee |
| 2016/0212488 | A1 | 7/2016 | Os et al. |
| 2016/0217784 | A1 | 7/2016 | Gelfenbeyn et al. |
| 2016/0224540 | A1 | 8/2016 | Stewart et al. |
| 2016/0224774 | A1 | 8/2016 | Pender |
| 2016/0225372 | A1 | 8/2016 | Cheung et al. |
| 2016/0227107 | A1 | 8/2016 | Beaumont |
| 2016/0232500 | A1 | 8/2016 | Wang et al. |
| 2016/0239645 | A1 | 8/2016 | Heo et al. |
| 2016/0240187 | A1 | 8/2016 | Fleizach et al. |
| 2016/0240189 | A1 | 8/2016 | Lee et al. |
| 2016/0240192 | A1 | 8/2016 | Raghuvir |
| 2016/0247061 | A1 | 8/2016 | Trask et al. |
| 2016/0249319 | A1 | 8/2016 | Dotan-Cohen et al. |
| 2016/0253312 | A1 | 9/2016 | Rhodes |
| 2016/0253528 | A1 | 9/2016 | Gao et al. |
| 2016/0259623 | A1 | 9/2016 | Sumner et al. |
| 2016/0259656 | A1 | 9/2016 | Sumner et al. |
| 2016/0259779 | A1 | 9/2016 | Labsk et al. |
| 2016/0260431 | A1 | 9/2016 | Newendorp et al. |
| 2016/0260433 | A1 | 9/2016 | Sumner et al. |
| 2016/0260434 | A1 | 9/2016 | Gelfenbeyn et al. |
| 2016/0260436 | A1 | 9/2016 | Lemay et al. |
| 2016/0266871 | A1 | 9/2016 | Schmid et al. |
| 2016/0267904 | A1 | 9/2016 | Biadsy et al. |
| 2016/0274938 | A1 | 9/2016 | Strinati et al. |
| 2016/0275941 | A1 | 9/2016 | Bellegarda et al. |
| 2016/0275947 | A1 | 9/2016 | Li et al. |
| 2016/0282824 | A1 | 9/2016 | Smallwood et al. |
| 2016/0282956 | A1 | 9/2016 | Ouyang et al. |
| 2016/0283185 | A1 | 9/2016 | Mclaren et al. |
| 2016/0284005 | A1 | 9/2016 | Daniel et al. |
| 2016/0284199 | A1 | 9/2016 | Dotan-Cohen et al. |
| 2016/0285808 | A1 | 9/2016 | Franklin et al. |
| 2016/0286045 | A1 | 9/2016 | Shaltiel et al. |
| 2016/0293157 | A1 | 10/2016 | Chen et al. |
| 2016/0293168 | A1 | 10/2016 | Chen |
| 2016/0294755 | A1 | 10/2016 | Prabhu |
| 2016/0299685 | A1 | 10/2016 | Zhai et al. |
| 2016/0299882 | A1 | 10/2016 | Hegerty et al. |
| 2016/0299883 | A1 | 10/2016 | Zhu et al. |
| 2016/0299977 | A1 | 10/2016 | Hreha |
| 2016/0300571 | A1 | 10/2016 | Foerster et al. |
| 2016/0301639 | A1 | 10/2016 | Liu et al. |
| 2016/0307566 | A1 | 10/2016 | Bellegarda |
| 2016/0308799 | A1 | 10/2016 | Schubert et al. |
| 2016/0313906 | A1 | 10/2016 | Kilchenko et al. |
| 2016/0314788 | A1 | 10/2016 | Jitkoff et al. |
| 2016/0314792 | A1 | 10/2016 | Alvarez et al. |
| 2016/0315996 | A1 | 10/2016 | Ha et al. |
| 2016/0317924 | A1 | 11/2016 | Tanaka et al. |
| 2016/0321239 | A1 | 11/2016 | Iso-Sipilä et al. |
| 2016/0321261 | A1 | 11/2016 | Spasojevic et al. |
| 2016/0321358 | A1 | 11/2016 | Kanani et al. |
| 2016/0322043 | A1 | 11/2016 | Bellegarda |
| 2016/0322044 | A1 | 11/2016 | Jung et al. |
| 2016/0322045 | A1 | 11/2016 | Hatfeild et al. |
| 2016/0322048 | A1 | 11/2016 | Amano et al. |
| 2016/0322050 | A1 | 11/2016 | Wang et al. |
| 2016/0328147 | A1 | 11/2016 | Zhang et al. |
| 2016/0328205 | A1 | 11/2016 | Agrawal et al. |
| 2016/0328893 | A1 | 11/2016 | Cordova et al. |
| 2016/0329060 | A1 | 11/2016 | Ito et al. |
| 2016/0334973 | A1 | 11/2016 | Reckhow et al. |
| 2016/0335532 | A1 | 11/2016 | Sanghavi et al. |
| 2016/0336007 | A1 | 11/2016 | Hanazawa |
| 2016/0336010 | A1 | 11/2016 | Lindahl |
| 2016/0336011 | A1 | 11/2016 | Koll et al. |
| 2016/0336024 | A1 | 11/2016 | Choi et al. |
| 2016/0337299 | A1 | 11/2016 | Lane et al. |
| 2016/0337301 | A1 | 11/2016 | Rollins et al. |
| 2016/0342317 | A1 | 11/2016 | Lim et al. |
| 2016/0342685 | A1 | 11/2016 | Basu et al. |
| 2016/0342781 | A1 | 11/2016 | Jeon |
| 2016/0350650 | A1 | 12/2016 | Leeman-Munk et al. |
| 2016/0351190 | A1 | 12/2016 | Binder et al. |
| 2016/0352567 | A1 | 12/2016 | Robbins et al. |
| 2016/0357304 | A1 | 12/2016 | Hatori et al. |
| 2016/0357728 | A1 | 12/2016 | Bellegarda et al. |
| 2016/0357790 | A1 | 12/2016 | Elkington et al. |
| 2016/0357861 | A1 | 12/2016 | Carlhian et al. |
| 2016/0357870 | A1 | 12/2016 | Hentschel et al. |
| 2016/0358598 | A1 | 12/2016 | Williams et al. |
| 2016/0358600 | A1 | 12/2016 | Nallasamy et al. |
| 2016/0358619 | A1 | 12/2016 | Ramprashad et al. |
| 2016/0359771 | A1 | 12/2016 | Sridhar |
| 2016/0360039 | A1 | 12/2016 | Sanghavi et al. |
| 2016/0360336 | A1 | 12/2016 | Gross et al. |
| 2016/0360382 | A1 | 12/2016 | Gross et al. |
| 2016/0364378 | A1 | 12/2016 | Futrell et al. |
| 2016/0365101 | A1 | 12/2016 | Foy et al. |
| 2016/0371250 | A1 | 12/2016 | Rhodes |
| 2016/0372112 | A1 | 12/2016 | Miller et al. |
| 2016/0372119 | A1 | 12/2016 | Sak et al. |
| 2016/0378747 | A1 | 12/2016 | Orr et al. |
| 2016/0379091 | A1 | 12/2016 | Lin et al. |
| 2016/0379626 | A1 | 12/2016 | Deisher et al. |
| 2016/0379632 | A1 | 12/2016 | Hoffmeister et al. |
| 2016/0379633 | A1 | 12/2016 | Lehman et al. |
| 2016/0379639 | A1 | 12/2016 | Weinstein et al. |
| 2016/0379641 | A1 | 12/2016 | Liu et al. |
| 2017/0003931 | A1 | 1/2017 | Dvortsov et al. |
| 2017/0004824 | A1 | 1/2017 | Yoo et al. |
| 2017/0005818 | A1 | 1/2017 | Gould |
| 2017/0011091 | A1 | 1/2017 | Chehreghani |
| 2017/0011303 | A1 | 1/2017 | Annapureddy et al. |
| 2017/0011742 | A1 | 1/2017 | Jing et al. |
| 2017/0013124 | A1 | 1/2017 | Havelka et al. |
| 2017/0013331 | A1 | 1/2017 | Watanabe et al. |
| 2017/0018271 | A1 | 1/2017 | Khan et al. |
| 2017/0019987 | A1 | 1/2017 | Dragone et al. |
| 2017/0023963 | A1 | 1/2017 | Davis et al. |
| 2017/0025124 | A1 | 1/2017 | Mixter et al. |
| 2017/0026318 | A1 | 1/2017 | Daniel et al. |
| 2017/0026509 | A1 | 1/2017 | Rand |
| 2017/0031576 | A1 | 2/2017 | Saoji et al. |
| 2017/0032783 | A1 | 2/2017 | Lord et al. |
| 2017/0032787 | A1 | 2/2017 | Dayal |
| 2017/0032791 | A1 | 2/2017 | Elson et al. |
| 2017/0039283 | A1 | 2/2017 | Bennett et al. |
| 2017/0039475 | A1 | 2/2017 | Cheyer et al. |
| 2017/0040002 | A1 | 2/2017 | Basson et al. |
| 2017/0047063 | A1 | 2/2017 | Ohmura et al. |
| 2017/0053652 | A1 | 2/2017 | Choi et al. |
| 2017/0055895 | A1 | 3/2017 | Des Jardins et al. |
| 2017/0060853 | A1 | 3/2017 | Lee et al. |
| 2017/0061423 | A1 | 3/2017 | Bryant et al. |
| 2017/0068423 | A1 | 3/2017 | Napolitano et al. |
| 2017/0068513 | A1 | 3/2017 | Stasior et al. |
| 2017/0068550 | A1 | 3/2017 | Zeitlin |
| 2017/0068670 | A1 | 3/2017 | Orr et al. |
| 2017/0069308 | A1 | 3/2017 | Aleksic et al. |
| 2017/0075653 | A1 | 3/2017 | Dawidowsky et al. |
| 2017/0076720 | A1 | 3/2017 | Gopalan et al. |
| 2017/0076721 | A1 | 3/2017 | Bargetzi et al. |
| 2017/0078490 | A1 | 3/2017 | Kaminsky et al. |
| 2017/0083179 | A1 | 3/2017 | Gruber et al. |
| 2017/0083285 | A1 | 3/2017 | Meyers et al. |
| 2017/0083504 | A1 | 3/2017 | Huang |
| 2017/0084277 | A1 | 3/2017 | Sharifi |
| 2017/0085547 | A1 | 3/2017 | De Aguiar et al. |
| 2017/0090569 | A1 | 3/2017 | Levesque |
| 2017/0091168 | A1 | 3/2017 | Bellegarda et al. |
| 2017/0091169 | A1 | 3/2017 | Bellegarda et al. |
| 2017/0091612 | A1 | 3/2017 | Gruber et al. |
| 2017/0092259 | A1 | 3/2017 | Jeon |

(56) References Cited

U.S. PATENT DOCUMENTS

2017/0092270 A1 3/2017 Newendorp et al.
2017/0092278 A1 3/2017 Evermann et al.
2017/0093356 A1 3/2017 Cudak et al.
2017/0102837 A1 4/2017 Toumpelis
2017/0102915 A1 4/2017 Kuscher et al.
2017/0103749 A1 4/2017 Zhao et al.
2017/0105190 A1 4/2017 Logan et al.
2017/0110117 A1 4/2017 Chakladar et al.
2017/0116177 A1 4/2017 Walia
2017/0116982 A1 4/2017 Gelfenbeyn et al.
2017/0116989 A1 4/2017 Yadgar et al.
2017/0124190 A1 5/2017 Wang et al.
2017/0125016 A1 5/2017 Wang
2017/0127124 A9 5/2017 Wilson et al.
2017/0131778 A1 5/2017 Iyer
2017/0132019 A1 5/2017 Karashchuk et al.
2017/0132199 A1 5/2017 Vescovi et al.
2017/0133007 A1 5/2017 Drewes
2017/0140041 A1 5/2017 Dotan-Cohen et al.
2017/0140644 A1 5/2017 Hwang et al.
2017/0140760 A1 5/2017 Sachdev
2017/0147841 A1 5/2017 Stagg et al.
2017/0148044 A1 5/2017 Fukuda et al.
2017/0154033 A1 6/2017 Lee
2017/0154055 A1 6/2017 Dimson et al.
2017/0155940 A1 6/2017 Ji et al.
2017/0161018 A1 6/2017 Lemay et al.
2017/0161268 A1 6/2017 Badaskar
2017/0161293 A1 6/2017 Ionescu et al.
2017/0161393 A1 6/2017 Oh et al.
2017/0162191 A1 6/2017 Grost et al.
2017/0162203 A1 6/2017 Huang et al.
2017/0169818 A1 6/2017 VanBlon et al.
2017/0169819 A1 6/2017 Mese et al.
2017/0177547 A1 6/2017 Ciereszko et al.
2017/0178619 A1 6/2017 Naik et al.
2017/0178620 A1 6/2017 Fleizach et al.
2017/0178626 A1 6/2017 Gruber et al.
2017/0180499 A1 6/2017 Gelfenbeyn et al.
2017/0185375 A1 6/2017 Martel et al.
2017/0185581 A1 6/2017 Bojja et al.
2017/0186429 A1 6/2017 Giuli et al.
2017/0187711 A1 6/2017 Joo et al.
2017/0193083 A1 7/2017 Bhatt et al.
2017/0195493 A1 7/2017 Kasilya Sudarsan et al.
2017/0195636 A1 7/2017 Child et al.
2017/0199870 A1 7/2017 Zheng et al.
2017/0199874 A1 7/2017 Patel et al.
2017/0200066 A1 7/2017 Wang et al.
2017/0201609 A1 7/2017 Salmenkaita et al.
2017/0201613 A1 7/2017 Engelke et al.
2017/0206899 A1 7/2017 Bryant et al.
2017/0215052 A1 7/2017 Koum et al.
2017/0221486 A1 8/2017 Kurata et al.
2017/0223189 A1 8/2017 Meredith et al.
2017/0227935 A1 8/2017 Su et al.
2017/0228367 A1 8/2017 Pasupalak et al.
2017/0228382 A1 8/2017 Haviv et al.
2017/0230429 A1 8/2017 Garmark et al.
2017/0230497 A1 8/2017 Kim et al.
2017/0230709 A1 8/2017 Van Os et al.
2017/0235361 A1 8/2017 Rigazio et al.
2017/0235618 A1 8/2017 Lin et al.
2017/0235721 A1 8/2017 Almosallam et al.
2017/0236512 A1 8/2017 Williams et al.
2017/0236514 A1 8/2017 Nelson
2017/0238039 A1 8/2017 Sabattini
2017/0242653 A1 8/2017 Lang et al.
2017/0242657 A1 8/2017 Jarvis et al.
2017/0243468 A1 8/2017 Dotan-Cohen et al.
2017/0243576 A1 8/2017 Millington et al.
2017/0243586 A1 8/2017 Civelli et al.
2017/0256256 A1 9/2017 Wang et al.
2017/0263247 A1 9/2017 Kang et al.
2017/0263248 A1 9/2017 Gruber et al.
2017/0263249 A1 9/2017 Akbacak et al.
2017/0264451 A1 9/2017 Yu et al.
2017/0264711 A1 9/2017 Natarajan et al.
2017/0270912 A1 9/2017 Levit et al.
2017/0278514 A1 9/2017 Mathias et al.
2017/0285915 A1 10/2017 Napolitano et al.
2017/0286397 A1 10/2017 Gonzalez
2017/0287472 A1 10/2017 Ogawa et al.
2017/0289305 A1 10/2017 Liensberger et al.
2017/0295446 A1 10/2017 Thagadur Shivappa
2017/0308609 A1 10/2017 Berkhin et al.
2017/0311005 A1 10/2017 Lin
2017/0316775 A1 11/2017 Le et al.
2017/0316782 A1 11/2017 Haughay et al.
2017/0319123 A1 11/2017 Voss et al.
2017/0323637 A1 11/2017 Naik
2017/0329466 A1 11/2017 Krenkler et al.
2017/0329490 A1 11/2017 Esinovskaya et al.
2017/0329572 A1 11/2017 Shah et al.
2017/0329630 A1 11/2017 Jann et al.
2017/0330567 A1 11/2017 Van Wissen et al.
2017/0337035 A1 11/2017 Choudhary et al.
2017/0337478 A1 11/2017 Sarikaya et al.
2017/0345411 A1 11/2017 Raitio et al.
2017/0345420 A1 11/2017 Barnett, Jr.
2017/0345429 A1 11/2017 Hardee et al.
2017/0346949 A1 11/2017 Sanghavi et al.
2017/0351487 A1 12/2017 Avilés-Casco et al.
2017/0352346 A1 12/2017 Paulik et al.
2017/0352350 A1 12/2017 Booker et al.
2017/0357478 A1 12/2017 Piersol et al.
2017/0357632 A1 12/2017 Pagallo et al.
2017/0357633 A1 12/2017 Wang et al.
2017/0357637 A1 12/2017 Nell et al.
2017/0357640 A1 12/2017 Bellegarda et al.
2017/0357716 A1 12/2017 Bellegarda et al.
2017/0358300 A1 12/2017 Laurens et al.
2017/0358301 A1 12/2017 Raitio et al.
2017/0358302 A1 12/2017 Orr et al.
2017/0358303 A1 12/2017 Walker, II et al.
2017/0358304 A1 12/2017 Castillo et al.
2017/0358305 A1 12/2017 Kudurshian et al.
2017/0358317 A1 12/2017 James
2017/0365251 A1 12/2017 Park et al.
2017/0371509 A1 12/2017 Jung et al.
2017/0371885 A1 12/2017 Aggarwal et al.
2017/0374093 A1 12/2017 Dhar et al.
2017/0374176 A1 12/2017 Agrawal et al.
2018/0005112 A1 1/2018 Iso-Sipila et al.
2018/0007060 A1 1/2018 Leblang et al.
2018/0007096 A1 1/2018 Levin et al.
2018/0007538 A1 1/2018 Naik et al.
2018/0012596 A1 1/2018 Piernot et al.
2018/0018248 A1 1/2018 Bhargava et al.
2018/0024985 A1 1/2018 Asano
2018/0033431 A1 2/2018 Newendorp et al.
2018/0033436 A1 2/2018 Zhou
2018/0047201 A1 2/2018 Filev et al.
2018/0047406 A1 2/2018 Park
2018/0052909 A1 2/2018 Sharifi et al.
2018/0054505 A1 2/2018 Hart et al.
2018/0060032 A1 3/2018 Boesen
2018/0060301 A1 3/2018 Li et al.
2018/0060312 A1 3/2018 Won
2018/0061400 A1 3/2018 Carbune et al.
2018/0061401 A1 3/2018 Sarikaya et al.
2018/0062691 A1 3/2018 Barnett, Jr.
2018/0063308 A1 3/2018 Crystal et al.
2018/0063324 A1 3/2018 Van Meter, II
2018/0063624 A1 3/2018 Boesen
2018/0067904 A1 3/2018 Li
2018/0067914 A1 3/2018 Chen et al.
2018/0067918 A1 3/2018 Bellegarda et al.
2018/0069743 A1 3/2018 Bakken et al.
2018/0075847 A1 3/2018 Lee et al.
2018/0088969 A1 3/2018 Vanblon et al.
2018/0089166 A1 3/2018 Meyer et al.
2018/0089588 A1 3/2018 Ravi et al.
2018/0090143 A1 3/2018 Saddler et al.

(56) References Cited

U.S. PATENT DOCUMENTS

2018/0091847 A1 3/2018 Wu et al.
2018/0096683 A1 4/2018 James et al.
2018/0096690 A1 4/2018 Mixter et al.
2018/0102914 A1 4/2018 Kawachi et al.
2018/0107917 A1 4/2018 Hewavitharana et al.
2018/0107945 A1 4/2018 Gao et al.
2018/0108346 A1 4/2018 Paulik et al.
2018/0113673 A1 4/2018 Sheynblat
2018/0121432 A1 5/2018 Parson et al.
2018/0122376 A1 5/2018 Kojima
2018/0122378 A1 5/2018 Mixter et al.
2018/0129967 A1 5/2018 Herreshoff
2018/0130470 A1 5/2018 Lemay et al.
2018/0130471 A1 5/2018 Trufinescu et al.
2018/0137856 A1 5/2018 Gilbert
2018/0137857 A1 5/2018 Zhou et al.
2018/0137865 A1 5/2018 Ling
2018/0143967 A1 5/2018 Anbazhagan et al.
2018/0144615 A1 5/2018 Kinney et al.
2018/0144746 A1 5/2018 Mishra et al.
2018/0144748 A1 5/2018 Leong
2018/0146089 A1 5/2018 Rauenbuehler et al.
2018/0150744 A1 5/2018 Orr et al.
2018/0157372 A1 6/2018 Kurabayashi
2018/0157992 A1 6/2018 Susskind et al.
2018/0158548 A1 6/2018 Taheri et al.
2018/0166076 A1 6/2018 Higuchi et al.
2018/0167884 A1 6/2018 Dawid et al.
2018/0173403 A1 6/2018 Carbune et al.
2018/0173542 A1 6/2018 Chan et al.
2018/0174406 A1 6/2018 Arashi et al.
2018/0174576 A1 6/2018 Soltau et al.
2018/0174597 A1 6/2018 Lee et al.
2018/0182376 A1 6/2018 Van Gysel et al.
2018/0188840 A1 7/2018 Tamura et al.
2018/0190273 A1 7/2018 Karimli et al.
2018/0190279 A1 7/2018 Anderson et al.
2018/0191670 A1 7/2018 Suyama
2018/0196683 A1 7/2018 Radebaugh et al.
2018/0210874 A1 7/2018 Fuxman et al.
2018/0213448 A1 7/2018 Segal et al.
2018/0218735 A1 8/2018 Hunt et al.
2018/0225274 A1 8/2018 Tommy et al.
2018/0232203 A1 8/2018 Gelfenbeyn et al.
2018/0233140 A1 8/2018 Koishida et al.
2018/0247065 A1 8/2018 Rhee et al.
2018/0253209 A1 9/2018 Jaygarl et al.
2018/0253652 A1 9/2018 Palzer et al.
2018/0260680 A1 9/2018 Finkelstein et al.
2018/0268106 A1 9/2018 Velaga
2018/0270343 A1 9/2018 Rout et al.
2018/0275839 A1 9/2018 Kocienda et al.
2018/0276197 A1 9/2018 Nell et al.
2018/0277113 A1 9/2018 Hartung et al.
2018/0278740 A1 9/2018 Choi et al.
2018/0285056 A1 10/2018 Cutler et al.
2018/0293984 A1 10/2018 Lindahl
2018/0293988 A1 10/2018 Huang et al.
2018/0308477 A1 10/2018 Nagasaka
2018/0308480 A1 10/2018 Jang et al.
2018/0308485 A1 10/2018 Kudurshian et al.
2018/0308486 A1 10/2018 Saddler et al.
2018/0314552 A1 11/2018 Kim et al.
2018/0315416 A1 11/2018 Berthelsen et al.
2018/0322112 A1 11/2018 Bellegarda et al.
2018/0322881 A1 11/2018 Min et al.
2018/0329677 A1 11/2018 Gruber et al.
2018/0329957 A1 11/2018 Frazzingaro et al.
2018/0329982 A1 11/2018 Patel et al.
2018/0329998 A1 11/2018 Thomson et al.
2018/0330714 A1 11/2018 Paulik et al.
2018/0330721 A1 11/2018 Thomson et al.
2018/0330722 A1 11/2018 Newendorp et al.
2018/0330723 A1 11/2018 Acero et al.
2018/0330729 A1 11/2018 Golipour et al.
2018/0330730 A1 11/2018 Garg et al.
2018/0330731 A1 11/2018 Zeitlin et al.
2018/0330733 A1 11/2018 Orr et al.
2018/0330737 A1 11/2018 Paulik et al.
2018/0332118 A1 11/2018 Phipps et al.
2018/0336184 A1 11/2018 Bellegarda et al.
2018/0336197 A1 11/2018 Skilling et al.
2018/0336275 A1 11/2018 Graham et al.
2018/0336439 A1 11/2018 Kliger et al.
2018/0336449 A1 11/2018 Adan et al.
2018/0336892 A1 11/2018 Kim et al.
2018/0336894 A1 11/2018 Graham et al.
2018/0336904 A1 11/2018 Piercy et al.
2018/0336905 A1 11/2018 Kim et al.
2018/0336920 A1 11/2018 Bastian et al.
2018/0341643 A1 11/2018 Alders et al.
2018/0343557 A1 11/2018 Naik et al.
2018/0349084 A1 12/2018 Nagasaka et al.
2018/0349346 A1 12/2018 Hatori et al.
2018/0349349 A1 12/2018 Bellegarda et al.
2018/0349447 A1 12/2018 Maccartney et al.
2018/0349472 A1 12/2018 Kohlschuetter et al.
2018/0350345 A1 12/2018 Naik
2018/0350353 A1 12/2018 Gruber et al.
2018/0357073 A1 12/2018 Johnson et al.
2018/0357308 A1 12/2018 Cheyer
2018/0358015 A1 12/2018 Cash et al.
2018/0358019 A1 12/2018 Mont-Reynaud
2018/0365653 A1 12/2018 Cleaver et al.
2018/0366105 A1 12/2018 Kim
2018/0373487 A1 12/2018 Gruber et al.
2018/0374484 A1 12/2018 Huang et al.
2019/0012141 A1 1/2019 Piersol et al.
2019/0012449 A1 1/2019 Cheyer
2019/0013018 A1 1/2019 Rekstad
2019/0013025 A1 1/2019 Alcorn et al.
2019/0014450 A1 1/2019 Gruber et al.
2019/0019077 A1 1/2019 Griffin et al.
2019/0027152 A1 1/2019 Huang et al.
2019/0034040 A1 1/2019 Shah et al.
2019/0034826 A1 1/2019 Ahmad et al.
2019/0035405 A1 1/2019 Haughay
2019/0042059 A1 2/2019 Baer
2019/0042627 A1 2/2019 Osotio et al.
2019/0043507 A1 2/2019 Huang et al.
2019/0045040 A1 2/2019 Lee et al.
2019/0051309 A1 2/2019 Kim et al.
2019/0057697 A1 2/2019 Giuli et al.
2019/0065144 A1 2/2019 Sumner et al.
2019/0065993 A1 2/2019 Srinivasan et al.
2019/0066674 A1 2/2019 Jaygarl et al.
2019/0068810 A1 2/2019 Okamoto et al.
2019/0073998 A1 3/2019 Leblang et al.
2019/0074009 A1 3/2019 Kim et al.
2019/0074015 A1 3/2019 Orr et al.
2019/0074016 A1 3/2019 Orr et al.
2019/0079476 A1 3/2019 Funes
2019/0080685 A1 3/2019 Johnson, Jr.
2019/0080698 A1 3/2019 Miller
2019/0087412 A1 3/2019 Seyed Ibrahim et al.
2019/0087455 A1 3/2019 He et al.
2019/0095050 A1 3/2019 Gruber et al.
2019/0095171 A1 3/2019 Carson et al.
2019/0102378 A1 4/2019 Piernot et al.
2019/0102381 A1 4/2019 Futrell et al.
2019/0103103 A1 4/2019 Ni et al.
2019/0103112 A1 4/2019 Walker et al.
2019/0116264 A1 4/2019 Sanghavi et al.
2019/0122666 A1 4/2019 Raitio et al.
2019/0122692 A1 4/2019 Binder et al.
2019/0124019 A1 4/2019 Leon et al.
2019/0129615 A1 5/2019 Sundar et al.
2019/0132694 A1 5/2019 Hanes et al.
2019/0139541 A1 5/2019 Andersen et al.
2019/0141494 A1 5/2019 Gross et al.
2019/0147880 A1 5/2019 Booker et al.
2019/0149972 A1 5/2019 Parks et al.
2019/0156830 A1 5/2019 Devaraj et al.
2019/0158994 A1 5/2019 Gross et al.

(56) References Cited

U.S. PATENT DOCUMENTS

2019/0164546 A1 5/2019 Piernot et al.
2019/0172467 A1 6/2019 Kim et al.
2019/0179607 A1 6/2019 Thangarathnam et al.
2019/0179890 A1 6/2019 Evermann
2019/0180770 A1 6/2019 Kothari et al.
2019/0182176 A1 6/2019 Niewczas
2019/0187787 A1 6/2019 White et al.
2019/0188326 A1 6/2019 Daianu et al.
2019/0188328 A1 6/2019 Oyenan et al.
2019/0189118 A1 6/2019 Piernot et al.
2019/0189125 A1 6/2019 Van Os et al.
2019/0197053 A1 6/2019 Graham et al.
2019/0213999 A1 7/2019 Grupen et al.
2019/0214024 A1 7/2019 Gruber et al.
2019/0220245 A1 7/2019 Martel et al.
2019/0220246 A1 7/2019 Orr et al.
2019/0220247 A1 7/2019 Lemay et al.
2019/0236130 A1 8/2019 Li et al.
2019/0236459 A1 8/2019 Cheyer et al.
2019/0244618 A1 8/2019 Newendorp et al.
2019/0251339 A1 8/2019 Hawker
2019/0251960 A1 8/2019 Maker et al.
2019/0259386 A1 8/2019 Kudurshian et al.
2019/0272825 A1 9/2019 O'Malley et al.
2019/0272831 A1 9/2019 Kajarekar
2019/0273963 A1 9/2019 Jobanputra et al.
2019/0278841 A1 9/2019 Pusateri et al.
2019/0287522 A1 9/2019 Lambourne et al.
2019/0295544 A1 9/2019 Garcia et al.
2019/0303442 A1 10/2019 Peitz et al.
2019/0310765 A1 10/2019 Napolitano et al.
2019/0318739 A1 10/2019 Garg et al.
2019/0339784 A1 11/2019 Lemay et al.
2019/0341027 A1 11/2019 Vescovi et al.
2019/0341056 A1 11/2019 Paulik et al.
2019/0347063 A1 11/2019 Liu et al.
2019/0348022 A1 11/2019 Park et al.
2019/0354548 A1 11/2019 Orr et al.
2019/0355346 A1 11/2019 Bellegarda
2019/0361729 A1 11/2019 Gruber et al.
2019/0369748 A1 12/2019 Hindi et al.
2019/0369842 A1 12/2019 Dolbakian et al.
2019/0370292 A1 12/2019 Irani et al.
2019/0370323 A1 12/2019 Davidson et al.
2019/0371315 A1 12/2019 Newendorp et al.
2019/0371316 A1 12/2019 Weinstein et al.
2019/0371317 A1 12/2019 Irani et al.
2019/0371331 A1 12/2019 Schramm et al.
2019/0372902 A1 12/2019 Piersol
2019/0373102 A1 12/2019 Weinstein et al.
2020/0019609 A1 1/2020 Yu et al.
2020/0042334 A1 2/2020 Radebaugh et al.
2020/0043482 A1 2/2020 Gruber et al.
2020/0043489 A1 2/2020 Bradley et al.
2020/0044485 A1 2/2020 Smith et al.
2020/0053218 A1 2/2020 Gray
2020/0058299 A1 2/2020 Lee et al.
2020/0075018 A1 3/2020 Chen
2020/0091958 A1 3/2020 Curtis et al.
2020/0092625 A1 3/2020 Raffle
2020/0098362 A1 3/2020 Piernot et al.
2020/0098368 A1 3/2020 Lemay et al.
2020/0104357 A1 4/2020 Bellegarda et al.
2020/0104362 A1 4/2020 Yang et al.
2020/0104369 A1 4/2020 Bellegarda
2020/0104668 A1 4/2020 Sanghavi et al.
2020/0105260 A1 4/2020 Piernot et al.
2020/0118568 A1 4/2020 Kudurshian et al.
2020/0125820 A1 4/2020 Kim et al.
2020/0127988 A1 4/2020 Bradley et al.
2020/0135209 A1 4/2020 Delfarah et al.
2020/0137230 A1 4/2020 Spohrer
2020/0143812 A1 5/2020 Walker, II et al.
2020/0159579 A1 5/2020 Shear et al.
2020/0160179 A1 5/2020 Chien et al.
2020/0169637 A1 5/2020 Sanghavi et al.
2020/0175566 A1 6/2020 Bender et al.
2020/0184964 A1 6/2020 Myers et al.
2020/0193997 A1 6/2020 Piernot et al.
2020/0221155 A1 7/2020 Hansen et al.
2020/0227034 A1 7/2020 Summa et al.
2020/0227044 A1 7/2020 Lindahl
2020/0249985 A1 8/2020 Zeitlin
2020/0252508 A1 8/2020 Gray
2020/0267222 A1 8/2020 Phipps et al.
2020/0272485 A1 8/2020 Karashchuk et al.
2020/0279556 A1 9/2020 Gruber et al.
2020/0279576 A1 9/2020 Binder et al.
2020/0279627 A1 9/2020 Nida et al.
2020/0285327 A1 9/2020 Hindi et al.
2020/0286472 A1 9/2020 Newendorp et al.
2020/0286493 A1 9/2020 Orr et al.
2020/0302356 A1 9/2020 Gruber et al.
2020/0302919 A1 9/2020 Greborio et al.
2020/0302925 A1 9/2020 Shah et al.
2020/0302932 A1 9/2020 Schramm et al.
2020/0304955 A1 9/2020 Gross et al.
2020/0304972 A1 9/2020 Gross et al.
2020/0305084 A1 9/2020 Freeman et al.
2020/0312317 A1 10/2020 Kothari et al.
2020/0314191 A1 10/2020 Madhavan et al.
2020/0319850 A1 10/2020 Stasior et al.
2020/0356243 A1 11/2020 Meyer et al.
2020/0357391 A1 11/2020 Ghoshal et al.
2020/0357406 A1 11/2020 York et al.
2020/0357409 A1 11/2020 Sun et al.
2020/0364411 A1 11/2020 Evermann
2020/0365155 A1 11/2020 Milden
2020/0372904 A1 11/2020 Vescovi et al.
2020/0374243 A1 11/2020 Jina et al.
2020/0379610 A1 12/2020 Ford et al.
2020/0379640 A1 12/2020 Bellegarda et al.
2020/0379726 A1 12/2020 Blatz et al.
2020/0379727 A1 12/2020 Blatz et al.
2020/0379728 A1 12/2020 Gada et al.
2020/0380389 A1 12/2020 Eldeeb et al.
2020/0380956 A1 12/2020 Rossi et al.
2020/0380963 A1 12/2020 Chappidi et al.
2020/0380966 A1 12/2020 Acero et al.
2020/0380973 A1 12/2020 Novitchenko et al.
2020/0380980 A1 12/2020 Shum et al.
2020/0380985 A1 12/2020 Gada et al.
2020/0382616 A1 12/2020 Vaishampayan et al.
2020/0382635 A1 12/2020 Vora et al.
2022/0254338 A1 8/2022 Gruber et al.
2022/0383864 A1 12/2022 Gruber et al.

FOREIGN PATENT DOCUMENTS

AU 2015101171 A4 10/2015
AU 2018100187 A4 3/2018
AU 2017222436 A1 10/2018
CA 2659698 A1 9/2009
CA 2670562 A1 1/2010
CA 2694314 A1 8/2010
CA 2792412 A1 7/2011
CA 2666438 C 6/2013
CH 681573 A5 4/1993
CN 1263385 A 8/2000
CN 1494695 A 5/2004
CN 1673939 A 9/2005
CN 1771712 A 5/2006
CN 1864204 A 11/2006
CN 1898721 A 1/2007
CN 1959628 A 5/2007
CN 101162153 A 4/2008
CN 101183525 A 5/2008
CN 101292282 A 10/2008
CN 101297541 A 10/2008
CN 101416471 A 4/2009
CN 101427244 A 5/2009
CN 101448340 A 6/2009
CN 101453498 A 6/2009
CN 101499156 A 8/2009

(56) References Cited

FOREIGN PATENT DOCUMENTS

| | | | |
|---|---|---|---|
| CN | 101500041 | A | 8/2009 |
| CN | 101515952 | A | 8/2009 |
| CN | 101535983 | A | 9/2009 |
| CN | 101547396 | A | 9/2009 |
| CN | 101557432 | A | 10/2009 |
| CN | 101601088 | A | 12/2009 |
| CN | 101604521 | A | 12/2009 |
| CN | 101632316 | A | 1/2010 |
| CN | 101636736 | A | 1/2010 |
| CN | 101667424 | A | 3/2010 |
| CN | 101673544 | A | 3/2010 |
| CN | 101751387 | A | 6/2010 |
| CN | 101833286 | A | 9/2010 |
| CN | 101847405 | A | 9/2010 |
| CN | 101855521 | A | 10/2010 |
| CN | 101894547 | A | 11/2010 |
| CN | 101910960 | A | 12/2010 |
| CN | 101923853 | A | 12/2010 |
| CN | 101930789 | A | 12/2010 |
| CN | 101939740 | A | 1/2011 |
| CN | 101951553 | A | 1/2011 |
| CN | 101958958 | A | 1/2011 |
| CN | 101971250 | A | 2/2011 |
| CN | 101992779 | A | 3/2011 |
| CN | 102056026 | A | 5/2011 |
| CN | 102122506 | A | 7/2011 |
| CN | 102124515 | A | 7/2011 |
| CN | 102137085 | A | 7/2011 |
| CN | 102137193 | A | 7/2011 |
| CN | 102160043 | A | 8/2011 |
| CN | 102201235 | A | 9/2011 |
| CN | 102214187 | A | 10/2011 |
| CN | 102237088 | A | 11/2011 |
| CN | 102246136 | A | 11/2011 |
| CN | 202035047 | U | 11/2011 |
| CN | 102282609 | A | 12/2011 |
| CN | 202092650 | U | 12/2011 |
| CN | 102340590 | A | 2/2012 |
| CN | 102346557 | A | 2/2012 |
| CN | 102368256 | A | 3/2012 |
| CN | 102402985 | A | 4/2012 |
| CN | 102405463 | A | 4/2012 |
| CN | 102498457 | A | 6/2012 |
| CN | 102510426 | A | 6/2012 |
| CN | 102629246 | A | 8/2012 |
| CN | 102651217 | A | 8/2012 |
| CN | 102681896 | A | 9/2012 |
| CN | 102682769 | A | 9/2012 |
| CN | 102682771 | A | 9/2012 |
| CN | 102685295 | A | 9/2012 |
| CN | 102693725 | A | 9/2012 |
| CN | 102694909 | A | 9/2012 |
| CN | 202453859 | U | 9/2012 |
| CN | 102722478 | A | 10/2012 |
| CN | 102737104 | A | 10/2012 |
| CN | 102750087 | A | 10/2012 |
| CN | 102792320 | A | 11/2012 |
| CN | 102801853 | A | 11/2012 |
| CN | 102820033 | A | 12/2012 |
| CN | 102844738 | A | 12/2012 |
| CN | 102866828 | A | 1/2013 |
| CN | 102870065 | A | 1/2013 |
| CN | 102882752 | A | 1/2013 |
| CN | 102917004 | A | 2/2013 |
| CN | 102917271 | A | 2/2013 |
| CN | 102918493 | A | 2/2013 |
| CN | 102955652 | A | 3/2013 |
| CN | 103035240 | A | 4/2013 |
| CN | 103035251 | A | 4/2013 |
| CN | 103038728 | A | 4/2013 |
| CN | 103093334 | A | 5/2013 |
| CN | 103135916 | A | 6/2013 |
| CN | 103198831 | A | 7/2013 |
| CN | 103209369 | A | 7/2013 |
| CN | 103226949 | A | 7/2013 |

| | | | |
|---|---|---|---|
| CN | 103236260 | A | 8/2013 |
| CN | 103246638 | A | 8/2013 |
| CN | 103268315 | A | 8/2013 |
| CN | 103280218 | A | 9/2013 |
| CN | 103292437 | A | 9/2013 |
| CN | 103327063 | A | 9/2013 |
| CN | 103365279 | A | 10/2013 |
| CN | 103366741 | A | 10/2013 |
| CN | 103390016 | A | 11/2013 |
| CN | 103412789 | A | 11/2013 |
| CN | 103426428 | A | 12/2013 |
| CN | 103455234 | A | 12/2013 |
| CN | 103456306 | A | 12/2013 |
| CN | 103533143 | A | 1/2014 |
| CN | 103533154 | A | 1/2014 |
| CN | 103543902 | A | 1/2014 |
| CN | 103562863 | A | 2/2014 |
| CN | 103608859 | A | 2/2014 |
| CN | 103645876 | A | 3/2014 |
| CN | 103716454 | A | 4/2014 |
| CN | 103727948 | A | 4/2014 |
| CN | 103744761 | A | 4/2014 |
| CN | 103760984 | A | 4/2014 |
| CN | 103765385 | A | 4/2014 |
| CN | 103792985 | A | 5/2014 |
| CN | 103794212 | A | 5/2014 |
| CN | 103795850 | A | 5/2014 |
| CN | 103841268 | A | 6/2014 |
| CN | 103902373 | A | 7/2014 |
| CN | 103930945 | A | 7/2014 |
| CN | 103959751 | A | 7/2014 |
| CN | 203721183 | U | 7/2014 |
| CN | 103971680 | A | 8/2014 |
| CN | 104007832 | A | 8/2014 |
| CN | 104038621 | A | 9/2014 |
| CN | 104090652 | A | 10/2014 |
| CN | 104113471 | A | 10/2014 |
| CN | 104125322 | A | 10/2014 |
| CN | 104144377 | A | 11/2014 |
| CN | 104169837 | A | 11/2014 |
| CN | 104180815 | A | 12/2014 |
| CN | 104243699 | A | 12/2014 |
| CN | 104281259 | A | 1/2015 |
| CN | 104284257 | A | 1/2015 |
| CN | 104335207 | A | 2/2015 |
| CN | 104335234 | A | 2/2015 |
| CN | 104374399 | A | 2/2015 |
| CN | 104423625 | A | 3/2015 |
| CN | 104427104 | A | 3/2015 |
| CN | 104463552 | A | 3/2015 |
| CN | 104487929 | A | 4/2015 |
| CN | 104516522 | A | 4/2015 |
| CN | 104573472 | A | 4/2015 |
| CN | 104575501 | A | 4/2015 |
| CN | 104584010 | A | 4/2015 |
| CN | 104604274 | A | 5/2015 |
| CN | 104679472 | A | 6/2015 |
| CN | 104769584 | A | 7/2015 |
| CN | 104854583 | A | 8/2015 |
| CN | 104869342 | A | 8/2015 |
| CN | 104951077 | A | 9/2015 |
| CN | 104967748 | A | 10/2015 |
| CN | 104969289 | A | 10/2015 |
| CN | 104978963 | A | 10/2015 |
| CN | 105025051 | A | 11/2015 |
| CN | 105027197 | A | 11/2015 |
| CN | 105093526 | A | 11/2015 |
| CN | 105100356 | A | 11/2015 |
| CN | 105190607 | A | 12/2015 |
| CN | 105247511 | A | 1/2016 |
| CN | 105264524 | A | 1/2016 |
| CN | 105278681 | A | 1/2016 |
| CN | 105320251 | A | 2/2016 |
| CN | 105320726 | A | 2/2016 |
| CN | 105379234 | A | 3/2016 |
| CN | 105430186 | A | 3/2016 |
| CN | 105471705 | A | 4/2016 |
| CN | 105472587 | A | 4/2016 |
| CN | 105556592 | A | 5/2016 |

(56) References Cited

FOREIGN PATENT DOCUMENTS

| | | | |
|---|---|---|---|
| CN | 105808200 | A | 7/2016 |
| CN | 105830048 | A | 8/2016 |
| CN | 105869641 | A | 8/2016 |
| CN | 106030699 | A | 10/2016 |
| CN | 106062734 | A | 10/2016 |
| CN | 106415412 | A | 2/2017 |
| CN | 106462383 | A | 2/2017 |
| CN | 106463114 | A | 2/2017 |
| CN | 106465074 | A | 2/2017 |
| CN | 106534469 | A | 3/2017 |
| CN | 106776581 | A | 5/2017 |
| CN | 107450800 | A | 12/2017 |
| CN | 107480161 | A | 12/2017 |
| CN | 107491468 | A | 12/2017 |
| CN | 107545262 | A | 1/2018 |
| CN | 107608998 | A | 1/2018 |
| CN | 107615378 | A | 1/2018 |
| CN | 107871500 | A | 4/2018 |
| CN | 107919123 | A | 4/2018 |
| CN | 107924313 | A | 4/2018 |
| CN | 107978313 | A | 5/2018 |
| CN | 108647681 | A | 10/2018 |
| CN | 109447234 | A | 3/2019 |
| CN | 109657629 | A | 4/2019 |
| CN | 110135411 | A | 8/2019 |
| CN | 110531860 | A | 12/2019 |
| CN | 110598671 | A | 12/2019 |
| CN | 110647274 | A | 1/2020 |
| CN | 110825469 | A | 2/2020 |
| DE | 3837590 | A1 | 5/1990 |
| DE | 4126902 | A1 | 2/1992 |
| DE | 4334773 | A1 | 4/1994 |
| DE | 4445023 | A1 | 6/1996 |
| DE | 102004029203 | A1 | 12/2005 |
| DE | 19841541 | B4 | 12/2007 |
| DE | 102008024258 | A1 | 11/2009 |
| DE | 202016008226 | U1 | 5/2017 |
| EP | 30390 | A1 | 6/1981 |
| EP | 57514 | A1 | 8/1982 |
| EP | 138061 | A1 | 4/1985 |
| EP | 218859 | A2 | 4/1987 |
| EP | 262938 | A1 | 4/1988 |
| EP | 138061 | B1 | 6/1988 |
| EP | 283995 | A2 | 9/1988 |
| EP | 293259 | A2 | 11/1988 |
| EP | 299572 | A2 | 1/1989 |
| EP | 313975 | A2 | 5/1989 |
| EP | 314908 | A2 | 5/1989 |
| EP | 327408 | A2 | 8/1989 |
| EP | 389271 | A2 | 9/1990 |
| EP | 411675 | A2 | 2/1991 |
| EP | 441089 | A2 | 8/1991 |
| EP | 464712 | A2 | 1/1992 |
| EP | 476972 | A2 | 3/1992 |
| EP | 558312 | A1 | 9/1993 |
| EP | 559349 | A1 | 9/1993 |
| EP | 570660 | A1 | 11/1993 |
| EP | 575146 | A2 | 12/1993 |
| EP | 578604 | A1 | 1/1994 |
| EP | 586996 | A2 | 3/1994 |
| EP | 609030 | A1 | 8/1994 |
| EP | 651543 | A2 | 5/1995 |
| EP | 679005 | A1 | 10/1995 |
| EP | 795811 | A1 | 9/1997 |
| EP | 476972 | B1 | 5/1998 |
| EP | 845894 | A2 | 6/1998 |
| EP | 863453 | A1 | 9/1998 |
| EP | 863469 | A2 | 9/1998 |
| EP | 867860 | A2 | 9/1998 |
| EP | 869697 | A2 | 10/1998 |
| EP | 559349 | B1 | 1/1999 |
| EP | 889626 | A1 | 1/1999 |
| EP | 917077 | A2 | 5/1999 |
| EP | 691023 | B1 | 9/1999 |
| EP | 946032 | A2 | 9/1999 |
| EP | 981236 | A1 | 2/2000 |
| EP | 982732 | A1 | 3/2000 |
| EP | 984430 | A2 | 3/2000 |
| EP | 1001588 | A2 | 5/2000 |
| EP | 1014277 | A1 | 6/2000 |
| EP | 1028425 | A2 | 8/2000 |
| EP | 1028426 | A2 | 8/2000 |
| EP | 1047251 | A2 | 10/2000 |
| EP | 1076302 | A1 | 2/2001 |
| EP | 1091615 | A1 | 4/2001 |
| EP | 1107229 | A2 | 6/2001 |
| EP | 1229496 | A2 | 8/2002 |
| EP | 1233600 | A2 | 8/2002 |
| EP | 1245023 | A1 | 10/2002 |
| EP | 1246075 | A2 | 10/2002 |
| EP | 1280326 | A1 | 1/2003 |
| EP | 1311102 | A1 | 5/2003 |
| EP | 1315084 | A1 | 5/2003 |
| EP | 1315086 | A1 | 5/2003 |
| EP | 1347361 | A1 | 9/2003 |
| EP | 1379061 | A2 | 1/2004 |
| EP | 1396797 | A1 | 3/2004 |
| EP | 1432219 | A1 | 6/2004 |
| EP | 1435620 | A1 | 7/2004 |
| EP | 1480421 | A1 | 11/2004 |
| EP | 1517228 | A2 | 3/2005 |
| EP | 1536612 | A1 | 6/2005 |
| EP | 1566948 | A1 | 8/2005 |
| EP | 1588353 | A2 | 10/2005 |
| EP | 1650938 | A1 | 4/2006 |
| EP | 1693829 | A1 | 8/2006 |
| EP | 1699042 | A1 | 9/2006 |
| EP | 1181802 | B1 | 2/2007 |
| EP | 1818786 | A1 | 8/2007 |
| EP | 1892700 | A1 | 2/2008 |
| EP | 1912205 | A2 | 4/2008 |
| EP | 1939860 | A1 | 7/2008 |
| EP | 651543 | B1 | 9/2008 |
| EP | 1909263 | B1 | 1/2009 |
| EP | 1335620 | B1 | 3/2009 |
| EP | 2069895 | A1 | 6/2009 |
| EP | 2081185 | A1 | 7/2009 |
| EP | 2094032 | A1 | 8/2009 |
| EP | 2096840 | A1 | 9/2009 |
| EP | 2107553 | A1 | 10/2009 |
| EP | 2109295 | A1 | 10/2009 |
| EP | 2144226 | A1 | 1/2010 |
| EP | 2168399 | A1 | 3/2010 |
| EP | 1720375 | B1 | 7/2010 |
| EP | 2205010 | A1 | 7/2010 |
| EP | 2250640 | A1 | 11/2010 |
| EP | 2309491 | A1 | 4/2011 |
| EP | 2329348 | | 6/2011 |
| EP | 2339576 | A2 | 6/2011 |
| EP | 2355093 | A2 | 8/2011 |
| EP | 2393056 | A1 | 12/2011 |
| EP | 2400373 | A1 | 12/2011 |
| EP | 2431842 | A2 | 3/2012 |
| EP | 2523109 | A1 | 11/2012 |
| EP | 2523188 | A1 | 11/2012 |
| EP | 2551784 | A1 | 1/2013 |
| EP | 2555536 | A1 | 2/2013 |
| EP | 2575128 | A2 | 4/2013 |
| EP | 2632129 | A1 | 8/2013 |
| EP | 2639792 | A1 | 9/2013 |
| EP | 2669889 | A2 | 12/2013 |
| EP | 2672229 | A2 | 12/2013 |
| EP | 2672231 | A2 | 12/2013 |
| EP | 2675147 | A1 | 12/2013 |
| EP | 2680257 | A1 | 1/2014 |
| EP | 2683147 | A1 | 1/2014 |
| EP | 2683175 | A1 | 1/2014 |
| EP | 2717259 | A2 | 4/2014 |
| EP | 2725577 | A2 | 4/2014 |
| EP | 2733598 | A2 | 5/2014 |
| EP | 2733896 | A1 | 5/2014 |
| EP | 2743846 | A2 | 6/2014 |
| EP | 2760015 | A1 | 7/2014 |
| EP | 2781883 | A2 | 9/2014 |

(56) References Cited

FOREIGN PATENT DOCUMENTS

| | | | |
|---|---|---|---|
| EP | 2801890 | A1 | 11/2014 |
| EP | 2801972 | A1 | 11/2014 |
| EP | 2801974 | A2 | 11/2014 |
| EP | 2824564 | A1 | 1/2015 |
| EP | 2849177 | A1 | 3/2015 |
| EP | 2879402 | A1 | 6/2015 |
| EP | 2881939 | A1 | 6/2015 |
| EP | 2891049 | A1 | 7/2015 |
| EP | 2930715 | A1 | 10/2015 |
| EP | 2938022 | A1 | 10/2015 |
| EP | 2940556 | A1 | 11/2015 |
| EP | 2947859 | A1 | 11/2015 |
| EP | 2950307 | A1 | 12/2015 |
| EP | 2957986 | A1 | 12/2015 |
| EP | 2985984 | A2 | 2/2016 |
| EP | 2891049 | A4 | 3/2016 |
| EP | 3032532 | A1 | 6/2016 |
| EP | 3035329 | A1 | 6/2016 |
| EP | 3038333 | A1 | 6/2016 |
| EP | 3115905 | A1 | 1/2017 |
| EP | 3125097 | A2 | 2/2017 |
| EP | 3224708 | A1 | 10/2017 |
| EP | 3246916 | A1 | 11/2017 |
| EP | 3300074 | A1 | 3/2018 |
| EP | 2983065 | B1 | 8/2018 |
| EP | 3392876 | A1 | 10/2018 |
| EP | 3401773 | A1 | 11/2018 |
| EP | 2973002 | B1 | 6/2019 |
| EP | 3506151 | A1 | 7/2019 |
| EP | 3323058 | B1 | 2/2020 |
| GB | 2293667 | A | 4/1996 |
| GB | 2310559 | A | 8/1997 |
| GB | 2342802 | A | 4/2000 |
| GB | 2346500 | A | 8/2000 |
| GB | 2352377 | A | 1/2001 |
| GB | 2384399 | A | 7/2003 |
| GB | 2402855 | A | 12/2004 |
| GB | 2445436 | A | 7/2008 |
| GB | 2470585 | A1 | 12/2010 |
| IT | 20010199 | A1 | 4/2003 |
| JP | 57-41731 | A | 3/1982 |
| JP | 59-57336 | A | 4/1984 |
| JP | 2-86397 | A | 3/1990 |
| JP | 2-153415 | A | 6/1990 |
| JP | 3-113578 | A | 5/1991 |
| JP | 4-236624 | A | 8/1992 |
| JP | 5-79951 | A | 3/1993 |
| JP | 5-165459 | A | 7/1993 |
| JP | 5-293126 | A | 11/1993 |
| JP | 6-19965 | A | 1/1994 |
| JP | 6-69954 | A | 3/1994 |
| JP | 06-208389 | A | 7/1994 |
| JP | 6-274586 | A | 9/1994 |
| JP | 06-332493 | A | 12/1994 |
| JP | 6-332617 | A | 12/1994 |
| JP | 7-199379 | A | 8/1995 |
| JP | 7-219961 | A | 8/1995 |
| JP | 7-320051 | A | 12/1995 |
| JP | 7-320079 | A | 12/1995 |
| JP | 8-63330 | A | 3/1996 |
| JP | 8-185265 | A | 7/1996 |
| JP | 8-223281 | A | 8/1996 |
| JP | 8-227341 | A | 9/1996 |
| JP | 9-18585 | A | 1/1997 |
| JP | 9-27000 | A | 1/1997 |
| JP | 9-55792 | A | 2/1997 |
| JP | 9-259063 | A | 10/1997 |
| JP | 9-265457 | A | 10/1997 |
| JP | 10-31497 | A | 2/1998 |
| JP | 10-105324 | A | 4/1998 |
| JP | 11-06743 | A | 1/1999 |
| JP | 11-45241 | A | 2/1999 |
| JP | 11-136278 | A | 5/1999 |
| JP | 11-175553 | A | 7/1999 |
| JP | 11-265400 | A | 9/1999 |
| JP | 2000-90119 | A | 3/2000 |
| JP | 2000-99225 | A | 4/2000 |
| JP | 2000-134407 | A | 5/2000 |
| JP | 2000-163031 | A | 6/2000 |
| JP | 2000-207167 | A | 7/2000 |
| JP | 2000-216910 | A | 8/2000 |
| JP | 2000-224663 | A | 8/2000 |
| JP | 2000-331004 | A | 11/2000 |
| JP | 2000-339137 | A | 12/2000 |
| JP | 2001-22779 | A | 1/2001 |
| JP | 2001-56233 | A | 2/2001 |
| JP | 2001-75775 | A | 3/2001 |
| JP | 2001-125896 | A | 5/2001 |
| JP | 2001-148899 | A | 5/2001 |
| JP | 2001-297174 | A | 10/2001 |
| JP | 2002-14954 | A | 1/2002 |
| JP | 2002-24212 | A | 1/2002 |
| JP | 2002-30676 | A | 1/2002 |
| JP | 2002-41276 | A | 2/2002 |
| JP | 2002-41624 | A | 2/2002 |
| JP | 2002-82748 | A | 3/2002 |
| JP | 2002-82893 | A | 3/2002 |
| JP | 2002-132804 | A | 5/2002 |
| JP | 2002-230021 | A | 8/2002 |
| JP | 2002-524806 | A | 8/2002 |
| JP | 2002-525690 | A | 8/2002 |
| JP | 2002-287793 | A | 10/2002 |
| JP | 2002-341892 | A | 11/2002 |
| JP | 2002-342033 | A | 11/2002 |
| JP | 2002-344880 | A | 11/2002 |
| JP | 2002-542501 | A | 12/2002 |
| JP | 2003-15682 | A | 1/2003 |
| JP | 2003-44091 | A | 2/2003 |
| JP | 2003-84877 | A | 3/2003 |
| JP | 2003-517158 | A | 5/2003 |
| JP | 2003-194547 | A | 7/2003 |
| JP | 2003-233568 | A | 8/2003 |
| JP | 2003-533909 | A | 11/2003 |
| JP | 2004-48804 | A | 2/2004 |
| JP | 2004-505525 | A | 2/2004 |
| JP | 2004-70504 | A | 3/2004 |
| JP | 2004-86356 | A | 3/2004 |
| JP | 2004-94936 | A | 3/2004 |
| JP | 2004-152063 | A | 5/2004 |
| JP | 2004-523004 | A | 7/2004 |
| JP | 2004-295837 | A | 10/2004 |
| JP | 2004-333870 | A | 11/2004 |
| JP | 2004-355003 | A | 12/2004 |
| JP | 2005-55782 | A | 3/2005 |
| JP | 2005-63257 | A | 3/2005 |
| JP | 2005-70645 | A | 3/2005 |
| JP | 2005-86624 | A | 3/2005 |
| JP | 2005-506602 | A | 3/2005 |
| JP | 2005-92441 | A | 4/2005 |
| JP | 2005-149481 | A | 6/2005 |
| JP | 2005-181386 | A | 7/2005 |
| JP | 2005-189454 | A | 7/2005 |
| JP | 2005-221678 | A | 8/2005 |
| JP | 2005-283843 | A | 10/2005 |
| JP | 2005-311864 | A | 11/2005 |
| JP | 2005-332212 | A | 12/2005 |
| JP | 2005-334363 | A | 12/2005 |
| JP | 2005-537576 | A | 12/2005 |
| JP | 2006-4274 | A | 1/2006 |
| JP | 2006-23860 | A | 1/2006 |
| JP | 2006-59094 | A | 3/2006 |
| JP | 2006-107438 | A | 4/2006 |
| JP | 2006-146008 | A | 6/2006 |
| JP | 2006-189394 | A | 7/2006 |
| JP | 2006-195637 | A | 7/2006 |
| JP | 2006-201870 | A | 8/2006 |
| JP | 2006-318373 | A | 11/2006 |
| JP | 2006-526185 | A | 11/2006 |
| JP | 2007-4633 | A | 1/2007 |
| JP | 2007-17990 | A | 1/2007 |
| JP | 2007-500903 | A | 1/2007 |
| JP | 2007-79690 | A | 3/2007 |
| JP | 2007-193794 | A | 8/2007 |
| JP | 2007-206317 | A | 8/2007 |

(56) References Cited

FOREIGN PATENT DOCUMENTS

| | | | |
|---|---|---|---|
| JP | 2007-264471 | A | 10/2007 |
| JP | 2007-280179 | A | 10/2007 |
| JP | 2007-323612 | A | 12/2007 |
| JP | 2007-325089 | A | 12/2007 |
| JP | 2008-26381 | A | 2/2008 |
| JP | 2008-39928 | A | 2/2008 |
| JP | 2008-58813 | A | 3/2008 |
| JP | 2008-064885 | A | 3/2008 |
| JP | 2008-90545 | A | 4/2008 |
| JP | 2008-97003 | A | 4/2008 |
| JP | 2008-514983 | A | 5/2008 |
| JP | 2008-134949 | A | 6/2008 |
| JP | 2008-526101 | A | 7/2008 |
| JP | 2008-185693 | A | 8/2008 |
| JP | 2008-198022 | A | 8/2008 |
| JP | 2008-217468 | A | 9/2008 |
| JP | 2008-233678 | A | 10/2008 |
| JP | 2008-236448 | A | 10/2008 |
| JP | 2008-269480 | A | 11/2008 |
| JP | 2008-271481 | A | 11/2008 |
| JP | 2008-287697 | A | 11/2008 |
| JP | 2009-2850 | A | 1/2009 |
| JP | 2009-503623 | A | 1/2009 |
| JP | 2009-36999 | A | 2/2009 |
| JP | 2009-505142 | A | 2/2009 |
| JP | 2009-47920 | A | 3/2009 |
| JP | 2009-69062 | A | 4/2009 |
| JP | 2009-98490 | A | 5/2009 |
| JP | 2009-110300 | A | 5/2009 |
| JP | 2009-116841 | A | 5/2009 |
| JP | 2009-134409 | A | 6/2009 |
| JP | 2009-140444 | A | 6/2009 |
| JP | 2009-522861 | A | 6/2009 |
| JP | 2009-157951 | A | 7/2009 |
| JP | 2009-169470 | A | 7/2009 |
| JP | 2009-177440 | A | 8/2009 |
| JP | 2009-186989 | A | 8/2009 |
| JP | 2009-193448 | A | 8/2009 |
| JP | 2009-193457 | A | 8/2009 |
| JP | 2009-193532 | A | 8/2009 |
| JP | 2009-205367 | A | 9/2009 |
| JP | 2009-217611 | A | 9/2009 |
| JP | 2009-223840 | A | 10/2009 |
| JP | 2009-294913 | A | 12/2009 |
| JP | 2009-294946 | A | 12/2009 |
| JP | 2009-543166 | A | 12/2009 |
| JP | 2010-66519 | A | 3/2010 |
| JP | 2010-78602 | A | 4/2010 |
| JP | 2010-78979 | A | 4/2010 |
| JP | 2010-108378 | A | 5/2010 |
| JP | 2010-109789 | A | 5/2010 |
| JP | 2010-518475 | A | 5/2010 |
| JP | 2010-518526 | A | 5/2010 |
| JP | 2010-122928 | A | 6/2010 |
| JP | 2010-135976 | A | 6/2010 |
| JP | 2010-146347 | A | 7/2010 |
| JP | 2010-157207 | A | 7/2010 |
| JP | 2010-166478 | A | 7/2010 |
| JP | 2010-205111 | A | 9/2010 |
| JP | 2010-224236 | A | 10/2010 |
| JP | 2010-236858 | A | 10/2010 |
| JP | 4563106 | B2 | 10/2010 |
| JP | 2010-256392 | A | 11/2010 |
| JP | 2010-535377 | A | 11/2010 |
| JP | 2010-287063 | A | 12/2010 |
| JP | 2011-33874 | A | 2/2011 |
| JP | 2011-41026 | A | 2/2011 |
| JP | 2011-45005 | A | 3/2011 |
| JP | 2011-59659 | A | 3/2011 |
| JP | 2011-81541 | A | 4/2011 |
| JP | 2011-525045 | A | 9/2011 |
| JP | 2011-237621 | A | 11/2011 |
| JP | 2011-238022 | A | 11/2011 |
| JP | 2011-250027 | A | 12/2011 |
| JP | 2012-14394 | A | 1/2012 |
| JP | 2012-502377 | A | 1/2012 |
| JP | 2012-22478 | A | 2/2012 |
| JP | 2012-33997 | A | 2/2012 |
| JP | 2012-37619 | A | 2/2012 |
| JP | 2012-63536 | A | 3/2012 |
| JP | 2012-508530 | A | 4/2012 |
| JP | 2012-89020 | A | 5/2012 |
| JP | 2012-116442 | A | 6/2012 |
| JP | 2012-142744 | A | 7/2012 |
| JP | 2012-147063 | A | 8/2012 |
| JP | 2012-150804 | A | 8/2012 |
| JP | 2012-518847 | A | 8/2012 |
| JP | 2012-211932 | A | 11/2012 |
| JP | 2013-37688 | A | 2/2013 |
| JP | 2013-46171 | A | 3/2013 |
| JP | 2013-511214 | A | 3/2013 |
| JP | 2013-65284 | A | 4/2013 |
| JP | 2013-73240 | A | 4/2013 |
| JP | 2013-513315 | A | 4/2013 |
| JP | 2013-80476 | A | 5/2013 |
| JP | 2013-517566 | A | 5/2013 |
| JP | 2013-134430 | A | 7/2013 |
| JP | 2013-134729 | A | 7/2013 |
| JP | 2013-140520 | A | 7/2013 |
| JP | 2013-527947 | A | 7/2013 |
| JP | 2013-528012 | A | 7/2013 |
| JP | 2013-148419 | A | 8/2013 |
| JP | 2013-156349 | A | 8/2013 |
| JP | 2013-200423 | A | 10/2013 |
| JP | 2013-205999 | A | 10/2013 |
| JP | 2013-238936 | A | 11/2013 |
| JP | 2013-258600 | A | 12/2013 |
| JP | 2014-2586 | A | 1/2014 |
| JP | 2014-10688 | A | 1/2014 |
| JP | 20145-2445 | A | 1/2014 |
| JP | 2014-26629 | A | 2/2014 |
| JP | 2014-45449 | A | 3/2014 |
| JP | 2014-507903 | A | 3/2014 |
| JP | 2014-60600 | A | 4/2014 |
| JP | 2014-72586 | A | 4/2014 |
| JP | 2014-77969 | A | 5/2014 |
| JP | 2014-89711 | A | 5/2014 |
| JP | 2014-109889 | A | 6/2014 |
| JP | 2014-124332 | A | 7/2014 |
| JP | 2014-126600 | A | 7/2014 |
| JP | 2014-140121 | A | 7/2014 |
| JP | 2014-518409 | A | 7/2014 |
| JP | 2014-142566 | A | 8/2014 |
| JP | 2014-145842 | A | 8/2014 |
| JP | 2014-146940 | A | 8/2014 |
| JP | 2014-150323 | A | 8/2014 |
| JP | 2014-519648 | A | 8/2014 |
| JP | 2014-191272 | A | 10/2014 |
| JP | 2014-219614 | A | 11/2014 |
| JP | 2014-222514 | A | 11/2014 |
| JP | 2015-4928 | A | 1/2015 |
| JP | 2015-8001 | A | 1/2015 |
| JP | 2015-12301 | A | 1/2015 |
| JP | 2015-18365 | A | 1/2015 |
| JP | 2015-501022 | A | 1/2015 |
| JP | 2015-504619 | A | 2/2015 |
| JP | 2015-41845 | A | 3/2015 |
| JP | 2015-52500 | A | 3/2015 |
| JP | 2015-60423 | A | 3/2015 |
| JP | 2015-81971 | A | 4/2015 |
| JP | 2015-83938 | A | 4/2015 |
| JP | 2015-94848 | A | 5/2015 |
| JP | 2015-514254 | A | 5/2015 |
| JP | 2015-519675 | A | 7/2015 |
| JP | 2015-524974 | A | 8/2015 |
| JP | 2015-526776 | A | 9/2015 |
| JP | 2015-527683 | A | 9/2015 |
| JP | 2015-528140 | A | 9/2015 |
| JP | 2015-528918 | A | 10/2015 |
| JP | 2015-531909 | A | 11/2015 |
| JP | 2016-504651 | A | 2/2016 |
| JP | 2016-508007 | A | 3/2016 |
| JP | 2016-71247 | A | 5/2016 |
| JP | 2016-119615 | A | 6/2016 |

(56) References Cited

FOREIGN PATENT DOCUMENTS

| | | | |
|---|---|---|---|
| JP | 2016-151928 | A | 8/2016 |
| JP | 2016-524193 | A | 8/2016 |
| JP | 2016-536648 | A | 11/2016 |
| JP | 2017-19331 | A | 1/2017 |
| JP | 2017-516153 | A | 6/2017 |
| JP | 2017-537361 | A | 12/2017 |
| JP | 6291147 | B1 | 2/2018 |
| JP | 2018-525950 | A | 9/2018 |
| KR | 10-1999-0073234 | A | 10/1999 |
| KR | 2002-0004931 | A | 1/2002 |
| KR | 2002-0013984 | A | 2/2002 |
| KR | 2002-0057262 | A | 7/2002 |
| KR | 2002-0064149 | A | 8/2002 |
| KR | 2002-0069952 | A | 9/2002 |
| KR | 2003-0016993 | A | 3/2003 |
| KR | 10-2004-0014835 | A | 2/2004 |
| KR | 10-2004-0044632 | A | 5/2004 |
| KR | 10-2005-0083561 | A | 8/2005 |
| KR | 10-2005-0090568 | A | 9/2005 |
| KR | 10-2006-0011603 | A | 2/2006 |
| KR | 10-2006-0012730 | A | 2/2006 |
| KR | 10-2006-0037228 | A | 5/2006 |
| KR | 10-2006-0073574 | A | 6/2006 |
| KR | 10-2006-0091469 | A | 8/2006 |
| KR | 10-2007-0022393 | A | 2/2007 |
| KR | 10-2007-0024262 | A | 3/2007 |
| KR | 10-2007-0071675 | A | 7/2007 |
| KR | 10-0757496 | B1 | 9/2007 |
| KR | 10-2007-0100837 | A | 10/2007 |
| KR | 10-0776800 | B1 | 11/2007 |
| KR | 10-0801227 | B1 | 2/2008 |
| KR | 10-0810500 | B1 | 3/2008 |
| KR | 10-2008-0049647 | A | 6/2008 |
| KR | 10-2008-0109322 | A | 12/2008 |
| KR | 10-2009-0001716 | A | 1/2009 |
| KR | 10-2009-0028464 | A | 3/2009 |
| KR | 10-2009-0030117 | A | 3/2009 |
| KR | 10-2009-0086805 | A | 8/2009 |
| KR | 10-0920267 | B1 | 10/2009 |
| KR | 10-2009-0122944 | A | 12/2009 |
| KR | 10-2009-0127961 | A | 12/2009 |
| KR | 10-2009-0129192 | A | 12/2009 |
| KR | 10-2010-0015958 | A | 2/2010 |
| KR | 10-2010-0048571 | A | 5/2010 |
| KR | 10-2010-0053149 | A | 5/2010 |
| KR | 10-2010-0119519 | A | 11/2010 |
| KR | 10-2011-0005937 | A | 1/2011 |
| KR | 10-2011-0013625 | A | 2/2011 |
| KR | 10-2011-0043644 | A | 4/2011 |
| KR | 10-1032792 | B1 | 5/2011 |
| KR | 10-2011-0068490 | A | 6/2011 |
| KR | 10-2011-0072847 | A | 6/2011 |
| KR | 10-2011-0086492 | A | 7/2011 |
| KR | 10-2011-0100620 | A | 9/2011 |
| KR | 10-2011-0113414 | A | 10/2011 |
| KR | 10-2011-0115134 | A | 10/2011 |
| KR | 10-2012-0020164 | A | 3/2012 |
| KR | 10-2012-0031722 | A | 4/2012 |
| KR | 10-2012-0066523 | A | 6/2012 |
| KR | 10-2012-0082371 | A | 7/2012 |
| KR | 10-2012-0084472 | A | 7/2012 |
| KR | 10-1178310 | B1 | 8/2012 |
| KR | 10-2012-0120316 | A | 11/2012 |
| KR | 10-2012-0137424 | A | 12/2012 |
| KR | 10-2012-0137434 | A | 12/2012 |
| KR | 10-2012-0137435 | A | 12/2012 |
| KR | 10-2012-0137440 | A | 12/2012 |
| KR | 10-2012-0138826 | A | 12/2012 |
| KR | 10-2012-0139827 | A | 12/2012 |
| KR | 10-1193668 | B1 | 12/2012 |
| KR | 10-2013-0035983 | A | 4/2013 |
| KR | 10-2013-0090947 | A | 8/2013 |
| KR | 10-2013-0108563 | A | 10/2013 |
| KR | 10-1334342 | B1 | 11/2013 |
| KR | 10-2013-0131252 | A | 12/2013 |
| KR | 10-2013-0133629 | A | 12/2013 |
| KR | 10-2014-0024271 | A | 2/2014 |
| KR | 10-2014-0031283 | A | 3/2014 |
| KR | 10-2014-0033574 | A | 3/2014 |
| KR | 10-2014-0042994 | A | 4/2014 |
| KR | 10-2014-0055204 | A | 5/2014 |
| KR | 10-2014-0068752 | A | 6/2014 |
| KR | 10-2014-0088449 | A | 7/2014 |
| KR | 10-2014-0106715 | A | 9/2014 |
| KR | 10-2014-0147557 | A | 12/2014 |
| KR | 10-2015-0013631 | A | 2/2015 |
| KR | 10-1506510 | B1 | 3/2015 |
| KR | 10-2015-0038375 | A | 4/2015 |
| KR | 10-2015-0039380 | A | 4/2015 |
| KR | 10-2015-0041974 | A | 4/2015 |
| KR | 10-2015-0043512 | A | 4/2015 |
| KR | 10-2015-0095624 | A | 8/2015 |
| KR | 10-1555742 | B1 | 9/2015 |
| KR | 10-2015-0113127 | A | 10/2015 |
| KR | 10-2015-0138109 | A | 12/2015 |
| KR | 10-2016-0004351 | A | 1/2016 |
| KR | 10-2016-0010523 | A | 1/2016 |
| KR | 10-2016-0040279 | A | 4/2016 |
| KR | 10-2016-0055839 | A | 5/2016 |
| KR | 10-2016-0065503 | A | 6/2016 |
| KR | 10-2016-0101198 | A | 8/2016 |
| KR | 10-2016-0105847 | A | 9/2016 |
| KR | 10-2016-0121585 | A | 10/2016 |
| KR | 10-2016-0140694 | A | 12/2016 |
| KR | 10-2017-0036805 | A | 4/2017 |
| KR | 10-2017-0107058 | A | 9/2017 |
| KR | 10-1776673 | B1 | 9/2017 |
| KR | 10-2018-0032632 | A | 3/2018 |
| KR | 10-2018-0034637 | A | 4/2018 |
| NL | 1014847 | C | 10/2001 |
| RU | 2273106 | C2 | 3/2006 |
| RU | 2349970 | C2 | 3/2009 |
| RU | 2353068 | C2 | 4/2009 |
| RU | 2364917 | C2 | 8/2009 |
| TW | 200643744 | A | 12/2006 |
| TW | 200801988 | A | 1/2008 |
| TW | M348993 | U | 1/2009 |
| TW | 200943903 | A | 10/2009 |
| TW | 201018258 | A | 5/2010 |
| TW | 201027515 | A1 | 7/2010 |
| TW | 201028996 | A1 | 8/2010 |
| TW | 201110108 | A1 | 3/2011 |
| TW | 201142823 | A1 | 12/2011 |
| TW | 201227715 | A1 | 7/2012 |
| TW | 201245989 | A1 | 11/2012 |
| TW | 201312548 | A1 | 3/2013 |
| WO | 1993/020640 | A1 | 10/1993 |
| WO | 1994/016434 | A1 | 7/1994 |
| WO | 1994/029788 | A1 | 12/1994 |
| WO | 1995/002221 | A1 | 1/1995 |
| WO | 1995/016950 | A1 | 6/1995 |
| WO | 1995/017746 | A1 | 6/1995 |
| WO | 1997/010586 | A1 | 3/1997 |
| WO | 1997/026612 | A1 | 7/1997 |
| WO | 1997/029614 | A1 | 8/1997 |
| WO | 1997/038488 | A1 | 10/1997 |
| WO | 1997/049044 | A1 | 12/1997 |
| WO | 1998/009270 | A1 | 3/1998 |
| WO | 1998/033111 | A1 | 7/1998 |
| WO | 1998/041956 | A1 | 9/1998 |
| WO | 1999/001834 | A1 | 1/1999 |
| WO | 1999/008238 | A1 | 2/1999 |
| WO | 1999/016181 | A1 | 4/1999 |
| WO | 1999/056227 | A1 | 11/1999 |
| WO | 2000/014727 | A1 | 3/2000 |
| WO | 2000/014728 | A1 | 3/2000 |
| WO | 2000/019697 | A1 | 4/2000 |
| WO | 2000/022820 | A1 | 4/2000 |
| WO | 2000/029964 | A1 | 5/2000 |
| WO | 2000/030070 | A2 | 5/2000 |
| WO | 2000/038041 | A1 | 6/2000 |
| WO | 2000/044173 | A1 | 7/2000 |
| WO | 2000/060435 | A2 | 10/2000 |
| WO | 2000/060435 | A3 | 10/2000 |

(56) References Cited

FOREIGN PATENT DOCUMENTS

| | | | |
|---|---|---|---|
| WO | 2000/063766 | A1 | 10/2000 |
| WO | 2000/068936 | A1 | 11/2000 |
| WO | 2001/006489 | A1 | 1/2001 |
| WO | 2001/030046 | A2 | 4/2001 |
| WO | 2001/030047 | A2 | 4/2001 |
| WO | 2001/033569 | A1 | 5/2001 |
| WO | 2001/035391 | A1 | 5/2001 |
| WO | 2001/046946 | A1 | 6/2001 |
| WO | 2001/065413 | A1 | 9/2001 |
| WO | 2001/067753 | A1 | 9/2001 |
| WO | 2001/071480 | A2 | 9/2001 |
| WO | 2002/025610 | A1 | 3/2002 |
| WO | 2002/031814 | A1 | 4/2002 |
| WO | 2002/037469 | A2 | 5/2002 |
| WO | 2002/049253 | A2 | 6/2002 |
| WO | 2002/071259 | A1 | 9/2002 |
| WO | 2002/073603 | A1 | 9/2002 |
| WO | 2003/003152 | A2 | 1/2003 |
| WO | 2003/003765 | A1 | 1/2003 |
| WO | 2003/023786 | A2 | 3/2003 |
| WO | 2003/041364 | A2 | 5/2003 |
| WO | 2003/049494 | A1 | 6/2003 |
| WO | 2003/056789 | A1 | 7/2003 |
| WO | 2003/067202 | A2 | 8/2003 |
| WO | 2003/084196 | A1 | 10/2003 |
| WO | 2003/094489 | A1 | 11/2003 |
| WO | 2004/008801 | A1 | 1/2004 |
| WO | 2004/023334 | A1 | 3/2004 |
| WO | 2004/023455 | A2 | 3/2004 |
| WO | 2004/025938 | A1 | 3/2004 |
| WO | 2004/047415 | A1 | 6/2004 |
| WO | 2004/055637 | A2 | 7/2004 |
| WO | 2004/057486 | A1 | 7/2004 |
| WO | 2004/061850 | A1 | 7/2004 |
| WO | 2004/064299 | A2 | 7/2004 |
| WO | 2004/084413 | A2 | 9/2004 |
| WO | 2004/102417 | A1 | 11/2004 |
| WO | 2005/003920 | A2 | 1/2005 |
| WO | 2005/008505 | A1 | 1/2005 |
| WO | 2005/008899 | A1 | 1/2005 |
| WO | 2005/010725 | A2 | 2/2005 |
| WO | 2005/027472 | A2 | 3/2005 |
| WO | 2005/027485 | A1 | 3/2005 |
| WO | 2005/031737 | A1 | 4/2005 |
| WO | 2005/034085 | A1 | 4/2005 |
| WO | 2005/041455 | A1 | 5/2005 |
| WO | 2005/059895 | A1 | 6/2005 |
| WO | 2005/064592 | A1 | 7/2005 |
| WO | 2005/069171 | A1 | 7/2005 |
| WO | 2005/101176 | A2 | 10/2005 |
| WO | 2006/020305 | A2 | 2/2006 |
| WO | 2006/054724 | A1 | 5/2006 |
| WO | 2006/056822 | A1 | 6/2006 |
| WO | 2006/078246 | A1 | 7/2006 |
| WO | 2006/084144 | A2 | 8/2006 |
| WO | 2006/101649 | A2 | 9/2006 |
| WO | 2006/129967 | A1 | 12/2006 |
| WO | 2006/133571 | A1 | 12/2006 |
| WO | 2007/002753 | A2 | 1/2007 |
| WO | 2007/013521 | A1 | 2/2007 |
| WO | 2007/055766 | A2 | 5/2007 |
| WO | 2007/080559 | A2 | 7/2007 |
| WO | 2007/083894 | A1 | 7/2007 |
| WO | 2008/030970 | A2 | 3/2008 |
| WO | 2008/071231 | A1 | 6/2008 |
| WO | 2008/085742 | A2 | 7/2008 |
| WO | 2008/098900 | A2 | 8/2008 |
| WO | 2008/109835 | A2 | 8/2008 |
| WO | 2008/140236 | A1 | 11/2008 |
| WO | 2008/153639 | A1 | 12/2008 |
| WO | 2009/009240 | A2 | 1/2009 |
| WO | 2009/016631 | A2 | 2/2009 |
| WO | 2009/017280 | A1 | 2/2009 |
| WO | 2009/034686 | A1 | 3/2009 |
| WO | 2009/075912 | A1 | 6/2009 |
| WO | 2009/104126 | A1 | 8/2009 |
| WO | 2009/156438 | A1 | 12/2009 |
| WO | 2009/156978 | A1 | 12/2009 |
| WO | 2010/013369 | A1 | 2/2010 |
| WO | 2010/054373 | A2 | 5/2010 |
| WO | 2010/075623 | A1 | 7/2010 |
| WO | 2010/100937 | A1 | 9/2010 |
| WO | 2010/141802 | A1 | 12/2010 |
| WO | 2010/144651 | A2 | 12/2010 |
| WO | 2011/028842 | A2 | 3/2011 |
| WO | 2011/057346 | A1 | 5/2011 |
| WO | 2011/060106 | A1 | 5/2011 |
| WO | 2011/082521 | A1 | 7/2011 |
| WO | 2011/088053 | A2 | 7/2011 |
| WO | 2011/093025 | A1 | 8/2011 |
| WO | 2011/100142 | A2 | 8/2011 |
| WO | 2011/116309 | A1 | 9/2011 |
| WO | 2011/123122 | A1 | 10/2011 |
| WO | 2011/133543 | A1 | 10/2011 |
| WO | 2011/133573 | A2 | 10/2011 |
| WO | 2011/097309 | A3 | 12/2011 |
| WO | 2011/150730 | A1 | 12/2011 |
| WO | 2011/163350 | A1 | 12/2011 |
| WO | 2011/088053 | A3 | 1/2012 |
| WO | 2012/008434 | A1 | 1/2012 |
| WO | 2012/019020 | A1 | 2/2012 |
| WO | 2012/019637 | A1 | 2/2012 |
| WO | 2012/063260 | A2 | 5/2012 |
| WO | 2012/092562 | A1 | 7/2012 |
| WO | 2012/112331 | A2 | 8/2012 |
| WO | 2012/129231 | A1 | 9/2012 |
| WO | 2012/063260 | A3 | 10/2012 |
| WO | 2012/135157 | A2 | 10/2012 |
| WO | 2012/154317 | A1 | 11/2012 |
| WO | 2012/154748 | A1 | 11/2012 |
| WO | 2012/155079 | A2 | 11/2012 |
| WO | 2012/167168 | A2 | 12/2012 |
| WO | 2012/173902 | A2 | 12/2012 |
| WO | 2013/009578 | A2 | 1/2013 |
| WO | 2013/022135 | A1 | 2/2013 |
| WO | 2013/022223 | A2 | 2/2013 |
| WO | 2013/048880 | A1 | 4/2013 |
| WO | 2013/049358 | A1 | 4/2013 |
| WO | 2013/057153 | A1 | 4/2013 |
| WO | 2013/122310 | A1 | 8/2013 |
| WO | 2013/137660 | A1 | 9/2013 |
| WO | 2013/163113 | A1 | 10/2013 |
| WO | 2013/163857 | A1 | 11/2013 |
| WO | 2013/169842 | A2 | 11/2013 |
| WO | 2013/173504 | A1 | 11/2013 |
| WO | 2013/173511 | A2 | 11/2013 |
| WO | 2013/176847 | A1 | 11/2013 |
| WO | 2013/184953 | A1 | 12/2013 |
| WO | 2013/184990 | A1 | 12/2013 |
| WO | 2014/003138 | A1 | 1/2014 |
| WO | 2014/004544 | A2 | 1/2014 |
| WO | 2014/021967 | A1 | 2/2014 |
| WO | 2014/022148 | A1 | 2/2014 |
| WO | 2014/028735 | A2 | 2/2014 |
| WO | 2014/028797 | A1 | 2/2014 |
| WO | 2014/031505 | A1 | 2/2014 |
| WO | 2014/032461 | A1 | 3/2014 |
| WO | 2014/047047 | A1 | 3/2014 |
| WO | 2014/066352 | A1 | 5/2014 |
| WO | 2014/070872 | A2 | 5/2014 |
| WO | 2014/078965 | A1 | 5/2014 |
| WO | 2014/093339 | A1 | 6/2014 |
| WO | 2014/096506 | A1 | 6/2014 |
| WO | 2014/124332 | A2 | 8/2014 |
| WO | 2014/137074 | A1 | 9/2014 |
| WO | 2014/138604 | A1 | 9/2014 |
| WO | 2014/143959 | A2 | 9/2014 |
| WO | 2014/144395 | A2 | 9/2014 |
| WO | 2014/144579 | A1 | 9/2014 |
| WO | 2014/144949 | A2 | 9/2014 |
| WO | 2014/151153 | A2 | 9/2014 |
| WO | 2014/124332 | A3 | 10/2014 |
| WO | 2014/159578 | A1 | 10/2014 |
| WO | 2014/159581 | A1 | 10/2014 |

(56) References Cited

FOREIGN PATENT DOCUMENTS

| | | | |
|---|---|---|---|
| WO | 2014/162570 | A1 | 10/2014 |
| WO | 2014/169269 | A1 | 10/2014 |
| WO | 2014/173189 | A1 | 10/2014 |
| WO | 2013/173504 | A8 | 12/2014 |
| WO | 2014/197336 | A1 | 12/2014 |
| WO | 2014/197635 | A2 | 12/2014 |
| WO | 2014/197730 | A1 | 12/2014 |
| WO | 2014/200728 | A1 | 12/2014 |
| WO | 2014/204659 | A2 | 12/2014 |
| WO | 2014/210392 | A2 | 12/2014 |
| WO | 2015/018440 | A1 | 2/2015 |
| WO | 2015/020942 | A1 | 2/2015 |
| WO | 2015/029379 | A1 | 3/2015 |
| WO | 2015/030796 | A1 | 3/2015 |
| WO | 2015/041882 | A1 | 3/2015 |
| WO | 2015/041892 | A1 | 3/2015 |
| WO | 2015/047932 | A1 | 4/2015 |
| WO | 2015/053485 | A1 | 4/2015 |
| WO | 2015/084659 | A1 | 6/2015 |
| WO | 2015/092943 | A1 | 6/2015 |
| WO | 2015/094169 | A1 | 6/2015 |
| WO | 2015/094369 | A1 | 6/2015 |
| WO | 2015/098306 | A1 | 7/2015 |
| WO | 2015/099939 | A1 | 7/2015 |
| WO | 2015/116151 | A1 | 8/2015 |
| WO | 2015/151133 | A1 | 10/2015 |
| WO | 2015/153310 | A1 | 10/2015 |
| WO | 2015/157013 | A1 | 10/2015 |
| WO | 2015/183401 | A1 | 12/2015 |
| WO | 2015/183699 | A1 | 12/2015 |
| WO | 2015/184186 | A1 | 12/2015 |
| WO | 2015/184387 | A1 | 12/2015 |
| WO | 2015/200207 | A1 | 12/2015 |
| WO | 2016/027933 | A1 | 2/2016 |
| WO | 2016/028946 | A1 | 2/2016 |
| WO | 2016/033257 | A1 | 3/2016 |
| WO | 2016/039992 | A1 | 3/2016 |
| WO | 2016/052164 | A1 | 4/2016 |
| WO | 2016/054230 | A1 | 4/2016 |
| WO | 2016/057268 | A1 | 4/2016 |
| WO | 2016/075081 | A1 | 5/2016 |
| WO | 2016/085775 | A2 | 6/2016 |
| WO | 2016/085776 | A1 | 6/2016 |
| WO | 2016/100139 | A1 | 6/2016 |
| WO | 2016/111881 | A1 | 7/2016 |
| WO | 2016/144840 | A1 | 9/2016 |
| WO | 2016/144982 | A1 | 9/2016 |
| WO | 2016/144983 | A1 | 9/2016 |
| WO | 2016/175354 | A1 | 11/2016 |
| WO | 2016/187149 | A1 | 11/2016 |
| WO | 2016/190950 | A1 | 12/2016 |
| WO | 2016/209444 | A1 | 12/2016 |
| WO | 2016/209924 | A1 | 12/2016 |
| WO | 2017/044160 | A1 | 3/2017 |
| WO | 2017/044257 | A1 | 3/2017 |
| WO | 2017/044260 | A1 | 3/2017 |
| WO | 2017/044629 | A1 | 3/2017 |
| WO | 2017/053311 | A1 | 3/2017 |
| WO | 2017/058293 | A1 | 4/2017 |
| WO | 2017/059388 | A1 | 4/2017 |
| WO | 2017/071420 | A1 | 5/2017 |
| WO | 2017/142116 | A1 | 8/2017 |
| WO | 2017/160487 | A1 | 9/2017 |
| WO | 2017/213682 | A1 | 12/2017 |
| WO | 2018/009397 | A1 | 1/2018 |
| WO | 2018/213401 | A1 | 11/2018 |
| WO | 2018/213415 | A1 | 11/2018 |
| WO | 2019/067930 | A1 | 4/2019 |
| WO | 2019/078576 | A1 | 4/2019 |
| WO | 2019/079017 | A1 | 4/2019 |
| WO | 2019/147429 | A1 | 8/2019 |
| WO | 2019/236217 | A1 | 12/2019 |
| WO | 2020/010530 | A1 | 1/2020 |

OTHER PUBLICATIONS

2007 Lexus GS 450h 4dr Sedan (3.5L 6cyl Gas/Electric Hybrid CVT), available at <http://review.cnet.com/4505-10865_16-31833144.html>, retrieved on Aug. 3, 2006, 10 pages.
Abcom Pty. Ltd. "12.1" 925 Candela Mobile PC", LCDHardware.com, available at <http://www.lcdhardware.com/panel/12_1_panel/default.asp.>, retrieved on Dec. 19, 2002, 2 pages.
ABF Software, "Lens-Magnifying Glass 1.5", available at <http://download.com/3000-2437-10262078.html?tag=1st-0-1>, retrieved on Feb. 11, 2004, 1 page.
Abut et al., "Low-Rate Speech Encoding Using Vector Quantization and Subband Coding", (Proceedings of the IEEE International Acoustics, Speech and Signal Processing Conference, Apr. 1986), as reprinted in Vector Quantization IEEE Press, 1990, pp. 312-315.
Abut et al., "Vector Quantization of Speech and Speech-Like Waveforms", (IEEE Transactions on Acoustics, Speech, and Signal Processing, Jun. 1982), as reprinted in Vector Quantization (IEEE Press, 1990), 1990, pp. 258-270.
Acero et al., "Environmental Robustness in Automatic Speech Recognition", International Conference on Acoustics, Speech and Signal Processing (ICASSP'90), Apr. 1990, 4 pages.
Acero et al., "Robust Speech Recognition by Normalization of the Acoustic Space", International Conference on Acoustics, Speech and Signal Processing, 1991, 4 pages.
Adium, "AboutAdium—Adium X-Trac", available at <http://web.archive.org/web/20070819113247/http://trac.adiumx.com/wiki/AboutAdium>, retrieved on Nov. 25, 2011, 2 pages.
adobe.com, "Reading PDF Documents with Adobe Reader 6.0—A Guide for People with Disabilities", Available online at "https://www.adobe.com/enterprise/accessibility/pdfs/acro6_cg_ue.pdf", Jan. 2004, 76 pages.
Advisory Action received for U.S. Appl. No. 13/492,809, mailed on Nov. 10, 2014, 5 pages.
Advisory Action received for U.S. Appl. No. 13/913,336, mailed on Feb. 20, 2018, 3 pages.
Agnas et al., "Spoken Language Translator: First-Year Report", SICS (ISSN 0283-3638), SRI and Telia Research AB, Jan. 1994, 161 pages.
Ahlberg et al., "The Alphaslider: A Compact and Rapid Selector", CHI '94 Proceedings of the SIGCHI Conference on Human Factors in Computing Systems, Apr. 1994, pp. 365-371.
Ahlberg et al., "Visual Information Seeking: Tight Coupling of Dynamic Query Filters with Starfield Displays", Proceedings of the SIGCHI Conference on Human Factors in Computing Systems, Apr. 24-28, 1994, pp. 313-317.
Ahlbom et al., Modeling Spectral Speech Transitions Using Temporal Decomposition Techniques, IEEE International Conference of Acoustics, Speech and Signal Processing (ICASSP'87), vol. 12, Apr. 1987, 4 pages.
Ahlstrom et al., "Overcoming Touchscreen User Fatigue by Workplace Design", CHI '92 Posters and Short Talks of the 1992 SIGCHI Conference on Human Factors in Computing Systems, 1992, pp. 101-102.
Ahmed et al., "Intelligent Natural Language Query Processor", TENCON '89, Fourth IEEE Region 10 International Conference, Nov. 22-24, 1989, pp. 47-49.
Ahuja et al., "A Comparison of Application Sharing Mechanisms in Real-Time Desktop Conferencing Systems", At&T Bell Laboratories, 1990, pp. 238-248.
Aikawa et al., "Generation for Multilingual MT", available at <http://mtarchive.info/MTS-2001-Aikawa.pdf>, retrieved on Sep. 18, 2001, 6 pages.
Aikawa et al., "Speech Recognition Using Time-Warping Neural Networks", Proceedings of the 1991, IEEE Workshop on Neural Networks for Signal Processing, 1991, 10 pages.
Aikawa, K. "Time-Warping Neural Network for Phoneme Recognition", IEEE International Joint Conference on Neural Networks, vol. 3, Nov. 18-21, 1991, pp. 2122-2127.
"Alexa, Turn up the Heat!", Smartthings Samsung [online], Available online at https://web.archive.org/web/20160329142041/https://blog.smartthings.com/news/smartthingsupdates/alexa-turn-up-the-heat/, Mar. 3, 2016, 3 pages.

(56) References Cited

OTHER PUBLICATIONS

Alfred App, "Alfred", available at <http://www.alfredapp.com/>, retrieved on Feb. 8, 2012, 5 pages.
All Music Website, available at <http://www.allmusic.com/>, retrieved on Mar. 19, 2007, 2 pages.
Allen et al., "Automated Natural Spoken Dialog", Computer, vol. 35, No. 4, Apr. 2002, pp. 51-56.
Allen, J., "Natural Language Understanding", 2nd Edition, The Benjamin/Cummings Publishing Company, Inc., 1995, 671 pages.
Alleva et al., "Applying SPHINX-II to DARPA Wall Street Journal CSR Task", Proceedings of Speech and Natural Language Workshop, Feb. 1992, pp. 393-398.
Alshawi et al., "CLARE: A Contextual Reasoning and Co-operative Response Framework for the Core Language Engine", SRI International, Cambridge Computer Science Research Centre, Cambridge, Dec. 1992, 273 pages.
Alshawi et al., "Declarative Derivation of Database Queries from Meaning Representations", Proceedings of the Bankai Workshop on Intelligent Information Access, Oct. 1991, 12 pages.
Alshawi et al., "Logical Forms in the Core Language Engine", Proceedings of the 27th Annual Meeting of the Association for Computational Linguistics, 1989, pp. 25-32.
Alshawi et al., "Overview of the Core Language Engine", Proceedings of Future Generation Computing Systems, Tokyo, Sep. 1988, 13 pages.
Alshawi, H., "Translation and Monotonic Interpretation/Generation", SRI International, Cambridge Computer Science Research Centre, Cambridge, available at <http://www.cam.sri.com/tr/crc024/paper.ps.Z1992>, Jul. 1992, 18 pages.
Amano et al., "A User-friendly Multimedia Book Authoring System", The Institute of Electronics, Information and Communication Engineers Technical Report, vol. 103, No. 416, Nov. 2003, pp. 33-40.
Amano, Junko, "A User-Friendly Authoring System for Digital Talking Books", IEICE Technical Report, The Institute of Electronics, Information and Communication Engineers, vol. 103 No. 418, Nov. 6, 2003, pp. 33-40.
Ambite et al., "Design and Implementation of the CALO Query Manager", American Association for Artificial Intelligence, 2006, 8 pages.
Ambite et al., "Integration of Heterogeneous Knowledge Sources in the CALO Query Manager", The 4th International Conference on Ontologies, Databases and Applications of Semantics (ODBASE), 2005, 18 pages.
Amrel Corporation, "Rocky Matrix BackLit Keyboard", available at <http://www.amrel.com/asi_matrixkeyboard.html>, retrieved on Dec. 19, 2002, 1 page.
Anania, Peter, "Amazon Echo with Home Automation (Smartthings)", Available online at https://www.youtube.com/watch?v=LMW6aXmsWNE, Dec. 20, 2015, 1 page.
Anastasakos et al., "Duration Modeling in Large Vocabulary Speech Recognition", International Conference on Acoustics, Speech and Signal Processing (ICASSP'95), May 1995, pp. 628-631.
Anderson et al., "Syntax-Directed Recognition of Hand-Printed Two-Dimensional Mathematics", Proceedings of Symposium on Interactive Systems for Experimental Applied Mathematics: Proceedings of the Association for Computing Machinery Inc. Symposium, 1967, 12 pages.
Anhui USTC IFL YTEK Co. Ltd., "Flytek Research Center Information Datasheet", available at <http://www.iflttek.com/english/Research.htm>, retrieved on Oct. 15, 2004, 3 pages.
Ansari et al., "Pitch Modification of Speech using a Low-Sensitivity Inverse Filter Approach", IEEE Signal Processing Letters, vol. 5, No. 3, Mar. 1998, pp. 60-62.
Anthony et al., "Supervised Adaption for Signature Verification System", IBM Technical Disclosure, Jun. 1, 1978, 3 pages.
api.ai, "Android App Review—Speaktoit Assistant", Available at <https://www.youtube.com/watch?v=myE498nyfGw>, Mar. 30, 2011, 3 pages.
Appelt et al., "Fastus: A Finite-State Processor for Information Extraction from Real-world Text", Proceedings of IJCAI, 1993, 8 pages.
Appelt et al., "SRI International Fastus System MUC-6 Test Results and Analysis", SRI International, Menlo Park, California, 1995, 12 pages.
Appelt et al., "SRI: Description of the JV-FASTUS System used for MUC-5", SRI International, Artificial Intelligence Center, 1993, 19 pages.
Apple Computer, "Guide Maker User's Guide", Apple Computer, Inc., Apr. 27, 1994, 8 pages.
Apple Computer, "Introduction to Apple Guide", Apple Computer, Inc., Apr. 28, 1994, 20 pages.
Apple Computer, "Knowledge Navigator", published by Apple Computer no later than 2008, as depicted in Exemplary Screenshots from video entitled 'Knowledge Navigator', 2008, 7 pages.
Apple Computer, Inc., "Apple—iPod—Technical Specifications, iPod 20GB and 60GB Mac + PC", available at <http://www.apple.com/ipod/color/specs.html>, 2005, 3 pages.
Apple Computer, Inc., "Apple Announces iTunes 2", Press Release, Oct. 23, 2001, 2 pages.
Apple Computer, Inc., "Apple Introduces iTunes—World's Best and Easiest to Use Jukebox Software", Macworld Expo, Jan. 9, 2001, 2 pages.
Apple Computer, Inc., "Apple's iPod Available in Stores Tomorrow", Press Release, Nov. 9, 2001, 1 page.
Apple Computer, Inc., "Inside Macintosh", vol. VI, 1985.
Apple Computer, Inc., "iTunes 2, Playlist Related Help Screens", iTunes v2.0, 2000-2001, 8 pages.
Apple Computer, Inc., "iTunes 2: Specification Sheet", 2001, 2 pages.
Apple Computer, Inc., "iTunes, Playlist Related Help Screens", iTunes v1.0, 2000-2001, 8 pages.
Apple Computer, Inc., "QuickTime Movie Playback Programming Guide", Aug. 11, 2005, pp. 1-58.
Apple Computer, Inc., "QuickTime Overview", Aug. 11, 2005, pp. 1-34.
Apple Computer, Inc., "Welcome to Tiger", available at <http://www.maths.dundee.ac.uk/software/Welcome_to_Mac_OS_X_v10.4_Tiger.pdf>, 2005, pp. 1-32.
Apple, "VoiceOver", available at <http://www.apple.com/accessibility/voiceover/>, Feb. 2009, 5 pages.
Applebaum et al., "Enhancing the Discrimination of Speaker Independent Hidden Markov Models with Corrective Training", International Conference on Acoustics, Speech, and Signal Processing, May 23, 1989, pp. 302-305.
AppleEvent Manager, which is described in the publication Inside Macintosh vol. VI, available from Addison-Wesley Publishing Company, 1985.
Applicant Initiated Interview Summary received for U.S. Appl. No. 16/352,410, mailed on Mar. 18, 2020, 3 pages.
Arango et al., "Touring Machine: A Software Platform for Distributed Multimedia Applications", 1992 IFIP International Conference on Upper Layer Protocols, Architectures, and Applications, May 1992, pp. 1-11.
Archbold et al., "A Team User's Guide", SRI International, Dec. 21, 1981, 70 pages.
Arons, Barry M., "The Audio-Graphical Interface to a Personal Integrated Telecommunications System", Thesis Submitted to the Department of Architecture at the Massachusetts Institute of Technology, Jun. 1984, 88 pages.
Asakura et al., "What LG thinks; How the TV should be in the Living Room", HiVi, vol. 31, No. 7 (Jul. 2013), Stereo Sound Publishing, Inc., Jun. 17, 2013, pp. 68-71.
Asanovic et al., "Experimental Determination of Precision Requirements for Back-Propagation Training of Artificial Neural Networks", Proceedings of the 2nd International Conference of Microelectronics for Neural Networks, 1991, www.ICSI.Berkelev.EDU, 1991, 7 pages.
Ashbrook, Daniel L., "Enabling Mobile Microinteractions", Retrieved from the Internet: URL: "http://danielashbrook.com/wp-content/uploads/2012/06/2009-Ashbrook-Thesis.pdf", May 2010, 186 pages.

(56) References Cited

OTHER PUBLICATIONS

Ashingtondctech & Gaming, "SwipeStatusBar—Reveal the Status Bar in a Fullscreen App", Online Available at: <https://www.youtube.com/watch?v=wA_tT9IAreQ>, Jul. 1, 2013, 3 pages.
"Ask Alexa—Things That Are Smart Wiki", Available online at <URL: http://thingsthataresmart.wiki/index.php?title=Ask_Alexa&oldid=4283>, [retrieved from internet on Aug. 2, 2017], Jun. 8, 2016, pp. 1-31.
Atal et al., "Efficient Coding of LPC Parameters by Temporal Decomposition", IEEE International Conference on Acoustics, Speech and Signal Processing (ICASSP'83), Apr. 1983, 4 pages.
Badino et al., "Language Independent Phoneme Mapping for Foreign TTS", 5th ISCA Speech Synthesis Workshop, Pittsburgh, PA, Jun. 14-16, 2004, 2 pages.
Baechtle et al., "Adjustable Audio Indicator", IBM Technical Disclosure Bulletin, Jul. 1, 1984, 2 pages.
Baeza-Yates, Ricardo, "Visualization of Large Answers in Text Databases", AVI '96 Proceedings of the Workshop on Advanced Visual Interfaces, 1996, pp. 101-107.
Bahl et al., "A Maximum Likelihood Approach to Continuous Speech Recognition", IEEE Transaction on Pattern Analysis and Machine Intelligence, vol. PAMI-5, No. 2, Mar. 1983, 13 pages.
Bahl et al., "A Tree-Based Statistical Language Model for Natural Language Speech Recognition", IEEE Transactions on Acoustics, Speech and Signal Processing, vol. 37, No. 7, Jul. 1989, 8 pages.
Bahl et al., "Acoustic Markov Models Used in the Tangora Speech Recognition System", Proceeding of International Conference on Acoustics, Speech and Signal Processing (ICASSP'88), vol. 1, Apr. 1988, 4 pages.
Bahl et al., "Large Vocabulary Natural Language Continuous Speech Recognition", Proceedings of 1989 International Conference on Acoustics, Speech and Signal Processing, vol. 1, May 1989, 6 pages.
Bahl et al., "Multonic Markov Word Models for Large Vocabulary Continuous Speech Recognition", IEEE Transactions on Speech and Audio Processing, vol. 1, No. 3, Jul. 1993, 11 pages.
Bahl et al., "Recognition of a Continuously Read Natural Corpus", IEEE International Conference on Acoustics, Speech, and Signal Processing, vol. 3, Apr. 1978, pp. 422-424.
Bahl et al., "Speech Recognition with Continuous-Parameter Hidden Markov Models", Proceeding of International Conference on Acoustics, Speech and Signal Processing (ICASSP'88), vol. 1, Apr. 1988, 8 pages.
Bajarin, Tim, "With Low End Launched, Apple Turns to Portable Future", PC Week, vol. 7, Oct. 1990, p. 153(1).
Banbrook, M., "Nonlinear Analysis of Speech from a Synthesis Perspective", A Thesis Submitted for the Degree of Doctor of Philosophy, The University of Edinburgh, Oct. 15, 1996, 35 pages.
Barrett et al., "How to Personalize the Web", 1997 In proceddings of the ACM SIGCHI Conference on Human Factors in Computer Systems, Mar. 22-27, 1997, pp. 75-82.
Barthel, B., "Information Access for Visually Impaired Persons: Do We Still Keep a "Document" in "Documentation"?", Professional Communication Conference, Sep. 1995, pp. 62-66.
Baudel et al., "2 Techniques for Improved HC Interaction: Toolglass & Magic Lenses: The See-Through Interface", Apple Inc., Video Clip, CHI'94 Video Program on a CD, 1994.
Bear et al., "A System for Labeling Self-Repairs in Speech", SRI International, Feb. 22, 1993, 9 pages.
Bear et al., "Detection and Correction of Repairs in Human-Computer Dialog", SRI International, May 1992, 11 pages.
Bear et al., "Integrating Multiple Knowledge Sources for Detection and Correction of Repairs in Human-Computer Dialog", Proceedings of the 30th Annual Meeting on Association for Computational Linguistics (ACL), 1992, 8 pages.
Bear et al., "Using Information Extraction to Improve Document Retrieval", SRI International, Menlo Park, California, 1998, 11 pages.
Beck et al., "Integrating Natural Language, Query Processing, and Semantic Data Models", COMCON Spring '90. IEEE Computer Society International Conference, 1990, Feb. 26-Mar. 2, 1990, pp. 538-543.
Bederson et al., "Pad++: A Zooming Graphical Interface for Exploring Alternate Interface Physics", UIST' 94 Proceedings of the 7th Annual ACM symposium on User Interface Software and Technology, Nov. 1994, pp. 17-26.
Bederson et al., "The Craft of Information Visualization", Elsevier Science, Inc., 2003, 435 pages.
Belaid et al., "A Syntactic Approach for Handwritten Mathematical Formula Recognition", IEEE Transactions on Pattern Analysis and Machine Intelligence, vol. PAMI-6, No. 1, Jan. 1984, 7 pages.
Bellegarda et al., "A Latent Semantic Analysis Framework for Large-Span Language Modeling", 5th European Conference on Speech, Communication and Technology (EUROSPEECH'97), Sep. 1997, 4 pages.
Bellegarda et al., "A Multispan Language Modeling Framework for Large Vocabulary Speech Recognition", IEEE Transactions on Speech and Audio Processing, vol. 6, No. 5, Sep. 1998, 12 pages.
Bellegarda et al., "A Novel Word Clustering Algorithm Based on Latent Semantic Analysis", Proceedings of the IEEE International Conference on Acoustics, Speech and Signal Processing (ICASSP'96), vol. 1, 1996, 4 pages.
Bellegarda et al., "Experiments Using Data Augmentation for Speaker Adaptation", International Conference on Acoustics, Speech and Signal Processing (ICASSP'95), May 1995, 4 pages.
Bellegarda et al., "On-Line Handwriting Recognition using Statistical Mixtures", Advances in Handwriting and Drawings: A Multidisciplinary Approach, Europia, 6th International IGS Conference on Handwriting and Drawing, Paris, France, Jul. 1993, 11 pages.
Bellegarda et al., "Performance of the IBM Large Vocabulary Continuous Speech Recognition System on the ARPA Wall Street Journal Task", Signal Processing VII: Theories and Applications, European Association for Signal Processing, 1994, 4 pages.
Bellegarda et al., "The Metamorphic Algorithm: A Speaker Mapping Approach to Data Augmentation", IEEE Transactions on Speech and Audio Processing, vol. 2, No. 3, Jul. 1994, 8 pages.
Bellegarda et al., "Tied Mixture Continuous Parameter Modeling for Speech Recognition", IEEE Transactions on Acoustics, Speech and Signal Processing, vol. 38, No. 12, Dec. 1990, pp. 2033-2045.
Bellegarda, Jerome R. "Latent Semantic Mapping", IEEE Signal Processing Magazine, vol. 22, No. 5, Sep. 2005, pp. 70-80.
Bellegarda, Jerome R., "Exploiting both Local and Global Constraints for Multi-Span Statistical Language Modeling", Proceeding of the 1998 IEEE International Conference on Acoustics, Speech and Signal Processing (1CASSP'98), vol. 2, May 1998, 5 pages.
Bellegarda, Jerome R., "Exploiting Latent Semantic Information in Statistical Language Modeling", Proceedings of the IEEE, vol. 88, No. 8, Aug. 2000, 18 pages.
Bellegarda, Jerome R., "Interaction-Driven Speech Input—A Data-Driven Approach to the Capture of both Local and Global Language Constraints", available at <http://old.sig.chi.ora/bulletin/1998.2/bellegarda.html>, 1992, 7 pages.
Bellegarda, Jerome R., "Large Vocabulary Speech Recognition with Multispan Statistical Language Models", IEEE Transactions on Speech and Audio Processing, vol. 8, No. 1, Jan. 2000, 9 pages.
Bellegarda, Jerome, "Spoken Language Understanding for Natural Interaction: The Siri Experience", Slideshow retrieved from : <https://www.uni-ulm.de/fileadmin/website_uni_ulm/iui.iwsds2012/files/Bellegarda.pdf>, International Workshop on Spoken Dialog Systems (IWSDS) 2012, May 2012, pp. 1-43.
Belvin et al., "Development of the HRL Route Navigation Dialogue System", Proceedings of the First International Conference on Human Language Technology Research, Paper, 2001, 5 pages.
Benel et al., "Optimal Size and Spacing of Touchscreen Input Areas", Human-Computer Interaction—INTERACT, 1987, pp. 581-585.
Beringer et al., "Operator Behavioral Biases Using High-Resolution Touch Input Devices", Proceedings of the Human Factors and Ergonomics Society 33rd Annual Meeting, 1989, 3 pages.

(56) References Cited

OTHER PUBLICATIONS

Beringer, Dennis B., "Target Size, Location, Sampling Point and Instruction Set: More Effects on Touch Panel Operation", Proceedings of the Human Factors and Ergonomics Society 34th Annual Meeting, 1990, 5 pages.
Bernabei et al., "Graphical I/O Devices for Medical Users", 14th Annual International Conference of the IEEE on Engineering in Medicine and Biology Society, vol. 3, 1992, pp. 834-836.
Bernstein, Macrophone, "Speech Corpus", IEEE/ICASSP, Apr. 22, 1994, pp. 1-81 to 1-84.
Berry et al., "PTIME: Personalized Assistance for Calendaring", ACM Transactions on Intelligent Systems and Technology, vol. 2, No. 4, Article 40, Jul. 2011, pp. 1-22.
Berry et al., "Symantec", New version of MORE.TM, Apr. 10, 1990, 1 page.
Berry et al., "Task Management under Change and Uncertainty Constraint Solving Experience with the CALO Project", Proceedings of CP'05 Workshop on Constraint Solving under Change, 2005, 5 pages.
Bertulucci, Jeff, "Google Adds Voice Search to Chrome Browser", PC World, Jun. 14, 2011, 5 pages.
Best Buy, "When it Comes to Selecting a Projection TV, Toshiba Makes Everything Perfectly Clear", Previews of New Releases, available at <http://www.bestbuy.com/HomeAudioVideo/Specials/ToshibaTVFeatures.asp>, retrieved on Jan. 23, 2003, 5 pages.
Betts et al., "Goals and Objectives for User Interface Software", Computer Graphics, vol. 21, No. 2, Apr. 1987, pp. 73-78.
Biemann et al., "Disentangling from Babylonian Confusion—Unsupervised Language Identification", CICLing'05 Proceedings of the 6th international conference on Computational Linguistics and Intelligent Text Processing, vol. 3406, Feb. 2005, pp. 773-784.
Biemann, Chris, "Unsupervised Part-of-Speech Tagging Employing Efficient Graph Clustering", Proceeding COLING ACL '06 Proceedings of the 21st International Conference on computational Linguistics and 44th Annual Meeting of the Association for Computational Linguistics: Student Research Workshop, 2006, pp. 7-12.
Bier et al., "Toolglass and Magic Lenses: The See-Through Interface", Computer Graphics (SIGGRAPH '93 Proceedings), vol. 27, 1993, pp. 73-80.
Birrell, Andrew, "Personal Jukebox (PJB)", available at <http://birrell.org/andrew/talks/pjb-overview.ppt>, Oct. 13, 2000, 6 pages.
Black et al., "Automatically Clustering Similar Units for Unit Selection in Speech Synthesis", Proceedings of Eurospeech, vol. 2, 1997, 4 pages.
Black et al., "Multilingual Text-to-Speech Synthesis", Acoustics, Speech and Signal Processing (ICASSP'04), Proceedings of the IEEE International Conference, vol. 3, May 17-21, 2004, pp. 761-764.
Blair et al., "An Evaluation of Retrieval Effectiveness for a Full-Text Document-Retrieval System", Communications of the ACM, vol. 28, No. 3, Mar. 1985, 11 pages.
Bleher et al., "A Graphic Interactive Application Monitor", IBM Systems Journal, vol. 19, No. 3, Sep. 1980, pp. 382-402.
BluePhoneElite: About, available at <http://www.reelintelligence.com/BluePhoneElite>, retrieved on Sep. 25, 2006, 2 pages.
BluePhoneElite: Features, available at <http://www.reelintelligence.com/BluePhoneElite/features.shtml,>, retrieved on Sep. 25, 2006, 2 pages.
Bluetooth PC Headsets, "'Connecting' Your Bluetooth Headset with Your Computer", Enjoy Wireless VoIP Conversations, available at <http://www.bluetoothpcheadsets.com/connect.htm>, retrieved on Apr. 29, 2006, 4 pages.
Bobrow et al., "Knowledge Representation for Syntactic/Semantic Processing", From: AAA-80 Proceedings, Copyright 1980, AAAI, 1980, 8 pages.
Bocchieri et al., "Use of Geographical Meta-Data in ASR Language and Acoustic Models", IEEE International Conference on Acoustics Speech and Signal Processing, 2010, pp. 5118-5121.
Bociurkiw, Michael, "Product Guide: Vanessa Matz", available at <http://www.forbes.com/asap/2000/1127/vmartz_print.html>, retrieved on Jan. 23, 2003, 2 pages.
Borden IV, G.R., "An Aural User Interface for Ubiquitous Computing", Proceedings of the 6th International Symposium on Wearable Computers, IEEE, 2002, 2 pages.
Borenstein, Nathaniel S., "Cooperative Work in the Andrew Message System", Information Technology Center and Computer Science Department, Carnegie Mellon University; Thyberg, Chris A. Academic Computing, Carnegie Mellon University, 1988, pp. 306-323.
Bouchou et al., "Using Transducers in Natural Language Database Query", Proceedings of 4th International Conference on Applications of Natural Language to Information Systems, Austria, Jun. 1999, 17 pages.
Boy, Guy A., "Intelligent Assistant Systems", Harcourt Brace Jovanovicy, 1991, 1 page.
Boyer et al., "A Fast String Searching Algorithm", Communications of the ACM, vol. 20, 1977, pp. 762-772.
Brain, Marshall, "How MP3 Files Work", available at <http://www.howstuffworks.com>, retrieved on Mar. 19, 2007, 4 pages.
Bratt et al., "The SRI Telephone-Based ATIS System", Proceedings of ARPA Workshop on Spoken Language Technology, 1995, 3 pages.
Briner, L. L., "Identifying Keywords in Text Data Processing", In Zelkowitz, Marvin V., ED, Directions and Challenges, 15th Annual Technical Symposium, Gaithersbury, Maryland, Jun. 17, 1976, 7 pages.
Brown et al., "Browing Graphs Using a Fisheye View", Apple Inc., Video Clip, Systems Research Center, CHI '92 Continued Proceedings on a CD, 1992.
Brown et al., "Browsing Graphs Using a Fisheye View", CHI '93 Proceedings of the INTERACT '93 and CHI '93 Conference on Human Factors in Computing Systems, 1993, p. 516.
Bulyko et al., "Error-Correction Detection and Response Generation in a Spoken Dialogue System", Speech Communication, vol. 45, 2005, pp. 271-288.
Bulyko et al., "Joint Prosody Prediction and Unit Selection for Concatenative Speech Synthesis", Electrical Engineering Department, University of Washington, Seattle, 2001, 4 pages.
Burger, D., "Improved Access to Computers for the Visually Handicapped: New Prospects and Principles", IEEE Transactions on Rehabilitation Engineering, vol. 2, No. 3, Sep. 1994, pp. 111-118.
Burke et al., "Question Answering from Frequently Asked Question Files", AI Magazine, vol. 18, No. 2, 1997, 10 pages.
Burns et al., "Development of a Web-Based Intelligent Agent for the Fashion Selection and Purchasing Process via Electronic Commerce", Proceedings of the Americas Conference on Information System (AMCIS), Dec. 31, 1998, 4 pages.
Busemann et al., "Natural Language Diaglogue Service for Appointment Scheduling Agents", Technical Report RR-97-02, Deutsches Forschungszentrum fur Kunstliche Intelligenz GmbH, 1997, 8 pages.
Bussey, et al., "Service Architecture, Prototype Description and Network Implications of a Personalized Information Grazing Service", INFOCOM'90, Ninth Annual Joint Conference of the IEEE Computer and Communication Societies, Available at <http://slrohall.com/oublications/>, Jun. 1990, 8 pages.
Bussler et al., "Web Service Execution Environment (WSMX)", retrieved from Internet on Sep. 17, 2012, available at <http://www.w3.org/Submission/WSMX>, Jun. 3, 2005, 29 pages.
Butcher, Mike, "Evi Arrives in Town to go Toe-to-Toe with Siri", TechCrunch, Jan. 23, 2012, 2 pages.
Butler, Travis, "Archos Jukebox 6000 Challenges Nomad Jukebox", available at <http://tidbits.com/article/6521>, Aug. 13, 2001, 5 pages.
Butler, Travis, "Portable MP3: The Nomad Jukebox", available at <http://tidbits.com/article/6261>, Jan. 8, 2001, 4 pages.
Buxton et al., "EuroPARC's Integrated Interactive Intermedia Facility (IIIF): Early Experiences", Proceedings of the IFIP WG 8.4 Conference on Multi-User Interfaces and Applications, 1990, pp. 11-34.

(56) References Cited

OTHER PUBLICATIONS

Buzo et al., "Speech Coding Based Upon Vector Quantization", IEEE Transactions on Acoustics, Speech and Signal Processing, vol. Assp-28, No. 5, Oct. 1980, 13 pages.
Call Centre, "Word Prediction", The Call Centre & Scottish Executive Education Dept., 1999, pp. 63-73.
Cambria et al., "Jumping NLP Curves: A Review of Natural Language Processing Research", IEEE Computational Intelligence Magazine, 2014, vol. 9, May 2014, pp. 48-57.
Caminero-Gil et al., "Data-Driven Discourse Modeling for Semantic Interpretation", Proceedings of the IEEE International Conference on Acoustics, Speech and Signal Processing, May 1996, 6 pages.
Campbell et al., "An Expandable Error-Protected 4800 BPS CELP Coder (U.S. Federal Standard 4800 BPS Voice Coder)", (Proceedings of IEEE Int'l Acoustics, Speech, and Signal Processing Conference, May 1983), as reprinted in Vector Quantization (IEEE Press, 1990), 1990, pp. 328-330.
Cao et al., "Adapting Ranking SVM to Document Retrieval", SIGIR '06, Seattle, WA, Aug. 6-11, 2006, 8 pages.
Car Working Group, "Hands-Free Profile 1.5 HFP1.5_SPEC", Bluetooth Doc, available at <www.bluetooth.org>, Nov. 25, 2005, 93 pages.
Caraballo et al., "Language Identification Based on a Discriminative Text Categorization Technique", Iberspeech 2012—Vii Jornadas En Tecnologia Del Habla and Iii Iberiansl Tech Workshop, Nov. 21, 2012, pp. 1-10.
Card et al., "Readings in Information Visualization Using Vision to Think", Interactive Technologies, 1999, 712 pages.
Carpendale et al., "3-Dimensional Pliable Surfaces: For the Effective Presentation of Visual Information", UIST '95 Proceedings of the 8th Annual ACM Symposium on User Interface and Software Technology, Nov. 14-17, 1995, pp. 217-226.
Carpendale et al., "Extending Distortion Viewing from 2D to 3D", IEEE Computer Graphics and Applications, Jul./Aug. 1997, pp. 42-51.
Carpendale et al., "Making Distortions Comprehensible", IEEE Proceedings of Symposium on Visual Languages, 1997, 10 pages.
Carter et al., "The Speech-Language Interface in the Spoken Language Translator", SRI International, Nov. 23, 1994, 9 pages.
Carter, D., "Lexical Acquisition in the Core Language Engine", Proceedings of the Fourth Conference of the European Chapter of the Association for Computational Linguistics, 1989, 8 pages.
Casner et al., "N-Way Conferencing with Packet Video", The Third International Workshop on Packet Video, Mar. 22-23, 1990, pp. 1-6.
Castleos, "Whole House Voice Control Demonstration", available online at : https://www.youtube.com/watch?v=9SRCoxrZ_W4, Jun. 2, 2012, 26 pages.
Cawley, Gavin C. "The Application of Neural Networks to Phonetic Modelling", PhD. Thesis, University of Essex, Mar. 1996, 13 pages.
Chai et al., "Comparative Evaluation of a Natural Language Dialog Based System and a Menu Driven System for Information Access: A Case Study", Proceedings of the International Conference on Multimedia Information Retrieval (RIAO), Paris, Apr. 2000, 11 pages.
Chakarova et al., "Digital Still Cameras—Downloading Images to a Computer", Multimedia Reporting and Convergence, available at <http://journalism.berkeley.edu/multimedia/tutorials/stillcams/downloading.html>, retrieved on May 9, 2005, 2 pages.
Chang et al., "A Segment-Based Speech Recognition System for Isolated Mandarin Syllables", Proceedings TEN CON '93, IEEE Region 10 Conference on Computer, Communication, Control and Power Engineering, vol. 3, Oct. 1993, 6 pages.
Chang et al., "Discriminative Training of Dynamic Programming based Speech Recognizers", IEEE Transactions on Speech and Audio Processing, vol. 1, No. 2, Apr. 1993, pp. 135-143.
Chartier, David, "Using Multi-Network Meebo Chat Service on Your iPhone", available at <http://www.tuaw.com/2007/07/04/using-multi-network-meebo-chat-service-on-your-iphone/>, Jul. 4, 2007, 5 pages.
Chen, Yi, "Multimedia Siri Finds and Plays Whatever You Ask for", PSFK Report, Feb. 9, 2012, 9 pages.
Cheyer et al., "Demonstration Video of Multimodal Maps Using an Agent Architecture", published by SRI International no later than 1996, as depicted in Exemplary Screenshots from video entitled Demonstration Video of Multimodal Maps Using an Agent Architecture, 1996, 6 pages.
Cheyer et al., "Demonstration Video of Multimodal Maps Using an Open-Agent Architecture", published by SRI International no later than 1996, as depicted in Exemplary Screenshots from video entitled Demonstration Video of Multimodal Maps Using an Open-Agent Architecture, 6 pages.
Cheyer et al., "Multimodal Maps: An Agent-Based Approach", International Conference on Co-operative Multimodal Communication, 1995, 15 pages.
Cheyer et al., "Spoken Language and Multimodal Applications for Electronic Realties", Virtual Reality, vol. 3, 1999, pp. 1-15.
Cheyer et al., "The Open Agent Architecture", Autonomous Agents and Multi-Agent Systems, vol. 4, Mar. 1, 2001, 6 pages.
Cheyer et al., "The Open Agent Architecture: Building Communities of Distributed Software Agents", Artificial Intelligence Center, SRI International, Power Point Presentation, Available online at <http://www.ai.sri.com/-oaa/>, retrieved on Feb. 21, 1998, 25 pages.
Cheyer, A., "Demonstration Video of Vanguard Mobile Portal", published by SRI International no later than 2004, as depicted in 'Exemplary Screenshots from video entitled Demonstration Video of Vanguard Mobile Portal', 2004, 10 pages.
Cheyer, Adam, "A Perspective on AI & Agent Technologies for SCM", VerticalNet Presentation, 2001, 22 pages.
Cheyer, Adam, "About Adam Cheyer", available at <http://www.adam.cheyer.com/about.html>, retrieved on Sep. 17, 2012, 2 pages.
Choi et al., "Acoustic and Visual Signal based Context Awareness System for Mobile Application", IEEE Transactions on Consumer Electronics, vol. 57, No. 2, May 2011, pp. 738-746.
Chomsky et al., "The Sound Pattern of English", New York, Harper and Row, 1968, 242 pages.
Choularton et al., "User Responses to Speech Recognition Errors: Consistency of Behaviour Across Domains", Proceedings of the 10th Australian International Conference on Speech Science & Technology, Dec. 8-10, 2004, pp. 457-462.
Church, Kenneth W., "Phonological Parsing in Speech Recognition", Kluwer Academic Publishers, 1987.
Cisco Systems, Inc., "Cisco Unity Unified Messaging User Guide", Release 4.0(5), Apr. 14, 2005, 152 pages.
Cisco Systems, Inc., "Installation Guide for Cisco Unity Unified Messaging with Microsoft Exchange 2003/2000 (With Failover Configured)", Release 4.0(5), Apr. 14, 2005, 152 pages.
Cisco Systems, Inc., "Operations Manager Tutorial, Cisco's IPC Management Solution", 2006, 256 pages.
Codd, E. F., "Databases: Improving Usability and Responsiveness—How About Recently", Copyright 1978, Academic Press, Inc., 1978, 28 pages.
Cohen et al., "An Open Agent Architecture", available at <http://citeseerx.ist.psu.edu/viewdoc/summary?doi=1 0.1.1.30.480>, 1994, 8 pages.
Cohen et al., "Voice User Interface Design,", Excerpts from Chapter 1 and Chapter 10, 2004, 36 pages.
Coleman, David W., "Meridian Mail Voice Mail System Integrates Voice Processing and Personal Computing", Speech Technology, vol. 4, No. 2, Mar./Apr. 1988, pp. 84-87.
Coles et al., "Chemistry Question-Answering", SRI International, Jun. 1969, 15 pages.
Coles et al., "Techniques for Information Retrieval Using an Inferential Question-Answering System with Natural-Language Input", SRI International, Nov. 1972, 198 Pages.
Coles et al., "The Application of Theorem Proving to Information Retrieval", SRI International, Jan. 1971, 21 pages.
Colt, Sam, "Here's One Way Apple's Smartwatch Could Be Better Than Anything Else", Business Insider, Aug. 21, 2014, pp. 1-4.
Combined Search Report and Examination Report under Sections 17 and 18(3) received for GB Patent Application No. 1009318.5, mailed on Oct. 8, 2010, 5 pages.

(56) References Cited

OTHER PUBLICATIONS

Combined Search Report and Examination Report under Sections 17 and 18(3) received for GB Patent Application No. 1217449.6, mailed on Jan. 17, 2013, 6 pages.
Compaq Inspiration Technology, "Personal Jukebox (PJB)—Systems Research Center and PAAD", Oct. 13, 2000, 25 pages.
Compaq, "Personal Jukebox", available at <http://research.compaq.com/SRC/pjb/>, 2001, 3 pages.
Conkie et al., "Preselection of Candidate Units in a Unit Selection-Based Text-to-Speech Synthesis System", ISCA, 2000, 4 pages.
Conklin, Jeff, "Hypertext: An Introduction and Survey", Computer Magazine, Sep. 1987, 25 pages.
Conklin, Jeffrey, "A Survey of Hypertext", MCC Software Technology Program, Dec. 1987, 40 pages.
Connolly et al., "Fast Algorithms for Complex Matrix Multiplication Using Surrogates", IEEE Transactions on Acoustics, Speech and Signal Processing, vol. 37, No. 6, Jun. 1989, 13 pages.
Constantinides et al., "A Schema Based Approach to Dialog Control", Proceedings of the International Conference on Spoken Language Processing, 1998, 4 pages.
Copperi et al., "CELP Coding for High Quality Speech at 8 kbits/s", Proceedings of IEEE International Acoustics, Speech and Signal Processing Conference, Apr. 1986), as reprinted in Vector Quantization (IEEE Press), 1990, pp. 324-327.
Corporate Ladder, Bloc Publishing Corporation, 1991, 1 page.
Corr, Paul, "Macintosh Utilities for Special Needs Users", available at <http://homepage.mac.com/corrp/macsupt/columns/specneeds.html>, Feb. 1994 (content updated Sep. 19, 1999), 4 pages.
Cox et al., "Speech and Language Processing for Next-Millennium Communications Services", Proceedings of the IEEE, vol. 88, No. 8, Aug. 2000, 24 pages.
Craig et al., "Deacon: Direct English Access and Control", AFIPS Conference Proceedings, vol. 19, San Francisco, Nov. 1966, 18 pages.
Creative Technology Ltd., "Creative Nomad® II: Getting Started—User Guide (On Line Version)", available at <http://ec1.images-amazon.com/media/i3d/01/A/man-migrate/MANUAL000026434.pdf>, Apr. 2000, 46 pages.
Creative Technology Ltd., "Creative Nomad®: Digital Audio Player: User Guide (On-Line Version)", available at <http://ec1.images-amazon.com/media/i3d/01/A/man-migrate/MANUAL000010757.pdf>, Jun. 1999, 40 pages.
Creative Technology Ltd., "Nomad Jukebox", User Guide, Version 1.0, Aug. 2000, 52 pages.
Creative, "Creative Nomad MuVo TX", available at <http://web.archive.org/web/20041024175952/www.creative.com/products/pfriendly.asp?product=9672>, retrieved on Jun. 6, 2006, 1 page.
Creative, "Creative Nomad MuVo", available at <http://web.archive.org/web/20041024075901/www.creative.com/products/product.asp?category=213&subcategory=216&product=4983>, retrieved on Jun. 7, 2006, 1 page.
Creative, "Digital MP3 Player", available at <http://web.archive.org/web/20041024074823/www.creative.com/products/product.asp?category=213&subcategory=216&product=4983, 2004, 1 page.
Croft et al., "Task Support in an Office System", Proceedings of the Second ACM-SIGOA Conference on Office Information Systems, 1984, pp. 22-24.
Crowley et al., "MMConf: An Infrastructure for Building Shared Multimedia Applications", CSCW 90 Proceedings, Oct. 1990, pp. 329-342.
Cucerzan et al., "Bootstrapping a Multilingual Part-of-Speech Tagger in One Person-Day", In Proceedings of the 6th Conference on Natural Language Learning, vol. 20, 2002, pp. 1-7.
Cuperman et al., "Vector Predictive Coding of Speech at 16 kbit s/s", (IEEE Transactions on Communications, Jul. 1985), as reprinted in Vector Quantization (IEEE Press, 1990), 1990, pp. 300-311.
Cutkosky et al., "PACT: An Experiment in Integrating Concurrent Engineering Systems", Journal & Magazines, Computer, vol. 26, No. 1, Jan. 1993, 14 pages.
Dar et al., "DTL's DataSpot: Database Exploration Using Plain Language", Proceedings of the 24th VLDB Conference, New York, 1998, 5 pages.
Davis et al., "A Personal Handheld Multi-Modal Shopping Assistant", International Conference on Networking and Services, IEEE, 2006, 9 pages.
Davis et al., "Stone Soup Translation", Department of Linguistics, Ohio State University, 2001, 11 pages.
De Herrera, Chris, "Microsoft ActiveSync 3.1", Version 1.02, available at <http://www.cewindows.net/wce/activesync3.1.htm>, Oct. 13, 2000, 8 pages.
Decision on Appeal received for Korean Patent Application No. 10-2015-7035370, mailed on Jun. 7, 2019, 13 pages.
Decision to Grant received for Russian Patent Application No. 2012135502, mailed on Sep. 11, 2014, 15 pages.
Decision to Grant received for Russian Patent Application No. 2012144606, mailed on Nov. 19, 2014, 13 pages.
Decision to Grant received for Russian Patent Application No. 2012144639, mailed on Nov. 28, 2014, 10 pages.
Decision to Grant received for Russian Patent Application No. 2012144643, mailed on Nov. 20, 2014, 13 pages.
Decision to Grant received for Russian Patent Application No. 2012144647, mailed on Jan. 27, 2015, 16 pages.
Decision to Grant received for Russian Patent Application No. 2012144648, mailed on Nov. 19, 2014, 14 pages.
Decision to Grant received for Russian Patent Application No. 2015120954, mailed on Feb. 14, 2018, 20 pages.
Decision to Refuse received for European Patent Application No. 14737370.8, mailed on Jun. 26, 2019, 18 pages.
Decker et al., "Designing Behaviors for Information Agents", The Robotics Institute, Carnegie-Mellon University, Paper, Jul. 1996, 15 pages.
Decker et al., "Matchmaking and Brokering", The Robotics Institute, Carnegie-Mellon University, Paper, May 1996, 19 pages.
Deedeevuu, "Amazon Echo Alarm Feature", Available online at https://www.youtube.com/watch?v=fdjU8eRLk7c, Feb. 16, 2015, 1 page.
Deerwester et al., "Indexing by Latent Semantic Analysis", Journal of the American Society for Information Science, vol. 41, No. 6, Sep. 1990, 19 pages.
Degani et al., "'Soft' Controls for Hard Displays: Still a Challenge", Proceedings of the 36th Annual Meeting of the Human Factors Society, 1992, pp. 52-56.
Del Strother, Jonathan, "Coverflow", available at <http://www.steelskies.com/coverflow>, retrieved on Jun. 15, 2006, 14 pages.
Deller, Jr. et al., "Discrete-Time Processing of Speech Signals", Prentice Hall, ISBN: 0-02-328301-7, 1987, 14 pages.
Diagrammaker, Action Software, 1989.
Diagram-Master, Ashton-Tate, 1989.
Diamond Multimedia Systems, Inc., "Rio PMP300: User's Guide", available at <http://ec1.images-amazon.com/media/i3d/01/A/man-migrate/MANUAL000022854.pdf>, 1998, 28 pages.
Dickinson et al., "Palmtips: Tiny Containers for All Your Data", PC Magazine, vol. 9, Mar. 1990, p. 218(3).
Digital Audio in the New Era, Electronic Design and Application, No. 6, Jun. 30, 2003, 3 pages.
Digital Equipment Corporation, "Open VMS Software Overview", Software Manual, Dec. 1995, 159 pages.
Digital Equipment Corporation, "OpenVMS RTL DECtalk (DTK$) Manual", May 1993, 56 pages.
"Directv™ Voice", Now Part of the Directtv Mobile App for Phones, Sep. 18, 2013, 5 pages.
Dobrisek et al., "Evolution of the Information-Retrieval System for Blind and Visually-Impaired People", International Journal of Speech Technology, Kluwer Academic Publishers, Bo, vol. 6, No. 3, pp. 301-309.
Domingue et al., "Web Service Modeling Ontology (WSMO)—An Ontology for Semantic Web Services", Position Paper at the W3C Workshop on Frameworks for Semantics in Web Services, Innsbruck, Austria, Jun. 2005, 6 pages.
Donahue et al., "Whiteboards: A Graphical Database Tool", ACM Transactions on Office Information Systems, vol. 4, No. 1, Jan. 1986, pp. 24-41.

(56) References Cited

OTHER PUBLICATIONS

Donovan, R. E., “A New Distance Measure for Costing Spectral Discontinuities in Concatenative Speech Synthesisers”, available at <http://citeseerx.ist.osu.edu/viewdoc/summarv?doi=1 0.1.1.21.6398>, 2001, 4 pages.
Dourish et al., “Portholes: Supporting Awareness in a Distributed Work Group”, CHI 1992, May 1992, pp. 541-547.
Dowding et al., “Gemini: A Natural Language System for Spoken-Language Understanding”, Proceedings of the Thirty-First Annual Meeting of the Association for Computational Linguistics, 1993, 8 pages.
Dowding et al., “Interleaving Syntax and Semantics in an Efficient Bottom-Up Parser”, Proceedings of the 32nd Annual Meeting of the Association for Computational Linguistics, 1994, 7 pages.
Dual Rate Speech Coder for Multimedia Communications Transmitting at 5.3 and 6.3 kbit/s, International Telecommunication Union Recommendation G.723, 7 pages.
Dusan et al., “Multimodal Interaction on PDA’s Integrating Speech and Pen Inputs”, Eurospeech Geneva, 2003, 4 pages.
dyslexic.com, “AlphaSmart 3000 with CoWriter SmartApplet: Don Johnston Special Needs”, available at <http://www.dyslexic.com/procuts.php?catid-2&pid=465&PHPSESSID=2511b800000f7da>, retrieved on Dec. 6, 2005, 13 pages.
Earthling1984, “Samsung Galaxy Smart Stay Feature Explained”, Available online at:—“https://www.youtube.com/watch?v=RpjBNtSjupl”, May 29, 2013, 1 page.
Edwards, John R., “Q&A: Integrated Software with Macros and an Intelligent Assistant”, Byte Magazine, vol. 11, No. 1, Jan. 1986, pp. 120-122.
Egido, Carmen, “Video Conferencing as a Technology to Support Group Work: A Review of its Failures”, Bell Communications Research, 1988, pp. 13-24.
Elio et al., “On Abstract Task Models and Conversation Policies”, Proc. Workshop on Specifying and Implementing Conversation Policies, Autonomous Agents’99 Conference, 1999, pp. 1-10.
Elliot, Chip, “High-Quality Multimedia Conferencing Through a Long-Haul Packet Network”, BBN Systems and Technologies, 1993, pp. 91-98.
Elliott et al., “Annotation Suggestion and Search for Personal Multimedia Objects on the Web”, CIVR, Jul. 7-9, 2008, pp. 75-84.
Elofson et al., “Delegation Technologies: Environmental Scanning with Intelligent Agents”, Jour. of Management Info. Systems, Summer 1991, vol. 8, No. 1, 1991, pp. 37-62.
Eluminx, “Illuminated Keyboard”, available at <http://www.elumix.com/>, retrieved on Dec. 19, 2002, 1 page.
Engst, Adam C., “SoundJam Keeps on Jammin”, available at <http://db.tidbits.com/getbits.acgi?tbart=05988>, Jun. 19, 2000, 3 pages.
Epstein et al., “Natural Language Access to a Melanoma Data Base”, SRI International, Sep. 1978, 7 pages.
Ericsson et al., “Software Illustrating a Unified Approach to Multimodality and Multilinguality in the In-Home Domain”, Talk and Look: Tools for Ambient Linguistic Knowledge, Dec. 2006, 127 pages.
Ericsson Inc., “Cellular Phone with Integrated MP3 Player”, Research Disclosure Journal No. 41815, Feb. 1999, 2 pages.
Erol et al., “Multimedia Clip Generation From Documents for Browsing on Mobile Devices”, IEEE Transactions on Multimedia, vol. 10, No. 5, Aug. 2008, 13 pages.
Eslambolchilar et al., “Making Sense of Fisheye Views”, Second Dynamics and Interaction Workshop at University of Glasgow, Aug. 2005, 6 pages.
Eslambolchilar et al., “Multimodal Feedback for Tilt Controlled Speed Dependent Automatic Zooming”, UIST’04, Oct. 24-27, 2004, 2 pages.
Evermann et al., “Posterior Probability Decoding, Confidence Estimation and System Combination”, Proceedings Speech Transcription Workshop, 2000, 4 pages.
Evi, “Meet Evi: The One Mobile Application that Provides Solutions for your Everyday Problems”, Feb. 2012, 3 pages.
Ex Parte Quayle Action received for U.S. Appl. No. 13/725,713, mailed on Dec. 18, 2013, 5 pages.
Exhibit 1, “Natural Language Interface Using Constrained Intermediate Dictionary of Results”, List of Publications Manually Reviewed for the Search of U.S. Pat. No. 7,177,798, Mar. 22, 2013, 1 page.
Extended European Search Report (includes European Search Report and European Search Opinion) received for European Patent Application No. 06256215.2, mailed on Feb. 20, 2007, 6 pages.
Extended European Search Report (includes European Search Report and European Search Opinion) received for European Patent Application No. 12186113.2, mailed on Apr. 28, 2014, 14 pages.
Extended European Search Report (includes Partial European Search Report and European Search Opinion) received for European Patent Application No. 13169672.6, mailed on Aug. 14, 2013, 11 pages.
Extended European Search Report (includes Supplementary European Search Report and Search Opinion) received for European Patent Application No. 07863218.9, mailed on Dec. 9, 2010, 7 pages.
Extended European Search Report (includes Supplementary European Search Report and Search Opinion) received for European Patent Application No. 12727027.0, mailed on Sep. 26, 2014, 7 pages.
Extended European Search Report (inclusive of the Partial European Search Report and European Search Opinion) received for European Patent Application No. 12729332.2, mailed on Oct. 31, 2014, 6 pages.
Extended European Search Report and Search Opinion received for European Patent Application No. 12185276.8, mailed on Dec. 18, 2012, 4 pages.
Extended European Search Report received for European Patent Application No. 11707939.2, mailed on Nov. 18, 2016, 13 pages.
Extended European Search Report received for European Patent Application No. 12186663.6, mailed on Jul. 16, 2013, 6 pages.
Extended European Search Report received for European Patent Application No. 14737370.8, mailed on May 19, 2016, 12 pages.
Extended European Search Report received for European Patent Application No. 16188272.5, mailed on Nov. 18, 2016, 12 pages.
Extended European Search Report received for European Patent Application No. 18202474.5, mailed on Feb. 12, 2019, 9 pages.
Extended European Search Report received for European Patent Application No. 19195766.1, mailed on Oct. 8, 2019, 15 pages.
Fanty et al., “A Comparison of DFT, PLP and Cochleagram for Alphabet Recognition”, IEEE, Nov. 1991, pp. 326-329.
Feigenbaum et al., “Computer-Assisted Semantic Annotation of Scientific Life Works”, Oct. 15, 2007, 22 pages.
Ferguson et al., “TRIPS: An Integrated Intelligent Problem-Solving Assistant”, Proceedings of the Fifteenth National Conference on Artificial Intelligence (AAAI-98) and Tenth Conference on Innovative Applications of Artificial Intelligence (IAAI-98), 1998, 7 pages.
Fikes et al., “A Network-Based Knowledge Representation and its Natural Deduction System”, SRI International, Jul. 1977, 43 pages.
Filipowicz, Luke, “How to use the Quick Type Keyboard in iOS 8”, available online at <https://www.imore.com/comment/568232>, Oct. 11, 2014, pp. 1-17.
Final Office Action received for U.S. Appl. No. 12/987,982, mailed on Jul. 25, 2014, 21 pages.
Final Office Action received for U.S. Appl. No. 13/492,809, mailed on Feb. 9, 2016, 11 pages.
Final Office Action received for U.S. Appl. No. 13/492,809, mailed on May 22, 2014, 10 pages.
Final Office Action received for U.S. Appl. No. 13/725,481, mailed on Dec. 19, 2013, 16 pages.
Final Office Action received for U.S. Appl. No. 13/725,550, mailed on Nov. 13, 2013, 10 pages.
Final Office Action received for U.S. Appl. No. 13/725,616, mailed on Nov. 15, 2013, 8 pages.
Final Office Action received for U.S. Appl. No. 13/725,742, mailed on Nov. 18, 2013, 6 pages.
Final Office Action received for U.S. Appl. No. 13/725,761, mailed on Dec. 19, 2013, 13 pages.

(56) References Cited

OTHER PUBLICATIONS

Final Office Action received for U.S. Appl. No. 13/725,761, mailed on Jul. 11, 2014, 5 pages.
Final Office Action received for U.S. Appl. No. 13/784,707, mailed on Nov. 6, 2013, 12 pages.
Final Office Action received for U.S. Appl. No. 13/913,336, mailed on Oct. 24, 2017, 9 pages.
Final Office Action received for U.S. Appl. No. 15/394,162, mailed on Oct. 29, 2019, 17 pages.
Findlater et al., "Beyond Qwerty: Augmenting Touch-Screen Keyboards with Multi-Touch Gestures for Non-Alphanumeric Input", CHI '12, Austin, Texas, USA, May 5-10, 2012, 4 pages.
Finkel et al., "Joint Parsing and Named Entity Recognition", Human Language Technologies: The 2009 Annual Conference of the North American Chapter of the ACL, Jun. 2009, pp. 326-334.
Fiscus, J. G., "A Post-Processing System to Yield Reduced Word Error Rates: Recognizer Output Voting Error Reduction (ROVER)", IEEE Proceedings, Automatic Speech Recognition and Understanding, Dec. 14-17, 1997, pp. 347-354.
Fisher et al., "Virtual Environment Display System", Interactive 3D Graphics, Oct. 23-24, 1986, pp. 77-87.
Forsdick, Harry, "Explorations into Real-Time Multimedia Conferencing", Proceedings of the lfip Tc 6 International Symposium on Computer Message Systems, 1986, 331 pages.
Frisse, M. E., "Searching for Information in a Hypertext Medical Handbook", Communications of the ACM, vol. 31, No. 7, Jul. 1988, 8 pages.
Furnas et al., "Space-Scale Diagrams: Understanding Multiscale Interfaces", CHI '95 Proceedings of the SIGCHI Conference on Human Factors in Computing Systems, 1995, pp. 234-241.
Furnas, George W., "Effective View Navigation", Proceedings of the ACM SIGCHI Conference on Human Factors in Computing Systems, Mar. 1997, pp. 367-374.
Furnas, George W., "Generalized Fisheye Views", CHI '86 Proceedings of the SIGCHI Conference on Human Factors in Computing Systems, vol. 17, No. 4, Apr. 1986, pp. 16-23.
Furnas, George W., "The Fisheye Calendar System", Bellcore Technical Memorandum, Nov. 19, 1991, pp. 1-9.
"Galaxy S7: How to Adjust Screen Timeout & Lock Screen Timeout", Available online at:—"https://www.youtube.com/watch?v=n6e1WKUS2ww", Jun. 9, 2016, 1 page.
Gamback et al., "The Swedish Core Language Engine", NOTEX Conference, 1992, 17 pages.
Gannes, Liz, "Alfred App Gives Personalized Restaurant Recommendations", AllThingsD, Jul. 18, 2011, pp. 1-3.
Gardner, Jr., P. C., "A System for the Automated Office Environment", IBM Systems Journal, vol. 20, No. 3, 1981, pp. 321-345.
Garretson, R., "IBM Adds 'Drawing Assistant' Design Tool to Graphic Series", PC Week, vol. 2, No. 32, Aug. 13, 1985, 1 page.
Gautier et al., "Generating Explanations of Device Behavior Using Compositional Modeling and Causal Ordering", CiteSeerx, 1993, pp. 89-97.
Gaver et al., "One Is Not Enough: Multiple Views in a Media Space", INTERCHI, Apr. 24-29, 1993, pp. 335-341.
Gaver et al., "Realizing a Video Environment: EuroPARC's RAVE System", Rank Xerox Cambridge EuroPARC, 1992, pp. 27-35.
Gervasio et al., "Active Preference Learning for Personalized Calendar Scheduling Assistance", CiteSeerx, Proceedings of IUI'05, Jan. 2005, pp. 90-97.
Giachin et al., "Word Juncture Modeling Using Inter-Word Context-Dependent Phone-Like Units", Cselt Technical Reports, vol. 20, No. 1, Mar. 1992, pp. 43-47.
Gillespie, Kelly, "Adventures in Integration", Data Based Advisor, vol. 9, No. 9, Sep. 1991, pp. 90-92.
Gillespie, Kelly, "Internationalize Your Applications with Unicode", Data Based Advisor, vol. 10, No. 10, Oct. 1992, pp. 136-137.
Gilloire et al., "Innovative Speech Processing for Mobile Terminals: An Annotated Bibliography", Signal Processing, vol. 80, No. 7, Jul. 2000, pp. 1149-1166.
Glass et al., "Multilingual Language Generation Across Multiple Domains", International Conference on Spoken Language Processing, Japan, Sep. 1994, 5 pages.
Glass et al., "Multilingual Spoken-Language Understanding in the Mit Voyager System", Available online at <http://groups.csail.mit.edu/sls/publications/1995/speechcomm95-voyager.pdf>, Aug. 1995, 29 pages.
Glass, Alyssa, "Explaining Preference Learning", CiteSeerx, 2006, pp. 1-5.
Glinert-Stevens, Susan, "Microsoft Publisher: Desktop Wizardry", PC Sources, vol. 3, No. 2, Feb. 1992, 1 page.
Glossary of Adaptive Technologies: Word Prediction, available at <http://www.utoronto.ca/atrc/reference/techwordpred.html>, retrieved on Dec. 6, 2005, 5 pages.
Gmail, "About Group Chat", available at <http://mail.google.com/support/bin/answer.py?answer=81090>, Nov. 26, 2007, 2 pages.
Goddeau et al., "A Form-Based Dialogue Manager for Spoken Language Applications", Available online at <http://phasedance.com/pdflicslp96.pdf>, Oct. 1996, 4 pages.
Goddeau et al., "Galaxy: A Human-Language Interface to On-Line Travel Information", International Conference on Spoken Language Processing, Yokohama, 1994, pp. 707-710.
Goldberg et al., "Using Collaborative Filtering to Weave an Information Tapestry", Communications of the ACM, vol. 35, No. 12, Dec. 1992, 10 pages.
Goldberg, Cheryl, "IBM Drawing Assistant: Graphics for the EGA", PC Magazine, vol. 4, No. 26, Dec. 24, 1985, 1 page.
Gomez et al., "Mouth Gesture and Voice Command Based Robot Command Interface", IEEE International Conference on Robotics and Automation, May 12-17, 2009, pp. 333-338.
Gong et al., "Guidelines for Handheld Mobile Device Interface Design", Proceedings of DSI 2004 Annual Meeting, 2004, pp. 3751-3756.
Gonnet et al., "Handbook of Algorithms and Data Structures: in Pascal and C. (2nd ed.)", Addison-Wesley Longman Publishing Co., 1991, 17 pages.
Good et al., "Building a User-Derived Interface", Communications of the ACM; (Oct. 1984) vol. 27, No. 10, Oct. 1984, pp. 1032-1043.
Google Developers, "Voice Search in Your App", Available online at:—https://www.youtube.com/watch?v=PS1FbB5qWEI, Nov. 12, 2014, 1 page.
Gorin et al., "On Adaptive Acquisition of Language", International Conference on Acoustics, Speech and Signal Processing (ICASSP'90), vol. 1, Apr. 1990, 5 pages.
Gotoh et al., "Document Space Models Using Latent Semantic Analysis", In Proceedings of Eurospeech, 1997, 4 pages.
Gray et al., "Rate Distortion Speech Coding with a Minimum Discrimination Information Distortion Measure", (IEEE Transactions on Information Theory, Nov. 1981), as reprinted in Vector Quantization (IEEE Press), 1990, pp. 208-221.
Gray, R. M., "Vector Quantization", IEEE ASSP Magazine, Apr. 1984, 26 pages.
Green, C., "The Application of Theorem Proving to Question-Answering Systems", SRI Stanford Research Institute, Artificial Intelligence Group, Jun. 1969, 169 pages.
Greenberg, Saul, "A Fisheye Text Editor for Relaxed-WYSIWIS Groupware", CHI '96 Companion, Vancouver, Canada, Apr. 13-18, 1996, 2 pages.
Gregg et al., "DSS Access on the WWW: An Intelligent Agent Prototype", Proceedings of the Americas Conference on Information Systems, Association for Information Systems, 1998, 3 pages.
Griffin et al., "Signal Estimation From Modified Short-Time Fourier Transform", IEEE Transactions on Acoustics, Speech and Signal Processing, vol. ASSP-32, No. 2, Apr. 1984, pp. 236-243.
Grishman et al., "Computational Linguistics: An Introduction", Cambridge University Press, 1986, 172 pages.
Grosz et al., "Dialogic: A Core Natural-Language Processing System", SRI International, Nov. 1982, 17 pages.
Grosz et al., "Research on Natural-Language Processing at SRI", SRI International, Nov. 1981, 21 pages.
Grosz et al., "Team: An Experiment in the Design of Transportable Natural-Language Interfaces", Artificial Intelligence, vol. 32, 1987, 71 pages.

(56) References Cited

OTHER PUBLICATIONS

Grosz, B., "Team: A Transportable Natural-Language Interface System", Proceedings of the First Conference on Applied Natural Language Processing, 1983, 7 pages.
Gruber et al., "An Ontology for Engineering Mathematics", Fourth International Conference on Principles of Knowledge Representation and Reasoning, Available online at <http://www-ksl.stanford.edu/knowledge-sharing/papers/engmath.html>, 1994, pp. 1-22.
Gruber et al., "Generative Design Rationale: Beyond the Record and Replay Paradigm", Knowledge Systems Laboratory, Technical Report KSL 92-59, Dec. 1991, Updated Feb. 1993, 24 pages.
Gruber et al., "Machine-Generated Explanations of Engineering Models: A Compositional Modeling Approach", Proceedings of International Joint Conference on Artificial Intelligence, 1993, 7 pages.
Gruber et al., "NIKE: A National Infrastructure for Knowledge Exchange", A Whitepaper Advocating and ATP Initiative on Technologies for Lifelong Learning, Oct. 1994, pp. 1-10.
Gruber et al., "Toward a Knowledge Medium for Collaborative Product Development", Proceedings of the Second International Conference on Artificial Intelligence in Design, Jun. 1992, pp. 1-19.
Gruber, Thomas R., "A Translation Approach to Portable Ontology Specifications", Knowledge Acquisition, vol. 5, No. 2, Jun. 1993, pp. 199-220.
Gruber, Thomas R., "Automated Knowledge Acquisition for Strategic Knowledge", Machine Learning, vol. 4, 1989, pp. 293-336.
Gruber, Thomas R., "Interactive Acquisition of Justifications: Learning "Why" by Being Told "What"", Knowledge Systems Laboratory, Technical Report KSL 91-17, Original Oct. 1990, Revised Feb. 1991, 24 pages.
Gruber, Thomas R., "Toward Principles for the Design of Ontologies used for Knowledge Sharing", International Journal of Human-Computer Studies, vol. 43, No. 5-6, Nov. 1995, pp. 907-928.
Gruber, Thomas R., et al., U.S. Appl. No. 61/186,414, filed Jun. 12, 2009 titled "System and Method for Semantic Auto-Completion" 13 pages.
Gruber, Thomas R., et al., U.S. Appl. No. 61/493,201, filed Jun. 3, 2011 titled "Generating and Processing Data Items That Represent Tasks to Perform", 68 pages.
Gruber, Thomas R., et al., Unpublished U.S. Appl. No. 61/657,744, filed Jun. 9, 2012 titled "Automatically Adapting User Interfaces for Hands-Free Interaction", 40 pages.
Gruber, Thomas R., et al., U.S. Appl. No. 07/976,970, filed Nov. 16, 1992 titled "Status Bar for Application Windows".
Gruber, Tom, "(Avoiding) The Travesty of the Commons", Presentation at NPUC, New Paradigms for User Computing, IBM Almaden Research Center, Jul. 24, 2006, 52 pages.
Gruber, Tom, "2021: Mass Collaboration and the Really New Economy", TNTY Futures, vol. 1, No. 6, Available online at <http://tomgruber.org/writing/tnty2001.htm>, Aug. 2001, 5 pages.
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Collaborating Around Shared Content on the WWW, W3C Workshop on WWW and Collaboration", available at <http://www.w3.org/Collaboration/Workshop/Proceedings/P9.html>, Sep. 1995, 1 page.
Gruber, Tom, "Collective Knowledge Systems: Where the Social Web Meets the Semantic Web", Web Semantics: Science, Services and Agents on the World Wide Web, 2007, pp. 1-19.
Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.
Gruber, Tom, "Enterprise Collaboration Management with Intraspect", Intraspect Technical White Paper, Jul. 2001, pp. 1-24.
Gruber, Tom, "Every Ontology is a Treaty—A Social Agreement—Among People with Some Common Motive in Sharing", Official Quarterly Bulletin of AIS Special Interest Group on Semantic Web and Information Systems, vol. 1, No. 3, 2004, pp. 1-5.
Gruber, Tom, "Helping Organizations Collaborate, Communicate, and Learn", Presentation to NASA Ames Research, Available online at <http://tomgruber.org/writing/organizational-intelligence-talk.htm>, Mar.-Oct. 2003, 30 pages.
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.
Gruber, Tom, "It Is What It Does: The Pragmatics of Ontology for Knowledge Sharing", Proceedings of the International CIDOC CRM Symposium, Available online at <http://tomgruber.org/writing/cidoc-ontology.htm>, Mar. 26, 2003, 21 pages.
Gruber, Tom, "Ontologies, Web 2.0 and Beyond", Ontology Summit, Available online at <http://tomgruber.org/writing/ontolog-social-web-keynote.htm>, Apr. 2007, 17 pages.
Gruber, Tom, "Ontology of Folksonomy: A Mash-Up of Apples and Oranges", Int'l Journal on Semantic Web & Information Systems, vol. 3, No. 2, 2007, 7 pages.
Gruber, Tom, "Siri, A Virtual Personal Assistant—Bringing Intelligence to the Interface", Semantic Technologies Conference, Jun. 16, 2009, 21 pages.
Gruber, Tom, "TagOntology", Presentation to Tag Camp, Oct. 29, 2005, 20 pages.
Gruber, Tom, "Where the Social Web Meets the Semantic Web", Presentation at the 5th International Semantic Web Conference, Nov. 2006, 38 pages.
Gruhn et al., "A Research Perspective on Computer-Assisted Office Work", IBM Systems Journal, vol. 18, No. 3, 1979, pp. 432-456.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guida et al., "NLI: A Robust Interface for Natural Language Person-Machine Communication", International Journal of Man-Machine Studies, vol. 17, 1982, 17 pages.
Guim, Mark, "How to Set a Person-Based Reminder with Cortana", available at <http://www.wpcentral.com/how-to-person-based-reminder-cortana>, Apr. 26, 2014, 15 pages.
Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.
Guzzoni et al., "Active, A Platform for Building Intelligent Operating Rooms", Surgetica 2007 Computer-Aided Medical Interventions: Tools and Applications, 2007, pp. 191-198.
Guzzoni et al., "Active, A platform for Building Intelligent Software", Computational Intelligence, available at <http://www.informatik.uni-trier.del-ley/pers/hd/g/Guzzoni:Didier>, 2006, 5 pages.
Guzzoni et al., "Active, A Tool for Building Intelligent User Interfaces", ASC 2007, Palma de Mallorca, Aug. 2007, 6 pages.
Guzzoni et al., "Many Robots Make Short Work", AAAI Robot Contest, SRI International, 1996, 9 pages.
Guzzoni et al., "Modeling Human-Agent Interaction with Active Ontologies", AAAI Spring Symposium, Interaction Challenges for Intelligent Assistants, Stanford University, Palo Alto, California, 2007, 8 pages.
Guzzoni, D., "Active: A Unified Platform for Building Intelligent Assistant Applications", Oct. 25, 2007, 262 pages.
Haas et al., "An Approach to Acquiring and Applying Knowledge", SRI international, Nov. 1980, 22 pages.
Hadidi et al., "Student's Acceptance of Web-Based Course Offerings: An Empirical Assessment", Proceedings of the Americas Conference on Information Systems(AMCIS), 1998, 4 pages.
Hain et al., "The Papageno TTS System", Siemens AG, Corporate Technology, Munich, Germany TC-STAR Workshop, 2006, 6 pages.
Haitsma et al., "A Highly Robust Audio Fingerprinting System", In Proceedings of the International Symposium on Music Information Retrieval (ISMIR), 2002, 9 pages.
Halbert, D. C., "Programming by Example", Dept. Electrical Engineering and Comp. Sciences, University of California, Berkley, Nov. 1984, pp. 1-76.
Hall, William S., "Adapt Your Program for Worldwide Use with Windows.TM. Internationalization Support", Microsoft Systems Journal, vol. 6, No. 6, Nov./Dec. 1991, pp. 29-58.

(56) References Cited

OTHER PUBLICATIONS

Haoui et al., "Embedded Coding of Speech: A Vector Quantization Approach", (Proceedings of the IEEE International Acoustics, Speech and Signal Processing Conference, Mar. 1985), as reprinted in Vector Quantization (IEEE Press, 1990), 1990, pp. 297-299.
Hardwar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Harris, F. J., "On the Use of Windows for Harmonic Analysis with the Discrete Fourier Transform", In Proceedings of the IEEE, vol. 66, No. 1, Jan. 1978, 34 pages.
Hartson et al., "Advances in Human-Computer Interaction", Chapters 1, 5, and 6, vol. 3, 1992, 121 pages.
Hashimoto, Yoshiyuki, "Simple Guide for iPhone Siri, Which Can Be Operated with Your Voice", Shuwa System Co., Ltd., vol. 1, Jul. 5, 2012, pp. 8, 130, 131.
Hawkins et al., "Hierarchical Temporal Memory: Concepts, Theory and Terminology", Numenta, Inc., Mar. 27, 2007, 20 pages.
Hayashi et al., "Internet Information Navigation Service Titan", NTT Technology Journal, JPN, vol. 8, No. 8, Aug. 1996, pp. 20-23.
He et al., "Personal Security Agent: KQML-Based PKI", The Robotics Institute, Carnegie-Mellon University, Paper, 1997, 14 pages.
Headset Button Controller v7.3 APK Full App Download for Android, Blackberry, iPhone, 11 pages.
Hear voice from Google translate, Available on URL: https://www.youtube.com/watch?v=18AvMhFqD28, Jan. 28, 2011, 1 page.
Heger et al., "Knowbot: An Adaptive Data Base Interface", Nuclear Science and Engineering, V. 107, No. 2, Feb. 1991, pp. 142-157.
Helm et al., "Building Visual Language Parsers", Proceedings of CHI'91, Proceedings of the SIGCHI Conference on Human Factors in Computing Systems, 1991, 8 pages.
Hendrickson, Bruce, "Latent Semantic Analysis and Fiedler Retrieval", Linear Algebra and its Applications, vol. 421, 2007, pp. 345-355.
Hendrix et al., "Developing a Natural Language Interface to Complex Data", ACM Transactions on Database Systems, vol. 3, No. 2, Jun. 1978, pp. 105-147.
Hendrix et al., "The Intelligent Assistant: Technical Considerations Involved in Designing Q&A's Natural-Language Interface", Byte Magazine, Issue 14, Dec. 1987, 1 page.
Hendrix et al., "Transportable Natural-Language Interfaces to Databases", SRI International, Technical Note 228, Apr. 30, 1981, 18 pages.
Hendrix, Gary G., "Human Engineering for Applied Natural Language Processing", SRI International, Technical Note 139, Feb. 1977, 27 pages.
Hendrix, Gary G., "Klaus: A System for Managing Information and Computational Resources", SRI International, Technical Note 230, Oct. 1980, 34 pages.
Hendrix, Gary G., "Lifer: A Natural Language Interface Facility", SRI Stanford Research Institute, Technical Note 135, Dec. 1976, 9 pages.
Hendrix, Gary G., "Natural-Language Interface", American Journal of Computational Linguistics, vol. 8, No. 2, Apr.-Jun. 1982, pp. 56-61.
Hendrix, Gary G., "The Lifer Manual: A Guide to Building Practical Natural Language Interfaces", SRI International, Technical Note 138, Feb. 1977, 76 pages.
Henrich et al., "Language Identification for the Automatic Grapheme-To-Phoneme Conversion of Foreign Words in a German Text-To-Speech System", Proceedings of the European Conference on Speech Communication and Technology, vol. 2, Sep. 1989, pp. 220-223.
Hermansky, H., "Perceptual Linear Predictive (PLP) Analysis of Speech", Journal of the Acoustical Society of America, vol. 87, No. 4, Apr. 1990, 15 pages.
Hermansky, H., "Recognition of Speech in Additive and Convolutional Noise Based on Rasta Spectral Processing", Proceedings of IEEE International Conference on Acoustics, Speech and Signal Processing (ICASSP'93), Apr. 1993, 4 pages.
"Hey Google: How to Create a Shopping List with Your Google Assistant", Available online at:—https://www.youtube.com/watch?v=w9NCsElax1Y, May 25, 2018, 1 page.
Heyer et al., "Exploring Expression Data: Identification and Analysis of Coexpressed Genes", Genome Research, vol. 9, 1999, pp. 1106-1115.
Hill, R. D., "Some Important Features and Issues in User Interface Management System", Dynamic Graphics Project, University of Toronto, CSRI, vol. 21, No. 2, Apr. 1987, pp. 116-120.
Hinckley et al., "A Survey of Design Issues in Spatial Input", UIST '94 Proceedings of the 7th Annual ACM Symposium on User Interface Software and Technology, 1994, pp. 213-222.
Hiroshi, "TeamWork Station: Towards a Seamless Shared Workspace", NTT Human Interface Laboratories, CSCW 90 Proceedings, Oct. 1990, pp. 13-26.
Hirschman et al., "Multi-Site Data Collection and Evaluation in Spoken Language Understanding", Proceedings of the Workshop on Human Language Technology, 1993, pp. 19-24.
Hobbs et al., "Fastus: A System for Extracting Information from Natural-Language Text", SRI International, Technical Note 519, Nov. 19, 1992, 26 pages.
Hobbs et al., "Fastus: Extracting Information from Natural-Language Texts", SRI International, 1992, pp. 1-22.
Hobbs, Jerry R., "Sublanguage and Knowledge", SRI International, Technical Note 329, Jun. 1984, 30 pages.
Hodjat et al., "Iterative Statistical Language Model Generation for use with an Agent-Oriented Natural Language Interface", Proceedings of HCI International, vol. 4, 2003, pp. 1422-1426.
Hoehfeld et al., "Learning with Limited Numerical Precision Using the Cascade-Correlation Algorithm", IEEE Transactions on Neural Networks, vol. 3, No. 4, Jul. 1992, 18 pages.
Holmes, "Speech System and Research", 1955, pp. 129-135, 152-153.
Holmes, J. N., "Speech Synthesis and Recognition-Stochastic Models for Word Recognition", Published by Chapman & Hall, London, ISBN 0 412 534304, 1998, 7 pages.
Hon et al., "CMU Robust Vocabulary-Independent Speech Recognition System", IEEE International Conference on Acoustics, Speech and Signal Processing (ICASSP-91), Apr. 1991, 4 pages.
Hon et al., "Towards Large Vocabulary Mandarin Chinese Speech Recognition", Conference on Acoustics, Speech, and Signal Processing, ICASSP-94, IEEE International, vol. 1, Apr. 1994, pp. 545-548.
Hopper, Andy, "Pandora—An Experimental System for Multimedia Applications", Olivetti Research Laboratory, Apr. 1990, pp. 19-34.
Horvitz et al., "Handsfree Decision Support: Toward a Non-invasive Human-Computer Interface", Proceedings of the Symposium on Computer Applications in Medical Care, IEEE Computer Society Press, 1995, p. 955.
Horvitz et al., "In Pursuit of Effective Handsfree Decision Support: Coupling Bayesian Inference, Speech Understanding, and User Models", 1995, 8 pages.
"How to Enable Google Assistant on Galaxy 57 and other Android Phones (No Root)", Available online at:—"https://www.youtube.com/watch?v=HeklQbWyksE", Mar. 20, 2017, 1 page.
"How to Use Ok Google Assistant Even Phone is Locked", Available online at:—"https://www.youtube.com/watch?v=9B_gP4j_SP8", Mar. 12, 2018, 1 page.
Howard, John H., "(Abstract) An Overview of the Andrew File System", Information Technology Center, Carnegie Mellon University; (CMU-ITC-88-062) To Appear in a future issue of the ACM Transactions on Computer Systems, 1988, pp. 1-6.
Huang et al., "Real-Time Software-Based Video Coder for Multimedia Communication Systems", Department of Computer Science and Information Engineering, 1993, 10 pages.
Huang et al., "The SPHINX-II Speech Recognition System: An Overview", Computer, Speech and Language, vol. 7, No. 2, 1993, 14 pages.
Hukin, R. W., "Testing an Auditory Model by Resynthesis", European Conference on Speech Communication and Technology, Sep. 26-29, 1989, pp. 243-246.

(56) References Cited

OTHER PUBLICATIONS

Hunt, "Unit Selection in a Concatenative Speech Synthesis System Using a Large Speech Database", Copyright 1996 IEEE. "To appear in Proc. ICASSP-96, May 7-10, Atlanta, GA" ATR Interpreting Telecommunications Research Labs, Kyoto Japan, 1996, pp. 373-376.
IAP Sports Lingo 0x09 Protocol V1.00, May 1, 2006, 17 pages.
IBM Corporation, "Simon Says Here's How", Users Manual, 1994, 3 pages.
IBM, "Integrated Audio-Graphics User Interface", IBM Technical Disclosure Bulletin, vol. 33, No. 11, Apr. 1991, 4 pages.
IBM, "Speech Editor", IBM Technical Disclosure Bulletin, vol. 29, No. 10, Mar. 10, 1987, 3 pages.
IBM, "Speech Recognition with Hidden Markov Models of Speech Waveforms", IBM Technical Disclosure Bulletin, vol. 34, No. 1, Jun. 1991, 10 pages.
IBM, "Why Buy: ThinkPad", available at <http://www.pc.ibm.com/us/thinkpad/easeofuse.html>, retrieved on Dec. 19, 2002, 2 pages.
IChat AV, "Video Conferencing for the Rest of Us", Apple—Mac OS X—iChat AV, available at <http://www.apple.com/macosx/features/ichat/>, retrieved on Apr. 13, 2006, 3 pages.
id3.org, "id3v2.4.0-Frames", available at <http://id3.org/id3v2.4.0-frames?action=print>, retrieved on Jan. 22, 2015, 41 pages.
IEEE 1394 (Redirected from Firewire, Wikipedia, The Free Encyclopedia, available at <http://www.wikipedia.org/wiki/Firewire>, retrieved on Jun. 8, 2003, 2 pages.
Inews and Tech, "How to Use the QuickType Keyboard in iOS 8", Available online at:—"http://www.inewsandtech.com/how-to-use-the-quicktype-keyboard-in-ios-8/", Sep. 17, 2014, 6 pages.
Interactive Voice, available at <http://www.helloivee.com/company/>, retrieved on Feb. 10, 2014, 2 pages.
International Preliminary Report on Patentability received for PCT Patent Application No. PCT/GB2009/051684, mailed on Jun. 23, 2011, 10 pages.
International Preliminary Report on Patentability received for PCT Patent Application No. PCT/US1993/012637, issued on Apr. 10, 1995, 7 pages.
International Preliminary Report on Patentability received for PCT Patent Application No. PCT/US1993/012666, issued on Mar. 1, 1995, 5 pages.
International Preliminary Report on Patentability received for PCT Patent Application No. PCT/US1994/011011, issued on Feb. 28, 1996, 4 pages.
International Preliminary Report on Patentability received for PCT Patent Application No. PCT/US1995/008369, issued on Oct. 9, 1996, 4 pages.
International Preliminary Report on Patentability received for PCT Patent Application No. PCT/US2005/030234, issued on Mar. 20, 2007, 9 pages.
International Preliminary Report on Patentability received for PCT Patent Application No. PCT/US2009/051954, issued on Mar. 24, 2011, 8 pages.
International Preliminary Report on Patentability received for PCT Patent Application No. PCT/US2009/055577, completed on Aug. 6, 2010, 12 pages.
International Preliminary Report on Patentability received for PCT Patent Application No. PCT/US2011/020861, mailed on Aug. 2, 2012, 11 pages.
International Preliminary Report on Patentability received for PCT Patent Application No. PCT/US2012/029810, mailed on Oct. 3, 2013, 9 pages.
International Preliminary Report on Patentability received for PCT Patent Application No. PCT/US2012/040571, mailed on Dec. 19, 2013, 10 pages.
International Preliminary Report on Patentability received for PCT Patent Application No. PCT/US2012/040801, mailed on Dec. 19, 2013, 16 pages.
International Preliminary Report on Patentability received for PCT Patent Application No. PCT/US2012/056382, mailed on Apr. 10, 2014, 9 pages.
International Preliminary Report on Patentability received for PCT Patent Application No. PCT/US2013/028412, mailed on Sep. 12, 2014, 12 pages.
International Preliminary Report on Patentability received for PCT Patent Application No. PCT/US2013/028920, mailed on Sep. 18, 2014, 11 pages.
International Preliminary Report on Patentability received for PCT Patent Application No. PCT/US2013/029156, mailed on Sep. 9, 2014, 7 pages.
International Preliminary Report on Patentability received for PCT Patent Application No. PCT/US2013/041225, mailed on Nov. 27, 2014, 9 pages.
International Preliminary Report on Patentability received for PCT Patent Application No. PCT/US2013/041233, issued on Nov. 18, 2014, 8 pages.
International Preliminary Report on Patentability received for PCT Patent Application No. PCT/US2013/047668, mailed on Jan. 8, 2015, 13 pages.
International Preliminary Report on Patentability received for PCT Patent Application No. PCT/US2013/052558, mailed on Feb. 12, 2015, 12 pages.
International Preliminary Report on Patentability received for PCT Patent Application No. PCT/US2013/058916, mailed on Mar. 19, 2015, 8 pages.
International Preliminary Report on Patentability received for PCT Patent Application No. PCT/US2013/060121, mailed on Apr. 2, 2015, 6 pages.
International Preliminary Report on Patentability received for PCT Patent Application No. PCT/US2014/040961, mailed on Dec. 17, 2015, 20 pages.
International Search Report and Written Opinion received for PCT Patent Application No. PCT/US1994/011011, mailed on Feb. 8, 1995, 3 pages (International Search Report only).
International Search Report and Written Opinion received for PCT Patent Application No. PCT/US2004/016519, mailed on Nov. 3, 2005, 6 pages.
International Search Report and Written Opinion received for PCT Patent Application No. PCT/US2005/030234, mailed on Mar. 17, 2006, 11 pages.
International Search Report and Written Opinion received for PCT Patent Application No. PCT/US2005/038819, mailed on Apr. 5, 2006, 12 pages.
International Search Report and Written Opinion received for PCT Patent Application No. PCT/US2006/048669, mailed on Jul. 2, 2007, 12 pages.
International Search Report and Written Opinion received for PCT Patent Application No. PCT/US2006/048670, mailed on May 21, 2007, 11 pages.
International Search Report and Written Opinion received for PCT Patent Application No. PCT/US2006/048753, mailed on Jun. 19, 2007, 15 pages.
International Search Report and Written Opinion received for PCT Patent Application No. PCT/US2007/026243, mailed on Mar. 31, 2008, 10 pages.
International Search Report and Written Opinion received for PCT Patent Application No. PCT/US2007/088872, mailed on May 8, 2008, 8 pages.
International Search Report and Written Opinion received for PCT Patent Application No. PCT/US2007/088873, mailed on May 8, 2008, 7 pages.
International Search Report and Written Opinion received for PCT Patent Application No. PCT/US2008/000032, mailed on Jun. 12, 2008, 7 pages.
International Search Report and Written Opinion received for PCT Patent Application No. PCT/US2008/000042, mailed on May 21, 2008, 7 pages.
International Search Report and Written Opinion received for PCT Patent Application No. PCT/US2008/000043, mailed on Oct. 10, 2008, 12 pages.
International Search Report and Written Opinion received for PCT Patent Application No. PCT/US2008/000045, mailed on Jun. 12, 2008, 7 pages.

(56) References Cited

OTHER PUBLICATIONS

International Search Report and Written Opinion received for PCT Patent Application No. PCT/US2008/000047, mailed on Sep. 11, 2008, 12 pages.
International Search Report and Written Opinion received for PCT Patent Application No. PCT/US2008/000059, mailed on Sep. 19, 2008, 18 pages.
International Search Report and Written Opinion received for PCT Patent Application No. PCT/US2008/000061, mailed on Jul. 1, 2008, 13 pages.
International Search Report and Written Opinion received for PCT Patent Application No. PCT/US2009/051954, mailed on Oct. 30, 2009, 10 pages.
International Search Report and Written Opinion received for PCT Patent Application No. PCT/US2009/055577, mailed on Jan. 26, 2010, 9 pages.
International Search Report and Written Opinion received for PCT Patent Application No. PCT/US2010/037378, mailed on Aug. 25, 2010, 14 pages.
International Search Report and Written Opinion received for PCT Patent Application No. PCT/US2011/020350, mailed on Jun. 30, 2011, 17 pages.
International Search Report and Written Opinion received for PCT Patent Application No. PCT/US2011/020861, mailed on Nov. 29, 2011, 12 pages.
International Search Report and Written Opinion received for PCT Patent Application No. PCT/US2012/029810, mailed on Aug. 17, 2012, 11 pages.
International Search Report and Written Opinion received for PCT Patent Application No. PCT/US2012/034028, mailed on Jun. 11, 2012, 9 pages.
International Search Report and Written Opinion received for PCT Patent Application No. PCT/US2012/040571, mailed on Nov. 16, 2012, 14 pages.
International Search Report and Written Opinion received for PCT Patent Application No. PCT/US2012/040801, mailed on Oct. 22, 2012, 20 pages.
International Search Report and Written Opinion received for PCT Patent Application No. PCT/US2012/040931, mailed on Feb. 1, 2013, 4 pages (International Search Report only).
International Search Report and Written Opinion received for PCT Patent Application No. PCT/US2012/043098, mailed on Nov. 14, 2012, 9 pages.
International Search Report and Written Opinion received for PCT Patent Application No. PCT/US2012/043100, mailed on Nov. 15, 2012, 8 pages.
International Search Report and Written Opinion received for PCT Patent Application No. PCT/US2012/056382, mailed on Dec. 20, 2012, 11 pages.
International Search Report and Written Opinion received for PCT Patent Application No. PCT/US2013/028412, mailed on Sep. 26, 2013, 17 pages.
International Search Report and Written Opinion received for PCT Patent Application No. PCT/US2013/028920, mailed on Jun. 27, 2013, 14 pages.
International Search Report and Written Opinion received for PCT Patent Application No. PCT/US2013/029156, mailed on Jul. 15, 2013, 9 pages.
International Search Report and Written Opinion received for PCT Patent Application No. PCT/US2013/040971, mailed on Nov. 12, 2013, 11 pages.
International Search Report and Written Opinion received for PCT Patent Application No. PCT/US2013/041225, mailed on Aug. 23, 2013, 3 pages (International Search Report only).
International Search Report and Written Opinion received for PCT Patent Application No. PCT/US2013/047668, mailed on Feb. 13, 2014, 17 pages.
International Search Report and Written Opinion received for PCT Patent Application No. PCT/US2013/052558, mailed on Jan. 30, 2014, 15 pages.
International Search Report and Written Opinion received for PCT Patent Application No. PCT/US2013/058916, mailed on Sep. 8, 2014, 10 pages.
International Search Report and Written Opinion received for PCT Patent Application No. PCT/US2013/060121, mailed on Dec. 6, 2013, 8 pages.
International Search Report and Written Opinion received for PCT Patent Application No. PCT/US2014/015418, mailed on Aug. 26, 2014, 17 pages.
International Search Report and Written Opinion received for PCT Patent Application No. PCT/US2014/023822, mailed on Sep. 25, 2014, 14 pages.
International Search Report and Written Opinion received for PCT Patent Application No. PCT/US2014/028785, mailed on Oct. 17, 2014, 23 pages.
International Search Report and Written Opinion received for PCT Patent Application No. PCT/US2014/029050, mailed on Jul. 31, 2014, 9 pages.
International Search Report and Written Opinion received for PCT Patent Application No. PCT/US2014/029562, mailed on Sep. 18, 2014, 21 pages.
International Search Report and Written Opinion received for PCT Patent Application No. PCT/US2014/040401, mailed on Sep. 4, 2014, 10 pages.
International Search Report and Written Opinion received for PCT Patent Application No. PCT/US2014/040403, mailed on Sep. 23, 2014, 9 pages.
International Search Report and Written Opinion received for PCT Patent Application No. PCT/US2014/040961, mailed on Mar. 10, 2015, 5 pages.
International Search Report and Written Opinion received for PCT Patent Application No. PCT/US2014/041159, mailed on Sep. 26, 2014, 10 pages.
International Search Report and Written Opinion received for PCT Patent Application No. PCT/US2014/041173, mailed on Sep. 10, 2014, 11 pages.
International Search Report and Written Opinion received for PCT Patent Application No. PCT/US2014/049568, mailed on Nov. 14, 2014, 12 pages.
International Search Report received for PCT Patent Application No. PCT/GB2009/051684, mailed on Mar. 12, 2010, 4 pages.
International Search Report received for PCT Patent Application No. PCT/US1993/012666, mailed on Nov. 9, 1994, 8 pages.
International Search Report received for PCT Patent Application No. PCT/US1995/008369, mailed on Nov. 8, 1995, 6 pages.
International Search Report received for PCT Patent Application No. PCT/US2002/033330, mailed on Feb. 4, 2003, 6 pages.
International Search Report received for PCT Patent Application No. PCT/US2005/046797, mailed on Nov. 24, 2006, 6 pages.
International Search Report received for PCT Patent Application No. PCT/US2011/037014, mailed on Oct. 4, 2011, 6 pages.
International Search Report received for PCT Patent Application No. PCT/US2013/041233, mailed on Nov. 22, 2013, 3 pages.
Intraspect Software, "The Intraspect Knowledge Management Solution: Technical Overview", available at <http://tomgruber.org/writing/intraspect-whitepaper-1998.pdf>, 1998, 18 pages.
Invitation to Pay Additional Fees and Partial International Search Report received for PCT Patent Application No. PCT/US2004/016519, mailed on Aug. 4, 2005, 6 pages.
Invitation to Pay Additional Fees and Partial International Search Report received for PCT Patent Application No. PCT/US2005/046797, mailed on Jul. 3, 2006, 6 pages.
Invitation to Pay Additional Fees and Partial International Search Report received for PCT Patent Application No. PCT/US2006/048738, mailed on Jul. 10, 2007, 4 pages.
Invitation to Pay Additional Fees and Partial International Search Report received for PCT Patent Application No. PCT/US2011/020350, mailed on Apr. 14, 2011, 5 pages.
Invitation to Pay Additional Fees received for PCT Patent Application No. PCT/US2008/000043, mailed on Jun. 27, 2008, 4 pages.
Invitation to Pay Additional Fees received for PCT Patent Application No. PCT/US2008/000047, mailed on Jul. 4, 2008, 4 pages.

(56) References Cited

OTHER PUBLICATIONS

Invitation to Pay Additional Fees received for PCT Patent Application No. PCT/US2011/037014, mailed on Aug. 2, 2011, 6 pages.
Invitation to Pay Additional Fees received for PCT Patent Application No. PCT/US2013/047659, mailed on Feb. 27, 2014, 7 pages.
Invitation to Pay Additional Fees received for PCT Patent Application No. PCT/US2013/052558, mailed on Nov. 7, 2013, 6 pages.
Invitation to Pay Additional Fees received for PCT Patent Application No. PCT/US2014/040961, mailed on Jan. 14, 2015, 3 pages.
IOS 8 Release, "Quick Type Keyboard on iOS 8 Makes Typing Easier", Retrieved from the Internet: URL: https://www.youtube.com/watch?v=0CidLR4fhVU, [Retrieved on Nov. 23, 2018], XP054978896, Jun. 3, 2014, 1 page.
Iowegian International, "FIR Filter Properties, DSPGuru, Digital Signal Processing Central", available at <http://www.dspguru.com/dsp/faq/fir/properties> retrieved on Jul. 28, 2010, 6 pages.
Iphone Hacks, "Native iPhone MMS Application Released", available at <http://www.iphonehacks.com/2007/12/iphone-mms-app.html>, retrieved on Dec. 25, 2007, 5 pages.
Iphonechat, "iChat for iPhone in JavaScript", available at <http://www.publictivity.com/iPhoneChat/>, retrieved on Dec. 25, 2007, 2 pages.
Issar et al., "CMU's Robust Spoken Language Understanding System", Proceedings of Eurospeech, 1993, 4 pages.
Issar, Sunil, "Estimation of Language Models for New Spoken Language Applications", Proceedings of 4th International Conference on Spoken language Processing, Oct. 1996, 4 pages.
Jabra Corporation, "FreeSpeak: BT200 User Manual", 2002, 42 pages.
Jabra, "Bluetooth Headset: User Manual", 2005, 17 pages.
Jabra, "Bluetooth Introduction", 2004, 15 pages.
Jacobs et al., "Scisor: Extracting Information from On-Line News", Communications of the ACM, vol. 33, No. 11, Nov. 1990, 10 pages.
Janas, Jurgen M., "The Semantics-Based Natural Language Interface to Relational Databases", Chapter 6, Cooperative Interfaces to Information Systems, 1986, pp. 143-188.
Jawaid et al., "Machine Translation with Significant Word Reordering and Rich Target-Side Morphology", WDS'11 Proceedings of Contributed Papers, Part I, 2011, pp. 161-166.
Jaybird, "Everything Wrong with AIM: Because We've All Thought About It", available at <http://www.psychonoble.com/archives/articles/82.html>, May 24, 2006, 3 pages.
Jeffay et al., "Kernel Support for Live Digital Audio and Video", In Proc. of the Second Intl. Workshop on Network and Operating System Support for Digital Audio and Video, vol. 614, Nov. 1991, pp. 10-21.
Jelinek et al., "Interpolated Estimation of Markov Source Parameters from Sparse Data", In Proceedings of the Workshop on Pattern Recognition in Practice, May 1980, pp. 381-397.
Jelinek, F., "Self-Organized Language Modeling for Speech Recognition", Readings in Speech Recognition, Edited by Alex Waibel and Kai-Fu Lee, Morgan Kaufmann Publishers, Inc., ISBN: 1-55860-124-4, 1990, 63 pages.
Jennings et al., "A Personal News Service Based on a User Model Neural Network", IEICE Transactions on Information and Systems, vol. E75-D, No. 2, Mar. 1992, 12 pages.
Ji et al., "A Method for Chinese Syllables Recognition Based upon Sub-syllable Hidden Markov Model", 1994 International Symposium on Speech, Image Processing and Neural Networks, Hong Kong, Apr. 1994, 4 pages.
Jiang et al., "A Syllable-based Name Transliteration System", Proc. of the 2009 Named Entities Workshop, Aug. 7, 2009, pp. 96-99.
Johnson, Jeff A., "A Comparison of User Interfaces for Panning on a Touch-Controlled Display", CHI '95 Proceedings, 1995, 8 pages.
Johnson, Julia Ann., "A Data Management Strategy for Transportable Natural Language Interfaces", Doctoral Thesis Submitted to the Department of Computer Science, University of British Columbia, Canada, Jun. 1989, 285 pages.
Jones, J., "Speech Recognition for Cyclone", Apple Computer, Inc., E.R.S. Revision 2.9, Sep. 10, 1992, 93 pages.
Jonsson et al, "Proximity-based Reminders Using Bluetooth", 2014 IEEE International Conference on Pervasive Computing and Communications Demonstrations, 2014, pp. 151-153.
Jouvet et al., "Evaluating Grapheme-to-phoneme Converters in Automatic Speech Recognition Context", IEEE, 2012, pp. 4821-4824.
Julia et al., "http://www.speech.sri.com/demos/atis.html", Proceedings of AAAI, Spring Symposium, 1997, 5 pages.
Julia et al., "Un Editeur Interactif De Tableaux Dessines a Main Levee (An Interactive Editor for Hand-Sketched Tables)", Traitement du Signal, vol. 12, No. 6, 1995, pp. 619-626.
Kaeppner et al., "Architecture of HeiPhone: A Testbed for Audio/Video Teleconferencing", IBM European Networking Center, 1993.
Kahn et al., "CoABS Grid Scalability Experiments", Autonomous Agents and Multi-Agent Systems, vol. 7, 2003, pp. 171-178.
Kamba et al., "Using Small Screen Space More Efficiently", CHI '96 Proceedings of the SIGCHI Conference on Human Factors in Computing Systems, Apr. 13-18, 1996, pp. 383-390.
Kamel et al., "A Graph Based Knowledge Retrieval System", IEEE International Conference on Systems, Man and Cybernetics, 1990, pp. 269-275.
Kanda et al., "Robust Domain Selection Using Dialogue History in Multi-domain Spoken Dialogue Systems", Journal of Information Processing Society, vol. 48, No. 5, May 15, 2007, pp. 1980-1989.
Kanda et al., "Spoken Language Understanding Using Dialogue Context in Database Search Task", Journal of Information Processing Society of Japan, vol. 47, No. 6, Jun. 15, 2016, pp. 1802-1811.
Kane et al., "Slide Rule: Making Mobile Touch Screens Accessible to Blind People Using Multi-Touch Interaction Techniques", Assets, Oct. 13-15, 2008, pp. 73-80.
Kang et al., "Quality Improvement of LPC-Processed Noisy Speech by Using Spectral Subtraction", IEEE Transactions on Acoustics, Speech and Signal Processing, vol. 37, No. 6, Jun. 1989, pp. 939-942.
Karn, Ujjwal, "An Intuitive Explanation of Convolutional Neural Networks", The Data Science Blog, Aug. 11, 2016, 23 pages.
Karp, P. D., "A Generic Knowledge-Base Access Protocol", Available online at <http://lecture.cs.buu.ac.th/-f50353/Document/gfp.pdf>, May 12, 1994, 66 pages.
Katz et al., "Exploiting Lexical Regularities in Designing Natural Language Systems", Proceedings of the 12th International Conference on Computational Linguistics, 1988, pp. 1-22.
Katz et al., "Rextor: A System for Generating Relations from Natural Language", Proceedings of the ACL Workshop on Natural Language Processing and Information Retrieval (NLP&IR), Oct. 2000, 11 pages.
Katz, Boris, "A Three-Step Procedure for Language Generation", Massachusetts Institute of Technology, A.I. Memo No. 599, Dec. 1980, pp. 1-40.
Katz, Boris, "Annotating the World Wide Web Using Natural Language", Proceedings of the 5th RIAO Conference on Computer Assisted Information Searching on the Internet, 1997, 7 pages.
Katz, Boris, "Using English for Indexing and Retrieving", Proceedings of the 1st RIAO Conference on User-Oriented Content-Based Text and Image Handling, 1988, pp. 314-332.
Katz, S. M., "Estimation of Probabilities from Sparse Data for the Language Model Component of a Speech Recognizer", IEEE Transactions on Acoustics, Speech and Signal Processing, vol. ASSP-35, No. 3, Mar. 1987, 3 pages.
Kawamae et al., "Study on the Structure of Index Data for Metasearch System", Artificial Intelligence Foundation & 45th SIG of Knowledge Base System, JPN, Sep. 29, 1999, pp. 37-42.
Kazemzadeh et al., "Acoustic Correlates of User Response to Error in Human-Computer Dialogues", Automatic Speech Recognition and Understanding, 2003, pp. 215-220.
Kazmucha, Allyson, "How to Send Map Locations Using iMessage", iMore.com, Available at <http://www.imore.com/how-use-imessage-share-your-location-your-iphone>, Aug. 2, 2012, 6 pages.
Keahey et al., "Non-Linear Image Magnification", Apr. 24, 1996, 11 pages.
Keahey et al., "Nonlinear Magnification Fields", Proceedings of the 1997 IEEE Symposium on Information Visualization, 1997, 12 pages.

(56) References Cited

OTHER PUBLICATIONS

Keahey et al., "Techniques for Non-Linear Magnification Transformations", IEEE Proceedings of Symposium on Information Visualization, Oct. 1996, pp. 38-45.
Keahey et al., "Viewing Text With Non-Linear Magnification: An Experimental Study", Department of Computer Science, Indiana University, Apr. 24, 1996, pp. 1-9.
Kennedy, P J., "Digital Data Storage Using Video Disc", IBM Technical Disclosure Bulletin, vol. 24, No. 2, Jul. 1981, p. 1171.
Kerr, "An Incremental String Search in C: This Data Matching Algorithm Narrows the Search Space with each Keystroke", Computer Language, vol. 6, No. 12, Dec. 1989, pp. 35-39.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
Kikui, Gen-Itiro, "Identifying the Coding System and Language of On-Line Documents on the Internet", International Conference on Computational, Aug. 1996, pp. 652-657.
Kim, E.A. S., "The Structure and Processing of Fundamental Frequency Contours", University of Cambridge, Doctoral Thesis, Apr. 1987, 378 pages.
Kirstein et al., "Piloting of Multimedia Integrated Communications for European Researchers", Proc. INET '93, 1993, pp. 1-12.
Kitano, H., "PhiDM-Dialog, An Experimental Speech-to-Speech Dialog Translation System", Computer, vol. 24, No. 6, Jun. 1991, 13 pages.
Kjelldahl et al., "Multimedia—Principles, Systems, and Applications", Proceedings of the 1991 Eurographics Workshop on Multimedia Systems, Applications, and Interaction, Apr. 1991.
Klabbers et al., "Reducing Audible Spectral Discontinuities", IEEE Transactions on Speech and Audio Processing, vol. 9, No. 1, Jan. 2001, 13 pages.
Klatt et al., "Linguistic Uses of Segmental Duration in English: Acoustic and Perpetual Evidence", Journal of the Acoustical Society of America, vol. 59, No. 5, May 1976, 16 pages.
Kline et al., "Improving GUI Accessibility for People with Low Vision", CHI '95 Proceedings of the SIGCHI Conference on Human Factors in Computing Systems, May 7-11, 1995, pp. 114-121.
Kline et al., "UnWindows 1.0: X Windows Tools for Low Vision Users", ACM SIGCAPH Computers and the Physically Handicapped, No. 49, Mar. 1994, pp. 1-5.
Knight et al., "Heuristic Search", Production Systems, Artificial Intelligence, 2nd ed., McGraw-Hill, Inc., 1983-1991.
Knownav, "Knowledge Navigator", YouTube Video available at <http://www.youtube.com/watch?v=QRH8eimU_20>, Apr. 29, 2008, 1 page.
Kohler, Joachim, "Multilingual Phone Models for Vocabulary-Independent Speech Recognition Tasks", Speech Communication, vol. 35, No. 1-2, Aug. 2001, pp. 21-30.
Komatani et al., "Multi-domain Spoken Dialogue System with Extensibility and Robustness Against Speech Recognition Errors", Proceedings of the 7th SIGdial Workshop on Discourse and Dialogue, Association for Computational Linguistics, Jul. 2006, pp. 9-17.
Kominek et al., "Impact of Durational Outlier Removal from Unit Selection Catalogs", 5th ISCA Speech Synthesis Workshop, Jun. 14-16, 2004, 6 pages.
Konolige, Kurt, "A Framework for a Portable Natural-Language Interface to Large Data Bases", SRI International, Technical Note 197, Oct. 12, 1979, 54 pages.
Kroon et al., "Pitch Predictors with High Temporal Resolution", IEEE, vol. 2, 1990, pp. 661-664.
Kroon et al., "Quantization Procedures for the Excitation in CELP Coders", (Proceedings of IEEE International Acoustics, Speech, and Signal Processing Conference, Apr. 1987), as reprinted in Vector Quantization (IEEE Press, 1990), 1990, pp. 320-323.
Kubala et al., "Speaker Adaptation from a Speaker-Independent Training Corpus", International Conference on Acoustics, Speech and Signal Processing (ICASSP'90), Apr. 1990, 4 pages.
Kubala et al., "The Hub and Spoke Paradigm for CSR Evaluation", Proceedings of the Spoken Language Technology Workshop, Mar. 1994, 9 pages.
Kuo et al., "A Radical-Partitioned coded Block Adaptive Neural Network Structure for Large-Volume Chinese Characters Recognition", International Joint Conference on Neural Networks, vol. 3, Jun. 1992, pp. 597-601.
Kuo et al., "A Radical-Partitioned Neural Network System Using a Modified Sigmoid Function and a Weight-Dotted Radical Selector for Large-Volume Chinese Character Recognition VLSI", IEEE Int. Symp. Circuits and Systems, Jun. 1994, pp. 3862-3865.
Kurlander et al., "Comic Chat", [Online], 1996 [Retrieved on: Feb. 4, 2013], SIGGRAPH '96 Proceedings of the 23rd annual conference on Computer graphics and interactive techniques, [Retrieved from: http://delivery.acm.org/10.1145/240000/237260/p225-kurlander.pdf], 1996, pp. 225-236.
Ladefoged, Peter, "A Course in Phonetics", New York, Harcourt, Brace, Jovanovich, Second Edition, 1982.
Laface et al., "A Fast Segmental Viterbi Algorithm for Large Vocabulary Recognition", International Conference on Acoustics, Speech, and Signal Processing, vol. 1, May 1995, pp. 560-563.
Lafferty et al., "Conditional Random Fields: Probabilistic Models for Segmenting and Labeling Sequence Data", Proceedings of the 18th International Conference on Machine Learning, 2001, 9 pages.
Laird et al., "Soar: An Architecture for General Intelligence", Artificial Intelligence, vol. 33, 1987, pp. 1-64.
Lamel et al., "Generation and synthesis of Broadcast Messages", Proceedings of ESCA-NATO Workshop: Applications of Speech Technology, Sep. 1, 1993, 4 pages.
Lamping et al., "Laying Out and Visualizing Large Trees Using a Hyperbolic Space", Proceedings of the ACM Symposium on User Interface Software and Technology, Nov. 1994, pp. 13-14.
Lamping et al., "Visualizing Large Trees Using the Hyperbolic Browser", Apple Inc., Video Clip, MIT Media Library, on a CD, 1995.
Langley et al., "A Design for the ICARUS Architechture", SIGART Bulletin, vol. 2, No. 4, 1991, pp. 104-109.
Lantz et al., "Towards a Universal Directory Service", Departments of Computer Science and Electrical Engineering, Stanford University, 1985, pp. 250-260.
Lantz, Keith, "An Experiment in Integrated Multimedia Conferencing", 1986, pp. 267-275.
Larks, "Intelligent Software Agents", available at <http://www.cs.cmu.edu/~softagents/larks.html> retrieved on Mar. 15, 2013, 2 pages.
Lau et al., "Trigger-Based Language Models: A Maximum Entropy Approach", ICASSP'93 Proceedings of the 1993 IEEE international conference on Acoustics, speech, and signal processing: speech processing—vol. II, 1993, pp. 45-48.
Lauwers et al., "Collaboration Awareness in Support of Collaboration Transparency: Requirements for the Next Generation of Shared Window Systems", CHI'90 Proceedings, 1990, pp. 303-311.
Lauwers et al., "Replicated Architectures for Shared Window Systems: A Critique", COCS '90 Proceedings of the ACM SIGOIS and IEEE CS TC-OA conference on Office information systems, ACM SIGOIS Bulletin, 1990, pp. 249-260.
Lazzaro, Joseph J., "Adapting Desktop Computers to Meet the Needs of Disabled Workers is Easier Than You Might Think", Computers for the Disabled, Byte Magazine, Jun. 1993, 4 pages.
Leahy et al., "Effect of Touch Screen Target Location on User Accuracy", Proceedings of the Human Factors Society 34th Annual Meeting, 1990, 5 pages.
Lee et al., "A Multi-Touch Three Dimensional Touch-Sensitive Tablet", CHI '85 Proceedings of the SIGCHI Conference on Human Factors in Computing Systems, Apr. 1985, pp. 21-25.
Lee et al., "A Real-Time Mandarin Dictation Machine for Chinese Language with Unlimited Texts and Very Large Vocabulary", International Conference on Acoustics, Speech and Signal Processing, vol. 1, Apr. 1990, 5 pages.
Lee et al., "Golden Mandarin (II)—An Improved Single-Chip Real-Time Mandarin Dictation Machine for Chinese Language with Very Large Vocabulary", IEEE International Conference of Acoustics, Speech and Signal Processing, vol. 2, 1993, 4 pages.

(56) References Cited

OTHER PUBLICATIONS

Lee et al., "Golden Mandarin (II)—An Intelligent Mandarin Dictation Machine for Chinese Character Input with Adaptation/Learning Functions", International Symposium on Speech, Image Processing and Neural Networks, Hong Kong, Apr. 1994, 5 pages.
Lee et al., "On URL Normalization", Proceedings of the International Conference on Computational Science and its Applications, ICCSA 2005, pp. 1076-1085.
Lee et al., "System Description of Golden Mandarin (I) Voice Input for Unlimited Chinese Characters", International Conference on Computer Processing of Chinese & Oriental Languages, vol. 5, No. 3 & 4, Nov. 1991, 16 pages.
Lee, K. F., "Large-Vocabulary Speaker-Independent Continuous Speech Recognition: The Sphinx System", Partial Fulfillment of the Requirements for the Degree of Doctorof Philosophy, Computer Science Department, Carnegie Mellon University, Apr. 1988, 195 pages.
Lee, Kai-Fu, "Automatic Speech Recognition", 1989, 14 pages (Table of Contents).
Lemon et al., "Multithreaded Context for Robust Conversational Interfaces: Context-Sensitive Speech Recognition and Interpretation of Corrective Fragments", ACM Transactions on Computer-Human Interaction, vol. 11, No. 3, Sep. 2004, pp. 241-267.
Leong et al., "CASIS: A Context-Aware Speech Interface System", Proceedings of the 10th International Conference on Intelligent User Interfaces, Jan. 2005, pp. 231-238.
Leung et al., "A Review and Taxonomy of Distortion-Oriented Presentation Techniques", ACM Transactions on Computer-Human Interaction (TOCHI), vol. 1, No. 2, Jun. 1994, pp. 126-160.
Leveseque et al., "A Fundamental Tradeoff in Knowledge Representation and Reasoning", Readings in Knowledge Representation, 1985, 30 pages.
Levinson et al., "Speech synthesis in telecommunications", IEEE Communications Magazine, vol. 31, No. 11, Nov. 1993, pp. 46-53.
Lewis, "Speech synthesis in a computer aided learning environment", UK IT, Mar. 19-22, 1990, pp. 294-298.
Lewis, Cameron, "Task Ave for iPhone Review", Mac Life, Available at <http://www.maclife.com/article/reviews/task_ave_iphone_review>, Mar. 3, 2011, 5 pages.
Lewis, Peter, "Two New Ways to Buy Your Bits", CNN Money, available at <http://money.cnn.com/2003/12/30/commentary/ontechnology/download/>, Dec. 31, 2003, 4 pages.
Lieberman et al., "Out of Context: Computer Systems that Adapt to, and Learn from, Context", IBM Systems Journal, vol. 39, No. 3 & 4, 2000, pp. 617-632.
Lieberman, Henry, "A Multi-Scale, Multi-Layer, Translucent Virtual Space", Proceedings of IEEE Conference on Information Visualization, Aug. 1997, pp. 124-131.
Lieberman, Henry, "Powers of Ten Thousand: Navigating in Large Information Spaces", Proceedings of the ACM Symposium on User Interface Software and Technology, Nov. 1994, pp. 1-2.
Lin et al., "A Distributed Architecture for Cooperative Spoken Dialogue Agents with Coherent Dialogue State and History", Available on line at <http://citeseerx.ist.psu.edu/viewdoc/summary?doi=10.1.1.42.272>, 1999, 4 pages.
Lin et al., "A New Framework for Recognition of Mandarin Syllables with Tones Using Sub-syllabic Unites", IEEE International Conference on Acoustics, Speech and Signal Processing (ICASSP-93), Apr. 1993, 4 pages.
Linde et al., "An Algorithm for Vector Quantizer Design", IEEE Transactions on Communications, vol. 28, No. 1, Jan. 1980, 12 pages.
Liou et al., "Autoencoder for Words", Neurocomputing, vol. 139, Sep. 2014, pp. 84-96.
Liu et al., "Efficient Joint Compensation of Speech for the Effects of Additive Noise and Linear Filtering", IEEE International Conference of Acoustics, Speech and Signal Processing, ICASSP-92, Mar. 1992, 4 pages.
Logan et al., "Mel Frequency Cepstral Co-efficients for Music Modeling", International Symposium on Music Information Retrieval, 2000, 2 pages.
Lowerre, B. T., "The-Harpy Speech Recognition System", Doctoral Dissertation, Department of Computer Science, Carnegie Mellon University, Apr. 1976, 20 pages.
Lyon, R., "A Computational Model of Binaural Localization and Separation", Proceedings of IEEE International Conference on Acoustics, Speech and Signal Processing, Apr. 1983, pp. 1148-1151.
Lyons et al., "Augmenting Conversations Using Dual-Purpose Speech", Proceedings of the 17th Annual ACM Symposium on User interface Software and Technology, 2004, 10 pages.
Lyons, Richard F., "CCD Correlators for Auditory Models", Proceedings of the Twenty-Fifth Asilomar Conference on Signals, Systems and Computers, Nov. 4-6, 1991, pp. 785-789.
Mackenzie et al., "Alphanumeric Entry on Pen-Based Computers", International Journal of Human-Computer Studies, vol. 41, 1994, pp. 775-792.
Mackinlay et al., "The Perspective Wall: Detail and Context Smoothly Integrated", ACM, 1991, pp. 173-179.
Macsimum News, "Apple Files Patent for an Audio Interface for the iPod", available at <http://www.macsimumnews.com/index.php/archive/apple_files_patent_for_an_audio_interface_for_the_ipod>, retrieved on Jul. 13, 2006, 8 pages.
Mactech, "KeyStrokes 3.5 for Mac OS X Boosts Word Prediction", available at <http://www.mactech.com/news/?p=1007129>, retrieved on Jan. 7, 2008, 3 pages.
Maghbouleh, Arman, "An Empirical Comparison of Automatic Decision Tree and Linear Regression Models for Vowel Durations", Revised Version of a Paper Presented at the Computational Phonology in Speech Technology Workshop, 1996 Annual Meeting of the Association for Computational Linguistics in Santa Cruz, California, 7 pages.
Mahedero et al., "Natural Language Processing of Lyrics", In Proceedings of the 13th Annual ACM International Conference on Multimedia, ACM, Nov. 6-11, 2005, 4 pages.
Majerus, Wesley, "Cell Phone Accessibility for your Blind Child", Retrieved from the Internet <URL: https://web.archive.org/web/20100210001100/https://nfb.org/images/nfb/publications/fr/fr28/3/fr280314.htm>, 2010, pp. 1-5.
Mangu et al., "Finding Consensus in Speech Recognition: Word Error Minimization and Other Applications of Confusion Networks", Computer Speech and Language, vol. 14, No. 4, 2000, pp. 291-294.
Manning etal, "Foundations of Statistical Natural Language Processing", The MIT Press, Cambridge Massachusetts, 1999, pp. 10-11.
Marcus et al., "Building a Large Annotated Corpus of English: The Penn Treebank", Computational Linguistics, vol. 19, No. 2, 1993, pp. 313-330.
Markel et al., "Linear Prediction of Speech", Springer-Verlag, Berlin, Heidelberg, New York, 1976, 12 pages.
Markel et al., "Linear Production of Speech", Reviews, 1976, pp. xii, 288.
Marketing Land, "Amazon Echo: Play Music", Online Available at: <https://www.youtube.com/watch?v=A7V5NPbsXi4>, Apr. 27, 2015, 3 pages.
Martin et al., "Building and Using Practical Agent Applications", SRI International, PAAM Tutorial, 1998, 78 pages.
Martin et al., "Building Distributed Software Systems with the Open Agent Architecture", Proceedings of the Third International Conference on the Practical Application of Intelligent Agents and Multi-Agent Technology, Mar. 1998, pp. 355-376.
Martin et al., "Development Tools for the Open Agent Architecture", Proceedings of the International Conference on the Practical Application of Intelligent Agents and Multi-Agent Technology, Apr. 1996, pp. 1-17.
Martin et al., "Information Brokering in an Agent Architecture", Proceedings of the Second International Conference on the Practical Application of Intelligent Agents and Multi-Agent Technology, Apr. 1997, pp. 1-20.
Martin et al., "The Open Agent Architecture: A Framework for Building Distributed Software Systems", Applied Artificial Intelli-

(56) References Cited

OTHER PUBLICATIONS gence: An International Journal, vol. 13, No. 1-2, available at <http://adam.cheyer.com/papers/oaa.pdf> >, retrieved from internet on Jan.-Mar. 1999.
Martin et al., "Transportability and Generality in a Natural-Language Interface System", Proceedings of the Eighth International Joint Conference on Artificial Intelligence, Technical Note 293, Aug. 1983, 21 pages.
Martins et al., "Extracting and Exploring the Geo-Temporal Semantics of Textual Resources", Semantic Computing, IEEE International Conference, 2008, pp. 1-9.
Masui, Toshiyuki, "POBox: An Efficient Text Input Method for Handheld and Ubiquitous Computers", Proceedings of the 1st International Symposium on Handheld and Ubiquitous Computing, 1999, 12 pages.
Matiasek et al., "Tamic-P: A System for NL Access to Social Insurance Database", 4th International Conference on Applications of Natural Language to Information Systems, Jun. 1999, 7 pages.
Matsui et al., "Speaker Adaptation of Tied-Mixture-Based Phoneme Models for Text-Prompted Speaker Recognition", 1994 IEEE International Conference on Acoustics, Speech and Signal Processing, Apr. 19-22, 1994, pp. 1-125-1-128.
Matsuzawa, A, "Low-Voltage and Low-Power Circuit Design for Mixed Analog/Digital Systems in Portable Equipment", IEEE Journal of Solid-State Circuits, vol. 29, No. 4, 1994, pp. 470-480.
Mcguire et al., "Shade: Technology for Knowledge-Based Collaborative Engineering", Journal of Concurrent Engineering Applications and Research (CERA), 1993, 18 pages.
Meet Ivee, Your Wi-Fi Voice Activated Assistant, available at <http://www.helloivee.com/>, retrieved on Feb. 10, 2014, 8 pages.
Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.
Mellinger, David K., "Feature-Map Methods for Extracting Sound Frequency Modulation", IEEE Computer Society Press, 1991, pp. 795-799.
Meng et al., "Generating Phonetic Cognates to Handle Named Entities in English-Chinese Cross-Language Spoken Document Retrieval", Automatic Speech Recognition and Understanding, Dec. 2001, pp. 311-314.
Meng et al., "Wheels: A Conversational System in the Automobile Classified Domain", Proceedings of Fourth International Conference on Spoken Language, ICSLP 96, vol. 1, Oct. 1996, 4 pages.
Menico, Costas, "Faster String Searches", Dr. Dobb's Journal, vol. 14, No. 7, Jul. 1989, pp. 74-77.
Menta, Richard, "1200 Song MP3 Portable is a Milestone Player", available at <http://www.mp3newswire.net/stories/personaljuke.html>, Jan. 11, 2000, 4 pages.
Meyer, Mike, "A Shell for Modern Personal Computers", University of California, Aug. 1987, pp. 13-19.
Meyrowitz et al., "Bruwin: An Adaptable Design Strategy for Window Manager/Virtual Terminal Systems", Department of Computer Science, Brown University, 1981, pp. 180-189.
Mhatre et al., "Donna Interactive Chat-bot acting as a Personal Assistant", International Journal of Computer Applications (0975-8887), vol. 140, No. 10, Apr. 2016, 6 pages.
Miastkowski, Stan, "paperWorks Makes Paper Intelligent", Byte Magazine, Jun. 1992.
Michos et al., "Towards an Adaptive Natural Language Interface to Command Languages", Natural Language Engineering, vol. 2, No. 3, 1996, pp. 191-209.
Microsoft Corporation, "Microsoft MS-DOS Operating System User's Guide", Microsoft Corporation, 1982, pp. 4-1 to 4-16, 5-1 to 5-19.
Microsoft Corporation, Microsoft Office Word 2003 (SP2), Microsoft Corporation, SP3 as of 2005, pp. MSWord 2003 Figures 1-5, 1983-2003.
Microsoft Press, "Microsoft Windows User's Guide for the Windows Graphical Environment", version 3.0, 1985-1990, pp. 33-41 & 70-74.
Microsoft Windows XP, "Magnifier Utility", Oct. 25, 2001, 2 pages.
Microsoft Word 2000 Microsoft Corporation, pp. MSWord Figures 1-5, 1999.
Microsoft, "Turn on and Use Magnifier", available at <http://www.microsoft.com/windowsxp/using/accessibility/magnifierturnon.mspx>, retrieved on Jun. 6, 2009.
Microsoft/Ford, "Basic Sync Commands", www.SyncMyRide.com, Sep. 14, 2007, 1 page.
Mikolov et al., "Linguistic Regularities in Continuous Space Word Representations", Proceedings of NAACL-HLT, Jun. 9-14, 2013, pp. 746-751.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Milner, N. P., "A Review of Human Performance and Preferences with Different Input Devices to Computer Systems", Proceedings of the Fourth Conference of the British Computer Society on People and Computers, Sep. 5-9, 1988, pp. 341-352.
Milstead et al., "Metadata: Cataloging by Any Other Name", available at <http://www.iicm.tugraz.at/thesis/cguetl_diss/literatur/Kapitel06/References/Milstead_et_al._1999/metadata.html>, Jan. 1999, 18 pages.
Milward et al., "D2.2: Dynamic Multimodal Interface Reconfiguration, Talk and Look: Tools for Ambient Linguistic Knowledge", available at <http://www.ihmc.us/users/nblaylock!Pubs/Files/talk d2.2.pdf>, Aug. 8, 2006, 69 pages.
Miniman, Jared, "Applian Software's Replay Radio and Player v1.02", pocketnow.com—Review, available at <http://www.pocketnow.com/reviews/replay/replay.htm>, Jul. 31, 2001, 16 pages.
Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.
Minker et al., "Hidden Understanding Models for Machine Translation", Proceedings of ETRW on Interactive Dialogue in Multi-Modal Systems, Jun. 1999, pp. 1-4.
Minutes of the Oral Proceedings received for European Patent Application No. 14737370.8, mailed on Jun. 26, 2019, 3 pages.
Mitra et al., "A Graph-Oriented Model for Articulation of Ontology Interdependencies", Advances in Database Technology, Lecture Notes in Computer Science, vol. 1777, 2000, pp. 1-15.
Moberg et al., "Cross-Lingual Phoneme Mapping for Multilingual Synthesis Systems", Proceedings of the 8th International Conference on Spoken Language Processing, Jeju Island, Korea, INTERSPEECH 2004, Oct. 4-8, 2004, 4 pages.
Moberg, M., "Contributions to Multilingual Low-Footprint TTS System for Hand-Held Devices", Doctoral Thesis, Tampere University of Technology, Aug. 17, 2007, 82 pages.
Mobile Speech Solutions, Mobile Accessibility, SVOX AG Product Information Sheet, available at <http://www.svox.com/site/bra840604/con782768/mob965831936.aSQ?osLang=1>, Sep. 27, 2012, 1 page.
Mobile Tech News, "T9 Text Input Software Updated", available at <http://www.mobiletechnews.com/info/2004/11/23/122155.html>, Nov. 23, 2004, 4 pages.
Modi et al., "CMRadar: A Personal Assistant Agent for Calendar Management", AAAI, Intelligent Systems Demonstrations, 2004, pp. 1020-1021.
Mok et al., "Media Searching on Mobile Devices", IEEE EIT 2007 Proceedings, 2007, pp. 126-129.
Moore et al., "Combining Linguistic and Statistical Knowledge Sources in Natural-Language Processing for ATIS", SRI International, Artificial Intelliqence Center, 1995, 4 pages.
Moore et al., "SRI's Experience with the ATIS Evaluation", Proceedings of the Workshop on Speech and Natural Language, Jun. 1990, pp. 147-148.
Moore et al., "The Information Warfare Advisor: An Architecture for Interacting with Intelligent Agents Across the Web", Proceedings of Americas Conference on Information Systems (AMCIS), Dec. 31, 1998, pp. 186-188.
Moore, Robert C., "Handling Complex Queries in a Distributed Data Base", SRI International, Technical Note 170, Oct. 8, 1979, 38 pages.

(56) References Cited

OTHER PUBLICATIONS

Moore, Robert C., "Practical Natural-Language Processing by Computer", SRI International, Technical Note 251, Oct. 1981, 34 pages.
Moore, Robert C., "The Role of Logic in Knowledge Representation and Commonsense Reasoning", SRI International, Technical Note 264, Jun. 1982, 19 pages.
Moore, Robert C., "Using Natural-Language Knowledge Sources in Speech Recognition", SRI International, Artificial Intelligence Center, Jan. 1999, pp. 1-24.
Moran et al., "Intelligent Agent-Based User Interfaces", Proceedings of International Workshop on Human Interface Technology, Oct. 1995, pp. 1-4.
Moran et al., "Multimodal User Interfaces in the Open Agent Architecture", International Conference on Intelligent User Interfaces (IUI97), 1997, 8 pages.
Moran, Douglas B., "Quantifier Scoping in the SRI Core Language Engine", Proceedings of the 26th Annual Meeting on Association for Computational Linguistics, 1988, pp. 33-40.
Morgan, B., "Business Objects (Business Objects for Windows) Business Objects Inc.", DBMS, vol. 5, No. 10, Sep. 1992, 3 pages.
Morland, D. V., "Human Factors Guidelines for Terminal Interface Design", Communications ofthe ACM vol. 26, No. 7, Jul. 1983, pp. 484-494.
Morris et al., "Andrew: A Distributed Personal Computing Environment", Communications of the ACM, (Mar. 1986); vol. 29 No. 3, Mar. 1986, pp. 184-201.
Morrison, Jonathan, "iPhone 5 Siri Demo", Online Available at <https://www.youtube.com/watch?v=_wHWwG5lhWc>, Sep. 21, 2012, 3 pages.
Motro, Amihai, "Flex: A Tolerant and Cooperative User Interface to Databases", IEEE Transactions on Knowledge and Data Engineering, vol. 2, No. 2, Jun. 1990, pp. 231-246.
Mountford et al., "Talking and Listening to Computers", The Art of Human-Computer Interface Design, Apple Computer, Inc., Addison-Wesley Publishing Company, Inc., 1990, 17 pages.
Mozer, Michael C., "An Intelligent Environment must be Adaptive", IEEE Intelligent Systems, 1999, pp. 11-13.
Muller et al., "CSCW'92 Demonstrations", 1992, pp. 11-14.
Murty et al., "Combining Evidence from Residual Phase and MFCC Features for Speaker Recognition", IEEE Signal Processing Letters, vol. 13, No. 1, Jan. 2006, 4 pages.
Murveit et al., "Integrating Natural Language Constraints into HMM-Based Speech Recognition", International Conference on Acoustics, Speech and Signal Processing, Apr. 1990, 5 pages.
Murveit et al., "Speech Recognition in SRI's Resource Management and ATIS Systems", Proceedings of the Workshop on Speech and Natural Language, 1991, pp. 94-100.
Musicmatch, "Musicmatch and Xing Technology Introduce Musicmatch Jukebox", Press Releases, available at <http://www.musicmatch.com/info/company/press/releases/?year= 1998&release=2>, May 18, 1998, 2 pages.
Muthusamy et al., "Speaker-Independent Vowel Recognition: Spectograms versus Cochleagrams", IEEE, Apr. 1990, pp. 533-536.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
N200 Hands-Free Bluetooth Car Kit, available at <www.wirelessground.com>, retrieved on Mar. 19, 2007, 3 pages.
Nadoli et al., "Intelligent Agents in the Simulation of Manufacturing Systems", Proceedings of the SCS Multiconference on AI and Simulation, 1989, 1 page.
Nakagawa et al., "Speaker Recognition by Combining MFCC and Phase Information", IEEE International Conference on Acoustics, Speech and Signal Processing (ICASSP), Mar. 2010, 4 pages.
Nakagawa et al., "Unknown Word Guessing and Part-of-Speech Tagging Using Support Vector Machines", Proceedings of the 6th NLPRS, 2001, pp. 325-331.
Nakamura, Satoshi, "Overcoming the Language Barrier with Speech Translation Technology, Science & Technology Trends", Quarterly Review No. 31, Apr. 2009, pp. 36-49.
Nakazawa et al., "Detection and Labeling of Significant Scenes from TV program based on Twitter Analysis", Proceedings of the 3rd Forum on Data Engineering and Information Management (deim 2011 proceedings), IEICE Data Engineering Technical Group. Available online at: http://db-event.jpn.org/deim2011/proceedings/pdf/f5-6.pdf, Feb. 28, 2011, 10 pages.
Naone, Erica, "TR10: Intelligent Software Assistant", Technology Review, Mar.-Apr. 2009, 2 pages.
Navigli, Roberto, "Word Sense Disambiguation: A Survey", ACM Computing Surveys, vol. 41, No. 2, Feb. 2009, 70 pages.
NCIP Staff, "Magnification Technology", available at <http://www2.edc.org/ncip/library/vi/magnifi.htm>, 1994, 6 pages.
NCIP, "NCIP Library: Word Prediction Collection", available at <http://www2.edc.org/ncip/library/wp/toc.htm>, 1998, 4 pages.
NCIP, "What is Word Prediction?", available at <http://www2.edc.org/NCIP/library/wp/what_is.htm>, 1998, 2 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Neches et al., "Enabling Technology for Knowledge Sharing", Fall, 1991, pp. 37-56.
Newton, Harry, "Newton's Telecom Dictionary", Mar. 1998, pp. 62, 155, 610-611, 771.
Ng, Simon, "Google's Task List Now Comes to Iphone", SimonBlog, Available at <http://www.simonblog.com/2009/02/04/googles-task-list-now-comes-to-iphone/>, Feb. 4, 2009, 33 pages.
Nguyen et al., "Generic Manager for Spoken Dialogue Systems", In DiaBruck: 7th Workshop on the Semantics and Pragmatics of Dialogue, Proceedings, 2003, 2 pages.
Niesler et al., "A Variable-Length Category-Based N-Gram Language Model", IEEE International Conference on Acoustics, Speech and Signal Processing (ICASSP'96), vol. 1, May 1996, 6 pages.
Nilsson, B. A., "Microsoft Publisher is an Honorable Start for DTP Beginners", Computer Shopper, Feb. 1, 1992, 2 pages.
Noik, Emanuel G., "Layout-Independent Fisheye Views of Nested Graphs", IEEE Proceedings of Symposium on Visual Languages, 1993, 6 pages.
Non-Final Office Action received for U.S. Appl. No. 12/987,982, mailed on Dec. 2, 2013, 18 pages.
Non-Final Office Action received for U.S. Appl. No. 12/987,982, mailed on Mar. 5, 2015, 24 pages.
Non-Final Office Action received for U.S. Appl. No. 12/987,982, mailed on Mar. 14, 2013, 28 pages.
Non-Final Office Action received for U.S. Appl. No. 13/492,809, mailed on Jun. 11, 2015, 9 pages.
Non-Final Office Action received for U.S. Appl. No. 13/492,809, mailed on Mar. 7, 2013, 7 pages.
Non-Final Office Action received for U.S. Appl. No. 13/492,809, mailed on Nov. 27, 2013, 8 pages.
Non-Final Office Action received for U.S. Appl. No. 13/725,481, mailed on Jul. 5, 2013, 13 pages.
Non-Final Office Action received for U.S. Appl. No. 13/725,512, mailed on Jul. 26, 2013, 14 pages.
Non-Final Office Action received for U.S. Appl. No. 13/725,550, mailed on Apr. 16, 2013, 8 pages.
Non-Final Office Action received for U.S. Appl. No. 13/725,616, mailed on Jun. 28, 2013, 9 pages.
Non-Final Office Action received for U.S. Appl. No. 13/725,656, mailed on Mar. 27, 2013, 7 pages.
Non-Final Office Action received for U.S. Appl. No. 13/725,713, mailed on Jul. 5, 2013, 14 pages.
Non-Final Office Action received for U.S. Appl. No. 13/725,742, mailed on Jun. 27, 2013, 9 pages.
Non-Final Office Action received for U.S. Appl. No. 13/725,761, mailed on Jul. 2, 2013, 12 pages.
Non-Final Office Action received for U.S. Appl. No. 13/784,694, mailed on May 23, 2013, 7 pages.
Non-Final Office Action received for U.S. Appl. No. 13/784,694, mailed on Oct. 10, 2013, 9 pages.

(56) References Cited

OTHER PUBLICATIONS

Non-Final Office Action received for U.S. Appl. No. 13/784,707, mailed on Jul. 11, 2013, 9 pages.
Non-Final Office Action received for U.S. Appl. No. 13/913,336, mailed on Jan. 30, 2017, 17 pages.
Non-Final Office Action received for U.S. Appl. No. 13/913,336, mailed on Jul. 2, 2018, 8 pages.
Non-Final Office Action received for U.S. Appl. No. 15/394,162, mailed on Feb. 28, 2019, 23 pages.
Non-Final Office Action received for U.S. Appl. No. 16/352,410, mailed on Dec. 2, 2019, 9 pages.
Nonhoff-Arps et al., "StraBenmusik: Portable MP3-Spieler mit USB Anschluss", CT Magazin Fuer Computer Technik, Verlag Heinz Heise GMBH, Hannover DE, No. 25, 2000, pp. 166-175.
Northern Telecom, "Meridian Mail PC User Guide", 1988, 17 Pages.
Notenboom, Leo A., "Can I Retrieve Old MSN Messenger Conversations?", available at <http://ask-leo.com/can_i_retrieve_old_msn_messenger_conversations.html>, Mar. 11, 2004, 23 pages.
Noth et al., "Verbmobil: The Use of Prosody in the Linguistic Components of a Speech Understanding System", IEEE Transactions on Speech and Audio Processing, vol. 8, No. 5, Sep. 2000, pp. 519-532.
Notice of Acceptance received for Australian Patent Application No. 2011205426, mailed on Jan. 6, 2014, 2 pages.
Notice of Acceptance received for Australian Patent Application No. 2013205568, mailed on May 20, 2015, 2 pages.
Notice of Acceptance received for Australian Patent Application No. 2013205569, mailed on Feb. 15, 2016, 2 pages.
Notice of Acceptance received for Australian Patent Application No. 2013205571, mailed on Jun. 1, 2015, 2 pages.
Notice of Acceptance received for Australian Patent Application No. 2013205586, mailed on Aug. 6, 2015, 2 pages.
Notice of Acceptance received for Australian Patent Application No. 2013205588, mailed on Feb. 12, 2016, 2 pages.
Notice of Acceptance received for Australian Patent Application No. 2013205590, mailed on May 20, 2015, 2 pages.
Notice of Acceptance received for Australian Patent Application No. 2013205591, mailed on Feb. 12, 2016, 2 pages.
Notice of Acceptance received for Australian Patent Application No. 2014274913, mailed on May 1, 2017, 3 pages.
Notice of Acceptance received for Australian Patent Application No. 2016204262, mailed on Dec. 22, 2017, 3 pages.
Notice of Acceptance received for Australian Patent Application No. 2017204217, mailed on Oct. 8, 2018, 3 pages.
Notice of Acceptance received for Australian Patent Application No. 2018202411, mailed on Sep. 18, 2019, 3 pages.
Notice of Acceptance received for Australian Patent Application No. 2019200296, mailed on Sep. 5, 2019, 3 pages.
Notice of Acceptance received for Canadian Patent Application No. 2,793,118, mailed on May 12, 2017, 1 page.
Notice of Allowance received for Canadian Patent Application No. 2,787,351, mailed on Aug. 6, 2015, 1 page.
Notice of Allowance received for Canadian Patent Application No. 2,791,791, mailed on Aug. 9, 2016, 1 page.
Notice of Allowance received for Canadian Patent Application No. 2,792,412, mailed on Sep. 14, 2015, 1 page.
Notice of Allowance received for Canadian Patent Application No. 2,792,570, mailed on Sep. 16, 2015, 1 page.
Notice of Allowance received for Canadian Patent Application No. 2,793,002, mailed on Feb. 23, 2016, 1 page.
Notice of Allowance received for Canadian Patent Application No. 2,793,248, mailed on Aug. 24, 2016, 2 pages.
Notice of Allowance received for Canadian Patent Application No. 2,793,741, mailed on Sep. 16, 2015, 1 page.
Notice of Allowance received for Canadian Patent Application No. 2,793,743, mailed on May 20, 2015, 1 page.
Notice of Allowance received for Canadian Patent Application No. 2,954,559, mailed on Jun. 14, 2018, 1 page.
Notice of Allowance received for Canadian Patent Application No. 2,954,559, mailed on Oct. 20, 2017, 1 page.
Notice of Allowance received for Canadian Patent Application No. 3,000,109, mailed on Oct. 16, 2019, 1 page.
Notice of Allowance received for Chinese Patent Application No. 201610126045.2, mailed on Jul. 16, 2019, 2 pages.
Notice of Allowance received for Japanese Patent Application No. 2014-127579, mailed on Sep. 16, 2016, 3 pages.
Notice of Allowance received for Japanese Patent Application No. 2014-127580, mailed on Jun. 30, 2017, 3 pages.
Notice of Allowance received for Japanese Patent Application No. 2014-127581, mailed on May 21, 2018, 3 pages.
Notice of Allowance received for Japanese Patent Application No. 2014-127582, mailed on Jun. 24, 2016, 3 pages.
Notice of Allowance received for Japanese Patent Application No. 2014-127583, mailed on May 27, 2016, 3 pages.
Notice of Allowance received for Japanese Patent Application No. 2014-127584, mailed on May 30, 2016, 3 pages.
Notice of Allowance received for Japanese Patent Application No. 2014-127585, mailed on Jul. 10, 2017, 3 pages.
Notice of Allowance received for Japanese Patent Application No. 2014-127586, mailed on May 9, 2016, 3 pages.
Notice of Allowance received for Japanese Patent Application No. 2014-127587, mailed on May 21, 2018, 3 pages.
Notice of Allowance received for Japanese Patent Application No. 2017-117880, mailed on Feb. 12, 2019, 4 pages.
Notice of Allowance received for Korean Patent Application No. 10-2012-7021659, mailed on Jan. 20, 2016, 3 pages.
Notice of Allowance received for Korean Patent Application No. 10-2012-7028786, mailed on Feb. 27, 2015, 2 pages.
Notice of Allowance received for Korean Patent Application No. 10-2012-7028802, mailed on Feb. 27, 2015, 2 pages.
Notice of Allowance received for Korean Patent Application No. 10-2012-7028805, mailed on Aug. 28, 2015, 3 pages.
Notice of Allowance received for Korean Patent Application No. 10-2012-7029183, mailed on Dec. 16, 2015, 5 pages.
Notice of Allowance received for Korean Patent Application No. 10-2012-7029195, mailed on May 30, 2016, 3 pages.
Notice of Allowance received for Korean Patent Application No. 10-2012-7029197, mailed on Feb. 27, 2015, 2 pages.
Notice of Allowance received for Korean Patent Application No. 10-2012-7029381, mailed on Nov. 27, 2015, 3 pages.
Notice of Allowance received for Korean Patent Application No. 10-2012-7029382, mailed on Nov. 20, 2015, 3 pages.
Notice of Allowance received for Korean Patent Application No. 10-2012-7029385, mailed on Aug. 21, 2015, 3 pages.
Notice of Allowance received for Korean Patent Application No. 10-2016-7023962, mailed on May 31, 2017, 4 pages.
Notice of Allowance received for Korean Patent Application No. 10-2017-7024596, mailed on Dec. 19, 2018, 4 pages.
Notice of Allowance received for Korean Patent Application No. 10-2017-7035711, mailed on Mar. 28, 2019, 4 pages.
Notice of Allowance received for Korean Patent Application No. 10-2019-7007971, mailed on Dec. 26, 2019, 5 pages.
Notice of Allowance received for Mexican Patent Application No. MX/a/2012/011794, mailed on Nov. 19, 2014, 1 page.
Notice of Allowance received for Mexican Patent Application No. MX/a/2012/011795, mailed on Nov. 20, 2014, 1 page.
Notice of Allowance received for Mexican Patent Application No. MX/a/2012/011797, mailed on Nov. 20, 2014, 1 page.
Notice of Allowance received for Mexican Patent Application No. MX/a/2012/011798, mailed on Nov. 28, 2014, 1 page.
Notice of Allowance received for Mexican Patent Application No. MX/a/2012/011799, mailed on Nov. 27, 2014, 1 page.
Notice of Allowance received for Mexican Patent Application No. MX/a/2012/011800, mailed on Feb. 9, 2016, 2 pages.
Notice of Allowance received for Mexican Patent Application No. MX/a/2012/011803, mailed on Nov. 28, 2014, 1 page.
Notice of Allowance received for Mexican Patent Application No. MX/a/2012/011807, mailed on Nov. 28, 2014, 1 page.
Notice of Allowance received for Mexican Patent Application No. MX/a/2012/011808, mailed on Jan. 23, 2015, 1 page.

(56) References Cited

OTHER PUBLICATIONS

Notice of Allowance received for Mexican Patent Application No. MX/a/2015/004983, mailed on Dec. 16, 2015, 2 pages.
Notice of Allowance received for Mexican Patent Application No. MX/a/2015/004983, mailed on Jun. 10, 2016, 1 page.
Notice of Allowance received for Mexican Patent Application No. MX/a/2016/011562, mailed on Mar. 31, 2017, 1 page.
Notice of Allowance received for Russian Patent Application No. 2012144637, mailed on Oct. 17, 2014, 15 pages.
Notice of Allowance received for U.S. Appl. No. 12/987,982, mailed on Dec. 15, 2015, 9 pages.
Notice of Allowance received for U.S. Appl. No. 13/492,809, mailed on Sep. 8, 2016, 14 pages.
Notice of Allowance received for U.S. Appl. No. 13/725,481, mailed on Jul. 23, 2014, 7 pages.
Notice of Allowance received for U.S. Appl. No. 13/725,481, mailed on May 12, 2014, 7 pages.
Notice of Allowance received for U.S. Appl. No. 13/725,512, mailed on Dec. 17, 2013, 9 pages.
Notice of Allowance received for U.S. Appl. No. 13/725,550, mailed on Jun. 11, 2014, 10 pages.
Notice of Allowance received for U.S. Appl. No. 13/725,550, mailed on Sep. 18, 2014, 10 pages.
Notice of Allowance received for U.S. Appl. No. 13/725,616, mailed on Apr. 3, 2014, 8 pages.
Notice of Allowance received for U.S. Appl. No. 13/725,616, mailed on Jul. 17, 2014, 8 pages.
Notice of Allowance received for U.S. Appl. No. 13/725,656, mailed on Dec. 4, 2013, 10 pages.
Notice of Allowance received for U.S. Appl. No. 13/725,656, mailed on Jul. 10, 2013, 10 pages.
Notice of Allowance received for U.S. Appl. No. 13/725,713, mailed on Jan. 30, 2014, 5 pages.
Notice of Allowance received for U.S. Appl. No. 13/725,742, mailed on Feb. 19, 2014, 7 pages.
Notice of Allowance received for U.S. Appl. No. 13/725,761, mailed on Apr. 10, 2015, 5 pages.
Notice of Allowance received for U.S. Appl. No. 13/784,694, mailed on Aug. 1, 2014, 8 pages.
Notice of Allowance received for U.S. Appl. No. 13/784,694, mailed on Feb. 21, 2014, 7 pages.
Notice of Allowance received for U.S. Appl. No. 13/784,694, mailed on Jun. 2, 2014, 8 pages.
Notice of Allowance received for U.S. Appl. No. 13/784,707, mailed on Feb. 20, 2014, 7 pages.
Notice of Allowance received for U.S. Appl. No. 13/784,707, mailed on Mar. 20, 2014, 2 pages.
Notice of Allowance received for U.S. Appl. No. 13/913,336, mailed on Dec. 14, 2018, 9 pages.
Notice of Allowance received for U.S. Appl. No. 15/394,162, mailed on Feb. 20, 2020, 6 pages.
Notice of Allowance received for U.S. Appl. No. 16/352,410, mailed on Mar. 26, 2020, 8 pages.
Notice of Allowance received for U.S. Patent Application No. 2013205584, mailed on Mar. 9, 2016, 2 pages.
Notification to Grant received for Chinese Patent Application No. 201180013559.2, mailed on Jan. 18, 2016, 3 pages.
Nozawa et al., “iPhone 4S Perfect Manual”, vol. 1, First Edition, Nov. 11, 2011, 4 pages.
O'Connor, Rory J., “Apple Banking on Newton's Brain”, San Jose Mercury News, Apr. 22, 1991.
Odubiyi et al., “SAIRE—A Scalable Agent-Based Information Retrieval Engine”, Proceedings of the First International Conference on Autonomous Agents, 1997, 12 pages.
Office Action received for Australian Patent Application No. 2013205568, mailed on Feb. 13, 2015, 3 pages.
Office Action received for Australian Patent Application No. 2013205569, mailed on Feb. 16, 2015, 3 pages.
Office Action received for Australian Patent Application No. 2013205571, mailed on Feb. 16, 2015, 3 pages.
Office Action received for Australian Patent Application No. 2013205584, mailed on Dec. 7, 2015, 3 pages.
Office Action received for Australian Patent Application No. 2013205584, mailed on Feb. 18, 2015, 3 pages.
Office Action received for Australian Patent Application No. 2013205585, mailed on Feb. 19, 2015, 3 pages.
Office Action received for Australian Patent Application No. 2013205586, mailed on Feb. 17, 2015, 3 pages.
Office Action received for Australian Patent Application No. 2013205588, mailed on Feb. 17, 2015, 3 pages.
Office Action received for Australian Patent Application No. 2013205590, mailed on Feb. 16, 2015, 3 pages.
Office Action received for Australian Patent Application No. 2013205591, mailed on Feb. 16, 2015, 3 pages.
Office Action received for Australian Patent Application No. 2014274913, mailed on Aug. 5, 2016, 3 pages.
Office Action received for Australian Patent Application No. 2016204262, mailed on Feb. 24, 2017, 3 pages.
Office Action received for Australian Patent Application No. 2017204217, mailed on Feb. 12, 2018, 3 pages.
Office Action received for Australian Patent Application No. 2018202411, mailed on Jan. 23, 2019, 2 pages.
Office Action received for Australian Patent Application No. 2019200296, mailed on Jul. 19, 2019, 2 pages.
Office Action received for Brazilian Patent Application No. 112012017826-1, mailed on Sep. 6, 2019, 5 pages.
Office Action received for Brazilian Patent Application No. BR122012028965-5, mailed on May 27, 2020, 6 pages.
Office Action received for Brazilian Patent Application No. BR122012028966-3, mailed on May 27, 2020, 6 pages.
Office Action received for Brazilian Patent Application No. BR122012028968-0, mailed on May 27, 2020, 6 pages.
Office Action received for Brazilian Patent Application No. BR122012028969-8, mailed on May 27, 2020, 6 pages.
Office Action received for Brazilian Patent Application No. BR122012028970-1, mailed on May 27, 2020, 6 pages.
Office Action received for Brazilian Patent Application No. BR122012028971-0, mailed on May 27, 2020, 6 pages.
Office Action received for Brazilian Patent Application No. BR122012028973-6, mailed on May 27, 2020, 6 pages.
Office Action received for Brazilian Patent Application No. BR122012028974-4, mailed on May 27, 2020, 6 pages.
Office Action received for Canadian Patent Application No. 2,787,351, mailed on May 28, 2014, 4 pages.
Office Action received for Canadian Patent Application No. 2,791,791, mailed on Aug. 13, 2014, 3 pages.
Office Action received for Canadian Patent Application No. 2,791,791, mailed on Aug. 25, 2015, 4 pages.
Office Action received for Canadian Patent Application No. 2,792,412, mailed on Aug. 21, 2014, 3 pages.
Office Action received for Canadian Patent Application No. 2,792,442, mailed on Aug. 25, 2015, 3 pages.
Office Action received for Canadian Patent Application No. 2,792,442, mailed on Feb. 4, 2016, 1 page.
Office Action received for Canadian Patent Application No. 2,792,570, mailed on Sep. 3, 2014, 3 pages.
Office Action received for Canadian Patent Application No. 2,793,002, mailed on Sep. 3, 2014, 3 pages.
Office Action received for Canadian Patent Application No. 2,793,002, mailed on Sep. 22, 2015, 3 pages.
Office Action received for Canadian Patent Application No. 2,793,118, mailed on Aug. 21, 2015, 4 pages.
Office Action received for Canadian Patent Application No. 2,793,118, mailed on Jul. 11, 2016, 4 pages.
Office Action received for Canadian Patent Application No. 2,793,118, mailed on Mar. 19, 2015, 3 pages.
Office Action received for Canadian Patent Application No. 2,793,248, mailed on Sep. 3, 2014, 3 pages.
Office Action received for Canadian Patent Application No. 2,793,248, mailed on Sep. 10, 2015, 3 pages.
Office Action received for Canadian Patent Application No. 2,793,741, mailed on Aug. 21, 2014, 2 pages.

(56) References Cited

OTHER PUBLICATIONS

Office Action received for Canadian Patent Application No. 2,793,743, mailed on May 20, 2014, 4 pages.
Office Action received for Canadian Patent Application No. 2,954,559, mailed on Mar. 27, 2017, 3 pages.
Office Action received for Canadian Patent Application No. 3,000,109, mailed on Jan. 14, 2019, 3 pages.
Office Action received for Chinese Patent Application No. 201180013559.2, mailed on Feb. 28, 2015, 14 pages.
Office Action received for Chinese Patent Application No. 201480030811.4, mailed on Jan. 28, 2019, 11 pages.
Office Action received for Chinese Patent Application No. 201480030811.4, mailed on Mar. 1, 2018, 17 pages.
Office Action received for Chinese Patent Application No. 201480030811.4, mailed on Mar. 3, 2017, 19 pages.
Office Action received for Chinese Patent Application No. 201480030811.4, mailed on Sep. 8, 2017, 17 pages.
Office Action received for Chinese Patent Application No. 201480030811.4, mailed on Sep. 30, 2018, 19 pages.
Office Action received for Chinese Patent Application No. 201610126045.2, mailed on May 8, 2018, 10 pages.
Office Action received for Chinese Patent Application No. 201610126045.2, mailed on Nov. 12, 2018, 5 pages.
Office Action received for European Patent Application No. 11707939.2, mailed on Jan. 18, 2019, 8 pages.
Office Action received for European Patent Application No. 14737370.8, mailed on Dec. 21, 2017, 5 pages.
Office Action received for European Patent Application No. 16188272.5, mailed on May 10, 2019, 8 pages.
Office Action received for Indian Patent Application No. 6734/CHENP/2012, mailed on Oct. 30, 2018, 8 pages.
Office Action received for Indian Patent Application No. 8902/CHENP/2012, mailed on Oct. 30, 2018, 6 pages.
Office Action received for Indian Patent Application No. 8903/CHENP/2012, mailed on Aug. 9, 2018, 6 pages.
Office Action received for Indian Patent Application No. 8904/CHENP/2012, mailed on Oct. 23, 2018, 6 pages.
Office Action received for Indian Patent Application No. 8905/CHENP/2012, mailed on Oct. 8, 2018, 7 pages.
Office Action received for Indian Patent Application No. 8906/CHENP/2012, mailed on Oct. 24, 2018, 6 pages.
Office Action received for Indian Patent Application No. 8907/CHENP/2012, mailed on Oct. 24, 2018, 6 pages.
Office Action received for Indian Patent Application No. 8908/CHENP/2012, mailed on Oct. 24, 2018, 6 pages.
Office Action received for Indian Patent Application No. 8909/CHENP/2012, mailed on Oct. 25, 2018, 6 pages.
Office Action received for Indian Patent Application No. 8910/CHENP/2012, mailed on Oct. 25, 2018, 6 pages.
Office Action received for Japanese Patent Application No. 2012-549003, mailed on Dec. 20, 2013, 3 pages.
Office Action received for Japanese Patent Application No. 2012-549003, mailed on Feb. 22, 2016, 15 pages.
Office Action received for Japanese Patent Application No. 2012-549003, mailed on Jun. 26, 2017, 138 pages.
Office Action received for Japanese Patent Application No. 2012-549003, mailed on Mar. 2, 2015, 10 pages.
Office Action received for Japanese Patent Application No. 2012-549003, mailed on Oct. 21, 2016, 51 pages.
Office Action received for Japanese Patent Application No. 2014-127579, mailed on Apr. 4, 2016, 6 pages.
Office Action received for Japanese Patent Application No. 2014-127579, mailed on Sep. 14, 2015, 5 pages.
Office Action received for Japanese Patent Application No. 2014-127580, mailed on Jan. 20, 2017, 10 pages.
Office Action received for Japanese Patent Application No. 2014-127580, mailed on Jun. 21, 2016, 12 pages.
Office Action received for Japanese Patent Application No. 2014-127580, mailed on Sep. 28, 2015, 7 pages.
Office Action received for Japanese Patent Application No. 2014-127581, mailed on Aug. 31, 2015, 9 pages.
Office Action received for Japanese Patent Application No. 2014-127581, mailed on Jun. 24, 2016, 4 pages.
Office Action received for Japanese Patent Application No. 2014-127581, mailed on Nov. 24, 2016, 4 pages.
Office Action received for Japanese Patent Application No. 2014-127581, mailed on Oct. 2, 2017, 44 pages.
Office Action received for Japanese Patent Application No. 2014-127582, mailed on Aug. 31, 2015, 11 pages.
Office Action received for Japanese Patent Application No. 2014-127583, mailed on Sep. 7, 2015, 3 pages.
Office Action received for Japanese Patent Application No. 2014-127584, mailed on Sep. 4, 2015, 3 pages.
Office Action received for Japanese Patent Application No. 2014-127585, mailed on Feb. 17, 2017, 9 pages.
Office Action received for Japanese Patent Application No. 2014-127585, mailed on Jul. 15, 2016, 8 pages.
Office Action received for Japanese Patent Application No. 2014-127585, mailed on Sep. 10, 2015, 4 pages.
Office Action received for Japanese Patent Application No. 2014-127586, mailed on Sep. 14, 2015, 8 pages.
Office Action received for Japanese Patent Application No. 2014-127587, mailed on Aug. 23, 2017, 6 pages.
Office Action received for Japanese Patent Application No. 2014-127587, mailed on Jan. 27, 2017, 6 pages.
Office Action received for Japanese Patent Application No. 2014-127587, mailed on Jul. 4, 2016, 7 pages.
Office Action received for Japanese Patent Application No. 2014-127587, mailed on Mar. 19, 2018, 3 pages.
Office Action received for Japanese Patent Application No. 2014-127587, mailed on Sep. 14, 2015, 9 pages.
Office Action received for Japanese Patent Application No. 2017-117880, mailed on May 11, 2018, 9 pages.
Office Action received for Japanese Patent Application No. 2017-117880, mailed on Sep. 29, 2017, 6 pages.
Office Action received for Japanese Patent Application No. 2018-050944, mailed on Feb. 28, 2020, 6 pages.
Office Action received for Japanese Patent Application No. 2018-050944, mailed on Mar. 29, 2019, 8 pages.
Office Action received for Korean Patent Application No. 10-2012-7021659, mailed on Apr. 30, 2014, 8 pages.
Office Action received for Korean Patent Application No. 10-2012-7021659, mailed on Feb. 27, 2015, 15 pages.
Office Action received for Korean Patent Application No. 10-2012-7028786, mailed on Apr. 30, 2014, 15 pages.
Office Action received for Korean Patent Application No. 10-2012-7028802, mailed on Apr. 30, 2014, 10 pages.
Office Action received for Korean Patent Application No. 10-2012-7028805, mailed on Feb. 27, 2015, 14 pages.
Office Action received for Korean Patent Application No. 10-2012-7029183, mailed on Apr. 30, 2014, 11 pages.
Office Action received for Korean Patent Application No. 10-2012-7029183, mailed on Jan. 28, 2015, 10 pages.
Office Action received for Korean Patent Application No. 10-2012-7029183, mailed on Sep. 7, 2015, 7 pages.
Office Action received for Korean Patent Application No. 10-2012-7029195, mailed on Apr. 30, 2014, 11 pages.
Office Action received for Korean Patent Application No. 10-2012-7029195, mailed on Feb. 27, 2015, 16 pages.
Office Action received for Korean Patent Application No. 10-2012-7029195, mailed on Jan. 28, 2016, 6 pages.
Office Action received for Korean Patent Application No. 10-2012-7029197, mailed on Apr. 30, 2014, 10 pages.
Office Action received for Korean Patent Application No. 10-2012-7029381, mailed on Apr. 30, 2014, 12 pages.
Office Action received for Korean Patent Application No. 10-2012-7029381, mailed on Mar. 28, 2015, 5 pages.
Office Action received for Korean Patent Application No. 10-2012-7029382, mailed on Apr. 30, 2014, 9 pages.
Office Action received for Korean Patent Application No. 10-2012-7029382, mailed on Jan. 28, 2015, 7 pages.

(56) References Cited

OTHER PUBLICATIONS

Office Action received for Korean Patent Application No. 10-2012-7029382, mailed on Jul. 31, 2015, 12 pages.
Office Action received for Korean Patent Application No. 10-2012-7029385, mailed on Apr. 30, 2015, 13 pages.
Office Action received for Korean Patent Application No. 10-2012-7029385, mailed on Jun. 27, 2014, 13 pages.
Office Action received for Korean Patent Application No. 10-2015-7035370, mailed on Jul. 11, 2016, 12 pages.
Office Action received for Korean Patent Application No. 10-2015-7035370, mailed on May 31, 2017, 6 pages.
Office Action received for Korean Patent Application No. 10-2015-7035370, mailed on Oct. 11, 2017, 7 pages.
Office Action received for Korean Patent Application No. 10-2016-7023962, mailed on Oct. 20, 2016, 5 pages.
Office Action received for Korean Patent Application No. 10-2017-7024596, mailed on Feb. 22, 2018, 10 pages.
Office Action received for Korean Patent Application No. 10-2017-7035711, mailed on May 18, 2018, 14 pages.
Office Action received for Korean Patent Application No. 10-2019-7007971, mailed on May 17, 2019, 12 pages.
Office Action received for Korean Patent Application No. 10-2019-7018332, mailed on Mar. 12, 2020, 9 pages.
Office Action received for Korean Patent Application No. 10-2019-7018332, mailed on Sep. 10, 2019, 5 pages.
Office Action received for Mexican Patent Application No. MX/a/2012/008369, mailed on Oct. 21, 2013, 6 pages.
Office Action received for Mexican Patent Application No. MX/a/2012/011794, mailed on Jun. 13, 2014, 2 pages.
Office Action received for Mexican Patent Application No. MX/a/2012/011795, mailed on Feb. 19, 2014, 1 page.
Office Action received for Mexican Patent Application No. MX/a/2012/011795, mailed on Jun. 13, 2014, 2 pages.
Office Action received for Mexican Patent Application No. MX/a/2012/011797, mailed on Feb. 19, 2014, 1 page.
Office Action received for Mexican Patent Application No. MX/a/2012/011797, mailed on Jun. 13, 2014, 2 pages.
Office Action received for Mexican Patent Application No. MX/a/2012/011798, mailed on Feb. 19, 2014, 1 page.
Office Action received for Mexican Patent Application No. MX/a/2012/011798, mailed on Jun. 24, 2014, 3 pages.
Office Action received for Mexican Patent Application No. MX/a/2012/011799, mailed on Feb. 19, 2014, 1 page.
Office Action received for Mexican Patent Application No. MX/a/2012/011799, mailed on Jun. 25, 2014, 2 pages.
Office Action received for Mexican Patent Application No. MX/a/2012/011800, mailed on Aug. 20, 2015, 9 pages.
Office Action received for Mexican Patent Application No. MX/a/2012/011800, mailed on Dec. 5, 2014, 5 pages.
Office Action received for Mexican Patent Application No. MX/a/2012/011803, mailed on Feb. 19, 2014, 1 page.
Office Action received for Mexican Patent Application No. MX/a/2012/011803, mailed on Jun. 25, 2014, 2 pages.
Office Action received for Mexican Patent Application No. MX/a/2012/011807, mailed on Feb. 19, 2014, 1 page.
Office Action received for Mexican Patent Application No. MX/a/2012/011807, mailed on Jun. 26, 2014, 2 pages.
Office Action received for Mexican Patent Application No. MX/a/2012/011808, mailed on Feb. 19, 2014, 1 page.
Office Action received for Russian Patent Application No. 2012135502, mailed on Feb. 18, 2014, 8 pages.
Office Action received for Russian Patent Application No. 2012144605, mailed on Mar. 26, 2014, 7 pages.
Office Action received for Russian Patent Application No. 2012144606, mailed on Mar. 25, 2014, 7 pages.
Office Action received for Russian Patent Application No. 2012144637, mailed on Mar. 25, 2014, 8 pages.
Office Action received for Russian Patent Application No. 2012144640, mailed on Mar. 24, 2014, 9 pages.
Office Action received for Russian Patent Application No. 2012144640, mailed on Nov. 28, 2014, 8 pages.
Office Action received for Russian Patent Application No. 2012144644, mailed on Mar. 24, 2014, 8 pages.
Office Action received for Russian Patent Application No. 2012144647, mailed on Jun. 20, 2014, 8 pages.
Office Action received for United Kingdom Patent Application No. 1213633.9, mailed on Feb. 16, 2017, 5 pages.
Office Action received for United Kingdom Patent Application No. 1213633.9, mailed on Sep. 28, 2017, 5 pages.
Ohsawa et al., "A computational Model of an Intelligent Agent Who Talks with a Person", Research Reports on Information Sciences, Series C, No. 92, Apr. 1989, pp. 1-18.
Ohtomo et al., "Two-Stage Recognition Method of Hand-Written Chinese Characters Using an Integrated Neural Network Model", Denshi Joohoo Tsuushin Gakkai Ronbunshi, D-II, vol. J74, Feb. 1991, pp. 158-165.
Okazaki et al., "Multi-Fisheye Transformation Method for Large-Scale Network Maps", IEEE Japan, vol. 44, No. 6, 1995, pp. 495-500.
Okuno et al., "System for Japanese Input Method based on the Internet", Technical Report of Information Processing Society of Japan, Natural Language Processing, Japan, Information Processing Society of Japan, vol. 2009, No. 36, Mar. 18, 2009, 8 pages.
Omologo et al., "Microphone Array Based Speech Recognition with Different Talker-Array Positions", IEEE International Conference on Acoustics, Speech, and Signal Processing, vol. 1, Apr. 21-24, 1997, pp. 227-230.
Oregon Scientific, "512MB Waterproof MP3 Player with FM Radio & Built-in Pedometer", available at <http://www2.oregonscientific.com/shop/product.asp?cid=4&scid=11&pid=581>, retrieved on Jul. 31, 2006, 2 pages.
Oregon Scientific, "Waterproof Music Player with FM Radio and Pedometer (MP121)—User Manual", 2005, 24 pages.
Osxdaily, "Get a List of Siri Commands Directly from Siri", Available at <http://osxdaily.com/2013/02/05/list-siri-commands/>, Feb. 5, 2013, 15 pages.
Owei et al., "Natural Language Query Filtration in the Conceptual Query Language", IEEE, 1997, pp. 539-549.
Padilla, Alfredo, "Palm Treo 750 Cell Phone Review—Messaging", available at <http://www.wirelessinfo.com/content/palm-Treo-750-Cell-Phone-Review/Messaging.htm>, Mar. 17, 2007, 6 pages.
Palay et al., "The Andrew Toolkit: An Overview", Information Technology Center, Carnegie-Mellon University, 1988, pp. 1-15.
Palm, Inc., "User Guide: Your Palm® Treo.TM. 755p Smartphone", 2005-2007, 304 pages.
Pan et al., "Natural Language Aided Visual Query Building for Complex Data Access", In proceeding of: Proceedings of the Twenty-Second Conference on Innovative Applications of Artificial Intelligence, XP055114607, Jul. 11, 2010.
Panasonic, "Toughbook 28: Powerful, Rugged and Wireless", Panasonic: Toughbook Models, available at <http://www.panasonic.com/computer/notebook/html/01a_s8.htm>, retrieved on Dec. 19, 2002, 3 pages.
Pannu et al., "A Learning Personal Agent for Text Filtering and Notification", Proceedings of the International Conference of Knowledge Based Systems, 1996, pp. 1-11.
Papadimitriou et al., "Latent Semantic Indexing: A Probabilistic Analysis", Available online at <http://citeseerx.ist.psu.edu/messaqes/downloadsexceeded.html>, Nov. 14, 1997, 21 pages.
Parks et al., "Classification of Whale and Ice Sounds with a cochlear Model", IEEE, Mar. 1992.
Parson, T. W., "Voice and Speech Processing", Pitch and Formant Estimation, McGraw-Hill, Inc., ISBN: 0-07-0485541-0, 1987, 15 pages.
Parsons, T. W., "Voice and Speech Processing", Linguistics and Technical Fundamentals, Articulatory Phonetics and Phonemics, McGraw-Hill, Inc., ISBN: 0-07-0485541-0, 1987, 5 pages.
Pathak et al., "Privacy-preserving Speech Processing: Cryptographic and String-matching Frameworks Show Promise", In: IEEE signal processing magazine, retrieved from <http://www.merl.com/publications/docs/TR2013-063.pdf>, Feb. 13, 2013, 16 pages.

(56) References Cited

OTHER PUBLICATIONS

Patra et al., "A Kernel-Based Approach for Biomedical Named Entity Recognition", Scientific World Journal, vol. 2013, 2013, pp. 1-7.
Patterson et al., "Rendezvous: An Architecture for Synchronous Multi-User Applications", CSCW '90 Proceedings, 1990, pp. 317-328.
Pearl, Amy, "System Support for Integrated Desktop Video Conferencing", Sunmicrosystems Laboratories, Dec. 1992, pp. 1-15.
Penn et al., "Ale for Speech: A Translation Prototype", Bell Laboratories, 1999, 4 pages.
Pennington et al., "GloVe: Global Vectors for Word Representation", Proceedings of the Conference on Empirical Methods Natural Language Processing (EMNLP), Oct. 25-29, 2014, pp. 1532-1543.
Pereira, Fernando, "Logic for Natural Language Analysis", SRI International, Technical Note 275, Jan. 1983, 194 pages.
Perlow, Jason, "Alexa Loop Mode with Playlist for Sleep Noise", Online Available at: <https://www.youtube.com/watch?v=nSkSuXziJSg>, Apr. 11, 2016, 3 pages.
Perrault et al., "Natural-Language Interfaces", SRI International, Technical Note 393, Aug. 22, 1986, 48 pages.
PhatNoise, Voice Index on Tap, Kenwood Music Keg, available at <http://www.phatnoise.com/kenwood/kenwoodssamail.html>, retrieved on Jul. 13, 2006, 1 page.
Phillipps, Ben, "Touchscreens are Changing the Face of Computers—Today's Users Have Five Types of Touchscreens to Choose from, Each with its Own Unique Characteristics", Electronic Products, Nov. 1994, pp. 63-70.
Phillips, Dick, "The Multi-Media Workstation", SIGGRAPH '89 Panel Proceedings, 1989, pp. 93-109.
Phoenix Solutions, Inc., "Declaration of Christopher Schmandt Regarding the MIT Galaxy System", West Interactive Corp., A Delaware Corporation, Document 40, Jul. 2, 2010, 162 pages.
Pickering, J. A., "Touch-Sensitive Screens: The Technologies and Their Application", International Journal of Man-Machine Studies, vol. 25, No. 3, Sep. 1986, pp. 249-269.
Picone, J., "Continuous Speech Recognition using Hidden Markov Models", IEEE ASSP Magazine, vol. 7, No. 3, Jul. 1990, 16 pages.
Pingali et al., "Audio-Visual Tracking for Natural Interactivity", ACM Multimedia, Oct. 1999, pp. 373-382.
Plaisant et al., "Touchscreen Interfaces for Alphanumeric Data Entry", Proceedings of the Human Factors and Ergonomics Society 36th Annual Meeting, 1992, pp. 293-297.
Plaisant et al., "Touchscreen Toggle Design", CHI'92, May 3-7, 1992, pp. 667-668.
Poly-Optical Products, Inc., "Poly-Optical Fiber Optic Membrane Switch Backlighting", available at <http://www.poly-optical.com/membrane_switches.html>, retrieved on Dec. 19, 2002, 3 pages.
Poor, Alfred, "Microsoft Publisher", PC Magazine, vol. 10, No. 20, Nov. 26, 1991, 1 page.
Potter et al., "An Experimental Evaluation of Three Touch Screen Strategies within a Hypertext Database", International Journal of Human-Computer Interaction, vol. 1, No. 1, 1989, pp. 41-52.
Potter et al., "Improving the Accuracy of Touch Screens: An Experimental Evaluation of Three Strategies", CHI '88 ACM, 1988, pp. 27-32.
Powell, Josh, "Now You See Me . . . Show/Hide Performance", available at http://www.learningjquery.com/2010/05/now-you-see-me-showhide-performance, May 4, 2010, 3 pages.
Public Safety Technologies, "Tracer 2000 Computer", available at <http://www.pst911.com/tracer.html>, retrieved on Dec. 19, 2002, 3 pages.
Pulman et al., "Clare: A Combined Language and Reasoning Engine", Proceedings of JFIT Conference, available at <http://www.cam.sri.com/tr/crc042/paper.ps.Z>, 1993, 8 pages.
Quazza et al., "Actor: A Multilingual Unit-Selection Speech Synthesis System", Proceedings of 4th ISCA Tutorial and Research Workshop on Speech Synthesis, Jan. 1, 2001, 6 pages.
Quick Search Algorithm, Communications of the ACM, 33(8), 1990, pp. 132-142.
Rabiner et al., "Digital Processing of Speech Signals", Prentice Hall, 1978, pp. 274-277.
Rabiner et al., "Fundamental of Speech Recognition", AT&T, Published by Prentice-Hall, Inc., ISBN: 0-13-285826-6, 1993, 17 pages.
Rabiner et al., "Note on the Properties of a Vector Quantizer for LPC Coefficients", Bell System Technical Journal, vol. 62, No. 8, Oct. 1983, 9 pages.
Rampe et al., "SmartForm Designer and SmartForm Assistant", News release, Claris Corp., Jan. 9, 1989, 1 page.
Rao et al., "Exploring Large Tables with the Table Lens", Apple Inc., Video Clip, Xerox Corp., on a CD, 1994.
Rao et al., "Exploring Large Tables with the Table Lens", CHI'95 Mosaic of Creativity, ACM, May 7-11, 1995, pp. 403-404.
Rao et al., "The Table Lens: Merging Graphical and Symbolic Representations in an Interactive Focus+Context Visualization for Tabular Information", Proceedings of the ACM SIGCHI Conference on Human Factors in Computing Systems, Apr. 1994, pp. 1-7.
Raper, Larry K.,"The C-MU PC Server Project", (CMU-ITC-86-051), Dec. 1986, pp. 1-30.
Ratcliffe et al., "Intelligent Agents Take U.S. Bows", MacWeek, vol. 6, No. 9, Mar. 2, 1992, 1 page.
Ratcliffe, M., "ClearAccess 2.0 Allows SQL Searches Off-Line (Structured Query Language) (ClearAccess Corp. Preparing New Version of Data-Access Application with Simplified User Interface, New Features) (Product Announcement)", MacWeek, vol. 6, No. 41, Nov. 16, 1992, 2 pages.
Ravishankar, Mosur K., "Efficient Algorithms for Speech Recognition", Doctoral Thesis Submitted to School of Computer Science, Computer Science Division, Carnegie Mellon University, Pittsburgh, May 15, 1996, 146 pages.
Rayner et al., "Adapting the Core Language Engine to French and Spanish", Cornell University Library, available at <http://arxiv.org/abs/cmp-lg/9605015>, May 10, 1996, 9 pages.
Rayner et al., "Deriving Database Queries from Logical Forms by Abductive Definition Expansion", Proceedings of the Third Conference on Applied Natural Language Processing, ANLC, 1992, 8 pages.
Rayner et al., "Spoken Language Translation with Mid-90's Technology: A Case Study", Eurospeech, ISCA, Available online at <http://citeseerx.ist.psu.edu/viewdoc/summary?doi=10.1.1.54.8608>, 1993, 4 pages.
Rayner, M., "Abductive Equivalential Translation and its Application to Natural Language Database Interfacing", Dissertation Paper, SRI International, Sep. 1993, 162 pages.
Rayner, Manny, "Linguistic Domain Theories: Natural-Language Database Interfacing from First Principles", SRI International, Cambridge, 1993, 11 pages.
Reddy, D. R., "Speech Recognition by Machine: A Review", Proceedings of the IEEE, Apr. 1976, pp. 501-531.
Reininger et al., "Speech and Speaker Independent Codebook Design in VQ Coding Schemes", (Proceedings of the IEEE International Acoustics, Speech and Signal Processing Conference, Mar. 1985), as reprinted in Vector Quantization (IEEE Press, 1990), 1990, pp. 271-273.
Remde et al., "SuperBook: An Automatic Tool for Information Exploration-Hypertext?", In Proceedings of Hypertext, 87 Papers, Nov. 1987, 14 pages.
Ren et al., "Efficient Strategies for Selecting Small Targets on Pen-Based Systems: An Evaluation Experiment for Selection Strategies and Strategy Classifications", Proceedings of the IFIP TC2/TC13 WG2.7/WG13.4 Seventh Working Conference on Engineering for Human-Computer Interaction, vol. 150, 1998, pp. 19-37.
Ren et al., "Improving Selection Performance on Pen-Based Systems: A Study of Pen-Based Interaction for Selection Tasks", ACM Transactions on Computer-Human Interaction, vol. 7, No. 3, Sep. 2000, pp. 384-416.
Ren et al., "The Best among Six Strategies for Selecting a Minute Target and the Determination of the Minute Maximum Size of the Targets on a Pen-Based Computer", Human-Computer Interaction INTERACT, 1997, pp. 85-92.

(56) References Cited

OTHER PUBLICATIONS

Reynolds, C. F., "On-Line Reviews: A New Application of the HICOM Conferencing System", IEEE Colloquium on Human Factors in Electronic Mail and Conferencing Systems, Feb. 3, 1989, 4 pages.
Rice et al., "Monthly Program: Nov. 14, 1995", The San Francisco Bay Area Chapter of ACM SIGCHI, available at <http://www.baychi.org/calendar/19951114>, Nov. 14, 1995, 2 pages.
Rice et al., "Using the Web Instead of a Window System", Proceedings of the SIGCHI Conference on Human Factors in Computing Systems, CHI'96, 1996, pp. 1-14.
Ricker, Thomas, "Apple Patents Audio User Interface", Engadget, available at <http://www.engadget.com/2006/05/04/apple-patents-audio-user-interface/>, May 4, 2006, 6 pages.
Riecken, R D., "Adaptive Direct Manipulation", IEEE Xplore, 1991, pp. 1115-1120.
Rigoll, G., "Speaker Adaptation for Large Vocabulary Speech Recognition Systems Using Speaker Markov Models", International Conference on Acoustics, Speech and Signal Processing (ICASSP'89), May 1989, 4 pages.
Riley, M D., "Tree-Based Modelling of Segmental Durations", Talking Machines Theories, Models and Designs, Elsevier Science Publishers B.V., North-Holland, ISBN: 08-444-89115.3, 1992, 15 pages.
Rioport, "Rio 500: Getting Started Guide", available at <http://ec1.images-amazon.com/media/i3d/01/A/man-migrate/MANUAL000023453.pdf>, 1999, 2 pages.
Rivlin et al., "Maestro: Conductor of Multimedia Analysis Technologies", SRI International, 1999, 7 pages.
Rivoira et al., "Syntax and Semantics in a Word-Sequence Recognition System", IEEE International Conference on Acoustics, Speech and Signal Processing (ICASSP'79), Apr. 1979, 5 pages.
Robbin et al., "MP3 Player and Encoder for Macintosh!", SoundJam MP Plus, Version 2.0, 2000, 76 pages.
Robertson et al., "Information Visualization Using 3D Interactive Animation", Communications of the ACM, vol. 36, No. 4, Apr. 1993, pp. 57-71.
Robertson et al., "The Document Lens", UIST '93, Nov. 3-5, 1993, pp. 101-108.
Roddy et al., "Communication and Collaboration in a Landscape of B2B eMarketplaces", VerticalNet Solutions, White Paper, Jun. 15, 2000, 23 pages.
Roddy et al., "Interface Issues in Text Based Chat Rooms", SIGCHI Bulletin, vol. 30, No. 2, Apr. 1998, pp. 119-123.
Root, Robert, "Design of a Multi-Media Vehicle for Social Browsing", Bell Communications Research, 1988, pp. 25-38.
Rose et al., "Inside Macintosh", vols. I, II, and III, Addison-Wesley Publishing Company, Inc., Jul. 1988, 1284 pages.
Roseberry, Catherine, "How to Pair a Bluetooth Headset & Cell Phone", available at <http://mobileoffice.about.com/od/usingyourphone/ht/blueheadset_p.htm>, retrieved on Apr. 29, 2006, 2 pages.
Rosenberg et al., "An Overview of the Andrew Message System", Information Technology Center Carnegie-Mellon University, Jul. 1987, pp. 99-108.
Rosenfeld, R., "A Maximum Entropy Approach to Adaptive Statistical Language Modelling", Computer Speech and Language, vol. 10, No. 3, Jul. 1996, 25 pages.
Rosner et al., "In Touch: A Graphical User Interface Development Tool", IEEE Colloquium on Software Tools for Interface Design, Nov. 8, 1990, pp. 12/1-12/7.
Rossfrank, "Konstenlose Sprachmitteilungins Festnetz", XP002234425, Dec. 10, 2000, pp. 1-4.
Roszkiewicz, A., "Extending your Apple", Back Talk-Lip Service, A+ Magazine, The Independent Guide for Apple Computing, vol. 2, No. 2, Feb. 1984, 5 pages.
Roucos et al., "A Segment Vocoder at 150 B/S", (Proceedings of the IEEE International Acoustics, Speech and Signal Processing Conference, Apr. 1983), as reprinted in Vector Quantization (IEEE Press, 1990), 1990, pp. 246-249.
Roucos et al., "High Quality Time-Scale Modification for Speech", Proceedings of the 1985 IEEE Conference on Acoustics, Speech and Signal Processing, 1985, pp. 493-496.
Routines, "SmartThings Support", Available online at <https://web.archive.org/web/20151207165701/https://support.smartthings.com/hc/en-us/articles/205380034-Routines>, 2015, 2 pages.
Rubine, Dean Harris, "Combining Gestures and Direct Manipulation", CHI '92, May 3-7, 1992, pp. 659-660.
Rubine, Dean Harris, "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Rudnicky et al., "Creating Natural Dialogs in the Carnegie Mellon Communicator System", Proceedings of Eurospeech, vol. 4, 1999, pp. 1531-1534.
Russell et al., "Artificial Intelligence, A Modern Approach", Prentice Hall, Inc., 1995, 121 pages.
Russo et al., "Urgency is a Non-Monotonic Function of Pulse Rate", Journal of the Acoustical Society of America, vol. 122, No. 5, 2007, 6 pages.
Sabin et al., "Product Code Vector Quantizers for Waveform and Voice Coding", (IEEE Transactions on Acoustics, Speech and Signal Processing, Jun. 1984), as reprinted in Vector Quantization (IEEE Press, 1990), 1990, pp. 274-288.
Sacerdoti et al., "A Ladder User's Guide (Revised)", SRI International Artificial Intelligence Center, Mar. 1980, 39 pages.
Sagalowicz, D., "AD-Ladder User's Guide", SRI International, Sep. 1980, 42 pages.
Sakoe et al., "Dynamic Programming Algorithm Optimization for Spoken Word Recognition", IEEE Transactions on Acoustics, Speech and Signal Processing, vol. ASSP-26, No. 1, Feb. 1978, 8 pages.
Salton et al., "On the Application of Syntactic Methodologies in Automatic Text Analysis", Information Processing and Management, vol. 26, No. 1, Great Britain, 1990, 22 pages.
Sameshima et al., "Authorization with Security Attributes and Privilege Delegation Access control beyond the ACL", Computer Communications, vol. 20, 1997, 9 pages.
Samsung Support, "Create a Quick Command in Bixby to Launch Custom Settings by at your Command", Retrieved from internet: https://www.facebook.com/samsungsupport/videos/10154746303151213, Nov. 13, 2017, 1 page.
Samsung, "SGH-a885 Series—Portable Quad-Band Mobile Phone-User Manual", Retrieved from the Internet: URL: "http://web.archive.org/web/20100106113758/http://www.comparecellular.com/images/phones/userguide1896.pdf", Jan. 1, 2009, 144 pages.
Sankar, Ananth, "Bayesian Model Combination (BAYCOM) for Improved Recognition", IEEE International Conference on Acoustics, Speech, and Signal Processing (ICASSP), Mar. 18-23, 2005, pp. 845-848.
San-Segundo et al., "Confidence Measures for Dialogue Management in the CU Communicator System", Proceedings of Acoustics, Speech and Signal Processing (ICASSP'00), Jun. 2000, 4 pages.
Santaholma, Marianne E., "Grammar Sharing Techniques for Rule-based Multilingual NLP Systems", Proceedings of the 16th Nordic Conference of Computational Linguistics, NODALIDA 2007, May 25, 2007, 8 pages.
Santen, Jan P., "Assignment of Segmental Duration in Text-to-Speech Synthesis", Computer Speech and Language, vol. 8, No. 2, Apr. 1994, pp. 95-128.
Sarawagi, Sunita, "CRF Package Page", available at <http://crf.sourceforge.net/>, retrieved on Apr. 6, 2011, 2 pages.
Sarkar et al., "Graphical Fisheye Views of Graphs", CHI '92 Proceedings of the SIGCHI Conference on Human Factors in Computing Systems, May 3-7, 1992, pp. 83-91.
Sarkar et al., "Graphical Fisheye Views of Graphs", Systems Research Center, Digital Equipment Corporation, Mar. 17, 1992, 31 pages.
Sarkar et al., "Graphical Fisheye Views", Communications of the ACM, vol. 37, No. 12, Dec. 1994, pp. 73-83.
Sarkar et al., "Stretching the Rubber Sheet: A Metaphor for Viewing Large Layouts on Small Screens", UIST'93, ACM, Nov. 3-5, 1993, pp. 81-91.

(56) References Cited

OTHER PUBLICATIONS

Sastry, Ravindra W., "A Need for Speed: A New Speedometer for Runners", submitted to the Department of Electrical Engineering and Computer Science at the Massachusetts Institute of Technology, 1999, pp. 1-42.
Sato, H., "A Data Model, Knowledge Base and Natural Language Processing for Sharing a Large Statistical Database", Statistical and Scientific Database Management, Lecture Notes in Computer Science, vol. 339, 1989, 20 pages.
Savoy, J., "Searching Information in Hypertext Systems Using Multiple Sources of Evidence", International Journal of Man-Machine Studies, vol. 38, No. 6, Jun. 1996, 15 pages.
Scagliola, C., "Language Models and Search Algorithms for Real-Time Speech Recognition", International Journal of Man-Machine Studies, vol. 22, No. 5, 1985, 25 pages.
Schafer et al., "Digital Representations of Speech Signals", Proceedings of the IEEE, vol. 63, No. 4, Apr. 1975, pp. 662-677.
Schaffer et al., "Navigating Hierarchically Clustered Networks through Fisheye and Full-Zoom Methods", ACM Transactions on Computer-Human Interaction, vol. 3, No. 2, Jun. 1996, pp. 162-188.
Scheifler, R. W., "The X Window System", MIT Laboratory for Computer Science and Gettys, Jim Digital Equipment Corporation and MIT Project Athena; ACM Transactions on Graphics, vol. 5, No. 2, Apr. 1986, pp. 79-109.
Schluter et al., "Using Phase Spectrum Information for Improved Speech Recognition Performance", IEEE International Conference on Acoustics, Speech, and Signal Processing, 2001, pp. 133-136.
Schmandt et al., "A Conversational Telephone Messaging System", IEEE Transactions on Consumer Electronics, vol. CE-30, Aug. 1984, pp. xxi-xxiv.
Schmandt et al., "Augmenting a Window System with Speech Input", IEEE Computer Society, Computer, vol. 23, No. 8, Aug. 1990, 8 pages.
Schmandt et al., "Phone Slave: A Graphical Telecommunications Interface", Proceedings of the SID, vol. 26, No. 1, 1985, pp. 79-82.
Schmandt et al., "Phone Slave: A Graphical Telecommunications Interface", Society for Information Display, International Symposium Digest of Technical Papers, Jun. 1984, 4 pages.
Schmid, H., "Part-of-speech tagging with neural networks", COLING '94 Proceedings of the 15th conference on Computational linguistics—vol. 1, 1994, pp. 172-176.
Schnelle, Dirk, "Context Aware Voice User Interfaces for Workflow Support", Dissertation paper, Aug. 27, 2007, 254 pages.
Schone et al., "Knowledge-Free Induction of Morphology Using Latent Semantic Analysis", Proceedings of the 2nd Workshop on Learning Language in Logic and the 4th Conference on Computational Natural Language Learning, vol. 7, 2000, pp. 67-72.
Schooler et al., "A Packet-switched Multimedia Conferencing System", By Eve Schooler, et al; ACM SIGOIS Bulletin, vol. I, No. 1, Jan. 1989, pp. 12-22.
Schooler et al., "An Architecture for Multimedia Connection Management", Proceedings IEEE 4th Comsoc International Workshop on Multimedia Communications, Apr. 1992, pp. 271-274.
Schooler et al., "Multimedia Conferencing: Has it Come of Age?", Proceedings 24th Hawaii International Conference on System Sciences, vol. 3, Jan. 1991, pp. 707-716.
Schooler et al., "The Connection Control Protocol: Architecture Overview", USC/Information Sciences Institute, Jan. 28, 1992, pp. 1-6.
Schooler, Eve M., "Case Study: Multimedia Conference Control in a Packet-Switched Teleconferencing System", Journal of Internetworking: Research and Experience, vol. 4, No. 2, Jun. 1993, pp. 99-120.
Schooler, Eve M., "The Impact of Scaling on a Multimedia Connection Architecture", Multimedia Systems, vol. 1, No. 1, 1993, pp. 2-9.
Schooler, Eve, "A Distributed Architecture for Multimedia Conference Control", ISI Research Report, Nov. 1991, pp. 1-18.
Schütze, H., "Dimensions of Meaning", Proceedings of Supercomputing'92 Conference, Nov. 1992, 10 pages.
SCHüTZE, H., "Distributional part-of-speech tagging", EACL '95 Proceedings of the seventh conference on European chapter of the Association for Computational Linguistics, 1995, pp. 141-148.
SCHüTZE, Hinrich, "Part-of-speech induction from scratch", ACL '93 Proceedings of the 31st annual meeting on Association for Computational Linguistics, 1993, pp. 251-258.
Schwartz et al., "Context-Dependent Modeling for Acoustic-Phonetic Recognition of Continuous Speech", IEEE International Conference on Acoustics, Speech, and Signal Processing, vol. 10, Apr. 1985, pp. 1205-1208.
Schwartz et al., "Improved Hidden Markov Modeling of Phonemes for Continuous Speech Recognition", IEEE International Conference on Acoustics, Speech, and Signal Processing, vol. 9, 1984, pp. 21-24.
Schwartz et al., "The N-Best Algorithm: An Efficient and Exact Procedure for Finding the N Most Likely Sentence Hypotheses", IEEE, 1990, pp. 81-84.
Scott et al., "Designing Touch Screen Numeric Keypads: Effects of Finger Size, Key Size, and Key Spacing", Proceedings of the Human Factors and Ergonomics Society 41st Annual Meeting, Oct. 1997, pp. 360-364.
Seagrave, Jim, "A Faster Way to Search Text", EXE, vol. 5, No. 3, Aug. 1990, pp. 50-52.
Sears et al., "High Precision Touchscreens: Design Strategies and Comparisons with a Mouse", International Journal of Man-Machine Studies, vol. 34, No. 4, Apr. 1991, pp. 593-613.
Sears et al., "Investigating Touchscreen Typing: The Effect of Keyboard Size on Typing Speed", Behavior & Information Technology, vol. 12, No. 1, 1993, pp. 17-22.
Sears et al., "Touchscreen Keyboards", Apple Inc., Video Clip, Human-Computer Interaction Laboratory, on a CD, Apr. 1991.
Seehafer, Brent, "Activate google assistant on Galaxy S7 with screen off", Available online at:—"https://productforums.google.com/forum/#!topic/websearch/lp3qIGBHLVI", Mar. 8, 2017, 4 pages.
Seide et al., "Improving Speech Understanding by Incorporating Database Constraints and Dialogue History", Proceedings of Fourth International Conference on Philadelphia, 1996, pp. 1017-1020.
Selfrifge et al., "Interact: Tightly-coupling Multimodal Dialog with an Interactive Virtual Assistant", International Conference on Multimodal Interaction, ACM, Nov. 9, 2015, pp. 381-382.
Sen et al., "Indian Accent Text-to-Speech System for Web Browsing", Sadhana, vol. 27, No. 1, Feb. 2002, pp. 113-126.
Seneff et al., "A New Restaurant Guide Conversational System: Issues in Rapid Prototyping for Specialized Domains", Proceedings of Fourth International Conference on Spoken Language, vol. 2, 1996, 4 pages.
Sethy et al., "A Syllable Based Approach for Improved Recognition of Spoken Names", ITRW on Pronunciation Modeling and Lexicon Adaptation for Spoken Language Technology (PMLA2002), Sep. 14-15, 2002, pp. 30-35.
Sharoff et al., "Register-Domain Separation as a Methodology for Development of Natural Language Interfaces to Databases", Proceedings of Human-Computer Interaction (INTERACT'99), 1999, 7 pages.
Sheth et al., "Evolving Agents for Personalized Information Filtering", Proceedings of the Ninth Conference on Artificial Intelligence for Applications, Mar. 1993, 9 pages.
Sheth et al., "Relationships at the Heart of Semantic Web: Modeling, Discovering, and Exploiting Complex Semantic Relationships", Enhancing the Power of the Internet: Studies in Fuzziness and Soft Computing, Oct. 13, 2002, pp. 1-38.
Shikano et al., "Speaker Adaptation through Vector Quantization", IEEE International Conference on Acoustics, Speech and Signal Processing (ICASSP'86), vol. 11, Apr. 1986, 4 pages.
Shimazu et al., "CAPIT: Natural Language Interface Design Tool with Keyword Analyzer and Case-Based Parser", NEG Research & Development, vol. 33, No. 4, Oct. 1992, 11 pages.
Shinkle, L., "Team User's Guide", SRI International, Artificial Intelligence Center, Nov. 1984, 78 pages.
Shiraki et al., "LPC Speech Coding Based on Variable-Length Segment Quantization", (IEEE Transactions on Acoustics, Speech and Signal Processing, Sep. 1988), as reprinted in Vector Quantization (IEEE Press, 1990), 1990, pp. 250-257.

(56) References Cited

OTHER PUBLICATIONS

Shklar et al., “InfoHarness: Use of Automatically Generated Metadata for Search and Retrieval of Heterogeneous Information”, Proceedings of CAiSE’95, Finland, 1995, 14 pages.
Shneiderman, Ben, “Designing the User Interface: Strategies for Effective Human-Computer Interaction”, Second Edition, 1992, 599 pages.
Shneiderman, Ben, “Designing the User Interface: Strategies for Effective Human-Computer Interaction”, Third Edition, 1998, 669 pages.
Shneiderman, Ben, “Direct Manipulation for Comprehensible, Predictable and Controllable User Interfaces”, Proceedings of the 2nd International Conference on Intelligent User Interfaces, 1997, pp. 33-39.
Shneiderman, Ben, “Sparks of Innovation in Human-Computer Interaction”, 1993, (Table of Contents, Title Page, Ch. 4, Ch. 6 and List of References).
Shneiderman, Ben, “The Eyes Have It: A Task by Data Type Taxonomy for Information Visualizations”, IEEE Proceedings of Symposium on Visual Languages, 1996, pp. 336-343.
Shneiderman, Ben, “Touch Screens Now Offer Compelling Uses”, IEEE Software, Mar. 1991, pp. 93-94.
Shoham et al., “Efficient Bit and Allocation for an Arbitrary Set of Quantizers”, (IEEE Transactions on Acoustics, Speech, and Signal Processing, Sep. 1988) as reprinted in Vector Quantization (IEEE Press, 1990), 1990, pp. 289-296.
Sigurdsson et al., “Mel Frequency Cepstral Co-efficients: An Evaluation of Robustness of MP3 Encoded Music”, Proceedings of the 7th International Conference on Music Information Retrieval, 2006, 4 pages.
Silverman et al., “Using a Sigmoid Transformation for Improved Modeling of Phoneme Duration”, Proceedings of the IEEE International Conference on Acoustics, Speech and Signal Processing, Mar. 1999, 5 pages.
Simkovitz, Daniel, “LP-DOS Magnifies the PC Screen”, IEEE, 1992, pp. 203-204.
Simonite, Tom, “One Easy Way to Make Siri Smarter”, Technology Review, Oct. 18, 2011, 2 pages.
Singh et al., “Automatic Generation of Phone Sets and Lexical Transcriptions”, Acoustics, Speech and Signal Processing (ICASSP’00), 2000, 1 page.
Singh, N., “Unifying Heterogeneous Information Models”, Communications of the ACM, 1998, 13 pages.
Sinitsyn, Alexander, “A Synchronization Framework for Personal Mobile Servers”, Proceedings of the Second IEEE Annual Conference on Pervasive Computing and Communications Workshops, Piscataway, 2004, pp. 1, 3 and 5.
Slaney et al., “On the Importance of Time—A Temporal Representation of Sound”, Visual Representation of Speech Signals, 1993, pp. 95-116.
“SmartThings +Amazon Echo”, Smartthings Samsung [online], Available online at <https://web.archive.org/web/20160509231428/https://blog.smartthings.com/featured/alexa-turn-on-my-smartthings/>, Aug. 21, 2015, 3 pages.
Smeaton, Alan F., “Natural Language Processing and Information Retrieval”, Information Processing and Management, vol. 26, No. 1, 1990, pp. 19-20.
Smith et al., “Guidelines for Designing User Interface Software”, User Lab, Inc., Aug. 1986, pp. 1-384.
Smith et al., “Relating Distortion to Performance in Distortion Oriented Displays”, Proceedings of Sixth Australian Conference on Computer-Human Interaction, Nov. 1996, pp. 6-11.
Sony Eiicsson Corporate, “Sony Ericsson to introduce Auto pairing. TM. to Improve Bluetooth.TM. Connectivity Between Headsets and Phones”, Press Release, available at <http://www.sonyericsson.com/spg.jsp?cc=global&lc=en&ver=4001&template=pc3_1_ 1&z . . . >, Sep. 28, 2005, 2 pages.
Soong et al., “A High Quality Subband Speech Coder with Backward Adaptive Predictor and Optimal Time-Frequency Bit Assignment”, (Proceedings of the IEEE International Acoustics, Speech, and Signal Processing Conference, Apr. 1986), as reprinted in Vector Quantization (IEEE Press, 1990), 1990, pp. 316-319.
Speaker Recognition, Wikipedia, The Free Encyclopedia, Nov. 2, 2010, 4 pages.
Spiller, Karen, “Low-Decibel Earbuds Keep Noise at a Reasonable Level”, available at <http://www.nashuatelegraph.com/apps/pbcs.dll/article?Date=20060813&Cate . . . >, Aug. 13, 2006, 3 pages.
Spivack, Nova, “Sneak Preview of Siri—Part Two—Technical Foundations—Interview with Tom Gruber, CTO of Siri”, Online Available at <https://web.archive.org/web/20100114234454/http://www.twine.com/item/12vhy39k4-22m/interview-with-tom-gruber-of-siri>, Jan. 14, 2010, 5 pages.
SRI International, “The Open Agent Architecture TM 1.0 Distribution”, Open Agent Architecture (OAA), 1999, 2 pages.
SRI, “SRI Speech: Products: Software Development Kits: EduSpeak”, available at <http://web.archive.org/web/20090828084033/http://www.speechatsri.com/products/eduspeak>shtml, retrieved on Jun. 20, 2013, 2 pages.
Srinivas et al., “Monet: A Multi-Media System for Conferencing and Application Sharing in Distributed Systems”, CERC Technical Report Series Research Note, Feb. 1992.
Starr et al., “Knowledge-Intensive Query Processing”, Proceedings of the 5th KRDB Workshop, Seattle, May 31, 1998, 6 pages.
Stealth Computer Corporation, “Peripherals for Industrial Keyboards & Pointing Devices”, available at <http://www.stealthcomputer.com/peripherals_oem.htm>, retrieved on Dec. 19, 2002, 6 pages.
Steinberg, Gene, “Sonicblue Rio Car (10 GB, Reviewed: 6 GB)”, available at <http://electronics.cnet.com/electronics/0-6342420-1304-4098389.htrnl>, Dec. 12, 2000, 2 pages.
Stent et al., “Geo-Centric Language Models for Local Business Voice Search”, AT&T Labs—Research, 2009, pp. 389-396.
Stent et al., “The CommandTalk Spoken Dialogue System”, SRI International, 1999, pp. 183-190.
Stern et al., “Multiple Approaches to Robust Speech Recognition”, Proceedings of Speech and Natural Language Workshop, 1992, 6 pages.
Stickel, Mark E., “A Nonclausal Connection-Graph Resolution Theorem-Proving Program”, Proceedings of AAAI’82, 1982, 5 pages.
Stifleman, L., “Not Just Another Voice Mail System”, Proceedings of 1991 Conference, American Voice, Atlanta GA, Sep. 24-26, 1991, pp. 21-26.
Stone et al., “The Movable Filter as a User Interface Tool”, CHI ’94 Human Factors in Computing Systems, 1994, pp. 306-312.
Strom et al., “Intelligent Barge-In in Conversational Systems”, MIT laboratory for Computer Science, 2000, 4 pages.
Stuker et al., “Cross-System Adaptation and Combination for Continuous Speech Recognition: The Influence of Phoneme Set and Acoustic Front-End”, Influence of Phoneme Set and Acoustic Front-End, Interspeech, Sep. 17-21, 2006, pp. 521-524.
Su et al., “A Review of ZoomText Xtra Screen Magnification Program for Windows 95”, Journal of Visual Impairment & Blindness, Feb. 1998, pp. 116-119.
Su, Joseph C., “A Review of Telesensory’s Vista PCI Screen Magnification System”, Journal of Visual Impairment & Blindness, Oct. 1998, pp. 705, 707-710.
Sugumaran, V., “A Distributed Intelligent Agent-Based Spatial Decision Support System”, Proceedings of the Americas Conference on Information systems (AMCIS), Dec. 31, 1998, 4 pages.
Sullivan, Danny, “How Google Instant’s Autocomplete Suggestions Work”, available at <http://searchengineland.com/how-google-instant-autocomplete-suggestions-work-62592>, Apr. 6, 2011, 12 pages.
Summerfield et al., “ASIC Implementation of the Lyon Cochlea Model”, Proceedings of the 1992 International Conference on Acoustics, Speech and Signal Processing, IEEE, vol. V, 1992, pp. 673-676.
Summons to Attend Oral Proceedings received for European Patent Application No. 11707939.2, mailed on Mar. 20, 2020, 12 pages.
Summons to Attend Oral Proceedings received for European Patent Application No. 14737370.8, mailed on Jan. 21, 2019, 12 pages.
Sundaram et al., “Latent Perceptual Mapping with Data-Driven Variable-Length Acoustic Units for Template-Based Speech Recognition”, ICASSP 2012, Mar. 2012, pp. 4125-4128.

(56) References Cited

OTHER PUBLICATIONS

Sundermeyer et al., "From Feedforward to Recurrent LSTM Neural Networks for Language Modeling", IEEE Transactions to Audio, Speech, and Language Processing, 2015, vol. 23, Mar. 2015, pp. 517-529.
Sundermeyer et al., "LSTM Neural Networks for Language Modeling", INTERSPEECH 2012, ISCA's 13 Annual Conference, Sep. 9-13, 2012, pp. 194-197.
Susaki et al., "A New Decision Factor for IR System Extracted from Structure of Hypertexts", Report of Information Processing Society of Japan, JPN, vol. 99, No. 57, Jul. 16, 1999, pp. 73-80.
Sycara et al., "Coordination of Multiple Intelligent Software Agents", International Journal of Cooperative Information Systems (IJCIS), vol. 5, No. 2 & 3, 1996, 31 pages.
Sycara et al., "Distributed Intelligent Agents", IEEE Expert, vol. 11, No. 6, Dec. 1996, 32 pages.
Sycara et al., "Dynamic Service Matchmaking among Agents in Open Information Environments", SIGMOD Record, 1999, 7 pages.
Sycara et al., "The RETSINA MAS Infrastructure", Autonomous Agents and Multi-Agent Systems, vol. 7, 2003, 20 pages.
T3 Magazine, "Creative MuVo TX 256MB", available at <http://www.t3.co.uk/reviews/entertainment/mp3_player/creative_muvo_tx_256mb>, Aug. 17, 2004, 1 page.
Tanaka, Tatsuo, "Next Generation IT Channel Strategy Through "Experience Technology"", Intellectual Resource Creation, Japan, Nomura Research Institute Ltd. vol. 19, No. 1, Dec. 20, 2010, 17 pages.
TAOS, "TAOS, Inc. Announces Industry's First Ambient Light Sensor to Convert Light Intensity to Digital Signals", News Release, available at <http://www.taosinc.com/presssrelease_090902.htm>, Sep. 16, 2002, 3 pages.
Tatsuya et al., "Open-Source Speech Recognition Software Julius", Journal of Japanese Society for Artificial Intelligence, vol. 20, No. 1, Jan. 2005, pp. 41-49.
Taylor et al., "Speech Synthesis by Phonological Structure Matching", International Speech Communication Association, vol. 2, Section 3, 1999, 4 pages.
Tello, Ernest R., "Natural-Language Systems", Mastering AI Tools and Techniques, Howard W. Sams & Company, 1988, pp. 25-64.
Tenenbaum et al., "Data Structure Using Pascal", Prentice-Hall, Inc., 1981, 34 pages.
Textndrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.
TG3 Electronics, Inc., "BL82 Series Backlit Keyboards", available at <http://www.tg3electronics.com/products/backlit/backlit.htm>, retrieved on Dec. 19, 2002, 2 pages.
The HP 150, "Hardware: Compact, Powerful, and Innovative", vol. 8, No. 10, Oct. 1983, pp. 36-50.
"The world of Virtual Assistants—more SemTech . . . ", End of Business as Usual—Glenn's External blog, Online Available at <https://web.archive.org/web/20091101840940/http://glennas.wordpress.com/2009/10/17/the-world-of-virtual-assistants-more-semtech/>, Oct. 17, 2009, 5 pages.
Tidwell, Jenifer, "Animated Transition", Designing Interfaces, Patterns for effective Interaction Design, Nov. 2005, First Edition, 4 pages.
Tofel, Kevin C., "SpeakTolt: A Personal Assistant for Older iPhones, iPads", Apple News, Tips and Reviews, Feb. 9, 2012, 7 pages.
Tombros et al., "Users' Perception of Relevance of Spoken Documents", Journal of the American Society for Information Science, New York, Aug. 2000, pp. 929-939.
Tomita et al., "Multi-database Searching System Based on WWW: WebSENA", NTT Technology Journal, JPN, vol. 10, No. 5 (serial No. 100), 1998, pp. 55-58.
Top 10 Best Practices for Voice User Interface Design available at <http://www.developer.com/voice/article.php/1567051/Top-10-Best-Practices-for-Voice-UserInterface-Design.htm>, Nov. 1, 2002, 4 pages.
Touch, Joseph, "Zoned Analog Personal Teleconferencing", USC / Information Sciences Institute, 1993, pp. 1-19.
Toutanova et al., "Feature-Rich Part-of-Speech Tagging with a Cyclic Dependency Network", Computer Science Dept., Stanford University, Stanford CA 94305-9040, 2003, 8 pages.
Trigg et al., "Hypertext Habitats: Experiences of Writers in NoteCards", Hypertext '87 Papers; Intelligent Systems Laboratory, Xerox Palo Alto Research Center, 1987, pp. 89-108.
Trowbridge, David, "Using Andrew for Development of Educational Applications", Center for Design of Educational Computing, Carnegie-Mellon University (CMU-ITC-85-065), Jun. 2, 1985, pp. 1-6.
Tsai et al., "Attributed Grammar—A Tool for Combining Syntactic and Statistical Approaches to Pattern Recognition", IEEE Transactions on Systems, Man and Cybernetics, vol. SMC-10, No. 12, Dec. 1980, 13 pages.
Tsao et al., "Matrix Quantizer Design for LPC Speech Using the Generalized Lloyd Algorithm", (IEEE Transactions on Acoustics, Speech and Signal Processing, Jun. 1985), as reprinted in Vector Quantization (IEEE Press, 1990), 1990, pp. 237-245.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Turletti, Thierry, "The INRIA Videoconferencing System (IVS)", Oct. 1994, pp. 1-7.
Tyson et al., "Domain-Independent Task Specification in the TACITUS Natural Language System", SRI International, Artificial Intelligence Center, May 1990, 16 pages.
Udell, J., "Computer Telephony", Byte, vol. 19, No. 7, Jul. 1994, 9 pages.
Ushida et al., "Spoken Dialogue Engine based on Autonomous Behavior Decision Model", Omron Technics, vol. 40, No. 1, 2000, pp. 16-21.
Uslan et al., "A Review of Henter-Joyce's MAGic for Windows NT", Journal of Visual Impairment and Blindness, Dec. 1999, pp. 666-668.
Uslan et al., "A Review of Supernova Screen Magnification Program for Windows", Journal of Visual Impairment & Blindness, Feb. 1999, pp. 108-110.
Uslan et al., "A Review of Two Screen Magnification Programs for Windows 95: Magnum 95 and LP-Windows", Journal of Visual Impairment & Blindness, Sep.-Oct. 1997, pp. 9-13.
Van Santen, J. P.H., "Contextual Effects on Vowel Duration", Journal Speech Communication, vol. 11, No. 6, Dec. 1992, pp. 513-546.
Veiga, Alex, "AT&T Wireless Launching Music Service", available at <http://bizyahoo.com/ap/041005/at_t_mobile_music_5.html?printer=1>, Oct. 5, 2004, 2 pages.
Vepa et al., "New Objective Distance Measures for Spectral Discontinuities in Concatenative Speech Synthesis", Proceedings of the IEEE 2002 Workshop on Speech Synthesis, 2002, 4 pages.
Verschelde, Jan, "MATLAB Lecture 8. Special Matrices in MATLAB", UIC, Dept. of Math, Stat. & CS, MCS 320, Introduction to Symbolic Computation, 2007, 4 pages.
Viegas et al., "Chat Circles", SIGCHI Conference on Human Factors in Computing Systems, May 15-20, 1999, pp. 9-16.
Vingron, Martin, "Near-Optimal Sequence Alignment", Current Opinion in Structural Biology, vol. 6, No. 3, 1996, pp. 346-352.
Vlingo InCar, "Distracted Driving Solution with Vlingo InCar", YouTube Video, Available online at <http://www.youtube.com/watch?v=Vqs8XfXxgz4>, Oct. 2010, 2 pages.
Vlingo, "Vlingo Launches Voice Enablement Application on Apple App Store", Press Release, Dec. 3, 2008, 2 pages.
Vodafone Deutschland, "Samsung Galaxy S3 Tastatur Spracheingabe", Available online at—"https://www.youtube.com/watch?v=6kOd6Gr8uFE", Aug. 22, 2012, 1 page.

(56) References Cited

OTHER PUBLICATIONS

Vogel et al., "Shift: A Technique for Operating Pen-Based Interfaces Using Touch", CHI '07 Proceedings, Mobile Interaction Techniques I, Apr. 28-May 3, 2007, pp. 657-666.
Voiceassist, "Send Text, Listen to and Send E-Mail by Voice", YouTube Video, Available online at <http://www.youtube.com/watch?v=0tEU61nHHA4>, Jul. 30, 2009, 1 page.
Voiceonthego, "Voice on the Go (BlackBerry)", YouTube Video, available online at <http://www.youtube.com/watch?v=pJqpWgQS98w>, Jul. 27, 2009, 1 page.
W3C Working Draft, "Speech Synthesis Markup Language Specification for the Speech Interface Framework", available at <http://www.w3org./TR/speech-synthesis>, retrieved on Dec. 14, 2000, 42 pages.
Wadlow, M. G., "The Role of Human Interface Guidelines in the Design of Multimedia Applications", Carnegie Mellon University (To be Published in Current Psychology: Research and Reviews, Summer 1990 (CMU-ITC-91-101), 1990, pp. 1-22.
Wahlster et al., "Smartkom: Multimodal Communication with a Life-Like Character", Eurospeech-Scandinavia, 7th European Conference on Speech Communication and Technology, 2001, 5 pages.
Waibel, Alex, "Interactive Translation of Conversational Speech", Computer, vol. 29, No. 7, Jul. 1996, pp. 41-48.
Waldinger et al., "Deductive Question Answering from Multiple Resources", New Directions in Question Answering, Published by AAAI, Menlo Park, 2003, 22 pages.
Walker et al., "Natural Language Access to Medical Text", SRI International, Artificial Intelligence Center, Mar. 1981, 23 pages.
Walker et al., "The Locus Distributed Operating System 1", University of California Los Angeles, 1983, pp. 49-70.
Waltz, D., "An English Language Question Answering System for a Large Relational Database", ACM, vol. 21, No. 7, 1978, 14 pages.
Wang et al., "An Industrial-Strength Audio Search Algorithm", In Proceedings of the International Conference on Music Information Retrieval (ISMIR), 2003, 7 pages.
Wang et al., "An Initial Study on Large Vocabulary Continuous Mandarin Speech Recognition with Limited Training Data Based on Sub-Syllabic Models", International Computer Symposium, vol. 2, 1994, pp. 1140-1145.
Wang et al., "Tone Recognition of Continuous Mandarin Speech Based on Hidden Markov Model", International Journal of Pattern Recognition and Artificial Intelligence, vol. 8, 1994, pp. 233-245.
Ward et al., "A Class Based Language Model for Speech Recognition", IEEE, 1996, 3 pages.
Ward et al., "Recent Improvements in the CMU Spoken Language Understanding System", ARPA Human Language Technology Workshop, 1994, 4 pages.
Ward, Wayne, "The CMU Air Travel Information Service: Understanding Spontaneous Speech", Proceedings of the Workshop on Speech and Natural Language, HLT '90, 1990, pp. 127-129.
Ware et al., "The DragMag Image Magnifier Prototype I", Apple Inc., Video Clip, Marlon, on a CD, Applicant is not Certain about the Date for the Video Clip., 1995.
Warren et al., "An Efficient Easily Adaptable System for Interpreting Natural Language Queries", American Journal of Computational Linguistics, vol. 8, No. 3-4, 1982, 11 pages.
Watabe et al., "Distributed Multiparty Desktop Conferencing System: MERMAID", CSCW 90 Proceedings, Oct. 1990, pp. 27-38.
Weizenbaum, J., "Eliza—A Computer Program for the Study of Natural Language Communication Between Man and Machine", Communications of the ACM, vol. 9, No. 1, Jan. 1966, 10 pages.
Werner et al., "Prosodic Aspects of Speech, Universite de Lausanne", Fundamentals of Speech Synthesis and Speech Recognition: Basic Concepts, State of the Art and Future Challenges, 1994, 18 pages.
Westerman, Wayne, "Hand Tracking, Finger Identification and Chordic Manipulation on a Multi-Touch Surface", Doctoral Dissertation, 1999, 363 Pages.
"What is Fuzzy Logic?", Available at <http://www.cs.cmu.edu>, retrieved on Apr. 15, 1993, 5 pages.
White, George M., "Speech Recognition, Neural Nets, and Brains", Jan. 1992, pp. 1-48.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 3 pages.
Wikipedia, "Siri", Available at: URL: <https://en.wikipedia.orgjwjindex.php?title=Siri&oldid>, Nov. 8, 2015, 13 pages.
Wikipedia, "Speech Recognition", available at: <http://en.wikipedia.org/wiki/Speech_recognition>, retrieved on Sep. 14, 2011, 10 pages.
Wikipedia, "Virtual Assistant", Wikipedia, Online Available at: <https://en.wikipedia.orgjwjindex.php?title=Virtual_assistant&oldid=679330666>, Sep. 3, 2015, 4 pages.
Wikipedia, "Home Automation", Available at: https://en.wikipedia.org/w/index.php?titie= Home_automation&oldid, Oct. 19, 2015, 9 pages.
Wilensky et al., "Talking to UNIX in English: An Overview of UC", Communications of the ACM, vol. 27, No. 6, Jun. 1984, pp. 574-593.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 13 pages.
Windows XP: A Big Surprise!—Experiencing Amazement from Windows XP, New Computer, No. 2, Feb. 28, 2002, 8 pages.
Winiwarter et al., "Adaptive Natural Language Interfaces to FAQ Knowledge Bases", Proceedings of 4th International Conference on Applications of Natural Language to Information Systems, Austria, Jun. 1999, 22 pages.
Wirelessinfo, "SMS/MMS Ease of Use (8.0)", available at <http://www.wirelessinfo.com/content/palm-Treo-750-Cell-Phone-Review/Messaging.htm>, Mar. 2007, 3 pages.
Wolff, M., "Post Structuralism and the Artful Database: Some Theoretical Considerations", Information Technology and Libraries, vol. 13, No. 1, Mar. 1994, 10 pages.
Wong et al., "An 800 Bit/s Vector Quantization LPC Vocoder", (IEEE Transactions on Acoustics, Speech and Signal Processing, Oct. 1982), as reprinted in Vector Quantization (IEEE Press, 1990), 1990, pp. 222-232.
Wong et al., "Very Low Data Rate Speech Compression with LPC Vector and Matrix Quantization", (Proceedings of the IEEE Int'l Acoustics, Speech and Signal Processing Conference, Apr. 1983), as reprinted in Vector Quantization (IEEE Press, 1990), 1990, pp. 233-236.
Worldwide Character Encoding, Version 2.0, vols. 1,2 by Unicode, Inc., 12 pages.
Written Opinion received for PCT Patent Application No. PCT/US2005/046797, mailed on Nov. 24, 2006, 9 pages.
Wu et al., "Automatic Generation of Synthesis Units and Prosodic Information for Chinese Concatenative Synthesis", Speech Communication, vol. 35, No. 3-4, Oct. 2001, pp. 219-237.
Wu et al., "KDA: A Knowledge-Based Database Assistant", Proceeding of the Fifth International Conference on Engineering (IEEE Cat.No. 89CH2695-5), 1989, 8 pages.
Wu, M., "Digital Speech Processing and Coding", Multimedia Signal Processing, Lecture-2 Course Presentation, University of Maryland, College Park, 2003, 8 pages.
Wu, M., "Speech Recognition, Synthesis, and H.C.I.", Multimedia Signal Processing, Lecture-3 Course Presentation, University of Maryland, College Park, 2003, 11 pages.
Wyle, M. F., "A Wide Area Network Information Filter", Proceedings of First International Conference on Artificial Intelligence on Wall Street, Oct. 1991, 6 pages.
x.ai, "How it Works", Available online at: https://web.archive.org/web/20160531201426/https://x.ai/how-it-works/, May 31, 2016, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.

(56) References Cited

OTHER PUBLICATIONS

Xu, Yuhong, "Policy optimization of dialogue management in spoken dialogue system for out-of-domain utterances", 2016 International Conference on Asian Language Processing (IALP), IEEE, Nov. 21, 2016, pp. 10-13.
Yan et al., "A Scalable Approach to Using DNN-Derived Features in GMM-HMM Based Acoustic Modeling for LVCSR", InInterspeech, 2013, pp. 104-108.
Yang et al., "Auditory Representations of Acoustic Signals", IEEE Transactions of Information Theory, vol. 38, No. 2, Mar. 1992, pp. 824-839.
Yang et al., "Hidden Markov Model for Mandarin Lexical Tone Recognition", IEEE Transactions on Acoustics, Speech and Signal Processing, vol. 36, No. 7, Jul. 1988, pp. 988-992.
Yang et al., "Smart Sight: A Tourist Assistant System", Proceedings of Third International Symposium on Wearable Computers, 1999, 6 pages.
Yankelovich et al., "Intermedia: The Concept and the Construction of a Seamless Information Environment", Computer Magazine, IEEE, Jan. 1988, 16 pages.
Yates, Michael C., "How can I exit Google Assistant after i'm finished with it", Available online at:—"https://productforums.google.com/forum/#!msg/phone-by-google/faECnR2RJwA/gKNtOkQgAQAJ", Jan. 11, 2016, 2 pages.
Yiourgalis et al., "Text-to-Speech system for Greek", ICASSP 91, vol. 1, May 14-17, 1991, pp. 525-528.
Yoon et al., "Letter-to-Sound Rules for Korean", Department of Linguistics, The Ohio State University, 2002, 4 pages.
Young et al, "The HTK Book", Version 3.4, Dec. 2006, 368 pages.
Young et al., "The Hidden Information State model: A practical framework for POMDP-based spoken dialogue management", Computer Speech & Language, vol. 24, Issue 2, 2010, pp. 150-174.
Youtube, "New bar search for Facebook", Available at "https://www.youtube.com/watch?v=vwgN1WbvCas", 1 page.
Yunker, John, "Beyond Borders: Web Globalization Strategies", New Riders, Aug. 22, 2002, 11 pages.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zangerle et al., "Recommending #-Tag in Twitter", Proceedings of the Workshop on Semantic Adaptive Socail Web, 2011, pp. 1-12.
Zelig, "A Review of the Palm Treo 750v", available at <http://www.mtekk.com.au/Articles/tabid/54/articleType/ArticleView/articleId/769/A-Review-of-the-Palm-Treo-750v.aspx>, Feb. 5, 2007, 3 pages.
Zeng et al., "Cooperative Intelligent Software Agents", The Robotics Institute, Carnegie-Mellon University, Mar. 1995, 13 pages.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Zhao et al., "Intelligent Agents for Flexible Workflow Systems", Proceedings of the Americas Conference on Information Systems (AMCIS), Oct. 1998, 4 pages.
Zhao, Y., "An Acoustic-Phonetic-Based Speaker Adaptation Technique for Improving Speaker-Independent Continuous Speech Recognition", IEEE Transactions on Speech and Audio Processing, vol. 2, No. 3, Jul. 1994, pp. 380-394.
Zhong et al., "JustSpeak: Enabling Universal Voice Control on Android", W4A'14, Proceedings of the 11th Web for All Conference, No. 36, Apr. 7-9, 2014, 8 pages.
Ziegler, K, "A Distributed Information System Study", IBM Systems Journal, vol. 18, No. 3, 1979, pp. 374-401.
Zipnick et al., "U.S. Appl. No. 10/859,661, filed Jun. 2, 2004".
Zovato et al., "Towards Emotional Speech Synthesis: A Rule based Approach", Proceedings of 5th ISCA Speech Synthesis Workshop—Pittsburgh, 2004, pp. 219-220.
Zue et al., "From Interface to Content: Translingual Access and Delivery of On-Line Information", Eurospeech, 1997, 4 pages.
Zue et al., "Jupiter: A Telephone-Based Conversational Interface for Weather Information", IEEE Transactions on Speech and Audio Processing, Jan. 2000, 13 pages.
Zue et al., "Pegasus: A Spoken Dialogue Interface for On-Line Air Travel Planning", Speech Communication, vol. 15, 1994, 10 pages.
Zue et al., "The Voyager Speech Understanding System: Preliminary Development and Evaluation", Proceedings of IEEE, International Conference on Acoustics, Speech and Signal Processing, 1990, 4 pages.
Zue, Victor W., "Toward Systems that Understand Spoken Language", ARPA Strategic Computing Institute, Feb. 1994, 9 pages.
Zue, Victor, "Conversational Interfaces: Advances and Challenges", Spoken Language System Group, Sep. 1997, 10 pages.
Board Opinion received for Chinese Patent Application No. 201480030811.4, mailed on May 13, 2020, 23 pages (1 page of English Translation and 22 pages of Official Copy).
Notice of Allowance received for Korean Patent Application No. 10-2020-7008719, mailed on Jun. 17, 2020, 5 pages (2 pages of English Translation and 3 pages of Official Copy).
Supplemental Notice of Allowance received for U.S. Appl. No. 15/394,162, mailed on Apr. 9, 2020, 2 pages.
Result of Consultation received for European Patent Application No. 11707939.2, mailed on Aug. 19, 2020, 4 pages.
Decision to Refuse received for European Patent Application No. 11707939.2, mailed on Dec. 16, 2020, 31 pages.
Minutes of the Oral Proceedings received for European Patent Application No. 11707939.2, mailed on Dec. 15, 2020, 9 pages.
Office Action received for Brazilian Patent Application No. BR122012028972-8, mailed on Sep. 4, 2020, 6 pages (1 page of English Translation and 5 pages of Official Copy).
Office Action received for Japanese Patent Application No. 2018-050944, mailed on Sep. 11, 2020, 4 pages (2 pages of English Translation and 2 pages of Official Copy).
Notice of Allowance received for Japanese Patent Application No. 2018-050944, mailed on Dec. 22, 2020, 4 pages (1 page of English Translation and 3 pages of Official Copy).
Office Action received for Australian Patent Application No. 2019283968, mailed on Jul. 24, 2020, 3 pages.
Aaaaplay, "Sony Media Remote for iOS and Android", Online available at: <https://www.youtube.com/watch?v=W8QoeQhIGok>, Feb. 4, 2012, 3 pages.
Android Authority, "How to use Tasker: A Beginner's Guide", Online available at:—<https://youtube.com/watch?v= rDpdS_YWzFc>, May 1, 2013, 1 page.
Automate Your Life, "How to Setup Google Home Routines—A Google Home Routines Walkthrough", Online Available at: <https://www.youtube.com/watch?v=pXokZHP9kZg>, Aug. 12, 2018, 1 page.
Bell, Jason, "Machine Learning Hands-On for Developers and Technical Professionals", Wiley, 2014, 82 pages.
Bellegarda, Jeromer, "Spoken Language Understanding for Natural Interaction: The Siri Experience", Slideshow retrieved from : <https://www.uni-ulm.de/fileadmin/website_uni_ulm/iui.iwsds2012/files/Bellegarda.pdf>, International Workshop on Spoken Dialog Systems (IWSDS), May 2012, pp. 1-43.
beointegration.com, "BeoLink Gateway-Programming Example", Online Available at: <https:/ /www.youtube.com/watch?v=TXDaJFm5UH4>, Mar. 4, 2015, 3 pages.
Burgess, Brian, "Amazon Echo Tip: Enable the Wake up Sound", Online available at:—<https://www.groovypost.com/howto/amazon-echo-tip-enable-wake-up-sound/>, Jun. 30, 2015, 4 pages.
Chang et al., "Monaural Multi-Talker Speech Recognition with Attention Mechanism and Gated Convolutional Networks", Interspeech 2018, Sep. 2-6, 2018, pp. 1586-1590.
Chen et al., "A Convolutional Neural Network with Dynamic Correlation Pooling", 13th International Conference on Computational Intelligence and Security, IEEE, 2017, pp. 496-499.
Chen, Yi, "Multimedia Siri Finds and Plays Whatever You Ask for", PSFK Report, Feb. 9, 2012, pp. 1-9.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.

(56) References Cited

OTHER PUBLICATIONS

Coulouris et al., "Distributed Systems: Concepts and Design (Fifth Edition)", Addison-Wesley, 2012, 391 pages.
Czech Lucas, "A System for Recognizing Natural Spelling of English Words", Diploma Thesis, Karlsruhe Institute of Technology, May 7, 2014, 107 pages.
Delcroix et al., "Context Adaptive Deep Neural Networks for Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
Derrick, Amanda, "How to Set up Google Home for Multiple Users", Lifewire, Online available at:—<https://www.lifewire.com/set-up-google-home-multiple-users-4685691>, Jun. 8, 2020, 9 pages.
Detroitborg, "Apple Remote App (iPhone & iPod Touch): Tutorial and Demo", Online Available at:—<https://www.youtube.com/watch?v=M_jzeEevKql>, Oct. 13, 2010, 4 pages.
Dihelson, "How Can I Use Voice or Phrases as Triggers to Macrodroid?", Macrodroid Forums, Online Available at:—<https://www.tapatalk.com/groups/macrodroid/how-can-i-use-voice-or-phrases-as-triggers-to-macr-t4845.html>, May 9, 2018, 5 pages.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Gadget Hacks, "Tasker Too Complicated? Give MacroDroid a Try [How-To]", Online available at: <https://www.youtube.com/watch?v=8YL9cWCykKc>, May 27, 2016, 1 page.
Gasic et al., "Effective Handling of Dialogue State in the Hidden Information State POMDP-based Dialogue Manager", ACM Transactions on Speech and Language Processing, May 2011, pp. 1-25.
Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Gupta et al., "I-vector-based Speaker Adaptation of Deep Neural Networks for French Broadcast Audio Transcription", ICASSP, 2014, 2014, pp. 6334-6338.
Gupta, Naresh, "Inside Bluetooth Low Energy", Artech House, 2013, 274 pages.
Hershey et al., "Deep Clustering: Discriminative Embeddings for Segmentation and Separation", Proc. ICASSP, Mar. 2016, 6 pages.
Hutsko et al., "iPhone All-in-One for Dummies", 3rd Edition, 2013, 98 pages.
Ikeda, Masaru, "beGLOBAL Seoul 2015 Startup Battle: Talkey", YouTube Publisher, Online Available at:—<https://www.youtube.com/watch?v=4Wkp7sAAldg>, May 14, 2015, 1 page.
Internet Services and Social Net, "How to Search for Similar Websites", Online available at:—<https://www.youtube.com/watch?v=nLf2uirpt5s>, see from 0:17 to 1:06, Jul. 4, 2013, 1 page.
"IPhone 6 Smart Guide Full Version for SoftBank", Gijutsu-Hyohron Co., Ltd., vol. 1, Dec. 1, 2014, 4 pages (Official Copy Only). {See communication under 37 CFR § 1.98(a) (3)}.
Isik et al., "Single-Channel Multi-Speaker Separation using Deep Clustering", Interspeech 2016, Sep. 8-12, 2016, pp. 545-549.
Kastrenakes, Jacob, "Siri's creators will unveil their new AI bot on Monday", The Verge, Online available at:—<https://web.archive.org/web/20160505090418/https://www.theverge.com/2016/5/4/11593564/viv-labs-unveiling-monday-new-ai-from-siri-creators>, May 4, 2016, 3 pages.
King et al., "Robust Speech Recognition via Anchor Word Representations", Interspeech 2017, Aug. 20-24, 2017, pp. 2471-2475.
Lee, Sungjin, "Structured Discriminative Model for Dialog State Tracking", Proceedings of the SIGDIAL 2013 Conference, Aug. 22-24, 2013, pp. 442-451.
"Link Your Voice to Your Devices with Voice Match, Google Assistant Help", Online available at:—<https://support.google.com/assistant/answer/9071681?co=GENIE.Platform%3DAndroid&hl=en>, Retrieved on Jul. 1, 2020, 2 pages.
Liu et al., "Accurate Endpointing with Expected Pause Duration", Sep. 6-10, 2015, pp. 2912-2916.
Loukides et al., "What Is the Internet of Things?", O'Reilly Media, Inc., Online Available at: <https://www.oreilly.com/library/view/what-is-the/9781491975633/>, 2015, 31 pages.
Luo et al., "Speaker-Independent Speech Separation With Deep Attractor Network", IEEE/ACM Transactions on Audio, Speech, and Language Processing, vol. 26, No. 4, Apr. 2018, pp. 787-796.
Malcangi Mario, "Text-driven Avatars Based on Artificial Neural Networks and Fuzzy Logic", International Journal of Computers, vol. 4, No. 2, Dec. 31, 2010, pp. 61-69.
Modern Techies,"Braina—Artificial Personal Assistant for PC(like Cortana,Siri)!!!!", Online available at: <https://www.youtube.com/watch?v=_Coo2P8ilqQ>, Feb. 24, 2017, 3 pages.
Nakamura et al., "Realization of a Browser to Filter Spoilers Dynamically", vol. No. 67, 2010, 8 pages (Official Copy Only). {See communication under 37 CFR § 1.98(a) (3)}.
Nakamura et al., "Study of Information Clouding Methods to Prevent Spoilers of Sports Match", Proceedings of the International Working Conference on Advanced Visual Interfaces (AVI' 12), ISBN: 978-1-4503-1287-5, May 2012, pp. 661-664.
Nakamura et al., "Study of Methods to Diminish Spoilers of Sports Match: Potential of a Novel Concept "Information Clouding"", vol. 54, No. 4, ISSN: 1882-7764. Online available at: <https://ipsj.ixsq.nii.ac.jp/ej/index.php?active_action=repository_view_main_item_detail&page_id=13&block_id=8&item_id=91589&item_no=1>, Apr. 2013, pp. 1402-1412 (Official Copy Only). {See communication under 37 CFR § 1.98(a) (3)}.
Nakamura Satoshi, "Antispoiler : An Web Browser to Filter Spoiler", vol. 2010-HCL-139 No.17, Online available at:—<https://ipsj.ixsq.nii.ac.jp/ej/index.php?active_action=repository_view_main_item_detail&page_id=13&block_id=8&item_id=70067&item_no=1>, Jul. 31, 2010, 8 pages (Official Copy Only). {See communication under 37 CFR § 1.98(a) (3)}.
Office Action received for Brazilian Patent Application No. BR122012028965-5, mailed on Oct. 9, 2020, 5 pages (2 pages of English Translation and 3 pages of Official Copy).
Office Action received for Brazilian Patent Application No. BR122012028966-3, mailed on Oct. 9, 2020, 5 pages (2 pages of English Translation and 3 pages of Official Copy).
Office Action received for Brazilian Patent Application No. BR122012028968-0, mailed on Oct. 9, 2020, 5 pages (2 pages of English Translation and 3 pages of Official Copy).
Office Action received for Brazilian Patent Application No. BR122012028970-1, mailed on Oct. 9, 2020, 5 pages (2 pages of English Translation and 3 pages of Official Copy).
Office Action received for Brazilian Patent Application No. BR122012028971-0, mailed on Oct. 9, 2020, 5 pages (2 pages of English Translation and 3 pages of Official Copy).
Office Action received for Brazilian Patent Application No. BR122012028973-6, mailed on Oct. 9, 2020, 5 pages (2 pages of English Translation and 3 pages of Official Copy).
Office Action received for Brazilian Patent Application No. BR122012028974-4, mailed on Oct. 9, 2020, 5 pages (2 pages of English Translation and 3 pages of Official Copy).
Office Action received for Korean Patent Application No. 10-2020-7023927, mailed on Nov. 18, 2020, 10 pages (4 pages of English Translation and 6 pages of Official Copy).
Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.
PC Mag, "How to Voice Train Your Google Home Smart Speaker", Online available at: <https://in.pcmag.com/google-home/126520/how-to-voice-train-your-google-home-smart-speaker>, Oct. 25, 2018, 12 pages.
"*Phoenix Solutions, Inc.* v. *West Interactive Corp*.", Document 40, Declaration of Christopher Schmandt Regarding the MIT Galaxy System, Jul. 2, 2010, 162 pages.
pocketables.com,"AutoRemote example profile", Online available at: https://www.youtube.com/watch?v=kC_zhUnNZj8, Jun. 25, 2013, 1 page.

(56) References Cited

OTHER PUBLICATIONS

Qian et al., "Single-channel Multi-talker Speech Recognition With Permutation Invariant Training", Speech Communication, Issue 104, 2018, pp. 1-11.
Rasch, Katharina, "Smart Assistants for Smart Homes", Doctoral Thesis in Electronic and Computer Systems, 2013, 150 pages.
Ritchie, Rene, "QuickType keyboard in iOS 8: Explained", Online Available at:—<https://www.imore.com/quicktype-keyboards-ios-8-explained>, Jun. 21, 2014, pp. 1-19.
Rowland et al., "Designing Connected Products: UX for the Consumer Internet of Things", O'Reilly, May 2015, 452 pages.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Senior et al., "Improving DNN Speaker Independence With I-Vector Inputs", ICASSP, 2014, pp. 225-229.
Seroter et al., "SOA Patterns with BizTalk Server 2013 and Microsoft Azure", Packt Publishing, Jun. 2015, 454 pages.
Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Siou, Serge, "How to Control Apple TV 3rd Generation Using Remote app", Online available at: <https://www.youtube.com/watch?v=PhyKftZ0S9M>, May 12, 2014, 3 pages.
"Skilled at Playing my iPhone 5", Beijing Hope Electronic Press, Jan. 2013, 6 pages (Official Copy Only). {See communication under 37 CFR § 1.98(a) (3)}.
Smith, Jake, "Amazon Alexa Calling: How to Set it up and Use it on Your Echo", iGeneration, May 30, 2017, 5 pages.
Tan et al., "Knowledge Transfer in Permutation Invariant Training for Single-channel Multi-talker Speech Recognition", ICASSP 2018, 2018, pp. 5714-5718.
Vaswani et al., "Attention Is All You Need", 31st Conference on Neural Information Processing Systems (NIPS 2017), 2017, pp. 1-11.
Villemure et al., "The Dragon Drive Innovation Showcase: Advancing the State-of-the-art in Automotive Assistants", 2018, 7 pages.
Wang et al., "End-to-end Anchored Speech Recognition", Proc. ICASSP2019, May 12-17, 2019, 5 pages.
Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.
Yang Astor, "Control Android TV via Mobile Phone APP RKRemoteControl", Online Available at : <https://www.youtube.com/watch?v=zpmUeOX_xro>, Mar. 31, 2015, 4 pages.
Ye et al., "iPhone 4S Native Secret", Jun. 30, 2012, 1 page (Official Copy Only). {See communication under 37 CFR § 1.98(a) (3)}.
Yeh Jui-Feng, "Speech Act Identification Using Semantic Dependency Graphs with Probabilistic Context-free Grammars", ACM Transactions on Asian and Low-Resource Language Information Processing, vol. 15, No. 1, Dec. 2015, pp. 5.1-5.28.
Yousef, Zulfikara., "Braina (A.I) Artificial Intelligence Virtual Personal Assistant", Online available at:—<https://www.youtube.com/watch?v=2h6xpB8bPSA>, Feb. 7, 2017, 3 pages.
Yu et al., "Permutation Invariant Training of Deep Models for Speaker-Independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zhan et al., "Play with Android Phones", Feb. 29, 2012, 1 page (Official Copy Only). {See communication under 37 CFR § 1.98(a) (3)}.
Zmolikova et al., "Speaker-Aware Neural Network Based Beamformer for Speaker Extraction in Speech Mixtures", Interspeech 2017, Aug. 20-24, 2017, pp. 2655-2659.
Brief Communication received for European Patent Application No. 11707939.2, mailed on Oct. 9, 2020, 18 pages.
Notice of Allowance received for Korean Patent Application No. 10-2019-7018332, mailed on Sep. 28, 2020, 7 pages (2 pages of English Translation and 5 pages of Official Copy).
Office Action received for Australian Patent Application No. 2019283923, mailed on Sep. 25, 2020, 4 pages.
Notice of Acceptance received for Australian Patent Application No. 2019283968, mailed on Jan. 25, 2021, 3 pages.
Notice of Allowance received for Brazilian Patent Application No. BR122012028968-0, mailed on Jan. 19, 2021, 3 pages (1 page of English Translation and 2 pages of Official Copy).
Notice of Allowance received for Brazilian Patent Application No. BR122012028970-1, mailed on Jan. 19, 2021, 2 pages (1 page of English Translation and 1 page of Official Copy).
Office Action received for Korean Patent Application No. 10-2020-7037138, mailed on Jan. 21, 2021, 13 pages (6 pages of English Translation and 7 pages of Official Copy).
Notice of Allowance received for Brazilian Patent Application No. 112012017826-1, mailed on Oct. 20, 2020, 2 pages (1 page of English Translation and 1 page of Official Copy).
Notice of Allowance received for Brazilian Patent Application No. BR122012028969-8, mailed on Oct. 20, 2020, 3 pages (1 page of English Translation and 2 pages of Official Copy).
Board Decision received for Chinese Patent Application No. 201480030811.4, mailed on Feb. 1, 2021, 44 pages (2 pages of English Translation and 42 pages of Official Copy).
Notice of Allowance received for Brazilian Patent Application No. BR122012028965-5, mailed on Jan. 19, 2021, 2 pages (1 page of English Translation and 1 page of Official Copy).
Notice of Allowance received for Brazilian Patent Application No. BR122012028966-3, mailed on Jan. 26, 2021, 2 pages (1 page of English Translation and 1 page of Official Copy).
Notice of Allowance received for Brazilian Patent Application No. BR122012028971-0, mailed on Jan. 26, 2021, 3 pages (1 page of English Translation and 2 pages of Official Copy).
Notice of Allowance received for Brazilian Patent Application No. BR122012028972-8, mailed on Jan. 26, 2021, 2 pages (1 page of English Translation and 1 page of Official Copy).
Notice of Allowance received for Brazilian Patent Application No. BR122012028973-6, mailed on Jan. 26, 2021, 2 pages (1 page of English Translation and 1 page of Official Copy).
Notice of Allowance received for Brazilian Patent Application No. BR122012028974-4, mailed on Jan. 26, 2021, 3 pages (1 page of English Translation and 2 pages of Official Copy).
Brief Communication Regarding Oral Proceedings received for European Patent Application No. 16188272.5, mailed on Dec. 2, 2021, 1 page.
Decision to Refuse received for European Patent Application No. 16188272.5, mailed on Dec. 9, 2021, 2 pages.
Final Office Action received for U.S. Appl. No. 16/879,643, mailed on Dec. 15, 2021, 14 pages.
Intention to Grant received for Indian Patent Application No. 6734CHENP2012, mailed on Feb. 15, 2022, 2 pages.
Office Action received for Mexican Patent Application No. MX/a/2017/006911, mailed on Feb. 22, 2022, 12 pages (5 pages of English Translation and 7 pages of Official Copy).
Office Action received for European Patent Application No. 19195766.1, mailed on Jan. 3, 2022, 11 pages.
Brief Communication Regarding Oral Proceedings received for European Patent Application No. 16188272.5, mailed on Oct. 19, 2021, 2 pages.
Summons to Attend Oral Proceedings received for European Patent Application No. 16188272.5, mailed on Oct. 26, 2021, 11 pages.
Office Action received for Australian Patent Application No. 2020257070, mailed on May 23, 2022, 2 pages.
Supplemental Notice of Allowance received for U.S. Appl. No. 16/879,643, mailed on Jun. 2, 2022, 2 pages.
Supplemental Notice of Allowance received for U.S. Appl. No. 16/879,643, mailed on May 20, 2022, 2 pages.
Notice of Allowance received for Korean Patent Application No. 10-2022-7020185, mailed on Feb. 23, 2023, 7 pages (2 pages of English Translation and 5 pages of Official Copy).

(56) References Cited

OTHER PUBLICATIONS

Notice of Hearing received for Indian Patent Application No. 8904/CHENP/2012, mailed on Feb. 21, 2023, 2 pages.
Notice of Hearing received for Indian Patent Application No. 8908/CHENP/2012, mailed on Feb. 21, 2023, 2 pages.
Notice of Hearing received for Indian Patent Application No. 8909/CHENP/2012, mailed on Feb. 21, 2023, 2 pages.
Non-Final Office Action received for U.S. Appl. No. 16/879,643, mailed on Aug. 19, 2021, 12 pages.
Result of Consultation received for European Patent Application No. 16188272.5, mailed on Oct. 13, 2021, 3 pages.
Office Action received for Australian Patent Application No. 2020257070, mailed on Oct. 14, 2021, 4 pages.
Office Action received for Canadian Patent Application No. 3077914, mailed on Jun. 8, 2021, 5 pages.
Notice of Allowance received for Japanese Patent Application No. 2020-109934, mailed on Dec. 19, 2022, 19 pages (1 page of English Translation and 18 pages of Official Copy).
Notice of Acceptance received for Australian Patent Application No. 2021240130, mailed on Jan. 16, 2023, 3 pages.
Notice of Allowance received for Korean Patent Application No. 10-2020-7023927, mailed on May 27, 2021, 4 pages (2 pages of English Translation and 2 pages of Official Copy).
Office Action received for Australian Patent Application No. 2019283923, mailed on Jun. 2, 2021, 4 pages.
Office Action received for Australian Patent Application No. 2019283923, mailed on Jul. 29, 2021, 6 pages.
Office Action received for Japanese Patent Application No. 2022-114276, mailed on Aug. 7, 2023, 12 pages (6 pages of English Translation and 6 pages of Official Copy).
Applicant-Initiated Interview Summary received for U.S. Appl. No. 16/879,643, mailed on Sep. 27, 2021, 2 pages.
Office Action received for Russian Patent Application No. 2018112505, mailed on Sep. 2, 2021, 12 pages (5 pages of English Translation and 7 pages of Official Copy).
Applicant-Initiated Interview Summary received for U.S. Appl. No. 16/879,643, mailed on Mar. 29, 2022, 2 pages.
Notice of Allowance received for Korean Patent Application No. 10-2021-7027594, mailed on Mar. 14, 2022, 4 pages (1 page of English Translation and 3 pages of Official Copy).
Office Action received for Japanese Patent Application No. 2020-109934, mailed on Mar. 18, 2022, 6 pages (3 pages of English Translation and 3 pages of Official Copy).
Summons to Attend Oral Proceedings received for European Patent Application No. 18202474.5, mailed on Mar. 14, 2022, 15 pages.
Windows Practical & Secret Techniques Compendium, C & R Institute Inc, first Edition, Natsumesha Co., Ltd., Apr. 10, 2007, 5 pages (Official Copy Only). (See Communication under 37 CFR § 1.98(a) (3)).
Seto Haruka, "Application Integration Programming with VBA Next Generation Office Development Techniques", Visual Basic magazine, Shoeisha Co., Ltd., vol. 6, No. 12, Oct. 1, 2000, 15 pages (Official Copy Only). (See Communication under 37 CFR § 1.98(a) (3)).
Notice of Acceptance received for Australian Patent Application No. 2020257070, mailed on Jun. 9, 2022, 3 pages.
Supplemental Notice of Allowance received for U.S. Appl. No. 16/879,643, mailed on Jun. 23, 2022, 2 pages.
Notice of Hearing received for Indian Patent Application No. 8904/CHENP/2012, mailed on Apr. 10, 2023, 2 pages.
Notice of Hearing received for Indian Patent Application No. 8908/CHENP/2012, mailed on Apr. 10, 2023, 2 pages.
Notice of Hearing received for Indian Patent Application No. 8909/CHENP/2012, mailed on Apr. 10, 2023, 2 pages.
Notice of Hearing received for Indian Patent Application No. 8905/CHENP/2012, mailed on Aug. 13, 2020, 2 pages.
Notice of Hearing received for Indian Patent Application No. 8906/CHENP/2012, mailed on May 11, 2021, 2 pages.
Notice of Hearing received for Indian Patent Application No. 8907/CHENP/2012, mailed on Feb. 3, 2021, 2 pages.
Summons to Attend Oral Proceedings received for European Patent Application No. 16188272.5, mailed on Apr. 26, 2021, 11 pages.
Office Action received for Korean Patent Application No. 10-2022-7026740, mailed on Sep. 14, 2022, 5 pages (2 pages of English Translation and 3 pages of Official Copy).
Office Action received for Indian Patent Application No. 201948016386, mailed on Oct. 29, 2021, 6 pages.
Brief Communication Regarding Oral Proceedings received for European Patent Application No. 16188272.5, mailed on Nov. 24, 2021, 21 pages.
Notice of Allowance received for Korean Patent Application No. 10-2020-7037138, mailed on Nov. 24, 2021, 3 pages (1 page of English Translation and 2 pages of Official Copy).
Office Action received for Korean Patent Application No. 10-2021-7027594, mailed on Nov. 30, 2021, 9 pages (4 pages of English Translation and 5 pages of Official Copy).
Office Action received for Indian Patent Application No. 202248011347, mailed on Dec. 2, 2022, 5 pages.
Office Action received for Indian Patent Application No. 202248011348, mailed on Dec. 2, 2022, 5 pages.
Office Action received for Indian Patent Application No. 202248011349, mailed on Dec. 2, 2022, 5 pages.
Office Action received for Indian Patent Application No. 202248011350, mailed on Dec. 12, 2022, 5 pages.
Notice of Hearing received for Indian Patent Application No. 8902/CHENP/2012, mailed on May 1, 2023, 2 pages.
Notice of Hearing received for Indian Patent Application No. 8903/CHENP/2012, mailed on May 1, 2023, 2 pages.
Notice of Hearing received for Indian Patent Application No. 8910/CHENP/2012, mailed on May 1, 2023, 2 pages.
Notice of Allowance received for Korean Patent Application No. 10-2022-7006342, mailed on Apr. 29, 2022, 5 pages (2 pages of English Translation and 3 pages of Official Copy).
Notice of Allowance received for U.S. Appl. No. 16/879,643, mailed on Apr. 29, 2022, 10 pages.
Office Action received for Australian Patent Application No. 2021202350, mailed on Apr. 12, 2022, 3 pages.
Office Action received for Canadian Patent Application No. 3,077,914, mailed on Apr. 26, 2022, 4 pages.
Summons to Oral Proceedings received for European Patent Application No. 11707939.2, mailed on Aug. 24, 2022, 14 pages.
Notice of Allowance received for Canadian Patent Application No. 3,077,914, mailed on Feb. 10, 2023, 1 page.
Notice of Allowance received for Korean Patent Application No. 10-2022-7026740, mailed on Mar. 23, 2023, 7 pages (2 pages of English Translation and 5 pages of Official Copy).
Summons to Oral Proceedings received for European Patent Application No. 16188272.5, mailed on Sep. 6, 2023, 13 pages.
Office Action received for Japanese Patent Application No. 2020-109934, mailed on May 31, 2021, 5 pages (2 pages of English Translation and 3 pages of Official Copy).
Office Action received for Mexican Patent Application No. MX/a/2017/006911, mailed on Jun. 17, 2021, 5 pages (2 pages of English Translation and 3 pages of Official Copy).
Decision to Grant received for Russian Patent Application No. 2018112505, mailed on Oct. 14, 2022, 25 pages (9 pages of English Translation and 16 pages of Official Copy).
Notice of Acceptance received for Australian Patent Application No. 2021202350, mailed on Nov. 15, 2022, 3 pages.
Notice of Allowance received for Mexican Patent Application No. MX/a/2017/006911, mailed on Sep. 9, 2022, 4 pages (1 page of English Translation and 3 pages of Official Copy).
Office Action received for Australian Patent Application No. 2021240130, mailed on Oct. 4, 2022, 3 pages.
Office Action received for Indian Patent Application No. 6734/CHENP/2012, mailed on Mar. 17, 2021, 3 pages.
Supplemental Notice of Allowance received for U.S. Appl. No. 16/879,643, mailed on Jul. 20, 2022, 2 pages.
Office Action received for European Patent Application No. 18202474.5, mailed on Apr. 15, 2021, 15 pages.
Decision to Refuse received for Japanese Patent Application No. 2022-114276, mailed on Nov. 24, 2023, 4 pages (2 pages of English Translation and 2 pages of Official Copy).

(56) References Cited

OTHER PUBLICATIONS

Office Action received for Australian Patent Application No. 2023200803, mailed on Feb. 5, 2024, 3 pages.
Office Action received for Korean Patent Application No. 10-2023-7017413, mailed on Jan. 18, 2024, 9 pages (3 pages of English Translation and 6 pages of Official Copy).
Office Action received for Korean Patent Application No. 10-2023-7019935, mailed on Jan. 30, 2024, 8 pages (3 pages of English Translation and 5 pages of Official Copy).
Office Action received for Chinese Patent Application No. 202110472089.1, mailed on Jan. 15, 2024, 29 pages (9 pages of English Translation and 20 pages of Official Copy).
Communication for Board of Appeal received for European Patent Application No. 16188272.5, mailed on Mar. 13, 2024, 2 pages.
Notice of Allowance received for Japanese Patent Application No. 2022-114276, mailed on Mar. 15, 2024, 4 pages (1 page of English Translation and 3 pages of Official Copy).
Brownlee, John, "Siri app turns your GPS-enabled iPhone into a virtual concierge", Online Available at: https://web.archive.org/web/20111006222659/http://www.cultofmac.com:80/29188/siri-app-turns-your-gps-enabled-iphone-into-a-virtual-concierge/, Oct. 6, 2011, 7 pages.
Esposito, Dom, "How to Make Restaurant Reservations with Siri", Online available at: https://www.youtube.com/watch?v=Op828q-vqCQ, Dec. 23, 2012, 2 pages.
Horowitz, Paul, "Buy Movie Tickets with Siri", Online Available at: https://web.archive.org/web/20130203112931/https://osxdaily.com/2013/01/28/buy-movie-tickets-with-siri/, Feb. 3, 2013, 4 pages.
Kazmucha, Allyson, "How to find restaurants, read reviews, and make reservations using Siri", Online Available at: https://web.archive.org/web/20121023225357/https://www.imore.com/how-find-restaurants-make-reservations-read-ratings-and-more-Siri, Oct. 23, 2012, 17 pages.
Notice of Allowance received for Japanese Patent Application No. 2024-011222, mailed on Mar. 22, 2024, 4 pages (1 page of English Translation and 3 pages of Official Copy).
Office Action received for Australian Patent Application No. 2023200803, mailed on Mar. 22, 2024, 3 pages.
Office Action received for Australian Patent Application No. 2023202682, mailed on Mar. 27, 2024, 8 pages.

* cited by examiner

FIG. 12
1201
1202
AT&T
1:19 AM
Back
Siri
type here...
1203
or tap one of these...
restaurants (find, make reservations)
movies (find, buy tickets)
events (find, buy tickets)
local... (stores, services, places...)
taxis (book it online)
weather (get forecasts)
reminders (remind me to...)
Some things you can ask...
where is (Fedex, Starbucks, ...)

FIG. 14
1401
AT&T
1:57 PM
Back
Siri
1305
1303
wh
1203
what is happening in city
where is business name
what is showing at the venue name
what is playing at the movie theater
Q W E R T Y U I O P
A S D F G H J K L
Z X C V B N M
1304
.?123
space
Go
1306

FIG. 16
1601
1305
1602
AT&T
2:40 AM
Back
Siri
what is showing at the The Fillmore
1203
... by category concerts, sports, festivals
... for date
... in city or zipcode
... named event name
... featuring performer name
Go
1306

FIG. 17
1701
1305
1602
AT&T
2:41 AM
Back
Siri
what is showing at the The Fillmore
... by category concerts, sports, festivals
... for date
... in city or zipcode
... named event name
... featuring performer name
Go
1306

FIG. 18
1801
1305
1602
1304
1306
AT&T
2:41 AM
Back
Siri
what is showing at the The Fillmore
... for
1203
... for today
... for tonight
... for tomorrow
... for this weekend
Q W E R T Y U I O P
A S D F G H J K L
Z X C V B N M
.?123
space
Go

FIG. 19
1901
1305
1602
AT&T
2:41 AM
Back
Siri
what is showing at the The Fillmore
... for this weekend
1203
... by category concerts, sports, festivals
... in city or zipcode
... named event name
... featuring performer name
Go
1306

FIG. 20
2001
AT&T
2:42 AM
"nearest gas station"
Taxis
"book me a taxi"
Weather
"what's the temp in Reno?"
Examples...
how to find restaurants, movies...
More...
reminders, flight status, where is...
2002
what is showing at the The Fillmore for this weekend
2003
I'm looking for events at Fillmore for this weekend ...
Tap it...
Say it!
Start over
My stuff
Help
Feedback
Recents

FIG. 21
2101
2102
2103
AT&T
2:42 AM
I looked for events at Fillmore for this weekend ... here's what I found:
The Fillmore
San Francisco, 23.1
1 upcoming event
Call
Save
to My Stuff
Share
via email
Map It
Events (1)
Details
My Notes
STATE RADIO
Jan 16, (Saturday) 09:00pm
$20
concert, reggae concert, rock
Siri data from
Tap it...
Say it!
Start over
My stuff
Help
Feedback
Recents

FIG. 29
2901
2902
who is playing this weekend at the filmore
2903
I looked for events at Fillmore for this weekend ... here's what I found:
Fillmore (SF)
San Francisco, 38.2
1 upcoming event
Call
Save
to My Stuff
Share
via email
Map It
Events (1)
Details
My Notes
State Radio

FIG. 35
3501
asian restaurants
Ok, here are some asian restaurants within walking distance :
Restaurants
by location, rating
Map All
Outback Steakhouse
Cupertino, 0.2 miles
Yahoo! Local - 17 reviews
Call
Pick Up Stix
Cupertino, 0.6 miles
Citysearch
Gochi Japanese Fusion Tapas
3502

FIG. 36
3601
Gochi Japanese Fusion Tapas
Cupertino, 0.6 miles
Yelp - 624 reviews
Call
19980 E Homestead Rd
Cupertino, CA 95014
JAPANESE T
Japanese
Save
to My Stuff
Share
via email
Map It
Reviews
Details
My Notes
Yelp rating averaged from 624 reviews
read reviews on yelp
YAHOO!
LOCAL
this place is really different from
others : the atmosphere and food
we got felt more authentic then all

| Select a | Based on these criteria | | | | | | | | |
|---|---|---|---|---|---|---|---|---|---|
| | Location | Price | Availability | Type | Quality | Name | Services | special search | general search |
| Restaurant | proximity | affordability | open tables | cuisine | rating by guide, review | restaurant name | delivery | menu items | keywords |
| Hotel | proximity | price range | available rooms | motel, hotel, B&B . . . | rating by guide, review | hotel name | amenities | | keywords |
| Movie | theatre proximity | | show times | genre | rating by review | movie title | | actors, etc. | |
| Local Business | proximity | | | business category | rating by review | business name | | | keywords |
| Local event | venue proximity | | by date | | | event title | | | keywords |
| concert | venue proximity | | by tour schedule | music genre | | band name | | band members | keywords |
| CD, book, DVD, to buy | | price range | online, in store, etc. | download, physical | popularity | album or song name | | artist, title, etc. | keywords |

FIG. 52

INTELLIGENT AUTOMATED ASSISTANT

CROSS-REFERENCE TO RELATED APPLICATIONS

This application is a continuation of U.S. patent application Ser. No. 16/352,410, entitled "Intelligent Automated Assistant," filed Mar. 13, 2019, which is a continuation application of U.S. patent application Ser. No. 13/913,336 filed Jun. 7, 2013, which claims the benefit of U.S. Provisional Application Ser. No. 61/657,736, entitled "Intelligent Automated Assistant," filed Jun. 8, 2012, which is a continuation-in-part of U.S. patent application Ser. No. 12/987,982, entitled "Intelligent Automated Assistant," filed Jan. 10, 2011, which claims the benefit of U.S. Provisional Application Ser. No. 61/295,774, filed Jan. 18, 2010. All of the above-mentioned applications are incorporated herein by reference in their entirety.

This application is further related to (1) U.S. application Ser. No. 11/518,292, filed Sep. 8, 2006, entitled "Method and Apparatus for Building an Intelligent Automated Assistant;" (2) U.S. Provisional Application Ser. No. 61/186,414 filed Jun. 12, 2009, entitled "System and Method for Semantic Auto-Completion;" (3) U.S. application Ser. No. 13/725,512, filed Dec. 21, 2012, entitled "Active Input Elicitation by Intelligent Automated Assistant,"; (4) U.S. application Ser. No. 13/725,550, filed Dec. 21, 2012, entitled "Determining User Intent Based on Ontologies of Domains,"; (5) U.S. application Ser. No. 13/725,616, filed Dec. 21, 2012, entitled "Service Orchestration for Intelligent Automated Assistant,"; (6) U.S. application Ser. No. 13/725,656, filed Dec. 21, 2012, entitled "Prioritizing Selection Criteria by Automated Assistant,"; (7) U.S. application Ser. No. 13/725,713, filed Dec. 21, 2012, entitled "Disambiguation Based on Active Input Elicitation by Intelligent Automated Assistant,"; (8) U.S. application Ser. No. 13/784,694, filed Mar. 4, 2013, entitled "Paraphrasing of User Request by Automated Digital Assistant,"; (9) U.S. application Ser. No. 13/784,707, filed Mar. 4, 2013, entitled "Maintaining Context Information Between User Interactions with a Voice Assistant,"; (10) U.S. application Ser. No. 13/725,742, filed Dec. 21, 2012, entitled "Intent Deduction Based on Previous User Interactions with a Voice Assistant,"; and (11) U.S. application Ser. No. 13/725,761, filed Dec. 21, 2012, entitled "Using Event Alert Text as Input to an Automated Assistant, ", all of which are incorporated herein by reference in their entirety.

This application is related to U.S. Provisional Patent Application Ser. No. 61/186,414 for "System and Method for Semantic Auto-Completion," filed Jun. 12, 2009, which is incorporated herein by reference.

FIELD OF THE INVENTION

The present invention relates to intelligent systems, and more specifically for classes of applications for intelligent automated assistants.

BACKGROUND OF THE INVENTION

Today's electronic devices are able to access a large, growing, and diverse quantity of functions, services, and information, both via the Internet and from other sources. Functionality for such devices is increasing rapidly, as many consumer devices, smartphones, tablet computers, and the like, are able to run software applications to perform various tasks and provide different types of information. Often, each application, function, website, or feature has its own user interface and its own operational paradigms, many of which can be burdensome to learn or overwhelming for users. In addition, many users may have difficulty even discovering what functionality and/or information is available on their electronic devices or on various websites; thus, such users may become frustrated or overwhelmed, or may simply be unable to use the resources available to them in an effective manner.

In particular, novice users, or individuals who are impaired or disabled in some manner, and/or are elderly, busy, distracted, and/or operating a vehicle may have difficulty interfacing with their electronic devices effectively, and/or engaging online services effectively. Such users are particularly likely to have difficulty with the large number of diverse and inconsistent functions, applications, and websites that may be available for their use.

Accordingly, existing systems are often difficult to use and to navigate, and often present users with inconsistent and overwhelming interfaces that often prevent the users from making effective use of the technology.

SUMMARY

According to various embodiments of the present invention, an intelligent automated assistant is implemented on an electronic device, to facilitate user interaction with a device, and to help the user more effectively engage with local and/or remote services. In various embodiments, the intelligent automated assistant engages with the user in an integrated, conversational manner using natural language dialog, and invokes external services when appropriate to obtain information or perform various actions.

According to various embodiments of the present invention, the intelligent automated assistant integrates a variety of capabilities provided by different software components (e.g., for supporting natural language recognition and dialog, multimodal input, personal information management, task flow management, orchestrating distributed services, and the like). Furthermore, to offer intelligent interfaces and useful functionality to users, the intelligent automated assistant of the present invention may, in at least some embodiments, coordinate these components and services. The conversation interface, and the ability to obtain information and perform follow-on task, are implemented, in at least some embodiments, by coordinating various components such as language components, dialog components, task management components, information management components and/or a plurality of external services.

According to various embodiments of the present invention, intelligent automated assistant systems may be configured, designed, and/or operable to provide various different types of operations, functionalities, and/or features, and/or to combine a plurality of features, operations, and applications of an electronic device on which it is installed. In some embodiments, the intelligent automated assistant systems of the present invention can perform any or all of: actively eliciting input from a user, interpreting user intent, disambiguating among competing interpretations, requesting and receiving clarifying information as needed, and performing (or initiating) actions based on the discerned intent. Actions can be performed, for example, by activating and/or interfacing with any applications or services that may be available on an electronic device, as well as services that are available over an electronic network such as the Internet. In various embodiments, such activation of external services can be performed via APIs or by any other suitable mechanism. In this manner, the intelligent automated assistant systems of various embodiments of the present invention can unify, simplify, and improve the user's experience with respect to many different applications and functions of an electronic device, and with respect to services that may be available over the Internet. The user can thereby be relieved of the burden of learning what functionality may be available on the device and on web-connected services, how to interface with such services to get what he or she wants, and how to interpret the output received from such services; rather, the assistant of the present invention can act as a go-between between the user and such diverse services.

In addition, in various embodiments, the assistant of the present invention provides a conversational interface that the user may find more intuitive and less burdensome than conventional graphical user interfaces. The user can engage in a form of conversational dialog with the assistant using any of a number of available input and output mechanisms, such as for example speech, graphical user interfaces (buttons and links), text entry, and the like. The system can be implemented using any of a number of different platforms, such as device APIs, the web, email, and the like, or any combination thereof. Requests for additional input can be presented to the user in the context of such a conversation. Short and long term memory can be engaged so that user input can be interpreted in proper context given previous events and communications within a given session, as well as historical and profile information about the user.

In addition, in various embodiments, context information derived from user interaction with a feature, operation, or application on a device can be used to streamline the operation of other features, operations, or applications on the device or on other devices. For example, the intelligent automated assistant can use the context of a phone call (such as the person called) to streamline the initiation of a text message (for example to determine that the text message should be sent to the same person, without the user having to explicitly specify the recipient of the text message). The intelligent automated assistant of the present invention can thereby interpret instructions such as "send him a text message", wherein the "him" is interpreted according to context information derived from a current phone call, and/or from any feature, operation, or application on the device. In various embodiments, the intelligent automated assistant takes into account various types of available context data to determine which address book contact to use, which contact data to use, which telephone number to use for the contact, and the like, so that the user need not re-specify such information manually.

In various embodiments, the assistant can also take into account external events and respond accordingly, for example, to initiate action, initiate communication with the user, provide alerts, and/or modify previously initiated action in view of the external events. If input is required from the user, a conversational interface can again be used.

In one embodiment, the system is based on sets of interrelated domains and tasks, and employs additional functionally powered by external services with which the system can interact. In various embodiments, these external services include web-enabled services, as well as functionality related to the hardware device itself For example, in an embodiment where the intelligent automated assistant is implemented on a smartphone, personal digital assistant, tablet computer, or other device, the assistant can control many operations and functions of the device, such as to dial a telephone number, send a text message, set reminders, add events to a calendar, and the like.

In various embodiments, the system of the present invention can be implemented to provide assistance in any of a number of different domains. Examples include:

Local Services (including location- and time-specific services such as restaurants, movies, automated teller machines (ATMs), events, and places to meet);

Personal and Social Memory Services (including action items, notes, calendar events, shared links, and the like);

E-commerce (including online purchases of items such as books, DVDs, music, and the like);

Travel Services (including flights, hotels, attractions, and the like).

One skilled in the art will recognize that the above list of domains is merely exemplary. In addition, the system of the present invention can be implemented in any combination of domains.

In various embodiments, the intelligent automated assistant systems disclosed herein may be configured or designed to include functionality for automating the application of data and services available over the Internet to discover, find, choose among, purchase, reserve, or order products and services. In addition to automating the process of using these data and services, at least one intelligent automated assistant system embodiment disclosed herein may also enable the combined use of several sources of data and services at once. For ex-ample, it may combine information about products from several review sites, check prices and availability from multiple distributors, and check their locations and time constraints, and help a user find a personalized solution to their problem. Additionally, at least one intelligent automated assistant system embodiment disclosed herein may be configured or designed to include functionality for automating the use of data and services available over the Internet to discover, investigate, select among, reserve, and otherwise learn about things to do (including but not limited to movies, events, performances, exhibits, shows and at-tractions); places to go (including but not limited to travel destinations, hotels and other places to stay, landmarks and other sites of interest, etc.); places to eat or drink (such as restaurants and bars), times and places to meet others, and any other source of entertainment or social interaction which may be found on the Internet. Additionally, at least one intelligent automated assistant system embodiment disclosed herein may be configured or designed to include functionality for enabling the operation of applications and services via natural language dialog that may be otherwise provided by dedicated applications with graphical user interfaces including search (including location-based search); navigation (maps and directions); database lookup (such as finding businesses or people by name or other properties); getting weather conditions and forecasts, checking the price of market items or status of financial transactions; monitoring traffic or the status of flights; accessing and updating calendars and schedules; managing reminders, alerts, tasks and projects; communicating over email or other messaging platforms; and operating devices locally or remotely (e.g., dialing telephones, controlling light and temperature, controlling home security devices, playing music or video, etc.). Further, at least one intelligent automated assistant system embodiment disclosed herein may be configured or designed to include functionality for identifying, generating, and/or providing personalized recommendations for activities, products, services, source of entertainment, time management, or any other kind of recommendation service that benefits from an interactive dialog in natural language and automated access to data and services.

In various embodiments, the intelligent automated assistant of the present invention can control many features and operations of an electronic device. For example, the intelligent automated assistant can call services that interface with functionality and applications on a device via APIs or by other means, to perform functions and operations that might otherwise be initiated using a conventional user interface on the device. Such functions and operations may include, for example, setting an alarm, making a telephone call, sending a text message or email message, adding a calendar event, and the like. Such functions and operations may be performed as add-on functions in the context of a conversational dialog between a user and the assistant. Such functions and operations can be specified by the user in the context of such a dialog, or they may be automatically performed based on the context of the dialog. One skilled in the art will recognize that the assistant can thereby be used as a control mechanism for initiating and controlling various operations on the electronic device, which may be used as an alternative to conventional mechanisms such as buttons or graphical user interfaces.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIG. 52 is an example of constrained selection domains that may be handled by assistant 1002 according to various embodiments.

DETAILED DESCRIPTION OF THE EMBODIMENTS

Figure 1:
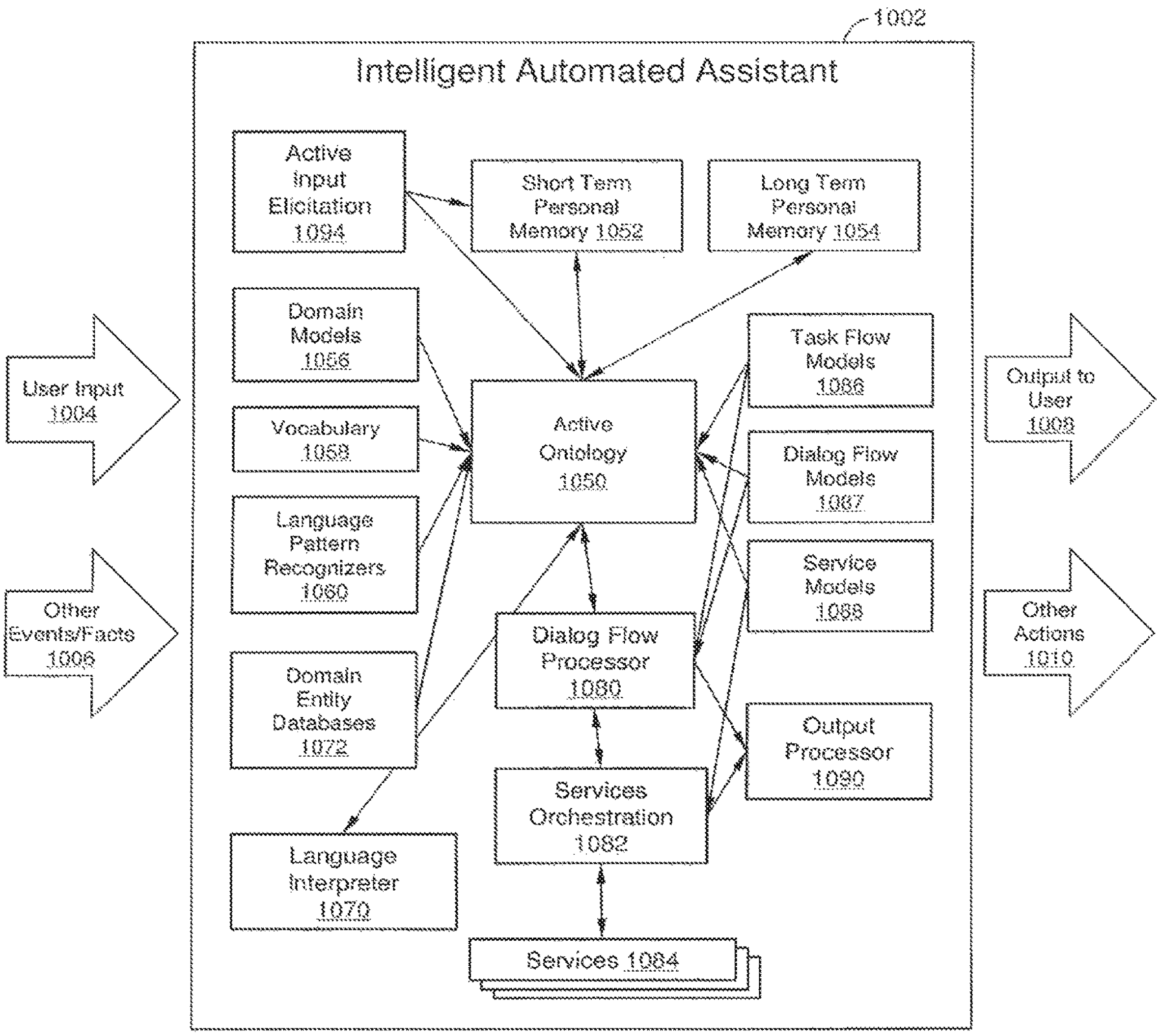
FIG. 1 is a block diagram depicting an example of one embodiment of an intelligent automated assistant system.

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

Although described within the context of intelligent automated assistant technology, it may be understood that the various aspects and techniques described herein (such as those associated with active ontologies, for example) may also be deployed and/or applied in other fields of technology involving human and/or computerized interaction with software.

Other aspects relating to intelligent automated assistant technology (e.g., which may be utilized by, provided by, and/or implemented at one or more intelligent automated assistant system embodiments described herein) are disclosed in one or more of the following references:

- U.S. Provisional Patent Application Ser. No. 61/295,774 for "Intelligent Automated Assistant," filed Jan. 18, 2010, the disclosure of which is incorporated herein by reference;
- U.S. patent application Ser. No. 11/518,292 for "Method And Apparatus for Building an Intelligent Automated Assistant," filed Sep. 8, 2006, the disclosure of which is incorporated herein by reference; and
- U.S. Provisional Patent Application Ser. No. 61/186,414 for "System and Method for Semantic Auto-Completion," filed Jun. 12, 2009, the disclosure of which is incorporated herein by reference.

Hardware Architecture

Generally, the intelligent automated assistant techniques disclosed herein may be implemented on hardware or a combination of software and hardware. For example, they may be implemented in an operating system kernel, in a separate user process, in a library package bound into network applications, on a specially constructed machine, or on a network interface card. In a specific embodiment, the techniques disclosed herein may be implemented in software such as an operating system or in an application running on an operating system.

Software/hardware hybrid implementation(s) of at least some of the intelligent automated assistant embodiment(s) disclosed herein may be implemented on a programmable machine selectively activated or reconfigured by a computer program stored in memory. Such network devices may have multiple network interfaces which may be configured or designed to utilize different types of network communication protocols. A general architecture for some of these machines may appear from the descriptions disclosed herein. According to specific embodiments, at least some of the features and/or functionalities of the various intelligent automated assistant embodiments disclosed herein may be implemented on one or more general-purpose network host machines such as an end-user computer system, computer, network server or server system, mobile computing device (e.g., personal digital assistant, mobile phone, smartphone, laptop, tablet computer, or the like), consumer electronic device, music player, or any other suitable electronic device, router, switch, or the like, or any combination thereof. In at least some embodiments, at least some of the features and/or functionalities of the various intelligent automated assistant embodiments disclosed herein may be implemented in one or more virtualized computing environments (e.g., network computing clouds, or the like).

Figure 3:
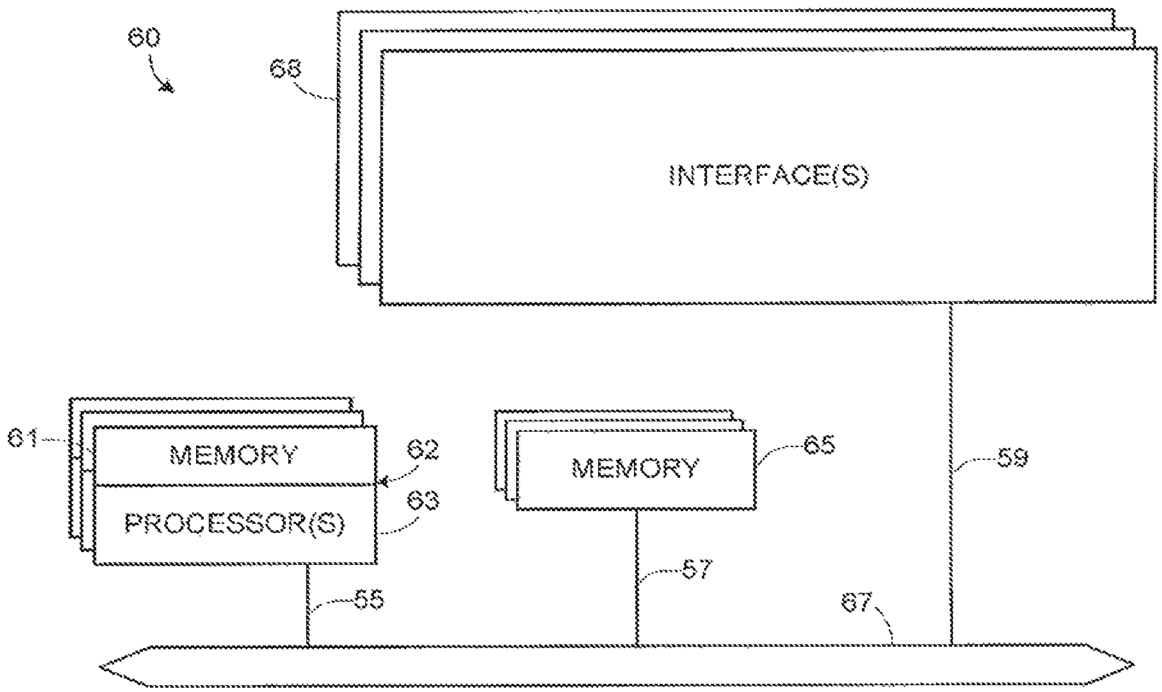
FIG. 3 is a block diagram depicting a computing device suitable for implementing at least a portion of an intelligent automated assistant according to at least one embodiment.

Referring now to FIG. 3, there is shown a block diagram depicting a computing device 60 suitable for implementing at least a portion of the intelligent automated assistant features and/or functionalities disclosed herein. Computing device 60 may be, for example, an end-user computer system, network server or server system, mobile computing device (e.g., personal digital assistant, mobile phone, smartphone, laptop, tablet computer, or the like), consumer electronic device, music player, or any other suitable electronic device, or any combination or portion thereof. Computing device 60 may be adapted to communicate with other computing devices, such as clients and/or servers, over a communications network such as the Internet, using known protocols for such communication, whether wireless or wired.

In one embodiment, computing device 60 includes central processing unit (CPU) 62, interfaces 68, and a bus 67 (such as a peripheral component inter-connect (PCI) bus). When acting under the control of appropriate software or firmware, CPU 62 may be responsible for implementing specific functions associated with the functions of a specifically configured computing device or machine. For example, in at least one embodiment, a user's personal digital assistant (PDA) may be configured or designed to function as an intelligent automated assistant system utilizing CPU 62, memory 61, 65, and interface(s) 68. In at least one embodiment, the CPU 62 may be caused to perform one or more of the different types of intelligent automated assistant functions and/or operations under the control of software modules/components, which for example, may include an operating system and any appropriate applications software, drivers, and the like.

CPU 62 may include one or more processor(s) 63 such as, for example, a processor from the Motorola or Intel family of microprocessors or the MIPS family of microprocessors. In some embodiments, processor(s) 63 may include specially designed hardware (e.g., application-specific integrated circuits (ASICs), electrically erasable programmable read-only memories (EEPROMs), field-programmable gate arrays (FPGAs), and the like) for controlling the operations of computing device 60. In a specific embodiment, a memory 61 (such as non-volatile random access memory (RAM) and/or read-only memory (ROM)) also forms part of CPU 62. However, there are many different ways in which memory may be coupled to the system. Memory block 61 may be used for a variety of purposes such as, for example, caching and/or storing data, programming instructions, and the like.

As used herein, the term "processor" is not limited merely to those integrated circuits referred to in the art as a processor, but broadly refers to a microcontroller, a microcomputer, a programmable logic controller, an application-specific integrated circuit, and any other programmable circuit.

In one embodiment, interfaces 68 are provided as interface cards (sometimes referred to as "line cards"). Generally, they control the sending and receiving of data packets over a computing network and sometimes support other peripherals used with computing device 60. Among the interfaces that may be provided are Ethernet interfaces, frame relay interfaces, cable interfaces, DSL interfaces, token ring interfaces, and the like. In addition, various types of interfaces may be provided such as, for example, universal serial bus (USB), Serial, Ethernet, Firewire, PCI, parallel, radio frequency (RF), Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 68 may include ports appropriate for communication with the appropriate media. In some cases, they may also include an independent processor and, in some instances, volatile and/or nonvolatile memory (e.g., RAM).

Although the system shown in FIG. 3 illustrates one specific architecture for a computing device 60 for implementing the techniques of the invention described herein, it is by no means the only device architecture on which at least a portion of the features and techniques described herein may be implemented. For example, architectures having one or any number of processors 63 can be used, and such processors 63 can be present in a single device or distributed among any number of devices. In one embodiment, a single processor 63 handles communications as well as routing computations. In various embodiments, different types of intelligent automated assistant features and/or functionalities may be implemented in an intelligent automated assistant system which includes a client device (such as a personal digital assistant or smartphone running client software) and server system(s) (such as a server system described in more detail below).

Regardless of network device configuration, the system of the present invention may employ one or more memories or memory modules (such as, for example, memory block 65) configured to store data, program instructions for the general-purpose network operations and/or other information relating to the functionality of the intelligent automated assistant techniques described herein. The program instructions may control the operation of an operating system and/or one or more applications, for example. The memory or memories may also be configured to store data structures, keyword taxonomy information, advertisement information, user click and impression information, and/or other specific non-program information described herein.

Because such information and program instructions may be employed to implement the systems/methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as floptical disks, and hardware devices that are specially configured to store and perform program instructions, such as read-only memory devices (ROM), flash memory, memristor memory, random access memory (RAM), and the like. Examples of program instructions include both machine code, such as produced by a compiler, and files containing higher level code that may be executed by the computer using an interpreter.

Figure 4:
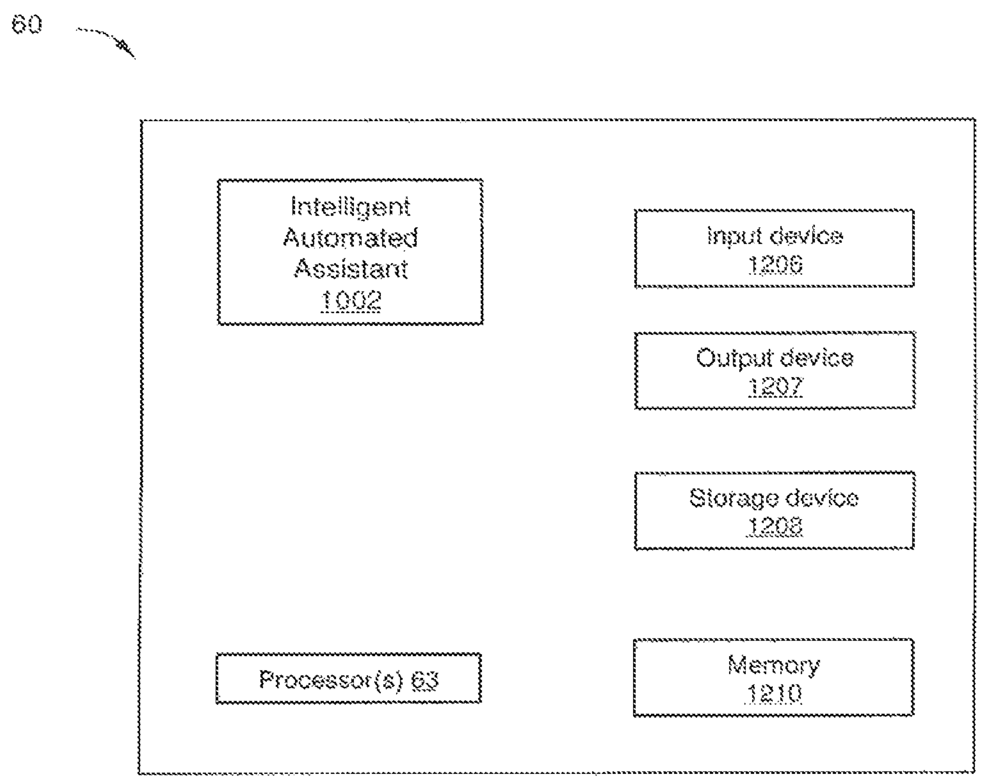
FIG. 4 is a block diagram depicting an architecture for implementing at least a portion of an intelligent automated assistant on a standalone computing system, according to at least one embodiment.

In one embodiment, the system of the present invention is implemented on a standalone computing system. Referring now to FIG. 4, there is shown a block diagram depicting an architecture for implementing at least a portion of an intelligent automated assistant on a standalone computing system, according to at least one embodiment. Computing device 60 includes processor(s) 63 which run software for implementing intelligent automated assistant 1002. Input device 1206 can be of any type suitable for receiving user input, including for example a keyboard, touchscreen, microphone (for example, for voice input), mouse, touchpad, trackball, five-way switch, joystick, and/or any combination thereof. Output device 1207 can be a screen, speaker, printer, and/or any combination thereof. Memory 1210 can be random-access memory having a structure and architecture as are known in the art, for use by processor(s) 63 in the course of running software. Storage device 1208 can be any magnetic, optical, and/or electrical storage device for storage of data in digital form; examples include flash memory, magnetic hard drive, CD-ROM, and/or the like.

Figure 5:
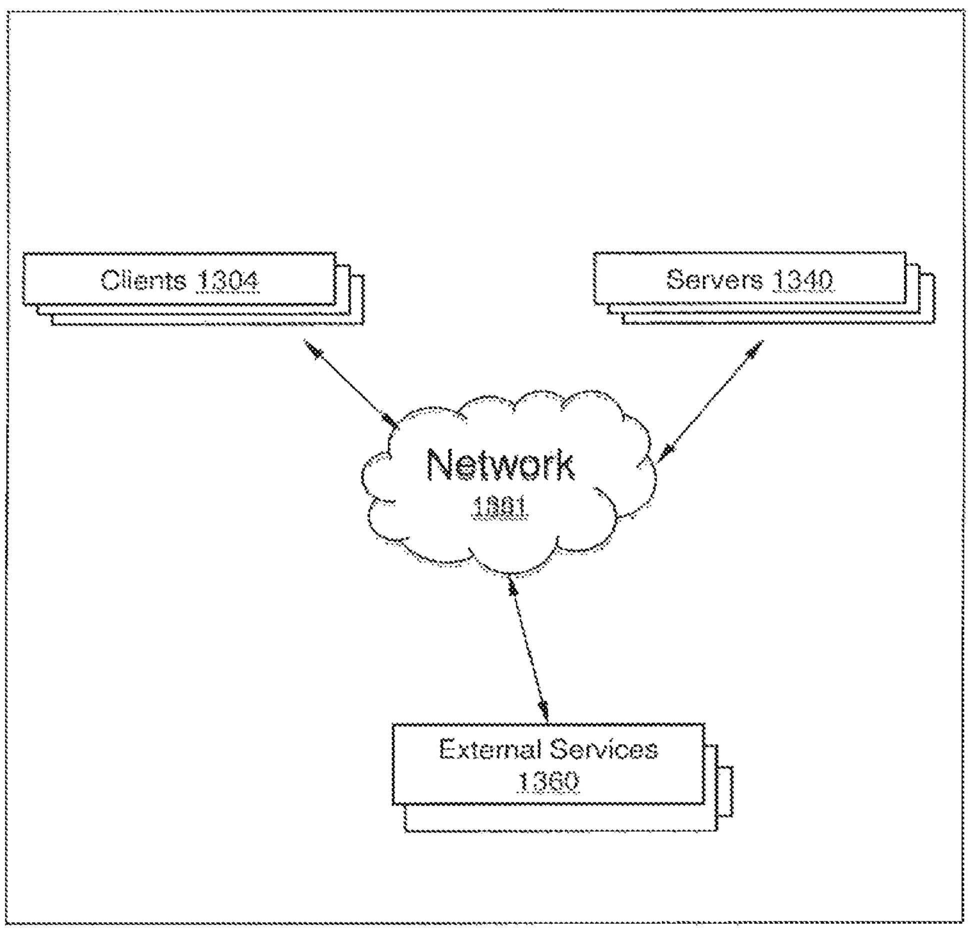
FIG. 5 is a block diagram depicting an architecture for implementing at least a portion of an intelligent automated assistant on a distributed computing network, according to at least one embodiment.

In another embodiment, the system of the present invention is implemented on a distributed computing network, such as one having any number of clients and/or servers. Referring now to FIG. 5, there is shown a block diagram depicting an architecture for implementing at least a portion of an intelligent automated assistant on a distributed computing network, according to at least one embodiment.

In the arrangement shown in FIG. 5, any number of clients 1304 are provided; each client 1304 may run software for implementing client-side portions of the present invention. In addition, any number of servers 1340 can be provided for handling requests received from clients 1304. Clients 1304 and servers 1340 can communicate with one another via electronic network 1361, such as the Internet. Network 1361 may be implemented using any known net-work protocols, including for example wired and/or wireless protocols.

In addition, in one embodiment, servers 1340 can call external services 1360 when needed to obtain additional information or refer to store data concerning previous interactions with particular users. Communications with external services 1360 can take place, for example, via network 1361. In various embodiments, external services 1360 include web-enabled services and/or functionality related to or installed on the hardware device itself. For example, in an embodiment where assistant 1002 is implemented on a smartphone or other electronic device, assistant 1002 can obtain information stored in a calendar application ("app"), contacts, and/or other sources.

In various embodiments, assistant 1002 can control many features and operations of an electronic device on which it is installed. For example, assistant 1002 can call external services 1360 that interface with functionality and applications on a device via APIs or by other means, to perform functions and operations that might otherwise be initiated using a conventional user interface on the device. Such functions and operations may include, for example, setting an alarm, making a telephone call, sending a text message or email message, adding a calendar event, and the like. Such functions and operations may be performed as add-on functions in the context of a conversational dialog between a user and assistant 1002. Such functions and operations can be specified by the user in the context of such a dialog, or they may be automatically performed based on the context of the dialog. One skilled in the art will recognize that assistant 1002 can thereby be used as a control mechanism for initiating and controlling various operations on the electronic device, which may be used as an alternative to conventional mechanisms such as buttons or graphical user interfaces.

For example, the user may provide input to assistant 1002 such as "I need to wake tomorrow at 8 am". Once assistant 1002 has determined the user's intent, using the techniques described herein, assistant 1002 can call external services 1360 to interface with an alarm clock function or application on the device. Assistant 1002 sets the alarm on behalf of the user. In this manner, the user can use assistant 1002 as a replacement for conventional mechanisms for setting the alarm or performing other functions on the device. If the user's requests are ambiguous or need further clarification, assistant 1002 can use the various techniques described herein, including active elicitation, paraphrasing, suggestions, and the like, to obtain the needed information so that the correct services 1360 are called and the intended action taken. In one embodiment, assistant 1002 may prompt the user for confirmation before calling a service 1360 to perform a function. In one embodiment, a user can selectively disable assistant's 1002 ability to call particular services 1360 or can disable all such service-calling if desired.

Figure 6:
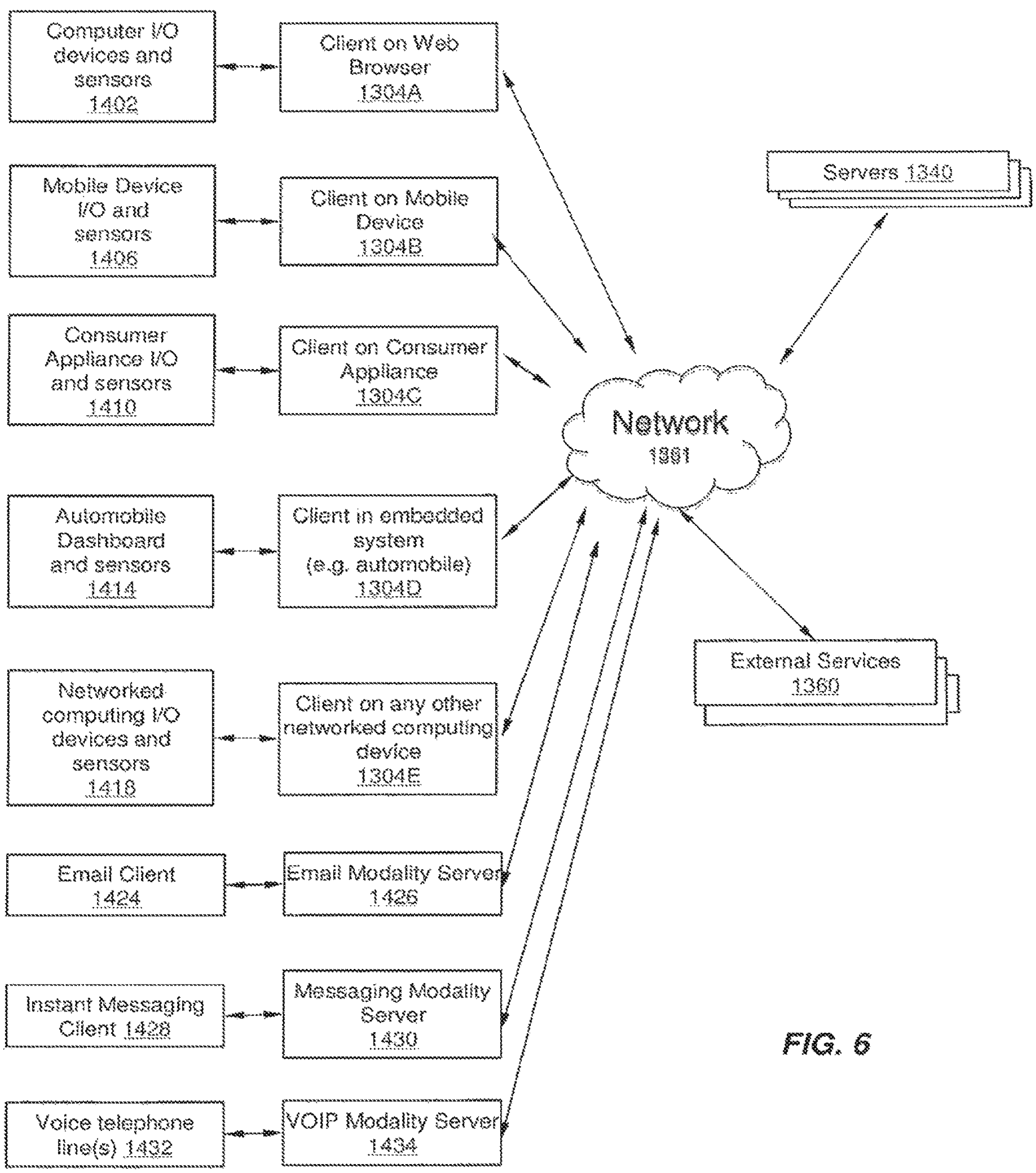
FIG. 6 is a block diagram depicting a system architecture illustrating several different types of clients and modes of operation.

The system of the present invention can be implemented with many different types of clients 1304 and modes of operation. Referring now to FIG. 6, there is shown a block diagram depicting a system architecture illustrating several different types of clients 1304 and modes of operation. One skilled in the art will recognize that the various types of clients 1304 and modes of operation shown in FIG. 6 are merely exemplary, and that the system of the present invention can be implemented using clients 1304 and/or modes of operation other than those depicted. Additionally, the system can include any or all of such clients 1304 and/or modes of operation, alone or in any combination. Depicted examples include:

- Computer devices with input/output devices and/or sensors 1402. A client component may be deployed on any such computer device 1402. At least one embodiment may be implemented using a web browser 1304A or other software application for enabling communication with servers 1340 via network 1361. Input and output channels may of any type, including for example visual and/or auditory channels. For example, in one embodiment, the system of the invention can be implemented using voice-based communication methods, allowing for an embodiment of the assistant for the blind whose equivalent of a web browser is driven by speech and uses speech for output.

Mobile Devices with I/O and sensors 1406, for which the client may be implemented as an application on the mobile device 1304B. This includes, but is not limited to, mobile phones, smartphones, personal digital assistants, tablet devices, networked game consoles, and the like.

Consumer Appliances with I/O and sensors 1410, for which the client may be implemented as an embedded application on the appliance 1304C.

Automobiles and other vehicles with dashboard interfaces and sensors 1414, for which the client may be implemented as an embedded system application 1304D. This includes, but is not limited to, car navigation systems, voice control systems, in-car entertainment systems, and the like.

Networked computing devices such as routers 1418 or any other device that resides on or interfaces with a network, for which the client may be implemented as a device-resident application 1304E.

Email clients 1424, for which an embodiment of the assistant is connected via an Email Modality Server 1426. Email Modality server 1426 acts as a communication bridge, for example taking input from the user as email messages sent to the assistant and sending output from the assistant to the user as replies.

Instant messaging clients 1428, for which an embodiment of the assistant is connected via a Messaging Modality Server 1430. Messaging Modality server 1430 acts as a communication bridge, taking input from the user as messages sent to the assistant and sending output from the assistant to the user as messages in reply.

Voice telephones 1432, for which an embodiment of the assistant is connected via a Voice over Internet Protocol (VoIP) Modality Server 1430. VoIP Modality server 1430 acts as a communication bridge, taking input from the user as voice spoken to the assistant and sending output from the assistant to the user, for example as synthesized speech, in reply.

For messaging platforms including but not limited to email, instant messaging, discussion forums, group chat sessions, live help or customer support sessions and the like, assistant 1002 may act as a participant in the conversations. Assistant 1002 may monitor the conversation and reply to individuals or the group using one or more the techniques and methods described herein for one-to-one interactions.

Figure 7:
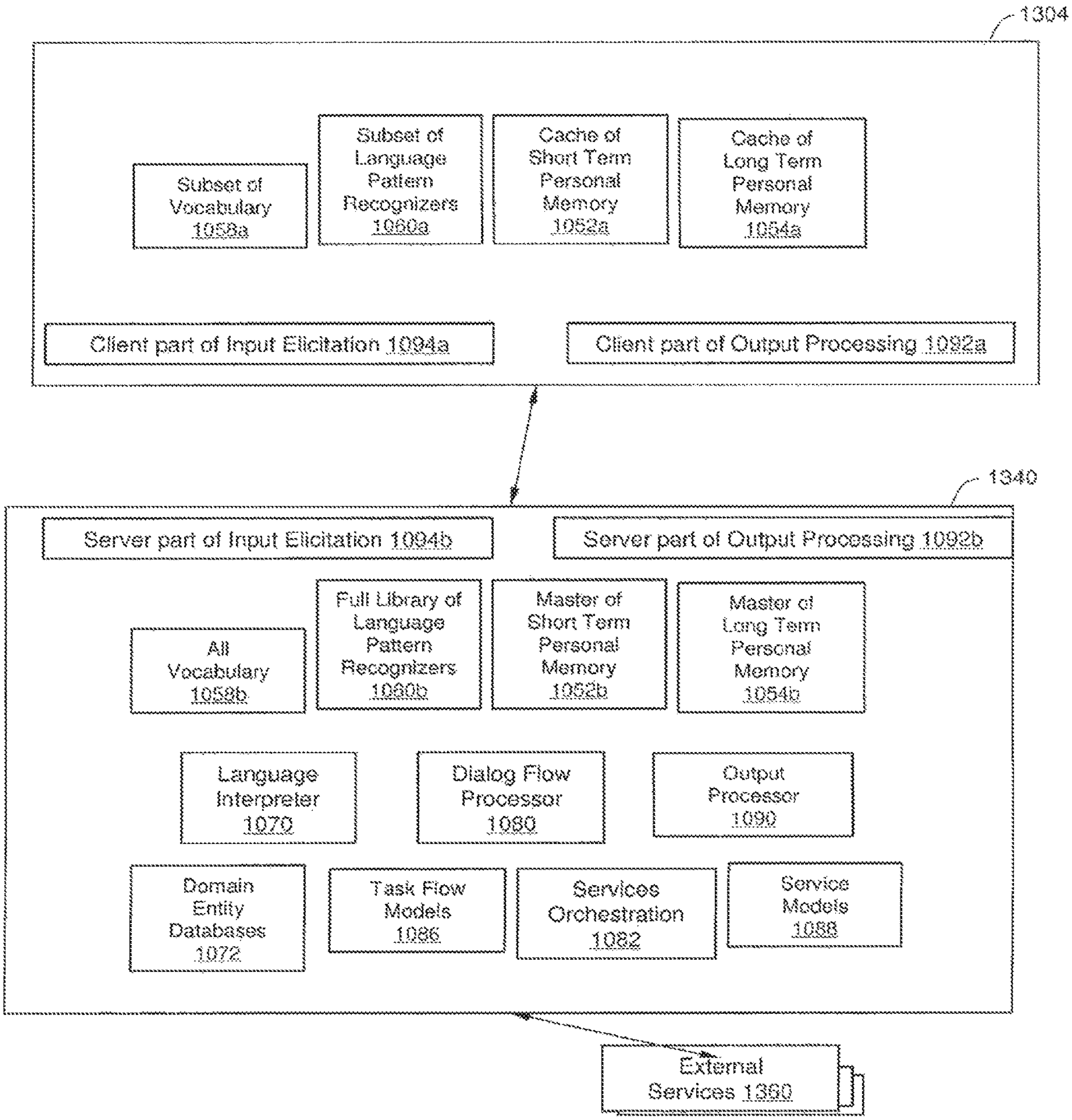
FIG. 7 is a block diagram depicting a client and a server, which communicate with each other to implement the present invention according to one embodiment.

In various embodiments, functionality for implementing the techniques of the present invention can be distributed among any number of client and/or server components. For example, various software modules can be implemented for performing various functions in connection with the present invention, and such modules can be variously implemented to run on server and/or client components. Referring now to FIG. 7, there is shown an example of a client 1304 and a server 1340, which communicate with each other to implement the present invention according to one embodiment. FIG. 7 depicts one possible arrangement by which software modules can be distributed among client 1304 and server 1340. One skilled in the art will recognize that the depicted arrangement is merely exemplary, and that such modules can be distributed in many different ways. In addition, any number of clients 1304 and/or servers 1340 can be provided, and the modules can be distributed among these clients 1304 and/or servers 1340 in any of a number of different ways.

In the example of FIG. 7, input elicitation functionality and output processing functionality are distributed among client 1304 and server 1340, with client part of input elicitation 1094*a* and client part of output processing 1092*a* located at client 1304, and server part of input elicitation 1094*b* and server part of output processing 1092*b* located at server 1340. The following components are located at server 1340:

complete vocabulary 1058*b;* complete library of language pattern recognizers 1060*b;* master version of short term personal memory 1052*b;* master version of long term personal memory 1054*b*.

In one embodiment, client 1304 maintains subsets and/or portions of these components locally, to improve responsiveness and reduce dependence on network communications. Such subsets and/or portions can be maintained and updated according to well-known cache management techniques. Such subsets and/or portions include, for example:

subset of vocabulary 1058*a;* subset of library of language pattern recognizers 1060*a;* cache of short term personal memory 1052*a;* cache of long term personal memory 1054*a*.

Additional components may be implemented as part of server 1340, including for example:

language interpreter 1070;

dialog flow processor 1080;

output processor 1090;

domain entity databases 1072;

task flow models 1086;

services orchestration 1082;

service capability models 1088.

Each of these components will be described in more detail below. Server 1340 obtains additional information by interfacing with external services 1360 when needed.

Conceptual Architecture

Referring now to FIG. 1, there is shown a simplified block diagram of a specific example embodiment of an intelligent automated assistant 1002. As described in greater detail herein, different embodiments of intelligent automated assistant systems may be configured, designed, and/or operable to provide various different types of operations, functionalities, and/or features generally relating to intelligent automated assistant technology. Further, as described in greater detail herein, many of the various operations, functionalities, and/or features of the intelligent automated assistant system(s) disclosed herein may provide may enable or provide different types of advantages and/or benefits to different entities interacting with the intelligent automated assistant system(s). The embodiment shown in FIG. 1 may be implemented using any of the hardware architectures described above, or using a different type of hardware architecture.

For example, according to different embodiments, at least some intelligent automated assistant system(s) may be configured, designed, and/or operable to provide various different types of operations, functionalities, and/or features, such as, for example, one or more of the following (or combinations thereof):

automate the application of data and services available over the Internet to discover, find, choose among, purchase, reserve, or order products and services. In addition to automating the process of using these data and services, intelligent automated assistant 1002 may also enable the combined use of several sources of data and services at once. For example, it may combine information about products from several review sites, check prices and availability from multiple distributors, and check their locations and time constraints, and help a user find a personalized solution to their problem.

automate the use of data and services available over the Internet to discover, investigate, select among, reserve, and otherwise learn about things to do (including but not limited to movies, events, performances, exhibits, shows and attractions); places to go (including but not limited to travel destinations, hotels and other places to stay, landmarks and other sites of interest, and the like); places to eat or drink (such as restaurants and bars), times and places to meet others, and any other source of entertainment or social interaction which may be found on the Internet.

enable the operation of applications and services via natural language dialog that are otherwise provided by dedicated applications with graphical user interfaces including search (including location-based search); navigation (maps and directions); database lookup (such as finding businesses or people by name or other properties); getting weather conditions and forecasts, checking the price of market items or status of financial transactions; monitoring traffic or the status of flights; accessing and updating calendars and schedules; managing reminders, alerts, tasks and projects; communicating over email or other messaging platforms; and operating devices locally or remotely (e.g., dialing telephones, controlling light and temperature, controlling home security devices, playing music or video, and the like). In one embodiment, assistant 1002 can be used to initiate, operate, and control many functions and apps available on the device.

offer personal recommendations for activities, products, services, source of entertainment, time management, or any other kind of recommendation service that benefits from an interactive dialog in natural language and automated access to data and services.

According to different embodiments, at least a portion of the various types of functions, operations, actions, and/or other features provided by intelligent automated assistant 1002 may be implemented at one or more client systems(s), at one or more server systems (s), and/or combinations thereof.

Figure 33:
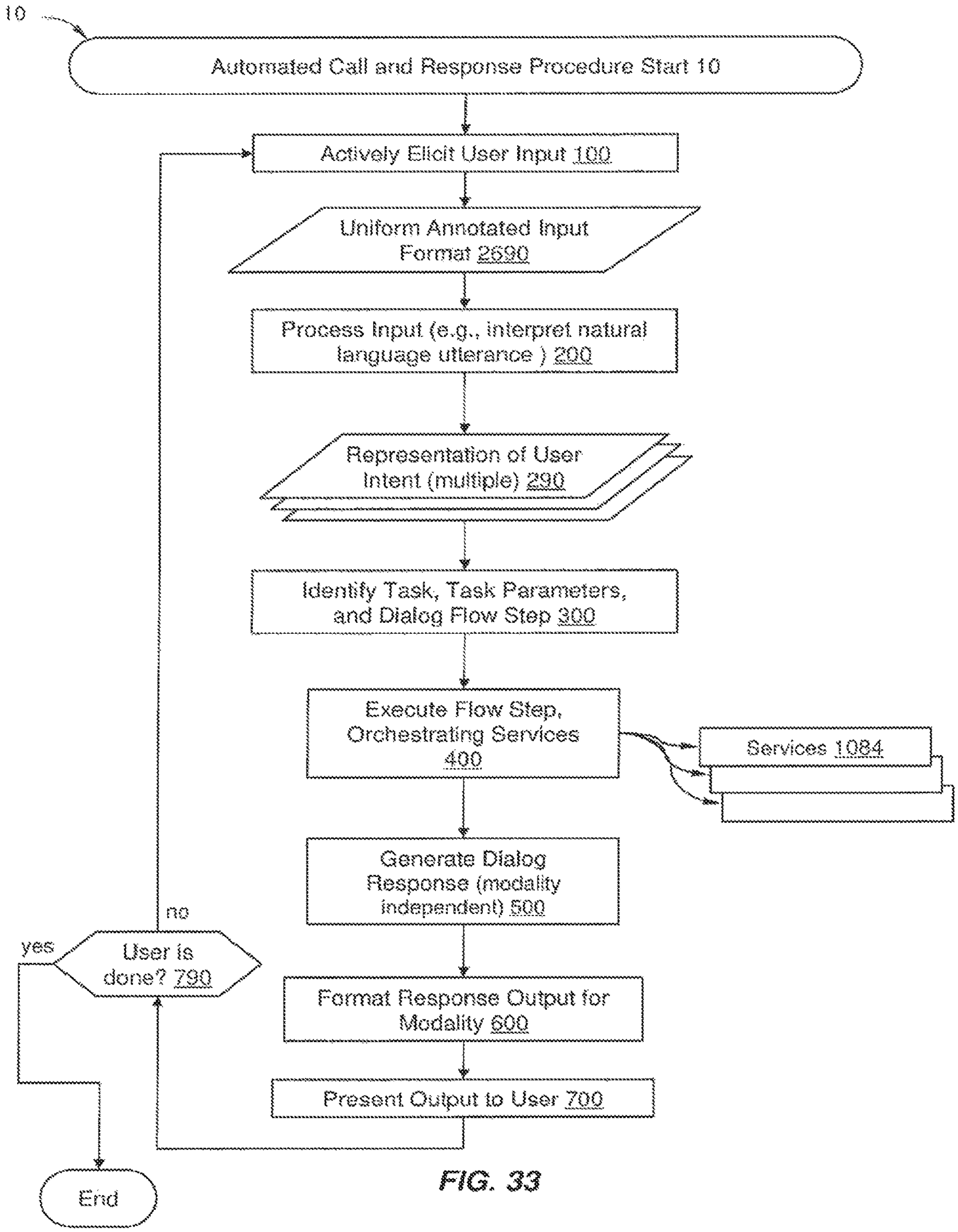
FIG. 33 is a flow diagram depicting an automatic call and response procedure, according to one embodiment.

According to different embodiments, at least a portion of the various types of functions, operations, actions, and/or other features provided by assistant 1002 may implement by at least one embodiment of an automated call and response procedure, such as that illustrated and described, for example, with respect to FIG. 33.

Additionally, various embodiments of assistant 1002 described herein may include or provide a number of different advantages and/or benefits over currently existing intelligent automated assistant technology such as, for example, one or more of the following (or combinations thereof):

The integration of speech-to-text and natural language understanding technology that is constrained by a set of explicit models of domains, tasks, services, and dialogs. Unlike assistant technology that attempts to implement a general-purpose artificial intelligence system, the embodiments described herein may apply the multiple sources of constraints to reduce the number of solutions to a more tractable size. This results in fewer ambiguous interpretations of language, fewer relevant domains or tasks, and fewer ways to operationalize the intent in services. The focus on specific domains, tasks, and dialogs also makes it feasible to achieve coverage over domains and tasks with human-managed vocabulary and mappings from intent to services parameters.

The ability to solve user problems by invoking services on their behalf over the Internet, using APIs. Unlike search engines which only return links and content, some embodiments of automated assistants 1002 described herein may automate research and problem-solving activities. The ability to invoke multiple services for a given request also provides broader functionality to the user than is achieved by visiting a single site, for instance to produce a product or service or find something to do.

The application of personal information and personal interaction history in the interpretation and execution of user requests. Unlike conventional search engines or question answering services, the embodiments described herein use information from personal interaction history (e.g., dialog history, previous selections from results, and the like), personal physical context (e.g., user's location and time), and personal information gathered in the context of interaction (e.g., name, email addresses, physical addresses, phone numbers, account numbers, preferences, and the like). Using these sources of information enables, for example, better interpretation of user input (e.g., using personal history and physical context when interpreting language);

more personalized results (e.g., that bias toward preferences or recent selections);

improved efficiency for the user (e.g., by automating steps involving the signing up to services or filling out forms).

The use of dialog history in interpreting the natural language of user inputs. Because the embodiments may keep personal history and apply natural language understanding on user inputs, they may also use dialog context such as current location, time, domain, task step, and task parameters to interpret the new inputs. Conventional search engines and command processors interpret at least one query independent of a dialog history. The ability to use dialog history may make a more natural interaction possible, one which resembles normal human conversation.

Active input elicitation, in which assistant 1002 actively guides and constrains the input from the user, based on the same models and information used to interpret their input. For example, assistant 1002 may apply dialog models to suggest next steps in a dialog with the user in which they are refining a request; offer completions to partially typed input based on domain and context specific possibilities; or use semantic interpretation to select from among ambiguous interpretations of speech as text or text as intent.

The explicit modeling and dynamic management of services, with dynamic and robust services orchestration. The architecture of embodiments described enables assistant 1002 to interface with many external services, dynamically determine which services may provide information for a specific user request, map parameters of the user request to different service APIs, call multiple services at once, integrate results from multiple services, fail over gracefully on failed services, and/or efficiently maintain the implementation of services as their APIs and capabilities evolve.

The use of active ontologies as a method and apparatus for building assistants 1002, which simplifies the software engineering and data maintenance of automated assistant systems. Active ontologies are an integration of data modeling and execution environments for assistants. They provide a framework to tie together the various sources of models and data (domain concepts, task flows, vocabulary, language pattern recognizers, dialog context, user personal information, and mappings from domain and task requests to external services. Active ontologies and the other architectural innovations described herein make it practical to build deep functionality within domains, unifying multiple sources of information and services, and to do this across a set of domains.

In at least one embodiment, intelligent automated assistant 1002 may be operable to utilize and/or generate various different types of data and/or other types of information when performing specific tasks and/or operations. This may include, for example, input data/information and/or output data/information. For example, in at least one embodiment, intelligent automated assistant 1002 may be operable to access, process, and/or otherwise utilize information from one or more different types of sources, such as, for example, one or more local and/or remote memories, devices and/or systems. Additionally, in at least one embodiment, intelligent automated assistant 1002 may be operable to generate one or more different types of output data/information, which, for example, may be stored in memory of one or more local and/or remote devices and/or systems.

Examples of different types of input data/information which may be accessed and/or utilized by intelligent automated assistant 1002 may include, but are not limited to, one or more of the following (or combinations thereof):

- Voice input: from mobile devices such as mobile telephones and tablets, computers with microphones, Bluetooth headsets, automobile voice control systems, over the telephone system, recordings on answering services, audio voicemail on integrated messaging services, consumer applications with voice input such as clock radios, telephone station, home entertainment control systems, and game consoles.
- Text input from keyboards on computers or mobile devices, keypads on remote controls or other consumer electronics devices, email messages sent to the assistant, instant messages or similar short messages sent to the assistant, text received from players in multiuser game environments, and text streamed in message feeds.
- Location information coming from sensors or location-based systems. Examples include Global Positioning System (GPS) and Assisted GPS (A-GPS) on mobile phones. In one embodiment, location information is combined with explicit user input. In one embodiment, the system of the present invention is able to detect when a user is at home, based on known address information and current location determination. In this manner, certain inferences may be made about the type of information the user might be interested in when at home as opposed to outside the home, as well as the type of services and actions that should be invoked on behalf of the user depending on whether or not he or she is at home.
- Time information from clocks on client devices. This may include, for example, time from telephones or other client devices indicating the local time and time zone. In addition, time may be used in the context of user requests, such as for instance, to interpret phrases such as "in an hour" and "tonight".
- Compass, accelerometer, gyroscope, and/or travel velocity data, as well as other sensor data from mobile or handheld devices or embedded systems such as automobile control systems. This may also include device positioning data from remote controls to appliances and game consoles.
- Clicking and menu selection and other events from a graphical user interface (GUI) on any device having a GUI. Further examples include touches to a touch screen.
- Events from sensors and other data-driven triggers, such as alarm clocks, calendar alerts, price change triggers, location triggers, push notification onto a device from servers, and the like.

The input to the embodiments described herein also includes the context of the user interaction history, including dialog and request history.

Examples of different types of output data/information which may be generated by intelligent automated assistant 1002 may include, but are not limited to, one or more of the following (or combinations thereof):

- Text output sent directly to an output device and/or to the user interface of a device
- Text and graphics sent to a user over email
- Text and graphics send to a user over a messaging service
- Speech output, may include one or more of the following (or combinations thereof):
  - Synthesized speech
  - Sampled speech
  - Recorded messages
- Graphical layout of information with photos, rich text, videos, sounds, and hyperlinks. For instance, the content rendered in a web browser.
- Actuator output to control physical actions on a device, such as causing it to turn on or off, make a sound, change color, vibrate, control a light, or the like.
- Invoking other applications on a device, such as calling a mapping application, voice dialing a telephone, sending an email or instant message, playing media, making entries in calendars, task managers, and note applications, and other applications.
- Actuator output to control physical actions to devices attached or controlled by a device, such as operating a remote camera, controlling a wheelchair, playing music on remote speakers, playing videos on remote displays, and the like.

It may be appreciated that the intelligent automated assistant 1002 of FIG. 1 is but one example from a wide range of intelligent automated assistant system embodiments which may be implemented. Other embodiments of the intelligent automated assistant system (not shown) may include additional, fewer and/or different components/features than those illustrated, for example, in the example intelligent automated assistant system embodiment of FIG. 1.

User Interaction

Figure 2:
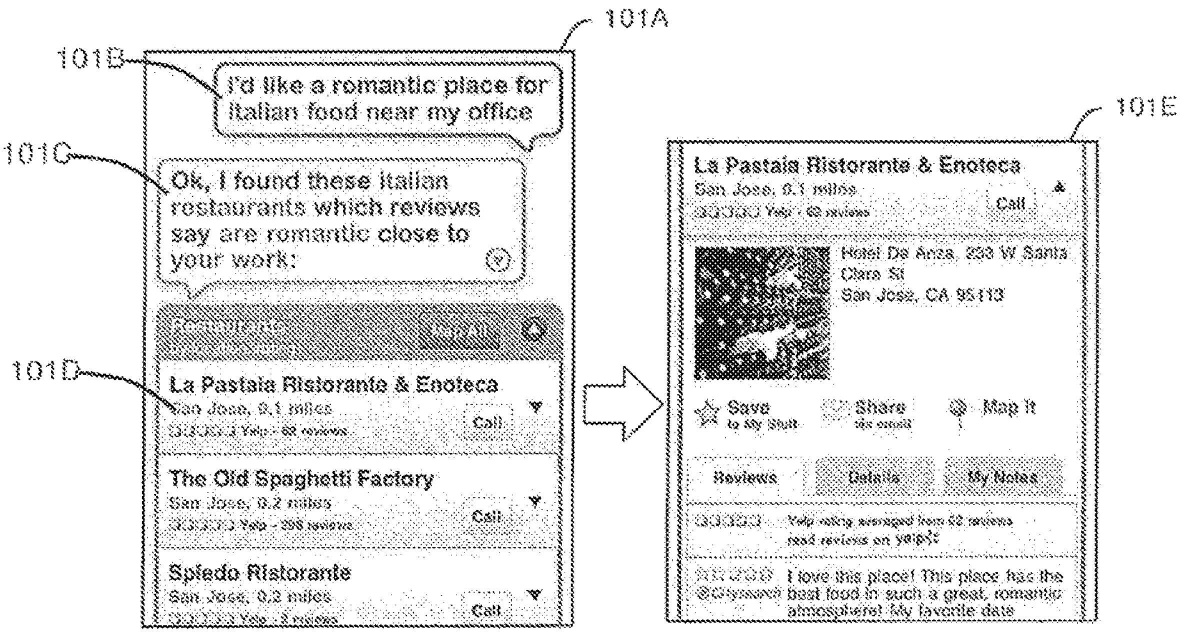
FIG. 2 illustrates an example of an interaction between a user and an intelligent automated assistant according to at least one embodiment.

Referring now to FIG. 2, there is shown an example of an interaction between a user and at least one embodiment of an intelligent automated assistant 1002. The example of FIG. 2 assumes that a user is speaking to intelligent automated assistant 1002 using input device 1206 (FIG. 4), which may be a speech input mechanism, and the output is graphical layout to output device 1207 (FIG. 4), which may be a scrollable screen. Conversation screen 101A features a conversational user interface showing what the user said 101B ("I'd like a romantic place for Italian food near my office") and assistant's 1002 response, which is a summary of its findings 101C ("OK, I found these Italian restaurants which reviews say are romantic close to your work:") and a set of results 101D (the first three of a list of restaurants are shown). In this example, the user clicks on the first result in the list, and the result automatically opens up to reveal more information about the restaurant, shown in information screen 101E. Information screen 101E and conversation screen 101A may appear on the same output device, such as a touch-screen or other display device; the examples depicted in FIG. 2 are two different output states for the same output device.

In one embodiment, information screen 101E shows information gathered and combined from a variety of services, including for example, any or all of the following:

- Addresses and geolocations of businesses;
- Distance from user's current location;
- Reviews from a plurality of sources;

In one embodiment, information screen 101E also includes some examples of services that assistant 1002 might offer on behalf of the user, including:

- Dial a telephone to call the business ("call");
- Remember this restaurant for future reference ("save");
- Send an email to someone with the directions and information about this restaurant ("share");
- Show the location of and directions to this restaurant on a map ("map it");
- Save personal notes about this restaurant ("my notes").

As shown in the example of FIG. 2, in one embodiment, assistant 1002 includes intelligence beyond simple database applications, such as, for example,

- Processing a statement of intent in a natural language 101B, not just keywords;
- Inferring semantic intent from that language input, such as interpreting "place for Italian food" as "Italian restaurants";
- Operationalizing semantic intent into a strategy for using online services and executing that strategy on behalf of the user (e.g., operationalizing the desire for a romantic place into the strategy of checking on-line review sites for reviews that describe a place as "romantic").

Intelligent Automated Assistant Components

According to various embodiments, intelligent automated assistant 1002 may include a plurality of different types of components, devices, modules, processes, systems, and the like, which, for example, may be implemented and/or instantiated via the use of hardware and/or combinations of hardware and software. For example, as illustrated in the example embodiment of FIG. 1, assistant 1002 may include one or more of the following types of systems, components, devices, processes, and the like (or combinations thereof):

- One or more active ontologies 1050;
- Active input elicitation component(s) 1094 (may include client part 1094*a* and server part 1094*b*);
- Short term personal memory component(s) 1052 (may include master version 1052*b* and cache 1052*a*);
- Long-term personal memory component(s) 1054 (may include master version 1052*b* and cache 1052*a*);
- Domain models component(s) 1056;
- Vocabulary component(s) 1058 (may include complete vocabulary 105 8*b* and subset 1058*a*);
- Language pattern recognizer(s) component(s) 1060 (may include full library 1060*b* and subset 1560*a*);
- Language interpreter component(s) 1070;
- Domain entity database(s) 1072;
- Dialog flow processor component(s) 1080;
- Services orchestration component(s) 1082;
- Services component(s) 1084;
- Task flow models component(s) 1086;
- Dialog flow models component(s) 1087;
- Service models component(s) 1088;
- Output processor component(s) 1090.

As described in connection with FIG. 7, in certain client/server-based embodiments, some or all of these components may be distributed between client 1304 and server 1340.

For purposes of illustration, at least a portion of the different types of components of a specific example embodiment of intelligent automated assistant 1002 will now be described in greater detail with reference to the example intelligent automated assistant 1002 embodiment of FIG. 1.

Active Ontologies 1050

Active ontologies 1050 serve as a unifying infrastructure that integrates models, components, and/or data from other parts of embodiments of intelligent automated assistants 1002. In the field of computer and information science, ontologies provide structures for data and knowledge representation such as classes/types, relations, attributes/properties and their instantiation in instances. Ontologies are used, for example, to build models of data and knowledge. In some embodiments of the intelligent automated system 1002, ontologies are part of the modeling framework in which to build models such as domain models.

Within the context of the present invention, an "active ontology" 1050 may also serve as an execution environment, in which distinct processing elements are arranged in an ontology-like manner (e.g., having distinct attributes and relations with other processing elements). These processing elements carry out at least some of the tasks of intelligent automated assistant 1002. Any number of active ontologies 1050 can be provided.

In at least one embodiment, active ontologies 1050 may be operable to perform and/or implement various types of functions, operations, actions, and/or other features such as, for example, one or more of the following (or combinations thereof):

- Act as a modeling and development environment, integrating models and data from various model and data components, including but not limited to
  - Domain models 1056
  - Vocabulary 1058
  - Domain entity databases 1072
  - Task flow models 1086
  - Dialog flow models 1087
  - Service capability models 1088
- Act as a data-modeling environment on which ontology-based editing tools may operate to develop new models, data structures, database schemata, and representations.
- Act as a live execution environment, instantiating values for elements of domain 1056, task 1086, and/or dialog models 1087, language pattern recognizers, and/or vocabulary 1058, and user-specific information such as that found in short term personal memory 1052, long term personal memory 1054, and/or the results of service orchestration 1082. For example, some nodes of an active ontology may correspond to domain concepts such as restaurant and its property restaurant name. During live execution, these active ontology nodes may be instantiated with the identity of a particular restaurant entity and its name, and how its name corresponds to words in a natural language input utterance. Thus, in this embodiment, the active ontology is serving as both a modeling environment specifying the concept that restaurants are entities with identities that have names, and for storing dynamic bindings of those modeling nodes with data from entity databases and parses of natural language.

Enable the communication and coordination among components and processing elements of an intelligent automated assistant, such as, for example, one or more of the following (or combinations thereof):

Active input elicitation component(s) 1094

Language interpreter component(s) 1070

Dialog flow processor component(s) 1080

Services orchestration component(s) 1082

Services component(s) 1084

In one embodiment, at least a portion of the functions, operations, actions, and/or other features of active ontologies 1050 described herein may be implemented, at least in part, using various methods and apparatuses described in U.S. patent application Ser. No. 11/518,292 for "Method and Apparatus for Building an Intelligent Automated Assistant," filed Sep. 8, 2006.

In at least one embodiment, a given instance of active ontology 1050 may access and/or utilize information from one or more associated databases. In at least one embodiment, at least a portion of the database information may be accessed via communication with one or more local and/or remote memory devices. Examples of different types of data which may be accessed by active ontologies 1050 may include, but are not limited to, one or more of the following (or combinations thereof):

Static data that is available from one or more components of intelligent automated assistant 1002;

Data that is dynamically instantiated per user session, for example, but not limited to, maintaining the state of the user-specific inputs and outputs exchanged among components of intelligent automated assistant 1002, the contents of short term personal memory, the inferences made from previous states of the user session, and the like.

In this manner, active ontologies 1050 are used to unify elements of various components in intelligent automated assistant 1002. An active ontology 1050 allows an author, designer, or system builder to integrate components so that the elements of one component are identified with elements of other components. The author, designer, or system builder can thus combine and integrate the components more easily.

Figure 8:
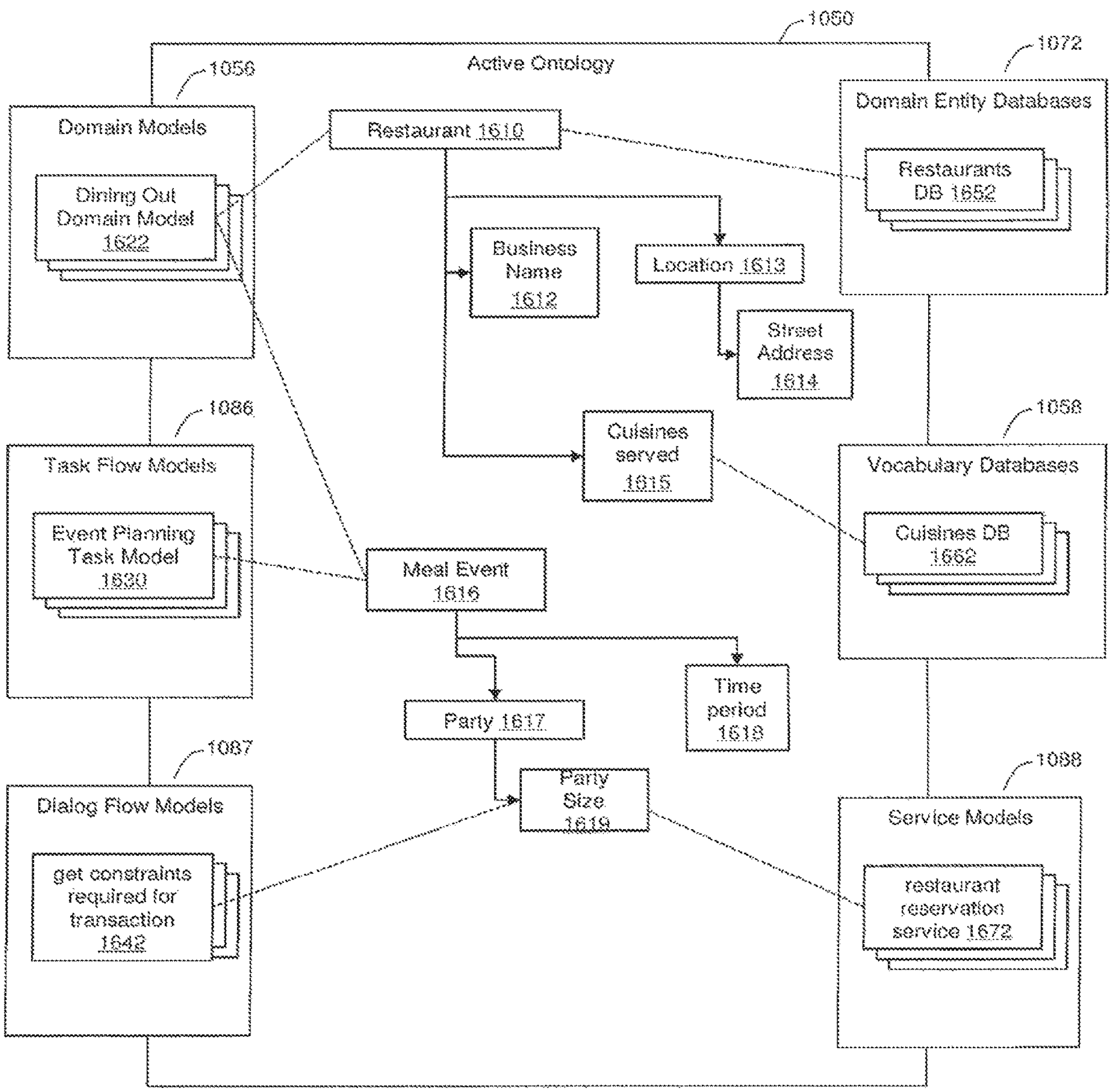
FIG. 8 is a block diagram depicting a fragment of an active ontology ac-cording to one embodiment.

Referring now to FIG. 8, there is shown an example of a fragment of an active ontology 1050 according to one embodiment. This example is intended to help illustrate some of the various types of functions, operations, actions, and/or other features that may be provided by active ontologies 1050.

Active ontology 1050 in FIG. 8 includes representations of a restaurant and meal event. In this example, a restaurant is a concept 1610 with properties such as its name 1612, cuisines served 1615, and its location 1613, which in turn might be modeled as a structured node with properties for street address 1614. The concept of a meal event might be modeled as a node 1616 including a dining party 1617 (which has a size 1619) and time period 1618.

Active ontologies may include and/or make reference to domain models 1056. For example, FIG. 8 depicts a dining out domain model 1622 linked to restaurant concept 1610 and meal event concept 1616. In this instance, active ontology 1050 includes dining out domain model 1622; specifically, at least two nodes of active ontology 1050, namely restaurant 1610 and meal event 1616, are also included in and/or referenced by dining out domain model 1622. This domain model represents, among other things, the idea that dining out involves meal event that occur at restaurants. The active ontology nodes restaurant 1610 and meal event 1616 are also included and/or referenced by other components of the intelligent automated assistant, a shown by dotted lines in FIG. 8.

Active ontologies may include and/or make reference to task flow models 1086. For example, FIG. 8 depicts an event planning task flow model 1630, which models the planning of events independent of domains, applied to a domain-specific kind of event: meal event 1616. Here, active ontology 1050 includes general event planning task flow model 1630, which comprises nodes representing events and other concepts involved in planning them. Active ontology 1050 also includes the node meal event 1616, which is a particular kind of event. In this example, meal event 1616 is included or made reference to by both domain model 1622 and task flow model 1630, and both of these models are included in and/or referenced by active ontology 1050. Again, meal event 1616 is an example of how active ontologies can unify elements of various components included and/or referenced by other components of the intelligent automated assistant, a shown by dotted lines in FIG. 8.

Active ontologies may include and/or make reference to dialog flow models 1087. For example, FIG. 8 depicts a dialog flow model 1642 for getting the values of constraints required for a transaction instantiated on the constraint party size as represented in concept 1619. Again, active ontology 1050 provides a framework for relating and unifying various components such as dialog flow models 1087. In this case, dialog flow model 1642 has a general concept of a constraint that is instantiated in this particular example to the active ontology node party size 1619. This particular dialog flow model 1642 operates at the abstraction of constraints, independent of domain. Active ontology 1050 represents party size property 1619 of party node 1617, which is related to meal event node 1616. In such an embodiment, intelligent automated assistant 1002 uses active ontology 1050 to unify the concept of constraint in dialog flow model 1642 with the property of party size 1619 as part of a cluster of nodes representing meal event concept 1616, which is part of the domain model 1622 for dining out.

Active ontologies may include and/or make reference to service models 1088. For example, FIG. 8 depicts a model of a restaurant reservation service 1672 associated with the dialog flow step for getting values required for that service to perform a transaction. In this instance, service model 1672 for a restaurant reservation service specifies that a reservation requires a value for party size 1619 (the number of people sitting at a table to reserve). The concept party size 1619, which is part of active ontology 1050, also is linked or related to a general dialog flow model 1642 for asking the user about the constraints for a transaction; in this instance, the party size is a required constraint for dialog flow model 1642.

Active ontologies may include and/or make reference to domain entity databases 1072. For example, FIG. 8 depicts a domain entity database of restaurants 1652 associated with restaurant node 1610 in active ontology 1050. Active ontology 1050 represents the general concept of restaurant 1610, as may be used by the various components of intelligent automated assistant

1002, and it is instantiated by data about specific restaurants in restaurant database 1652.

Active ontologies may include and/or make reference to vocabulary databases 1058. For example, FIG. 8 depicts a vocabulary database of cuisines 1662, such as Italian, French, and the like, and the words associated with each cuisine such as "French", "continental", "provincial", and the like. Active ontology 1050 includes restaurant node 1610, which is related to cuisines served node 1615, which is associated with the representation of cuisines in cuisines database 1662. A specific entry in database 1662 for a cuisine, such as "French", is thus related through active ontology 1050 as an instance of the concept of cuisines served 1615.

Active ontologies may include and/or make reference to any database that can be mapped to concepts or other representations in ontology 1050. Domain entity databases 1072 and vocabulary databases 1058 are merely two examples of how active ontology 1050 may integrate databases with each other and with other components of automated assistant 1002. Active ontologies allow the author, designer, or system builder to specify a nontrivial mapping between representations in the database and representations in ontology 1050. For example, the database schema for restaurants database 1652 may represent a restaurant as a table of strings and numbers, or as a projection from a larger database of business, or any other representation suitable for database 1652. In this example active ontology 1050, restaurant 1610 is a concept node with properties and relations, organized differently from the database tables. In this example, nodes of ontology 1050 are associated with elements of database schemata. The integration of database and ontology 1050 provides a unified representation for interpreting and acting on specific data entries in databases in terms of the larger sets of models and data in active ontology 1050. For instance, the word "French" may be an entry in cuisines database 1662. Because, in this example, database 1662 is integrated in active ontology 1050, that same word "French" also has an interpretation as a possible cuisine served at a restaurant, which is involved in planning meal events, and this cuisine serves as a constraint to use when using restaurants reservation services, and so forth. Active ontologies can thus integrate databases into the modeling and execution environment to inter-operate with other components of automated assistant 1002.

As described above, active ontology 1050 allows the author, designer, or system builder to integrate components; thus, in the example of FIG. 8, the elements of a component such as constraint in dialog flow model 1642 can be identified with elements of other components such as required parameter of restaurant reservation service 1672.

Active ontologies 1050 may be embodied as, for example, configurations of models, databases, and components in which the relationships among models, databases, and components are any of:

- containership and/or inclusion;
- relationship with links and/or pointers;
- interface over APIs, both internal to a program and between programs.

Figure 9:
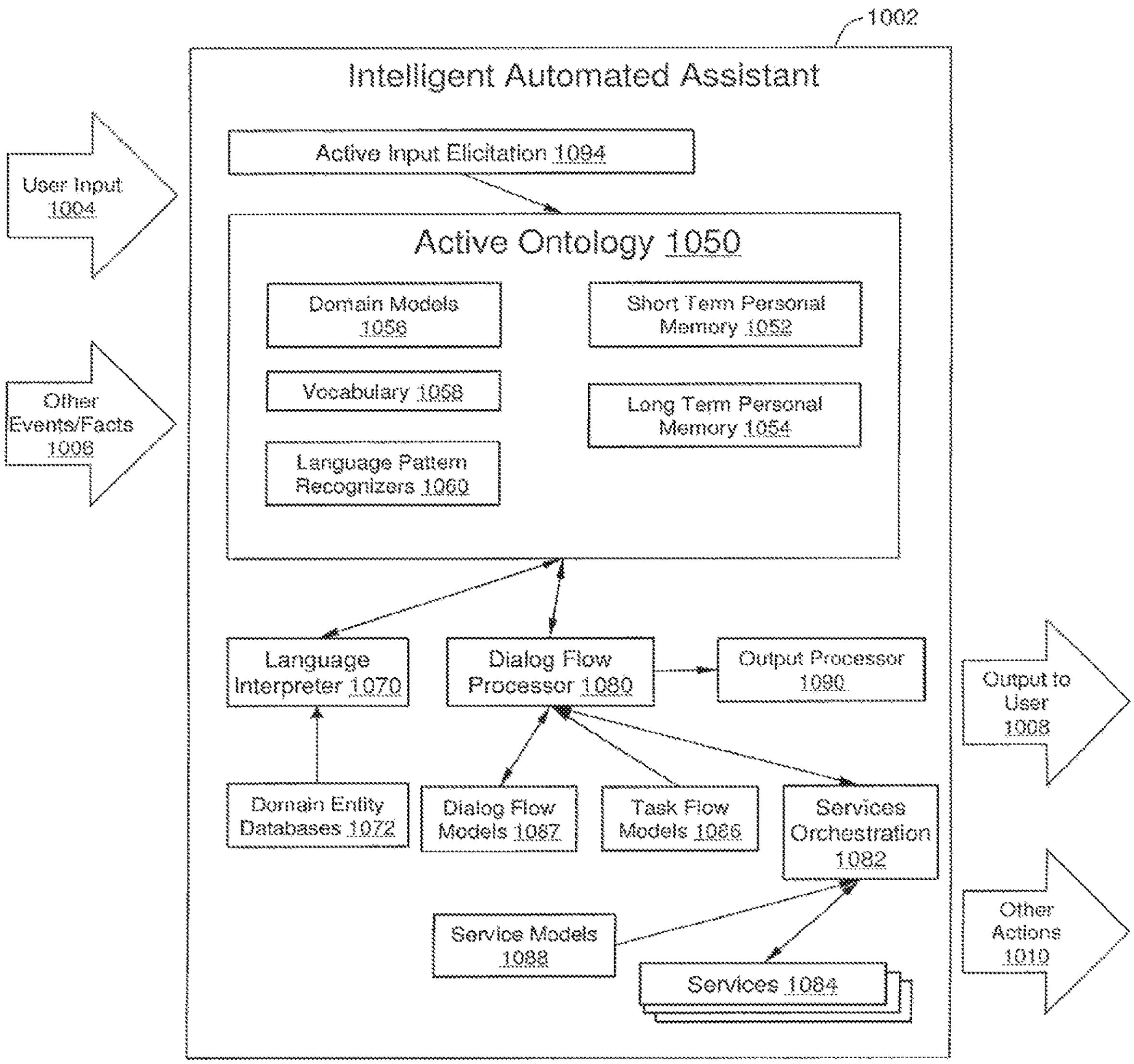
FIG. 9 is a block diagram depicting an example of an alternative embodiment of an intelligent automated assistant system.

For example, referring now to FIG. 9, there is shown an example of an alternative embodiment of intelligent automated assistant system 1002, wherein domain models 1056, vocabulary 1058, language pattern recognizers 1060, short term personal memory 1052, and long term personal memory 1054 components are organized under a common container associated with active ontology 1050, and other components such as active input elicitation component(s) 1094, language interpreter 1070 and dialog flow processor 1080 are associated with active ontology 1050 via API relationships.

Active Input Elicitation Component(s) 1094

In at least one embodiment, active input elicitation component(s) 1094 (which, as described above, may be implemented in a stand-alone configuration or in a configuration including both server and client components) may be operable to perform and/or implement various types of functions, operations, actions, and/or other features such as, for example, one or more of the following (or combinations thereof):

- Elicit, facilitate and/or process input from the user or the user's environment, and/or information about their need(s) or request(s). For example, if the user is looking to find a restaurant, the input elicitation module may get information about the user's constraints or preferences for location, time, cuisine, price, and so forth.
- Facilitate different kinds of input from various sources, such as for example, one or more of the following (or combinations thereof):
  - input from keyboards or any other input device that generates text
  - input from keyboards in user interfaces that offer dynamic suggested completions of partial input
  - input from voice or speech input systems
  - input from Graphical User Interfaces (GUIs) in which users click, select, or otherwise directly manipulate graphical objects to indicate choices
  - input from other applications that generate text and send it to the automated assistant, including email, text messaging, or other text communication platforms By performing active input elicitation, assistant 1002 is able to disambiguate intent at an early phase of input processing. For example, in an embodiment where input is provided by speech, the waveform might be sent to a server 1340 where words are extracted, and semantic interpretation performed. The results of such semantic interpretation can then be used to drive active input elicitation, which may offer the user alternative candidate words to choose among based on their degree of semantic fit as well as phonetic match.

Figure 10:
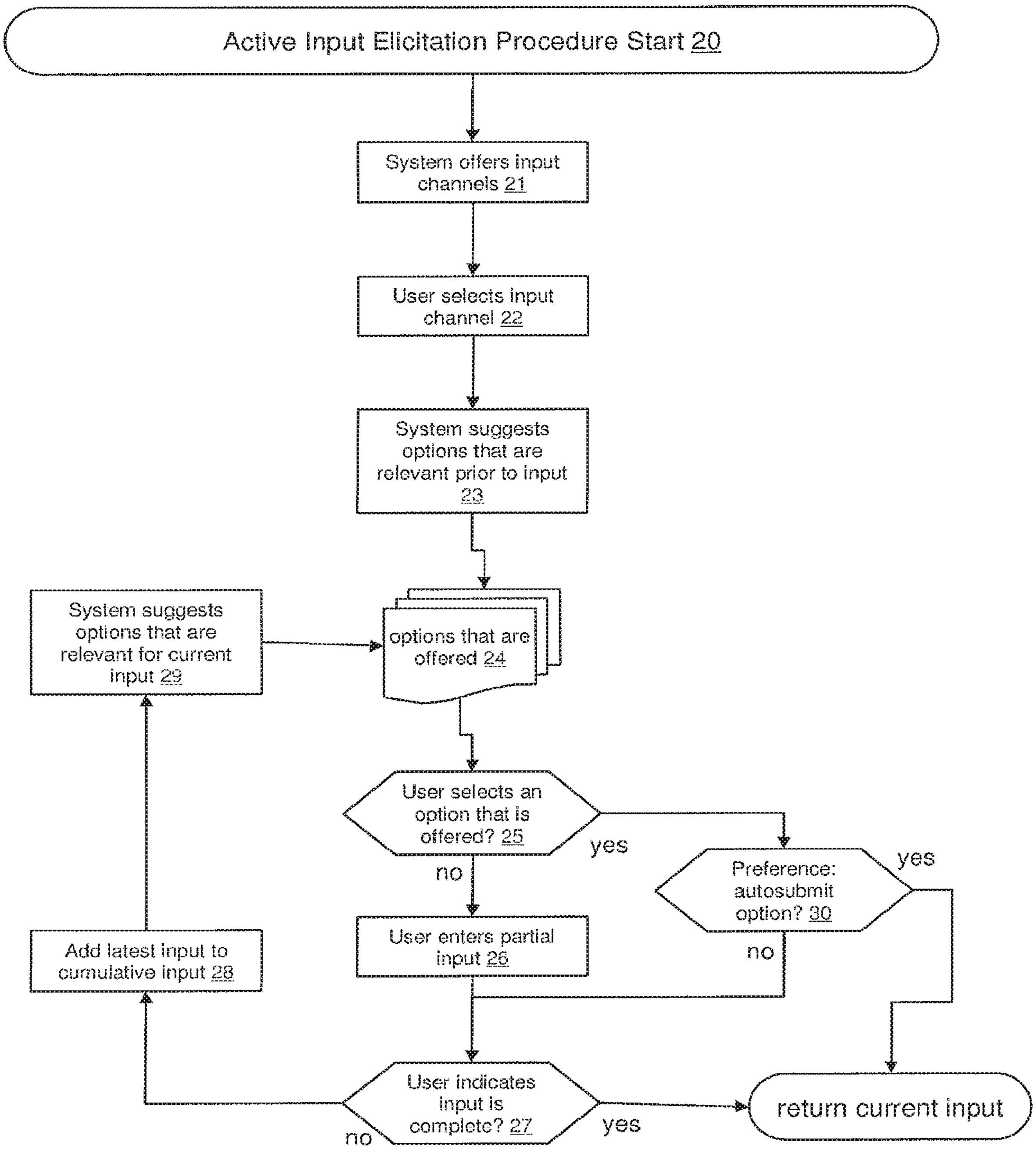
FIG. 10 is a flow diagram depicting a method of operation for active input elicitation component(s) according to one embodiment.

In at least one embodiment, active input elicitation component(s) 1094 actively, automatically, and dynamically guide the user toward inputs that may be acted upon by one or more of the services offered by embodiments of assistant 1002. Referring now to FIG. 10, there is shown a flow diagram depicting a method of operation for active input elicitation component(s) 1094 according to one embodiment.

The procedure begins 20. In step 21, assistant 1002 may offer interfaces on one or more input channels. For example, a user interface may offer the user options to speak or type or tap at any stage of a conversational interaction. In step 22, the user selects an input channel by initiating input on one modality, such as pressing a button to start recording speech or to bring up an interface for typing.

In at least one embodiment, assistant 1002 offers default suggestions for the selected modality 23. That is, it offers options 24 that are relevant in the current context prior to the user entering any input on that modality. For example, in a text input modality, assistant 1002 might offer a list of common words that would begin textual requests or commands such as, for example, one or more of the following (or combinations thereof): imperative verbs (e.g., find, buy, reserve, get, call, check, schedule, and the like), nouns (e.g., restaurants, movies, events, businesses, and the like), or menu-like options naming domains of discourse (e.g., weather, sports, news, and the like)

If the user selects one of the default options in 25, and a preference to autosubmit 30 is set, the procedure may return immediately. This is similar to the operation of a conventional menu selection.

However, the initial option may be taken as a partial input, or the user may have started to enter a partial input 26. At any point of input, in at least one embodiment, the user may choose to indicate that the partial input is complete 22, which causes the procedure to return.

In 28, the latest input, whether selected or entered, is added to the cumulative input.

In 29, the system suggestions next possible inputs that are relevant given the current input and other sources of constraints on what constitutes relevant and/or meaningful input.

In at least one embodiment, the sources of constraints on user input (for example, which are used in steps 23 and 29) are one or more of the various models and data sources that may be included in assistant 1002, which may include, but are not limited to, one or more of the following (or combinations thereof):

- Vocabulary 1058. For example, words or phrases that match the current input may be suggested. In at least one embodiment, vocabulary may be associated with any or one or more nodes of active ontologies, domain models, task models, dialog models, and/or service models.
- Domain models 1056, which may constrain the inputs that may instantiate or otherwise be consistent with the domain model. For example, in at least one embodiment, domain models 1056 may be used to suggest concepts, relations, properties, and/or instances that would be consistent with the current input.
- Language pattern recognizers 1060, which may be used to recognize idioms, phrases, grammatical constructs, or other patterns in the current input and be used to suggest completions that fill out the pattern.
- Domain entity databases 1072, which may be used to suggest possible entities in the domain that match the input (e.g., business names, movie names, event names, and the like).
- Short term memory 1052, which may be used to match any prior input or portion of prior input, and/or any other property or fact about the history of interaction with a user. For example, partial input may be matched against cities that the user has encountered in a session, whether hypothetically (e.g., mentioned in queries) and/or physically (e.g., as determined from location sensors).
- In at least one embodiment, semantic paraphrases of recent inputs, request, or results may be matched against the current input. For example, if the user had previously request "live music" and obtained concert listing, and then typed "music" in an active input elicitation environment, suggestions may include "live music" and/or "concerts".
- Long term personal memory 1054, which may be used to suggest matching items from long term memory. Such matching items may include, for example, one or more or any combination of: domain entities that are saved (e.g., "favorite" restaurants, movies, theaters, venues, and the like), to-do items, list items, calendar entries, people names in contacts/address books, street or city names mentioned in contact/address books, and the like.
- Task flow models 1086, which may be used to suggest inputs based on the next possible steps of in a task flow.
- Dialog flow models 1087, which may be used to suggest inputs based on the next possible steps of in a dialog flow.
- Service capability models 1088, which may be used to suggest possible services to employ, by name, category, capability, or any other property in the model. For example, a user may type part of the name of a preferred review site, and assistant 1002 may suggest a complete command for querying that review site for review.

In at least one embodiment, active input elicitation component(s) 1094 present to the user a conversational interface, for example, an interface in which the user and assistant communicate by making utterances back and forth in a conversational manner. Active input elicitation component(s) 1094 may be operable to perform and/or implement various types of conversational interfaces.

In at least one embodiment, active input elicitation component(s) 1094 may be operable to perform and/or implement various types of conversational interfaces in which assistant 1002 uses plies of the conversation to prompt for information from the user according to dialog models. Dialog models may represent a procedure for executing a dialog, such as, for example, a series of steps required to elicit the information needed to perform a service.

In at least one embodiment, active input elicitation component(s) 1094 offer constraints and guidance to the user in real time, while the user is in the midst of typing, speaking, or otherwise creating input. For example, active elicitation may guide the user to type text inputs that are recognizable by an embodiment of assistant 1002 and/or that may be serviced by one or more services offered by embodiments of assistant 1002. This is an advantage over passively waiting for unconstrained input from a user because it enables the user's efforts to be focused on inputs that may or might be useful, and/or it enables embodiments of assistant 1002 to apply its interpretations of the input in real time as the user is inputting it.

At least a portion of the functions, operations, actions, and/or other features of active input elicitation described herein may be implemented, at least in part, using various methods and apparatuses described in U.S. patent application Ser. No. 11/518,292 for "Method and Apparatus for Building an Intelligent Automated Assistant," filed Sep. 8, 2006.

According to specific embodiments, multiple instances or threads of active input elicitation component(s) 1094 may be concurrently implemented and/or initiated via the use of one or more processors 63 and/or other combinations of hardware and/or hardware and software.

According to different embodiments, one or more different threads or instances of active input elicitation component(s) 1094 may be initiated in response to detection of one or more conditions or events satisfying one or more different types of minimum threshold criteria for triggering initiation of at least one instance of active input elicitation component(s) 1094. Various examples of conditions or events which may trigger initiation and/or implementation of one or more different threads or instances of active input elicitation component(s) 1094 may include, but are not limited to, one or more of the following (or combinations thereof):

- Start of user session. For example, when the user session starts up an application that is an embodiment of assistant 1002, the interface may offer the opportunity for the user to initiate input, for example, by pressing a button to initiate a speech input system or clicking on a text field to initiate a text input session.
- User input detected.
- When assistant 1002 explicitly prompts the user for input, as when it requests a response to a question or offers a menu of next steps from which to choose.
- When assistant 1002 is helping the user perform a transaction and is gathering data for that transaction, e.g., filling in a form.

In at least one embodiment, a given instance of active input elicitation component(s) 1094 may access and/or utilize information from one or more associated databases. In at least one embodiment, at least a portion of the database information may be accessed via communication with one or more local and/or remote memory devices. Examples of different types of data which may be accessed by active input elicitation component(s) 1094 may include, but are not limited to, one or more of the following (or combinations thereof):

- database of possible words to use in a textual input;
- grammar of possible phrases to use in a textual input utterance;
- database of possible interpretations of speech input;
- database of previous inputs from a user or from other users;
- data from any of the various models and data sources that may be part of embodiments of assistant 1002, which may include, but are not limited to, one or more of the following (or combinations thereof):
- Domain models 1056;
- Vocabulary 1058;
- Language pattern recognizers 1060;
- Domain entity databases 1072;
- Short term memory 1052;
- Long term personal memory 1054;
- Task flow models 1086;
- Dialog flow models 1087;
- Service capability models 1088.

According to different embodiments, active input elicitation component(s) 1094 may apply active elicitation procedures to, for example, one or more of the following (or combinations thereof):

- typed input;
- speech input;
- input from graphical user interfaces (GUIs), including gestures;
- input from suggestions offered in a dialog; and
- events from the computational and/or sensed environments.

Active Typed Input Elicitation

Figure 11:
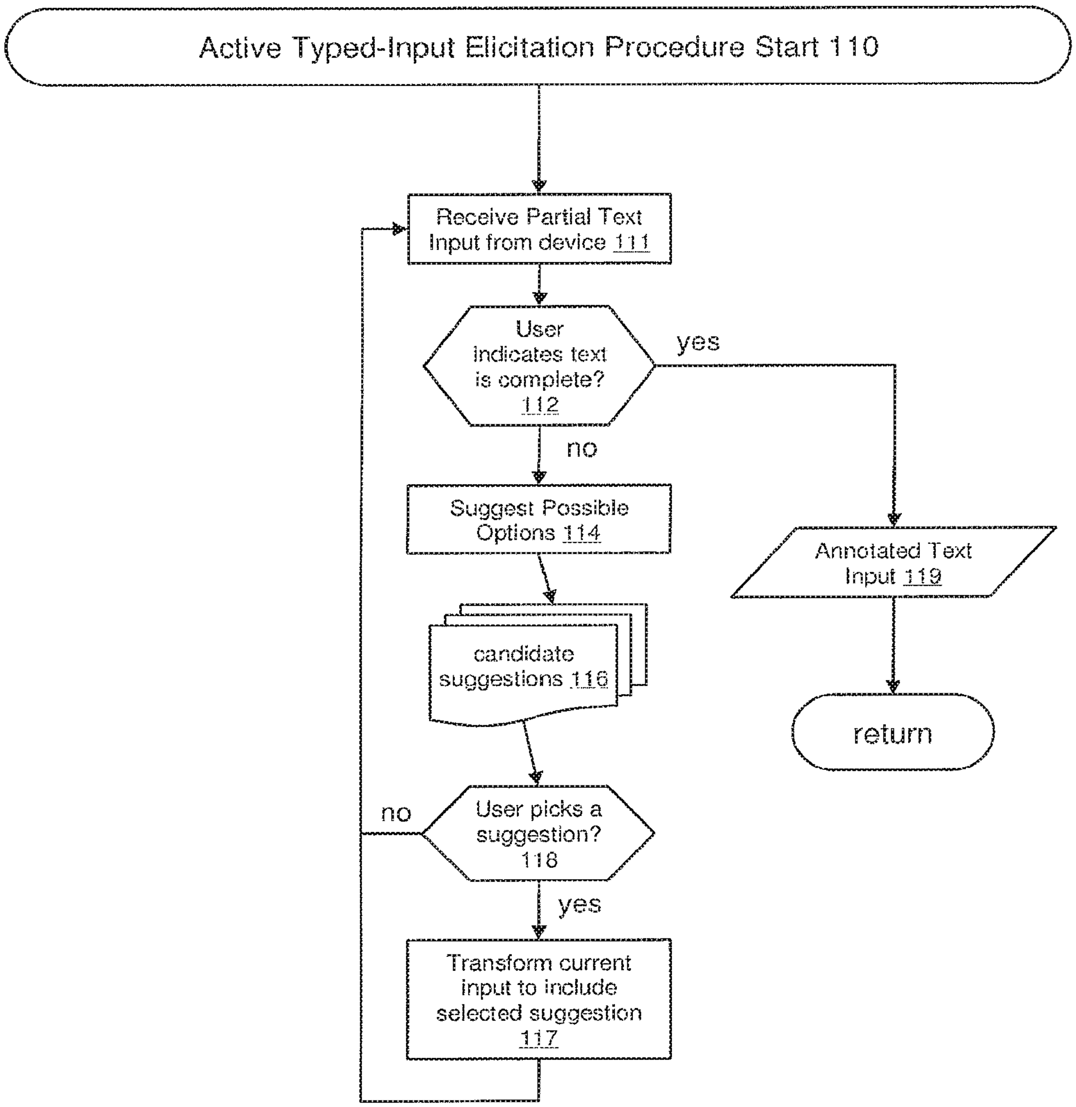
FIG. 11 is a flow diagram depicting a method for active typed-input elicitation according to one embodiment.

Referring now to FIG. 11, there is shown a flow diagram depicting a method for active typed input elicitation according to one embodiment.

The method begins 110. Assistant 1002 receives 111 partial text input, for example via input device 1206. Partial text input may include, for example, the characters that have been typed so far in a text input field. At any time, a user may indicate that the typed input is complete 112, as, for example, by pressing an Enter key. If not complete, a suggestion generator generates 114 candidate suggestions 116. These suggestions may be syntactic, semantic, and/or other kinds of suggestion based any of the sources of information or constraints described herein. If the suggestion is selected 118, the input is transformed 117 to include the selected suggestion.

In at least one embodiment, the suggestions may include extensions to the current input. For example, a suggestion for "rest" may be "restaurants".

In at least one embodiment, the suggestions may include replacements of parts of the current input. For example, a suggestion for "rest" may be "places to eat".

In at least one embodiment, the suggestions may include replacing and rephrasing of parts of the current input. For example, if the current input is "find restaurants of style" a suggestion may be "italian" and when the suggestion is chosen, the entire input may be rewritten as "find Italian restaurants".

In at least one embodiment, the resulting input that is returned is annotated 119, so that information about which choices were made in 118 is preserved along with the textual input. This enables, for example, the semantic concepts or entities underlying a string to be associated with the string when it is returned, which improves accuracy of subsequent language interpretation.

Referring now to FIGS. 12 to 21, there are shown screen shots illustrating some portions of some of the procedures for active typed-input elicitation according to one embodiment. The screen shots depict an example of an embodiment of assistant 1002 as implemented on a smartphone such as the iPhone available from Apple Inc. of Cupertino, California Input is provided to such device via a touchscreen, including on-screen keyboard functionality. One skilled in the art will recognize that the screen shots depict an embodiment that is merely exemplary, and that the techniques of the present invention can be implemented on other devices and using other layouts and arrangements.

Figure 12:
FIGS. 12 to 21 are screen shots illustrating some portions of some of the procedures for active typed-input elicitation according to one embodiment.

In FIG. 12, screen 1201 includes a top-level set of suggestions 1202 shown when no input has been provided in field 1203. This corresponds to no-input step 23 of FIG. 10 applied to step 114 of FIG. 11 where there is no input.

Figure 13:
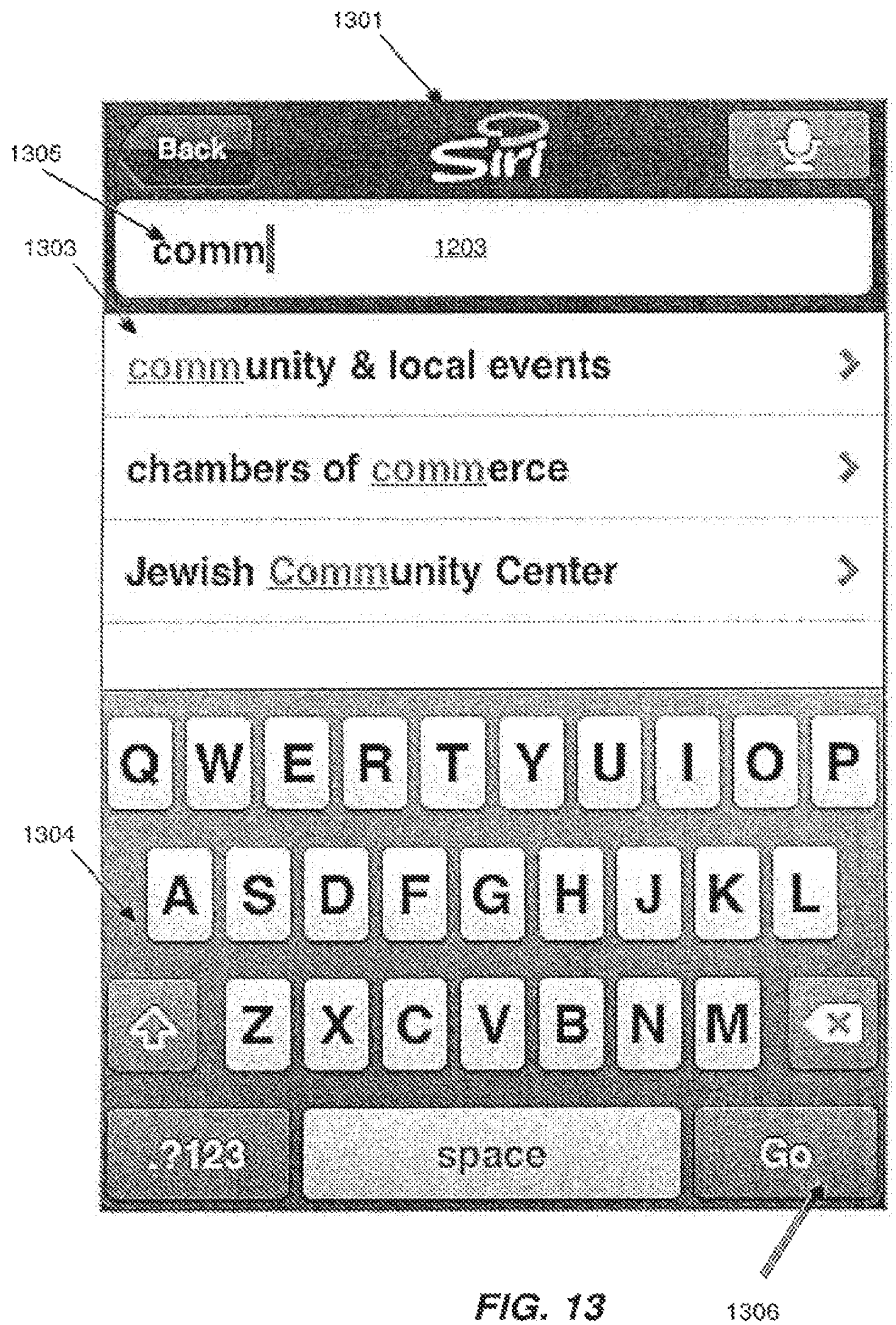

In FIG. 13, screen 1301 depicts an example of the use of vocabulary to offer suggested completions 1303 of partial user input 1305 entered in field 1203 using onscreen keyboard 1304. These suggested completions 1303 may be part of the function of active input elicitation 1094. The user has entered partial user input 1305 including the string "comm". Vocabulary component 1058 has provided a mapping of this string into three different kinds of instances, which are listed as suggested completions 1303: the phrase "community & local events" is a category of the events domain; "chambers of commerce" is a category of the local business search domain, and "Jewish Community Center" is the name of an instance of local businesses. Vocabulary component 1058 may provide the data lookup and management of name spaces like these. The user can tap Go button 1306 to indicate that he or she has finished entering input: this causes assistant 1002 to proceed with the completed text string as a unit of user input.

Figure 14:

In FIG. 14, screen 1401 depicts an example in which suggested semantic completions 1303 for a partial string "wh" 1305 include entire phrases with typed parameters. These kinds of suggestions may be enabled by the use of one or more of the various models and sources of input constraints described herein. For example, in one embodiment shown in FIG. 14, "what is happening in city" is an active elicitation of the location parameter of the Local Events domain; "where is business name" is an active elicitation of the Business Name constraint of the Local Business Search domain; "what is showing at the venue name" is an active elicitation of the Venue Name constraint of the Local Events domain; and "what is playing at the movie theater" is an active elicitation of the Movie Theater Name constraint of the Local Events domain. These examples illustrate that the suggested completions are generated by models rather than simply drawn from a database of previously entered queries.

Figure 15:
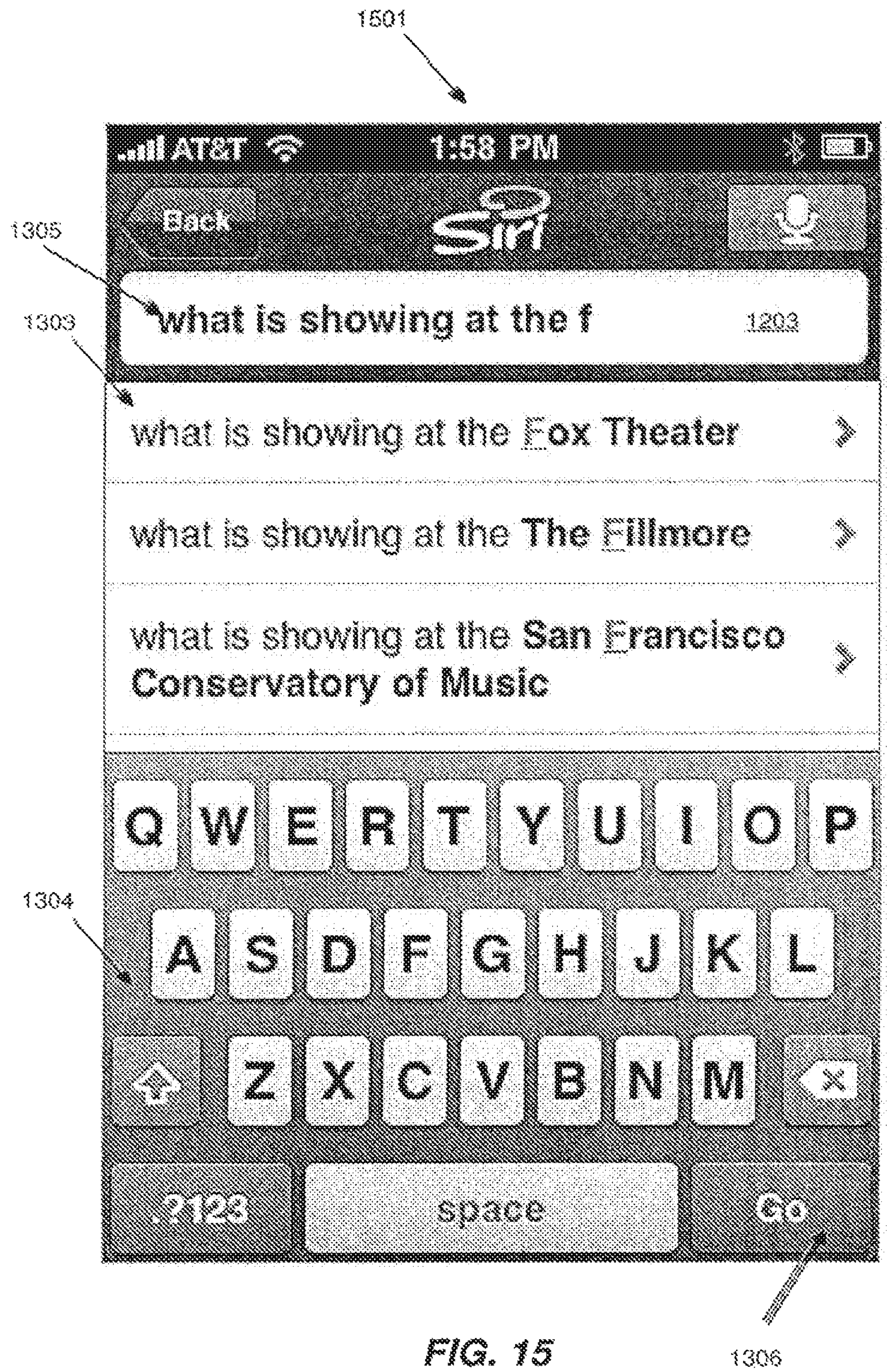

In FIG. 15, screen 1501 depicts a continuation of the same example, after the user has entered additional text 1305 in field 1203. Suggested completions 1303 are updated to match the additional text 1305. In this example, data from a domain entity database 1072 were used: venues whose name starts with "f". Note that this is a significantly smaller and more semantically relevant set of suggestions than all words that begin with "f". Again, the suggestions are generated by applying a model, in this case the domain model that represents Local Events as happening at Venues, which are Businesses with Names. The suggestions actively elicit inputs that would make potentially meaningful entries when using a Local Events service.

Figure 16:

In FIG. 16, screen 1601 depicts a continuation of the same example, after the user has selected one of suggested completions 1303. Active elicitation continues by prompting the user to further specify the type of information desired, here by presenting a number of specifiers 1602 from which the user can select. In this example, these specifiers are generated by the domain, task flow, and dialog flow models. The Domain is Local Events, which includes Categories of events that happen on Dates in Locations and have Event Names and Feature Performers. In this embodiment, the fact that these five options are offered to the user is generated from the Dialog Flow model that indicates that users should be asked for Constraints that they have not yet entered and from the Service Model that indicates that these five Constraints are parameters to Local Event services available to the assistant. Even the choice of preferred phrases to use as specifiers, such as "by category" and "featured", are generated from the Domain Vocabulary databases.

Figure 17:

In FIG. 17, screen 1701 depicts a continuation of the same example, after the user has selected one of specifiers 1602.

Figure 18:

In FIG. 18, screen 1801 depicts a continuation of the same example, wherein the selected specifier 1602 has been added to field 1203, and additional specifiers 1602 are presented. The user can select one of specifiers 1602 and/or provide additional text input via keyboard 1304.

Figure 19:

In FIG. 19, screen 1901 depicts a continuation of the same example, wherein the selected specifier 1602 has been added to field 1203, and yet more specifiers 1602 are presented. In this example, previously entered constraints are not actively elicited redundantly.

Figure 20:

In FIG. 20, screen 2001 depicts a continuation of the same example, wherein the user has tapped the Go button 1306. The user's input is shown in box 2002, and a message is shown in box 2003, providing feedback to the user as to the query being performed in response to the user's input.

Figure 21:

In FIG. 21, screen 2101 depicts a continuation of the same example, wherein results have been found. Message is shown in box 2102. Results 2103, including input elements allowing the user to view further details, save the identified event, buy tickets, add notes, or the like.

In one screen 2101, and other displayed screens, are scrollable, allowing the user to scroll upwards to see screen 2001 or other previously presented screens, and to make changes to the query if desired.

Active Speech Input Elicitation

Figure 22:
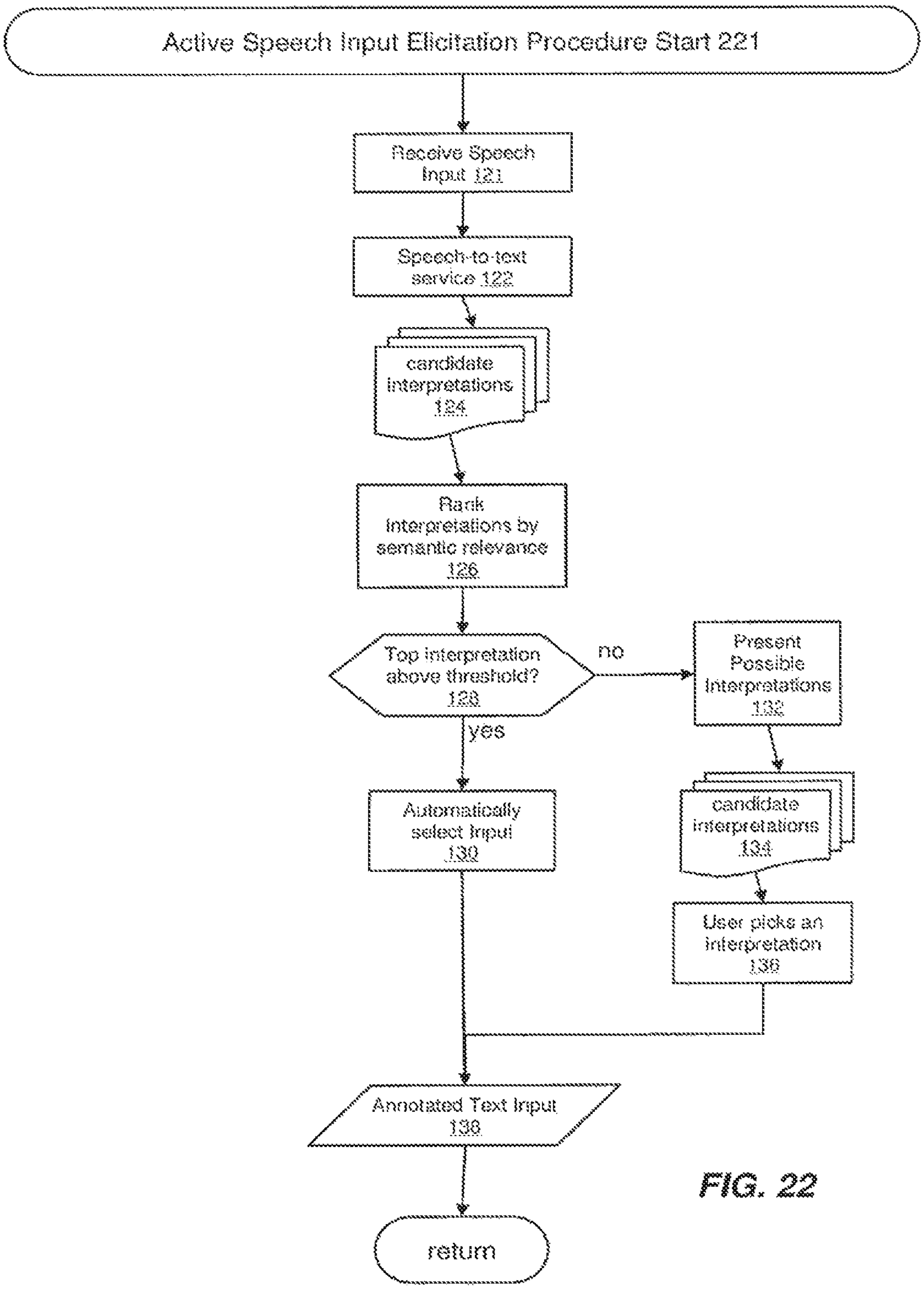
FIG. 22 is a flow diagram depicting a method for active input elicitation for voice or speech input according to one embodiment.

Referring now to FIG. 22, there is shown a flow diagram depicting a method for active input elicitation for voice or speech input according to one embodiment.

The method begins 221. Assistant 1002 receives 121 voice or speech input in the form of an auditory signal. A speech-to-text service 122 or processor generates a set of candidate text interpretations 124 of the auditory signal. In one embodiment, speech-to-text service 122 is implemented using, for example, Nuance Recognizer, available from Nuance Communications, Inc. of Burlington, MA.

In one embodiment, assistant 1002 employs statistical language models to generate candidate text interpretations 124 of speech input 121.

In addition, in one embodiment, the statistical language models are tuned to look for words, names, and phrases that occur in the various models of assistant 1002 shown in FIG. 8. For example, in at least one embodiment the statistical language models are given words, names, and phrases from some or all of: domain models 1056 (e.g., words and phrases relating to restaurant and meal events), task flow models 1086 (e.g., words and phrases relating to planning an event), dialog flow models 1087 (e.g., words and phrases related to the constraints that are needed to gather the inputs for a restaurant reservation), domain entity databases 1072 (e.g., names of restaurants), vocabulary databases 1058 (e.g., names of cuisines), service models 1088 (e.g., names of service provides such as OpenTable), and/or any words, names, or phrases associated with any node of active ontology 1050.

In one embodiment, the statistical language models are also tuned to look for words, names, and phrases from long-term personal memory 1054. For example, statistical language models can be given text from to-do items, list items, personal notes, calendar entries, people names in contacts/address books, email addresses, street or city names mentioned in contact/address books, and the like.

A ranking component analyzes the candidate interpretations 124 and ranks 126 them according to how well they fit syntactic and/or semantic models of intelligent automated assistant 1002. Any sources of constraints on user input may be used. For example, in one embodiment, assistant 1002 may rank the output of the speech-to-text interpreter according to how well the interpretations parse in a syntactic and/or semantic sense, a domain model, task flow model, and/or dialog model, and/or the like: it evaluates how well various combinations of words in the text interpretations 124 would fit the concepts, relations, entities, and properties of active ontology 1050 and its associated models. For example, if speech-to-text service 122 generates the two candidate interpretations "italian food for lunch" and "italian shoes for lunch", the ranking by semantic relevance 126 might rank "italian food for lunch" higher if it better matches the nodes assistant's 1002 active ontology 1050 (e.g., the words "italian", "food" and "lunch" all match nodes in ontology 1050 and they are all connected by relationships in ontology 1050, whereas the word "shoes" does not match ontology 1050 or matches a node that is not part of the dining out domain network).

Figure 28:
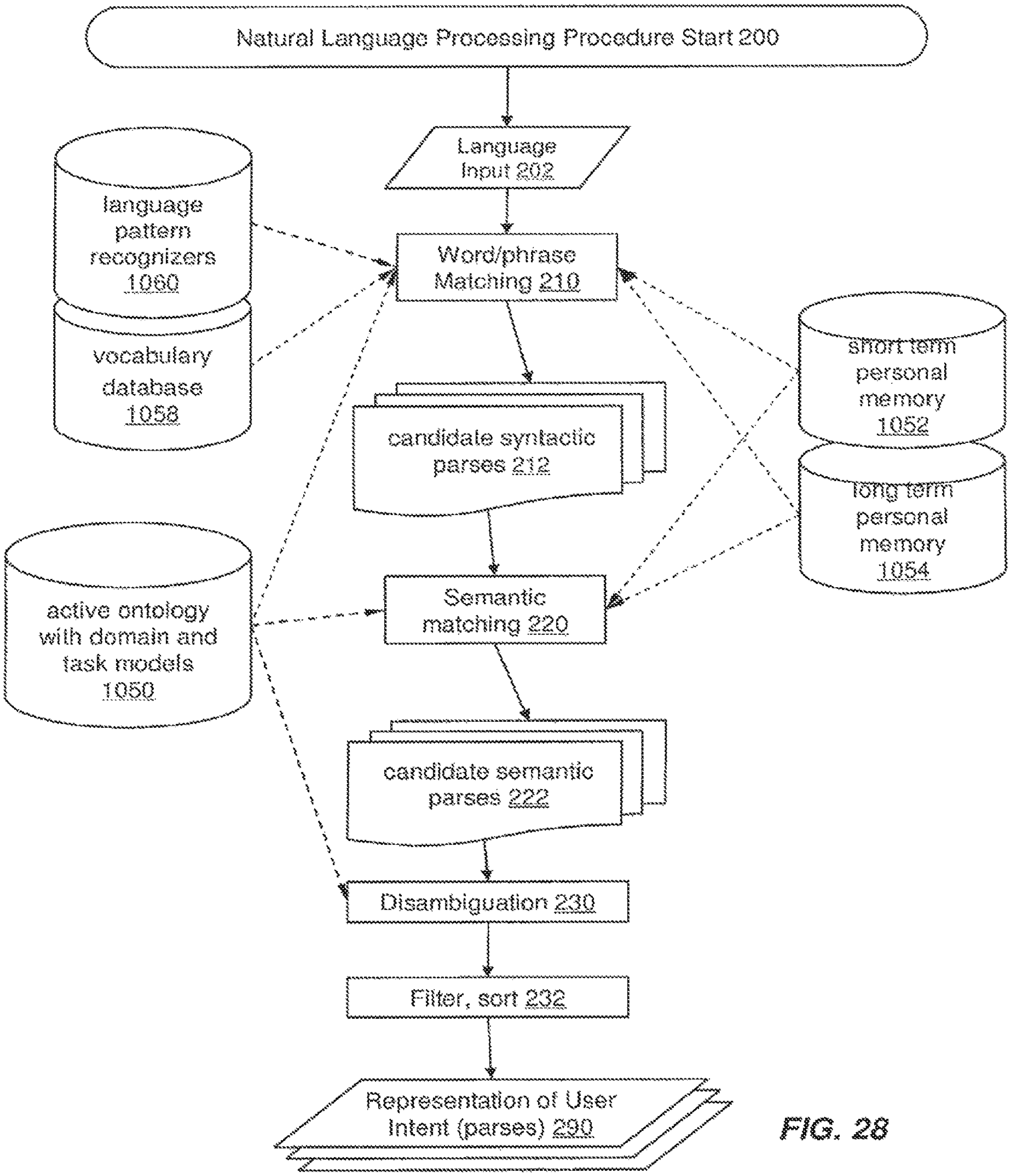
FIG. 28 is a flow diagram depicting an example of a method for natural language processing according to one embodiment.

In various embodiments, algorithms or procedures used by assistant 1002 for interpretation of text inputs, including any embodiment of the natural language processing procedure shown in FIG. 28, can be used to rank and score candidate text interpretations 124 generated by speech-to-text service 122.

In one embodiment, if ranking component 126 determines 128 that the highest-ranking speech interpretation from interpretations 124 ranks above a specified threshold, the highest-ranking interpretation may be automatically selected 130. If no interpretation ranks above a specified threshold, possible candidate interpretations of speech 134 are presented 132 to the user. The user can then select 136 among the displayed choices.

In various embodiments, user selection 136 among the displayed choices can be achieved by any mode of input, including for example any of the modes of multimodal input described in connection with FIG. 16. Such input modes include, without limitation, actively elicited typed input 2610, actively elicited speech input 2620, actively presented GUI for input 2640, and/or the like. In one embodiment, the user can select among candidate interpretations 134, for example by tapping or speaking. In the case of speaking, the possible interpretation of the new speech input is highly constrained by the small set of choices offered 134. For example, if offered "Did you mean italian food or italian shoes?" the user can just say "food" and the assistant can match this to the phrase "italian food" and not get it confused with other global interpretations of the input.

Whether input is automatically selected 130 or selected 136 by the user, the resulting input 138 is returned. In at least one embodiment, the returned input is annotated 138, so that information about which choices were made in step 136 is preserved along with the textual input. This enables, for example, the semantic concepts or entities underlying a string to be associated with the string when it is returned, which improves accuracy of subsequent language interpretation. For example, if "Italian food" was offered as one of the candidate interpretations 134 based on a semantic interpretation of Cuisine=ItalianFood, then the machine-readable semantic interpretation can be sent along with the user's selection of the string "Italian food" as annotated text input 138.

In at least one embodiment, candidate text interpretations 124 are generated based on speech interpretations received as output of speech-to-text service 122.

In at least one embodiment, candidate text interpretations 124 are generated by paraphrasing speech interpretations in terms of their semantic meaning. In some embodiments, there can be multiple paraphrases of the same speech interpretation, offering different word sense or homonym alternatives. For example, if speech-to-text service 122 indicates "place for meet", the candidate interpretations presented to the user could be paraphrased as "place to meet (local businesses)" and "place for meat (restaurants)".

In at least one embodiment, candidate text interpretations 124 include offers to correct substrings.

In at least one embodiment, candidate text interpretations 124 include offers to correct substrings of candidate interpretations using syntactic and semantic analysis as described herein.

In at least one embodiment, when the user selects a candidate interpretation, it is returned.

In at least one embodiment, the user is offered an interface to edit the interpretation before it is returned.

In at least one embodiment, the user is offered an interface to continue with more voice input before input is returned. This enables one to incrementally build up an input utterance, getting syntactic and semantic corrections, suggestions, and guidance at one iteration.

In at least one embodiment, the user is offered an interface to proceed directly from 136 to step 111 of a method of active typed input elicitation (described above in connection with FIG. 11). This enables one to interleave typed and spoken input, getting syntactic and semantic corrections, suggestions, and guidance at one step.

In at least one embodiment, the user is offered an interface to proceed directly from step 111 of an embodiment of active typed input elicitation to an embodiment of active speech input elicitation. This enables one to interleave typed and spoken input, getting syntactic and semantic corrections, suggestions, and guidance at one step.

Active GUI-Based Input Elicitation

Figure 23:
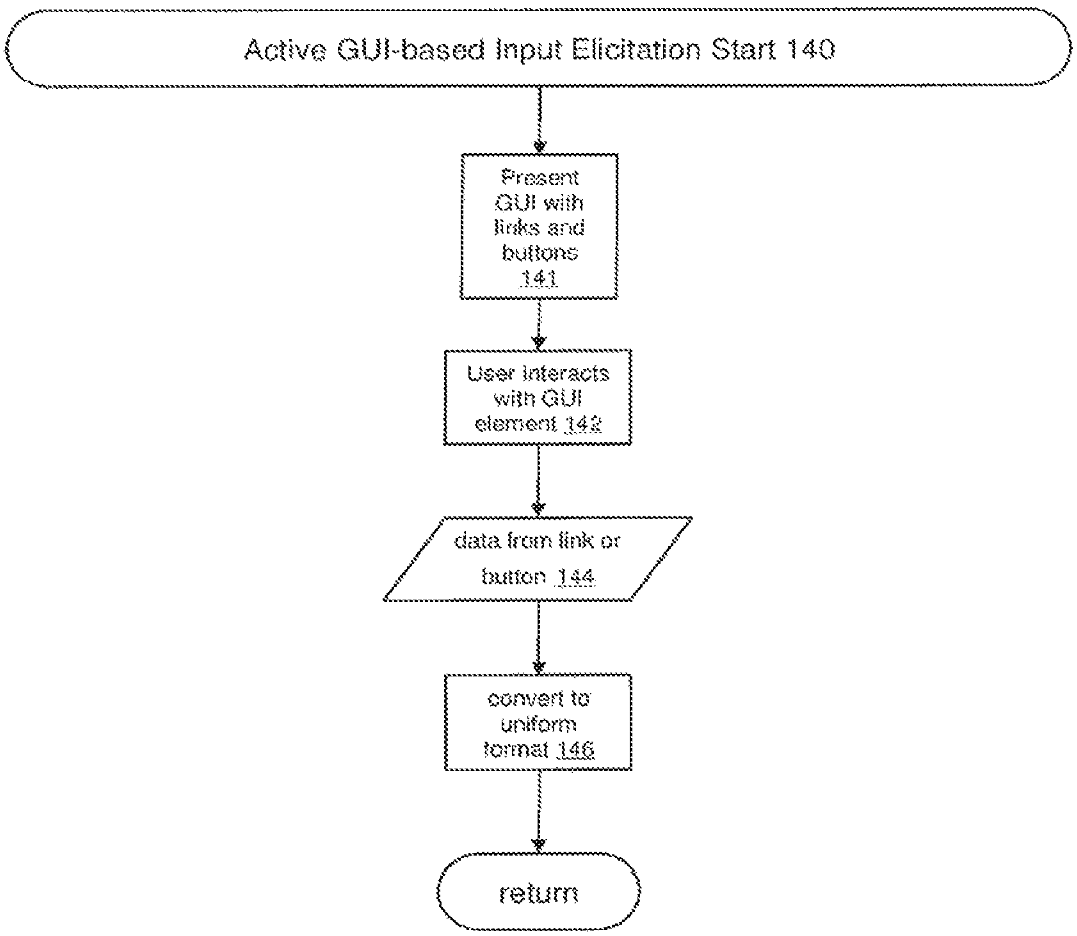
FIG. 23 is a flow diagram depicting a method for active input elicitation for GUI-based input according to one embodiment.

Referring now to FIG. 23, there is shown a flow diagram depicting a method for active input elicitation for GUI-based input according to one embodiment.

The method begins 140. Assistant 1002 presents 141 graphical user interface (GUI) on output device 1207, which may include, for example, links and buttons. The user interacts 142 with at least one GUI element. Data 144 is received, and converted 146 to a uniform format. The converted data is then returned.

In at least one embodiment, some of the elements of the GUI are generated dynamically from the models of the active ontology, rather than written into a computer program. For example, assistant 1002 can offer a set of constraints to guide a restaurant reservation service as regions for tapping on a screen, with each region representing the name of the constraint and/or a value. For instance, the screen could have rows of a dynamically generated GUI layout with regions for the constraints Cuisine, Location, and Price Range. If the models of the active ontology change, the GUI screen would automatically change without reprogramming.

Active Dialog Suggestion Input Elicitation

Figure 24:
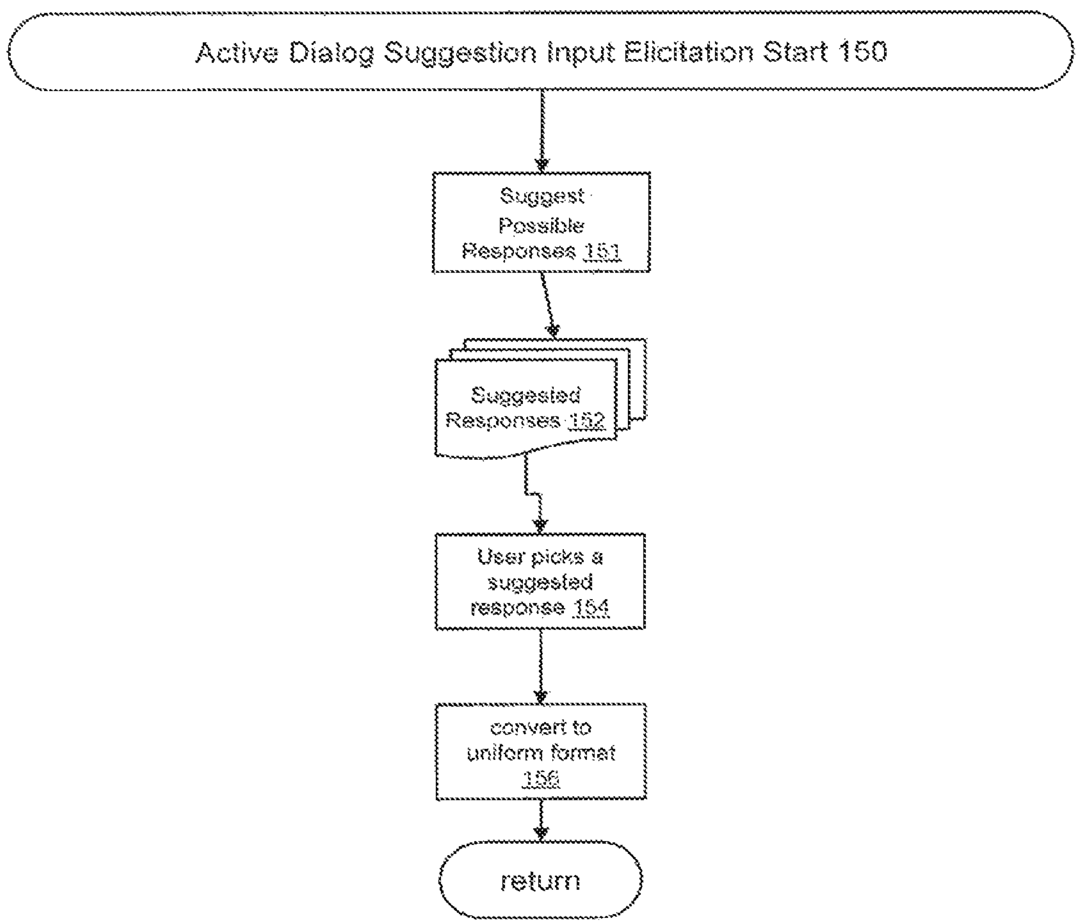
FIG. 24 is a flow diagram depicting a method for active input elicitation at the level of a dialog flow according to one embodiment.

FIG. 24 is a flow diagram depicting a method for active input elicitation at the level of a dialog flow according to one embodiment. The method begins 150. Assistant 1002 suggests 151 possible responses 152. The user selects 154 a suggested response. The received input is converted 156 to a uniform format. The converted data is then returned.

In at least one embodiment, the suggestions offered in step 151 are offered as follow-up steps in a dialog and/or task flow.

In at least one embodiment, the suggestions offer options to refine a query, for example using parameters from a domain and/or task model. For example, one may be offered to change the assumed location or time of a request.

In at least one embodiment, the suggestions offer options to choose among ambiguous alternative interpretations given by a language interpretation procedure or component.

In at least one embodiment, the suggestions offer options to choose among ambiguous alternative interpretations given by a language interpretation procedure or component.

In at least one embodiment, the suggestions offer options to choose among next steps in a workflow associated dialog flow model 1087. For example, dialog flow model 1087 may suggest that after gathering the constrained for one domain (e.g., restaurant dining), assistant 1002 should suggest other related domains (e.g., a movie nearby).

Active Monitoring for Relevant Events

In at least one embodiment, asynchronous events may be treated as inputs in an analogous manner to the other modalities of active elicited input. Thus, such events may be provided as inputs to assistant 1002. Once interpreted, such events can be treated in a manner similar to any other input.

For example, a flight status change may initiate an alert notification to be sent to a user. If a flight is indicated as being late, assistant 1002 may continue the dialog by presenting alternative flights, making other suggestions, and the like, based on the detected event.

Such events can be of any type. For example, assistant 1002 might detect that the user just got home, or is lost (off a specified route), or that a stock price hit a threshold value, or that a television show the user is interested in is starting, or that a musician of interest is touring in the area. In any of these situations, assistant 1002 can proceed with a dialog in substantially the same manner as if the user had him- or herself initiated the inquiry. In one embodiment, events can even be based on data provided from other devices, for example to tell the user when a coworker has returned from lunch (the coworker's device can signal such an event to the user's device, at which time assistant 1002 installed on the user's device responds accordingly).

In one embodiment, the events can be notifications or alerts from a calendar, clock, reminder, or to-do application. For example, an alert from a calendar application about a dinner date can initiate a dialog with assistant 1002 about the dining event. The dialog can proceed as if the user had just spoken or typed the information about the upcoming dinner event, such as "dinner for 2 in San Francisco".

In one embodiment, the context of possible event trigger 162 can include information about people, places, times, and other data. These data can be used as part of the input to assistant 1002 to use in various steps of processing.

In one embodiment, these data from the context of event trigger 162 can be used to disambiguate speech or text inputs from the user. For example, if a calendar event alert includes the name of a person invited to the event, that information can help disambiguate input which might match several people with the same or similar name.

Figure 25:
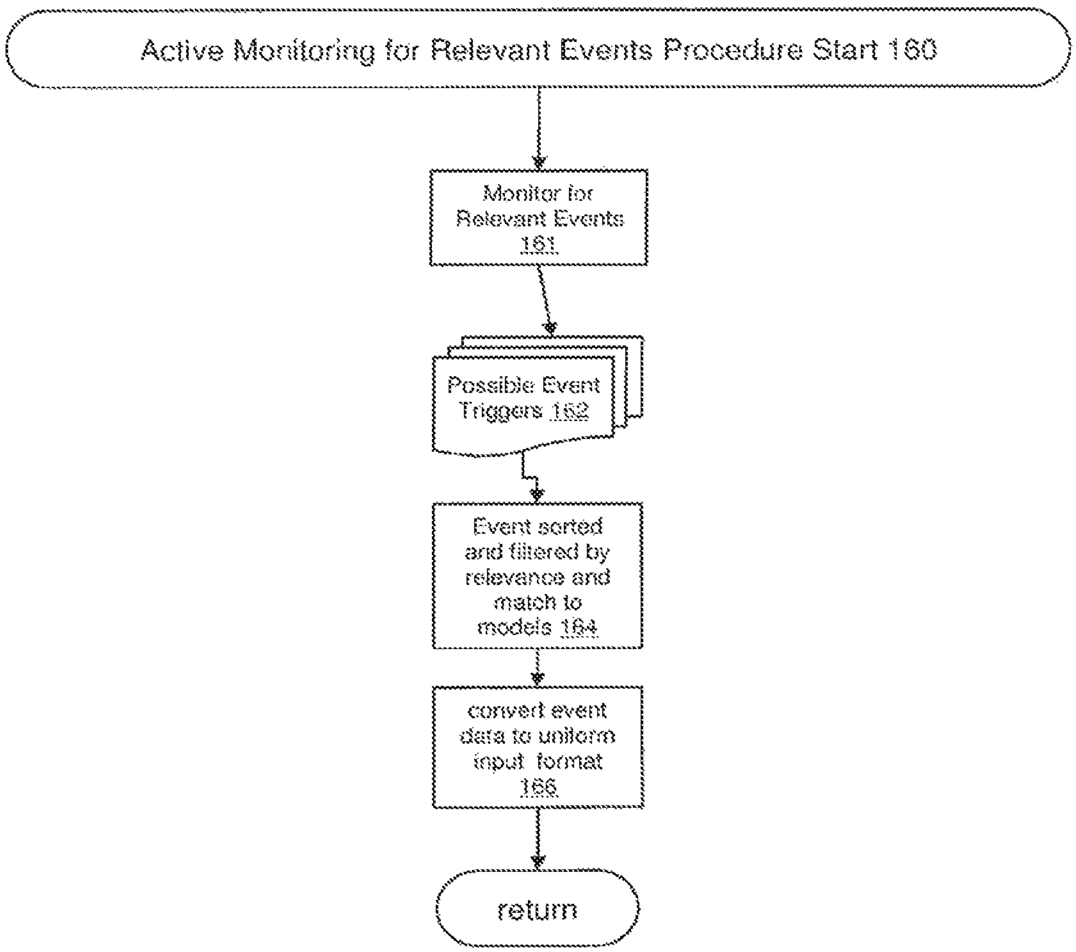
FIG. 25 is a flow diagram depicting a method for active monitoring for relevant events according to one embodiment.

Referring now to FIG. 25, there is shown a flow diagram depicting a method for active monitoring for relevant events according to one embodiment. In this example, event trigger events are sets of input 162. The method begins 160. Assistant 1002 monitors 161 for such events. Detected events may be filtered and sorted 164 for semantic relevance using models, data and information available from other components in intelligent automated assistant 1002. For example, an event that reports a change in flight status may be given higher relevance if the short-term or long-term memory records for a user indicate that the user is on that flight and/or have made inquiries about it to assistant 1002. This sorting and filtering may then present only the top events for review by the user, who may then choose to pick one or more and act on them.

Event data is converted 166 to a uniform input format, and returned.

In at least one embodiment, assistant 1002 may proactively offer services associated with events that were suggested for user attention. For example, if a flight status alert indicates a flight may be missed, assistant 1002 may suggest to the user a task flow for replanning the itinerary or booking a hotel.

Input Elicitation Component(s) Example:

The following example is intended to help illustrate some of the various types of functions, operations, actions, and/or other features which may be provided by active input elicitation component(s) 1094.

Example: Command Completion (What can the User Say to Assistant 1002)

The user is facing a text input box with the general instruction to enter "what do you want to do?" Depending on the context and the user input, any of several system responses are provided. Examples are shown below Case: Null Input

| User Input | System Response | Comment |
|---|---|---|
| With an empty field and no dialog context, type a question or space character, or enter nothing for some period of time. | Find restaurants, hotels, movies, . . .<br>Book a table, a room, a seat, . . .<br>Order food, flowers, . . .<br>Buy a ticket, a book, a DVD,<br>Schedule a meeting, an event, . . .<br>Remember to a thing to do . . .<br>Explain results | Black text would be inserted into the input field. Italicized text would be the follow-up suggestions once the text was inserted. |

Case: First Word Input

| User Input | System Response | Comment |
|---|---|---|
| With empty dialog context If the user types the first letter of any command, it is suggested. For example<br>F \| | Find restaurants, hotels, movies, . . . | Black text would be inserted into the input field. Italicized text would be the follow-up suggestions once the text was inserted. |

Case: Key Word Input

| User Input | System Response | Comment |
|---|---|---|
| With empty dialog context If the user types the first two letters of any keyword, it is suggested as well as command. For example<br>Re \| | Remember to a thing, to do . . .<br>Find restaurants by location, cuisine, | Black text would be inserted into the input field. Italicized text would be the follow-up suggestions once the text was inserted. |

Case: Prompting for Arguments

| User Input | System Response | Comment |
|---|---|---|
| The user has entered or selected a "command" verb and nothing else. For example, Find_ ǀ | restaurants by location, cuisine, . . . hotels by location, availability, . . . movies by location, genre, . . . name of place | Offer not only the selection class but advertise the constraint options. Note that name of place is a just a prompt, and would not insert text. |

Case: Suggesting Criteria

| User Input | System Response | Comment |
|---|---|---|
| The user has already entered enough to establish a task and domain, and now is prompted for constraints in order. find restaurants_ ǀ | in city, zip code near home, office, place name named restaurant name | Black text would be inserted into the input field. Italicized text would be the follow-up suggestions once the text was inserted. |

Case: Adding Criteria

| User Input | System Response | Comment |
|---|---|---|
| The user has said "in" and now is prompted for locations Find restaurants in_ ǀ | in city, zip code Palo Alto, CA Menlo Park, CA | Until they enter the next word, the suggestions are a prompt for what kind of thing to type. The Places are cities from personal memory. |
| The user has said "near" and now is prompted for locations Find restaurants near_ ǀ | my home my work Palo Alto, CA Menlo Park, CA | The Places are none or more places from personal memory. |

Case: Adding Location or Other Constraints

| User Input | System Response | Comment |
|---|---|---|
| Find restaurants in Palo Alto_ ǀ | serving food type or cuisine with availability tonight, tomorrow, . . . described as romantic, good service | Prompt for other constraints |
| Find restaurants in Palo Alto with availability_ ǀ | tonight tomorrow at 7pm at 9pm other time or date | The 7:00 and 9:00 are our suggestions based on current time |

Case: Starting from Constraint, Unknown Task or Domain

| User Input | System Response | Comment |
|---|---|---|
| romantic _ ǀ | restaurants by location, cuisine, . . . hotels by location, availability, . . . movies by location, genre, . . . | Constraint value from ontology tells you which selection classes to use. |
| Comedy _ ǀ | movies by location, genre, . . . events by location, . . . clubs by location | "comedy" is a constraint value for genre in movies, a genre in events, and "comedy clubs" is a local directory business category |

Example: Name Completion

Here, the user has typed some text without accepting any of the commands, or he or she is just extending a command with an entity name. The system may attempt to complete the names, depending on context. It also disambiguates the domain.

Case: Words without Context

| User Input | System Response | Comment |
|---|---|---|
| it for | Il Fomaio (restaurant) Ill Forgotten Gains (movie) | May require entity name lookup. Notice multi-word completion Show domain as a suggestion. |
| tom cruise | movies | May require entity name lookup. |
| romantic | movies restaurants | Based on ontology only |

Case: Name with Context

| User Input | System Response | Comment |
|---|---|---|
| Find restaurants il for | Il Fornaio (restaurant) | May require entity name lookup. Uses selection class and location context from current and past queries to constrain completion. Show domain as a suggestion. |
| tom cruise | movies | May require entity name lookup. |
| Find movies rom | romantic Roman Holiday (movie) | Based on ontology only |
| g-rated | movies | |

Example: Choosing Values from a Set

Here, the user is responding to a system request to enter a value for a specific parameter, such as location, time, cuisine, or genre. The user may either select from a list or enter a value. As she types, matching items from the list are shown as options. Examples are shown below.

Case: Valueclass Selection

| User Input | System Response Comment | Comment |
|---|---|---|
| Restaurants serving | burgers<br>Ice cream<br>Hot dogs | User may type anything else and doesn't have to pick from the menu |
| Restaurants serving h | Hamburgers<br>Hot dogs<br>Hot sauce | |
| Movies playing | today<br>tonight<br>Friday night | |

Example: Reusing Previous Commands

Previous queries are also options to complete on in an autocomplete interface. They may be just matched as strings (when the input field is empty and there are no known constraints) or they may be suggested as relevant when in certain situations.

Case: Completion on Previous Queries

| User Input | System Response | Comment |
|---|---|---|
| Intel | Italian restaurants (normal completion)<br>Films starring Italian actors (recent query) | Using string matching to retrieve previous queries |
| Lunch | lunch places in marin (recent query)<br>buy the book naked lunch | |

Example: Retrieving Personal Memory Items

Assistant 1002 may remember certain events and/or entities in personal memory associated with the user. Autocomplete can be performed based on such remembered items. Examples appear below.

Case: Completion on Events and Entities in Personal Memory

| User Input | System Response | Comment |
|---|---|---|
| Mary | lunch with Mary on Saturday (from My Events)<br>film called "Something about Mary" | |
| Lunch | lunch with Mary on Saturday (from My Events)<br>buy the book naked lunch (from My Todos) | |
| Hob | Hobee's Restaurant in Palo Alto (from My Restaurants) | |

Multimodal Active Input Elicitation

In at least one embodiment, active input elicitation component(s) 1094 may process input from a plurality of input modalities. At least one modality might be implemented with an active input elicitation procedure that takes advantages of the particular kinds of inputs and methods for selecting from suggested options. A described herein, they may be embodiments of procedures for active input elicitation for text input, speech input, GUI-based input, input in the context of a dialog, and/or input resulting from event triggers.

In at least one embodiment, for a single instance of intelligent automated assistant 1002, there may be support for one or more (or any combination of) typed input, speech input, GUI input, dialog input, and/or event input.

Figure 26:
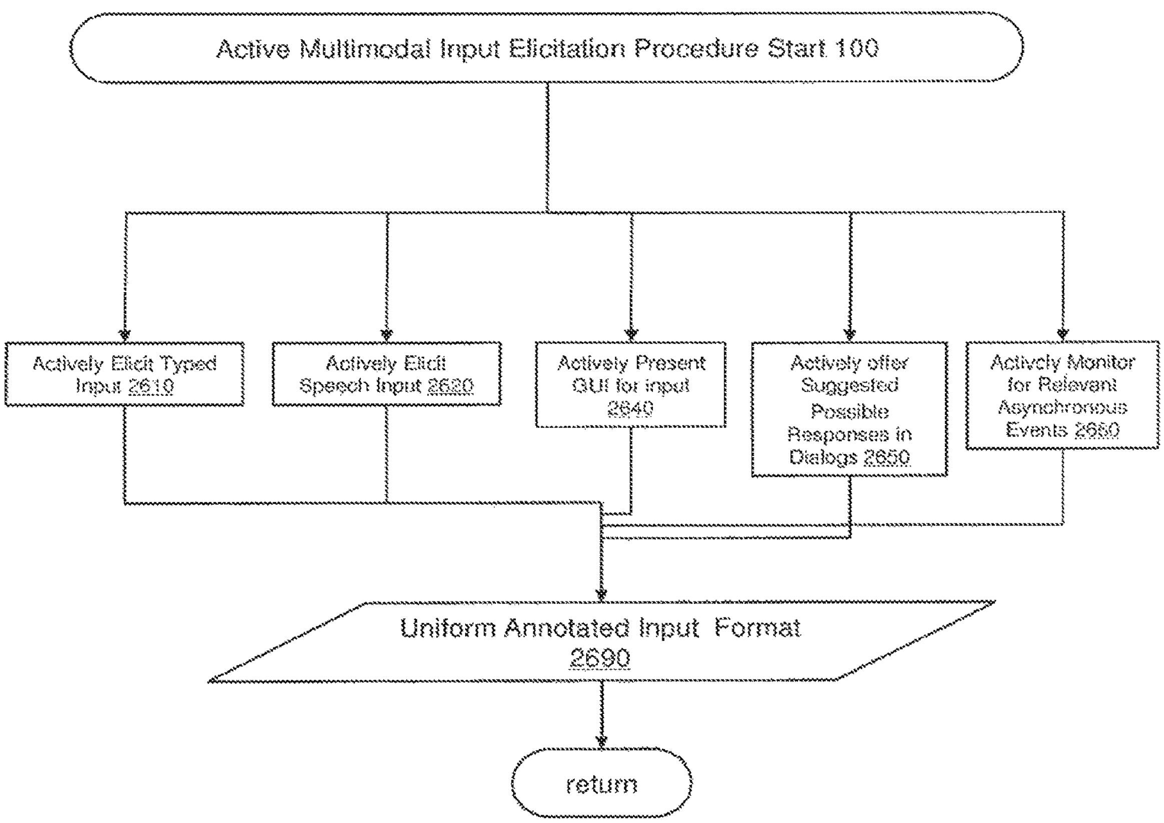
FIG. 26 is a flow diagram depicting a method for multimodal active input elicitation according to one embodiment.

Referring now to FIG. 26, there is shown a flow diagram depicting a method for multimodal active input elicitation according to one embodiment. The method begins 100. Inputs may be received concurrently from one or more or any combination of the input modalities, in any sequence. Thus, the method includes actively eliciting typed input 2610, speech input 2620, GUI-based input 2640, input in the context of a dialog 2650, and/or input resulting from event triggers 2660. Any or all of these input sources are unified into unified input format 2690 and returned. Unified input format 2690 enables the other components of intelligent automated assistant 1002 to be designed and to operate independently of the particular modality of the input.

Offering active guidance for multiple modalities and levels enables constraint and guidance on the input beyond those available to isolated modalities. For example, the kinds of suggestions offered to choose among speech, text, and dialog steps are independent, so their combination is a significant improvement over adding active elicitation techniques to individual modalities or levels.

Combining multiple sources of constraints as described herein (syntactic/linguistic, vocabulary, entity databases, domain models, task models, service models, and the like) and multiple places where these constraints may be actively applied (speech, text, GUI, dialog, and asynchronous events) provides a new level of functionality for human-machine interaction.

Domain Models Component(s) 1056

Domain models 1056 component(s) include representations of the concepts, entities, relations, properties, and instances of a domain. For example, dining out domain model 1622 might include the concept of a restaurant as a business with a name and an address and phone number, the concept of a meal event with a party size and date and time associated with the restaurant.

In at least one embodiment, domain models component(s) 1056 of assistant 1002 may be operable to perform and/or implement various types of functions, operations, actions, and/or other features such as, for example, one or more of the following (or combinations thereof):

- Domain model component(s) 1056 may be used by automated assistant 1002 for several processes, including: eliciting input 100, interpreting natural language 200, dispatching to services 400, and generating output 600.
- Domain model component(s) 1056 may provide lists of words that might match a domain concept or entity, such as names of restaurants, which may be used for active elicitation of input 100 and natural language processing 200.
- Domain model component(s) 1056 may classify candidate words in processes, for instance, to determine that a word is the name of a restaurant.
- Domain model component(s) 1056 may show the relationship between partial information for interpreting natural language, for example that cuisine may be associated with business entities (e.g., "local Mexican food" may be interpreted as "find restaurants with style=Mexican", and this inference is possible because of the information in domain model 1056).
- Domain model component(s) 1056 may organize information about services used in service orchestration 1082, for example, that a particular web service may provide reviews of restaurants.
- Domain model component(s) 1056 may provide the information for generating natural language paraphrases and other output formatting, for example, by providing canonical ways of describing concepts, relations, properties and instances.

According to specific embodiments, multiple instances or threads of the domain models component(s) 1056 may be concurrently implemented and/or initiated via the use of one or more processors 63 and/or other combinations of hardware and/or hardware and software. For example, in at least some embodiments, various aspects, features, and/or functionalities of domain models component(s) 1056 may be performed, implemented and/or initiated by one or more of the following types of systems, components, systems, devices, procedures, processes, and the like (or combinations thereof):

- Domain models component(s) 1056 may be implemented as data structures that represent concepts, relations, properties, and instances. These data structures may be stored in memory, files, or databases.
- Access to domain model component(s) 1056 may be implemented through direct APIs, network APIs, database query interfaces, and/or the like.
- Creation and maintenance of domain models component(s) 1056 may be achieved, for example, via direct editing of files, database transactions, and/or through the use of domain model editing tools.
- Domain models component(s) 1056 may be implemented as part of or in association with active ontologies 1050, which combine models with instantiations of the models for servers and users.

According to various embodiments, one or more different threads or instances of domain models component(s) 1056 may be initiated in response to detection of one or more conditions or events satisfying one or more different types of minimum threshold criteria for triggering initiation of at least one instance of domain models component(s) 1056. For example, trigger initiation and/or implementation of one or more different threads or instances of domain models component(s) 1056 may be triggered when domain model information is required, including during input elicitation, input interpretation, task and domain identification, natural language processing, service orchestration, and/or formatting output for users.

In at least one embodiment, a given instance of domain models component(s) 1056 may access and/or utilize information from one or more associated databases. In at least one embodiment, at least a portion of the database information may be accessed via communication with one or more local and/or remote memory devices. For example, data from domain model component(s) 1056 may be associated with other model modeling components including vocabulary 1058, language pattern recognizers 1060, dialog flow models 1087, task flow models 1086, service capability models 1088, domain entity databases 1072, and the like. For example, businesses in domain entity databases 1072 that are classified as restaurants might be known by type identifiers which are maintained in the dining out domain model components.

Figure 27:
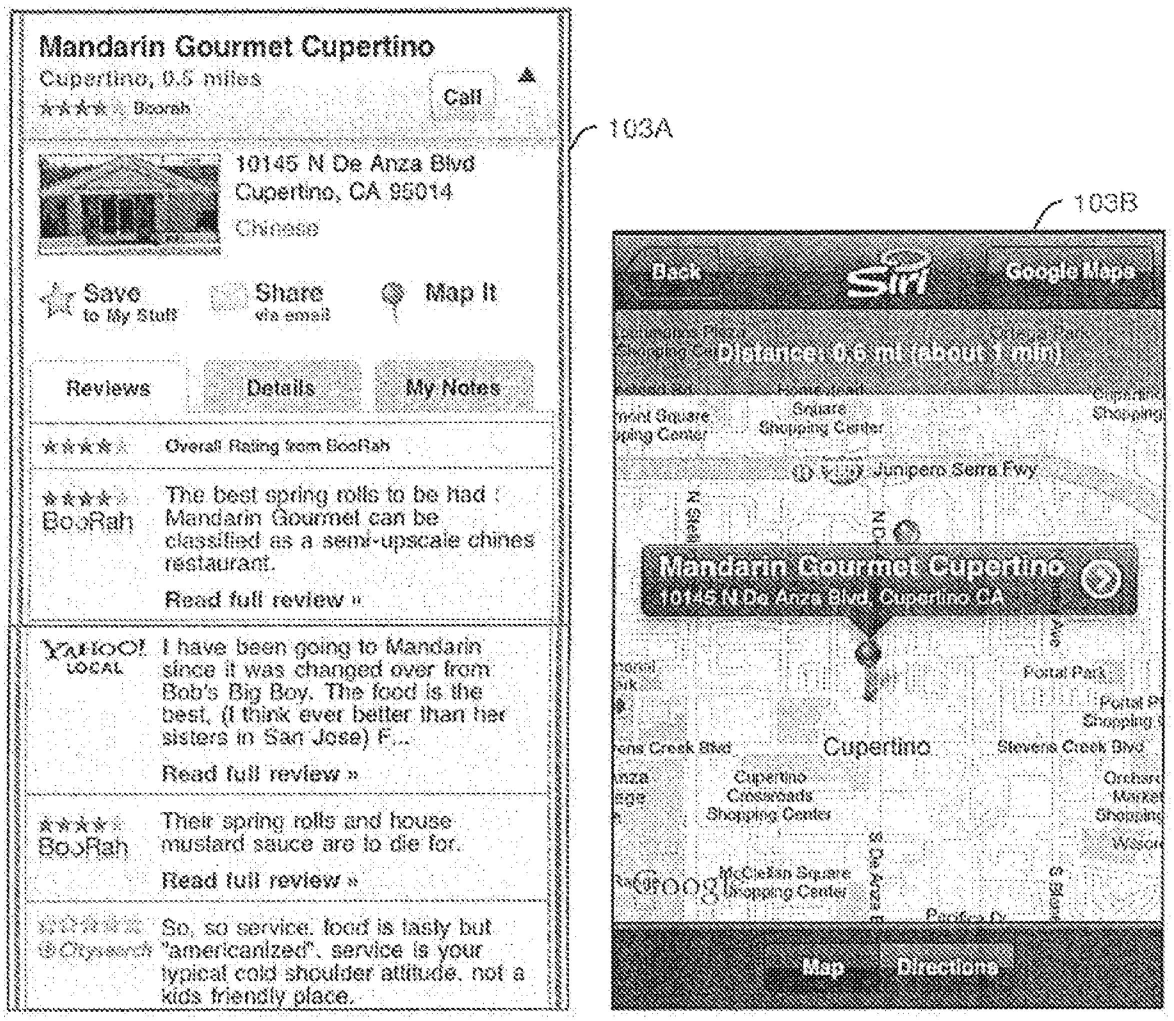
FIG. 27 is a set of screen shots illustrating an example of various types of functions, operations, actions, and/or other features which may be provided by domain models component(s) and services orchestration according to one embodiment.

Domain Models Component(s) Example:

Referring now to FIG. 27, there is shown a set of screen shots illustrating an example of various types of functions, operations, actions, and/or other features which may be provided by domain models component(s) 1056 according to one embodiment.

In at least one embodiment, domain models component(s) 1056 are the unifying data representation that enables the presentation of information shown in screens 103A and 103B about a restaurant, which combines data from several distinct data sources and services and which includes, for example: name, address, business categories, phone number, identifier for saving to long term personal memory, identifier for sharing over email, reviews from multiple sources, map coordinates, personal notes, and the like.

Language Interpreter Component(s) 1070

In at least one embodiment, language interpreter component(s) 1070 of assistant 1002 may be operable to perform and/or implement various types of functions, operations, actions, and/or other features such as, for example, one or more of the following (or combinations thereof):

- Analyze user input and identify a set of parse results.
  - User input can include any information from the user and his/her device context that can contribute to understanding the user's intent, which can include, for example one or more of the following (or combinations thereof): sequences of words, the identity of gestures or GUI elements involved in eliciting the input, current context of the dialog, current device application and its current data objects, and/or any other personal dynamic data obtained about the user such as location, time, and the like. For example, in one embodiment, user input is in the form of the uniform annotated input format 2690 resulting from active input elicitation 1094.
  - Parse results are associations of data in the user input with concepts, relationships, properties, instances, and/or other nodes and/or data structures in models, databases, and/or other representations of user intent and/context. Parse result associations can be complex mappings from sets and sequences of words, signals, and other elements of user input to one or more associated concepts, relations, properties, instances, other nodes, and/or data structures described herein.
- Analyze user input and identify a set of syntactic parse results, which are parse results that associate data in the user input with structures that represent syntactic parts of speech, clauses and phrases including multiword names, sentence structure, and/or other grammatical graph structures. Syntactic parse results are described in element 212 of natural language processing procedure described in connection with FIG. 28.

Analyze user input and identify a set of semantic parse results, which are parse results that associate data in the user input with structures that represent concepts, relationships, properties, entities, quantities, propositions, and/or other representations of meaning and user intent. In one embodiment, these representations of meaning and intent are represented by sets of and/or elements of and/or instances of models or databases and/or nodes in ontologies, as described in element 220 of natural language processing procedure described in connection with FIG. 28.

Disambiguate among alternative syntactic or semantic parse results as described in element 230 of natural language processing procedure described in connection with FIG. 28.

Determine whether a partially typed input is syntactically and/or semantically meaningful in an autocomplete procedure such as one described in connection with FIG. 11.

Help generate suggested completions 114 in an autocomplete procedure such as one described in connection with FIG. 11.

Determine whether interpretations of spoken input are syntactically and/or semantically meaningful in a speech input procedure such as one described in connection with FIG. 22.

According to specific embodiments, multiple instances or threads of language interpreter component(s) 1070 may be concurrently implemented and/or initiated via the use of one or more processors 63 and/or other combinations of hardware and/or hardware and software.

According to different embodiments, one or more different threads or instances of language interpreter component(s) 1070 may be initiated in response to detection of one or more conditions or events satisfying one or more different types of minimum threshold criteria for triggering initiation of at least one instance of language interpreter component(s) 1070. Various examples of conditions or events which may trigger initiation and/or implementation of one or more different threads or instances of language interpreter component(s) 1070 may include, but are not limited to, one or more of the following (or combinations thereof):

while eliciting input, including but not limited to

Suggesting possible completions of typed input 114 (FIG. 11);

Ranking interpretations of speech 126 (FIG. 22);

When offering ambiguities as suggested responses in dialog 152 (FIG. 24);

when the result of eliciting input is available, including when input is elicited by any mode of active multimodal input elicitation 100.

In at least one embodiment, a given instance of language interpreter component(s) 1070 may access and/or utilize information from one or more associated databases. In at least one embodiment, at least a portion of such data-base information may be accessed via communication with one or more local and/or remote memory devices. Examples of different types of data which may be accessed by the Language Interpreter component(s) may include, but are not limited to, one or more of the following (or combinations thereof):

Domain models 1056;

Vocabulary 1058;

Domain entity databases 1072;

Short term memory 1052;

Long term personal memory 1054;

Task flow models 1086;

Dialog flow models 1087;

Service capability models 1088.

Figure 29:
FIG. 29 is a screen shot illustrating natural language processing according to one embodiment.

Referring now also to FIG. 29, there is shown a screen shot illustrating natural language processing according to one embodiment. The user has entered (via voice or text) language input 2902 consisting of the phrase "who is playing this weekend at the fillmore". This phrase is echoed back to the user on screen 2901. Language interpreter component(s) 1070 component process input 2902 and generates a parse result. The parse result associates that input with a request to show the local events that are scheduled for any of the upcoming weekend days at any event venue whose name matches "fillmore". A paraphrase of the parse results is shown as 2903 on screen 2901.

Referring now also to FIG. 28, there is shown a flow diagram depicting an example of a method for natural language processing according to one embodiment.

The method begins 200. Language input 202 is received, such as the string "who is playing this weekend at the fillmore" in the example of FIG. 29. In one embodiment, the input is augmented by current context information, such as the current user location and local time. In word/phrase matching 210, language interpreter component(s) 1070 find associations between user input and concepts. In this example, associations are found between the string "playing" and the concept of listings at event venues; the string "this weekend" (along with the current local time of the user) and an instantiation of an approximate time period that represents the upcoming weekend; and the string "fillmore" with the name of a venue. Word/phrase matching 210 may use data from, for example, language pattern recognizers 1060, vocabulary database 1058, active ontology 1050, short term personal memory 1052, and long term personal memory 1054.

Language interpreter component(s) 1070 generate candidate syntactic parses 212 which include the chosen parse result but may also include other parse results. For example, other parse results may include those wherein "playing" is associated with other domains such as games or with a category of event such as sporting events.

Short- and/or long-term memory 1052, 1054 can also be used by language interpreter component(s) 1070 in generating candidate syntactic parses 212. Thus, input that was provided previously in the same session, and/or known information about the user, can be used, to improve performance, reduce ambiguity, and reinforce the conversational nature of the interaction. Data from active ontology 1050, domain models 1056, and task flow models 1086 can also be used, to implement evidential reasoning in determining valid candidate syntactic parses 212.

In semantic matching 220, language interpreter component(s) 1070 consider combinations of possible parse results according to how well they fit semantic models such as domain models and databases. In this case, the parse includes the associations (1) "playing" (a word in the user input) as "Local Event At Venue" (part of a domain model 1056 represented by a cluster of nodes in active ontology 1050) and (2) "fillmore" (another word in the input) as a match to an entity name in a domain entity database 1072 for Local Event Venues, which is represented by a domain model element and active ontology node (Venue Name).

Semantic matching 220 may use data from, for example, active ontology 1050, short term personal memory 1052, and long term personal memory 1054. For example, semantic matching 220 may use data from previous references to venues or local events in the dialog (from short term personal memory 1052) or personal favorite venues (from long term personal memory 1054).

A set of candidate, or potential, semantic parse results is generated 222.

In disambiguation step 230, language interpreter component(s) 1070 weigh the evidential strength of candidate semantic parse results 222. In this example, the combination of the parse of "playing" as "Local Event At Venue" and the match of "fillmore" as a Venue Name is a stronger match to a domain model than alternative combinations where, for instance, "playing" is associated with a domain model for sports but there is no association in the sports domain for "fillmore".

Disambiguation 230 may use data from, for example, the structure of active ontology 1050. In at least one embodiment, the connections between nodes in an active ontology provide evidential support for disambiguating among candidate semantic parse results 222. For example, in one embodiment, if three active ontology nodes are semantically matched and are all connected in active ontology 1050, this indicates higher evidential strength of the semantic parse than if these matching nodes were not connected or connected by longer paths of connections in active ontology 1050. For example, in one embodiment of semantic matching 220, the parse that matches both Local Event At Venue and Venue Name is given increased evidential support because the combined representations of these aspects of the user intent are connected by links and/or relations in active ontology 1050: in this instance, the Local Event node is connected to the Venue node which is connected to the Venue Name node which is connected to the entity name in the database of venue names.

In at least one embodiment, the connections between nodes in an active ontology that provide evidential support for disambiguating among candidate semantic parse results 222 are directed arcs, forming an inference lattice, in which matching nodes provide evidence for nodes to which they are connected by directed arcs.

In 232, language interpreter component(s) 1070 sort and select 232 the top semantic parses as the representation of user intent 290.

Domain Entity Database(s) 1072

In at least one embodiment, domain entity database(s) 1072 may be operable to perform and/or implement various types of functions, operations, actions, and/or other features such as, for example, one or more of the following (or combinations thereof):

- Store data about domain entities. Domain entities are things in the world or computing environment that may be modeled in domain models. Examples may include, but are not limited to, one or more of the following (or combinations thereof):
  - Businesses of any kind;
  - Movies, videos, songs and/or other musical products, and/or any other named entertainment products;
  - Products of any kind;
  - Events;
  - Calendar entries;
  - Cities, states, countries, neighborhoods, and/or other geographic, geopolitical, and/or geospatial points or regions;
  - Named places such as landmarks, airports, and the like;
- Provide database services on these databases, including but not limited to simple and complex queries, transactions, triggered events, and the like.

According to specific embodiments, multiple instances or threads of domain entity database(s) 1072 may be concurrently implemented and/or initiated via the use of one or more processors 63 and/or other combinations of hardware and/or hardware and software. For example, in at least some embodiments, various aspects, features, and/or functionalities of domain entity database(s) 1072 may be performed, implemented and/or initiated by database software and/or hardware residing on client(s) 1304 and/or on server(s) 1340.

One example of a domain entity database 1072 that can be used in connection with the present invention according to one embodiment is a database of one or more businesses storing, for example, their names and locations. The database might be used, for example, to look up words contained in an input request for matching businesses and/or to look up the location of a business whose name is known. One skilled in the art will recognize that many other arrangements and implementations are possible.

Vocabulary Component(s) 1058

In at least one embodiment, vocabulary component(s) 1058 may be operable to perform and/or implement various types of functions, operations, actions, and/or other features such as, for example, one or more of the following (or combinations thereof):

- Provide databases associating words and strings with concepts, properties, relations, or instances of domain models or task models,
- Vocabulary from vocabulary components may be used by automated assistant 1002 for several processes, including for example: eliciting input, interpreting natural language, and generating output.

According to specific embodiments, multiple instances or threads of vocabulary component(s) 1058 may be concurrently implemented and/or initiated via the use of one or more processors 63 and/or other combinations of hardware and/or hardware and software. For example, in at least some embodiments, various aspects, features, and/or functionalities of vocabulary component(s) 1058 may be implemented as data structures that associate strings with the names of concepts, relations, properties, and instances. These data structures may be stored in memory, files, or databases. Access to vocabulary component(s) 1058 may be implemented through direct APIs, network APIs, and/or database query interfaces. Creation and maintenance of vocabulary component(s) 1058 may be achieved via direct editing of files, database transactions, or through the use of domain model editing tools. Vocabulary component(s) 1058 may be implemented as part of or in association with active ontologies 1050. One skilled in the art will recognize that many other arrangements and implementations are possible.

According to different embodiments, one or more different threads or instances of vocabulary component(s) 1058 may be initiated in response to detection of one or more conditions or events satisfying one or more different types of minimum threshold criteria for triggering initiation of at least one instance of vocabulary component(s) 1058. In one embodiment, vocabulary component(s) 1058 are accessed whenever vocabulary information is required, including, for example, during input elicitation, input interpretation, and formatting output for users. One skilled in the art will recognize that other conditions or events may trigger initiation and/or implementation of one or more different threads or instances of vocabulary component(s) 1058.

In at least one embodiment, a given instance of vocabulary component(s) 1058 may access and/or utilize information from one or more associated databases. In at least one embodiment, at least a portion of the database information may be accessed via communication with one or more local and/or remote memory devices. In one embodiment, vocabulary component(s) 1058 may access data from external databases, for instance, from a data warehouse or dictionary.

Language Pattern Recognizer Component(s) 1060

In at least one embodiment, language pattern recognizer component(s) 1060 may be operable to perform and/or implement various types of functions, operations, actions, and/or other features such as, for example, looking for patterns in language or speech input that indicate grammatical, idiomatic, and/or other composites of input tokens. These patterns correspond to, for example, one or more of the following (or combinations thereof): words, names, phrases, data, parameters, commands, and/or signals of speech acts.

According to specific embodiments, multiple instances or threads of pattern recognizer component(s) 1060 may be concurrently implemented and/or initiated via the use of one or more processors 63 and/or other combinations of hardware and/or hardware and software. For example, in at least some embodiments, various aspects, features, and/or functionalities of language pattern recognizer component(s) 1060 may be performed, implemented and/or initiated by one or more files, databases, and/or programs containing expressions in a pattern matching language. In at least one embodiment, language pattern recognizer component(s) 1060 are represented declaratively, rather than as program code; this enables them to be created and maintained by editors and other tools other than programming tools. Examples of declarative representations may include, but are not limited to, one or more of the following (or combinations thereof): regular expressions, pattern matching rules, natural language grammars, parsers based on state machines and/or other parsing models.

One skilled in the art will recognize that other types of systems, components, systems, devices, procedures, processes, and the like (or combinations thereof) can be used for implementing language pattern recognizer component(s) 1060.

According to different embodiments, one or more different threads or instances of language pattern recognizer component(s) 1060 may be initiated in response to detection of one or more conditions or events satisfying one or more different types of minimum threshold criteria for triggering initiation of at least one instance of language pattern recognizer component(s) 1060. Various examples of conditions or events which may trigger initiation and/or implementation of one or more different threads or instances of language pattern recognizer component(s) 1060 may include, but are not limited to, one or more of the following (or combinations thereof):

- during active elicitation of input, in which the structure of the language pattern recognizers may constrain and guide the input from the user;
- during natural language processing, in which the language pattern recognizers help interpret input as language;
- during the identification of tasks and dialogs, in which the language pattern recognizers may help identify tasks, dialogs, and/or steps therein.

In at least one embodiment, a given instance of language pattern recognizer component(s) 1060 may access and/or utilize information from one or more associated databases. In at least one embodiment, at least a portion of the database information may be accessed via communication with one or more local and/or remote memory devices. Examples of different types of data which may be accessed by language pattern recognizer component(s) 1060 may include, but are not limited to, data from any of the models various models and data sources that may be part of embodiments of assistant 1002, which may include, but are not limited to, one or more of the following (or combinations thereof):

- Domain models 1056;
- Vocabulary 1058;
- Domain entity databases 1072;
- Short term memory 1052;
- Long term personal memory 1054;
- Task flow models 1086;
- Dialog flow models 1087;
- Service capability models 1088.

In one embodiment, access of data from other parts of embodiments of assistant 1002 may be coordinated by active ontologies 1050.

Referring again to FIG. 14, there is shown an example of some of the various types of functions, operations, actions, and/or other features which may be provided by language pattern recognizer component(s) 1060. FIG. 14 illustrates language patterns that language pattern recognizer component(s) 1060 may recognize. For example, the idiom "what is happening" (in a city) may be associated with the task of event planning and the domain of local events.

Dialog Flow Processor Component(s) 1080

In at least one embodiment, dialog flow processor component(s) 1080 may be operable to perform and/or implement various types of functions, operations, actions, and/or other features such as, for example, one or more of the following (or combinations thereof):

- Given a representation of the user intent 290 from language interpretation 200, identify the task a user wants performed and/or a problem the user wants solved. For example, a task might be to find a restaurant.
- For a given problem or task, given a representation of user intent 290, identify parameters to the task or problem. For example, the user might be looking for a recommended restaurant that serves Italian food near the user's home. The constraints that a restaurant be recommended, serving Italian food, and near home are parameters to the task of finding a restaurant.
- Given the task interpretation and current dialog with the user, such as that which may be represented in personal short term memory 1052, select an appropriate dialog flow model and determine a step in the flow model corresponding to the current state.

According to specific embodiments, multiple instances or threads of dialog flow processor component(s) 1080 may be concurrently implemented and/or initiated via the use of one or more processors 63 and/or other combinations of hardware and/or hardware and software.

In at least one embodiment, a given instance of dialog flow processor component(s) 1080 may access and/or utilize information from one or more associated databases. In at least one embodiment, at least a portion of the database information may be accessed via communication with one or more local and/or remote memory devices. Examples of different types of data which may be accessed by dialog flow processor component(s) 1080 may include, but are not limited to, one or more of the following (or combinations thereof):

- task flow models 1086;
- domain models 1056;
- dialog flow models 1087.

Figure 30:
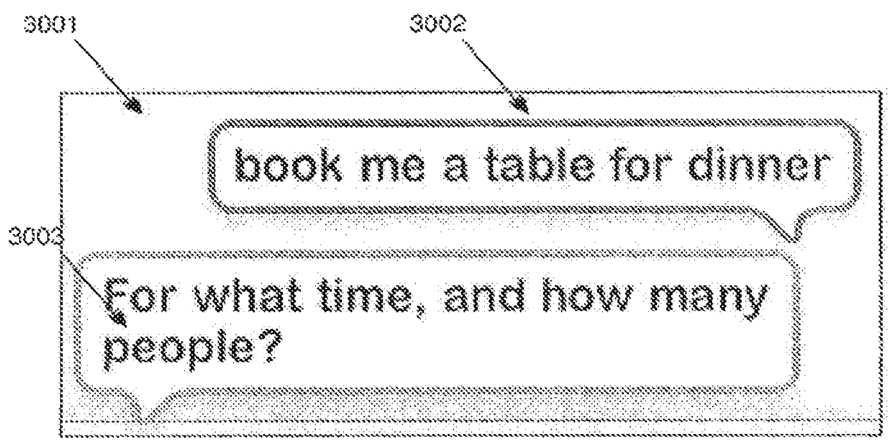
FIGS. 30 and 31 are screen shots illustrating an example of various types of functions, operations, actions, and/or other features which may be provided by dialog flow processor component(s) according to one embodiment.
Figure 31:
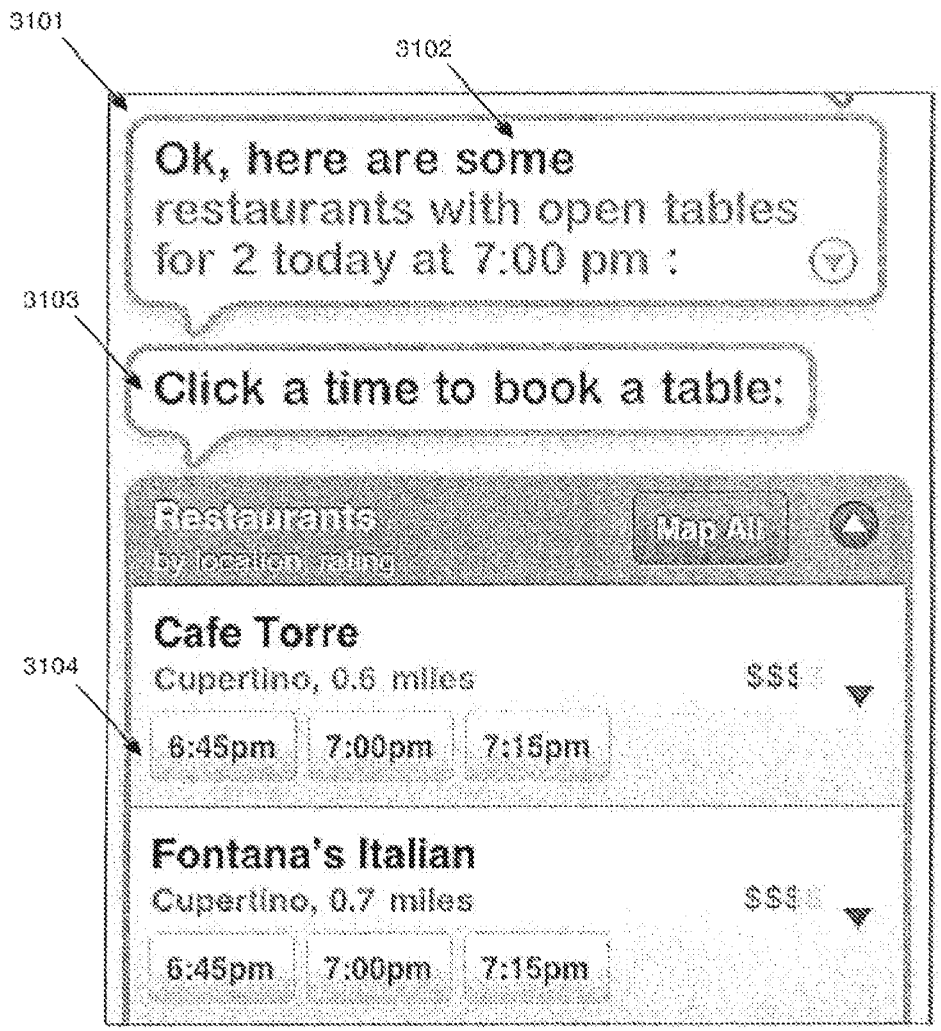

Referring now to FIGS. 30 and 31, there are shown screen shots illustrating an example of various types of functions, operations, actions, and/or other features which may be provided by dialog flow processor component(s) according to one embodiment.

As shown in screen 3001, user requests a dinner reservation by providing speech or text input 3002 "book me a table for dinner". Assistant 1002 generates a prompt 3003 asking the user to specify time and party size.

Once these parameters have been provided, screen 3101 is shown. Assistant 1002 outputs a dialog box 3102 indicating that results are being presented, and a prompt 3103 asking the user to click a time. Listings 3104 are also displayed.

In one embodiment, such a dialog is implemented as follows. Dialog flow processor component(s) 1080 are given a representation of user intent from language interpreter component 1070 and determine that the appropriate response is to ask the user for information required to perform the next step in a task flow. In this case, the domain is restaurants, the task is getting a reservation, and the dialog step is to ask the user for information required to accomplish the next step in the task flow. This dialog step is exemplified by prompt 3003 of screen 3001.

Figure 32:
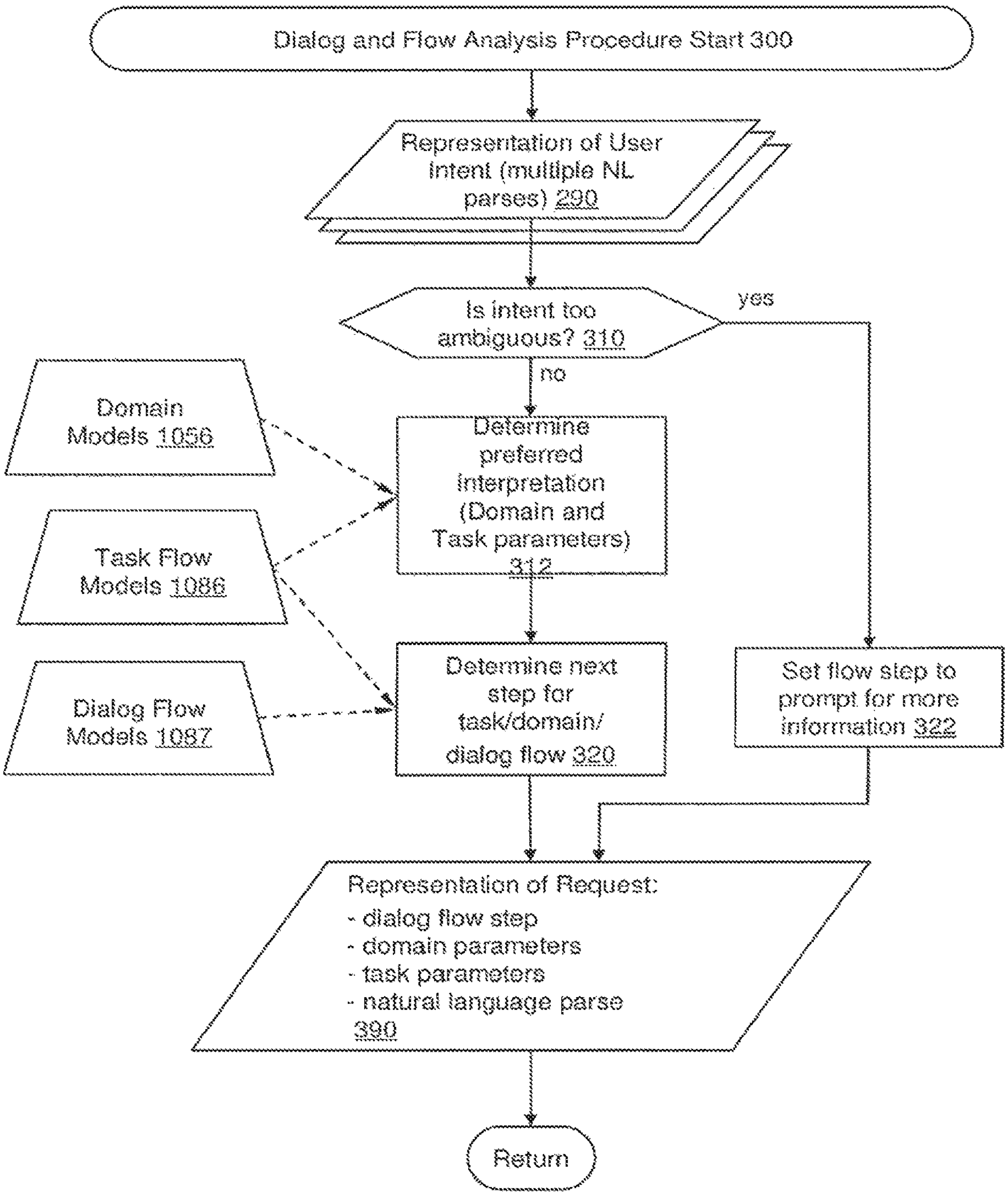
FIG. 32 is a flow diagram depicting a method of operation for dialog flow processor component(s) according to one embodiment.

Referring now also to FIG. 32, there is shown a flow diagram depicting a method of operation for dialog flow processor component(s) 1080 according to one embodiment. The flow diagram of FIG. 32 is described in connection with the example shown in FIGS. 30 and 31.

The method begins 300. Representation of user intent 290 is received. As described in connection with FIG. 28, in one embodiment, representation of user intent 290 is a set of semantic parses. For the example shown in FIGS. 30 and 31, the domain is restaurants, the verb is "book" associated with restaurant reservations, and the time parameter is the evening of the current day.

In 310, dialog flow processor component(s) 1080 determine whether this interpretation of user intent is supported strongly enough to proceed, and/or if it is better supported than alternative ambiguous parses. In the current example, the interpretation is strongly supported, with no competing ambiguous parses. If, on the other hand, there are competing ambiguities or sufficient uncertainty, then step 322 is performed, to set the dialog flow step so that the execution phase causes the dialog to output a prompt for more information from the user.

In 312, the dialog flow processor component(s) 1080 determine the preferred interpretation of the semantic parse with other information to determine the task to perform and its parameters. Information may be obtained, for example, from domain models 1056, task flow models 1086, and/or dialog flow models 1087, or any combination thereof. In the current example, the task is identified as getting a reservation, which involves both finding a place that is reservable and available, and effecting a transaction to reserve a table. Task parameters are the time constraint along with others that are inferred in step 312.

In 320, the task flow model is consulted to determine an appropriate next step. Information may be obtained, for example, from domain models 1056, task flow models 1086, and/or dialog flow models 1087, or any combination thereof. In the example, it is determined that in this task flow the next step is to elicit missing parameters to an availability search for restaurants, resulting in prompt 3003 illustrated in FIG. 30, requesting party size and time for a reservation.

As described above, FIG. 31 depicts screen 3101 is shown including dialog element 3102 that is presented after the user answers the request for the party size and reservation time. In one embodiment, screen 3101 is presented as the result of another iteration through an automated call and response procedure, as described in connection with FIG. 33, which leads to another call to the dialog and flow procedure depicted in FIG. 32. In this instantiation of the dialog and flow procedure, after receiving the user preferences, dialog flow processor component(s) 1080 determines a different task flow step in step 320: to do an availability search. When request 390 is constructed, it includes the task parameters sufficient for dialog flow processor component(s) 1080 and services orchestration component(s) 1082 to dispatch to a restaurant booking service.

Dialog Flow Models Component(s) 1087

In at least one embodiment, dialog flow models component(s) 1087 may be operable to provide dialog flow models, which represent the steps one takes in a particular kind of conversation between a user and intelligent automated assistant 1002. For example, the dialog flow for the generic task of performing a transaction includes steps for getting the necessary data for the transaction and confirming the transaction parameters before committing it.

Task Flow Models Component(s) 1086

In at least one embodiment, task flow models component(s) 1086 may be operable to provide task flow models, which represent the steps one takes to solve a problem or address a need. For example, the task flow for getting a dinner reservation involves finding a desirable restaurant, checking availability, and doing a transaction to get a reservation for a specific time with the restaurant.

According to specific embodiments, multiple instances or threads of task flow models component(s) 1086 may be concurrently implemented and/or initiated via the use of one or more processors 63 and/or other combinations of hardware and/or hardware and software. For example, in at least some embodiments, various aspects, features, and/or functionalities of task flow models component(s) 1086 may be implemented as programs, state machines, or other ways of identifying an appropriate step in a flow graph.

In at least one embodiment, task flow models component(s) 1086 may use a task modeling framework called generic tasks. Generic tasks are abstractions that model the steps in a task and their required inputs and generated outputs, without being specific to domains. For example, a generic task for transactions might include steps for gathering data required for the transaction, executing the transaction, and outputting results of the transaction—all without reference to any particular transaction domain or service for implementing it. It might be instantiated for a domain such as shopping, but it is independent of the shopping domain and might equally well apply to domains of reserving, scheduling, and the like.

At least a portion of the functions, operations, actions, and/or other features associated with task flow models component(s) 1086 and/or procedure(s) described herein may be implemented, at least in part, using concepts, features, components, processes, and/or other aspects disclosed herein in connection with generic task modeling framework.

Additionally, at least a portion of the functions, operations, actions, and/or other features associated with task flow models component(s) 1086 and/or procedure(s) described herein may be implemented, at least in part, using concepts, features, components, processes, and/or other aspects relating to constrained selection tasks, as described herein. For example, one embodiment of generic tasks may be implemented using a constrained selection task model.

In at least one embodiment, a given instance of task flow models component(s) 1086 may access and/or utilize information from one or more associated databases. In at least one embodiment, at least a portion of the database information may be accessed via communication with one or more local and/or remote memory devices. Examples of different types of data which may be accessed by task flow models component(s) 1086 may include, but are not limited to, one or more of the following (or combinations thereof):

- Domain models 1056;
- Vocabulary 1058;
- Domain entity databases 1072;
- Short term memory 1052;
- Long term personal memory 1054;
- Dialog flow models 1087;
- Service capability models 1088.

Figure 34:
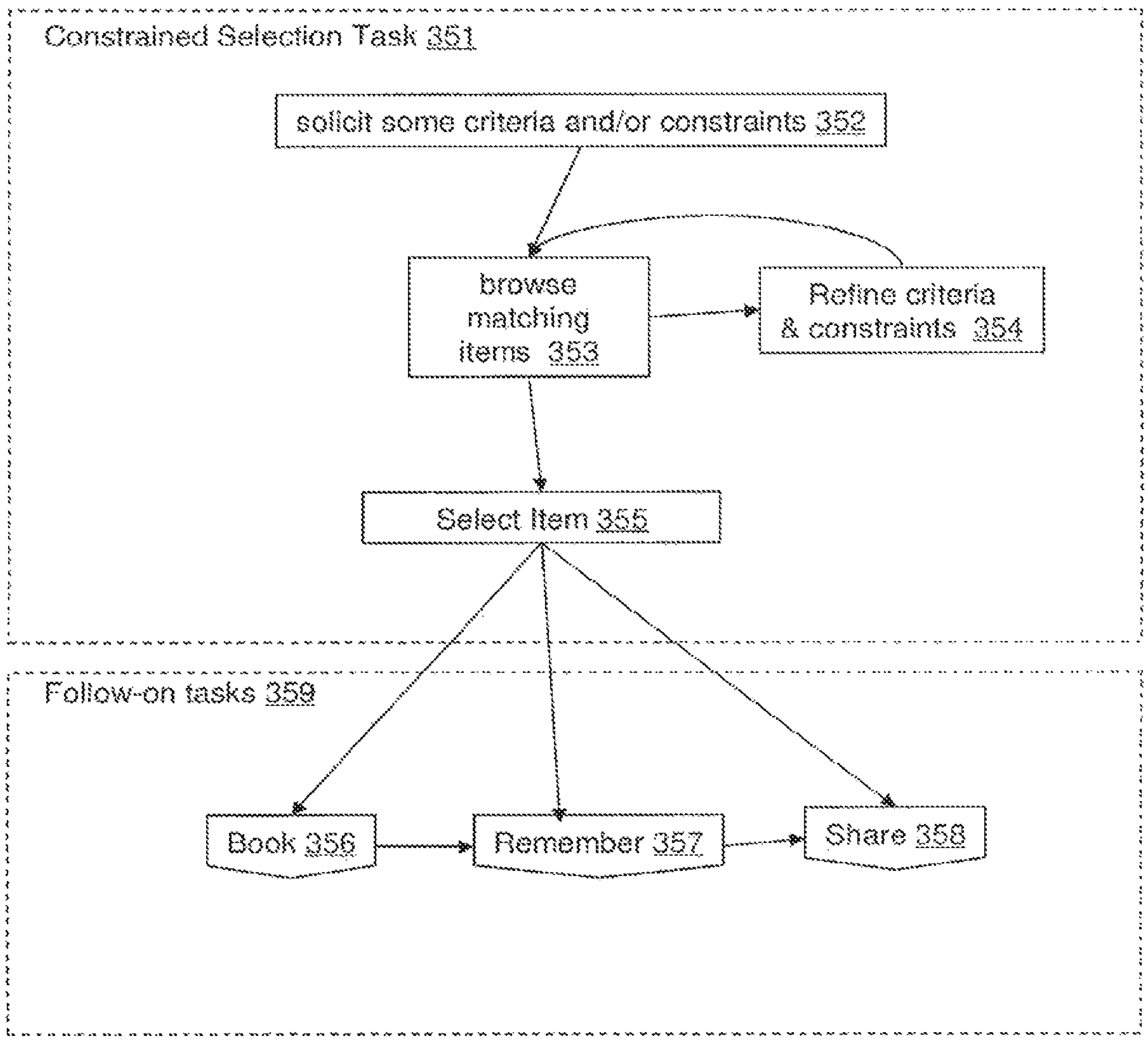
FIG. 34 is a flow diagram depicting an example of task flow for a constrained selection task according to one embodiment.

Referring now to FIG. 34, there is shown a flow diagram depicting an example of task flow for a constrained selection task 351 according to one embodiment.

Constrained selection is a kind of generic task in which the goal is to select some item from a set of items in the world based on a set of constraints. For example, a constrained selection task 351 may be instantiated for the domain of restaurants. Constrained selection task 351 starts by soliciting criteria and constraints from the user 352. For example, the user might be interested in Asian food and may want a place to eat near his or her office.

In step 353, assistant 1002 presents items that meet the stated criteria and constraints for the user to browse. In this example, it may be a list of restaurants and their properties which may be used to select among them.

In step 354, the user is given an opportunity to refine criteria and constraints. For example, the user might refine the request by saying "near my office". The system would then present a new set of results in step 353.

Figure 35:
FIGS. 35 and 36 are screen shots illustrating an example of the operation of constrained selection task according to one embodiment.

Referring now also to FIG. 35, there is shown an example of screen 3501 including list 3502 of items presented by constrained selection task 351 according to one embodiment.

In step 355, the user can select among the matching items. Any of a number of follow-on tasks 359 may then be made available, such as for example book 356, remember 357, or share 358. In various embodiments, follow-on tasks 359 can involve interaction with web-enabled services, and/or with functionality local to the device (such as setting a calendar appointment, making a telephone call, sending an email or text message, setting an alarm, and the like).

Figure 36:

In the example of FIG. 35, the user can select an item within list 3502 to see more details and to perform additional actions. Referring now also to FIG. 36, there is shown an example of screen 3601 after the user has selected an item from list 3502. Additional information and options corresponding to follow-on tasks 359 concerning the selected item are displayed.

In various embodiments, the flow steps may be offered to the user in any of several input modalities, including but not limited to any combination of explicit dialog prompts and GUI links.

Services Component(s) 1084

Services component(s) 1084 represent the set of services that intelligent automated assistant 1002 might call on behalf of the user. Any service that can be called may be offered in a services component 1084.

In at least one embodiment, services component(s) 1084 may be operable to perform and/or implement various types of functions, operations, actions, and/or other features such as, for example, one or more of the following (or combinations thereof):

- Provide the functions over an API that would normally be provided by a web-based user interface to a service. For example, a review website might provide a service API that would return reviews of a given entity automatically when called by a program. The API offers to intelligent automated assistant 1002 the services that a human would otherwise obtain by operating the user interface of the website.
- Provide the functions over an API that would normally be provided by a user interface to an application. For example, a calendar application might provide a service API that would return calendar entries automatically when called by a program. The API offers to intelligent automated assistant 1002 the services that a human would otherwise obtain by operating the user interface of the application. In one embodiment, assistant 1002 is able to initiate and control any of a number of different functions available on the device. For example, if assistant 1002 is installed on a smartphone, personal digital assistant, tablet computer, or other device, assistant 1002 can perform functions such as: initiate applications, make calls, send emails and/or text messages, add calendar events, set alarms, and the like. In one embodiment, such functions are activated using services component(s) 1084.
- Provide services that are not currently implemented in a user interface, but that are available through an API to assistant in larger tasks. For example, in one embodiment, an API to take a street address and return machine-readable geocoordinates might be used by assistant 1002 as a service component 1084 even if it has no direct user interface on the web or a device.

According to specific embodiments, multiple instances or threads of services component(s) 1084 may be concurrently implemented and/or initiated via the use of one or more processors 63 and/or other combinations of hardware and/or hardware and software. For example, in at least some embodiments, various aspects, features, and/or functionalities of services component(s) 1084 may be performed, implemented and/or initiated by one or more of the following types of systems, components, systems, devices, procedures, processes, and the like (or combinations thereof):

- implementation of an API exposed by a service, locally or remotely or any combination;
- inclusion of a database within automated assistant 1002 or a database service available to assistant 1002.

For example, a website that offers users an interface for browsing movies might be used by an embodiment of intelligent automated assistant 1002 as a copy of the database used by the website. Services component(s) 1084 would then offer an internal API to the data, as if it were provided over a network API, even though the data is kept locally.

As another example, services component(s) 1084 for an intelligent automated assistant 1002 that helps with restaurant selection and meal planning might include any or all of the following set of services which are available from third parties over the network:

- a set of restaurant listing services which lists restaurants matching name, location, or other constraints;
- a set of restaurant rating services which return rankings for named restaurants;
- a set of restaurant reviews services which returns written reviews for named restaurants;

a geocoding service to locate restaurants on a map;

a reservation service that enables programmatic reservation of tables at restaurants.

Services Orchestration Component(s) 1082

Services orchestration component(s) 1082 of intelligent automated assistant 1002 executes a service orchestration procedure.

In at least one embodiment, services orchestration component(s) 1082 may be operable to perform and/or implement various types of functions, operations, actions, and/or other features such as, for example, one or more of the following (or combinations thereof):

Dynamically and automatically determine which services may meet the user's request and/or specified domain(s) and task(s);

Dynamically and automatically call multiple services, in any combination of concurrent and sequential ordering;

Dynamically and automatically transform task parameters and constraints to meet input requirements of service APIs;

Dynamically and automatically monitor for and gather results from multiple services;

Dynamically and automatically merge service results data from various services into to a unified result model;

Orchestrate a plurality of services to meet the constraints of a request;

Orchestrate a plurality of services to annotate an existing result set with auxiliary information;

Output the result of calling a plurality of services in a uniform, service independent representation that unifies the results from the various services (for example, as a result of calling several restaurant services that return lists of restaurants, merge the data on at least one restaurant from the several services, removing redundancy).

For example, in some situations, there may be several ways to accomplish a particular task. For example, user input such as "remind me to leave for my meeting across town at 2 pm" specifies an action that can be accomplished in at least three ways: set alarm clock; create a calendar event; or call a to-do manager. In one embodiment, services orchestration component(s) 1082 makes the determination as to which way to best satisfy the request.

Services orchestration component(s) 1082 can also make determinations as to which combination of several services would be best to invoke in order to perform a given overall task. For example, to find and reserve a table for dinner, services orchestration component(s) 1082 would make determinations as to which services to call in order to perform such functions as looking up reviews, getting availability, and making a reservation. Determination of which services to use may depend on any of a number of different factors. For example, in at least one embodiment, information about reliability, ability of service to handle certain types of requests, user feedback, and the like, can be used as factors in determining which service(s) is/are appropriate to invoke.

According to specific embodiments, multiple instances or threads of services orchestration component(s) 1082 may be concurrently implemented and/or initiated via the use of one or more processors and/or other combinations of hardware and/or hardware and software.

In at least one embodiment, a given instance of services orchestration component(s) 1082 may use explicit service capability models 1088 to represent the capabilities and other properties of external services, and reason about these capabilities and properties while achieving the features of services orchestration component(s) 1082. This affords advantages over manually programming a set of services that may include, for example, one or more of the following (or combinations thereof):

Ease of development;

Robustness and reliability in execution;

The ability to dynamically add and remove services without disrupting code;

The ability to implement general distributed query optimization algorithms that are driven by the properties and capabilities rather than hard coded to specific services or APIs.

In at least one embodiment, a given instance of services orchestration component(s) 1082 may access and/or utilize information from one or more associated databases. In at least one embodiment, at least a portion of the database information may be accessed via communication with one or more local and/or remote memory devices. Examples of different types of data which may be accessed by services orchestration component(s) 1082 may include, but are not limited to, one or more of the following (or combinations thereof):

Instantiations of domain models;

Syntactic and semantic parses of natural language input;

Instantiations of task models (with values for parameters);

Dialog and task flow models and/or selected steps within them;

Service capability models 1088;

Any other information available in an active ontology 1050.

Figure 37:
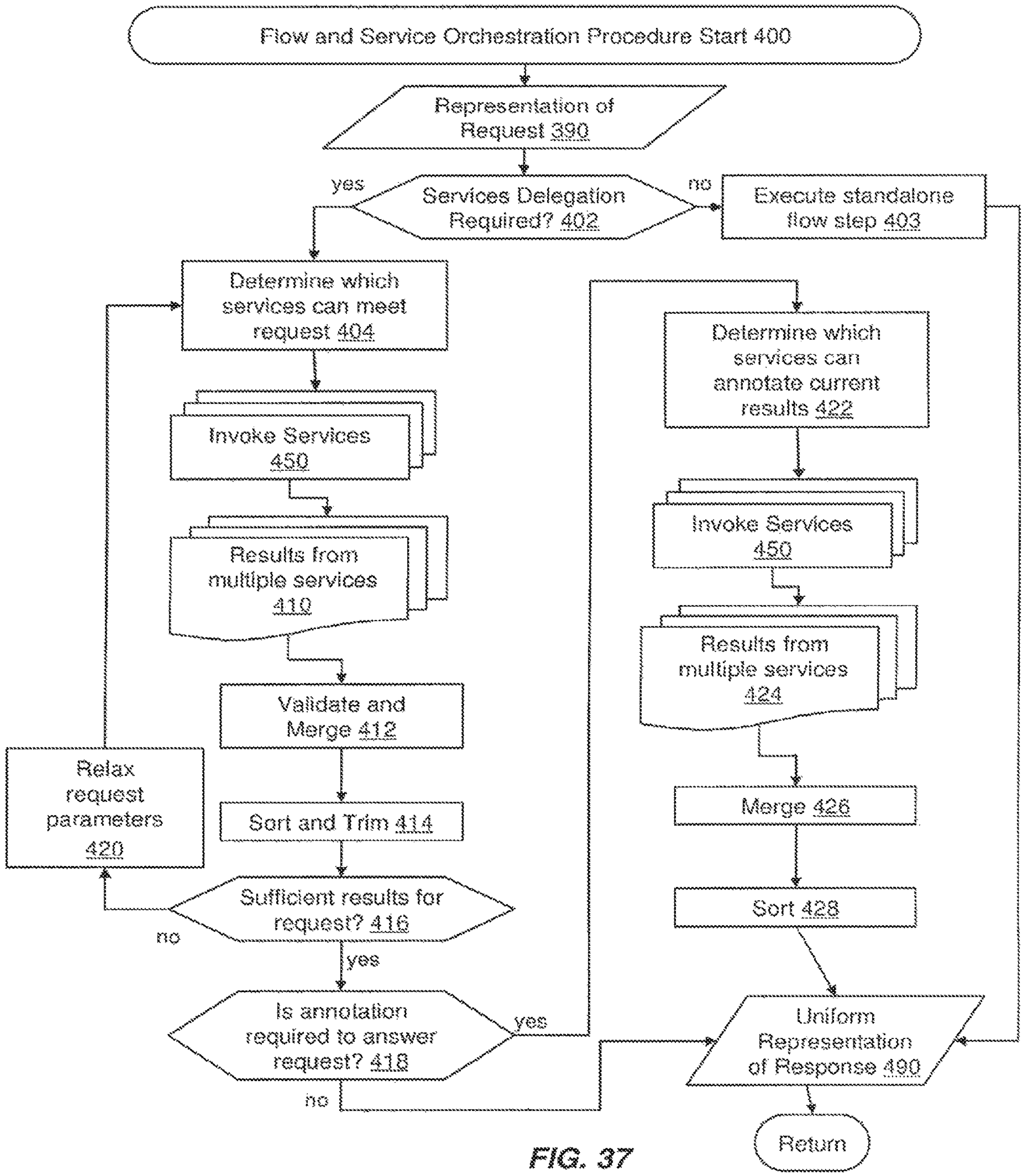
FIG. 37 is a flow diagram depicting an example of a procedure for executing a service orchestration procedure according to one embodiment.

Referring now to FIG. 37, there is shown an example of a procedure for executing a service orchestration procedure according to one embodiment.

In this particular example, it is assumed a single user is interesting in finding a good place for dinner at a restaurant, and is engaging intelligent automated assistant 1002 in a conversation to help provide this service.

Consider the task of finding restaurants that are of high quality, are well reviewed, near a particular location, available for reservation at a particular time, and serve a particular kind of food. The method begins 400. These domain and task parameters are given as input 390.

At 402, it is determined whether the given request may require any services. In some situations, services delegation may not be required, for example if assistant 1002 is able to perform the desired task itself. For example, in one embodiment, assistant 1002 may be able to answer a factual question without invoking services delegation. Accordingly, if the request does not require services, then standalone flow step is executed in 403 and its result 490 is returned. For example, if the task request was to ask for information about automated assistant 1002 itself, then the dialog response may be handled without invoking any external services.

If, in step 402, it is determined that services delegation is required, services orchestration component(s) 1082 proceed to step 404. In 404, services orchestration component(s) 1082 may match up the task requirements with declarative descriptions of the capabilities and properties of services in service capability models 1088. At least one service provider that might support the instantiated operation provides declarative, qualitative metadata detailing, for example, one or more of the following (or combinations thereof):

the data fields that are returned with results;

which classes of parameters the service provider is statically known to support;

policy functions for parameters the service provider might be able to support after dynamic inspection of the parameter values;

a performance rating defining how the service performs (e.g. relational DB, web service, triple store, full-text index, or some combination thereof);

property quality ratings statically defining the expected quality of property values returned with the result object;

an overall quality rating of the results the service may expect to return.

For example, reasoning about the classes of parameters that service may support, a service model may state that services 1, 2, 3, and 4 may provide restaurants that are near a particular location (a parameter), services 2 and 3 may filter or rank restaurants by quality (another parameter), services 3, 4, and 5 may return reviews for restaurants (a data field returned), service 6 may list the food types served by restaurants (a data field returned), and service 7 may check availability of restaurants for particular time ranges (a parameter). Services 8 through 99 offer capabilities that are not required for this particular domain and task.

Using this declarative, qualitative metadata, the task, the task parameters, and other information available from the runtime environment of the assistant, services orchestration component(s) 1082 determines 404 an optimal set of service providers to invoke. The optimal set of service providers may support one or more task parameters (returning results that satisfy one or more parameters) and also considers the performance rating of at least one service provider and the overall quality rating of at least one service provider.

The result of step 404 is a dynamically generated list of services to call for this particular user and request.

In at least one embodiment, services orchestration component(s) 1082 considers the reliability of services as well as their ability to answer specific information requests.

In at least one embodiment, services orchestration component(s) 1082 hedges against unreliability by calling overlapping or redundant services.

In at least one embodiment, services orchestration component(s) 1082 considers personal information about the user (from the short term personal memory component) to select services. For example, the user may prefer some rating services over others.

In step 450, services orchestration component(s) 1082 dynamically and automatically invokes multiple services on behalf of a user. In at least one embodiment, these are called dynamically while responding to a user's request. According to specific embodiments, multiple instances or threads of the services may be concurrently called. In at least one embodiment, these are called over a network using APIs, or over a network using web service APIs, or over the Internet using web service APIs, or any combination thereof.

In at least one embodiment, the rate at which services are called is programmatically limited and/or managed.

Figure 38:
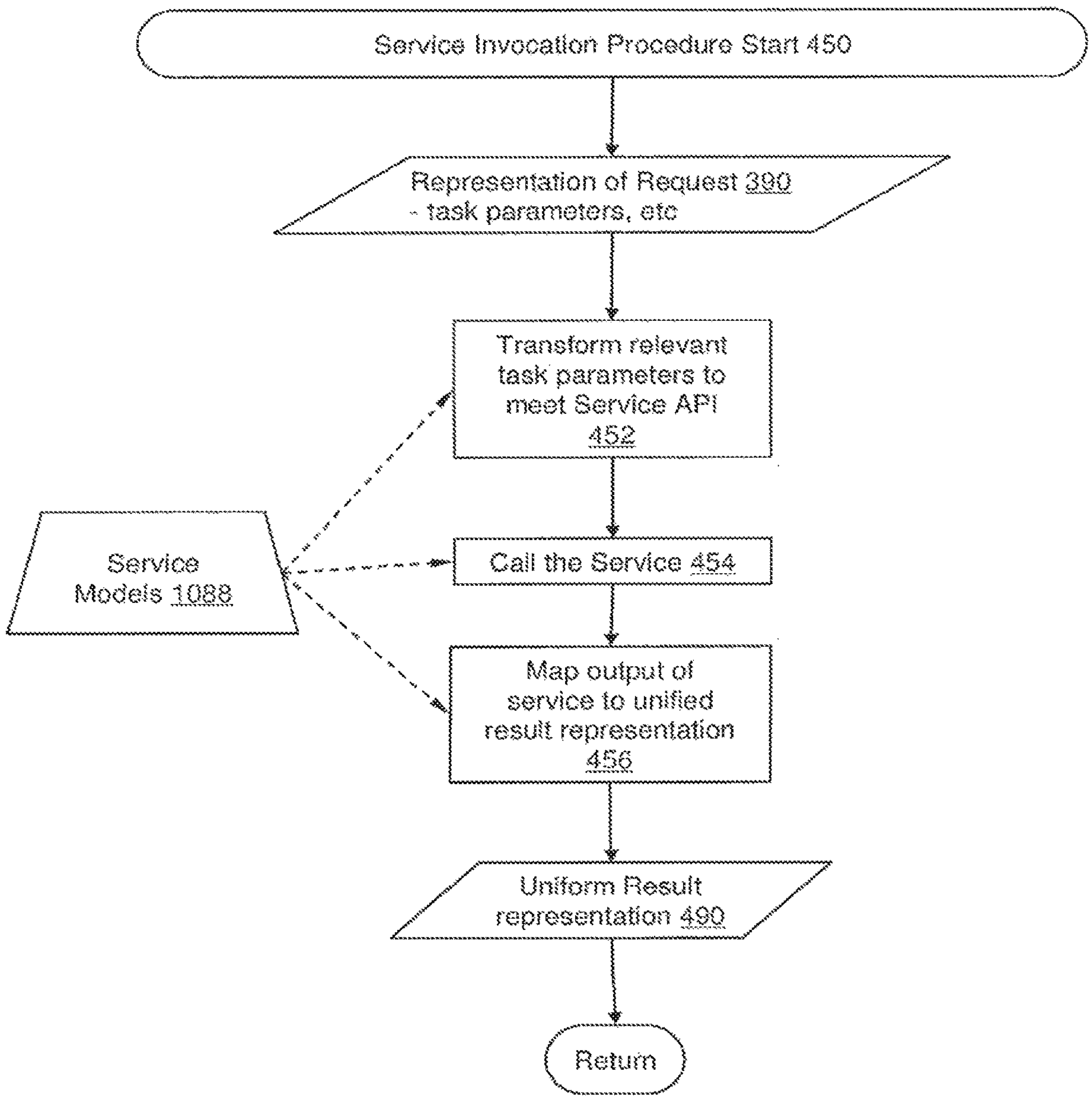
FIG. 38 is a flow diagram depicting an example of a service invocation procedure according to one embodiment.

Referring now also to FIG. 38, there is shown an example of a service invocation procedure 450 according to one embodiment. Service invocation is used, for example, to obtain additional information or to perform tasks by the use of external services. In one embodiment, request parameters are transformed as appropriate for the service's API. Once results are received from the service, the results are transformed to a results representation for presentation to the user within assistant 1002.

In at least one embodiment, services invoked by service invocation procedure 450 can be a web service, application running on the device, operating system function, or the like.

Representation of request 390 is provided, including for example task parameters and the like. For at least one service available from service capability models 1088, service invocation procedure 450 performs transformation 452, calling 454, and output-mapping 456 steps.

In transformation step 452, the current task parameters from request representation 390 are transformed into a form that may be used by at least one service. Parameters to services, which may be offered as APIs or databases, may differ from the data representation used in task requests, and also from at least one other. Accordingly, the objective of step 452 is to map at least one task parameter in the one or more corresponding formats and values in at least one service being called.

For example, the names of businesses such as restaurants may vary across services that deal with such businesses. Accordingly, step 452 would involve transforming any names into forms that are best suited for at least one service.

As another example, locations are known at various levels of precision and using various units and conventions across services. Service 1 might may require ZIP codes, service 2 GPS coordinates, and service 3 postal street addresses.

The service is called 454 over an API and its data gathered. In at least one embodiment, the results 410 are cached. In at least one embodiment, the services that do not return within a specified level performance (e.g., as specified in Service Level Agreement or SLA) are dropped.

In output mapping step 456, the data returned by a service is mapped back onto unified result representation 490. This step may include dealing with different formats, units, and so forth.

In step 412, results from multiple services are validated and merged. In one embodiment, if validated results are collected, an equality policy function—defined on a per-domain basis—is then called pair-wise across one or more results to determine which results represent identical concepts in the real world. When a pair of equal results is discovered, a set of property policy functions—also defined on a per-domain basis—are used to merge property values into a merged result. The property policy function may use the property quality ratings from the service capability models, the task parameters, the domain context, and/or the long-term personal memory 1054 to decide the optimal merging strategy.

For example, lists of restaurants from different providers of restaurants might be merged and duplicates removed. In at least one embodiment, the criteria for identifying duplicates may include fuzzy name matching, fuzzy location matching, fuzzy matching against multiple properties of domain entities, such as name, location, phone number, and/or website address, and/or any combination thereof In step 414, the results are sorted and trimmed to return a result list of the desired length.

In at least one embodiment, a request relaxation loop is also applied. If, in step 416, services orchestration component(s) 1082 determines that the current result list is not sufficient (e.g., it has fewer than the desired number of matching items), then task parameters may be relaxed 420 to allow for more results. For example, if the number of restaurants of the desired sort found within N miles of the target location is too small, then relaxation would run the request again, looking in an area larger than N miles away, and/or relaxing some other parameter of the search.

In at least one embodiment, the service orchestration method is applied in a second pass to "annotate" results with auxiliary data that is useful to the task.

In step 418, services orchestration component(s) 1082 determines whether annotation is required. It may be required if, for example, if the task may require a plot of the results on a map, but the primary services did not return geocoordinates required for mapping.

In 422, service capability models 1088 are consulted again to find services that may return the desired extra information. In one embodiment, the annotation process determines if additional or better data may be annotated to a merged result. It does this by delegating to a property policy function—defined on a per-domain basis—for at least one property of at least one merged result. The property policy function may use the merged property value and property quality rating, the property quality ratings of one or more other service providers, the domain context, and/or the user profile to decide if better data may be obtained. If it is determined that one or more service providers may annotate one or more properties for a merged result, a cost function is invoked to determine the optimal set of service providers to annotate.

At least one service provider in the optimal set of annotation service providers is then invoked 450 with the list of merged results, to obtain results 424. The changes made to at least one merged result by at least one service provider are tracked during this process, and the changes are then merged using the same property policy function process as was used in step 412. Their results are merged 426 into the existing result set.

The resulting data is sorted 428 and unified into a uniform representation 490.

It may be appreciated that one advantage of the methods and systems described above with respect to services orchestration component(s) 1082 is that they may be advantageously applied and/or utilized in various fields of technology other than those specifically relating to intelligent automated assistants. Examples of such other areas of technologies where aspects and/or features of service orchestration procedures include, for example, one or more of the following:

- Dynamic "mash ups" on websites and web-based applications and services;
- Distributed database query optimization;
- Dynamic service oriented architecture configuration.

Service Capability Models Component(s) 1088

In at least one embodiment, service capability models component(s) 1088 may be operable to perform and/or implement various types of functions, operations, actions, and/or other features such as, for example, one or more of the following (or combinations thereof):

- Provide machine readable information about the capabilities of services to perform certain classes of computation;
- Provide machine readable information about the capabilities of services to answer certain classes of queries;
- Provide machine readable information about which classes of transactions are provided by various services;
- Provide machine readable information about the parameters to APIs exposed by various services;
- Provide machine readable information about the parameters that may be used in database queries on databases provided by various services.

Output Processor Component(s) 1090

In at least one embodiment, output processor component(s) 1090 may be operable to perform and/or implement various types of functions, operations, actions, and/or other features such as, for example, one or more of the following (or combinations thereof):

- Format output data that is represented in a uniform internal data structure into forms and layouts that render it appropriately on different modalities. Output data may include, for example, communication in natural language between the intelligent automated assistant and the user; data about domain entities, such as properties of restaurants, movies, products, and the like; domain specific data results from information services, such as weather reports, flight status checks, prices, and the like; and/or interactive links and buttons that enable the user to respond by directly interacting with the output presentation.
- Render output data for modalities that may include, for example, any combination of: graphical user interfaces; text messages; email messages; sounds; animations; and/or speech output.
- Dynamically render data for different graphical user interface display engines based on the request. For example, use different output processing layouts and formats depending on which web browser and/or device is being used.
- Render output data in different speech voices dynamically.
- Dynamically render to specified modalities based on user preferences.
- Dynamically render output using user-specific "skins" that customize the look and feel.
- Send a stream of output packages to a modality, showing intermediate status, feedback, or results throughout phases of interaction with assistant 1002.

According to specific embodiments, multiple instances or threads of output processor component(s) 1090 may be concurrently implemented and/or initiated via the use of one or more processor(s) 63 and/or other combinations of hardware and/or hardware and software. For example, in at least some embodiments, various aspects, features, and/or functionalities of output processor component(s) 1090 may be performed, implemented and/or initiated by one or more of the following types of systems, components, systems, devices, procedures, processes, and the like (or combinations thereof):

- software modules within the client or server of an embodiment of an intelligent automated assistant,
- remotely callable services;
- using a mix of templates and procedural code.

Figure 39:
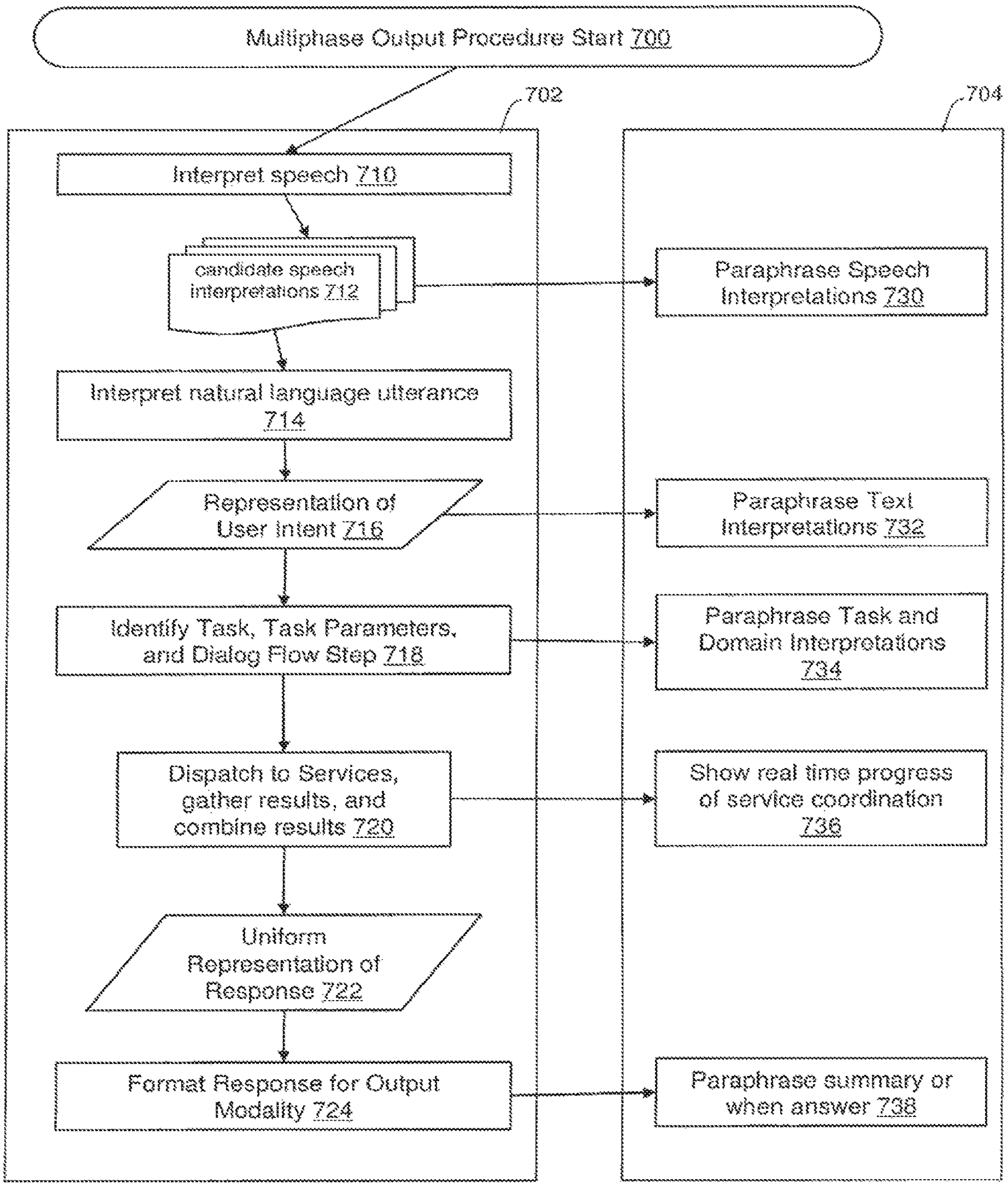
FIG. 39 is a flow diagram depicting an example of a multiphase output procedure according to one embodiment.

Referring now to FIG. 39, there is shown a flow diagram depicting an example of a multiphase output procedure according to one embodiment. The multiphase output procedure includes automated assistant 1002 processing steps 702 and multiphase output steps 704

In step 710, a speech input utterance is obtained and a speech-to-text component (such as component described in connection with FIG. 22) interprets the speech to produce a set of candidate speech interpretations 712. In one embodiment, speech-to-text component is implemented using, for example, Nuance Recognizer, available from Nuance Communications, Inc. of Burlington, MA Candidate speech interpretations 712 may be shown to the user in 730, for example in paraphrased form. For example, the interface might show "did you say?" alternatives listing a few possible alternative textual interpretations of the same speech sound sample.

In at least one embodiment, a user interface is provided to enable the user to interrupt and choose among the candidate speech interpretations.

In step 714, the candidate speech interpretations 712 are sent to a language interpreter 1070, which may produce representations of user intent 716 for at least one candidate speech interpretation 712. In step 732, paraphrases of these representations of user intent 716 are generated and presented to the user. (See related step 132 of procedure 120 in FIG. 22).

In at least one embodiment, the user interface enables the user to interrupt and choose among the paraphrases of natural language interpretations 732.

In step 718, task and dialog analysis is performed. In step 734, task and domain interpretations are presented to the user using an intent paraphrasing algorithm.

Figure 40:
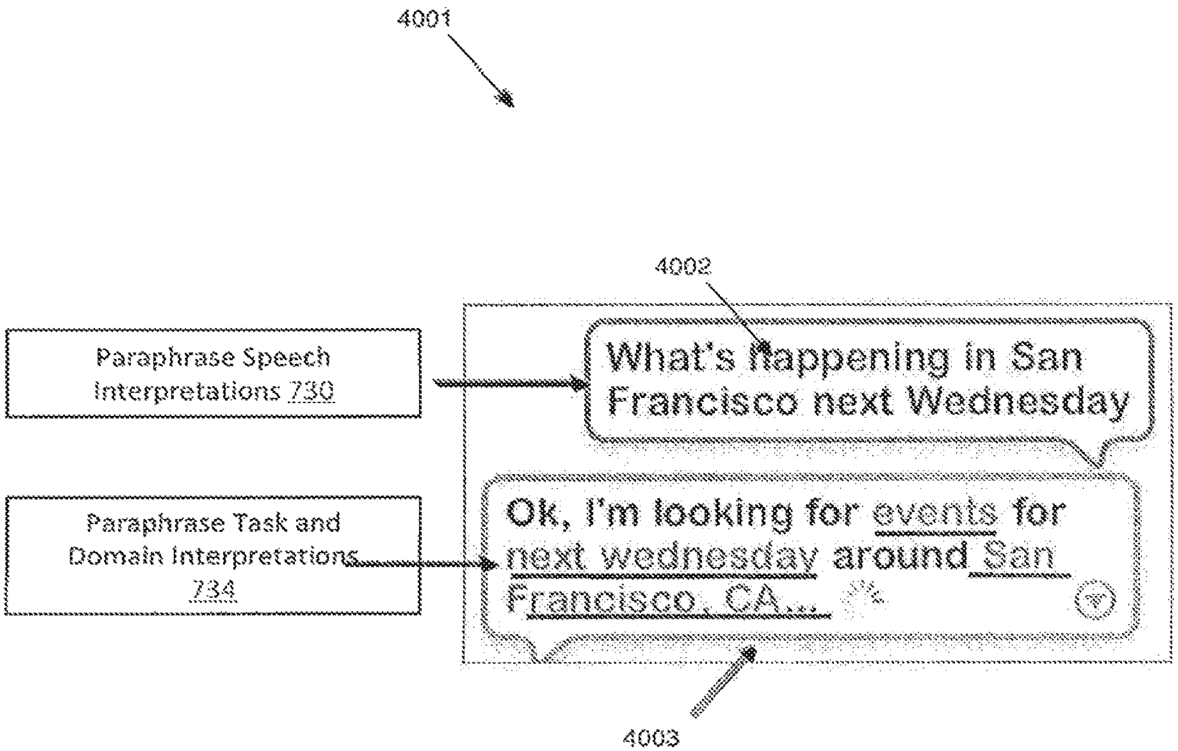
FIGS. 40 and 41 are screen shots depicting examples of output processing according to one embodiment.

Referring now also to FIG. 40, there is shown a screen shot depicting an example of output processing according to one embodiment. Screen 4001 includes echo 4002 of the user's speech input, generated by step 730. Screen 4001 further includes paraphrase 4003 of the user's intent, generated by step 734. In one embodiment, as depicted in the example of FIG. 40, special formatting/highlighting is used for key words such as "events", which may be used to facilitate training of the user for interaction with intelligent automated assistant 1002. For example, by visually observing the formatting of the displayed text, the user may readily identify and interpret back the intelligent automated assistant recognizes keywords such as "events", "next Wednesday", "San Francisco", and the like.

Returning to FIG. 39, as requests are dispatched 720 to services and results are dynamically gathered, intermediate results may be displayed in the form of real-time progress 736. For example, a list of restaurants may be returned and then their reviews may be populated dynamically as the results from the reviews services arrive. Services can include web-enabled services and/or services that access information stored locally on the device and/or from any other source.

A uniform representation of response 722 is generated and formatted 724 for the appropriate output modality. After the final output format is completed, a different kind of paraphrase may be offered in 738. In this phase, the entire result set may be analyzed and compared against the initial request. A summary of results or answer to a question may then be offered.

Figure 41:
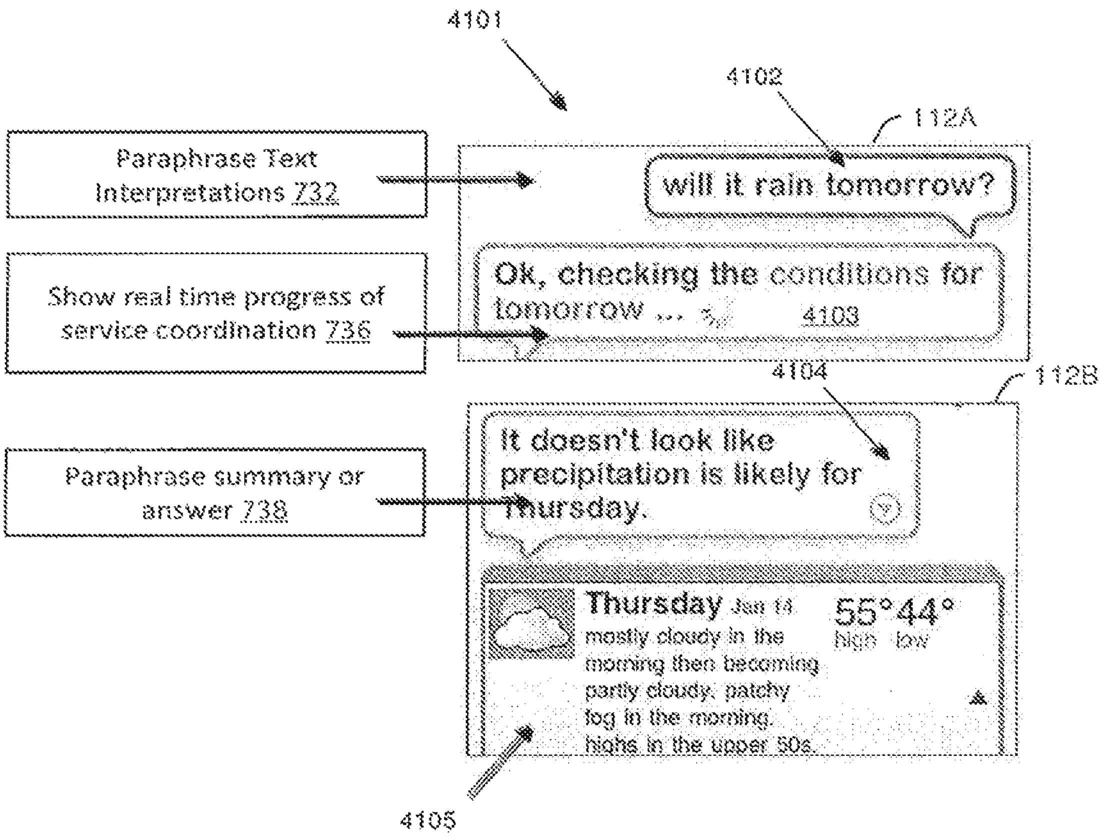

Referring also to FIG. 41, there is shown another example of output processing according to one embodiment. Screen 4101 depicts paraphrase 4102 of the text interpretation, generated by step 732, real-time progress 4103 generated by step 736, and paraphrased summary 4104 generated by step 738. Also included are detailed results 4105.

Figure 42:
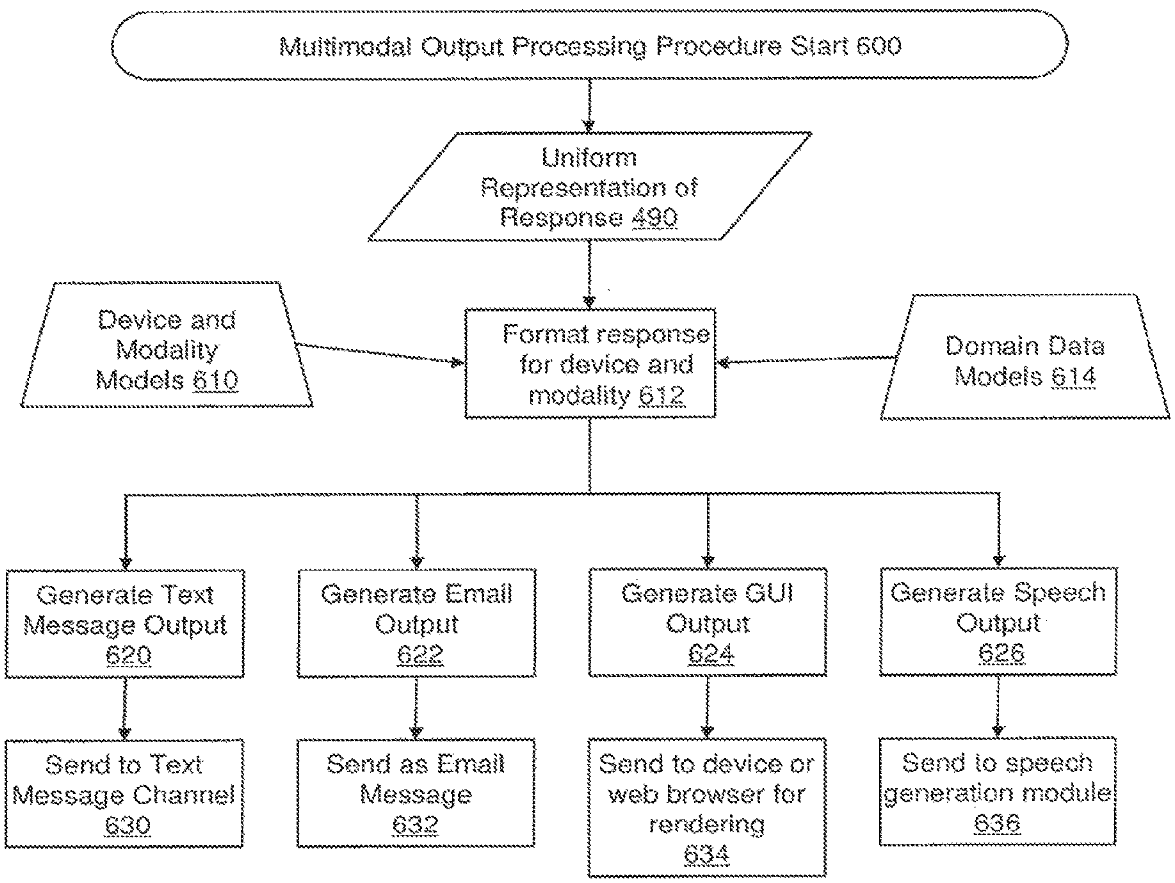
FIG. 42 is a flow diagram depicting an example of multimodal output processing according to one embodiment.

In one embodiment, assistant 1002 is capable of generating output in multiple modes. Referring now to FIG. 42, there is shown a flow diagram depicting an example of multimodal output processing according to one embodiment.

The method begins 600. Output processor 1090 takes uniform representation of response 490 and formats 612 the response according to the device and modality that is appropriate and applicable. Step 612 may include information from device and modality models 610 and/or domain data models 614.

Once response 490 has been formatted 612, any of a number of different output mechanisms can be used, in any combination. Examples depicted in FIG. 42 include:

- Generating 620 text message output, which is sent 630 to a text message channel;
- Generating 622 email output, which is sent 632 as an email message;
- Generating 624 GUI output, which is sent 634 to a device or web browser for rendering;
- Generating 626 speech output, which is sent 636 to a speech generation module.

One skilled in the art will recognize that many other output mechanisms can be used.

In one embodiment, the content of output messages generated by mul-tiphase output procedure 700 is tailored to the mode of multimodal output processing 600. For example, if the output modality is speech 626, the language of used to paraphrase user input 730, text interpretations 732, task and domain interpretations 734, progress 736, and/or result summaries 738 may be more or less verbose or use sentences that are easier to comprehend in audible form than in written form. In one embodiment, the language is tailored in the steps of the multiphase output procedure 700; in other embodiments, the multiphase output procedure 700 produces an intermediate result that is further refined into specific language by multimodal output processing 600.

Short Term Personal Memory Component(s) 1052

In at least one embodiment, short term personal memory component(s) 1052 may be operable to perform and/or implement various types of functions, operations, actions, and/or other features such as, for example, one or more of the following (or combinations thereof):

- Keep a history of the recent dialog between the embodiment of the assistant and the user, including the history of user inputs and their interpretations;
- Keep a history of recent selections by the user in the GUI, such as which items were opened or explored, which phone numbers were called, which items were mapped, which movie trailers where played, and the like;
- Store the history of the dialog and user interactions in a database on the client, the server in a user-specific session, or in client session state such as web browser cookies or RAM used by the client;
- Store the list of recent user requests;
- Store the sequence of results of recent user requests;
- Store the click-stream history of UI events, including button presses, taps, gestures, voice activated triggers, and/or any other user input.
- Store device sensor data (such as location, time, positional orientation, motion, light level, sound level, and the like) which might be correlated with interactions with the assistant.

According to specific embodiments, multiple instances or threads of short term personal memory component(s) 1052 may be concurrently implemented and/or initiated via the use of one or more processors 63 and/or other combinations of hardware and/or hardware and software.

According to different embodiments, one or more different threads or instances of short term personal memory component(s) 1052 may be initiated in response to detection of one or more conditions or events satisfying one or more different types of minimum threshold criteria for triggering initiation of at least one instance of short term personal memory component(s) 1052. For example, short term personal memory component(s) 1052 may be invoked when there is a user session with the embodiment of assistant 1002, on at least one input form or action by the user or response by the system.

In at least one embodiment, a given instance of short term personal memory component(s) 1052 may access and/or utilize information from one or more associated databases. In at least one embodiment, at least a portion of the database information may be accessed via communication with one or more local and/or remote memory devices. For example, short term personal memory component(s) 1052 may access data from long-term personal memory components(s) 1054

(for example, to obtain user identity and personal preferences) and/or data from the local device about time and location, which may be included in short term memory entries.

Figure 43A:
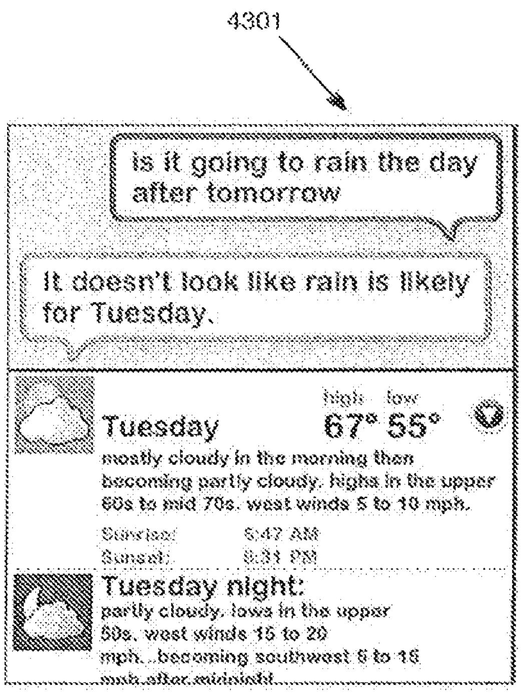
FIGS. 43A and 43B are screen shots depicting an example of the use of short term personal memory component(s) to maintain dialog context while changing location, according to one embodiment.
Figure 43B:

Referring now to FIGS. 43A and 43B, there are shown screen shots depicting an example of the use of short term personal memory component(s) 1052 to maintain dialog context while changing location, according to one embodiment. In this example, the user has asked about the local weather, then just says "in new york". Screen 4301 shows the initial response, including local weather. When the user says "in new york", assistant 1002 uses short term personal memory component(s) 1052 to access the dialog context and thereby determine that the current domain is weather forecasts. This enables assistant 1002 to interpret the new utterance "in new york" to mean "what is the weather forecast in New York this coming Tuesday?". Screen 4302 shows the appropriate response, including weather forecasts for New York.

In the example of FIGS. 43A and 43B, what was stored in short term memory was not only the words of the input "is it going to rain the day after tomorrow?" but the system's semantic interpretation of the input as the weather domain and the time parameter set to the day after tomorrow.

Long-Term Personal Memory Component(s) 1054

In at least one embodiment, long-term personal memory component(s) 1054 may be operable to perform and/or implement various types of functions, operations, actions, and/or other features such as, for example, one or more of the following (or combinations thereof):

- To persistently store the personal information and data about a user, including for example his or her preferences, identities, authentication credentials, accounts, addresses, and the like;
- To store information that the user has collected by using the embodiment of assistant 1002, such as the equivalent of bookmarks, favorites, clippings, and the like;
- To persistently store saved lists of business entities including restaurants, hotels, stores, theaters and other venues. In one embodiment, long-term personal memory component(s) 1054 saves more than just the names or URLs, but also saves the information sufficient to bring up a full listing on the entities including phone numbers, locations on a map, photos, and the like;
- To persistently store saved movies, videos, music, shows, and other items of entertainment;
- To persistently store the user's personal calendar(s), to do list(s), reminders and alerts, contact databases, social network lists, and the like;
- To persistently store shopping lists and wish lists for products and services, coupons and discount codes acquired, and the like;
- To persistently store the history and receipts for transactions including reservations, purchases, tickets to events, and the like.

According to specific embodiments, multiple instances or threads of long-term personal memory component(s) 1054 may be concurrently implemented and/or initiated via the use of one or more processors 63 and/or other combinations of hardware and/or hardware and software. For example, in at least some embodiments, various aspects, features, and/or functionalities of long-term personal memory component(s) 1054 may be performed, implemented and/or initiated using one or more databases and/or files on (or associated with) clients 1304 and/or servers 1340, and/or residing on storage devices.

According to different embodiments, one or more different threads or instances of long-term personal memory component(s) 1054 may be initiated in response to detection of one or more conditions or events satisfying one or more different types of minimum threshold criteria for triggering initiation of at least one instance of long-term personal memory component(s) 1054. Various examples of conditions or events which may trigger initiation and/or implementation of one or more different threads or instances of long-term personal memory component(s) 1054 may include, but are not limited to, one or more of the following (or combinations thereof):

- Long term personal memory entries may be acquired as a side effect of the user interacting with an embodiment of assistant 1002. Any kind of interaction with the assistant may produce additions to the long term personal memory, including browsing, searching, finding, shopping, scheduling, purchasing, reserving, communicating with other people via an assistant.
- Long term personal memory may also be accumulated as a consequence of users signing up for an account or service, enabling assistant 1002 access to accounts on other services, using an assistant 1002 service on a client device with access to other personal information databases such as calendars, to-do lists, contact lists, and the like.

In at least one embodiment, a given instance of long-term personal memory component(s) 1054 may access and/or utilize information from one or more associated databases. In at least one embodiment, at least a portion of the database information may be accessed via communication with one or more local and/or remote memory devices, which may be located, for example, at client(s) 1304 and/or server(s) 1340. Examples of different types of data which may be accessed by long-term personal memory component(s) 1054 may include, but are not limited to data from other personal information databases such as contact or friend lists, calendars, to-do lists, other list managers, personal account and wallet managers provided by external services 1360, and the like.

Figure 44A:
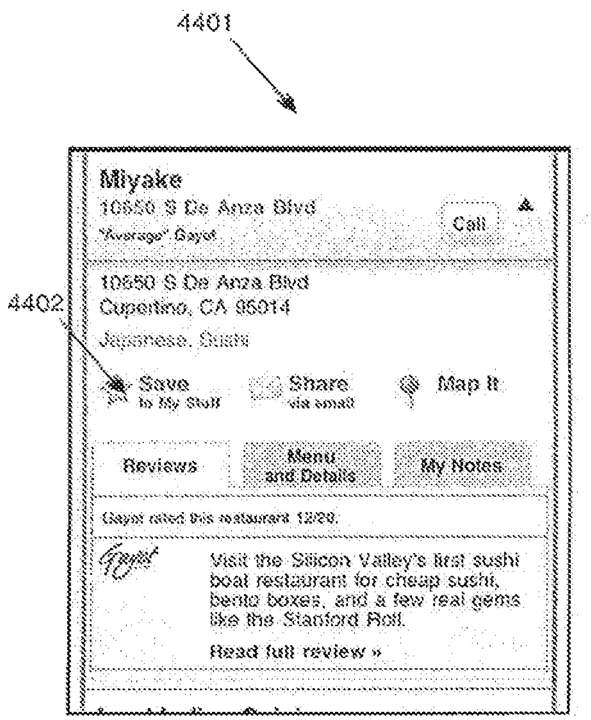
FIGS. 44A through 44C are screen shots depicting an example of the use of long term personal memory component(s), according to one embodiment.
Figure 44B:
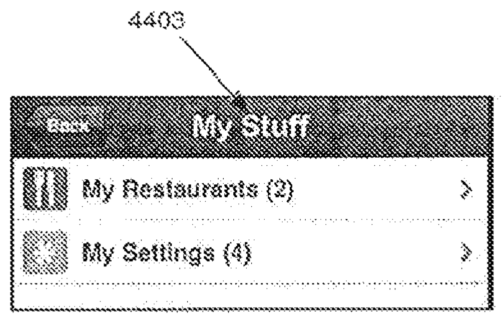
Figure 44C:
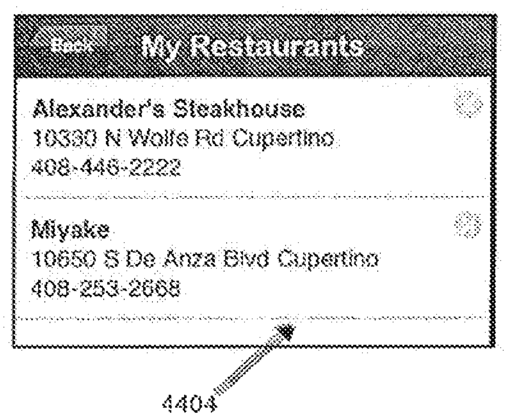

Referring now to FIGS. 44A through 44C, there are shown screen shots depicting an example of the use of long term personal memory component(s) 1054, according to one embodiment. In the example, a feature is provided (named "My Stuff"), which includes access to saved entities such as restaurants, movies, and businesses that are found via interactive sessions with an embodiment of assistant 1002. In screen 4401 of FIG. 44A, the user has found a restaurant. The user taps on Save to My Stuff 4402, which saves information about the restaurant in long-term personal memory component(s) 1054.

Screen 4403 of FIG. 44B depicts user access to My Stuff. In one embodiment, the user can select among categories to navigate to the desired item.

Screen 4404 of FIG. 44C depicts the My Restaurant category, including items previously stored in My Stuff.

Automated Call and Response Procedure

Referring now to FIG. 33, there is shown a flow diagram depicting an automatic call and response procedure, according to one embodiment. The procedure of FIG. 33 may be implemented in connection with one or more embodiments of intelligent automated assistant 1002. It may be appreciated that intelligent automated assistant 1002 as depicted in FIG. 1 is merely one example from a wide range of intelligent automated assistant system embodiments which may be implemented. Other embodiments of intelligent automated assistant systems (not shown) may include additional, fewer and/or different components/features than those illustrated, for example, in the example intelligent automated assistant 1002 depicted in FIG. 1.

In at least one embodiment, the automated call and response procedure of FIG. 33 may be operable to perform and/or implement various types of functions, operations, actions, and/or other features such as, for example, one or more of the following (or combinations thereof):

- The automated call and response procedure of FIG. 33 may provide an interface control flow loop of a conversational interface between the user and intelligent automated assistant 1002. At least one iteration of the automated call and response procedure may serve as a ply in the conversation. A conversational interface is an interface in which the user and assistant 1002 communicate by making utterances back and forth in a conversational manner.
- The automated call and response procedure of FIG. 33 may provide the executive control flow for intelligent automated assistant 1002. That is, the procedure controls the gathering of input, processing of input, generation of output, and presentation of output to the user.
- The automated call and response procedure of FIG. 33 may coordinate communications among components of intelligent automated assistant 1002. That is, it may direct where the output of one component feeds into another, and where the overall input from the environment and action on the environment may occur.

In at least some embodiments, portions of the automated call and response procedure may also be implemented at other devices and/or systems of a computer network.

According to specific embodiments, multiple instances or threads of the automated call and response procedure may be concurrently implemented and/or initiated via the use of one or more processors 63 and/or other combinations of hardware and/or hardware and software. In at least one embodiment, one or more or selected portions of the automated call and response procedure may be implemented at one or more client(s) 1304, at one or more server(s) 1340, and/or combinations thereof.

For example, in at least some embodiments, various aspects, features, and/or functionalities of the automated call and response procedure may be performed, implemented and/or initiated by software components, network services, databases, and/or the like, or any combination thereof.

According to different embodiments, one or more different threads or instances of the automated call and response procedure may be initiated in response to detection of one or more conditions or events satisfying one or more different types of criteria (such as, for example, minimum threshold criteria) for triggering initiation of at least one instance of automated call and response procedure. Examples of various types of conditions or events which may trigger initiation and/or implementation of one or more different threads or instances of the automated call and response procedure may include, but are not limited to, one or more of the following (or combinations thereof):

- a user session with an instance of intelligent automated assistant 1002, such as, for example, but not limited to, one or more of:
  - a mobile device application starting up, for instance, a mobile device application that is implementing an embodiment of intelligent automated assistant 1002;
  - a computer application starting up, for instance, an application that is implementing an embodiment of intelligent automated assistant 1002;
  - a dedicated button on a mobile device pressed, such as a "speech input button";
  - a button on a peripheral device attached to a computer or mobile device, such as a headset, telephone handset or base station, a GPS navigation system, consumer appliance, remote control, or any other device with a button that might be associated with invoking assistance;
  - a web session started from a web browser to a website implementing intelligent automated assistant 1002;
  - an interaction started from within an existing web browser session to a website implementing intelligent automated assistant 1002, in which, for example, intelligent automated assistant 1002 service is requested;
  - an email message sent to a modality server 1426 that is mediating communication with an embodiment of intelligent automated assistant 1002;
  - a text message is sent to a modality server 1430 that is mediating communication with an embodiment of intelligent automated assistant 1002;
  - a phone call is made to a modality server 1434 that is mediating communication with an embodiment of intelligent automated assistant 1002;
  - an event such as an alert or notification is sent to an application that is providing an embodiment of intelligent automated assistant 1002.
- when a device that provides intelligent automated assistant 1002 is turned on and/or started.

According to different embodiments, one or more different threads or instances of the automated call and response procedure may be initiated and/or implemented manually, automatically, statically, dynamically, concurrently, and/or combinations thereof. Additionally, different instances and/or embodiments of the automated call and response procedure may be initiated at one or more different time intervals (e.g., during a specific time interval, at regular periodic intervals, at irregular periodic intervals, upon demand, and the like).

In at least one embodiment, a given instance of the automated call and response procedure may utilize and/or generate various different types of data and/or other types of information when performing specific tasks and/or operations. This may include, for example, input data/information and/or output data/information. For example, in at least one embodiment, at least one instance of the automated call and response procedure may access, process, and/or otherwise utilize information from one or more different types of sources, such as, for example, one or more databases. In at least one embodiment, at least a portion of the database information may be accessed via communication with one or more local and/or remote memory devices. Additionally, at least one instance of the automated call and response procedure may generate one or more different types of output data/information, which, for example, may be stored in local memory and/or remote memory devices.

In at least one embodiment, initial configuration of a given instance of the automated call and response procedure may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the automated call and response procedure may correspond to and/or may be derived from the input data/information.

In the particular example of FIG. 33, it is assumed that a single user is accessing an instance of intelligent automated assistant 1002 over a network from a client application with speech input capabilities. The user is interested in finding a good place for dinner at a restaurant, and is engaging intelligent automated assistant 1002 in a conversation to help provide this service.

In step 100, the user is prompted to enter a request. The user interface of the client offers several modes of input, as described in connection with FIG. 26. These may include, for example:

- an interface for typed input, which may invoke an active typed-input elicitation procedure as illustrated in FIG. 11;
- an interface for speech input, which may invoke an active speech input elicitation procedure as illustrated in FIG. 22.
- an interface for selecting inputs from a menu, which may invoke active GUI-based input elicitation as illustrated in FIG. 23.

One skilled in the art will recognize that other input modes may be provided.

In one embodiment, step 100 may include presenting options remaining from a previous conversation with assistant 1002, for example using the techniques described in the active dialog suggestion input elicitation procedure described in connection with FIG. 24.

For example, by one of the methods of active input elicitation in step 100, the user might say to assistant 1002, "where may I get some good Italian around here?" For example, the user might have spoken this into a speech input component. An embodiment of an active input elicitation component 1094 calls a speech-to-text service, asks the user for confirmation, and then represents the confirmed user input as a uniform annotated input format 2690.

An embodiment of language interpreter component 1070 is then called in step 200, as described in connection with FIG. 29. Language interpreter component 1070 parses the text input and generates a list of possible interpretations of the user's intent 290. In one parse, the word "italian" is associated with restaurants of style Italian; "good" is associated with the recommendation property of restaurants; and "around here" is associated with a location parameter describing a distance from a global sensor reading (for example, the user's location as given by GPS on a mobile device).

In step 300, the representation of the user's intent 290 is passed to dialog flow processor 1080, which implements an embodiment of a dialog and flow analysis procedure as described in connection with FIG. 32. Dialog flow processor 1080 determines which interpretation of intent is most likely, maps this interpretation to instances of domain models and parameters of a task model, and determines the next flow step in a dialog flow. In the current example, a restaurant domain model is instantiated with a constrained selection task to find a restaurant by constraints (the cuisine style, recommendation level, and proximity constraints). The dialog flow model indicates that the next step is to get some examples of restaurants meeting these constraints and present them to the user.

In step 400, an embodiment of the flow and service orchestration procedure 400 is invoked, via services orchestration component 1082. It invokes a set of services 1084 on behalf of the user's request to find a restaurant. In one embodiment, these services 1084 contribute some data to a common result. Their data are merged and the resulting list of restaurants is represented in a uniform, service-independent form.

In step 500, output processor 1092 generates a dialog summary of the results, such as, "1 found some recommended Italian restaurants near here." Output processor 1092 combines this summary with the output result data, and then sends the combination to a module that formats the output for the user's particular mobile device in step 600.

In step 700, this device-specific output package is sent to the mobile device, and the client software on the device renders it on the screen (or other output device) of the mobile device.

The user browses this presentation, and decides to explore different options. If the user is done 790, the method ends. If the user is not done 490, another iteration of the loop is initiated by returning to step 100.

The automatic call and response procedure may be applied, for example to a user's query "how about mexican food?". Such input may be elicited in step 100. In step 200, the input is interpreted as restaurants of style Mexican, and combined with the other state (held in short term personal memory 1052) to support the interpretation of the same intent as the last time, with one change in the restaurant style parameter. In step 300, this updated intent produces a refinement of the request, which is given to service orchestration component(s) 1082 in step 400.

In step 400 the updated request is dispatched to multiple services 1084, resulting in a new set of restaurants which are summarized in dialog in 500, formatted for the device in 600, and sent over the network to show new information on the user's mobile device in step 700.

In this case, the user finds a restaurant of his or her liking, shows it on a map, and sends directions to a friend.

One skilled in the art will recognize that different embodiments of the automated call and response procedure (not shown) may include additional features and/or operations than those illustrated in the specific embodiment of FIG. 33, and/or may omit at least a portion of the features and/or operations of automated call and response procedure illustrated in the specific embodiment of FIG. 33.

Constrained Selection

In one embodiment, intelligent automated assistant 1002 uses constrained selection in its interactions with the user, so as to more effectively identify and present items that are likely to be of interest to the user.

Constrained selection is a kind of generic task. Generic tasks are abstractions that characterize the kinds of domain objects, inputs, outputs, and control flow that are common among a class of tasks. A constrained selection task is performed by selecting items from a choice set of domain objects (such as restaurants) based on selection constraints (such as a desired cuisine or location). In one embodiment, assistant 1002 helps the user explore the space of possible choices, eliciting the user's constraints and preferences, presenting choices, and offering actions to perform on those choices such as to reserve, buy, remember, or share them. The task is complete when the user selects one or more items on which to perform the action.

Constrained selection is useful in many contexts: for example, picking a movie to see, a restaurant for dinner, a hotel for the night, a place to buy a book, or the like. In general, constrained selection is useful when one knows the category and needs to select an instance of the category with some desired properties.

One conventional approach to constrained selection is a directory service. The user picks a category and the system offers a list of choices. In a local directory, one may constrain the directory to a location, such as a city. For instance, in a "yellow pages" service, users select the book for a city and then look up the category, and the book shows one or more items for that category. The main problem with a directory service is that the number of possibly relevant choices is large (e.g., restaurants in a given city).

Another conventional approach is a database application, which provides a way to generate a choice set by eliciting a query from the user, retrieving matching items, and presenting the items in some way that highlights salient features. The user browses the rows and columns of the result set, possibly sorting the results or changing the query until he or she finds some suitable candidates. The problem with the database service is that it may require the user to operationalize their human need as a formal query and to use the abstract machinery of sort, filter, and browse to explore the resulting data. These are difficult for most people to do, even with graphical user interfaces.

A third conventional approach is open-ended search, such as "local search". Search is easy to do, but there are several problems with search services that make them difficult for people to accomplish the task of constrained selection. Specifically:

- As with directory search, the user may not just enter a category and look atone or more possible choice, but must narrow down the list.
- If the user can narrow the selection by constraints, it is not obvious what constraints may be used (e.g., may 1 search for places that are within walking distance or are open late?)
- It is not clear how to state constraints (e.g., is it called cuisine or restaurant type, and what are the possible values?)
- Multiple preferences conflict; there is usually no objectively "best" answer to a given situation (e.g., I want a place that is close by and cheap serving gourmet food with excellent service and which is open until midnight).
- Preferences are relative, and they depend on what is available. For example, if the user may get a table at a highly rated restaurant, he or she might choose it even though it is expensive. In general, though, the user would prefer less expensive options.

In various embodiments, assistant 1002 of the present invention helps streamline the task of constrained selection. In various embodiments, assistant 1002 employs database and search services, as well as other functionality, to reduce the effort, on the part of the user, of stating what he or she is looking for, considering what is available, and deciding on a satisfactory solution.

In various embodiments, assistant 1002 helps to make constrained selection simpler for humans in any of a number of different ways.

For example, in one embodiment, assistant 1002 may operationalize properties into constraints. The user states what he or she wants in terms of properties of the desired outcome. Assistant 1002 operationalizes this input into formal constraints. For example, instead of saying "find one or more restaurants less than 2 miles from the center of Palo Alto whose cuisine includes Italian food" the user may just say "Italian restaurants in palo alto". Assistant 1002 may also operationalize qualities requested by the user that are not parameters to a database. For example, if the user requests romantic restaurants, the system may operationalize this as a text search or tag matching constraint. In this manner, assistant 1002 helps overcome some of the problems users may otherwise have with constrained selection. It is easier, for a user, to imagine and describe a satisfactory solution than to describe conditions that would distinguish suitable from unsuitable solutions.

In one embodiment, assistant 1002 may suggest useful selection criteria, and the user need only say which criteria are important at the moment. For example, assistant 1002 may ask "which of these matter: price (cheaper is better), location (closer is better), rating (higher rated is better)?" Assistant 1002 may also suggest criteria that may require specific values; for example, "you can say what kind of cuisine you would like or a food item you would like".

In one embodiment, assistant 1002 may help the user make a decision among choices that differ on a number of competing criteria (for example, price, quality, availability, and convenience).

By providing such guidance, assistant 1002 may help users in making multi-parametric decisions in any of several ways:

- One is to reduce the dimensionality of the space, combining raw data such as ratings from multiple sources into a composite "recommendation" score. The composite score may take into account domain knowledge about the sources of data (e.g., Zagat ratings may be more predictive of quality than Yelp).
- Another approach is to focus on a subset of criteria, turning a problem of "what are all the possible criteria to consider and how to they combine?" into a selection of the most important criteria in a given situation (e.g., "which is more important, price or proximity?").
- Another way to simply the decision making is to assume default values and preference orders (e.g., all things being equal, higher rated and closer and cheaper are better). The system may also remember users' previous responses that indicate their default values and preferences.
- Fourth, the system may offer salient properties of items in the choice set that were not mentioned in the original request. For example, the user may have asked for local Italian food. The system may offer a choice set of restaurants, and with them, a list of popular tags used by reviewers or a tag line from a guide book (e.g., "a nice spot for a date" "great pasta"). This could let people pick out a specific item and complete the task. Research shows that most people make decisions by evaluating specific instances rather than deciding on criteria and rationally accepting the one that pops to the top. It also shows that people learn about features from concrete cases. For example, when choosing among cars, buyers may not care about navigation systems until they see that some of the cars have them (and then the navigation system may become an important criterion). Assistant 1002 may present salient properties of listed items that help people pick a winner or that suggest a dimension along which to optimize.

Conceptual Data Model

In one embodiment, assistant 1002 offers assistance with the constrained selection task by simplifying the conceptual data model. The conceptual data model is the abstraction presented to users in the interface of assistant 1002. To overcome the psychological problems described above, in one embodiment assistant 1002 provides a model that allows users to describe what they want in terms of a few easily recognized and recalled properties of suitable choices rather than constraint expressions. In this manner, properties can be made easy to compose in natural language requests (e.g., adjectives modifying keyword markers) and be recognizable in prompts ("you may also favor recommended restaurants . . . "). In one embodiment, a data model is used that allows assistant 1002 to determine the domain of interest (e.g., restaurants versus hotels) and a general approach to guidance that may be instantiated with domain-specific properties.

In one embodiment, the conceptual data model used by assistant 1002 includes a selection class. This is a representation of the space of things from which to choose. For example, in the find-a-restaurant application, the selection class is the class of restaurants. The selection class may be abstract and have subclasses, such as "things to do while in a destination". In one embodiment, the conceptual data model assumes that, in a given problem solving situation, the user is interested in choosing from a single selection class. This assumption simplifies the interaction and also allows assistant 1002 to declare its boundaries of competence ("1 know about restaurants, hotels, and movies" as opposed to "I know about life in the city").

Given a selection class, in one embodiment the data model presented to the user for the constrained selection task includes, for example: items; item features; selection criteria; and constraints.

Items are instances of the selection class.

Item features are properties, attributes, or computed values that may be presented and/or associated with at least one item. For example, the name and phone number of a restaurant are item features. Features may be intrinsic (the name or cuisine of a restaurant) or relational (e.g., the distance from one's current location of interest). They may be static (e.g., restaurant name) or dynamic (rating). They may be composite values computed from other data (e.g., a "value for money" score). Item features are abstractions for the user made by the domain modeler; they do not need to correspond to underlying data from back-end services.

Selection criteria are item features that may be used to compare the value or relevance of items. That is, they are ways to say which items are preferred. Selection criteria are modeled as features of the items themselves, whether they are intrinsic properties or computed. For example, proximity (defined as distance from the location of interest) is a selection criterion. Location in space-time is a property, not a selection criterion, and it is used along with the location of interest to compute the distance from the location of interest.

Selection criteria may have an inherent preference order. That is, the values of any particular criterion may be used to line up items in a best first order. For example, the proximity criterion has an inherent preference that closer is better. Location, on the other hand, has no inherent preference value. This restriction allows the system to make default assumptions and guide the selection if the user only mentions the criterion. For example, the user interface might offer to "sort by rating" and assume that higher rated is better.

One or more selection criteria are also item features; they are those features related to choosing among possible items. However, item features are not necessarily related to a preference (e.g., the names and phone numbers of restaurants are usually irrelevant to choosing among them).

In at least one embodiment, constraints are restrictions on the desired values of the selection criteria. Formally, constraints might be represented as set membership (e.g., cuisine type includes Italian), pattern matches (e.g., restaurant review text includes "romantic"), fuzzy inequalities (e.g., distance less than a few miles), qualitative thresholds (e.g., highly rated), or more complex functions (e.g., a good value for money). To make things simple enough for normal humans, this data model reduces at least one or more constraints to symbolic values that may be matched as words. Time and distance may be excluded from this reduction. In one embodiment, the operators and threshold values used for implementing constraints are hidden from the user. For example, a constraint on the selection criteria called "cuisine" may be represented as a symbolic value such as "Italian" or "Chinese". A constraint on rating is "recommended" (a binary choice). For time and distance, in one embodiment assistant 1002 uses proprietary representations that handle a range of inputs and constraint values. For example, distance might be "walking distance" and time might be "tonight"; in one embodiment, assistant 1002 uses special processing to match such input to more precise data.

In at least one embodiment, some constraints may be required constraints. This means that the task simply cannot be completed without this data. For example, it is hard to pick a restaurant without some notion of desired location, even if one knows the name.

To summarize, a domain is modeled as selection classes with item features that are important to users. Some of the features are used to select and order items offered to the user—these features are called selection criteria. Constraints are symbolic limits on the selection criteria that narrow the set of items to those that match.

Often, multiple criteria may compete and constraints may match partially. The data model reduces the selection problem from an optimization (finding the best solution) to a matching problem (finding items that do well on a set of specified criteria and match a set of symbolic constraints). The algorithms for selecting criteria and constraints and determining an ordering are described in the next section.

Methodology for Constrained Selection

In one embodiment, assistant 1002 performs constrained selection by taking as input an ordered list of criteria, with implicit or explicit constraints on at least one, and generating a set of candidate items with salient features. Computationally, the selection task may be characterized as a nested search: first, identify a selection class, then identify the important selection criteria, then specify constraints (the boundaries of acceptable solutions), and search through instances in order of best fit to find acceptable items.

Figure 45:
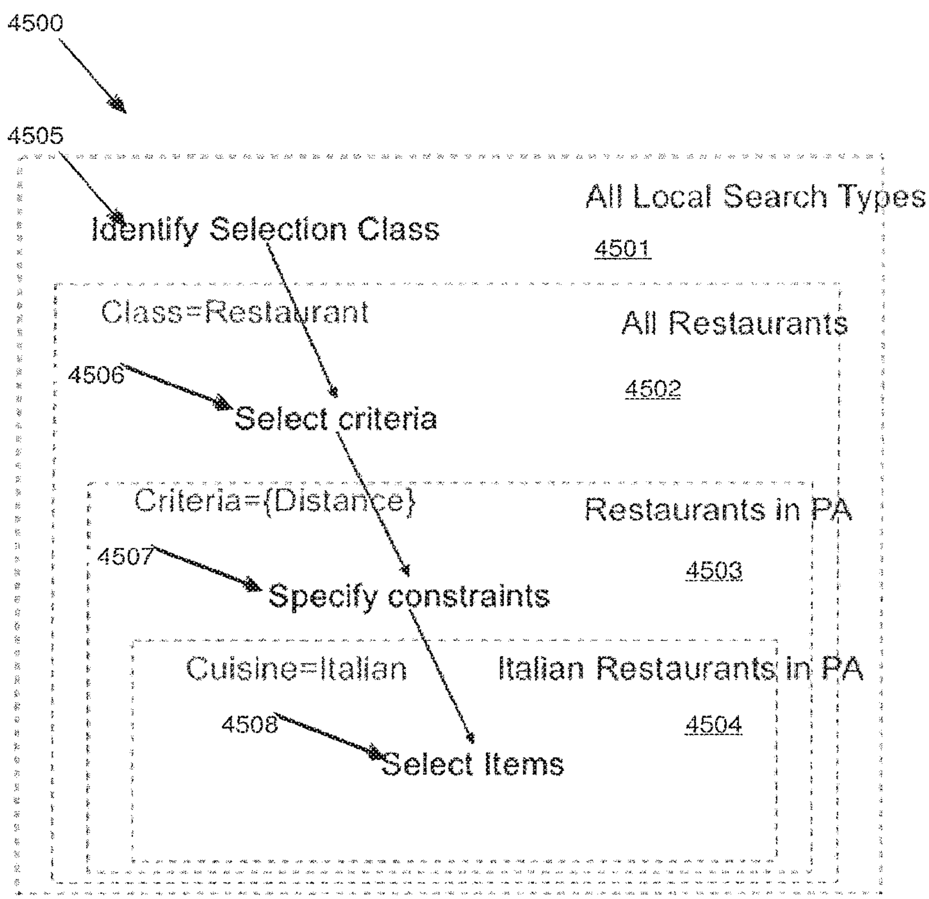
FIG. 45 depicts an example of an abstract model for a constrained selection task.

Referring now to FIG. 45, there is shown an example of an abstract model 4500 for a constrained selection task as a nested search. In the example assistant 1002 identifies 4505 a selection call among all local search types 4501. The identified class is restaurant. Within the set of all restaurants 4502, assistant 1002 selects 4506 criteria. In the example, the criterion is identified as distance. Within the set of restaurants in PA 4503, assistant 1002 specifies 4507 constraints for the search. In the example, the identified constraint is "Italian cuisine"). Within the set of Italian restaurants in PA 4504, assistant 4508 selects items for presentation to the user.

In one embodiment, such a nested search is what assistant 1002 does once it has the relevant input data, rather than the flow for eliciting the data and presenting results. In one embodiment, such control flow is governed via a dialog between assistant 1002 and the user which operates by other procedures, such as dialog and task flow models. Constrained selection offers a framework for building dialog and task flow models at this level of abstraction (that is, suitable for constrained selection tasks regardless of domain).

Figure 46:
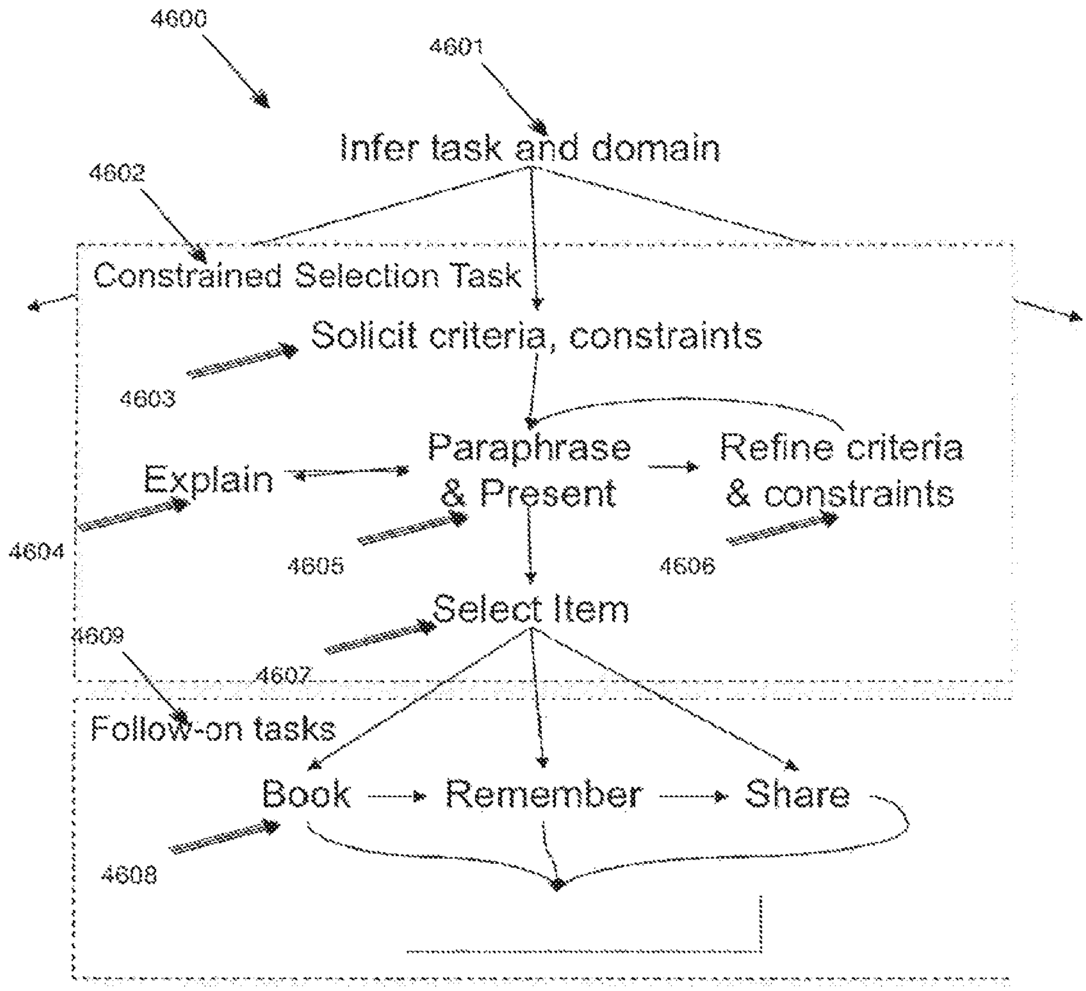
FIG. 46 depicts an example of a dialog flow model to help guide the user through a search process.

Referring now to FIG. 46, there is shown an example of a dialog 4600 to help guide the user through a search process, so that the relevant input data can be obtained.

In the example dialog 4600, the first step is for the user to state the kind of thing they are looking for, which is the selection class. For example, the user might do this by saying "dining in palo alto". This allows assistant 1002 to infer 4601 the task (e.g., constrained selection task 4602) and domain.

Once assistant 1002 has understood the task and domain binding (selection class=restaurants), the next step is to understand which selection criteria are important to this user, for example by soliciting 4603 criteria and/or constraints. In the example above, "in palo alto" indicates a location of interest. In the context of restaurants, the system may interpret a location as a proximity constraint (technically, a constraint on the proximity criterion). Assistant 1002 explains 4604 what is needed, receives input. If there is enough information to constrain the choice set to a reasonable size, then assistant 1002 paraphrases the input and presents 4605 one or more restaurants that meet the proximity constraint, sorted in some useful order. The user can then select 4607 from this list, or refine 4606 the criteria and constraints. Assistant 1002 reasons about the constraints already stated, and uses domain-specific knowledge to suggest other criteria that might help, soliciting constraints on these criteria as well. For example, assistant 1002 may reason that, when recommending restaurants within walking distance of a hotel, the useful criteria to solicit would be cuisine and table availability.

The constrained selection task is complete when the user selects 4607 an instance of the selection class. In one embodiment, additional follow-on tasks 4609 are enabled by assistant 1002. Thus, assistant 1002 can offer services that indicate selection while providing some other value. Examples 4608 booking a restaurant, setting a reminder on a calendar, and/or sharing the selection with others by sending an invitation. For example, booking a restaurant certainly indicates that it was selected; other options might be to put the restaurant on a calendar or send in invitation with directions to friends.

Figure 47:
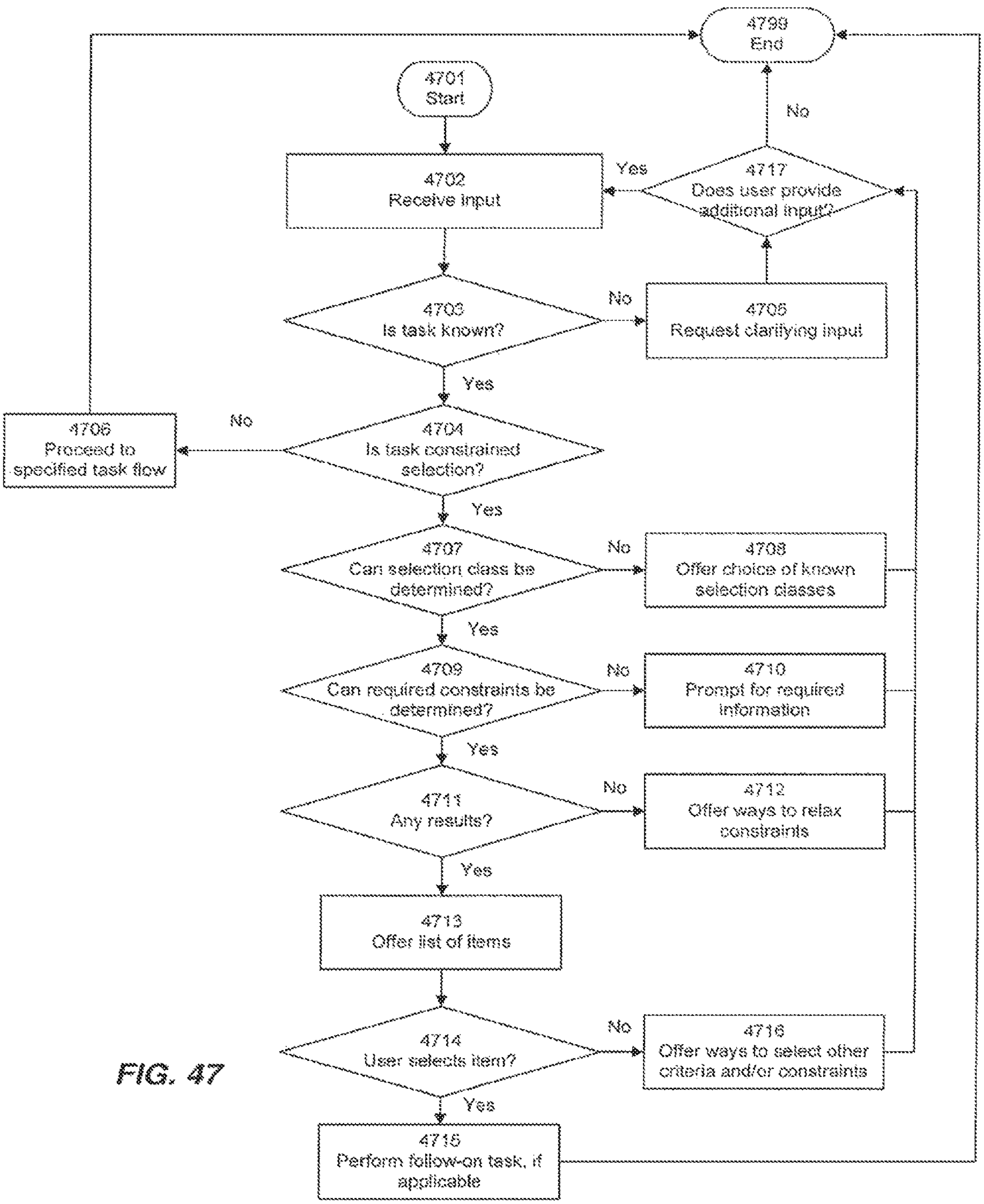
FIG. 47 is a flow diagram depicting a method of constrained selection according to one embodiment.

Referring now to FIG. 47, there is shown a flow diagram depicting a method of constrained selection according to one embodiment. In one embodiment, assistant 1002 operates in an opportunistic and mixed-initiative manner, permitting the user to jump to the inner loop, for instance, by stating task, domain, criteria, and constraints one or more at once in the input.

The method begins 4701. Input is received 4702 from the user, according to any of the modes described herein. If, based on the input, the task not known, assistant 1002 requests 4705 clarifying input from the user.

In step 4717, assistant 1002 determines whether the user provides additional input. If so, assistant 1002 returns to step 4702. Otherwise the method ends 4799.

If, in step 4703, the task is known, assistant 1002 determines 4704 whether the task is constrained selection. If not, assistant 1002 proceeds 4706 to the specified task flow.

If, in step 4704, the task is constrained selection, assistant 1002 determines 4707 whether the selection class can be determined. If not, assistant 1002 offers 4708 a choice of known selection classes, and returns to step 4717.

If, in step 4707, the selection class can be determined, assistant 1002 determines 4709 whether all required constraints can be determined. If not, assistant 1002 prompts 4710 for required information, and returns to step 4717.

If, in step 4709, all required constants can be determined, assistant 1002 determines 4711 whether any result items can be found, given the constraints. If there are no items that meet the constraints, assistant 1002 offers 4712 ways to relax the constraints. For example, assistant 1002 may relax the constraints from lowest to highest precedence, using a filter/sort algorithm. In one embodiment, if there are items that meet some of the constraints, then assistant 1002 may paraphrase the situation (outputting, for example, "I could not find Recommended Greek restaurants that deliver on Sundays in San Carlos. However, I found 3 Greek restaurants and 7 Recommend restaurants in San Carlos."). In one embodiment, if there are no items that match any constraints, then assistant 1002 may paraphrase this situation and prompt for different constraints (outputting, for example, "Sony, I could not find any restaurants in Anytown, Texas. You may pick a different location."). Assistant 1002 returns to step 4717.

If, in step 4711, result items can be found, assistant 1002 offers 4713 a list of items. In one embodiment, assistant 1002 paraphrases the currently specified criteria and constraints (outputting, for example, "Here are some recommended Italian restaurants in San Jose." (recommended=yes, cuisine=Italian, proximity=<in San Jose>)). In one embodiment, assistant 1002 presents a sorted, paginated list of items that meet the known constraints. If an item only shows some of the constraints, such a condition can be shown as part of the item display. In one embodiment, assistant 1002 offers the user ways to select an item, for example by initiating another task on that item such as booking, remembering, scheduling, or sharing. In one embodiment, on any given item, assistant 1002 presents item features that are salient for picking instances of the selection class. In one embodiment, assistant 1002 shows how the item meets a constraint; for example, Zagat rating of 5 meets the Recommended=yes constraint, and "1 mile away" meets the "within walking distance of an address" constraint. In one embodiment, assistant 1002 allows the user to drill down for more detail on an item, which results in display of more item features.

Assistant 1002 determines 4714 whether the user has selected an item. If the user selects an item, the task is complete. Any follow-on task is performed 4715, if there is one, and the method ends 4799.

If, in step 4714, the user does not select an item, assistant 1002 offers 4716 the user ways to select other criteria and constraints and returns to step 4717. For example, given the currently specified criteria and constraints, assistant 1002 may offer criteria that are most likely to constrain the choice set to a desired size. If the user selects a constraint value, that constraint value is added to the previously determined constraints when steps 4703 to 4713 are repeated.

Since one or more criteria may have an inherent preference value, selecting the criteria may add information to the request. For example, allowing the user to indicate that positive reviews are valued allows assistant 1002 to sort by this criterion. Such information can be taken into account when steps 4703 to 4713 are repeated.

In one embodiment, assistant 1002 allows the user to raise the importance of a criterion that is already specified, so that it would be higher in the precedence order. For example, if the user asked for fast, cheap, highly recommended restaurants within one block of their location, assistant 1002 may request that the user chooses which of these criteria are more important. Such information can be taken into account when steps 4703 to 4713 are repeated.

In one embodiment, the user can provide additional input at any point while the method of FIG. 47 is being performed. In one embodiment, assistant 1002 checks periodically or continuously for such input, and, in response, loops back to step 4703 to process it.

In one embodiment, when outputting an item or list of items, assistant 1002 indicates, in the presentation of items, the features that were used to select and order them. For example, if the user asked for nearby Italian restaurants, such item features for distance and cuisine may be shown in the presentation of the item. This may include highlighting matches, as well as listing selection criteria that were involved in the presentation of an item.

Example Domains

FIG. 52 provides an example of constrained selection domains that may be handled by assistant 1002 according to various embodiments.

Filtering and Sorting Results

In one embodiment, when presenting items that meet currently specified criteria and constraints, a filter/sort methodology can be employed. In one embodiment selection constraints may serve as both filter and sort parameters to the underlying services. Thus, any selection criterion can be used to determine which items are in the list, and to compute the order in which to paginate and show them. Sort order for this task is akin to relevance rank in search. For example, proximity is a criterion with symbolic constraint values such as "within driving distance" and a general notion of sorting by distance. The "driving distance" constraint might be used to select a group of candidate items. Within that group, closer items might be sorted higher in the list.

In one embodiment, selection constraints and associated filtering and sorting are at discrete "levels", which are functions of both the underlying data and the input from the user. For example, proximity is grouped into levels such as "walking distance", "taxi distance", "driving distance". When sorting, one or more items within walking distance are treated as if they were the same distance. The input from the user may come into play in the way he or she specifies a constraint. If the user enters "in palo alto", for example, then one or more items within the Palo Alto city limits are perfect matches and are equivalent. If the user enters, "near the University Avenue train station" then the match would depend on a distance from that address, with the degree of match dependent on the selection class (e.g., near for restaurants is different than near for hotels). Even within a constraint that may be specified with a continuous value, a discretization may be applied. This may be important for sorting operations, so that multiple criteria may participate in determining the best-first ordering.

In one embodiment, the item list—those items that are considered "matching" or "good enough"—may be shorter or longer than the number of items shown on one "page" of the output. Generally, items in the first page are given the most attention, but conceptually there is a longer list, and pagination is simply a function of the form factor of the output medium. This means, for instance, that if the user is offered a way to sort or browse the items by some criterion, then it is the entire set of items (more than one page worth) that is sorted or browsed.

In one embodiment, there is a precedence ordering among selection criteria. That is, some criteria may matter more than others in the filter and sort. In one embodiment, those criteria selected by the user are given higher precedence than others, and there is a default ordering over one or more criteria. This allows for a general lexicographic sort. The assumption is that there is a meaningful a priori precedence. For example, unless the user states otherwise, it may be more important for a restaurant to be close than to be inexpensive. In one embodiment, the a priori precedence ordering is domain-specific. The model allows for user-specific preferences to override the domain defaults, if that is desired.

Since the values of constraints can represent several internal data types, there are different ways for constraints to match, and they may be specific to the constraint. For example, in one embodiment:

- Binary constraints match one or more or none. For example, whether a restaurant is "Fast" might be either true or not.
- Set membership constraints match one or more or none based on a property value. For example, cuisine=Greek means the set of cuisines for a restaurant includes Greek.
- Enumeration constraints match at a threshold. For example, a rating criterion might have constraint values rated, highly-rated, or top-rated. Constraining to highly-rated would also match top-rated.
- Numeric constraints match at a threshold that may be criterion specific. For example, "open late" might be a criterion, and the user might ask for places open after 10:00 pm. This kind of constraint may be slightly out of scope for the constrained selection task, since it is not a symbolic constraint value. However, in one embodiment, assistant 1002 recognizes some cases of numeric constraints like this, and maps them to threshold values with symbolic constraints (e.g., "restaurants in palo alto open now"→"here are 2 restaurants in palo alto that are open late").
- Location and time are handled specially. A constraint on proximity might be a location of interest specified at some level of granularity, and that determines the match. If the user specifies a city, then city-level matching is appropriate; a ZIP code may allow for a radius. Assistant 1002 may also understand locations that are "near" other locations of interest, also based on special processing. Time is relevant as a constraint value of criteria that have threshold value based on a service call, such as table availability or flights within a given time range.

In one embodiment, constraints can be modeled so that there is a single threshold value for selection and a small set of discrete values for sorting. For example, the affordability criterion might be modeled as a roughly binary constraint, where affordable restaurants are any under some threshold price range. When the data justify multiple discrete levels for selection, constraints can be modeled using a gradient of matching. In one embodiment two levels of matching (such as strong and weak matching) may be provided; however, one skilled in the art will recognize that in other embodiments, any number of levels of matching can be provided. For example, proximity may be matched with a fuzzy boundary, so that things that are near the location of interest may match weakly. The operational consequence of a strong or weak match is in the filter/sort algorithm as described below.

For at least one criterion, an approach to matching and default thresholds can be established, if relevant. The user may be able to say just the name of the constraint, a symbolic constraint value, or a precise constraint expression if it is handled specially (such as time and location).

An ideal situation for constrained selection occurs when the user states constraints that result in a short list of candidates, one or more of which meet the constraints. The user then chooses among winners based on item features. In many cases, however, the problem is over- or under-constrained. When it is over-constrained, there are few or no items that meet the constraints. When it is under-constrained, there are so many candidates that examining the list is not expedient. In one embodiment, the general constrained selection model of the present invention is able to handle multiple constraints with robust matching and usually produce something to choose from. Then the user may elect to refine their criteria and constraints or just complete the task with a "good enough" solution.

Method

In one embodiment, the following method is used for filtering and sorting results:

1. Given an ordered list of selection criteria selected by the user, determine constraints on at least one.
   a. If the user specified a constraint value, use it. For example, if the user said "greek food" the constraint is cuisine=Greek. If the user said "san Francisco" the constraint is In the City of San Francisco. If the user said "south of market" then the constraint is In the Neighborhood of SoMa.
   b. Otherwise use a domain- and criteria-specific default. For example, if the user said "a table at some thai place" he or she is indicating that the availability criterion is relevant, but he or she did not specify a constraint value. The default constraint values for availability might be some range of date times such as tonight and a default party size of 2.
2. Select a minimum of N results by specified constraints.
   a. Try to get N results at strong match.
   b. If that fails, try to relax constraints, in reverse precedence order. That is, match at strong level for one or more of the criteria except the last, which may match at a weak level. If there is no weak match for that constraint, then try weak matches up the line from lowest to highest precedence.
   c. Then repeat the loop allowing failure to match on constraints, from lowest to highest precedence.
3. After getting a minimum choice set, sort lexicographically over one or more criteria (which may include user-specified criteria as well as other criteria) in precedence order.
   a. Consider the set of user-specified criteria as highest precedence, then one or more remaining criteria in their a priori precedence. For example, if the a priori precedence is (availability, cuisine, proximity, rating), and the user gives constraints on proximity and cuisine, then the sort precedence is (cuisine, proximity, availability, rating).
   b. Sort on criteria using discrete match levels (strong, weak, none), using the same approach as in relaxing constraints, this time applied the full criteria list.
      i. If a choice set was obtained without relaxing constraints, then one or more of the choice set may "tie" in the sort because they one or more match at strong levels. Then, the next criteria in the precedence list may kick in to sort them. For example, if the user says cuisine=Italian, proximity=in San Francisco, and the sort precedence is (cuisine, proximity, availability, rating), then one or more the places on the list have equal match values for cuisine and proximity. So the list would be sorted on availability (places with tables available bubble to the top). Within the available places, the highest rated ones would be at the top.
      ii. If the choice set was obtained by relaxing constraints, then one or more of the fully matching items are at the top of the list, then the partially matching items. Within the matching group, they are sorted by the remaining criteria, and the same for the partially matching group. For example, if there were only two Italian restaurants in San Francisco, then the available one would be shown first, then the unavailable one. Then the rest of the restaurants in San Francisco would be shown, sorted by availability and rating.

Precedence Ordering

The techniques described herein allow assistant 1002 to be extremely robust in the face of partially specified constraints and incomplete data. In one embodiment, assistant 1002 uses these techniques to generate a user list of items in best-first order, i.e. according to relevance.

In one embodiment, such relevance sorting is based on an a priori precedence ordering. That is, of the things that matter about a domain, a set of criteria is chosen and placed in order of importance. One or more things being equal, criteria higher in the precedence order may be more relevant to a constrained selection among items than those lower in the order. Assistant 1002 may operate on any number of criteria. In addition, criteria may be modified over time without breaking existing behaviors.

In one embodiment, the precedence order among criteria may be tuned with domain-specific parameters, since the way criteria interact may depend on the selection class. For example, when selecting among hotels, availability and price may be dominant constraints, whereas for restaurants, cuisine and proximity may be more important.

In one embodiment, the user may override the default criteria ordering in the dialog. This allows the system to guide the user when searches are over-constrained, by using the ordering to determine which constraints should be relaxed. For example, if the user gave constraints on cuisine, proximity, recommendation, and food item, and there were no fully matching items, the user could say that food item was more important than recommendation level and change the mix so the desired food item matches were sorted to the top.

In one embodiment, when precedence order is determined, user-specified constraints take precedence over others. For example, in one embodiment, proximity is a required constraint and so is always specified, and further has precedence over other unselected constraints. Therefore it does not have to be the highest precedence constraint in order to be fairly dominant. Also, many criteria may not match at one or more unless a constraint is given by the user, and so the precedence of these criteria only matters within user-selected criteria.

For example, when the user specifies a cuisine it is important to them, and otherwise is not relevant to sorting items.

For example, the following is a candidate precedence sorting paradigm for the restaurant domain:

1. cuisine*(not sortable unless a constraint value is given)
2. availability*(sortable using a default constraint value, e.g., time)
3. recommended
4. proximity*(a constraint value is always given)
5. affordability
6. may deliver
7. food item (not sortable unless a constraint value, e.g., a keyword, is given)

8. keywords (not sortable unless a constraint value, e.g., a keyword, is given)
9. restaurant name The following is an example of a design rationale for the above sorting paradigm:

If a user specifies a cuisine, he or she wants it to stick.

One or more things being equal, sort by rating level (it is the highest precedence among criteria than may be used to sort without a constraint).

In at least one embodiment, proximity may be more important than most things. However, since it matches at discrete levels (in a city, within a radius for walking and the like), and it is always specified, then most of the time most matching items may "tie" on proximity.

Availability (as determined by a search on a website such as open-table.com, for instance) is a valuable sort criterion, and may be based on a default value for sorting when not specified. If the user indicates a time for booking, then only available places may be in the list and the sort may be based on recommendation.

If the user says they want highly recommended places, then it may sort above proximity and availability, and these criteria may be relaxed before recommendation. The assumption is that if someone is looking for nice place, they may be willing to drive a bit farther and it is more important than a default table availability. If a specific time for availability is specified, and the user requests recommended places, then places that are both recommended and available may come first, and recommendation may relax to a weak match before availability fails to match at one or more.

The remaining constraints except for name are one or more based on incomplete data or matching. So they are weak sort heuristics by default, and when they are specified the match one or more-or-none.

Name may be used as a constraint to handle the case where someone mentions the restaurant by name, e.g., find one or more Hobee's restaurants near Palo Alto. In this case, one or more items may match the name, and may be sorted by proximity (the other specified constraint in this example).

Domain Modeling: Mapping Selection Criteria to Underlying Data

It may be desirable to distinguish between the data that are available for computation by assistant 1002 and the data used for making selections. In one embodiment, assistant 1002 uses a data model that reduces the complexity for the user by folding one or more kinds of data used to distinguish among items into a simple selection criteria model. Internally, these data may take several forms. Instances of the selection class can have intrinsic properties and attributes (such as cuisine of a restaurant), may be compared along dimensions (such as the distance from some location), and may be discovered by some query (such as whether it matches a text pattern or is available at a given time). They may also be computed from other data which are not exposed to the user as selection criteria (e.g., weighted combinations of ratings from multiple sources). These data are one or more relevant to the task, but the distinctions among these three kinds of data are not relevant to the user. Since the user thinks in terms of features of the desired choice rather than in properties and dimensions, assistant 1002 operationalizes these various criteria into features of the items. Assistant 1002 provides a user-facing domain data model and maps it to data found in web services.

One type of mapping is an isomorphism from underlying data to user-facing criteria. For example, the availability of tables for reservations as seen by the user could be exactly what an online reservation website, such as opentable.com, offers, using the same granularity for time and party size.

Another type of mapping is a normalization of data from one or more services to a common value set, possibly with a unification of equivalent values. For example, cuisines of one or more restaurants may be represented as a single ontology in assistant 1002, and mapped to various vocabularies used in different services. That ontology might be hierarchical, and have leaf nodes pointing to specific values from at least one service. For example, one service might have a cuisine value for "Chinese", another for "Szechuan", and a third for "Asian". The ontology used by assistant 1002 would cause references to "Chinese food" or "Szechuan" to semantically match one or more of these nodes, with confidence levels reflecting the degree of match.

Normalization might also be involved when resolving differences in precision. For example, the location of a restaurant may be given to the street level in one service but only to city in another. In one embodiment, assistant 1002 uses a deep structural representation of locations and times that may be mapped to different surface data values.

In one embodiment, assistant 1002 uses a special kind of mapping for open-ended qualifiers (e.g., romantic, quiet) which may be mapped to matches in full text search, tags, or other open-textured features. The name of the selection constraint in this case would be something like "is described as".

In at least one embodiment, constraints may be mapped to operational preference orderings. That is, given the name of a selection criterion and its constraint value, assistant 1002 is able to interpret the criterion as an ordering over possible items. There are several technical issues to address in such a mapping. For example:

Preference orderings may conflict. The ordering given by one constraint may be inconsistent or even inversely correlated with the ordering given by another. For example, price and quality tend to be in opposition. In one embodiment, assistant 1002 interprets constraints chosen by the user in a weighted or otherwise combined ordering that reflects the user's desires but is true to the data. For example, the user may ask for "cheap fast food French restaurants within walking distance rated highly". In many locations, there may not be any such restaurant. However, in one embodiment, assistant 1002 may show a list of items that tries to optimize for at least one constraint, and explain why at least one is listed. For example, item one might be "highly rated French cuisine" and another "cheap fast food within walking distance".

Data may be used as either hard or soft constraints. For example, the price range of a restaurant may be important to choosing one, but it may be difficult to state a threshold value for price up-front. Even seemingly hard constraints like cuisine may be, in practice, soft constraints because of partial matching. Since, in one embodiment, assistant 1002 using a data modeling strategy that seeks to flatten one or more criteria into symbolic values (such as "cheap" or "close"), these constraints may be mapped into a function that gets the criteria and order right, without being strict about matching specific threshold values. For symbolic criteria with clear objective truth values, assistant 1002 may weigh the objective criteria higher than other criteria, and make it clear in the explanation that it knows that some of the items do not strictly match the requested criteria.

- Items may match some but not one or more constraints, and the "best fitting" items may be shown.
- In general, assistant 1002 determines which item features are salient for a domain, and which may serve as selection criteria, and for at least one criteria, possible constraint values. Such information can be provided, for example, via operational data and API calls.

Paraphrase and Prompt Text

As described above, in one embodiment assistant 1002 provides feedback to show it understands the user's intent and is working toward the user's goal by producing paraphrases of its current understanding. In the conversational dialog model of the present invention, the paraphrase is what assistant 1002 outputs after the user's input, as a preface (for example, paraphrase 4003 in FIG. 40) or summary of the results to follow (for example, list 3502 in FIG. 35).

The prompt is a suggestion to the user about what else they can do to refine their request or explore the selection space along some dimensions.

In one embodiment, the purposes of paraphrase and prompt text include, for example:

- to show that assistant 1002 understands the concepts in the user's input, not just the text;
- to indicate the boundaries of assistant's 1002 understanding;
- to guide the user to enter text that is required for the assumed task;
- to help the user explore the space of possibilities in constrained selection;
- to explain the current results obtained from services in terms of the user's stated criteria and assistant's 1002 assumptions (for example, to explain the results of under- and over-constrained requests).

For example, the following paraphrase and prompt illustrates several of these goals:

User input: indonesian food in menlo park
System interpretation:
Task=constrainedSelection
SelectionClass=restaurant
Constraints:
 Location=Menlo Park, CA
 Cuisine=Indonesian (known in ontology)
Results from Services: no strong matches
Paraphrase: Sorry, I can't find any Indonesian restaurants near Menlo Park.
Prompt: You could try other cuisines or locations.
Prompt under hypertext links:
 Indonesian: You can try other food categories such as Chinese, or a favorite food item such as steak.
 Menlo Park: Enter a location such as a city, neighborhood, street address, or "near" followed by a landmark.
 Cuisines: Enter a food category such as Chinese or Pizza.
 Locations: Enter a location: a city, zip code, or "near" followed by the name of a place.

In one embodiment, assistant 1002 responds to user input relatively quickly with the paraphrase. The paraphrase is then updated after results are known. For example, an initial response may be "Looking for Indonesian restaurants near Menlo Park . . . " Once results are obtained, assistant 1002 would update the text to read, "Sorry, I can't find any Indonesian restaurants near Menlo Park. You could try other cuisines or locations." Note that certain items are highlighted (indicated here by underline), indicating that those items represent constraints that can be relaxed or changed.

In one embodiment, special formatting/highlighting is used for key words in the paraphrase. This can be helpful to facilitate training of the user for interaction with intelligent automated assistant 1002, by indicating to the user which words are most important to, and more likely to be recognized by, assistant 1002. User may then be more likely to use such words in the future.

In one embodiment, paraphrase and prompt are generated using any relevant context data. For example, any of the following data items can be used, alone or in combination:

- The parse—a tree of ontology nodes bound to their matching input tokens, with annotations and exceptions. For each node in the parse, this may include the node's metadata and/or any tokens in the input that provide evidence for the node's value.
- The task, if known
- The selection class.
- The location constraint, independent of selection class.
- Which required parameters are unknown for the given selection class (e.g., location is a required constraint on restaurants).
- The name of a named entity in the parse that is an instance of the selection class, if there is one (e.g., a specific restaurant or movie name.)
- Is this a follow-up refinement or the beginning of a conversation? (Reset starts a new conversation.)
- Which constraints in the parse are bound to values in the input that changed their values? In other words, which constraints were just changed by the latest input?
- Is the selection class inferred or directly stated?
- Sorted by quality, relevance, or proximity?
- For each constraint specified, how well was it matched?
- Was refinement entered as text or clicking?

In one embodiment, the paraphrase algorithm accounts for the query, domain model 1056, and the service results. Domain model 1056 contains classes and features including metadata that is used to decide how to generate text. Examples of such metadata for paraphrase generation include:

OsConstraint={trueIfalse}
IsMultiValued=(trueIfalse)
ConstraintType=}EntityName, Location, Time, CategoryConstraint, AvailabilityConstraint, BinaryConstraint, SearchQualifier, Guessed-Qualifier}
DisplayName=string
DisplayTemplateSingular=string
DisplayTemplatePlural=string
GrammaticalRole={AdjectiveBeforeNoun,Noun,ThatClauseModifer}

For example, a parse might contain these elements:

Class: Restaurant
IsConstraint=false
DisplayTemplateSingular="restaurant"
DisplayTemplatePlural="restaurants"
GrammaticalRole=Noun
Feature: RestaurantName (example: "II Fornaio")
IsConstraint=true
IsMultiValued=false
ConstraintType=EntityName
DisplayTemplateSingular="named $1"
DisplayTemplatePlural="named $1"
GrammaticalRole=Noun
Feature: RestaurantCuisine (example: "Chinese")
IsConstraint=true
IsMultiValued=false
 ConstraintType=CategoryConstraint
GrammaticalRole=AdjectiveBeforeNoun Feature: RestaurantSubtype (example: "café")
1sConstraint=true
IsMultiValued=false
ConstraintType=CategoryConstraint
DisplayTemplateSingular="$1"
DisplayTemplatePlural="$Is"
GrammaticalRole=Noun
Feature: RestaurantQualifiers (example: "romantic")
IsConstraint=true
IsMultiValued=true
ConstraintType=SearchQualifier
DisplayTemplateSingular="is described as $1"
DisplayTemplatePlural="are described as $1"
DisplayTemplateCompact="matching $1"
GrammaticalRole=Noun
Feature: FoodType (example: "burritos")
IsConstraint=true
IsMultiValued=false
ConstraintType=SearchQualifier
DisplayTemplateSingular="serves $1"
DisplayTemplatePlural="serve $1"
DisplayTemplateCompact="serving $1"
GrammaticalRole=ThatClauseModifer
Feature: IsRecommended (example: true)
IsConstraint=true
IsMultiValued=false
ConstraintType=BinaryConstraint
DisplayTemplateSingular="recommended'
DisplayTemplatePlural="recommended"
GrammaticalRole=AdjectiveBeforeNoun
Feature: RestaurantGuessedQualifiers (example: "spectacular")
IsConstraint=true
IsMultiValued=false
ConstraintType=GuessedQualifier
DisplayTemplateSingular="matches $1 in reviews"
DisplayTemplatePlural="match $1 in reviews"
DisplayTemplateCompact="matching $1"
GrammaticalRole=ThatClauseModifer In one embodiment, assistant 1002 is able to handle unmatched input. To handle such input, domain model 1056 can provide for nodes of type GuessedQualifier for each selection class, and rules that match otherwise unmatched words if they are in the right grammatical context. That is, GuessedQualifiers are treated as miscellaneous nodes in the parse which match when there are words that are not found in the ontology but which are in the right context to indicate that that are probably qualifiers of the selection class. The difference between GuessedQualifiers and SearchQualifiers is that the latter are matched to vocabulary in the ontology. This distinction allows us to paraphrase that assistant 1002 identified the intent solidly on the SearchQualifiers and can be more hesitant when echoing back the GuessedQualifiers.

In one embodiment, assistant 1002 performs the following steps when generating paraphrase text:

1. If the task is unknown, explain what assistant 1002 can do and prompt for more input.
2. If the task is a constrained selection task and the location is known, then explain the domains that assistant 1002 knows and prompt for the selection class.
3. If the selection class is known but a required constraint is missing, then prompt for that constraint. (for example, location is required for constrained selection on restaurants)
4. If the input contains an EntityName of the selection class, then output "looking up" <name> in <location>.
5. If this is the initial request in a conversation, then output "looking for" followed by the complex noun phrase that describes the constraints.
6. If this is a follow-up refinement step in the dialog,
   a. If the user just completed a required input, then output "thanks" and then paraphrase normally. (This happens when there is a required constraint that is mapped to the user input.)
   b. If the user is changing a constraint, acknowledge this and then paraphrase normally.
   c. If the user typed in the proper name of an instance of the selection class, handle this specially.
   d. If the user just added an unrecognized phrase, then indicate how it will be folded in as search. If appropriate, the input may be dispatched to a search service.
   e. If the user is just adding a normal constraint, then output "OK", and paraphrase normally.
7. To explain results, use the same approach for paraphrase. However, when the results are surprising or unexpected, then explain the results using knowledge about the data and service. Also, when the query is over- or underconstrained, prompt for more input.

Grammar for Constructing Complex Noun Phrases

In one embodiment, when paraphrasing 734 a constrained selection task query, the foundation is a complex noun phrase around the selection class that refers to the current constraints. Each constraint has a grammatical position, based on its type. For example, in one embodiment, assistant 1002 may construct a paraphrase such as:

recommended romantic Italian restaurants near Menlo Park
with open tables for 2 that serve osso buco and are described as "quiet"

A grammar to construct this is

<paraphraseNounClause> :== <binaryConstraint> <searchQualifier> <categoryConstraint> <itemNoun> <locationConstraint> <availabiltyConstraint> <adj ectivalClauses>

<binaryConstraint> :== single adjective that indicates the presence or absence of a BinaryConstraint (e.g., recommended (best), affordable (cheap))
It is possible to list more than one in the same query.

<searchQualifier> :== a word or words that match the ontology for a qualifier of the selection class, which would be passed into a search engine service, (e.g., romantic restaurants, funny movies).
Use when ConstraintType= Search Qualifier.

<categoryConstraint> :== an adjective that identifies the genre, cuisine, or category of the selection class (e.g., Chinese restaurant or R-rated file). It is thelast prefix adjective because it is the most intrinsic. Use for features of type CategoryConstraint and GrammaticalRole=AdjectiveBeforeNoun.

<itemNoum> :== <namedEntityPhrase> <selectionClass> <selectionClassSubType> find the most specific way to display the noun. NamedEntity < SubType < Class -continued <selectionClass > :== a noun that is the generic name for the selection class (e.g., restaurant, movie, place)
<selectionClassSubType> :== a noun phrase that is the subtype of the selection class if it is known (e.g., diner, museum, store, bar for the selection class local business). Use for features in which ConstraintType CategoryConstraint and GrammaticalRole=AcljectiveBeforeNoun.
<namedEntityPhrase> :== <entityName>
"the" (<selectionClass> <selectionClassSubType>)
<entityName> :== the proper name of an instance of the selection class (e.g., "Il Fornaio" "Animal House" "Harry's Bar")
<locationConstraint> :== <locationPreposition> <locationName>
<locationPreposition> :== "in", "near", "at", and the like
<locationName> :== city, street address, landmark, or something for GPS like "your current location"
<availabilityConstraint> :== the availability constraint expressed as a prepositional phrase that comes after the noun (e.g., "with open tables", "with seats available", "available online") It comes right after the noun to give it salience.
<adjectivalClauses>:== <modiferVerbPhrase> I "that" <modiferVerbPhrase> "and" <modiferVerbPhrase>
<modiferVerbPhrase> := a verb phrase that expresses a search-keyword style constraint on the selection class (e.g., restaurants that "are described as quiet", "serve meat after 11", "match 'tragically hip' in reviews"; movies that "contain violence", "star Billy Bob Thornton"). Include all constraints in the parse whose GrammaticalRole=ThatClauseModifier, using the "that...and" variant if there are more than one. Use the DisplayTemplatePlural to generate the "that" clauses, putting the GuessedQualifier last. If there is only one such constraint, use the DisplayTemplateCompact variant.

Table 1 provides some examples of paraphrases that may be provided in response to the first input for a task, according to one embodiment.

TABLE 1

Paraphrases in response to first input

| Input | Initial Paraphrase |
|---|---|
| tie house | Sorry, I don't understand "tie house." I know about restaurants, hotels, and other local businesses, flights, weather, and buying things online. What are you looking for, and where? |
| palo alto | I can help you find restaurants, businesses, events, and things to do in Palo Alto. What are you looking for? |
| food | Looking for a place to eat? Where? (examples) |
| Italian food | I can tell you about Italian restaurants in your area. Where would you like to eat? |
| burrito | I can help you find places that serve burritos in your area. Where would you like to eat? |
| best mexican food | I can help you find good Mexican restaurants in your area. Where are you? |
| restaurants palo alto | Looking for restaurants near Palo Alto. |
| Italian palo alto | Looking for Italian restaurants near Palo Alto. |
| thai food in menlo park | Looking for Thai restaurants near Menlo Park |
| indonesian food in menlo park | Looking for Indonesian restaurants near Menlo Park |
| best mexican food in Palo Alto | Looking for recommended Mexican restaurants near Palo Alto. |
| fast food menlo park | Looking for fast food restaurants near Menlo Park |
| healthy food in menlo park | Looking for places near Menlo Park that serve healthy food. |
| dive bar in menlo park | Looking for dive bars near Menlo Park. |
| pool room in menlo park | Looking for pool rooms near Menlo Park. |
| hookah room in menlo park | Looking for places near Menlo Park described as "hookah room". |
| spicy food in sf | Looking for places near Menlo Park that serve spicy food. |
| burgers in Menlo park | Looking for places near Menlo Park that serve burgers. |
| belly dancing place in sf | Looking for places near San Francisco described as "belly dancing". |
| belly dancing place in menlo park | Looking for places near Menlo Park described as "belly dancing". |
| juke joint in sf | Looking for joints near San Francisco described as "juke". |
| tie house Menlo park | Looking for places near Menlo Park described as "tie house". |
| thai house palo alto | Looking up Thai House in Palo Alto |
| il fornaio menlo park | Looking up Il Fornaio in Palo Alto |
| il fornao in Menlo park | Looking for places near Palo Alto described as "il fornao". |

TABLE 1-continued

| Paraphrases in response to first input | |
|---|---|
| Input | Initial Paraphrase |
| cliff house in Menlo park | Looking up Cliff House in Palo Alto |
| romantic restaurant in palo alto | Looking for romantic restaurants in Palo Alto |
| romantic restaurant in palo alto | Looking for romantic restaurants in Palo Alto |
| quiet romantic restaurant in palo alto | Looking for romantic restaurants in Palo Alto described as "quiet" |
| quiet romantic restaurant in palo alto | Looking for romantic restaurants in Palo Alto described as "quiet |
| tragically hip restaurant in palo alto | Looking for restaurants in Palo Alto described as "tragically hip" |
| tragically hip restaurant in palo alto | Looking for restaurants in Palo Alto described as "tragically hip" |
| table for two tonight in palo alto | Checking availability for tonight at restaurants near Palo Alto. |
| table for two italian food tonight in palo alto | Checking availability for tonight at Italian restaurants near Palo Alto. |
| il fornaio palo alto 6pm for 2 | Checking availability for tables tonight at Ill Fornaio in Palo Alto. |
| table for 2 at thai house in PA | Checking availability for tables tonight at Thai House in Palo Alto. |
| pizza delivery in menlo park I want the best quiet romantic italian restaurant for osso buco in or near menlo park | OK, looking for recommended romantic italian restaurants near Menlo Park that serve osso buco and are described as "quiet". |
| Book me a table for 2 at the best quiet romantic italian restaurant for osso buco in or near menlo park | OK, looking for recommended romantic italian restaurants near Menlo Park with open tables for 2 that serve osso buco and are described as "quiet". |

Refining a Query about Places to Eat

Table 2 provides some examples of paraphrases in response to a situation where user's intent to find a place to eat is known, but they have not selected a particular place to eat. They are facing a list of restaurants, and they provide refinements.

TABLE 2

| Paraphrases in response to refinements | |
|---|---|
| Refinements | |
| menlo park (was un-known) | Thanks, now looking for restaurants in Menlo Park. |
| Cheapest | OK, looking for affordable restaurants near Menlo Park. |
| chinese (was italian) | OK, changing cuisine to Chinese. Looking for Chinese restaurants near Menlo Park |
| pizza (adding food item) | OK, looking for Italian restaurants near Menlo Park that serve pizza. |
| san francisco (was menlo park) | OK, changing location to San Francisco. Looking for Italian restaurants near San Francisco that serve pizza. |
| tragically hip | OK, I'll search reviews for "tragically hip". |
| quiet romantic | OK, looking for romantic restaurants in Palo Alto described as "quiet" |
| cliff house | Cliff House sounds familiar. I'll look it up in Palo Alto. |

Table 3 provides some examples of results summaries that are provided once results are obtained.

TABLE 3

| Results Summaries | | |
|---|---|---|
| Input | # Results | Results Summary |
| tie house | N/A | N/A (no call to services) |
| palo alto | N/A | N/A (no call to services) |
| food | N/A | N/A (no call to services) |
| Italian food | N/A | N/A (no call to services) |

TABLE 3-continued

| Results Summaries | | |
|---|---|---|
| burrito | N/A | N/A (no call to services) |
| best mexican food | N/A | N/A (no call to services) |
| restaurants palo alto | many | Here are some recommended restaurants near Palo Alto. Do you prefer any particular food type? |
| Italian palo alto | Some | Here are some Italian restaurants near Palo Alto. To reserve a table, click on available times. |
| thai food in menlo park | some | Here are some Thai restaurants near Menlo Park. To reserve a table, click on available times. |
| indonesian food in menlo park | 0 | Sorry, I can't find any Indonesian restaurants To reserve a table, click on available times. near Menlo Park. You could try other cuisines or locations. |
| best mexican food in Palo Alto | some | Here are some recommended Mexican restaurants near Palo Alto. |
| fast food menlo park | some | OK, here are some fast food restaurants near Menlo Park. |
| healthy food in menlo park | some | Here are some places near Menlo Park that might serve healthy food, based on reviews. |
| dive bar in menlo park | some | Here are some bars near Menlo Park. I don't see anything specific to "dive bar". Are there other ways of saying it? |
| pool room in menlo park | some | Here are some places in Menlo Park that are described as pool rooms. You can add other words to describe what you want. |
| hookah room in menlo park | 0 | I can't find places Menlo Park matching "hookah room". Interested in restaurants, hotels, or local businesses? |
| spicy food in sf | Weak match | Here are some places to eat in San Francisco. I don't know which serve spicy food. Could it go by another name? |
| burgers in Menlo park | some | You might find burgers at these places to eat near Menlo Park. |
| belly dancing place in sf | some | Here are some places in Menlo Park that are described as "belly dancing". words to describe what you want. |
| belly dancing place in menlo park | 0 | I can help you find restaurants, businesses, events, and things to do in San Francisco. What are some other words for "belly dancing place"? |
| juke joint in sf | 0 | I can help you find restaurants, businesses, events, and things to do in San Francisco. What are some other words for "juke joint"? |
| tic house Menlo park | 0 | Sorry, I don't know about "tic house" in Menlo Park. Any other names for it? |
| thai house palo alto | 1 | Got it: Thai House restaurant in Palo Alto, CA. Want to reserve a table? When and for how many? |
| it fornaio menlo park | Weak match | There is a Il Fornaio restaurant in Palo Alto, which is near Menlo Park. |
| it fornao in Menlo park | spell match | Did you mean Il Fornaio in Palo Alto? If not, Did you mean Il Fornaio in Palo Alto? If not, try different words. |
| cliff house in Menlo park | 0 | I couldn't find Cliff House in Palo Alto. Could it go by a different name or be in a different city? |
| romantic restaurant in palo alto | some | Here are some restaurants near Palo Alto that are described in reviews as romantic. |
| romantic restaurant in palo alto | 0 | Here are restaurants near Palo Alto. Searching reviews did not find any described as romantic. Any other preferences? |
| quiet romantic restaurant in palo alto | some | Here are some restaurants near Palo Alto that match "quiet romantic" in reviews. |
| quiet romantic restaurant in palo alto | 0 | Here are some restaurants near Palo Alto. Searching reviews did not find any matching "quiet romantic". Any other preferences? |
| tragically hip restaurant in palo alto | some | Here are some restaurants near Palo Alto that match "tragically hip" in reviews. |
| tragically hip restaurant in palo alto | 0 | Here are some restaurants near Palo Alto. Searching reviews did not find any matching "tragically hip". Any other preferences? |
| table for two tonight in palo alto | some | Here are restaurants with open tables from 6pm to 8pm tonight for a party of two in Palo Alto, CA. |

TABLE 3-continued

| Results Summaries | | |
|---|---|---|
| table for two italian food tonight in palo alto | some | Here are restaurants with open tables from 6pm to 8pm tonight for a party of two in Palo Alto, CA |
| it fornaio palo alto 6pm for 2 | 1 | Here are table options at Il Fornaio restaurant in Palo Alto, CA at 6pm today for a party of 2. |
| table for 2 at thai house in PA | 1 | Here is the information for Thai House in in Palo Alto, CA. You can call them at the phone number listed. |
| | | Here are places that serve pizza in menlo park. I |
| pizza delivery in menlo park | | Here are places that serve pizza in menlo park. I do not have delivery options at this time. Click on restaurant phone numbers to call for delivery. |
| I want the best quiet romantic italian restaurant for osso buco in or near menlo park | weak match, sorted by availability | Here are the best matches for recommended romantic italian restaurants near Menlo Park that serve osso buco and are described as "quiet". Click on available times to reserve a table. |
| Book me a table for 2 at the best quiet romantic italian restaurant for osso buco in or near menlo park | weak match, sorted by availability | Here are the best matches for recommended romantic italian restaurants near Menlo Park with open tables for 2 that serve osso buco and are described as "quiet". Click on available times to reserve a table. |
| refinements | | |
| menlo park (was unknown) | some | Here are some recommended restaurants near Menlo Park. Do you prefer any particular food type? |
| cheapest | some | I found 4 affordable restaurants near Menlo Park. |
| chinese (was italian) | some | I found 4 Chinese restaurants near Menlo Park. |
| pizza (adding food item) | some | I found 4 Italian restaurants near Menlo Park that serve pizza. |
| san francisco (was menlo park) | some | I found 4 Italian restaurants near San Francisco. |
| tragically hip | some | I found 4 restaurants near Palo Alto that match "tragically hip" in reviews. |
| quiet romantic | some | Here are some restaurants near Palo Alto that match "quiet romantic" in reviews. |
| cliff house | 0 | I couldn't find Cliff House in Palo Alto. Could it |

Table 4 provides some examples of prompts that are provided when users click on active links.

Prompt when Users Click on Active Links

Prompt when Users Click on Active Links

TABLE 4

| Prompts when users click on active links | | |
|---|---|---|
| Anchor Text | Prompt Text | Notes |
| Location, where | Enter a location: a city, zip code, or "near" followed by the name of a place. | This prompt might be used when the user has not specified a location yet. |
| Palo Alto | Enter a location such as a city, neighborhood, street address, or "near" followed by a landmark. | This prompt might be used when the user is changing locations. |
| food type | Enter a food category such as Chinese or Pizza. | Merge food type and cuisine can be merged |
| Italian | You can try other food categories such as Chinese, or a favorite food item such as steak. | User already said Italian. Assistant 1002 is helping the user explore alter-natives. If it is a food item, it dominates over cuisine. |
| Reservation | Enter the day and time to reserve a table, such as "tomorrow at 8". | Prompting for a reservation |
| healthy food | You can also enter menu items or cuisines | Known food type |
| spicy food | You can also enter menu items or cuisines | Unknown food type |

TABLE 4-continued

| Prompts when users click on active links | | |
|---|---|---|
| Anchor Text | Prompt Text | Notes |
| restaurants | What kind of restaurant? (e.g., Chinese, Pizza) | Clicking on the restaurants link should insert the word "restaurant" on the end of the text input. |
| businesses | You can find local florists, ATMs, doctors, drug stores, and the like What kind of business are you looking for | Clicking on the businesses link should add to the machine readable tag that this is a local search |
| events | You can discover upcoming converts, shows, and the like What interests you? | |
| things to do | Music, art, theater, sports, and the like What kind of thing would you like to do in this area? | |
| hotels | I can help you find an available hotel room. Any preferences for amenities or location? | |
| weather | Enter a city, and I'll tell you what the weather is like there. | If location is known, just show the weather data |
| buying things | I can help you find music, movies, books, electronics, toys, and more -- and buy it from Amazon. What are you looking foract? | |

Suggesting Possible Responses in a Dialog

In one embodiment, assistant 1002 provides contextual suggestions. Suggestions a way for assistant 1002 to offer the user options to move forward from his or her current situation in the dialog. The set of suggestions offered by assistant 1002 depends on context, and the number of suggestions offered may depend on the medium and form factor. For example, in one embodiment, the most salient suggestions may be offered in line in the dialog, an extended list of suggestions ("more") may be offered in a scrollable menu, and even more suggestions are reachable by typing a few characters and picking from autocomplete options. One skilled in the art will recognize that other mechanisms may be used for providing suggestions.

In various embodiments, different types of suggestions may be provided. Examples of suggestion types include:
- options to refine a query, including adding or removing or changing constraint values;
- options to repair or recover from bad situations, such as "not what I mean" or "start over" or "search the web";
- options to disambiguate among;
- interpretations of speech;
- interpretations of text, including spell correction and semantic ambiguity;
- context-specific commands, such as "show these on a map" or "send directions to my date" or "explain these results";
- suggested cross-selling offers, such as next steps in meal or event planning scenarios;
- options to reuse previous commands, or parts of them.

In various embodiments, the context that determines the most relevant suggestions may be derived from, for example:
- dialog state
- user state, including, for example:
  - static properties (name, home address, etc)
  - dynamic properties (location, time, network speed)
- interaction history, including, for example:
  - query history
  - results history
  - the text that has been entered so far into autocomplete.

In various embodiments, suggestions may be generated by any mechanism, such as for example:
- paraphrasing a domain, task, or constraint based on the ontology model;
- prompting in autocomplete based on the current domain and constraints;
- paraphrasing ambiguous alternative interpretations;
- alternative interpretations of speech-to-text;
- hand authoring, based on special dialog conditions.

According to one embodiment, suggestions are generated as operations on commands in some state of completion. Commands are explicit, canonical representations of requests, including assumptions and inferences, based on attempted interpretations on user input. In situations where the user input is incomplete or ambiguous, suggestions are an attempt to help the user adjust the input to clarify the command.

In one embodiment, each command is an imperative sentence having some combination of a
- command verb (imperative such as "find" or "where is");
- domain (selection class such as "restaurants");
- constraint(s) such as location=Palo Alto and cuisine=Italian.

These parts of a command (verb, domain, constraints) correspond to nodes in the ontology.

A suggestion, then, may be thought of as operations on a command, such as setting it, changing it, or declaring that it is relevant or not relevant. Examples include:
- setting a command verb or domain ("find restaurants")
- changing a command verb ("book it", "map it", "save it")
- changing a domain ("looking for a restaurant, not a local business")
- stating that a constraint is relevant ("try refining by cuisine")

- choosing a value for a constraint ("Italian", "French", and the like)
- choosing a constraint and value together ("near here", "tables for 2")
- stating that a constraint value is wrong ("not that Boston")
- stating that a constraint is not relevant ("ignore the expense")
- stating the intent to change a constraint value ("try a different location")
- changing a constraint value ("Italian, not Chinese")
- adding to a constraint value ("and with a pool, too")
- snapping a value to grid ("Los Angeles, not los angelos")
- initiating a new command, reusing context ([after movies] "find nearby restaurants", "send directions to my friend")
- initiating a command that is "meta" to context ("explain these results")
- initiating a new command, resetting or ignoring context ("start over", "help with speech")

A suggestion may also involve some combination of the above. For example:

- "the movie Milk not [restaurants serving] the food item milk"
- "restaurants serving pizza, not just pizza joints"
- "The place called Costco in Mountain View, I don't care whether you think it is a restaurant or local business"
- "Chinese in mountain view" [a recent query]

In one embodiment, assistant 1002 includes a general mechanism to maintain a list of suggestions, ordered by relevance. The format in which a suggestion is offered may differ depending on current context, mode, and form factor of the device.

In one embodiment, assistant 1002 determines which constraints to modify by considering any or all of the following factors:

- Consider whether the constraint has a value;
- Consider whether the constraint was inferred or explicitly stated;
- Consider its salience (suggestionIndex).

In one embodiment, assistant 1002 determines an output format for the suggestion. Examples of output formats include:

- change domain:
  - if autocomplete option "find restaurants", then "try something different"
  - else [was inferred] "not looking for restaurants"
- change name constraint:
  - if name was inferred, offer alterative ambiguous interpretation"
  - stuff into autocomplete the entity names from current results
  - different name
  - consider that it wasn't a name lookup (remove constraint)—maybe offer category in place of it
- "not named"
- "not in Berkeley"
- "some other day"
- not that sense of (use ambiguity alternatives)
- inferred date: "any day, I don't need a reservation"

In one embodiment, assistant 1002 attempts to resolve ambiguities via suggestions. For example, if the set of current interpretations of user intent is too ambiguous 310, then suggestions are one way to prompt for more information 322. In one embodiment, for constrained selection tasks, assistant 1002 factors out common constraints among ambiguous interpretations of intent 290 and presents the differences among them to the user. For example, if the user input includes the word "café" and this word could match the name of a restaurant or the type of restaurant, then assistant 102 can ask "did you mean restaurants named 'café' or 'café restaurants'?"

In one embodiment, assistant 1002 infers constraints under certain situations. That is, for constrained selection tasks, not all constraints need be mentioned explicitly in the user input; some can be inferred from other information available in active ontology 1050, short term memory 1052, and/or other sources of information available to assistant 1002. For example:

- Inferring domain or location
- Default assumption, like location
- Weakly matched constraint (fuzzy, low salience location, etc)
- Ambiguous criteria (match to constraint value without prefix (name vs. category, often ambiguous)

In cases where the assistant 1002 infers constraint values, it may also offer these assumptions as suggestions for the user to overrule. For example, it might tell the user "I assumed you meant around here. Would you like to look at a different location?"

Figure 48:
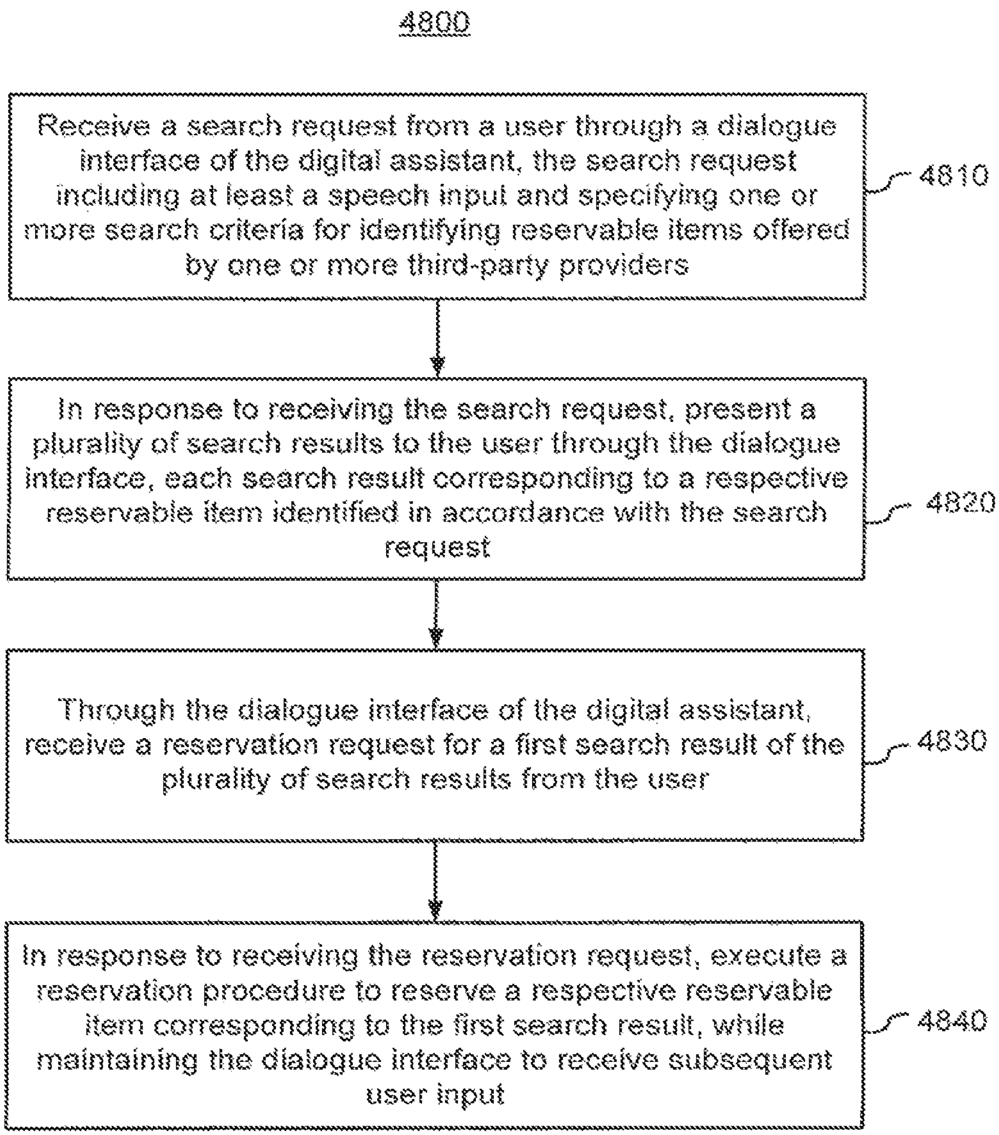
FIG. 48 is a flow diagram depicting a method for providing assistance with search and reservation requests using a digital assistant according to some embodiments.

FIG. 48 is flow diagram depicting a method for providing assistance with search and reservation requests using a digital assistant according to some embodiments. As shown in FIG. 48, in a process 4800, a search request is received from a user through a dialogue interface of the digital assistant, where the search request includes at least a speech input and specifies one or more search criteria for identifying reservable items offered by one or more third-party providers (4810).

As described earlier in the specification, when the digital assistant is active, the digital assistant optionally maintains a dialogue interface to facilitate real-time, two-way communications between the digital assistant and the user. The dialogue interface of the digital assistant is capable of receiving inputs from and providing outputs to the user through multiple modalities (e.g., via speech, text, touch, gestures, and other audio, visual, and tactile means). In some embodiments, the dialogue interface is a speech-only (e.g., an eyes-free and hands-free interface) input and output interface, and the user and the digital assistant communicate entirely through speech and sounds. In some embodiments, the dialogue interface provides a conversation screen in addition to a speech-based input and output interface. In some embodiments, the conversation screen presents textual paraphrases of the user's speech input (e.g., a search request) and/or presents information and search results in textual and graphical forms. In some embodiments, the conversation screen allows the user to enter text, select search results, and/or interact with various user interface elements presented on the conversation screen. In some embodiments, the conversation screen is a single frame displayed on the user device containing textual representations of the dialogue between the user and the digital assistant. In some embodiments, the textual representations include a series of text boxes, text bubbles, or other visual renditions of the original text input from the user, text derived from user speech input (e.g., original words or paraphrases), and/or text output provided the digital assistant.

In the process 4800, in response to receiving the search request, the digital assistant presents a plurality of search results to the user through the dialogue interface, each search result corresponding to a respective reservable item identified in accordance with the search request (4820). A reservable item refers to an item that can be reserved and/or purchase according to a reservation or booking process prescribed by the provider of the item. Examples of a reservable item include a table at a restaurant, a ticket or seating at an event, concert, movie, sports game, performance, talk, or the like, an item on sale at an auction, and the like. A search result corresponds to a respective reservable item identified in accordance with the search request, and provides information (e.g., name, location, show time, price, rating, etc.) about the reservable item or a third-party provider of the reservable item. For example, a search result for a restaurant search request provides information (e.g., name, cuisine, and location) on a restaurant that has open tables for reservation. A search result for an entertainment search request provides information (e.g., name, time, location, and price) on an entertainment event (e.g., a movie or a concert) that has tickets for sale. Search criteria for identifying reservable items include a search class or selection class (e.g., restaurants, entertainment events, etc.), and various constraints (e.g., location, time, price, review, genre, cuisine, etc.) for filtering and ranking the search results.

In some embodiments, the digital assistant presents a list of search results on the conversation screen. In some embodiments, the digital assistant reads through the list of search results on the conversation screen to the user. In an eyes-free mode, the digital assistant optionally reads the list of search results to the user without presenting them on a conversation screen. In some embodiments, the digital assistant provides a speech output summarizing the search results, and presents more detailed information regarding the search results on the conversation screen.

In some embodiments, the search request is a restaurant search request, and search results that are presented to the user correspond to restaurants that are identified in accordance the restaurant search request. For example, when a digital assistant is active, the digital assistant monitors various input channels for user input (e.g., listens to capture the user's speech input and/or captures text or gesture inputs on the conversation screen). When the digital assistant captures a speech input from the user requesting a search for restaurants (e.g., a speech input "Find me a romantic Italian restaurant in Menlo Park."), the digital assistant parses the speech input to determine the search criteria specified in the speech input (e.g., Task={Search or ConstrainedSelection}, SelectionClass=Restaurant, SearchConstraints={RestaurantCuisine="Italian", RestaurantQualifiers="romantic", RestaurantLocation="Menlo Park" }). In some embodiments, one or more of the search criteria are based on context information such as other inputs from the user or saved preferences of the user.

After the search criteria of the search are determined, the digital assistant performs a search for restaurants according to the search criteria specified in the speech input and the context information. Then the digital assistant presents the search results to the user through the dialogue interface of the digital assistant.

In some embodiments, before the search is performed or before the search results are presented, the digital assistant provides a speech output through the dialogue interface, the speech output paraphrasing the search request received from the user. For example, when the user says "Find me a place to eat in Palo Alto." The digital assistant can respond by saying "OK, searching for restaurants in Palo Alto." For another example, when the user says "I want to have Italian for dinner today." If the current time is close to dinner time, the digital assistant can respond by saying "OK, searching for Italian restaurants near your current location."

In some embodiments, the digital assistant provides a speech output with the search results, where the speech output announces the one or more search criteria used to identify the search results. For example, after the digital assistant has performed a search for Italian restaurants in Palo Alto according to the user's request, the digital assistant announces the search results by saying "Here are five Italian restaurants I found in Palo Alto: . . . " For another example, after the digital assistant has performed a search for restaurants near the user's current location, the digital assistant announces the search results by saying "I found a fast food restaurant and a French restaurant nearby: . . . "

In some embodiments, after announcing the search results through a speech output, the digital assistant optionally read through the list of search results to the user. In some embodiments, both the announcement and the search results are presented on a conversation screen on the user device. In some embodiments, text representing the search criteria (e.g., restaurant, Italian, Palo Alto, nearby) used to identify the search results are highlighted in the announcement and/or the search results.

In some embodiments, the announcement for the search results can indicate changes (e.g., relaxation and/or variation) in the search criteria used to obtain to the search results. For example, when the user had requested to find a Malaysian restaurant in Palo Alto, and no Malaysian restaurants were found in Palo Alto, the digital assistant can expand the search area to include the nearby cities (e.g., Menlo Park). When the digital assistant presents the search results obtained from the expanded search, the digital assistant announces the search results by saying, "No Malaysian restaurants were found in Palo Alto, but I found one Malaysian restaurant in Menlo Park which borders Palo Alto."

In some embodiments, the search request is an entertainment search request, and the search results correspond to a plurality of entertainment events identified in accordance the entertainment search request. Entertainment events refer to public activities and events related to entertainment and fun that generally occur at predetermined times and typically require a reservation or ticket for attendance. Examples of entertainment events include movies, shows, concerts, performances, sports games, tours, etc.

For example, when the digital assistant captures a speech input from the user requesting a search for a particular type of entertainment events (e.g., a speech input "Who's playing at the Fillmore next week?"), the digital assistant processes the speech input and determines that "the Fillmore" is the name of a music venue, and that the user is searching for concerts that are playing at the Fillmore next week. Based on the speech processing, the digital assistant obtains the search criteria specified in the speech input (e.g., Task=(Search or ConstrainedSelection, SelectionClass=Entertainment Event, Sub-class=Concerts, SearchConstraints={Venue="Fillmore," Time="next week" }). In some embodiments, one or more of the search criteria can be based on context information associated with the speech input, such as other inputs from the user or saved preferences of the user. After the search criteria of the entertainment event search are determined, the digital assistant performs a search for entertainment events (e.g., upcoming concerts) according to the search criteria specified in the speech input (e.g., Venue=Fillmore, and Time=next week) and the context information (e.g., the current date). Once the entertainment events meeting the search criteria have been identified, the digital assistant generates and presents the search results to the user through the dialogue interface of the digital assistant.

In some embodiments, before the search is performed or before the search results are presented, the digital assistant provides a speech output through the dialogue interface, the speech output paraphrasing the search request received from the user. For example, when the user's speech input was, "Who's playing at the Fillmore next week?" The digital assistant determines the search criteria based on the speech input, and paraphrases the search request by saying, "Searching for concerts at the Fillmore Concert Hall next week."

In some embodiments, when paraphrasing the search request, the digital assistant provides both explicit search criteria and implicit search criteria derived from the context information in the paraphrase. For example, if the digital assistant had just booked a table for two at an Italian restaurant for Saturday evening at the user's request, and subsequently detected a speech input saying, "I want to catch a movie before the dinner. What's on?" Based on the speech input, the digital assistant can determine explicit search criteria such as Task=Search, SelectionClass=Entertainment Events, Sub-class=Movies, and implicit search criteria such as Date="Saturday evening"=(e.g., Jun. 9, 2012), Time="before dinner"=(e.g., between 4:00 PM-6:00 PM), Location="near restaurant"=(e.g., within 15 miles of Palo Alto). Therefore, when paraphrasing the search request, the digital assistant speaks or presents on the conversation screen, "Searching for movies playing between 4:00 PM to 6:00 PM on Saturday."

In some embodiments, the digital assistant provides a speech output with the search results to announce one or more search criteria used to identify the search results. For example, when presenting the search results for the movie search in the above example, the digital assistant can provide a speech output saying "Here are movies that are showing before your dinner on Saturday: . . . " or "I found 6 movies with show times between 4:00 PM and 6:00 PM on Saturday: . . . " After announcing the search results through a speech output, the digital assistant optionally read through the list of search results to the user. In some embodiments, both the announcement and the search results are presented on a conversation screen on the user device. In some embodiments, text representing the search criteria (e.g., "movies", "Saturday", "before your dinner", "between 4:00 PM and 6:00 PM") used to identify the search results are highlighted in the announcement and/or the search results.

As shown in the examples above, in some embodiments, a search request includes context information associated with the speech input received from the user. In some embodiments, the digital assistant maintaining the context information based on one or more prior user interactions between the user and the digital assistant through the dialogue interface. More details on how context information is utilized have been provided in earlier sections of the specification. Examples of context information include personal interaction history (e.g., dialog history, previous selections from results, and the like), personal physical context (e.g., user's current location and the current time), and personal information gathered in the context of interaction (e.g., name, email addresses, physical addresses, phone numbers, account numbers, calendar information, contacts, preferences, and the like).

In some embodiments, the digital assistant determines at least some of the search criteria in the search request based at least in part on the context information associated with the speech input. After the search criteria are determined from the speech input and the associated context information, the digital assistant identifies reservable items in accordance with the search criteria that have been determined, and generate the search results based on the identified reservable items.

Below is another example in which context information is used to derive a search criterion of the search request. While the digital assistant is executing the reservation procedure at the user's request to purchase two tickets for a selected concert at the Fillmore for Saturday, or shortly after the reservation was made, the user provides a speech input through the dialogue interface saying, "Where can we eat before the concert?" In response to the speech input, and based on the context information already available to the digital assistant (e.g., the location and time for the concert), the digital assistant executes a restaurant search for places near the Fillmore that are open before the concert time on Saturday. In some embodiments, the digital assistant also infers a party-size requirement for the restaurant search request from the context information (e.g., the number of concert tickets that is being purchased), and presents only restaurants that have open tables meeting the party-size requirement as search results.

In some embodiments, after a search request is received from the user, the digital assistant determines based on the speech input and the associated context information that additional input from the user is needed to further constrain the search, or to sort the search results already obtained using the search criteria initially provided by the user. For example, when the user says "What's playing at the Fillmore?" The digital assistant will be able to determine that the user is interested in searching for events occurring at the Fillmore. However, without earlier user inputs or context information indicating a relevant time period for the search, the digital assistant will not be able to provide the most relevant search results. In such a scenario, the digital assistant determines that additional input from the user is needed or desirable to further constrain the search.

In some embodiments, upon determining that additional user input specifying one or more additional search criteria is needed or desirable, the digital assistant generates a speech output through the dialogue interface of the digital assistant to request the additional search criteria. For example, the digital assistant may provide a speech output saying, "OK, are you interested in all performances of this week? Or just the weekend?" In response to providing the speech output, the digital assistant receives additional inputs from the user through the dialogue interface, and supplements the search request with the additional inputs. For example, if the user says "Just this weekend." Then, the digital assistant derives an additional search criterion (Date="this weekend"=actual date range of the upcoming weekend (e.g., "Jun. 9th-10th, 2012")) and supplements the original search request with this additional search criterion. If the user instead says, "Fine me performances for this Saturday only." The digital assistant derives an additional search criterion {Date="this Saturday"=actual date of the upcoming Saturday (e.g., Jun. 9, 2012)} and supplements the original search request with this additional search criterion. In some embodiments, the digital assistant also paraphrases the augmented search request to the user, by saying "OK, searching for performances at the Fillmore for this weekend" or "OK, searching for performances at the Fillmore for this Saturday."

In some embodiments, the digital assistant can perform a search based on multiple search criteria specified in the original search request, and obtains some preliminary search results that do not meet all search criteria equally well. In such a scenario, in some embodiments, the digital assistant generates a speech input requesting additional input regarding the relative importance of the search criteria to the user. For example, if the original search request is for "romantic Italian restaurants in Palo Alto" and the digital assistant has identified non-Italian restaurants in Palo Alto that are considered romantic, romantic Italian restaurants that are just outside of Palo Alto, and Italian restaurants in Palo Alto that may or may not be considered romantic. Based on the mix of preliminary search results, the digital assistant generates an output requesting additional input regarding the relative importance of the three search criteria "RestaurantQualifiers=romantic," "RestaurantCuisine=Italian," and "RestaurantLocation=Palo Alto." For example, the digital assistant can ask the user, "Which is more important, atmosphere, location, or cuisine?" Based on the user's subsequent input (e.g., a speech input saying "Cuisine and atmosphere."), the digital assistant derives the additional constraint, and filters and/or ranks the search results according to the additional constraint (e.g., give more weight to the Cuisine and Atmosphere criteria).

In some embodiments, for each search result, the digital assistant presents one or more properties of the reservable item corresponding to the search result, where each property corresponds to one of the search criteria used in identifying the search results. For example, if the search request was for a place to eat before the concert, the properties shown along with the name of each restaurant in the search results can include the distance between the restaurant and the Fillmore (i.e., the location of the concert). For another example, if the search was for romantic Italian restaurants in Menlo Park, the digital assistant will present a snippet for each restaurant in the search results, and in the snippets, keywords such as "Italian" "Italy" "romantic" "nice atmosphere," "Tuscany," etc. are highlighted in the restaurant name, cuisine, and/or customer reviews.

In some embodiments, when presenting the search results, the digital assistant concurrently presenting one or more user interface elements in the dialogue interface (e.g., in the conversation screen) along with the plurality of search results. The user interface elements include, for example, links, buttons, and other interactive elements. In some embodiments, selection of one of the user interface elements causes presentation of additional information related to one or more of the search results in the dialogue interface. For example, a reviews user interface element causes more customer reviews for a selected search result to be presented through the dialogue interface. Alternatively, a reviews user interface element causes the interface of a restaurant review site to be loaded on the user device, and customer reviews for a selected search result are shown in their original format at the review site (i.e., selection of the reviews user interface element caused the review site to punch out of the dialogue interface of the digital assistant). Other examples of the user interface elements include links and buttons that cause presentation of a review, a map, a trailer, an availability summary, and a rating associated with one or more of the plurality of search results.

In some embodiments, when presenting the search results, the digital assistant also concurrently present one or more user interface elements in the dialogue interface (e.g., on a conversation screen) for invoking various follow-on actions regarding the search results. Selection of such a user interface element causes a follow-on action associated with one or more of the search results to be executed by the digital assistant. For example, in some embodiments, the digital assistant presents a call button for a search result. When the call button is invoked, it causes the digital assistant to initiates a telephone call to a telephone number associate with the search result (e.g., a telephone number associated with a restaurant or ticketing office). In some embodiments, the digital assistant presents a reviews button for each search result. When the reviews button is invoked, it causes the digital assistant to present reviews associated with the reservable item (e.g., restaurant, movies, concerts, etc.) corresponding to the search result. In some embodiments, the reviews are sourced from multiple third-party websites or services. In some embodiments, the digital assistant presents a directions button for each search result. When the directions button is invoked, it causes the digital assistant to generate a directions request for an address associated with the search result (e.g., the address of a restaurant identified by the search result). In response to the directions request, a directions interface can be presented with the address associated with the search result as the destination. Alternatively, a route between the user's current location and the address associated with the search result can be presented. In some embodiments, the directions interface or the route can be presented through the dialogue interface of the digital assistant, and the user can continue to interact with the digital assistant while reviewing the directions interface or the route. In some embodiments, the digital assistant presents one or more reservation or purchase user interface element (e.g., a reservation or buy button) for each search result. When one of the reservation or purchase user interface elements is invoked, the digital assistant initiates a reservation procedure for reserving or purchasing the reservable item (e.g., a table at a restaurant, tickets for an entertainment event) associated with the search result. In some embodiments, the digital assistant also presents user interface elements for sharing a link or saving a link to a search result.

As shown in FIG. 48, in the process 4800, after the search results are presented, a reservation request for a particular one of search results is received from the user through the dialogue interface of the digital assistant (4830). For example, if the list of search results are read to the user one by one, the user can interrupt the digital assistant after hearing a preferred restaurant or concert by saying "making me a reservation for two at this restaurant." or "Buy two tickets for this concert." Alternatively, the user can select one of the search results (e.g., restaurant search results, or event search results) presented on a conversation interface, and then say to the digital assistant, "Make me a reservation here." or "Get me a ticket for Saturday." In some embodiments, the digital assistant presents a respective user interface element for submitting a reservation request for each search result (e.g., a reservation or buy button), and the user can invoke the respective user interface element to submit a reservation request for a selected restaurant or entertainment event shown in the search result list.

In the process 4800, in response to receiving the reservation request, the digital assistant executes a reservation procedure to reserve a respective reservable item corresponding to the particular search result while maintaining the dialogue interface to receive subsequent user input (4840). In some embodiments, the reservation procedure executed by the digital assistant reserves a table at a respective restaurant corresponding to the particular search result for which the reservation request was submitted. In some embodiments, the reservation procedure purchases or reserves one or more tickets for a respective entertainment events corresponding to the particular search result for which the reservation request was submitted.

In some embodiments, the digital assistant executes a reservation procedure to reserve a respective reservable item (e.g., a restaurant table or seating at an event) by invoking a task flow associated with the reservation task. In some embodiments, the task flow invokes third-party services (e.g., an online reservation service for restaurants or an online ticketing service for movies and other entertainment events) for making the requested reservation. In some embodiments, while executing the reservation procedure, the digital assistant and the user continue to communicate through the dialogue interface regarding the reservation process, and related transactions. For example, while executing the reservation procedure, the digital assistant can ask the user whether the user has any additional requirements for the reservation (e.g., dietary restrictions, party-size, wine preference, etc. for restaurant reservation, and seating preferences for event reservations).

In some embodiments, the digital assistant performs the requested reservation in the background, while the user and the digital assistant continue to interact regarding other search results, and/or other unrelated tasks and requests through the dialogue interface. For example, while the digital assistant executes the reservation procedure, the user can review the menu of the restaurant that is being reserved, or ask the digital assistant to search for a flower shop near the restaurant through the dialogue interface of the digital assistant.

In some embodiments, the task flow of the reservation task further includes generating and storing a reminder or calendar entry in accordance with the reservation. For example, after a reservation has been made successfully at a restaurant or after tickets have been purchase for an event by the digital assistant, the digital assistant generates a reminder or calendar entry for the reservation according to the date, time, and/or location of the reservation. In some embodiments, the digital assistant has access to the user's electronic calendars, and inserts the reminder or calendar entry directly into the user's calendars. In some embodiments, the digital assistant sends a request to a third-party service, e.g., an online calendar service, to insert the reminder or calendar entry in the user's calendar. In some embodiments, the digital assistant requests the user's permission through the dialogue interface before the reminder or calendar entry is created for the user.

In some embodiments, the task flow of the reservation task further includes generating an invitation for another user in accordance with the reservation. For example, in some embodiments, if the reservation is for more than one person (e.g., reservation for a table for two or more people at a restaurant, or purchasing of two or more tickets for an event), the digital assistant determines the identities of the people who will be invited to join the meal at the restaurant or to attend the entertainment event with the user. Once the identities of these other people have been determined, the digital assistant generates an invitation to those people.

In some embodiments, the digital assistant determines the identities of the invitees to the meal or event based on the context information collected during the dialogue session in which the reservation was made. For example, if the user had said "Make a reservation for me and my mom at this restaurant." The digital assistant can determined the identity and contact information of the user's mom based on the user's contacts in the user's address book. In some embodiments, the digital assistant can offer to generate the invitation and prompt the user to provide the necessary contact information of the invitee(s).

Figure 49:
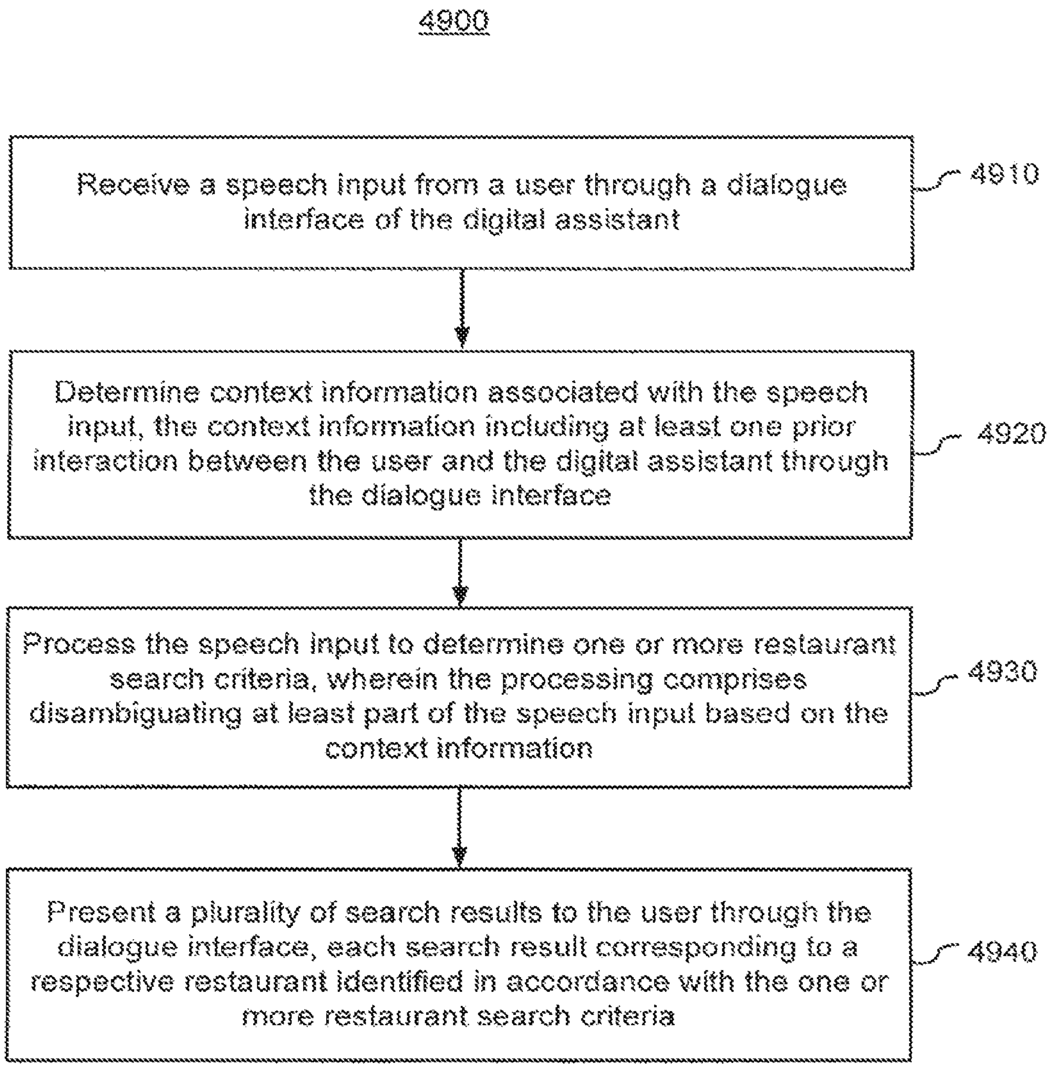
FIG. 49 is a flow diagram depicting a method for performing a restaurant search using a digital assistant according to some embodiments.
Figure 50:
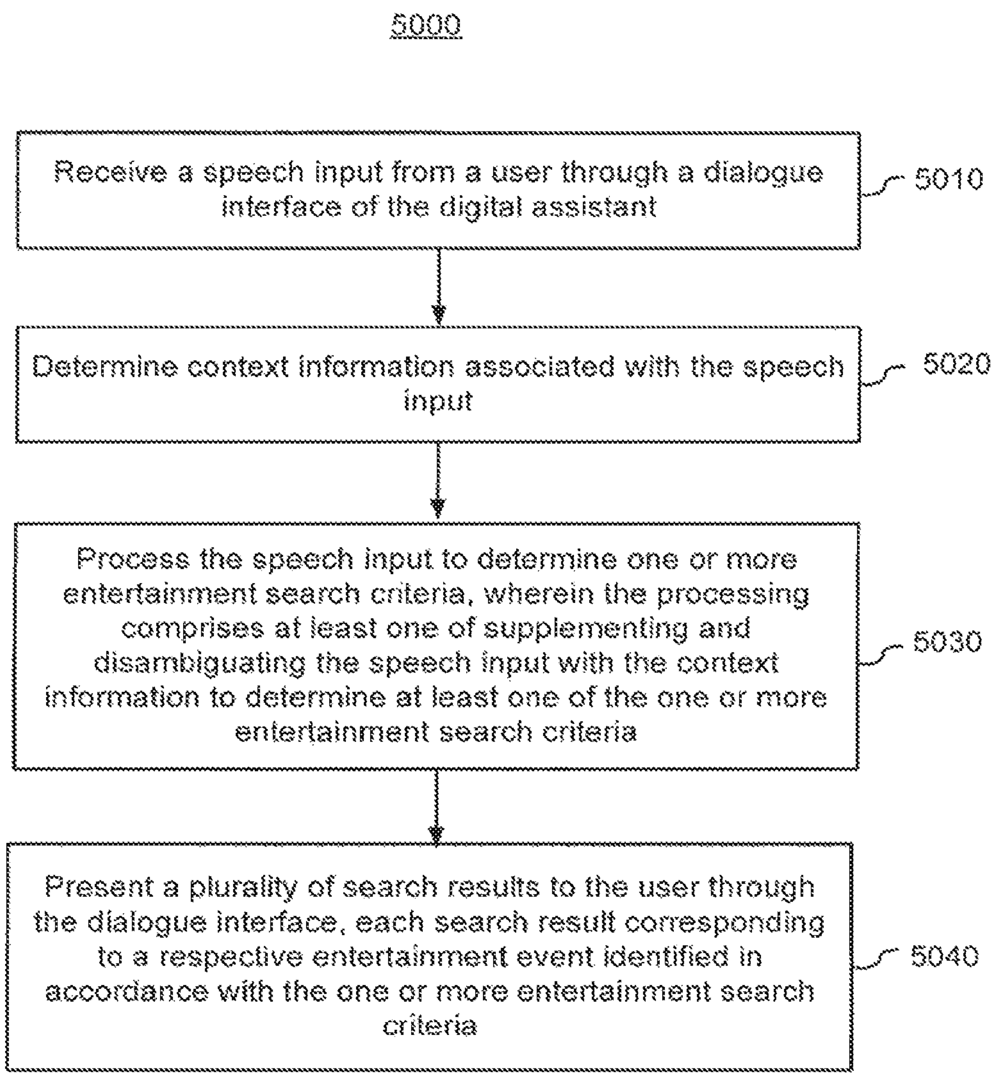
FIG. 50 is a flow diagram depicting a method for providing assistance with entertainment-related requests using a digital assistant according to some embodiments.

The features provided above with respect to FIG. 48 can be combined in various embodiments. In addition, the features are not necessarily limited to restaurant searches or entertainment event searches. Other applicable areas include, for example, searches for products, auction items, event venues, etc. FIG. 49 and FIG. 50 provide more details on features related to restaurant searches and entertainment event searches, respectively. The features described with respect to FIG. 48 can be combined with the features described in with respect to FIG. 49 and FIG. 50 as well as other features set forth in other sections of the specification.

FIG. 49 is a flow diagram depicting a method for performing a restaurant search using a digital assistant according to some embodiments. As shown in FIG. 49, in a process 4900, a digital assistant receives a speech input from a user through a dialogue interface of the digital assistant (4910). The digital assistant determines context information associated with the speech input, the context information including at least one prior interaction between the user and the digital assistant through the dialogue interface (4920). In some embodiments, the context information includes information extracted from one or more speech inputs previously received through the dialogue interface. The digital assistant processes the speech input to determine one or more restaurant search criteria, where the processing includes disambiguating at least part of the speech input based on the context information (4930). After a search is performed according to the restaurant search criteria, the digital assistant presents the search results to the user through the dialogue interface, where each search result corresponds to a respective restaurant identified in accordance with the restaurant search criteria (4940).

For example, suppose that the user has bought a ticket for a particular movie through the digital assistant during a particular dialogue session. Afterwards, the user asks the digital assistant to find a restaurant near the movie theater by providing a speech input "Where can we eat after the movie?" In such a scenario, the digital assistant uses the context provided by the prior user interactions (e.g., purchasing the movie ticket) to determine which movie the user was referring to in the speech input. After determining that the user was referring to the particular movie for which the user has just purchased a ticket, the digital assistant is able to determine the date, time, and location associated with that movie. The digital assistant then uses the determined date, time, and location as the search criteria for the newly received search request (e.g., the restaurant search request). In other words, without having to require the user to explicitly repeat the name, date, time, and location of the movie, the digital assistant processed the user's speech input, and determined the appropriate search criteria for the newly received restaurant search request using context information, including prior user interactions between the digital assistant and the user.

In some embodiments, the digital assistant processes the speech input from the user along with the associated context information to determine whether additional input is required to clarify the search request, to further constraint a search, and/or to rank the relative importance of various search criteria specified in the search request. If the digital assistant determines that such additional input is needed or desirable, the digital assistant generates a speech output or a textual prompt to request such additional input.

In some embodiments, the digital assistant provides a speech output through the dialogue interface requesting at least one additional search criterion for the restaurant search request. In response to providing the speech output, the digital assistant receives additional input (e.g., a speech input responding to the digital assistant's request) from the user through the dialogue interface. The digital assistant processes the additional input and supplements the restaurant search request with the additional user input.

In some embodiments, the digital assistant also provides a speech input requesting the user to specify the relative importance among multiple search criteria. Once the digital assistant receives the additional user input specifying the relative importance among the multiple search criteria, the digital assistant ranks and/or filters the search results based on the additional user input.

In some embodiments, the digital assistant receives the speech input from the user, and processes the speech input and associated context information to identify a party-size requirement for the restaurant search request. For example, when the user says, "I want to invite my parents to a nice dinner on Saturday night, please find me a good restaurant." Based on this speech input, the digital assistant can infer a party-size requirement of three (3), i.e., the user and the user's parents, for the restaurant search request.

In the above example, the digital assistant infers the party-size requirement from the user's speech input directly. In another example, if the user has just purchased two movie tickets through the digital assistant, and then asks the digital assistant, "Where can we eat before the movie'?" Based on the context information associated with the speech input (i.e., the purchasing of the movie tickets), the digital assistant infers that the movie referred to in the speech input is the same movie for which the tickets have been purchased. In addition, based on the fact that two movie tickets have been purchased, the digital assistant infers a party-size requirement of two (2) (i.e., the two people who are going to the movie) for the restaurant search request. In some embodiments, the digital assistant generates a speech output requesting the user to provide a party-size requirement for the restaurant search, and obtains the party-size requirement from the user's additional input provided in response to the digital assistant's request.

In some embodiments, after the digital assistant determines the party-size requirement for the restaurant search request, the digital assistant identifies one or more restaurants each having at least one open table meeting the party-size requirement. In some embodiments, the digital assistant submits the party-size requirement along with one or more other search criteria of the restaurant search request to one or more third-party information sources (e.g., online restaurant search and reservation services), and requests that only restaurants meeting the party-size requirement be provided by the third-party information sources. In some embodiments, the digital assistant requests the availability information for restaurants that satisfy at least a minimum set of the search criteria, and select only restaurants that have at least one open table meeting the party-size requirement as potential search results.

In some embodiments, after the restaurants meeting the party-size requirement (as well as the other search criteria) have been identified, the digital assistant generates the search results based on the identified restaurants. In some embodiments, each search result presents information about a respective restaurant, and also availability information about the restaurant. For example, if the user's restaurant search request did not specify a date and time for the restaurant search, the search results optionally presents the date(s) and time slot(s) that have availability (i.e., open tables) meeting the party-size requirement of the restaurant search request.

In some embodiments, before presenting the search results to the user, the digital assistant ranks the search results based on information collected from multiple third-party information services. For example, in some embodiments, the digital assistant compiles the reviews of candidate restaurants from multiple online sources, and reconciles the differences among the reviews and ratings from the different online sources. In some embodiments, the digital assistant also removes duplicate information, and/or integrates different facets of information regarding the same candidate restaurant that are available from the different online sources. Then, after reconciling and integrating the information from the multiple online sources regarding the candidate restaurants, the digital assistant generates and ranks the search results based on the integrated and reconciled information. More details regarding how information from multiple sources are integrated and reconciled is provided in earlier sections of this specification.

In some embodiments, the digital assistant identifies multiple restaurants in accordance with the restaurant search request, and places a hold on a respective open reservation slot for each of the multiple restaurants. For example, if the user has specified a party-size requirement in the restaurant search request, or if the digital assistant has inferred the party-size requirement based on context information (e.g., prior user input, prior user interactions, or default user preferences, etc.), the digital assistant places a hold on a restaurant reservation slot (or an open table) satisfying the party-size requirement. In some embodiments, the hold is placed through an application program interface (API) of a third-party online restaurant reservation service. In some embodiments, the hold is automatically placed on each restaurant that has been determined to satisfy all of the search criteria of the restaurant search request. In some embodiments, a hold is not placed on restaurants that only satisfy some of the search criteria of the restaurant search request until an affirmative instruction to do so is provided by the user (e.g., through real-time input or through previously saved user preferences). In some embodiments, the hold is automatically released after a predetermined time period if no subsequent reservation procedure is performed to convert the hold to an actual reservation.

In some embodiments, after the search results are presented to the user through the dialogue interface of the digital assistant, the digital assistant receives a reservation request for one of the search results from the user through the dialogue interface of the digital assistant. In response to receiving the reservation request, the digital assistant executes a reservation procedure to make a reservation for a respective restaurant corresponding to the search result. More details on how the digital assistant receives the reservation request and executes the reservation procedure are provided with respect to FIG. 48 and earlier sections of this specification.

In some embodiments, the digital assistant receives a reservation request for one of the search results from the user through the dialogue interface of the digital assistant. In response to receiving the reservation request, if a hold has been placed for the restaurant corresponding to the search result, the digital assistant converts the hold placed for the respective restaurant to a reservation. After successfully converting the hold to the reservation, the digital assistant releases the holds placed on other restaurants that are not reserved. In some embodiments, the digital assistant requests a user confirmation before actually making the reservation. In some embodiments, the hold is placed without a party-size requirement, and the digital assistant requests the party-size requirement from the user when the user asks the digital assistant to convert a hold to an actual reservation.

In some embodiments, when presenting the search results to the user, the digital assistant concurrently presenting a predetermined number of search results through the dialogue interface each time. For example, the digital assistant provides no more than five results (e.g., 3-5 results) concurrently to the user. In some embodiments, more results are only presented to the user when the user requests to see more results. By limiting the number of concurrently presented search results to a small number (e.g., 3-5), the digital assistant can reduce the cognitive burden placed on the user when the user reviews the results.

In some embodiments, for each of the search results, the digital assistant presents one or more properties of the respective restaurant corresponding to the search result, where each property corresponds to a respective restaurant search criterion used in identifying the plurality of search results. For example, if distance from a particular location was used as a search criterion for the restaurant search, then, for each search result, the distance between that particular location and a respective restaurant corresponding to the search result can be presented for the search result. Other properties such as cuisine (e.g., French, Italian, pizza, vegetarian, American, burgers, Californian, etc.), atmosphere (e.g., romantic, nice, trendy, cool, clean, good, etc.), price (e.g., expensive, $$$, cheap, etc.), popularity (e.g., number of reviews, years in existence, number of good reviews, number of bad reviews, etc.) can also be presented for each search result when they are used as the restaurant search criteria.

In some embodiments, the digital assistant concurrently presents one or more user interface elements (e.g., a reviews tab, a maps button, a ratings link, etc.) in the dialogue interface (e.g., on the conversation screen) along with the plurality of search results, where selection of the user interface elements causes presentation of a review, a map, or a rating associated with a respective restaurant corresponding to a selected search result.

In some embodiments, the digital assistant concurrently presents one or more user interface elements (e.g., a call button, a review submission button or link, a link-saving button, a link-sharing button, a direction request button, a reservation button, etc.) in the dialogue interface (e.g., on the conversation screen) along with the plurality of search results. Selection of the user interface elements causes follow-on actions of: initiating a telephonic call to a third party, submitting a review, saving a link, sharing a link, requesting directions, or making a reservation, with regard to a respective restaurant corresponding to a selected search result.

FIG. 50 is a flow diagram depicting a method for providing assistance with entertainment-related requests using a digital assistant according to some embodiments. As shown in FIG. 50, in a process 5000, the digital assistant receives a speech input from a user through a dialogue interface of the digital assistant (5010). The digital assistant then determines context information associated with the speech input (5020). The digital assistant processes the speech input to determine one or more entertainment search criteria, where the processing includes supplementing and/or disambiguating the speech input with the context information to determine at least one of the entertainment search criteria (5030). In some embodiments, the digital assistant presents search results to the user through the dialogue interface, where each search result corresponds to a respective entertainment event identified in accordance with the one or more entertainment search criteria (5040).

In some embodiments, supplementing the speech input includes determining a search criterion that is not specified or referred to in the speech input. For example, the context information may be used to provide a location search criterion, while the speech input makes no mention of any location. In some embodiments, disambiguating the speech input includes determining that the speech input includes a term that has multiple reasonable interpretations, selecting one of the multiple reasonable interpretations based on the context information associated with the speech input, and generating a search criterion based on the selected interpretation.

In some embodiments, the context information associated with the speech input includes at least one prior interaction between the user and the digital assistant through the dialogue interface. In some embodiments, the context information includes information stored in one or more applications, such as a calendar application, an e-mail application, an instant messaging application, and an address book application. For example, if the user mentions a name or scheduled appointment in the speech input, the digital assistant can obtain more information about the person(s) associated with that name or information about the scheduled appointment by accessing the user's address book or calendar through the appropriate applications.

In some embodiments, the context information includes one or more of a current location, a current time, and current or forecasted weather information. In some embodiments, the context information includes information extracted from one or more speech inputs previously received through the dialogue interface. In some embodiments, the context information includes information extracted from one or more non-verbal input previously received through the dialogue interface. For example, the non-verbal input includes text input, pointer input, and gesture input received from the user through various input devices coupled to the user device.

In some embodiments, the digital assistant concurrently presents one or more user interface elements in the dialogue interface along with the search results. In some embodiments, one of the user interface elements is for downloading and playing a media file associated with a corresponding entertainment event search result. For example, among the search results for a movie search, a respective trailers button can be presented for each movie search result. Selection of the trailers button will cause a movie trailer to be downloaded and played on the user device. In some embodiments, user interface elements for presenting reviews, show times, and making reservations are also provided for each search result.

In some embodiments, after the digital assistant has provided the search results to the user through the dialogue interface, the digital assistant continue to communicate with the user through the dialogue interface. For example, the digital assistant can receive a follow-up speech input from the user requesting additional information. The requested additional information can be in regard to one or more of the search results previously presented through the dialogue interface (e.g., through speech outputs by the digital assistant, and/or presented on a conversation screen) or one or more search results that are currently presented on the conversation screen. For example, after the digital assistant presented a number of movie search results based on the user's initial search request through the dialogue interface, the user can provide a follow-up speech input requesting additional information regarding one or more of the movie search results by saying, "Are there other movies on this topic?" or "Show me some other movies by the same director." or "Show me only movies that have a B+ rating." For another example, after the user has viewed the trailer for one of the movie search results, the user can provide a follow-up speech input by saying, "Are there other movies played by the same actress?"

In some embodiments, in response to receiving the follow-up speech input, the digital assistant disambiguates at least part of the follow-up speech input to generate a search query for retrieving the requested additional information, where the disambiguating is based at least in part on one or more properties related to respective entertainment events corresponding to the search results. For example, suppose that the user selects one of the movie search results, and provides a follow-up speech input, "Are there other movies by the same director?" In response to the follow-up speech input, the digital assistant identifies the movie that corresponds to the selected search results, and determines a relevant property associated with movie, namely, the director for the movie. Based on the relevant property (e.g., the identity of the director for the movie), the digital assistant disambiguates the user's follow-up speech input, and generates a search query for retrieving movies that were directed by the identified director.

In some embodiments, the digital assistant retrieves the requested additional information based on the search query, and presents the information to the user through the dialogue interface of the digital assistant. Continuing with the above example, once the digital assistant has retrieved the search results for movies that were directed by the identified director, the digital assistant presents the newly retrieved search results to the user through the dialogue interface. The user and the digital assistant can continue to interact with each other through the dialogue interface with respect to the newly retrieved search results, the search results presented earlier, and/or a new search request.

In some embodiments, during a dialogue session in which a speech input was received, the digital assistant maintains a dialogue context based on user inputs received through the dialogue interface and information provided to the user through the dialogue interface. A dialogue session includes the exchange of speech input and output between the user and the digital assistant. In some embodiments, the dialogue session also includes requests and responses exchanged through other modalities, such as textual prompts provided by the digital assistant and textual response provided by the user, as well as notifications or alerts provided by the digital assistant and user inputs to address the notifications and alerts.

A dialogue session can be defined in various ways. In some embodiments, a dialogue session is defined by a predetermined duration, e.g., a period of several minutes, tens of minutes, one hour, one day, several days, or even longer. It is advantageous to keep the dialogue session within a reasonable length, e.g., less than half an hour, so that maintaining the context information does not take up too much computation resources. In addition, the user is more likely to refer back to an item mentioned recently in the dialogue, and therefore, it is not particularly necessary to define a very long dialogue session.

In some embodiments, a dialogue session is defined as continuous or intermittent interactions between the digital assistant and the user with no interruptions longer than a predetermined duration (e.g., 2 minutes or 5 minutes). For example, a user can interact with the digital assistant continuously for a while, punch out of the digital assistant's conversation screen to access another application, and then resumes interaction with the digital assistant afterwards. In this example, as long as the user resumes the interaction with the digital assistant before the predetermined duration required for maintaining the dialogue session expires, the dialogue session persists, and the dialogue context associated with the dialogue session is continuously maintained.

In some embodiments, a dialogue session is defined by a starting trigger event and an ending trigger event. For example, the user can press a button or speak a trigger phrase to invoke the active listening of the digital assistant and start the dialogue session. After interacting with the digital assistant during the dialogue session, the user can press the button or speak another trigger phrase to end the dialogue session. Other ways of defining a dialogue session is possible.

In some embodiments, during the dialogue session in which an initial speech input was received, the digital assistant receives one or more additional speech inputs from the user through the dialogue interface. The digital assistant processes each of the one or more additional speech inputs based on the dialogue context maintained by the digital assistant to determine a user intent expressed in the additional speech input. In some embodiments, the processing of the additional speech input includes supplementing and/or disambiguating the additional speech input based on the dialogue context. In some embodiments, the digital assistant provides additional information in response to each of the one or more additional speech inputs based on the processing.

In some embodiments, when the digital assistant has presented the entertainment search results (e.g., movie search results or concert search results), the digital assistant receives a reservation request for one or more of the search results from the user through the dialogue interface of the digital assistant. In response to receiving the reservation request, the digital assistant executes a reservation procedure to purchase one or more tickets for a respective entertainment event corresponding to the one or more search results.

In some embodiments, the digital assistant performs the reservation procedure in the background while the digital assistant and the user continue to interact through the dialogue interface. In some embodiments, during the reservation procedure, the digital assistant communicates with the user regarding various preferences (e.g.,) and additional information (e.g., credit card information, payment authorization, etc.) regarding the reservation through the dialogue interface of the digital assistant. In some embodiments, the digital assistant loads the interface of a third-party online reservation service, and allows the user to make the reservation directly through the interface of the third-party online reservation service.

In some embodiments, during the dialogue session in which an initial speech input (e.g., the speech input initiating the entertainment search request) was received, the digital assistant receives a reservation request through the dialogue interface of the digital assistant after presentation of the search results has been replaced with other information in response to subsequent user inputs. In response to the reservation request, the digital assistant determines a target entertainment event of the reservation request based on the dialogue context, where the target entertainment event corresponds to one of the search results previously presented. Once the target entertainment event has been determined, the digital assistant executes a reservation procedure to purchase one or more tickets for the determined target entertainment event. The example below illustrates this process:

Suppose that the user had requested a movie search using an initial speech input "What movies are on this Saturday?" After the digital assistant had presented the list of movies that were showing this Saturday through the dialogue interface, the user asked to see some trailers for some of the movie results. In response, the digital assistant showed the trailers to the user, and as a result, the list of movies previously presented on the screen was replaced with the trailers. While the digital assistant interacts with the user regarding the movie search, the movie search results, and the trailers, the digital assistant maintained the dialogue context related to the current dialogue session. After the movie trailers were shown, the user submits a reservation request to the digital assistant, for example, using a speech input "Ok, get me a ticket for the dinosaur movie." Based on the speech input and the dialogue context of the current dialogue session, the digital assistant identifies the trailers that have been reviewed by the user, and determines the movies that correspond to those trailers. The digital assistant then identifies the particular movie among those movies that relates to dinosaurs. Once that particular movie related to dinosaurs has been identified, the digital assistant initiates the reservation procedure for the target entertainment event (i.e., the particular dinosaur movie that has been identified). In some embodiments, the digital assistant announces the name of the movie before proceeding to make the reservation or purchase the ticket for the movie.

Figure 51:
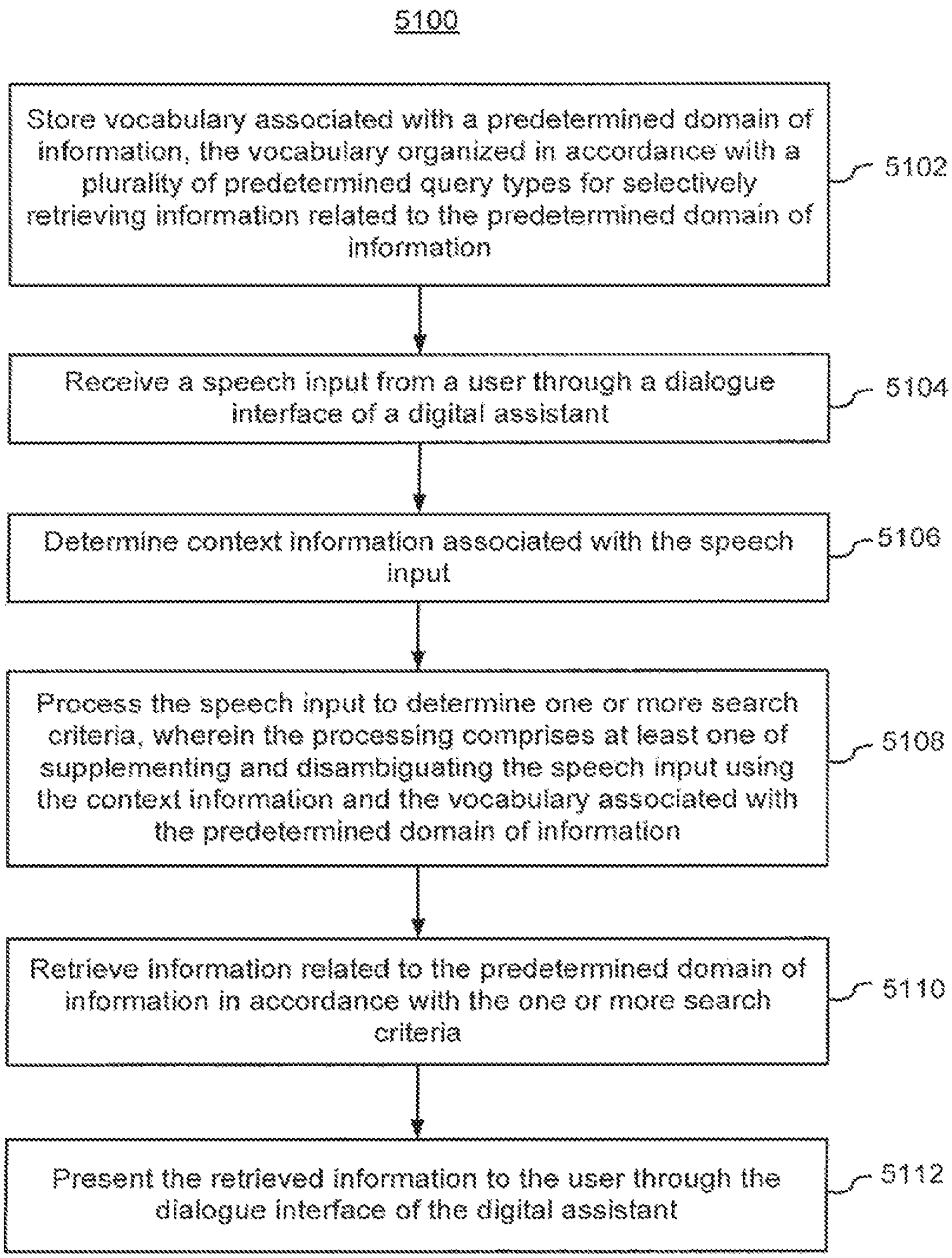
FIG. 51 is a flow diagram depicting a method for providing information related to particular domains of information using a digital assistant according to some embodiments.

FIG. 51 is a flow diagram depicting a method for providing information related to particular domains of information using a digital assistant according to some embodiments. As described earlier in the specification, a domain of information can be implemented as a cluster of interconnected nodes in an ontology. Each domain of information are associated with a set of vocabulary, domain entity data, language patterns (e.g., idioms, phrases, terms of art, typical queries, etc.), domain models, task flows, service capability models, dialogue flows and other components and data models that are relevant to the domain of information. For example, a restaurant domain includes vocabulary, domain entity data, and language patterns associated with restaurants, food, and dining; task flows of searching for restaurants, finding directions to restaurants, presenting search results for restaurant searches, comparing and ranking restaurants based on user's search priorities, and making restaurant reservations; dialogue flows for eliciting search criteria, constraints, references relevant to restaurant searches and reservations, paraphrasing user's search requests, and announcing restaurant search results; and other flows and data models implemented in the restaurant domain.

For another example, a movie domain includes vocabulary, domain entity data, and language patterns associated with movies, actors, directors, movie theatres, movie histories, etc. The movie domain also includes task flows, dialogue flows, and service capability models associated with movie/actor/director searches, movie ratings, downloading and playing movie trailers, reserving or buying movie tickets, and other questions and answers related to movies.

Similarly, in some embodiments, the digital assistant also implements a sports domain. The sports domain includes vocabulary, domain entities, language patterns, task flows, dialogue flows, and service capability models associated with searching for information on sports, performing tasks related to sporting events, sending short messages related to sports, trading sports-related memorabilia, and the like.

In some embodiments, the digital assistant implements a music domain. The music domain includes vocabulary, domain entities, language patterns, task flows, dialogue flows, and service capability models associated with searching for information on music and music-related people, events, and products, performing tasks related to music (e.g., purchasing CDs, albums, merchandises and/or downloading media files), and buying tickets to events (e.g., concerts, premieres, album signings).

In some embodiments, the digital assistant implements an entertainment domain. The entertainment domain includes vocabulary, domain entities, language patterns, task flows, dialogue flows, and service capability models associated with searching for information on entertainment-related people and events.

In some embodiments, the digital assistant implements a shopping domain. The shopping domain includes vocabulary, domain entities, language patterns, task flows, dialogue flows, and service models associated with searching for products and shopping.

In some embodiments, the digital assistant implements a gaming domain. The shopping domain includes vocabulary, domain entities, language patterns, task flows, dialogue flows, and service models associated with searching for information on games, gaming, gaming products, walk-throughs, making gaming-related purchases, and trade gaming-related virtual and real goods, equipments, and properties.

In some embodiments, each domain includes multiple sub-domains. For example, in some embodiments, the entertainment domain includes the movies domain, the sports domain, and the music domain. In some embodiments, the sports domain includes sub-domains for different sports. In some embodiments, the music domain includes sub-domains for different music genres. In some embodiments, the sub-domains may further include their own sub-domains, and the sub-domains may overlap.

In some embodiments, the digital assistant selectively provides information related to a domain of information in response to natural language requests from the user. For example, based on the vocabulary (e.g., particular keywords), domain entities (e.g., well-known people and entities), and/or language patterns (e.g., a particular query template or request pattern) commonly associated with requests for each information domain implemented by the digital assistant, the digital assistant is able to determine that the user's request is likely to be directed to a particular domain of information. Once the digital assistant has determined the likely domain of interest, natural language processing of the user's current and subsequent requests can be biased toward that particular domain to disambiguate the names of people, locations, entities, and user's intent expressed in the natural language request.

For example, vocabulary associated with the sports domain includes proper names and nicknames of different sports, athletes, sports teams, sporting events, and well-known sponsors of sporting events, brands for sporting goods, venues of sporting events and games, sport history, terms of art and jargons of different sports and games, and the like. The language patterns associated with the sports domain include keywords and phrases such as "what's the score for . . . ", "who is playing against . . . ?" "which team won the . . . ", "what's the game stats for . . . ", and so on. Based on the sports-related vocabulary and language patterns, the digital assistant can infer whether a user's request is related to the sports domain.

For another example, for the music domain, user often ask questions related to music, genres, billboard rankings of songs and albums, lyrics, albums and tours for particular artists, news about famous artists, the latest hits, and the like. The vocabulary associated with the music domain would include proper names and nicknames of musicians, singers, songs, genres, music groups, etc. The language patterns associated with the music domain include keywords and phrases such as “show me the lyrics for . . . ” “What’s the name of the song that “Who sang the song “What’s the latest song by . . . ”, and so on. Based on the music-related vocabulary and language patterns, the digital assistant can infer whether a user’s request is related to the music domain.

In some embodiments, the digital assistant stores a collection of common query types representing the type of questions that user frequently ask in a particular information domain. For example, for the sports domain, users often ask questions related to game scores and player statistics, game times, team rosters, athlete salaries, player and/or team history, and current sports news. For the music domain, users often ask questions related to artists, genre, lyrics, the latest hits, classics, famous songs, well-known lines in particular songs, and so on.

In some embodiments, the digital assistant also implements sub-domains of common query types related to famous personalities and entities in the domain. For example, in some embodiments, in the sports domain, the digital assistant also implements sub-domains of common query types revolved around famous athletes, sports teams, and sports events, such as “Kobe-related questions,” “Giants-related questions”, “Super Bowl related questions, and the like. In some embodiments, for the music domain, the digital assistant can implement sub-domains of common query types related to famous singers, songs, and genres, such as “Elvis-related questions” “Blues-related questions”, “Hip-Pop-related questions, and the like.

As shown in FIG. 51, in a process 5100, the digital assistant stores vocabulary associated with a predetermined domain of information, the vocabulary organized in accordance with a plurality of predetermined query types for selectively retrieving information related to the predetermined domain of information (5102). For example, in the sports domain, sports related vocabulary are stored in association with different query types, such as queries related to scores, queries related to athletes statistics, queries related to sports teams, queries related to current games or season, queries related to famous athlete X (e.g., Tiger Woods or Michael Jordan), and so on.

In the process 5100, the digital assistant receives a speech input from a user through a dialogue interface of a digital assistant (5104). The digital assistant determines context information associated with the speech input (5106). The digital assistant processes the speech input to determine one or more search criteria, where the processing includes supplementing and/or disambiguating the speech input using the context information and the vocabulary associated with the predetermined domain of information (5108).

For example, if the user’s speech input include sports-related vocabulary, once the digital assistant detects the sports-related vocabulary, (e.g., keywords or language patterns associated with a predetermined query type stored in the sports domain), the digital assistant supplements and/or disambiguate the speech input using context information and the vocabulary associated with the sports domain. For a more detailed example, suppose the user says, “Who is playing the Lakers tonight?” From this speech input, the digital assistant recognizes the sports-related vocabulary “the Lakers” and the sports-related language pattern “Who is playing [a sports team] . . . ” which have both been stored in the sports domain of the digital assistant. As a result, the digital assistant determines that the user is interested in sports-related information. The digital assistant also uses the context information (e.g., the current date) to determine which date the user is referring to by the word “tonight” in the speech input. After the digital assistant has fully disambiguated the user’s speech input, the digital assistant proceeds to perform a search to retrieve the requested information. Specifically, the digital assistant retrieves the name of the team that is playing against the Lakers in the evening of the current date.

For another more detailed example, suppose the user asks, “How did Lebron do last night?” According to the vocabulary (e.g., including proper and nicknames of basketball players) and domain entities (e.g., data records on players and sports teams) stored under the sports domain, the digital assistant recognizes that “Lebron” is the name of a famous basketball player “LeBron James”, and a current member of an NBA team called the “Miami Heat”. Based on the language pattern “How did [player name] do . . . ” stored under the sports domain, the digital assistant also recognizes that the user is asking a question related to player game statistics (i.e., a predetermined query type stored under the sports domain). After the digital assistant recognizes that the user is interested in knowing the game statistics for a basketball player of a particular team, the digital assistant uses the context information (e.g., the current date) to determine which game the Miami Heat played the day before, and proceeds the retrieve the game statistics for LeBron James for that game.

As shown in the example above, in the process 5100, the digital assistant retrieves information related to the predetermined domain of information (e.g., the sports domain) in accordance with the one or more search criteria (e.g., {query type=player’s game statistics, player name=LeBron James, Team=Miami Heat, game date=yesterday=e.g., Jun. 8, 2012)) (5110). After the information is retrieved based on the search criteria, the digital assistant presents the retrieved information to the user through the dialogue interface of the digital assistant (5112). For example, the digital assistant can produce a speech output to the user saying, “LeBron did well last night, 30 points, 8 rebounds, and 2 assists.”

In some embodiments, after the digital assistant has established that the user is interested in a particular domain of information (e.g., after the digital assistant has satisfactorily answered a user’s question related to the sport domain), the digital assistant can continue the conversation with the user within the sports domain. In some embodiments, the digital assistant carries on the conversation (e.g., continued questions and answers) by maintaining a dialogue context of the conversation. The dialogue context keeps track of what information have been asked and received by the user, at which time, and/or in which order.

For example, in some embodiments, during a dialogue session in which a speech input (e.g., an initial user question related to a particular domain of information) was received, the digital assistant maintains a dialogue context based on user inputs received through the dialogue interface and information provided to the user through the dialogue interface. Then, during the same dialogue session, the digital assistant receives one or more additional speech inputs from the user through the dialogue interface. The digital assistant processes each of the one or more additional speech inputs based on the dialogue context to determine the user intent expressed in the additional speech input. In some embodiments, the processing includes supplementing and/or disambiguating the additional speech inputs based on the dialogue context. Then, based on the processing, the digital assistant provides additional information in response to each of the one or more additional speech inputs.

Continuing with the above sport-related example, during the dialogue session in which the user asked about LeBron James' game statistics, the digital assistant maintains the dialogue context and keeps track of what the user has asked about, and what information has been provided to the user, at which times, and/or in which order. Suppose that, after hearing LeBron's game statistics, the user asks another question through an additional speech input "What about Kobe?" Based on this speech input, the digital assistant is able to identify that "Kobe" also refers to a basketball player. Based on the dialogue context stored by the digital assistant, the digital assistant determines that the user has just asked and received answers about the game statistics for another basketball player "LeBron James." Therefore, the digital assistant interprets the user's question "What about Kobe" as a request for game statistics for Kobe Bryant. In some implementations, the digital assistant performs the task flow for retrieving player game statistics as previously performed, except for replacing the player name "LeBron James" with a different player name "Kobe Bryant." Once the digital assistant retrieves the player game statistics for Kobe Bryant for last night, and the digital assistant presents the game statistics to the user through the dialogue interface through a speech output, "Kobe also did well last night, 30 points, 4 rebounds, and 4 assists."

In some embodiments, for some query types, the digital assistants implements dialogue flows that offer to provide the user with additional information related to the user's current questions. For example, after the digital assistant provided the game statistics information about particular players, the digital assistant can offer to show a video clip of the game in which the players had scored. For example, after the digital assistant has provided the user with Kobe's game statistics last night, the digital assistant can ask the user "Would you like to see a video clip of the game?" If the user accepts, the digital assistant proceeds to play the video clip for the game last night in which Kobe has scored.

Suppose that after the digital assistant has provided Kobe's game statistics to the user, or after the video clips are shown to the user, the conversation between the digital assistant and the user continues. For example, the user then asks, "So, who makes more money?" The digital assistant identifies that the user's input matches a language pattern (e.g., "makes . . . money") associated with a query type "player salaries" stored under the sports domain. Based on the dialogue context stored for the current dialogue session, the digital assistant determines that two basketball players (e.g., LeBron James and Kobe Bryant) have been mentioned in the most recent exchange between the user and the digital assistant. Based on the dialogue context, the digital assistant disambiguates the user's input and interprets the user's input as a question about the salaries of the two basketball players, and specifically, a comparison between the salaries of the two basketball players. After the digital assistant determines the user's intent, the digital assistant proceeds to retrieve the salary information about the two players, and formulate an output comparing the salaries of the two players. For example, the digital assistant can provide a speech output saying, "Based on my sources, Kobe made X dollars in 2011 in salaries, and LeBron made Y dollars in 2011 in salaries."

In some embodiments, the digital assistant implements a dialogue flow to provide additional related information that may be of interest to the user. For example, in the dialogue flow associated with the player salary related queries, the digital assistant can provide information on product sponsorship by the players, and deals on the sponsored products. For example, the based on the dialogue flow, instead of a plain answer to the user's question regarding player salaries, the digital assistant provides a speech output saying, "Based on my sources, Kobe made X dollars in 2011 in salaries, and LeBron made Y dollars in 2011 in salaries. Both Kobe and LeBron contribute to charities. Would you like to join them in supporting the "After-School All-Stars" a national children's charity that provides after-school programs to inner-city kids?" If the user answers in the affirmative, the digital assistant invokes an appropriate task flow to initiate a donation procedure for the user.

In some embodiments, the digital assistant implements a dialogue flow to provide related information that may be of interest to the user if the digital assistant cannot provide a satisfactory answer to the user's original question. For example, if the user asks the digital assistant "Who is a better player?" The digital assistant determines that it is not able to provide a satisfactory answer to this complex question. As a result, the digital assistant provides an output that says "That's a touch question. But did you know that Kobe and LeBron both likes to tweet? But LeBron has four times more followers on Twitter™?"

Although the above examples are provided in the context of the sports domain, vocabulary, task flows, dialogue flows for other domains can be implemented in an analogous manner. For example, the digital assistant can also implement an entertainment domain to answer users' questions about celebrities, and the entertainment industry; a travels domain to answer users' questions about traveling, sightseeing, and local and foreign cultures; a gaming domain to answer users' questions about games, gaming gadgets, walkthroughs, competitions, etc. Other domains are also possible.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (AS1Cs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joy-stick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, desktop computer, laptop computer, tablet computer, consumer electronic device, consumer entertainment device; music player; camera; television; set-top box; electronic gaming unit; or the like. An electronic device for implementing the present invention may use any operating system such as, for example, iOS or MacOS, available from Apple Inc. of Cupertino, California, or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. An electronic device, comprising: one or more processors;

a memory; and one or more programs, wherein the one or more programs are stored in the memory and configured to be executed by the one or more processors, the one or more programs including instructions for: storing vocabulary associated with a predetermined domain of information, the vocabulary organized in accordance with a plurality of predetermined query types for selectively retrieving information related to the predetermined domain of information of a plurality of predetermined domains of information, wherein the plurality of predetermined domains of information include a respective predetermined domain of information having a sub-domain including predetermined query types associated with queries frequently received from a plurality of users;

receiving a speech input from a user through a dialogue interface of a digital assistant;

determining context information associated with the speech input;

processing the speech input to determine one or more search criteria, wherein the processing comprises at least one of supplementing and disambiguating the speech input using the context information and the vocabulary associated with the predetermined domain of information;

retrieving information related to the predetermined domain of information in accordance with the one or more search criteria;

presenting, based on the retrieved information, one or more results to the user through the dialogue interface of the digital assistant;

determining that each of the one or more search criteria have been satisfied based on the one or more results;

after presenting the one or more results to the user, providing a prompt to the user, wherein the prompt includes an option to initiate playback of a media item corresponding to the one or more results; and in response to a user acceptance of the option to initiate playback of the media item corresponding to the one or more results, initiating playback of the media item corresponding to the one or more results.

2. The device of claim 1, the one or more programs including instructions for:

during a dialogue session in which the speech input was received:

maintaining a dialogue context based on user inputs received through the dialogue interface and information provided to the user through the dialogue interface;

receiving one or more additional speech inputs from the user through the dialogue interface;

processing each of the one or more additional speech inputs based on the dialogue context to determine a user intent expressed in the additional speech input, the processing including at least supplementing or disambiguating the additional speech input based on the dialogue context; and based on the processing, providing additional information in response to each of the one or more additional speech input.

3. The device of claim 1, wherein presenting, based on the retrieved information, one or more results to the user through the dialogue interface of the digital assistant further comprises:

determining whether the retrieved information is satisfactory to a question obtained from the speech input; and in accordance with a determination that the retrieved information is not satisfactory to a question obtained from the speech input, presenting information related to the retrieved information to the user through the dialogue interface of the digital assistant.

4. The device of claim 1, the one or more programs including instructions for:

storing a plurality of language patterns associated with a predetermined domain of information, wherein the processing comprises at least one of supplementing and disambiguating the speech input using the language patterns associated with a predetermined domain of information.

5. The device of claim 4, wherein the plurality of language patterns include at least one of a particular query template and a request pattern.

6. The device of claim 1, wherein the predetermined domain of information is associated with a sports domain including sports vocabulary stored in association with query types related to one or more of scores, athlete statistics, sports teams, current games, and current seasons.

7. The device of claim 1, wherein the predetermined domain of information is associated with a sub-domain of common query types.

8. The device of claim 7, wherein the predetermined domain corresponds to a sports domain, and wherein the common query types include one or more question types associated with game scores, player statistics, game times, team rosters, athlete salaries, player team history, and current sports news.

9. The device of claim 7, wherein the predetermined domain corresponds to a music domain, and wherein the common query types include one or more question types associated with artists, genre, lyrics, and famous songs.

10. The device of claim 1, the one or more programs including instructions for:

maintaining a dialog context including information asked by the user and information received by the user, wherein the dialog context includes an ordered list of information based on time parameters.

11. The device of claim 10, wherein the dialog context includes at least one question received from the user and at least one answer to the at least one question.

12. The device of claim 1, wherein presenting, based on the retrieved information, one or more results to the user through the dialogue interface of the digital assistant comprises:

providing a speech output including search results; and presenting the search results on a display screen of the electronic device.

13. A computer-implemented method, comprising: at an electronic device with one or more processors and memory:

storing vocabulary associated with a predetermined domain of information, the vocabulary organized in accordance with a plurality of predetermined query types for selectively retrieving information related to the predetermined domain of information of a plurality of predetermined domains of information, wherein the plurality of predetermined domains of information include a respective predetermined domain of information having a sub-domain including predetermined query types associated with queries frequently received from a plurality of users;

receiving a speech input from a user through a dialogue interface of a digital assistant;

determining context information associated with the speech input;

processing the speech input to determine one or more search criteria, wherein the processing comprises at least one of supplementing and disambiguating the speech input using the context information and the vocabulary associated with the predetermined domain of information;

retrieving information related to the predetermined domain of information in accordance with the one or more search criteria;

presenting, based on the retrieved information, one or more results to the user through the dialogue interface of the digital assistant;

determining that each of the one or more search criteria have been satisfied based on the one or more results;

after presenting the one or more results to the user, providing a prompt to the user, wherein the prompt includes an option to initiate playback of a media item corresponding to the one or more results; and in response to a user acceptance of the option to initiate playback of the media item corresponding to the one or more results, initiating playback of the media item corresponding to the one or more results.

14. A non-transitory computer-readable storage medium storing one or more programs, the one or more programs comprising instructions, which when executed by one or more processors of an electronic device, cause electronic device to: store vocabulary associated with a predetermined domain of information, the vocabulary organized in accordance with a plurality of predetermined query types for selectively retrieving information related to the predetermined domain of information of a plurality of predetermined domains of information, wherein the plurality of predetermined domains of information include a respective predetermined domain of information having a sub-domain including predetermined query types associated with queries frequently received from a plurality of users;

receive a speech input from a user through a dialogue interface of a digital assistant;

determine context information associated with the speech input;

process the speech input to determine one or more search criteria, wherein the processing comprises at least one of supplementing and disambiguating the speech input using the context information and the vocabulary associated with the predetermined domain of information;

retrieve information related to the predetermined domain of information in accordance with the one or more search criteria;

present, based on the retrieved information, one or more results to the user through the dialogue interface of the digital assistant;

determining that each of the one or more search criteria have been satisfied based on the one or more results;

after presenting the one or more results to the user, providing a prompt to the user, wherein the prompt includes an option to initiate playback of a media item corresponding to the one or more results; and in response to a user acceptance of the option to initiate playback of the media item corresponding to the one or more results, initiating playback of the media item corresponding to the one or more results.

15. The device of claim 1, the one or more programs including instructions for: determining that each of the one or more search criteria have been satisfied based on the one or more results; maintaining a dialog context including additional speech inputs and digital assistant responses to the additional speech inputs; and interpreting the additional speech inputs using the predetermined domain of information and the dialog context.

16. The method of claim 13, comprising:

during a dialogue session in which the speech input was received:

maintaining a dialogue context based on user inputs received through the dialogue interface and information provided to the user through the dialogue interface;

receiving one or more additional speech inputs from the user through the dialogue interface;

processing each of the one or more additional speech inputs based on the dialogue context to determine a user intent expressed in the additional speech input, the processing including at least supplementing or disambiguating the additional speech input based on the dialogue context; and based on the processing, providing additional information in response to each of the one or more additional speech input.

17. The method of claim 13, wherein presenting, based on the retrieved information, one or more results to the user through the dialogue interface of the digital assistant further comprises:

determining whether the retrieved information is satisfactory to a question obtained from the speech input; and in accordance with a determination that the retrieved information is not satisfactory to a question obtained from the speech input, presenting information related to the retrieved information to the user through the dialogue interface of the digital assistant.

18. The method of claim 13, comprising:

storing a plurality of language patterns associated with a predetermined domain of information, wherein the processing comprises at least one of supplementing and disambiguating the speech input using the language patterns associated with a predetermined domain of information.

19. The method of claim 18, wherein the plurality of language patterns include at least one of a particular query template and a request pattern.

20. The method of claim 13, wherein the predetermined domain of information is associated with a sports domain including sports vocabulary stored in association with query types related to one or more of scores, athlete statistics, sports teams, current games, and current seasons.

21. The method of claim 13, wherein the predetermined domain of information is associated with a sub-domain of common query types.

22. The method of claim 21, wherein the predetermined domain corresponds to a sports domain, and wherein the common query types include one or more question types associated with game scores, player statistics, game times, team rosters, athlete salaries, player team history, and current sports news.

23. The method of claim 21, wherein the predetermined domain corresponds to a music domain, and wherein the common query types include one or more question types associated with artists, genre, lyrics, and famous songs.

24. The method of claim 13, comprising:

maintaining a dialog context including information asked by the user and information received by the user, wherein the dialog context includes an ordered list of information based on time parameters.

25. The method of claim 24, wherein the dialog context includes at least one question received from the user and at least one answer to the at least one question.

26. The method of claim 13, wherein presenting, based on the retrieved information, one or more results to the user through the dialogue interface of the digital assistant comprises:

providing a speech output including search results; and presenting the search results on a display screen of the electronic device.

27. The method of claim 13, comprising:

determining that each of the one or more search criteria have been satisfied based on the one or more results;

maintaining a dialog context including additional speech inputs and digital assistant responses to the additional speech inputs; and interpreting the additional speech inputs using the predetermined domain of information and the dialog context.

28. The non-transitory computer-readable storage medium of claim 14, wherein the instructions cause the electronic device to:

during a dialogue session in which the speech input was received:

maintain a dialogue context based on user inputs received through the dialogue interface and information provided to the user through the dialogue interface;

receive one or more additional speech inputs from the user through the dialogue interface;

process each of the one or more additional speech inputs based on the dialogue context to determine a user intent expressed in the additional speech input, the processing including at least supplementing or disambiguating the additional speech input based on the dialogue context; and based on the processing, provide additional information in response to each of the one or more additional speech input.

29. The non-transitory computer-readable storage medium of claim 14, wherein presenting, based on the retrieved information, one or more results to the user through the dialogue interface of the digital assistant further comprises:

determine whether the retrieved information is satisfactory to a question obtained from the speech input; and in accordance with a determination that the retrieved information is not satisfactory to a question obtained from the speech input, present information related to the retrieved information to the user through the dialogue interface of the digital assistant.

30. The non-transitory computer-readable storage medium of claim 14, wherein the instructions cause the electronic device to:

store a plurality of language patterns associated with a predetermined domain of information, wherein the processing comprises at least one of supplementing and disambiguating the speech input using the language patterns associated with a predetermined domain of information.

31. The non-transitory computer-readable storage medium of claim 30, wherein the plurality of language patterns include at least one of a particular query template and a request pattern.

32. The non-transitory computer-readable storage medium of claim 14, wherein the predetermined domain of information is associated with a sports domain including sports vocabulary stored in association with query types related to one or more of scores, athlete statistics, sports teams, current games, and current seasons.

33. The non-transitory computer-readable storage medium of claim 14, wherein the predetermined domain of information is associated with a sub-domain of common query types.

34. The non-transitory computer-readable storage medium of claim 33, wherein the predetermined domain corresponds to a sports domain, and wherein the common query types include one or more question types associated with game scores, player statistics, game times, team rosters, athlete salaries, player team history, and current sports news.

35. The non-transitory computer-readable storage medium of claim 33, wherein the predetermined domain corresponds to a music domain, and wherein the common query types include one or more question types associated with artists, genre, lyrics, and famous songs.

36. The non-transitory computer-readable storage medium of claim 14, wherein the instructions cause the electronic device to:

maintain a dialog context including information asked by the user and information received by the user, wherein the dialog context includes an ordered list of information based on time parameters.

37. The non-transitory computer-readable storage medium of claim 36, wherein the dialog context includes at least one question received from the user and at least one answer to the at least one question.

38. The non-transitory computer-readable storage medium of claim 14, wherein presenting, based on the retrieved information, one or more results to the user through the dialogue interface of the digital assistant comprises:

provide a speech output including search results; and present the search results on a display screen of the electronic device.

39. The non-transitory computer-readable storage medium of claim 14, wherein the instructions cause the electronic device to:

determine that each of the one or more search criteria have been satisfied based on the one or more results;

maintaining a dialog context including additional speech inputs and digital assistant responses to the additional speech inputs; and interpreting the additional speech inputs using the predetermined domain of information and the dialog context.

* * * * *